US012797162B2

(12) United States Patent
Li et al.

(10) Patent No.: US 12,797,162 B2
(45) Date of Patent: Nov. 17, 2026

(54) ORTHODONTIC DEVICES AND METHODS OF USE

(71) Applicant: Brius Technologies, Inc., Carrollton, TX (US)

(72) Inventors: Steven Benson Li, Dallas, TX (US); Seyed Mehdi Roein Peikar, Carrollton, TX (US); Woojae Kim, Addison, TX (US); James Sylvester Wratten, Jr., Waterville, NY (US)

(73) Assignee: Brius Technologies, Inc., Carrollton, TX (US)

( * ) Notice: Subject to any disclaimer, the term of this patent is extended or adjusted under 35 U.S.C. 154(b) by 339 days.

(21) Appl. No.: 18/558,608

(22) PCT Filed: May 4, 2022

(86) PCT No.: PCT/US2022/072113

§ 371 (c)(1),
(2) Date: Nov. 2, 2023

(87) PCT Pub. No.: WO2022/236287

PCT Pub. Date: Nov. 10, 2022

(65) Prior Publication Data

US 2024/0225788 A1 Jul. 11, 2024

Related U.S. Application Data

(60) Provisional application No. 63/201,562, filed on May 4, 2021.

(51) Int. Cl.
*A61C 7/14* (2006.01)
*A61C 7/02* (2006.01)
(Continued)

(52) U.S. Cl.
CPC ................ *A61C 7/145* (2013.01); *A61C 7/02* (2013.01); *A61C 7/22* (2013.01); *A61C 7/30* (2013.01)

(58) Field of Classification Search
CPC .. A61C 7/02; A61C 7/145; A61C 7/22; A61C 7/30
See application file for complete search history.

(56) References Cited

U.S. PATENT DOCUMENTS 6,190,166 B1 * 2/2001 Sasakura ................ A61C 7/287 433/14
2009/0004618 A1 * 1/2009 Oda ......................... A61C 7/02 433/11
(Continued)

FOREIGN PATENT DOCUMENTS

WO 2022236287 A1 11/2022

*Primary Examiner* — Ralph A Lewis
(74) *Attorney, Agent, or Firm* — Fortem IP LLP

(57) ABSTRACT

Orthodontic systems are disclosed herein. According to some embodiments, the present technology includes a securing member configured to be secured to a patient's tooth and an orthodontic appliance comprising a resiliently deformable attachment portion configured to be releasably secured to the securing member. The attachment portion can be moveable between an attached state in which the orthodontic appliance exerts active and/or retentive orthodontic force on the tooth via the attachment portion and the securing member when the securing member is secured to the tooth and a detached state in which the orthodontic appliance is operably disconnected from the securing member. The securing member can comprise a plurality of protrusions configured to engage the attachment portion when the attachment portion is in the attached state.

31 Claims, 78 Drawing Sheets

(51) Int. Cl.

| | |
|---|---|
| ***A61C 7/22*** | (2006.01) |
| ***A61C 7/30*** | (2006.01) |

(56) References Cited

U.S. PATENT DOCUMENTS

| | | | | |
|---|---|---|---|---|
| 2017/0156823 | A1* | 6/2017 | Roein Peikar | A61C 7/28 |
| 2018/0049847 | A1* | 2/2018 | Oda | A61C 7/30 |
| 2020/0390524 | A1* | 12/2020 | Roein Peikar | A61C 7/22 |
| 2021/0401548 | A1* | 12/2021 | Oda | A61C 7/02 |

* cited by examiner

ORTHODONTIC DEVICES AND METHODS OF USE

CROSS-REFERENCE TO RELATED APPLICATION(S)

The present application is a 371 U.S. national phase application of International Application No. PCT/US2022/072113, filed May 4, 2022, which claims the benefit of priority to U.S. Provisional Patent Application No. 63/201,562, filed May 4, 2021, each of which is incorporated by reference herein in its entirety.

TECHNICAL FIELD

The present technology relates to the field of orthodontics and, more particularly, to devices, systems, and methods for securing orthodontic appliances to a patient's teeth.

BACKGROUND

A common objective in orthodontics is to move a patient's teeth to positions where the teeth function optimally and aesthetically. To move the teeth, the orthodontist begins by obtaining multiple scans and/or impressions of the patient's teeth to determine a series of corrective paths between the initial positions of the teeth and the desired ending positions. The orthodontist then fits the patient to one of two main appliance types: braces or aligners.

Traditional braces consist of brackets and an archwire placed across a front side of the teeth, with elastic ties or ligature wires to secure the archwire to the brackets. In some cases self-ligating brackets may be used in lieu of ties or wires. The shape and stiffness of the archwire as well as the archwire-bracket interaction governs the forces applied to the teeth and thus the direction and degree of tooth movement. To exert a desired force on the teeth, the orthodontist often manually bends the archwire. The orthodontist monitors the patient's progress through regular appointments, during which the orthodontist visually assesses the progress of the treatment and makes manual adjustments to the archwire (such as new bends) and/or replaces or repositions brackets. The adjustment process is both time consuming and tedious for the patient and more often than not results in patient discomfort for several days following the appointment. Moreover, braces are not aesthetically pleasing and make brushing, flossing, and other dental hygiene procedures difficult.

Aligners comprise clear, removable, polymeric shells having cavities shaped to receive and reposition teeth to produce a final tooth arrangement. Aligners offer patients significantly improved aesthetics over braces. Aligners do not require the orthodontists to bend wires or reposition brackets and are generally more comfortable than braces. However, unlike braces, aligners cannot effectively treat all malocclusions. Certain tooth repositioning steps, such as extrusion, translation, and certain rotations, can be difficult or impossible to achieve with aligners. Moreover, because the aligners are removable, success of treatment is highly dependent on patient compliance, which can be unpredictable and inconsistent.

Lingual braces are an alternative to aligners and traditional (buccal) braces and have been gaining popularity in recent years. Two examples of existing lingual braces are the Incognito™ Appliance System (3M United States) and INBRACE® (Swift Health Systems, Irvine, California, USA), each of which consists of brackets and an archwire placed on the lingual, or tongue side, of the teeth. In contrast to traditional braces, lingual braces are virtually invisible, and, unlike aligners, lingual braces are fixed to the patient's teeth and force compliance. These existing lingual technologies, however, also come with several disadvantages. Most notably, conventional lingual appliances still rely on a bracket-archwire system to move the teeth, thus requiring multiple office visits and painful adjustments. For example, lingual technologies have a relatively short inter-bracket distance, which generally makes compliance of the archwire stiffer. As a result, the overall lingual appliance is more sensitive to archwire adjustments and causes more pain for the patient. Moreover, the lingual surfaces of the appliance can irritate the tongue and impact speech, and make the appliance difficult to clean.

Therefore, a need exists for improved orthodontic appliances.

SUMMARY

The subject technology is illustrated, for example, according to various aspects described below, including with reference to FIGS. 1A-103C. Various examples of aspects of the subject technology are described as numbered clauses (1, 2, 3, etc.) for convenience. These are provided as examples and do not limit the subject technology.

1. An orthodontic system, comprising:
  - a securing member including:
    - a backing having a first side and a second side opposite the first side along a thickness of the backing and configured to be secured to a tooth of a patient,
    - a protrusion carried by the backing, wherein the protrusion extends away from the first side in a buccolingual dimension when the securing member is secured to the tooth via the backing, and
    - a fulcrum at the protrusion; and
  - an orthodontic appliance operably associated with the securing member, wherein the orthodontic appliance includes an attachment portion configured to be releasably secured to the securing member, wherein the attachment portion has:
    - an attached state in which the orthodontic appliance exerts active and/or retentive orthodontic force on the tooth via the attachment portion and the securing member when the securing member is secured to the tooth, and
    - a detached state in which the orthodontic appliance is operably disconnected from the securing member,
  - wherein the attachment portion is configured to move from the detached state to the attached state in response to relative movement between the attachment portion and the securing member in an occlusogingival dimension when the securing member is secured to the tooth, and
  - wherein the attachment portion is configured to move from the attached state toward the detached state in response to leverage from a lever supported by the fulcrum when the securing member is secured to the tooth.

2 The orthodontic system of Clause 1, wherein the attachment portion is configured to snap from the detached state to the attached state in response to relative movement between the attachment portion and the securing member in an occlusogingival dimension when the securing member is secured to the tooth.

3. The orthodontic system of Clause 1 or Clause 2, wherein the orthodontic appliance further comprises:

a biasing portion configured to store the orthodontic force; and a connector through which the biasing portion is connected to the attachment portion, wherein the connector extends gingivally away from the attachment portion at the securing member when the attachment portion is in the attached state and the securing member is secured to the tooth.

4. The orthodontic system of any one of Clauses 1 to 3, wherein the orthodontic appliance further comprises:

a biasing portion configured to store the orthodontic force; and a connector through which the biasing portion is connected to the attachment portion, wherein the connector extends mesially or distally away from the attachment portion at the securing member when the attachment portion is in the attached state and the securing member is secured to the tooth.

5. The orthodontic system of any one of Clauses 1 to 4, wherein the attachment portion is symmetrical about an occlusogingival plane when the attachment portion is in the attached state and the securing member is secured to the tooth.

6. The orthodontic system of any one of Clauses 1 to 5, wherein:

the attachment portion includes an elongate leveraging surface at which the attachment portion is configured to contact the lever supported by the fulcrum when the attachment portion is in the attached state and the securing member is secured to the tooth;

the attachment portion is configured to move from the attached state toward the detached state in response to leverage exerted on the attachment portion via the leveraging surface from the lever supported by the fulcrum when the securing member is secured to the tooth; and a length of the leveraging surface is within ten degrees of perpendicular to an occlusogingival dimension when the attachment portion is in the attached state and the securing member is secured to the tooth.

7. The orthodontic system of any one of Clauses 1 to 6, wherein:

the attachment portion defines an elongate slot at which the attachment portion is configured to receive the lever supported by the fulcrum when the attachment portion is in the attached state and the securing member is secured to the tooth; and a length of the slot is within ten degrees of perpendicular to an occlusogingival dimension when the attachment portion is in the attached state and the securing member is secured to the tooth.

8 The orthodontic system of any one of Clauses 1 to 7, further comprising:

a biasing portion configured to store the orthodontic force; and a connector through which the biasing portion is connected to the attachment portion, wherein the attachment portion includes:

a force-transferring surface through which the attachment portion is configured to transfer the orthodontic force from the biasing portion to the tooth via the securing member when the attachment portion is in the attached state and the securing member is secured to the tooth, and a flexure configured to resiliently deform as the attachment portion moves from the detached state toward the attached state and the securing member is secured to the tooth.

9. The orthodontic system of any one of Clauses 1 to 8, wherein:

the securing member includes a first securing surface;

the attachment portion includes a second securing surface;

the flexure carries the second securing surface; and the first and second securing surfaces conformably restrict relative movement between the attachment portion and the securing member in an occlusogingival dimension when the attachment portion is in the attached state and the securing member is secured to the tooth.

10. The orthodontic system of Clause 9, wherein:

the first and second securing surfaces conformably restrict occlusal movement of the attachment portion relative to the securing member when the attachment portion is in the attached state and the securing member is secured to the tooth;

the securing member includes a third securing surface;

the attachment portion includes a fourth securing surface; and the third and fourth securing surfaces conformably restrict gingival movement of the attachment portion relative to the securing member when the attachment portion is in the attached state and the securing member is secured to the tooth.

11. The orthodontic system of Clause 9 or Clause 10, wherein:

the securing member defines a recess;

the first securing surface is at the recess;

the attachment portion includes a protuberance;

the second securing surface is at the protuberance; and the protuberance is seated in the recess when the attachment portion is in the attached state and the securing member is secured to the tooth.

12. The orthodontic system of any one of Clauses 9 to 11, wherein sliding contact between the first securing surface and the second securing surface causes the flexure to resiliently deform in a mesiodistal dimension while the attachment portion moves from the detached state toward the attached state and the securing member is secured to the tooth.

13. The orthodontic system of any one of Clauses 9 to 12, wherein sliding contact between the first securing surface and the second securing surface causes the flexure to resiliently deform in a buccolingual dimension while the attachment portion moves from the detached state toward the attached state and the securing member is secured to the tooth.

14. The orthodontic system of any one of Clauses 9 to 13, wherein:

the first securing surface is a distal first securing surface;

the second securing surface is a distal second securing surface;

the flexure is a distal flexure;

the distal first securing surface, the distal second securing surface, and the distal flexure are at a distal side of an occlusogingival plane when the attachment portion is in the attached state and the securing member is secured to the tooth;

the securing member includes a mesial first securing surface;

the attachment portion includes:

a mesial flexure configured to resiliently deform while the attachment portion moves from the detached state toward the attached state and the securing member is secured to the tooth, and a mesial second securing surface carried by the mesial flexure;

the mesial first securing surface, the mesial second securing surface, and the mesial flexure are at a mesial side of the occlusogingival plane when the attachment portion is in the attached state and the securing member is secured to the tooth; and the mesial first securing surface and the mesial second securing surface conformably restrict relative movement between the attachment portion and the securing member in an occlusogingival dimension when the attachment portion is in the attached state and the securing member is secured to the tooth.

15. The orthodontic system of Clause 14, wherein:

the distal flexure is configured to resiliently deform mesially while the attachment portion moves from the detached state toward the attached state and the securing member is secured to the tooth; and the mesial flexure configured to resiliently deform distally while the attachment portion moves from the detached state toward the attached state and the securing member is secured to the tooth.

16. The orthodontic system of Clause 14, wherein:

the distal flexure is configured to resiliently deform distally while the attachment portion moves from the detached state toward the attached state and the securing member is secured to the tooth; and the mesial flexure configured to resiliently deform mesially while the attachment portion moves from the detached state toward the attached state and the securing member is secured to the tooth.

17. The orthodontic system of any one of Clauses 14 to 16, wherein:

the distal flexure is configured to resiliently deform in a buccolingual dimension while the attachment portion moves from the detached state toward the attached state and the securing member is secured to the tooth; and the mesial flexure configured to resiliently deform in the buccolingual dimension while the attachment portion moves from the detached state toward the attached state and the securing member is secured to the tooth.

18. The orthodontic system of any one of Clauses 14 to 17, wherein:

the securing member defines:

a distal recess, and a mesial recess;

the distal first securing surface is at the distal recess;

the mesial first securing surface is at the mesial recess;

the attachment portion includes:

a distal protuberance, and a mesial protuberance;

the distal second securing surface is at the distal protuberance;

the mesial second securing surface is at the mesial protuberance;

the distal recess and the distal protuberance are at the distal side of the occlusogingival plane when the attachment portion is in the attached state and the securing member is secured to the tooth;

the mesial recess and the mesial protuberance are at the mesial side of the occlusogingival plane when the attachment portion is in the attached state and the securing member is secured to the tooth;

the distal protuberance is seated in the distal recess when the attachment portion is in the attached state and the securing member is secured to the tooth; and the mesial protuberance is seated in the mesial recess when the attachment portion is in the attached state and the securing member is secured to the tooth.

19. The orthodontic system of any one of Clauses 14 to 18, wherein:

the distal first securing surface and the distal second securing surface conformably restrict occlusal movement of the attachment portion relative to the securing member when the attachment portion is in the attached state and the securing member is secured to the tooth;

the mesial first securing surface and the mesial second securing surface conformably restrict occlusal movement of the attachment portion relative to the securing member when the attachment portion is in the attached state and the securing member is secured to the tooth;

the securing member includes:

a distal third securing surface, and a mesial third securing surface;

the attachment portion includes:

a distal fourth securing surface, and a mesial fourth securing surface;

the distal third securing surface and the distal fourth securing surface are at the distal side of the occlusogingival plane when the attachment portion is in the attached state and the securing member is secured to the tooth;

the mesial third securing surface and the mesial fourth securing surface are at the mesial side of the occlusogingival plane when the attachment portion is in the attached state and the securing member is secured to the tooth;

the distal third securing surface and the distal fourth securing surface conformably restrict gingival movement of the attachment portion relative to the securing member when the attachment portion is in the attached state and the securing member is secured to the tooth; and the mesial third securing surface and the mesial fourth securing surface conformably restrict gingival movement of the attachment portion relative to the securing member when the attachment portion is in the attached state and the securing member is secured to the tooth.

20. A method of operating an orthodontic system, the method comprising:

detaching an attachment portion of an orthodontic appliance of the orthodontic system from a securing member of the orthodontic system while the securing member is secured to a tooth of a patient, wherein detaching the attachment portion from the securing member includes:

moving a lever into contact with a leveraging surface of the attachment portion while the attachment portion is in an attached state, wherein the attachment portion in the attached state operably connects the orthodontic appliance to the securing member such that the orthodontic appliance exerts active and/or retentive orthodontic force on the tooth via the attachment portion and the securing member, and wherein the attachment portion has a detached state in which the orthodontic appliance is operably disconnected from the securing member; and moving the lever supported by a fulcrum of the securing member to exert leverage on the attachment portion via the leveraging surface and thereby move the attachment portion from the attached state toward the detached state.

21. The method of Clause 20, further comprising transferring the orthodontic force to the tooth while the attachment portion is in the attached state and before detaching the attachment portion from the securing member.

22. The method of Clause 20 or Clause 21, further comprising transferring the orthodontic force to the tooth via a connector of the orthodontic appliance at a gingival side of the attachment portion while the attachment portion is in the attached state and before detaching the attachment portion from the securing member.

23. The method of any one of Clauses 20 to 22, further comprising transferring the orthodontic force to the tooth via a connector of the orthodontic appliance at a mesial or distal side of the attachment portion while the attachment portion is in the attached state and before detaching the attachment portion from the securing member.

24 The method of any one of Clauses 20 to 23, wherein:

the leveraging surface is elongate; and moving the lever includes moving the lever while a length of the leveraging surface is within ten degrees of parallel to a buccolingual dimension.

25. The method of any one of Clauses 20 to 24, wherein:

moving the lever includes moving the lever while the lever is received in a slot defined by the attachment portion; and exerting leverage on the attachment portion includes exerting leverage on the attachment portion via the leveraging surface at an occlusal side of the slot.

26. The method of any one of Clauses 20 to 25, further comprising attaching the attachment portion to the securing member before detaching the attachment portion from the securing member and while the securing member is secured to the tooth, wherein:

detaching the attachment portion from the securing member includes moving the attachment portion occlusally relative to the securing member; and attaching the attachment portion to the securing member includes moving the attachment portion gingivally relative to the securing member.

27. The method of Clause 26, wherein attaching the attachment portion to the securing member includes snapping the attachment portion from the detached state to the attached state in response to moving the attachment portion occlusally relative to the securing member.

28. The method of any one of Clauses 20 to 27, wherein detaching the attachment portion from the securing member includes resiliently deforming a flexure of the attachment portion.

29. The method of Clause 28, wherein resiliently deforming the flexure includes resiliently deforming the flexure in a mesiodistal dimension.

30. The method of Clause 28 or Clause 29, wherein resiliently deforming the flexure includes resiliently deforming the flexure in a buccolingual dimension.

31. An orthodontic system, comprising:

a securing member configured to be secured to a tooth of a patient, wherein the securing member includes:

a distal first securing surface, and a mesial first securing surface; and an orthodontic appliance operably associated with the securing member, wherein the orthodontic appliance includes an attachment portion configured to be releasably secured to the securing member, wherein the attachment portion has:

an attached state in which the orthodontic appliance exerts active and/or retentive orthodontic force on the tooth via the attachment portion and the securing member when the securing member is secured to the tooth, and a detached state in which the orthodontic appliance is operably disconnected from the securing member, wherein the attachment portion includes:

a distal second securing surface, wherein the distal first securing surface and the distal second securing surface conformably restrict movement of the attachment portion relative to the securing member in an occlusogingival dimension when the attachment portion is in the attached state and the securing member is secured to the tooth, a mesial second securing surface, wherein the mesial first securing surface and the mesial second securing surface conformably restrict movement of the attachment portion relative to the securing member in the occlusogingival dimension when the attachment portion is in the attached state and the securing member is secured to the tooth, a distal flexure configured to resiliently deform in response to gingival movement of the attachment portion relative to the securing member while the attachment portion moves from the detached state toward the attached state and the securing member is secured to the tooth, wherein the distal flexure carries the distal second securing surface, and a mesial flexure configured to resiliently deform in response to gingival movement of the attachment portion relative to the securing member while the attachment portion moves from the detached state toward the attached state and the securing member is secured to the tooth, wherein the mesial flexure carries the mesial second securing surface, wherein the distal first securing surface, the distal second securing surface, and the distal flexure are at a distal side of an occlusogingival plane when the attachment portion is in the attached state and the securing member is secured to the tooth, and wherein the mesial first securing surface, the mesial second securing surface, and the mesial flexure are at a mesial side of the occlusogingival plane when the attachment portion is in the attached state and the securing member is secured to the tooth.

32. The orthodontic system of Clause 31, wherein the attachment portion is configured to snap from the detached state to the attached state in response to relative movement between the attachment portion and the securing member in an occlusogingival dimension when the securing member is secured to the tooth.

33. The orthodontic system of Clause 31 or Clause 32, wherein the orthodontic appliance further comprises:

a biasing portion configured to store the orthodontic force; and a connector through which the biasing portion is connected to the attachment portion, wherein the connector extends gingivally away from the attachment portion at the securing member when the attachment portion is in the attached state and the securing member is secured to the tooth.

34. The orthodontic system of any one of Clauses 31 to 33, wherein the orthodontic appliance further comprises:
a biasing portion configured to store the orthodontic force; and
a connector through which the biasing portion is connected to the attachment portion, wherein the connector extends mesially or distally away from the attachment portion at the securing member when the attachment portion is in the attached state and the securing member is secured to the tooth.
35. The orthodontic system of any one of Clauses 31 to 34, wherein the attachment portion symmetrical about an occlusogingival plane when the attachment portion is in the attached state and the securing member is secured to the tooth.
36. The orthodontic system of any one of Clauses 31 to 35, wherein:
sliding contact between the distal first securing surface and the distal second securing surface causes the distal flexure to resiliently deform mesially while the attachment portion moves from the detached state toward the attached state and the securing member is secured to the tooth; and
sliding contact between the mesial first securing surface and the mesial second securing surface causes the mesial flexure to resiliently deform distally while the attachment portion moves from the detached state toward the attached state and the securing member is secured to the tooth.
37. The orthodontic system of any one of Clauses 31 to 35, wherein:
sliding contact between the distal first securing surface and the distal second securing surface causes the distal flexure to resiliently deform distally while the attachment portion moves from the detached state toward the attached state and the securing member is secured to the tooth; and
sliding contact between the mesial first securing surface and the mesial second securing surface causes the mesial flexure to resiliently deform mesially while the attachment portion moves from the detached state toward the attached state and the securing member is secured to the tooth.
38. The orthodontic system of any one of Clauses 31 to 37, wherein:
sliding contact between the distal first securing surface and the distal second securing surface causes the distal flexure to resiliently deform in a buccolingual dimension while the attachment portion moves from the detached state toward the attached state and the securing member is secured to the tooth; and
sliding contact between the mesial first securing surface and the mesial second securing surface causes the mesial flexure to resiliently deform in a buccolingual dimension while the attachment portion moves from the detached state toward the attached state and the securing member is secured to the tooth.
39. The orthodontic system of any one of Clauses 31 to 38, wherein:
the distal flexure is configured to resiliently deform mesially while the attachment portion moves from the detached state toward the attached state and the securing member is secured to the tooth; and
the mesial flexure configured to resiliently deform distally while the attachment portion moves from the detached state toward the attached state and the securing member is secured to the tooth.
40. The orthodontic system of any one of Clauses 31 to 38, wherein:
the distal flexure is configured to resiliently deform distally while the attachment portion moves from the detached state toward the attached state and the securing member is secured to the tooth; and
the mesial flexure configured to resiliently deform mesially while the attachment portion moves from the detached state toward the attached state and the securing member is secured to the tooth.
41. The orthodontic system of any one of Clauses 31 to 40, wherein:
the distal flexure is configured to resiliently deform in a buccolingual dimension while the attachment portion moves from the detached state toward the attached state and the securing member is secured to the tooth; and
the mesial flexure configured to resiliently deform in a buccolingual dimension while the attachment portion moves from the detached state toward the attached state and the securing member is secured to the tooth.
42. The orthodontic system of any one of Clauses 31 to 41, wherein:
the securing member defines:
a distal recess, and
a mesial recess;
the distal first securing surface is at the distal recess;
the mesial first securing surface is at the mesial recess;
the attachment portion includes:
a distal protuberance, and
a mesial protuberance;
the distal second securing surface is at the distal protuberance;
the mesial second securing surface is at the mesial protuberance;
the distal recess and the distal protuberance are at the distal side of the occlusogingival plane when the attachment portion is in the attached state and the securing member is secured to the tooth;
the mesial recess and the mesial protuberance are at the mesial side of the occlusogingival plane when the attachment portion is in the attached state and the securing member is secured to the tooth;
the distal protuberance is seated in the distal recess when the attachment portion is in the attached state and the securing member is secured to the tooth; and
the mesial protuberance is seated in the mesial recess when the attachment portion is in the attached state and the securing member is secured to the tooth.
43. The orthodontic system of any one of Clauses 31 to 42, wherein:
the distal first securing surface and the distal second securing surface conformably restrict occlusal movement of the attachment portion relative to the securing member when the attachment portion is in the attached state and the securing member is secured to the tooth;
the mesial first securing surface and the mesial second securing surface conformably restrict occlusal movement of the attachment portion relative to the securing member when the attachment portion is in the attached state and the securing member is secured to the tooth;
the securing member includes:
a distal third securing surface, and
a mesial third securing surface;

the attachment portion includes:

a distal fourth securing surface, and a mesial fourth securing surface;

the distal third securing surface and the distal fourth securing surface are at the distal side of the occlusogingival plane when the attachment portion is in the attached state and the securing member is secured to the tooth;

the mesial third securing surface and the mesial fourth securing surface are at the mesial side of the occlusogingival plane when the attachment portion is in the attached state and the securing member is secured to the tooth;

the distal third securing surface and the distal fourth securing surface conformably restrict gingival movement of the attachment portion relative to the securing member when the attachment portion is in the attached state and the securing member is secured to the tooth; and the mesial third securing surface and the mesial fourth securing surface conformably restrict gingival movement of the attachment portion relative to the securing member when the attachment portion is in the attached state and the securing member is secured to the tooth.

44. The orthodontic system of any one of Clauses 31 to 43, wherein:

the attachment portion includes:

a distal grip carried by the distal flexure, wherein the distal grip is at the distal side of the occlusogingival plane when the attachment portion is in the attached state and the securing member is secured to the tooth, and a mesial grip carried by the mesial flexure, wherein the mesial grip is at the mesial side of the occlusogingival plane when the attachment portion is in the attached state and the securing member is secured to the tooth; and the attachment portion is configured such that moving the distal grip and the mesial grip toward one another moves the attachment portion from the attached state toward the detached state.

45. The orthodontic system of Clause 44, wherein the attachment portion is configured such that moving the distal grip and the mesial grip toward one another allows relative movement between the attachment portion and the securing member in a buccolingual dimension.

46. A method of operating an orthodontic system, the method comprising:

attaching an attachment portion of an orthodontic appliance of the orthodontic system to a securing member of the orthodontic system while the securing member is secured to a tooth of a patient, wherein attaching the attachment portion to the securing member includes moving the attachment portion gingivally relative to the securing member such that:

the attachment portion moves from a detached state in which the orthodontic appliance is operably disconnected from the securing member to an attached state in which the orthodontic appliance exerts active and/or retentive orthodontic force on the tooth via the attachment portion and the securing member when the securing member is secured to the tooth, a distal flexure of the attachment portion resiliently deforms in response to sliding contact between the attachment portion and the securing member while the attachment portion moves from the detached state toward the attached state, wherein the distal flexure is at a distal side of an occlusogingival plane when the attachment portion is in the attached state, and a mesial flexure of the attachment portion resiliently deforms in response to sliding contact between the attachment portion and the securing member while the attachment portion moves from the detached state toward the attached state, wherein the mesial flexure is at a mesial side of the occlusogingival plane when the attachment portion is in the attached state; and detaching the attachment portion from the securing member while the securing member is secured to the tooth, wherein detaching the attachment portion from the securing member includes moving the attachment portion occlusally relative to the securing member such that:

the attachment portion moves from the attached state toward the detached state, the distal flexure resiliently deforms in response to sliding contact between the attachment portion and the securing member while the attachment portion moves from the attached state toward the detached state, and the mesial flexure resiliently deforms in response to sliding contact between the attachment portion and the securing member while the attachment portion moves from the attached state toward the detached state.

47. The method of Clause 46, further comprising transferring the orthodontic force to the tooth while the attachment portion is in the attached state and before detaching the attachment portion from the securing member.

48. The method of Clause 46 or Clause 47, further comprising transferring the orthodontic force to the tooth via a connector of the orthodontic appliance at a gingival side of the attachment portion while the attachment portion is in the attached state and before detaching the attachment portion from the securing member.

49. The method of any one of Clauses 46 to 48, further comprising transferring the orthodontic force to the tooth via a connector of the orthodontic appliance at a mesial or distal side of the attachment portion while the attachment portion is in the attached state and before detaching the attachment portion from the securing member.

50. The method of any one of Clauses 46 to 49, wherein attaching the attachment portion to the securing member includes snapping the attachment portion from the detached state to the attached state in response to moving the attachment portion occlusally relative to the securing member.

51. A method of operating an orthodontic system, the method comprising:

attaching an attachment portion of an orthodontic appliance of the orthodontic system to a securing member of the orthodontic system while the securing member is secured to a tooth of a patient, wherein attaching the attachment portion to the securing member includes moving the attachment portion gingivally relative to the securing member such that:

the attachment portion moves from a detached state in which the orthodontic appliance is operably disconnected from the securing member to an attached state in which the orthodontic appliance exerts active and/or retentive orthodontic force on the tooth via the attachment portion and the securing member when the securing member is secured to the tooth, a distal flexure of the attachment portion resiliently deforms in response to sliding contact between the attachment portion and the securing member while the attachment portion moves from the detached state toward the attached state, wherein the distal flexure is at a distal side of an occlusogingival plane when the attachment portion is in the attached state, and a mesial flexure of the attachment portion resiliently deforms in response to sliding contact between the attachment portion and the securing member while the attachment portion moves from the detached state toward the attached state, wherein the mesial flexure is at a mesial side of the occlusogingival plane when the attachment portion is in the attached state; and detaching the attachment portion from the securing member while the securing member is secured to the tooth, wherein detaching the attachment portion from the securing member includes moving a distal grip of the attachment portion and a mesial grip of the attachment portion toward one another such that the attachment portion moves from the attached state toward the detached state, wherein the distal grip is at the distal side of the occlusogingival plane when the attachment portion is in the attached state, and wherein the mesial grip is at the mesial side of the occlusogingival plane when the attachment portion is in the attached state.

52. The method of Clause 51, further comprising transferring the orthodontic force to the tooth while the attachment portion is in the attached state and before detaching the attachment portion from the securing member.

53. The method of Clause 51 or Clause 52, further comprising transferring the orthodontic force to the tooth via a connector of the orthodontic appliance at a gingival side of the attachment portion while the attachment portion is in the attached state and before detaching the attachment portion from the securing member.

54. The method of any one of Clauses 51 to 53, further comprising transferring the orthodontic force to the tooth via a connector of the orthodontic appliance at a mesial or distal side of the attachment portion while the attachment portion is in the attached state and before detaching the attachment portion from the securing member.

55. The method of any one of Clauses 51 to 54, wherein attaching the attachment portion to the securing member includes snapping the attachment portion from the detached state to the attached state in response to moving the attachment portion occlusally relative to the securing member.

56. The method of any one of Clauses 51 to 55, wherein detaching the attachment portion from the securing member includes moving the attachment portion relative to the securing member in a buccolingual dimension after moving the distal grip and the mesial grip toward one another.

57. An orthodontic system, comprising:

a securing member comprising:

a backing having a first side a second side opposite the first side along a thickness of the backing and configured to be secured to a tooth of a patient, a first protrusion carried by the backing, wherein the first protrusion extends away from the first side along a buccolingual dimension when the securing member is secured to the tooth via the backing, a second protrusion carried by the backing, wherein the second protrusion extends away from the first side along the buccolingual dimension and is positioned opposite the first protrusion along an occlusogingival dimension when the securing member is secured to the tooth via the backing, and a third protrusion carried by the backing, wherein the third protrusion extends away from the first side along the buccolingual dimension and is positioned opposite the first protrusion along an occlusogingival dimension and opposite the second protrusion along a mesiodistal dimension when the securing member is secured to the tooth via the backing; and an orthodontic appliance operably associated with the securing member, wherein the orthodontic appliance includes an attachment portion configured to be releasably secured to the securing member, wherein the attachment portion has:

an attached state in which the attachment portion abuts the first protrusion, the second protrusion, and the third protrusion to exert active and/or retentive orthodontic force on the tooth via the attachment portion and the securing member when the securing member is secured to the tooth, and a detached state in which the orthodontic appliance is operably disconnected from the securing member, wherein the attachment portion is configured to move from the detached state toward the attached state in response to relative movement between the attachment portion and the securing member along the occlusogingival dimension when the securing member is secured to the tooth, and the attachment portion is configured to move from the attached state toward the detached state in response to rotation of the attachment portion away from the first protrusion about the buccolingual dimension.

58. The orthodontic system of Clause 57, wherein:

the attachment portion includes a leveraging surface at which the attachment portion is configured to contact a lever when the attachment portion is in the attached state;

the attachment portion is configured to move from the attached state to the detached state in response to leverage exerted on the leveraging surface of the attachment portion by the lever; and the attachment portion is configured such that a length of the leveraging surface is angled relative to the mesiodistal dimension by at least ten degrees when the attachment portion is in the attached state and the securing member is secured to the tooth.

59. The orthodontic system of Clause 58, wherein the attachment portion is configured to move from the attached state to the detached state in response to leverage exerted on the leveraging surface of the attachment portion by the lever via rotation of the lever about the buccolingual dimension.

60. The orthodontic system of Clause 59, wherein the attachment portion is configured to move from the attached state to the detached state in response to leverage exerted on the leveraging surface of the attachment portion by the lever via rotation of the lever about the buccolingual dimension such that an occlusal end of the lever rotates away from the first protrusion.

61. The orthodontic system of any one of Clauses 57 to 60, wherein the attachment portion is asymmetrical about the occlusogingival dimension when the attachment portion is in the attached state and the securing member is secured to the tooth.

62. An orthodontic system comprising:

a securing member comprising:

a backing having a first side a second side opposite the first side along a thickness of the backing and configured to be secured to a tooth of a patient, a first protrusion carried by the backing, wherein the first protrusion extends away from the first side along a buccolingual dimension when the securing member is secured to the tooth via the backing, wherein the first protrusion comprises a slanted securing surface having a gingival edge and an occlusal edge, a second protrusion carried by the backing, wherein the second protrusion extends away from the first side along the buccolingual dimension and is positioned opposite the first protrusion along an occlusogingival dimension when the securing member is secured to the tooth via the backing, and a third protrusion carried by the backing, wherein the third protrusion extends away from the first side along the buccolingual dimension and is positioned opposite the first protrusion along an occlusogingival dimension and opposite the second protrusion along a mesiodistal dimension when the securing member is secured to the tooth via the backing; and an orthodontic appliance operably associated with the securing member, wherein the orthodontic appliance includes an attachment portion configured to be releasably secured to the securing member, wherein the attachment portion has:

an attached state in which the attachment portion exerts active and/or retentive orthodontic force on the tooth via the attachment portion and the securing member when the securing member is secured to the tooth, a detached state in which the orthodontic appliance is operably disconnected from the securing member, a protuberance comprising first and second ramped surfaces that meet at a corner, wherein the first ramped surface is configured to engage the occlusal edge or the gingival edge of the slanted surface while the attachment portion transitions from the detached state to the attached state and the second ramped surface is configured to engage the slanted surface while the attachment portion is in the attached state to restrict movement of the attachment portion relative to the securing member; and a flexure configured to resiliently deform while the attachment portion moves between the detached state and the attached state.

63. The orthodontic system of Clause 62, wherein the second ramped surface is configured to engage the slanted securing surface in the attached state to restrict occlusal movement and/or mesial or distal movement of the attachment portion relative to the securing member.

64. The orthodontic system of Clause 62 or Clause 63, wherein the attachment portion comprises a leveraging surface at which the attachment portion is configured to contact a lever such that rotation of the lever displaces the leveraging surface and deforms the flexure to enable the attachment portion to transition from the attached state to the detached state.

65. The orthodontic system of any one of Clauses 62 to 64, wherein the first ramped surface is configured to engage the occlusal edge or the gingival edge of the slanted securing surface while the attachment portion transitions from the detached state to the attached state such that the flexure resiliently deforms.

66. The orthodontic system of any one of Clauses 62 to 65, wherein the first ramped surface is configured to engage the occlusal edge or the gingival edge of the slanted securing surface while the attachment portion transitions from the detached state to the attached state such that the attachment portion rotates about the buccolingual dimension.

67. The orthodontic system of any one of Clauses 62 to 66, wherein the flexure is positioned gingivally of the protuberance when the attachment portion is in the attached state and the securing member is secured to the tooth.

68. The orthodontic system of any one of Clauses 62 to 67, wherein the flexure is substantially curved.

69. The orthodontic system of any one of Clauses 62 to 68, wherein the slanted securing surface of the first protrusion is substantially perpendicular to a first plane in which the occlusogingival dimension and the mesiodistal dimension lie, is angled relative to a second plane in which the buccolingual dimension and the mesiodistal dimension lie, and is angled relative to a third plane in which the buccolingual dimension and the occlusogingival dimension lie when the securing member is secured to the tooth.

70. The orthodontic system of any one of Clauses 62 to 69, wherein the gingival edge of the slanted securing surface is located closer to a mesiodistal midline of the securing member than the occlusal edge of the slanted securing surface.

71. The orthodontic system of any one of Clauses 62 to 69, wherein the gingival edge of the slanted securing surface is located closer to a mesiodistal midline of the securing member than the occlusal edge of the slanted securing surface.

72. An orthodontic bracket configured to receive and releasably secure thereto an attachment portion of an orthodontic appliance, the bracket comprising:

a backing region comprising a first side and a second side opposite the first side and configured to be secured to a surface of a patient's tooth;

a first protrusion at an occlusal portion of the backing region, the protrusion having a first surface that is gingivally-facing and slanted such that the first surface has a more gingival end and a more occlusal end;

a second protrusion at a gingival portion of the backing region;

a third protrusion at a gingival portion of the backing region and spaced apart from the second protrusion by a gap, wherein, when attachment portion is secured to the bracket:

the first protrusion prevents or substantially inhibits occlusal movement of the attachment portion, the second and third protrusions prevent or substantially inhibit gingival movement of the attachment portion, one or both of the second and third protrusions include a portion configured to extend over a buccal or lingual surface of the attachment portion, thereby preventing or substantially inhibiting displacement of the attachment portion along a substantially buccolingual dimension, and the first protrusion and at least one or both of the second and third protrusions are configured to prevent or substantially inhibit displacement of the attachment portion along a mesiodistal dimension, and wherein the first surface of the first protrusion is configured to abut and engage a slanted surface of the attachment portion, and wherein, when the attachment portion is rotated in the direction of the more occlusal end of the first surface, the slanted surface slides along the first surface until the slanted surface clears the first protrusion, thereby releasing the attachment portion from the bracket.

73. The bracket of Clause 72, further comprising a backing region, wherein each of the first, second, and third protrusions are disposed on and extend away from the backing region.

74. The bracket of Clause 72 or Clause 73, wherein the first protrusion does not extend over a lingual or buccal surface of the attachment portion when the attachment portion is engaged by the bracket.

75. The bracket of any one of Clauses 72 to 74, wherein a portion of both of the second and third protrusions extend over a lingual or buccal surface of the attachment portion when the attachment portion is engaged by the bracket, thereby substantially inhibiting or preventing displacement of the attachment portion along a substantially buccolingual dimension.

76. The bracket of any one of Clauses 72 to 75, wherein the first, second, and third protrusions have a fixed spacing configured such that the first, second, and third protrusions actively and continuously resist outward forces applied on the first, second, and third protrusions by the attachment portion.

77. The bracket of any one of Clauses 72 to 76, wherein the gap between the first and second protrusions is configured to receive a portion of the orthodontic appliance therethrough.

78. An orthodontic appliance configured to move a patient's teeth from a first position to a second position, the appliance comprising:

an attachment portion configured to be releasably secured to an orthodontic bracket that is secured to a patient's tooth, the attachment portion being formed of a resiliently deformable material, wherein the attachment portion comprises:

a base portion, and an arm having a proximal end region and a free distal end region and a longitudinal dimension extending therebetween, wherein the proximal end region of the arm is disposed at the base portion, and wherein the arm is configured to bend and/or rotate relative to the base portion.

79. The appliance of Clause 78, wherein the arm is in the form of a crook, having a first portion extending away from the base portion in a generally occlusal direction, a second portion extending away from the first portion along a generally mesiodistal dimension, and a third portion extending away from the second portion in a generally gingival direction.

80. The appliance of Clause 78 or Clause 79, wherein the attachment portion is configured to constantly press outwardly on abutting portions of the bracket when the attachment portion is secured to the bracket.

81. The appliance of any one of Clauses 78 to 80, wherein the attachment portion is in a compressed state when secured to the bracket.

82. The appliance of any one of Clauses 78 to 81, wherein the attachment portion is in a deformed state when secured to the bracket.

83. The appliance of any one of Clauses 78 to 82, wherein the arm is configured to deform and/or rotate in response to a rotational force applied to the distal end region of the arm.

84. The appliance of any one of Clauses 78 to 83, wherein the arm is configured to deform and/or rotate in response to a rotational force applied to the distal end region of the arm.

85. The appliance of any one of Clauses 78 to 84, wherein the arm is cantilevered from the base portion.

86. The appliance of any one of Clauses 78 to 85, wherein the arm comprises two or more bends along its longitudinal dimension.

87. The appliance of any one of Clauses 78 to 86, wherein the arm and base portion together define an open interior region configured to receive a distal portion of an orthodontic tool therein such that rotation of the orthodontic tool while the distal portion is positioned in the interior region and while the attachment portion is secured to the bracket causes the attachment portion to deform and release from the bracket.

88. An orthodontic system, comprising:

a bracket configured to be secured to a patient's tooth; and an orthodontic appliance configured to move at least one of a patient's teeth from a first position to a second position, the appliance comprising a resiliently deformable attachment portion configured to be releasably secured to the bracket, wherein the attachment portion comprises a base portion and an arm having a proximal end region at the base portion and extending away from the base portion to a free distal end region, and wherein the arm is configured to bend and/or rotate relative to the base portion, wherein the bracket comprises a first side and a second side opposite the first side and configured to be secured to a surface of a patient's tooth, the bracket comprising a plurality of protrusions at the first side, wherein, when the attachment portion is secured to the bracket, the base portion and the arm press outwardly against the protrusions, thereby securing the attachment portion to the bracket.

89. The system of Clause 88, wherein one of protrusions has a slanted surface that abuts and engages a slanted surface of the arm, and wherein deformation of the arm in the direction of the more occlusal ends of the slanted surfaces causes the slanted surface of the arm to slide along the slanted surface of the protrusion until the slanted surface of the arm clears the corresponding protrusion, thereby releasing the attachment portion from the bracket.

90. The system of Clause 88 or Clause 89, wherein deformation of the arm is required to releasably secure the arm to the bracket.

91. The system of any one of Clauses 88 to 90, wherein at least one of the protrusions does not extend over a lingual and/or buccal surface of the attachment portion when the attachment portion is secured to the bracket.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

I. Definitions

Figure 1A:
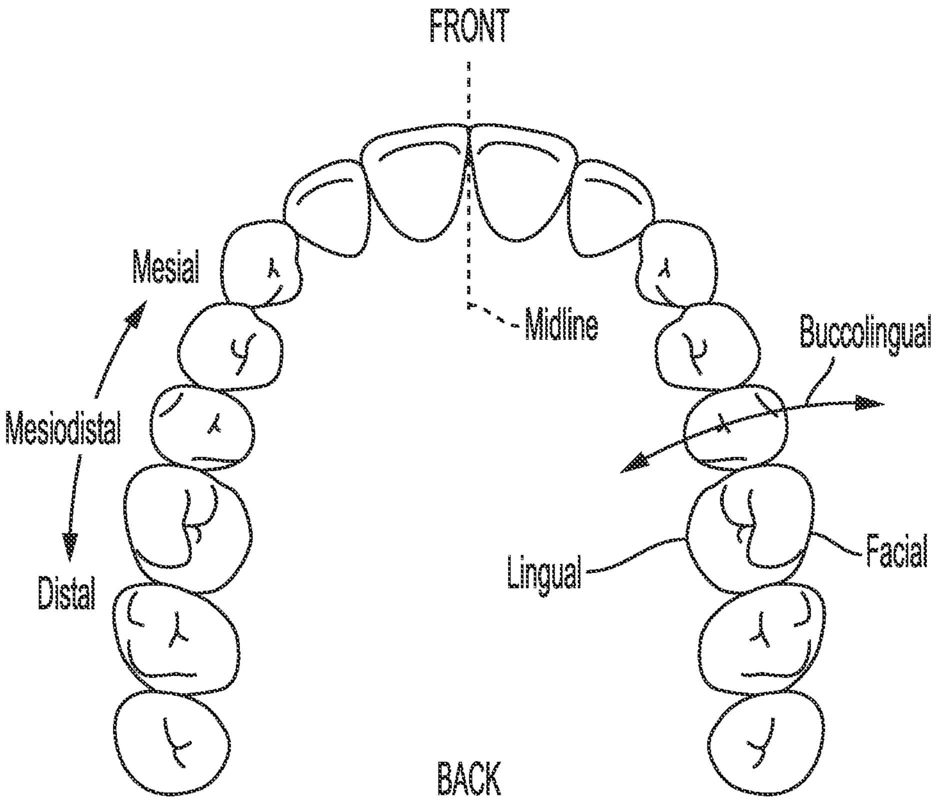
FIGS. 1A and 1B schematically illustrate directional references relative to a patient's dentition.
Figure 1B:
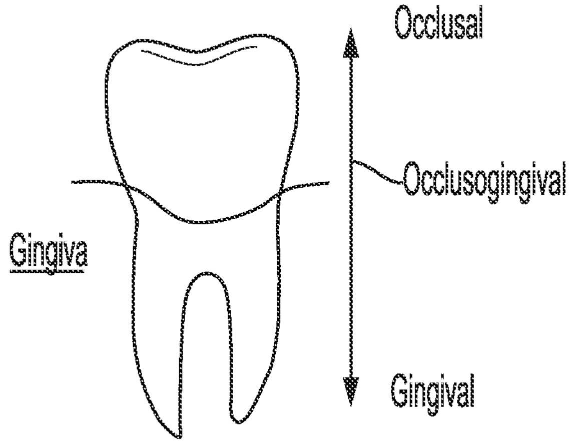

FIGS. 1A and 1B schematically depict several directional terms related to a patient's dentition. Terms used herein to provide anatomical direction or orientation are intended to encompass different orientations of the appliance as installed in the patient's mouth, regardless of whether the structure being described is shown installed in a mouth in the drawings. As illustrated in FIGS. 1A and 1B: "mesial" means in a direction toward the midline of the patient's face along the patient's curved dental arch; "distal" means in a direction away from the midline of the patient's face along the patient's curved dental arch; "occlusal" means in a direction toward the chewing surfaces of the patient's teeth; "gingival" means in a direction toward the patient's gums or gingiva; "facial" means in a direction toward the patient's lips or cheeks (used interchangeably herein with "buccal" and "labial"); and "lingual" means in a direction toward the patient's tongue.

As used herein, the terms "proximal" and "far" refer to a position that is closer and farther, respectively, from a given reference point. In many cases, the reference point is a certain connector, such as an anchor, and "proximal" and "far" refer to a position that is closer and farther, respectively, from the reference connector along a line passing through the centroid of the cross-section of the portion of the appliance branching from the reference connector.

As used herein, the terms "generally," "substantially," "about," and similar terms are used as terms of approximation and not as terms of degree, and are intended to account for the inherent variations in measured or calculated values that would be recognized by those of ordinary skill in the art.

As used herein, the term "operator" refers to a clinician, practitioner, technician or any person or machine that designs and/or manufactures an orthodontic appliance or portion thereof, and/or facilitates the design and/or manufacture of the appliance or portion thereof, and/or any person or machine associated with installing the appliance in the patient's mouth and/or any subsequent treatment of the patient associated with the appliance.

As used herein, the term "force" refers to the magnitude and/or direction of a force, a torque, or a combination thereof.

II. Overview of Orthodontic Appliances of the Present Technology

Figure 2A:
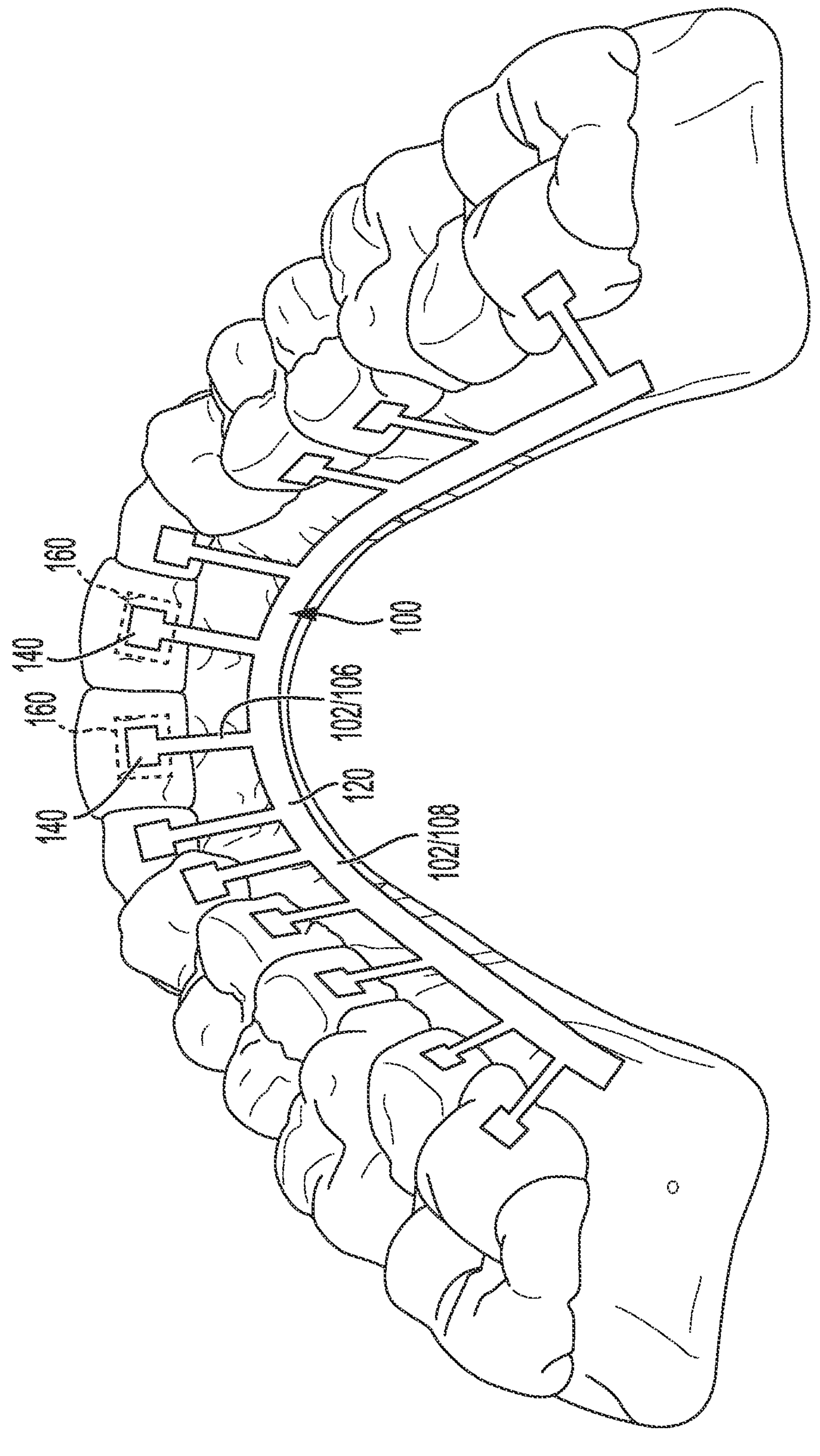
FIG. 2A shows the schematic representation of an orthodontic appliance configured in accordance with the present technology installed in a patient's mouth adjacent the patient's dentition.
Figure 2B:
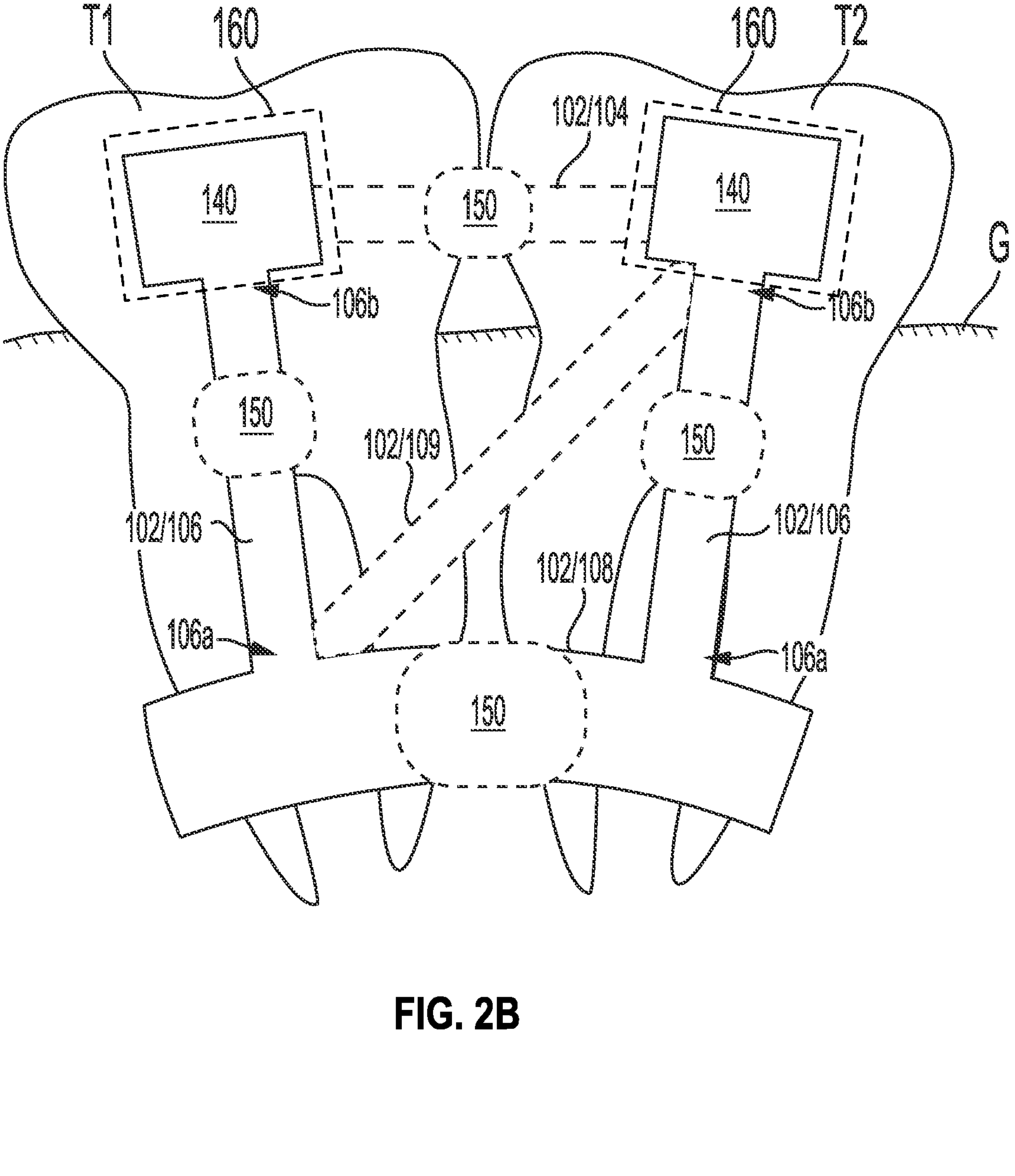
FIG. 2B is a schematic depiction of connection configuration options configured in accordance with embodiments of the present technology.

FIG. 2A is a schematic representation of an orthodontic appliance 100 (or "appliance 100") configured in accordance with embodiments of the present technology, shown positioned in a patient's mouth adjacent the patient's teeth. FIG. 2B is an enlarged view of a portion of the appliance 100. The appliance 100 is configured to be installed within a patient's mouth to impart forces on one or more of the teeth to reposition all or some of the teeth. In some cases, the appliance 100 may additionally or alternatively be configured to maintain a position of one or more teeth. As shown schematically in FIGS. 2A and 2B, the appliance 100 can comprise a deformable member that includes one or more attachment portions 140 (each represented schematically by a box), each configured to be secured to a tooth surface directly or indirectly via a securing member 160. The appliance 100 may further comprise one or more connectors 102 (also depicted schematically), each extending directly between attachment portions 140 ("first connectors 104"), between an attachment portion 140 and one or more other connectors 102 ("second connectors 106"), or between two or more other connectors 102 ("third connectors 108"). Only two attachment portions 140 and two connectors 102 are labeled in FIG. 2A for ease of illustration. As discussed herein, the number, configuration, and location of the connectors 102 and attachment portions 140 may be selected to provide a desired force on one or more of the teeth when the appliance 100 is installed.

The attachment portions 140 may be configured to be detachably coupled to a securing member 160 that is bonded, adhered, or otherwise secured to a surface of one of the teeth to be moved. In some embodiments, one or more of the attachment portions 140 may be directly bonded, adhered, or otherwise secured to a corresponding tooth without a securing member or other connection interface at the tooth. The attachment portions 140 may also be referred to as "bracket connectors" or "male connector elements" herein. The different attachment portions 140 of a given appliance 100 may have the same or different shape, same or different size, and/or same or different configuration. The attachment portions 140 may comprise any one or combination of the attachment portions disclosed herein (including but not limited to attachment portion 400), any one of the bracket connectors and/or male connector elements disclosed herein, as well as any of the attachment portions, bracket connectors, and/or male connector elements disclosed in U.S. patent application Ser. No. 15/370,704 (Publ. No. 2017/0156823) filed Dec. 6, 2016, U.S. patent application Ser. No. 15/929,443 (Publ. No. 20201/0007830), and/or U.S. patent application Ser. No. 15/929,443 (Publ. No. 2020/0390524) each of which is incorporated by reference herein in its entirety.

The appliance 100 may include any number of attachment portions 140 suitable for securely attaching the appliance 100 to the patient's tooth or teeth in order to achieve a desired movement. In some examples, multiple attachment portions 140 may be attached to a single tooth. The appliance 100 may include an attachment portion for every tooth, fewer attachment portions than teeth, or more attachment portions 140 than teeth. In these and other embodiments, the one or more of the attachment portions 140 may be configured to be coupled to one, two, three, four, five or more connectors 102. Moreover, any of the first and second connectors 104, 106 can extend from any portion of a corresponding attachment portion 140. For example, one or both ends of a given first and/or second connector 104, 106 can be disposed at an occlusal, gingival, mesial, or distal side of a corresponding attachment portion 140. In some embodiments, a location at which a connector connects to an attachment portion is based at least in part on an amount of space in the patient's mouth, an intended force to be applied to a tooth, etc. For example, in some cases it may be challenging to connect a second connector 106 to a gingival portion of an attachment portion 140 that is configured to impart an intended torque on a tooth to which the attachment portion 140 is configured to be secured. Accordingly, it may be preferable for the second connector 106 to connect to a mesial portion or a distal portion of the attachment portion 140 in these embodiments and others. In some cases, it may be challenging to connect a first and/or second connector 104, 106 to a mesial or distal portion of an attachment portion 140 due to the space within a patient's mouth. For example, if connecting the connector to a mesial or distal portion of an attachment portion 140 would cause the connector to collide with an adjacent tooth during installation or treatment, it may be preferable to connect the connector to a gingival or an occlusal portion of the attachment portion 140 to prevent such collision.

As previously mentioned, the connectors 102 may comprise one or more first connectors 104 that extend directly between attachment portions 140. The one or more first connectors 104 may extend along a generally mesiodistal dimension when the appliance 100 is installed in the patient's mouth. In these and other embodiments, the appliance 100 may include one or more first connectors 104 that extend along a generally occlusogingival and/or buccolingual dimension when the appliance 100 is installed in the patient's mouth. According to several embodiments, a single first connector 104 can have one or more bends such that it extends at least two of mesiodistally, occlusogingivally, or buccolingually. FIG. 2D, for example, shows a first connector 104*a* that extends gingivally from a gingival side of a first attachment portion 140*a* then bends and extends occlusally until terminating at a gingival side of a second attachment portion 140*b*. First connector 104*b* extends distally (assuming a midline M) from a distal side of the second attachment portion 140*b*, then bends and extends gingivally, then bends and extends occlusally, then bends and extends distally until terminating at a mesial side of a third attachment portion 140*c*. First connector 104*c* extends distally from a distal side of the third attachment portion 140*c* to a mesial side of a fourth attachment portion 140*d*. It will be appreciated that many other first connector geometries are possible and that showing every possible first connector shape would not be feasible. In some embodiments, the appliance 100 does not include any first connectors 104.

In several embodiments, all of the attachment portions 140 of the appliance 100 are coupled to one another only by first connectors 104 (and no second or third connectors 106, 108) (also referred to as a "Z appliance" herein). FIG. 2D, for example, shows a portion of such a Z appliance 100. In these embodiments, some or all of the first connectors 104 can have the same geometry. In some of the Z appliances 100, some or all of the first connectors 104 can have a different geometry. For the sake of explanation, the portion of the appliance 100 shown in FIG. 2D includes a different first connector geometry between each pair of adjacent teeth T. While not labeled in FIG. 2D, one, some, or all of the first connectors 104 in a Z appliance 100 can have one or more biasing portions (described in greater detail below). One, some, or all of the first connectors 104 in a Z appliance 100 can be rigid. It may be advantageous for an appliance 100 to comprise only first connectors 104 if a patient has tori that would obstruct more gingivally positioned second or third connectors 106, 108, if space in a patient's mouth is limited, etc.

Additionally or alternatively, the connectors 102 may comprise one or more second connectors 106 that extend between one or more attachment portions 140 and one or more connectors 102. The one or more second connectors 106 can extend along a generally occlusogingival dimension when the appliance 100 is installed in the patient's mouth. In these and other embodiments, the appliance 100 may include one or more second connectors 106 that extend along a generally mesiodistal and/or buccolingual dimension when the appliance 100 is installed in the patient's mouth. In some embodiments, the appliance 100 does not include any second connectors 106. In such embodiments, the appliance 100 would only include first connectors 104 extending between attachment portions 140. The use of two or more connectors to connect two points on the appliance 100 enables application of a greater force (relative to a single connector connecting the same points) without increasing the strain on the individual connectors. Such a configuration is especially beneficial given the spatial constraints of the fixed displacement treatments herein.

Additionally or alternatively, the connectors 102 may comprise one or more third connectors 108 that extend between two or more other connectors 102. The one or more third connectors 108 may extend along a generally mesiodistal dimension when the appliance 100 is installed in the patient's mouth. In these and other embodiments, the appliance 100 may include one or more third connectors 108 that extend along a generally occlusogingival and/or buccolingual dimension when the appliance 100 is installed in the patient's mouth. In some embodiments, the appliance 100 does not include any third connectors 108. One, some, or all of the third connectors 108 may be positioned gingival to one, some, or all of the first connectors 104. In some embodiments, the appliance 100 includes a single third connector 108 that extends along at least two adjacent teeth and provides a common attachment for two or more second connectors 106. In several embodiments, the appliance 100 includes multiple non-contiguous third connectors 108, each extending along at least two adjacent teeth.

In several embodiments, all of the attachment portions 140 of the appliance 100 are coupled to one another only by second and third connectors 106, 108 (and no first connectors 104) (also referred to as an "X appliance" herein). FIG. 2A, for example, shows such an X appliance 100. In these embodiments, and others, some or all of the second connectors 106 can have the same geometry. In some of the X appliances 100, some or all of the second connectors 106 can have a different geometry. While not labeled in FIG. 2A, one, some, or all of the second connectors 106 in an X appliance 100 can have one or more biasing portions. One, some, or all of the second connectors 106 in an X appliance 100 can be rigid.

In several embodiments, the appliance 100 comprises two or more attachment portions 140 that are coupled to one another by first connectors 104 and two or more attachment portions 140 coupled to one another by second and third connectors 106, 108. In some embodiments, the appliance 100 comprises two or more attachment portions 140 that are coupled to one another by first connectors 104 (and no second or third connectors 106, 108) and two or more attachment portions 140 coupled to one another by second and third connectors 106, 108 (and no first connectors 104). The foregoing hybrid appliances are referred to herein as "XZ appliances." FIG. 2E, for example, shows a portion of such an XZ appliance 100. In these embodiments, and others, some or all of the first connectors 104 can have the same geometry. In some of the XZ appliances 100, some or all of the first connectors 104 can have a different geometry. While not labeled in FIG. 2E, one, some, or all of the first connectors 104 in an XZ appliance 100 can have one or more biasing portions. One, some, or all of the first connectors 104 in an XZ appliance 100 can be rigid. In an XZ appliance 100, some or all of the second connectors 106 can have the same geometry. In some of the XZ appliances 100, some or all of the second connectors 106 can have a different geometry. While not labeled in FIG. 2E, one, some, or all of the second connectors 106 in an XZ appliance 100 can have one or more biasing portions. One, some, or all of the second connectors 106 in an XZ appliance 100 can be rigid. Although FIG. 2E depicts the third connector 108 mesiodistally adjacent to the first connectors 104, in some XZ appliances 100 one or more first connectors 104 can be mesiodistally aligned with one or more third connectors 108.

As shown in FIG. 2A, in some embodiments the appliance 100 may be configured such that all or a portion of one, some, or all of the connectors 102 are disposed proximate the patient's gingiva when the appliance 100 is installed within the patient's mouth. For example, one or more third connectors 108 may be configured such that all or a portion of the one or more third connectors 108 is positioned below the patient's gum line and adjacent to but spaced apart from the gingiva. In many cases it may be beneficial to provide a small gap (e.g., 0.5 mm or less) between the third connector(s) 108 and the patient's gingiva, as contact between the third connector(s) 108 (or any portion of the appliance 100) and the gingiva can cause irritation and patient discomfort. In some embodiments, all or a portion of the third connector(s) 108 is configured to be in direct contact with the gingiva when the appliance 100 is disposed in the patient's mouth. Additionally or alternatively, all or a portion of one or more first connectors 104 and/or second connectors 106 may be configured to be disposed proximate the gingiva.

According to some embodiments, one or more connectors 102 may extend between an attachment portion 140 or connector 102 and a joint comprising (a) two or more connectors 102, (b) two or more attachment portions 140, or (c) at least one attachment portion 140 and at least one connector 102. According to some embodiments, one or more connectors 102 may extend between a first joint comprising (a) two or more connectors 102, (b) two or more attachment portions 140, or (c) at least one attachment member and at least one connector 102, and a second joint comprising (a) two or more connectors 102, (b) two or more attachment portions 140, or (c) at least one attachment portion 140 and at least one connector 102. An example of a connector 102 extending between (a) a joint between a second and third connector 106, 108, and (b) a joint between a second connector 106 and an attachment portion 140 is depicted schematically and labeled 109 in FIG. 2B.

Each of the connectors 102 may be designed to have a desired stiffness so that an individual connector 102 or combination of connectors 102 imparts a desired force on one or more of the teeth. In many cases, the force applied by a given connector 102 may be governed by Hooke's Law, or $F=k\times x$, where F is the restoring force exerted by the connector 102, k is the stiffness coefficient of the connector 102, and x is the displacement. In the most basic example, if a connector 102 does not exist between two points on the appliance 100, then the stiffness coefficient along that path is zero and no forces are applied. In the present case, the individual connectors 102 of the present technology may have varying non-zero stiffness coefficients. For example, one or more of the connectors 102 may be rigid (i.e., the stiffness coefficient is infinite) such that the connector 102 will not flex or bend between its two end points. In some embodiments, one or more of the connectors 102 may be "flexible" (i.e., the stiffness coefficient is non-zero and positive) such that the connector 102 can deform to impart (or absorb) a force on the associated tooth or teeth or other connector 102.

In some embodiments it may be beneficial to include one or more rigid connectors between two or more teeth. A rigid connector 102 is sometimes referred to herein as a "rigid bar" or an "anchor." Each rigid connector 102 may have sufficient rigidity to hold and maintain its shape and resist bending. The rigidity of the connector 102 can be achieved by selecting a particular shape, width, length, thickness, and/or material. Connectors 102 configured to be relatively rigid may be employed, for example, when the tooth to be connected to the connector 102 is not to be moved (or moved by a limited amount) and can be used for anchorage. Molar teeth, for example, can provide good anchorage as molar teeth have larger roots than most teeth and thus require greater forces to be moved. Moreover, anchoring one or more portions of the appliance 100 to multiple teeth is more secure than anchoring to a single tooth. As another example, a rigid connection may be desired when moving a group of teeth relative to one or more other teeth. Consider, for instance, a case in which the patient has five teeth separated from a single tooth by a gap, and the treatment plan is to close the gap. The best course of treatment is typically to move the one tooth towards the five teeth, and not vice versa. In this case, it may be beneficial to provide one or more rigid connectors between the five teeth. For all of the foregoing reasons and many others, the appliance 100 may include one or more rigid first connectors 104, one or more rigid second connectors 106, and/or one or more rigid third connectors 108.

In these and other embodiments, the appliance 100 may include one or more flexible first connectors 104, one or more flexible second connectors 106, and/or one or more flexible third connectors 108. Each flexible connector 102 may have a particular shape, width, thickness, length, material, and/or other parameters to provide a desired degree of flexibility. According to some embodiments of the present technology, the stiffness of a given connector 102 may be tuned via incorporation of a one or more resiliently flexible biasing portions 150. As shown schematically in FIG. 2B, one, some, or all of the connectors 102 may include one or more biasing portion 150, such as springs, each configured to apply a customized force, torque or combination of force and torque specific to the tooth to which it is attached.

Figure 2C:
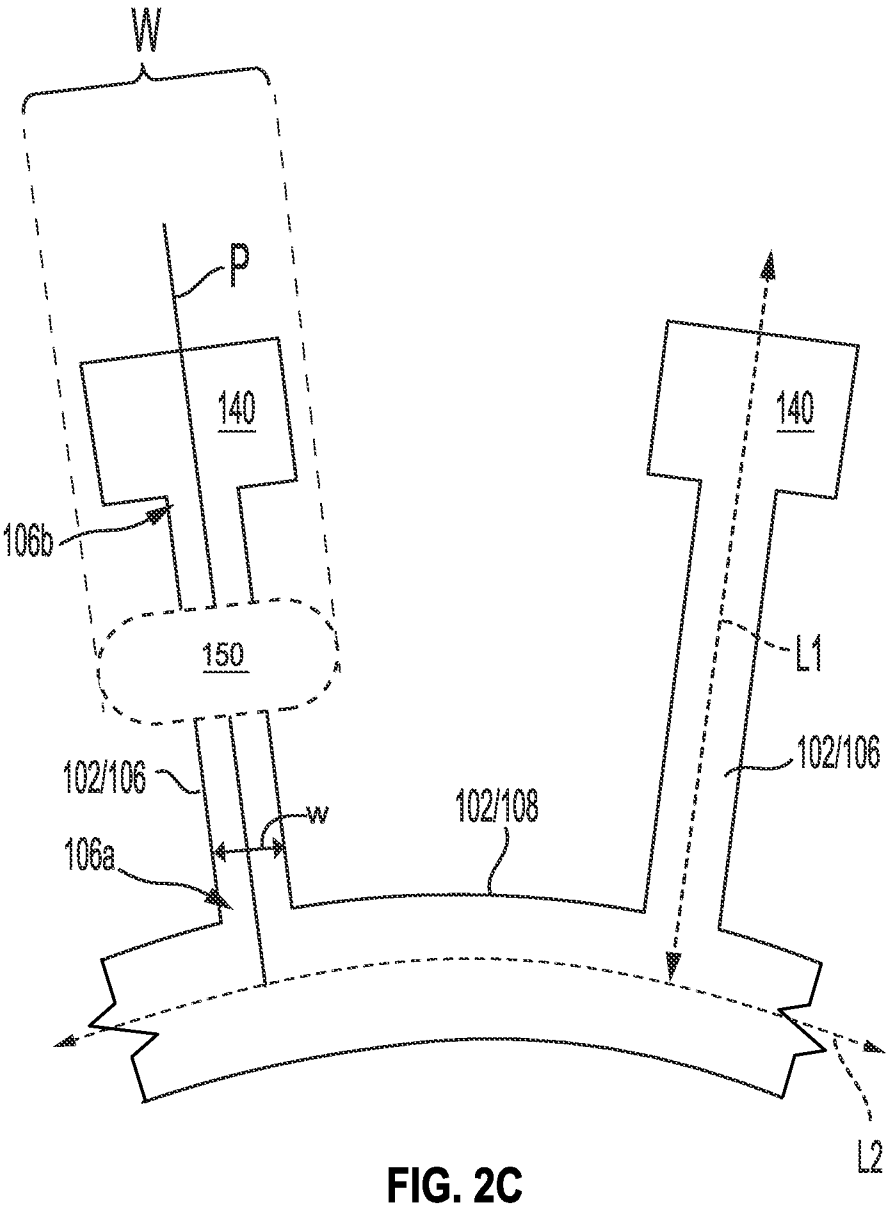
FIG. 2C is a schematic depiction of a portion of an appliance configured in accordance with embodiments of the present technology.
Figure 2D:
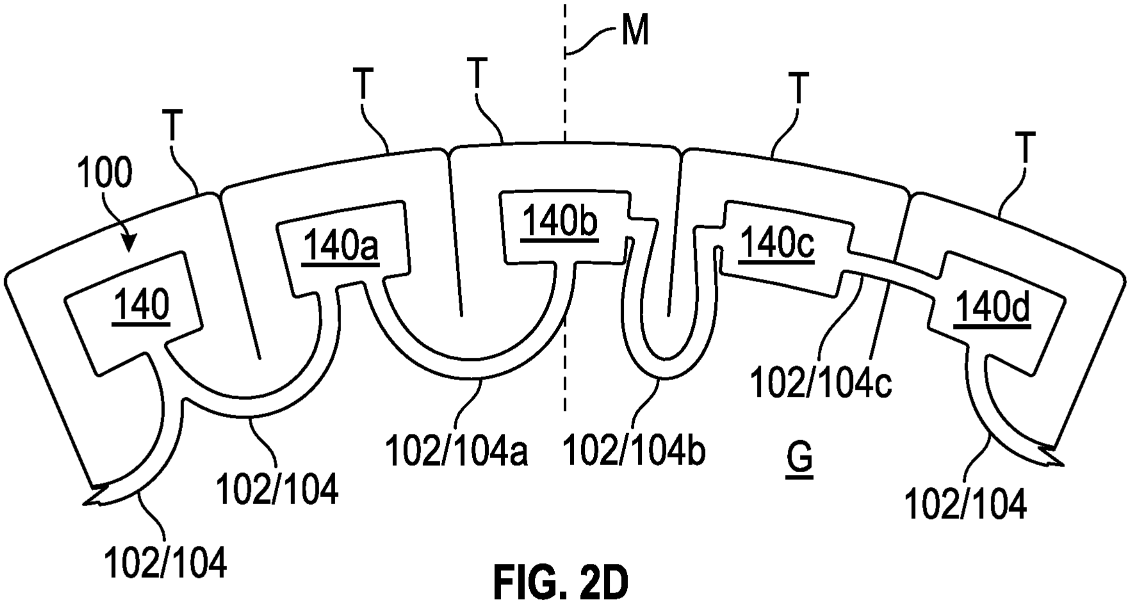
FIG. 2D is a schematic depiction of a portion of an appliance configured in accordance with embodiments of the present technology.
Figure 2E:
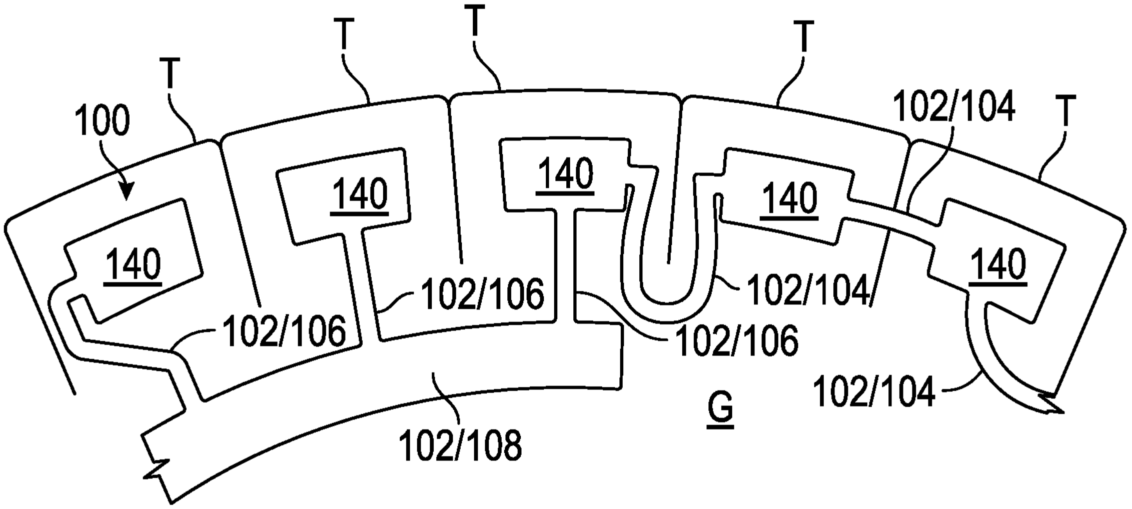
FIG. 2E is a schematic depiction of a portion of an appliance configured in accordance with embodiments of the present technology.

As depicted in the schematic shown in FIG. 2C, the biasing portion(s) 150 may extend along all or a portion of the longitudinal axis L1 of the respective connector 102 (only the longitudinal axis L1 for second connector 106 and the longitudinal axis L2 for third connector 108 is labeled in FIG. 2C). The direction and magnitude of the force and torque applied on a tooth by a biasing portion 150 depends, at least in part, on the shape, width, thickness, length, material, shape set conditions (e.g., austenite transformation finish temperature, etc.), and other parameters of the biasing portion 150. As such, one or more aspects of the biasing portion 150 (including the aforementioned parameters) may be varied so that the connector 102 and/or biasing portion 150 produces a desired tooth movement when the appliance 100 is installed in the patient's mouth. Each connector 102 and/or biasing portion 150 may be designed to move one or more teeth in one, two, or all three translational directions (i.e., mesiodistal, buccolingual, and occlusogingival) and/or in one, two, or all three rotational directions (i.e., buccolingual root torque, mesiodistal angulation and mesial out-in rotation).

The biasing portions 150 of the present technology can have any length, width, shape, and/or size sufficient to move the respective tooth towards a desired position. In some embodiments, one, some, or all of the connectors 102 may have one or more inflection points along a respective biasing portion 150. The connectors 102 and/or biasing portions 150 may have a serpentine configuration such that the connector 102 and/or biasing portion 150 doubles back on itself at least one or more times before extending towards the attachment portion 140. For example, in some embodiments the second connectors 106 double back on themselves two times along the biasing portion 150, thereby forming first and second concave regions facing in generally different directions relative to one another. The open loops or overlapping portions of the connector 102 corresponding to the biasing portion 150 may be disposed on either side of a plane P (FIG. 2C) bisecting an overall width W (FIG. 2C) of the connector 102 such that the extra length of the connector 102 is accommodated by the space medial and/or distal to the connector 102. This allows the connector 102 to have a longer length (as compared to a linear arm) to accommodate greater tooth movement, despite the limited space in the occlusal-gingival or vertical dimension between any associated third connector 108 and the location at which the connector 102 attaches to the tooth.

It will be appreciated that the biasing portion 150 may have other shapes or configurations. For example, in some embodiments the connector 102 and/or biasing portion 150 may include one or more linear regions that zig-zag towards the attachment portion 140. One, some, or all of the connectors 102 and/or biasing portions 150 may have only linear segments or regions, or may have a combination of curved and linear regions. In some embodiments, one, some, or all of the connectors 102 and/or biasing portions 150 do not include any curved portions.

According to some examples, a single connector 102 may have multiple biasing portions 150 in series along the longitudinal axis of the respective connector 102. In some embodiments, multiple connectors 102 may extend between two points along the same or different paths. In such embodiments, the different connectors 102 may have the same stiffness or different stiffnesses.

In those embodiments where the appliance 100 has two or more connectors 102 with biasing portions 150, some, none, or all of the connectors 102 may have the same or different lengths, the same or different widths, the same or different thicknesses, the same or different shapes, and/or may be made of the same or different materials, amongst other properties. In some embodiments, less than all of the connectors 102 have biasing portions 150. Connectors 102 without biasing portions 150 may, for example, comprise one or more rigid connections between a rigid third connector 108 and the attachment portion 140. In some embodiments, none of the connectors 102 of the appliance 100 have a biasing portion 150.

According to some embodiments, for example as depicted schematically in FIG. 2A, the appliance 100 may include a continuous, substantially rigid third connector (referred to as "anchor 120") and a plurality of flexible second connectors 106 extending away from the anchor 120. When the appliance 100 is installed in the patient's mouth, each of the second connectors 106 may connect to a different one of the teeth to be moved and exerts a specific force on its respective tooth, thereby allowing an operator to move each tooth independently. Such a configuration provides a notable improvement over traditional braces in which all of the teeth are connected by a single archwire, such that movement of one tooth can cause unintentional movement of one or more nearby teeth. As discussed in greater detail herein, the independent and customized tooth movement enabled by the appliances of the present technology allows the operator to move the teeth from an original tooth arrangement ("OTA") to a final tooth arrangement ("FTA") more efficiently, thereby obviating periodic adjustments, reducing the number of office visits, and reducing or eliminating patient discomfort, and reducing the overall treatment time (i.e., the length of time the appliance is installed in the patient's mouth) by at least 50% relative to the overall treatment time for traditional braces.

The anchor 120 may comprise any structure of any shape and size configured to comfortably fit within the patient's mouth and provide a common support for one or more of the second connectors 106. In many embodiments, the anchor 120 is disposed proximate the patient's gingiva when the appliance 100 is installed within the patient's mouth, for example as shown in FIG. 2A. For instance, the appliance may be designed such that, when installed in the patient's mouth, all or a portion of the anchor 120 is positioned below the patient's gum line and adjacent but spaced apart from the gingiva. In many cases it may be beneficial to provide a small gap (e.g., 0.5 mm or less) between the anchor 120 (or any portion of the appliance 100) and the patient's gingiva as contact between the anchor 120 and the gingiva can cause irritation and patient discomfort. In some embodiments, all or a portion of the anchor 120 is configured to be in contact with the gingiva when the appliance 100 is disposed in the patient's mouth.

The anchor 120 may be significantly more rigid than the second connectors 106 such that the equal and opposite forces experienced by each of the second connectors 106 when exerting a force on its respective tooth are countered by the rigidity of the anchor 120 and the forces applied by the other second connectors 106, and do not meaningfully affect the forces on other teeth. As such, the anchor 120 effectively isolates the forces experienced by each second connectors 106 from the rest of the second connectors 106, thereby enabling independent tooth movement. Because the anchor 120 is more rigid than the second connectors 106, any reaction forces applied to the anchor 120 by a connector 106 can be approximately evenly distributed among other teeth connected to the anchor 120 via second connectors 106 such that the reaction force applied to each of the other teeth is below a threshold required to cause movement of the other tooth. In this manner, movement of one tooth caused by a second connector 106 applying force to the tooth may not cause movement of the patient's other teeth.

According to some embodiments, for example as shown schematically in FIGS. 2A and 2B, the anchor 120 comprises an elongated member having a longitudinal axis L2 (see FIG. 2C) and forming an arched shape configured to extend along a patient's jaw when the appliance 100 is installed. In these and other embodiments, the anchor 120 may be shaped and sized to span two or more of the patient's teeth when positioned in the patient's mouth. In some examples, the anchor 120 includes a rigid, linear bar, or may comprise a structure having both linear and curved segments. In these and other embodiments, the anchor 120 may extend laterally across all or a portion of the patient's mouth (e.g., across all or a portion of the palate, across all or a portion of the lower jaw, etc.) and/or in a generally anterior-posterior direction. Moreover, the appliance 100 may comprise a single anchor or multiple anchors. For example, the appliance 100 may comprise multiple, discrete, spaced apart anchors, each having one or more second connectors 106 extending therefrom. In these and other embodiments, the appliance 100 may include one or more other connectors extending between adjacent second connectors 106. In various embodiments, the anchor 120 (or any of the connectors 102 disclosed herein) can define an opening configured to receive a temporary anchorage device or other orthodontic device therein. Additionally or alternatively, the anchor 120 (or any of the connectors 102 disclosed herein) can include a securing element such as a hook, a button, a clip, etc. for securing an orthodontic device (e.g., an elastic, a temporary anchorage device, etc.) to the appliance 100.

Any and all of the features discussed above with respect to anchor 120 applies to any of the third connectors 108 disclosed herein.

As shown in FIG. 2C, each of the second connectors 106 may extend between a first end portion 106*a* and a second end portion 106*b*, and may have a longitudinal axis L1 extending between the first end portion 106*a* and the second end portion 106*b*. The first end portion 106*a* of one, some, or all of the second connectors 106 may be disposed at the third connector 108 and/or anchor 120. In some embodiments, one, some, or all of the second connectors 106 are integral with the third connector 108 and/or anchor 120 such that the first end portion 106*a* of such second connectors 106 are continuous with the third connector 108 and/or anchor 120. The second connectors 106 may extend from the third connector 108 and/or anchor 120 at spaced intervals along the longitudinal axis L2 of the third connector 108 and/or anchor 120, as shown in FIGS. 2A and 2C. In some embodiments, the second connectors 106 may be spaced at even intervals relative to each other, or at uneven intervals relative to each other, along the longitudinal axis L2 of the third connector 108 and/or anchor 120.

One, some, or all of the second connectors 106 may include and/or be coupled to an attachment portion 140 at or near the second end portion 106*b* of the respective second connector 106. In some embodiments, for example as shown in FIGS. 2A-2C, one or more of the second connectors 106 is cantilevered from the third connector 108 and/or anchor 120 such that the second end portion 106*b* of the cantilevered second connector(s) 106 has a free second end portion 106*b*. In these and other embodiments, a gingival terminus of the attachment portion 140 may coincide with an occlusal terminus of the second connector 106. In some embodiments, the second connector 106 can connect to a mesial portion, a distal portion, and/or an occlusal portion of the attachment portion 140. The attachment portion 140 may be configured to detachably couple the respective second connector 106 to a securing member (e.g., a bracket) that is bonded, adhered, or otherwise secured to a surface of one of the teeth to be moved. In some embodiments, the attachment portion 140 may be directly bonded, adhered, or otherwise secured to a corresponding tooth without a securing member or other connection interface at the tooth. For example, the attachment portion 140 can comprise and/or can be secured to a polymeric cap having an inner surface with a contour substantially conforming to a surface of a tooth of the patient.

The appliances of the present technology may include any number of connectors 102 suitable for repositioning the patient's teeth while taking into account the patient's comfort. Unless explicitly limited to a certain number of connectors 102 in the specification, the appliances of the present technology may comprise a single connector 102, two connectors 102, three connectors 102, five connectors 102, ten connectors 102, sixteen connectors 102, etc. In some examples, one, some, or all of the connectors 102 of the appliance may be configured to individually connect to more than one tooth (i.e., a single connector 102 may be configured to couple to two teeth at the same time). In these and other embodiments, the appliance 100 may include two or more connectors 102 configured to connect to the same tooth at the same time.

Any portion of the appliances of the present technology may include a biasing portion 150. For example, in some embodiments, portion thereof (e.g., the anchor(s), the connector(s), the biasing portion(s), the attachment portion(s), the link(s), etc.) may comprise one or more superelastic materials.

Additional details related to the individual directional force(s) applied via the biasing portion 150 or, more generally the connectors 102, are described in U.S. application Ser. No. 15/370,704, now U.S. Pat. No. 10,383,707, issued Aug. 20, 2019, the disclosure of which is incorporated by reference herein in its entirety.

The appliances disclosed herein and/or any portion thereof (e.g., the anchor(s), the connector(s), the biasing portion(s), the attachment portion(s), the link(s), etc.) may comprise one or more superelastic materials. The appliances disclosed herein and/or any portion thereof (e.g., the anchor(s), the connector(s), the biasing portion(s), the attachment portion(s), the link(s), etc.) may comprise Nitinol, stainless steel, beta-titanium, cobalt chrome, MP35N, 35N LT, one or more metal alloys, one or more polymers, one or more ceramics, and/or combinations thereof.

The present technology includes a system comprising multiple appliances 100 for installation along a single arch. For example, the system can comprise a first appliance configured to be secured to at least two of the teeth of the arch and a second appliance configured to be secured to at least two different teeth of the same arch. The system can also comprise a third appliance, a fourth appliance, etc. The first appliance can be an X appliance, a Z appliance, or an XZ appliance. The second appliance can be an X appliance, a Z appliance, or an XZ appliance.

Figure 3B:
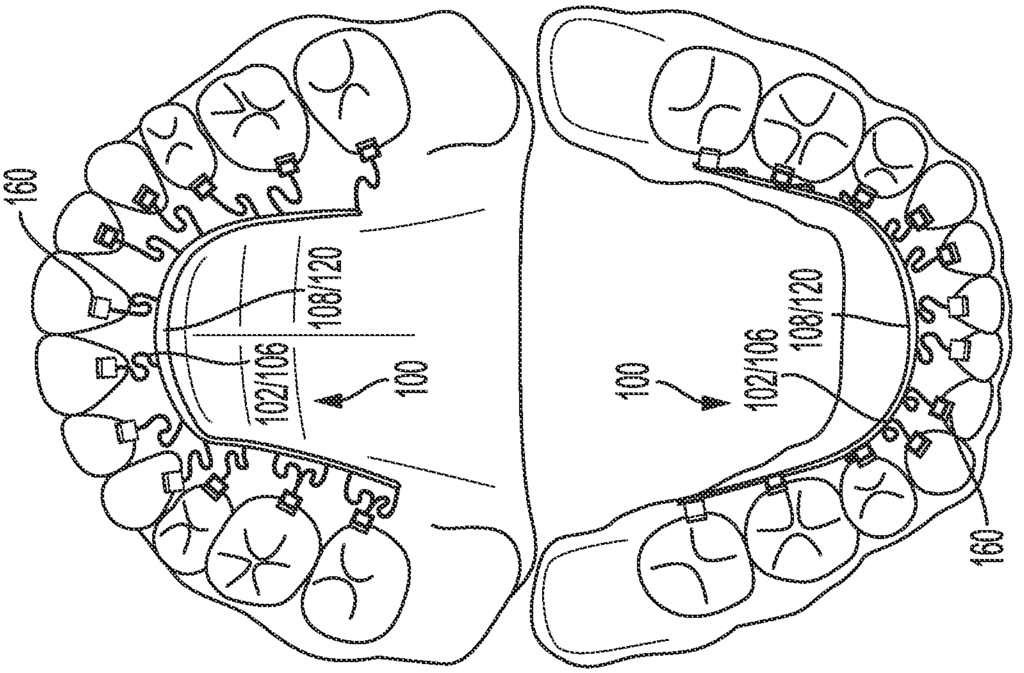
FIGS. 3A and 3B are elevation views of an appliance configured in accordance with several embodiments of the present technology installed in an upper and lower jaw of a patient's mouth with the patient's teeth in an original tooth arrangement and a final tooth arrangement, respectively.
Figure 3A:
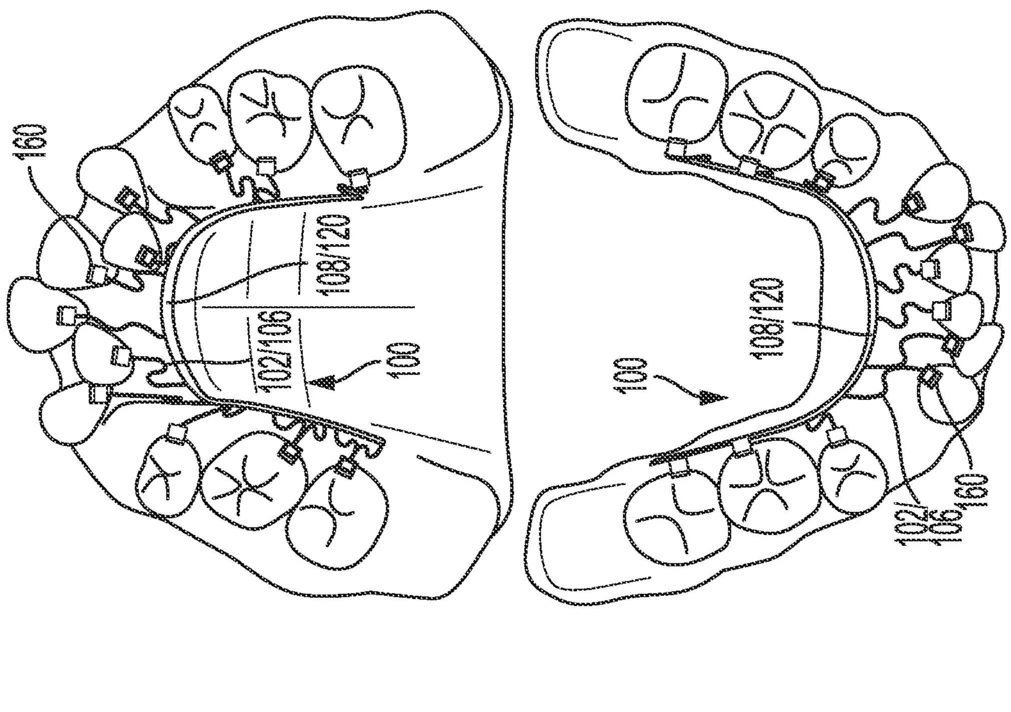

FIGS. 3A and 3B are elevation views of the appliance 100 installed on both the upper and lower arches of a patient's mouth with the connectors 102 coupled to securing members 160 attached to the lingual surfaces of the teeth via attachment portions 140. It will be appreciated that the appliance 100 of one or both of the upper and lower arches may be positioned proximate a buccal side of a patient's teeth, and that the securing members 160 and/or attachment portions 140 may alternatively be coupled to the buccal surface of the teeth.

FIG. 3A shows the teeth in an OTA with the connectors 102 in a deformed or loaded state, and FIG. 3B shows the teeth in the FTA with the connectors 102 in a substantially unloaded state. When the attachment portions 140 are initially secured to the securing members 160 when the teeth are in the OTA, the connectors 102 are forced to take a shape or path different than their "as designed" configurations. Because of the inherent memory of the resilient biasing portions 150, the connectors 102 impart a continuous, corrective force on the teeth to move the teeth towards the FTA, which is where the biasing portions 150 are in their as-designed or unloaded configurations. As such, tooth repositioning using the appliances of the present technology can be accomplished in a single step, using a single appliance. In addition to enabling fewer office visits and a shorter treatment time, the appliances of the present technology greatly reduce or eliminate the pain experienced by the patient as the result of the teeth moving as compared to braces. With traditional braces, every time the orthodontist makes an adjustment (such as installing a new archwire, bending the existing archwire, repositioning a bracket, etc.), the affected teeth experience a high force which is very painful for the patient. Over time, the applied force weakens until eventually a new wire is required. The appliances of the present technology, however, apply a movement-generating force on the teeth continuously while the appliance is installed, which allows the teeth to move at a slower rate that is much less painful (if painful at all) for the patient. Even though the appliances disclosed herein apply a lower and less painful force to the teeth, because the forces being applied are continuous and the teeth can move independently (and thus more efficiently), the appliances of the present technology arrive at the FTA faster than traditional braces or aligners, as both alternatives require intermediate adjustments.

Figure 3C:
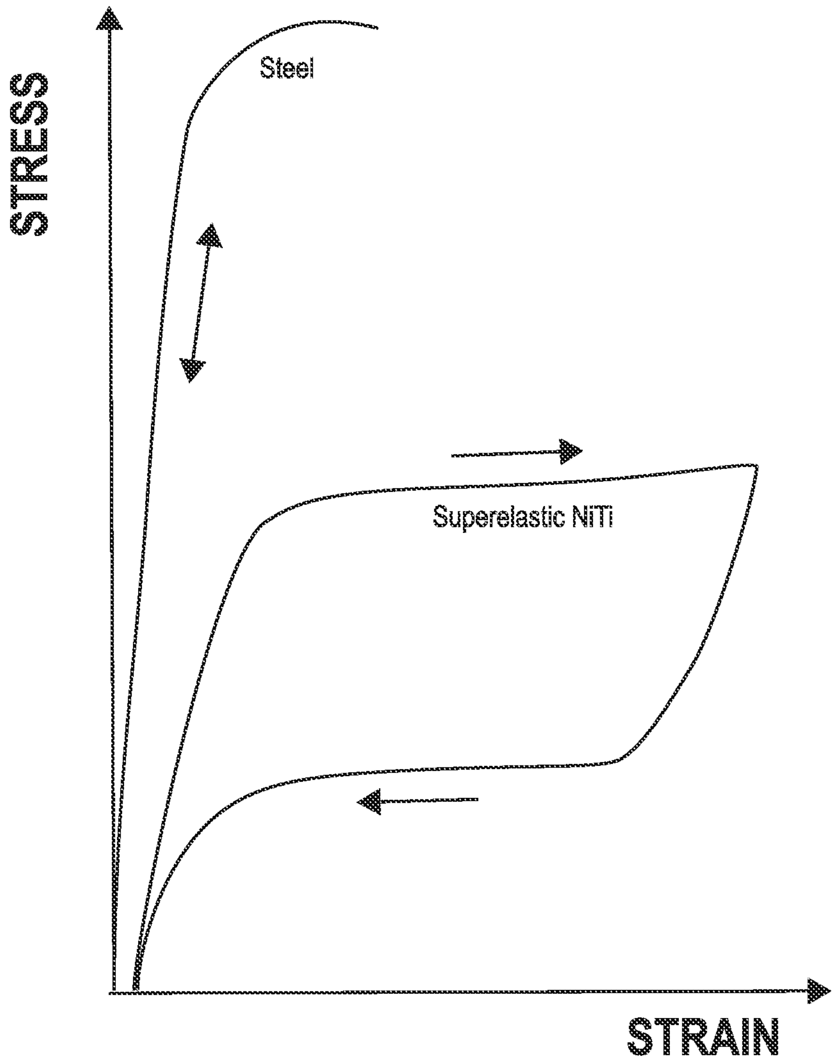
FIG. 3C is a graph showing the stress-strain curves for nitinol and steel.

In many embodiments, the movement-generating force is lower than that applied by traditional braces. In those embodiments in which the appliance comprises a superelastic material (such as nitinol), the superelastic material can behave like a constant force spring for certain ranges of strain such that the force applied does not drop appreciably as the tooth moves. For example, as shown in the stress-strain curves of nitinol and steel in FIG. 3C, the curve for nitinol is relatively flat compared to that of steel. Thus, the superelastic connectors and/or biasing portions of the present technology apply essentially the same stress for many different levels of strain (e.g., deflection). As a result, the force applied to a given tooth stays constant as the teeth move during treatment, at least up until the teeth are very close or in the final arrangement. The appliances of the present technology are configured to apply specific forces to a patient's teeth that move the teeth efficiently (e.g., quickly) but without causing adverse effects such as root resorption, pain, etc. For example, the appliances of the present technology can be configured to apply a force just below the pain threshold, such that the appliance applies the maximum non-painful force to the tooth (or teeth) at all or at least most times during tooth movement. This results in the most efficient (i.e., fastest) tooth movement without pain.

In some embodiments, tooth repositioning may involve multiple steps performed progressively, by using multiple appliances. Embodiments involving multiple steps (or multiple appliances, or both) may include one or more intermediate tooth arrangements (ITAs) between an original tooth arrangement (OTA) and a desired final tooth arrangement (FTA). Likewise, the appliances disclosed herein may be designed to be installed after a first or subsequently used appliance had moved the teeth from an OTA to an ITA (or from one ITA to another ITA) and was subsequently removed. Thus, the appliances of the present technology may be designed to move the teeth from an ITA to an FTA (or to another ITA). Additionally or alternatively, the appliances may be designed to move the teeth from an OTA to an ITA, or from an OTA to an FTA without changing appliances at an ITA.

In some embodiments, the appliances disclosed herein may be configured such that, once installed on the patient's teeth, the appliance cannot be removed by the patient. In some embodiments, the appliance may be removable by the patient.

Any of the example appliances or appliance portions described herein may be made of any suitable material or materials, such as, but not limited to Nitinol (NiTi), stainless steel, beta-titanium, cobalt chrome or other metal alloy, polymers or ceramics, and may be made as a single, monolithic structure or, alternatively, in multiple separately-formed components connected together in single structure. However, in particular examples, the rigid bars, bracket connectors and loop or curved features of an appliance (or portion of an appliance) described in those examples are made by cutting a two dimensional (2D) form of the appliance from a 2D sheet of material and bending the 2D form into a desired 3D shape of the appliance, according to processes as described in U.S. patent application Ser. No. 15/370,704 (Publ. No. 2017/0156823), filed Dec. 6, 2016, or other suitable processes.

Methods of Manufacturing

The present technology includes methods for designing and fabricating an orthodontic appliance as described herein. The particular processes described herein are exemplary only, and may be modified as appropriate to achieve the desired outcome (e.g., the desired force applied to each tooth by the appliance, the desired material properties of the appliance, etc.). In various embodiments, other suitable methods or techniques can be utilized to fabricate an orthodontic appliance. Moreover, although various aspects of the methods disclosed herein refer to sequences of steps, in various embodiments the steps can be performed in different orders, two or more steps can be combined together, certain steps may be omitted, and additional steps not expressly discussed can be included in the process as desired.

As noted above, in some embodiments an orthodontic appliance is configured to be coupled to a patient's teeth while the teeth are in an OTA. In this position, elements of the appliance exert customized loads on individual teeth to urge them toward a desired FTA. For example, a connector 102 of the appliance 100 can be coupled to a tooth via an attachment portion 140 and configured to apply a force so as to urge the tooth in a desired direction toward the FTA. In one example, a connector 102 of the appliance 100 can be configured to apply a tensile force that urges the tooth lingually along the facial-lingual axis. By selecting the appropriate dimensions, shape, shape set, material properties, and other aspects of the connectors 102, a customized load can be applied to each tooth to move each tooth from its OTA toward its FTA. In some embodiments, the connectors 102 are each configured such that little or no force is applied once the tooth to which the connector 102 is coupled has achieved its FTA. In other words, the appliance 100 can be configured such that the connectors 102 are at rest and passive in the FTA state.

The method may begin with obtaining data (e.g., position data) characterizing the patient's OTA. In some embodiments the operator may obtain a digital representation of the patient's OTA, for example using optical scanning, cone beam computed tomography (CBCT), MRI, scanning of patient impressions, or other suitable imaging technique to obtain position data of the patient's teeth, gingiva, and optionally other adjacent anatomical structures while the patient's teeth are in the original or pre-treatment condition.

The method may further comprise obtaining data (e.g., position data) characterizing the patient's intended or desired FTA, and in many cases generating a digital representation of the patient's FTA. The data characterizing the FTA can include coordinates (e.g., X, Y, Z coordinates) for each of the patient's teeth and the gingiva. Additionally or alternatively, such data can include positioning of each of the patient's teeth relative to other ones of the patient's teeth and/or the gingiva.

In some embodiments, segmentation software can be used to create individual virtual teeth and gingiva from the OTA data. Suitable software can be used to move the virtual teeth to their FTA positions. In some cases, digital models of securing members can be added to the OTA digital model (e.g., by an operator selecting positions on the tooth surface for placement of securing members thereon). Suitable software can be used to move the virtual teeth with the attached securing members from the OTA to a desired final position. Additionally or alternatively, digital models of the securing members can be added to FTA digital models.

In some embodiments a heat treatment fixture digital model can be obtained. In some embodiments, the heat treatment fixture digital model can correspond to and/or be derived from the FTA digital model. For example, the FTA digital model can be modified in a variety of ways to render a model suitable for manufacturing a heat treatment fixture. In some embodiments, the FTA digital model can be modified to replace the securing members (which are configured to couple to attachment portions 140 of an appliance 100 (FIG. 2A)) with members (which can be configured to facilitate temporary coupling of the heat treatment fixture to the appliance for shape-setting). Additionally or alternatively, the FTA digital model can be modified to enlarge or thicken the gingiva, to remove one or more of the teeth, and/or to add structural components for increased rigidity. In some embodiments, enlarging or thickening the gingiva may be done to ensure portions (e.g., the anchor) of the fabricated appliance, which is based in part on the FTA digital model, does not engage or contact the patient's gingiva when the appliance is installed. As a result, modifying the FTA digital model as described herein may be done to provide a less painful teeth repositioning experience for the patient.

The method may further comprise obtaining an appliance digital model. As used herein, the term "digital model" and "model" are intended to refer to a virtual representation of an object or collection of objects. For example, the term "appliance digital model" refers to the virtual representation of the structure and geometry of the appliance, including its individual components (e.g., the connectors, biasing portions, attachment portions, etc.). In some embodiments, a substantially planar digital model of the appliance is generated based at least in part on the heat treatment fixture digital model (and/or the FTA digital model). According to some examples, a contoured or 3D appliance digital model generally corresponding to the FTA can first be generated that conforms to the surface and attachment features of the heat treatment fixture digital model. In some embodiments, the 3D appliance digital model can include generic connector portions and securing members, without particular geometries, dimensions, or other properties of the connectors being selected or defined by a particular patient. The 3D appliance digital model may then be flattened to generate a substantially planar appliance digital model. In some embodiments, the particular configuration of the connectors (e.g., the geometry of biasing portions 150, the position along the anchor 120 (FIG. 2A), etc.) can then be selected so as to apply the desired force to urge the corresponding tooth (to which the connector is attached) from its OTA toward its FTA. As noted previously, in some embodiments the connectors are configured so as to be substantially at rest or in a substantially unstressed state when at the FTA. The selected connector configurations can then be substituted or otherwise incorporated into the planar appliance digital model.

In some cases, it may be beneficial to evaluate an intended appliance design prior to fabricating a physical appliance based on the intended appliance design to assess how the physical appliance would perform during treatment. For example, because the pre-installation form of the appliance is based at least in part on a desired FTA, the position of one or more portions of the appliance may shift relative to the gingiva once the physical appliance is installed in the patient's mouth (e.g., with the patient's teeth in the OTA). As a result, one or more shifted positions of the physical appliance may cause pain for the patient that may reduce treatment compliance and/or satisfaction.

In some embodiments, finite element analysis (or other suitable computational techniques) can be used to manipulate the 3D appliance digital model to assess its performance prior to fabrication. For example, the 3D appliance digital model can be virtually deformed (e.g., using finite element analysis) into a position for engagement with the patient's teeth in the OTA. The resulting virtual model represents the appliance digital model after it has been deformed into position to be engaged with the patient's teeth in the OTA. An output of the virtual deformation can be evaluated to assess whether the physical appliance will function as intended. Based on the evaluation of the output, the intended appliance design can be modified as needed, or a final appliance design can be obtained. In some embodiments, a portion of the appliance digital model may impinge on the gingiva digital model. As a result, the design of the appliance may be modified, and the evaluation may be repeated until the appliance digital model no longer impinges on the gingiva. This process may be repeated iteratively until a satisfactory appliance design is achieved.

Next, the heat treatment fixture can be fabricated. For example, using the heat treatment fixture digital model, the heat treatment fixture can be cast, molded, 3D printed, or otherwise fabricated using suitable materials configured to withstand heating for shape setting of an appliance thereon.

In some embodiments, fabricating the appliance includes first fabricating the appliance in a planar configuration based on the planar appliance digital model. For example, a pattern of the planar form of the final device can be cut out of a sheet of material to get a planar member. In some embodiments, the appliance is cut out of a sheet of Nitinol or other metal using laser cutting, water jet, stamping, or other suitable technique. The thickness of the material can be varied across the appliance, for example by electropolishing, etching, depositing, or otherwise manipulating the material of the appliance to achieve the desired material properties.

According to some embodiments, the planar member (e.g., as 3D-printed or as cut out from a sheet of material) can be bent or otherwise manipulated into the desired arrangement (e.g., substantially corresponding to the FTA) to form a 3D appliance for treatment. In some embodiments, the planar member can be bent into position by coupling the planar member to a heat treatment fixture. The heat treatment fixture may be, for example, the physical form of the previously-obtained heat treatment fixture digital model. For example, the attachment portions of the planar member can be removably coupled to hook members of the heat treatment fixture, and optionally ligature wire or other temporary fasteners can be used to secure the attachment portions or other portions of the appliance to the heat treatment fixture. The resulting assembly (i.e., the appliance fastened to the heat treatment fixture) can then be heated to shape-set the appliance into its final form, which can correspond or substantially correspond to the FTA. As a result, the appliance is configured to be in an unstressed state in the FTA. The shape set appliance can then be removed from the heat treatment fixture.

In operation, the appliance can then be installed in the patient's mouth (e.g., by bending or otherwise manipulating connectors of the appliance to couple the respective attachment portions to brackets of the patient's teeth while in the OTA). Due to the shape set of the appliance and the geometry of the connectors, the connectors will tend to urge each tooth away from its OTA and toward the FTA

III Selected Examples of Attachment Portions and Securing Members

A. Resilient Attachment Portions

Many traditional orthodontic systems comprise brackets configured to secure to one or more portions of an orthodontic appliance via additional fasteners (e.g., O-rings, adhesive, etc.) and/or actuation of one or more fastening elements of the bracket (e.g., self-ligating brackets, etc.). Such systems are tedious to install and/or costly to manufacture. Moreover, such systems may have a large thickness measured along a buccolingual dimension, which can be uncomfortable for the patient. In contrast, the attachment portions of the present technology can be resiliently deformable and can actively press outwardly against the bracket walls to secure themselves in place. The attachment portions are thus at least partially self-securing and require fewer portions of the bracket, if any, to extend over a soft-tissue facing surface of the attachment portion (e.g., a lingual surface of a lingually attached attachment portion, a buccal surface of a buccally positioned attachment portion, etc.). As a result, the attachment portions and brackets of the present technology have a significantly reduced buccolingual profile (together or individually) as compared to traditional bracket systems, which advantageously improves patient comfort. Moreover, the open structure of the brackets and deformability of the attachment portions allow for a greater tolerance in sizing of the attachment portions and ease of installation. Additionally, because the attachment portions and securing members of the present technology have little to no play when secured to one another, the attachment portions can transfer orthodontic forces to a patient's teeth via the securing members more efficiently. This efficient force transfer can result in more accurate movement of the patient's teeth and more efficient treatment.

The forces required to connect and disconnect the attachment portions and the brackets from each other can be sufficiently low to allow easy insertion and removal of the attachment portions and/or appliance by an operator. In one or more embodiments, these forces can be sufficiently high such that the attachment portions and/or appliance connects to the patient's dental structure and does not unintentionally detach from any of the brackets during treatment. That is, the attachment portions and bracket can remain connected even when subjected to normal corrective forces, retentive forces, or other forces caused by activity of the patient, such as chewing or other interactions with food and/or one or more teeth in the opposing jaw of the patient.

In several embodiments, the disengagement forces are neither too high such that disengagement causes patient discomfort nor too low such that spontaneous or unintentional disengagement occurs during treatment. The attachment portions of the present technology are configured to easily release from the brackets by a releasing force that is different than a force caused by patient activity, such as chewing. For example, as described in greater detail herein, the attachment portions and brackets of the present technology can be configured to be released by a twisting and/or rotational force applied to the attachment portion. In some embodiments, the attachment portions and brackets of the present technology can be configured to be released by an occlusogingival force applied to the attachment portion by a lever supported on a fulcrum integrated in the design of the bracket. The optimal values for engagement and disengagement forces may vary considerably from tooth to tooth and depend in part on the configuration of the appliance. In some embodiments, the forces required to disconnect the attachment portion from the bracket can be such that only a practitioner can release the attachment portion.

Figure 4B:
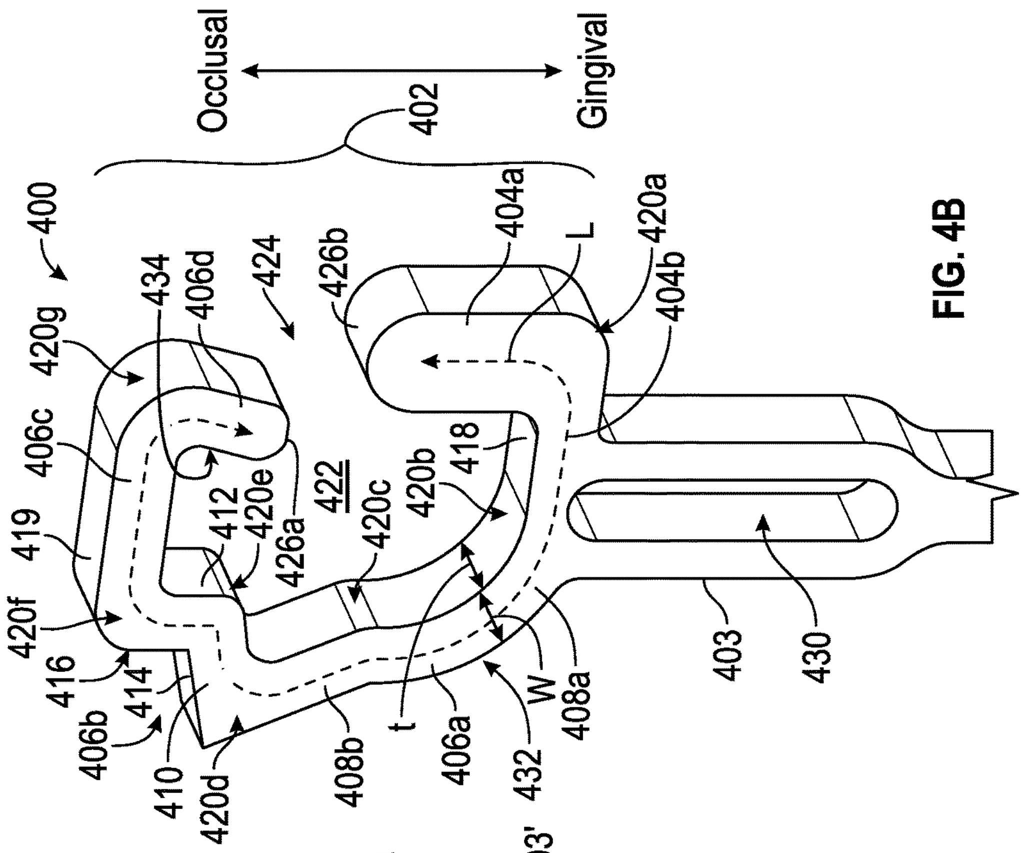
FIGS. 4A and 4B are different views of an attachment portion configured in accordance with several embodiments of the present technology.
Figure 4A:
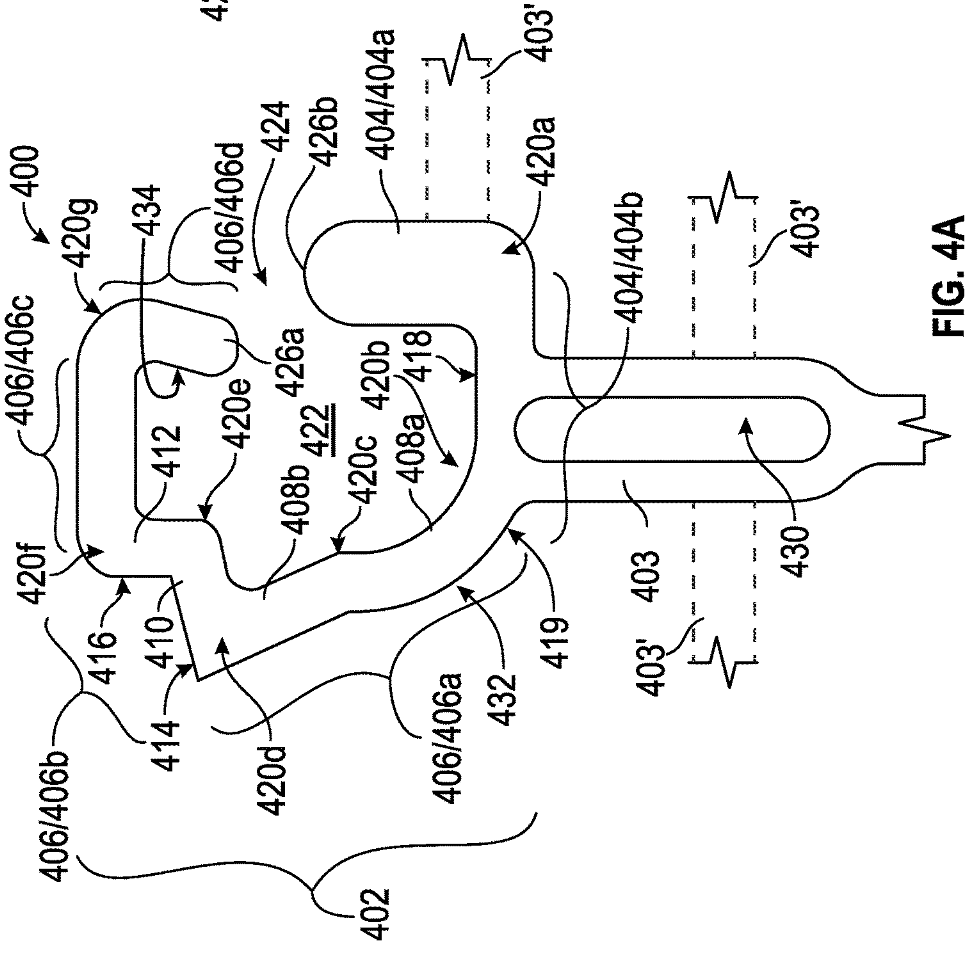

FIGS. 4A and 4B show different views of an attachment portion 400 configured in accordance with several embodiments of the present technology. The attachment portion 400 can be configured to be secured to a patient's tooth via a securing member, such as securing member 500 shown in FIGS. 5A and 5B. The attachment portion 400 and the securing member 500 are shown in a secured arrangement in FIGS. 6A and 6B. As discussed in greater detail below, the attachment portion 400 and the securing member 500 can be configured such that the attachment portion 400 can be releasably secured to the securing member 500. The attachment portion 400 can be continuous with a connector 403 that connects the attachment portion 400 to one or more additional portions of an orthodontic appliance (not shown).

Referring first to FIGS. 4A and 4B, the attachment portion 400 can comprise a head 402. In some embodiments, the attachment portion 400 comprises a head 402 and at least a portion of the connector 403 continuous with the head 402. The connector 403, for example, can comprise a second connector as previously described herein and can extend gingivally away from a gingival portion of the head 402. The connector 403 can have features similar to any of the connectors disclosed herein (e.g., first connectors, second connectors, third connectors, etc.) and can comprise a single connector or multiple connectors. For example, the connector 403 can comprise a single, occlusogingivally extending connector 403, multiple occlusogingivally extending connectors (not shown), one or more occlusogingivally extending connectors 403 and one or more mesiodistally extending connectors 403' branching off of the occlusogingivally extending connector 403 (shown schematically in FIG. 4A) and/or attachment portion (shown schematically in FIG. 4A), or one or more mesiodistally extending connectors (and no occlusogingivally extending connectors). Accordingly, the attachment portion 400 can be connected to a single connector or multiple connectors 403, 403'. As shown schematically in FIG. 4A, the connectors 403 can connect to the head 402 at a variety of locations. For example, the occlusogingivally extending connector 403 can connect to a gingival portion of the head 402 while a mesiodistally extending connector 403' can connect to a lateral portion of a base the head 402. Any of the connectors 403, 403' disclosed herein can extend away from the head 402 along a variety of dimensions (e.g., along an occlusogingival dimension, a mesiodistal dimension, a buccolingual dimension, etc.). The mesiodistally extending connector(s) 403' can have similar features as the occlusogingivally extending connector(s) 403, as detailed below (e.g., the mesiodistally extending connector(s) 403' and/or the occlusogingivally extending connector(s) 403 can be part of the same monolithic piece of material as the head 402, etc.).

In some embodiments, the head 402 and the connector 403 are part of the same, monolithic piece of material (e.g., cut from a sheet of material, a 3D-printed piece, etc.). Thus, the head 402 and the connector 403 may refer to different portions of the same continuous component. The attachment portion 400 can be one portion of a greater orthodontic appliance, or may be formed separately and attached to an orthodontic appliance. The attachment portion 400 and/or the corresponding appliance can be cut from the same sheet of material and/or may be formed by molding, casting, machining, 3D printing, stamping, extruding, or the like. The attachment portion 400 may comprise a metal or a plastic and may have superelastic and/or shape memory properties. In some embodiments, the attachment portion 400 does not have superelastic and/or shape memory properties.

Figure 6A:
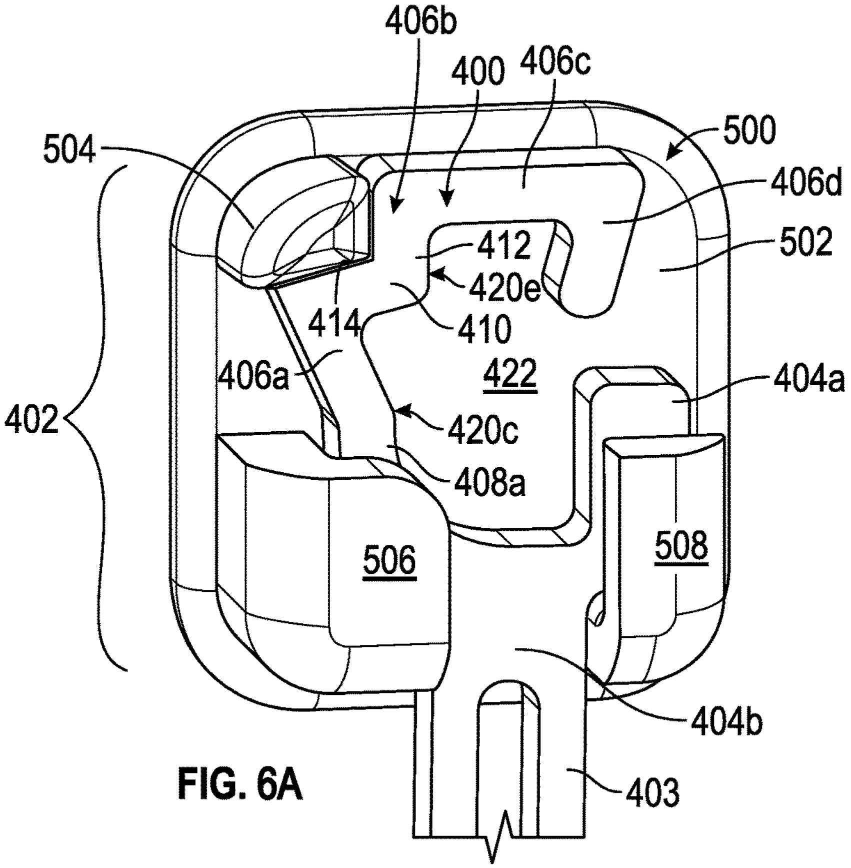
FIGS. 6A and 6B are different views of an attachment portion secured to a securing member in accordance with several embodiments of the present technology.

The head 402 of the attachment portion 400 can comprise an elongate member having a first end portion 426*a*, a second end portion 426*b*, and a longitudinal axis L (only labeled in FIG. 4B) extending between the first and second end portions 426*a*, 426*b*. The elongate member can include a plurality of bends along its longitudinal axis L such that it forms an open, generally C-shaped structure surrounding an interior region 422. As discussed in greater detail herein, the interior region 422 can be sized to receive a tool configured to release the attachment portion 400 from a securing member (such as securing member 500). Additionally or alternatively, the interior region 422 can be sized to receive a tool to facilitate securing of the attachment portion 400 to the securing member 500. At least when the attachment portion 400 is in a relaxed (unsecured) state (as shown in FIGS. 4A and 4B, for example), the first and second end portions 426*a*, 426*b* can be spaced apart by a gap 424 that is continuous with the interior region 422 of the head 402. In some embodiments, the first and second end portions 426*a*, 426*b* can be spaced apart by the gap 424 even when the attachment portion 400 is in a compressed (secured) state (for example as shown in FIG. 6A).

In some embodiments, the head 402 can comprise a base 404 and an arm 406 extending occlusally and mesiodistally from the base 404 and configured to bend and/or rotate relative to the base 404. The base 404 and the arm 406 can together partially enclose and define the interior region 422. The elongate member can extend laterally away from the connector 403 on either side of the connector 403. The elongate member, base 404, and/or arm 406 can have an interior surface 418 facing the interior region 422, an exterior surface 419 facing away from the head 402 and interior region 422, and a width w (only labeled in FIG. 4B) measured between the interior and exterior surfaces 418, 419. The elongate member, base 404, and/or arm 406 can also have a front surface (facing out of the page) and a back surface (not visible in FIGS. 4A and 4B), and a thickness t (only labeled in FIG. 4B) measured between the front and back surfaces. The elongate member, base 404, and/or arm 406 can have a substantially constant thickness t along its longitudinal axis L or may have a varying thickness t along its longitudinal axis. Likewise, the elongate member, base 404, and/or arm 406 can have a substantially constant width w along its longitudinal axis L, or may have a varying width along its longitudinal axis L. A width w and/or thickness t of the elongate member, base 404, and/or arm 406 can be varied to impart a preferred stiffness profile to all or a portion of the elongate member, base 404, and/or arm 406.

As shown in FIGS. 4A and 4B, the base 404 can include a first base region 404*a* extending along a generally occlusogingival dimension and a second base region 404*b* continuous with and extending away from an end of the first base region 404*a* along a generally mesiodistal dimension. A connecting end of the arm 406 can be disposed at and/or continuous with an end of the base 404, and the arm 406 can extend occlusogingivally away from the base 404, as shown in FIG. 4A. In some embodiments, a connecting end of the arm 406 can be disposed at and/or continuous with an end of the second base region 404*b*, and the arm 406 can extend occlusally away from the second base region 404*b*.

The arm 406 can include a first arm region 406*a* extending occlusally from the second base region 404*b*, a second arm region 406*b* continuous with and extending away from an end of the first arm region 406*a*, a third arm region 406*c* continuous with and extending away from an end of the second arm region 406*b* along a generally mesiodistal dimension, and a fourth arm region 406*d* continuous with and extending gingivally from an end of the third arm region 406*c*. In some embodiments, the first arm region 406*a* comprises a curved portion 408*a* and a substantially linear portion 408*b* extending away from the curved portion 408*a* such that the curved portion 408*a* is positioned between the second base region 404*b* and the substantially linear portion 408*b*. The linear portion 408*b* can beneficially provide a ramped surface that forces the arm 406 to bend or rotate when contacting an abutting surface of the securing member 500 during engagement and/or disengagement, as described in greater detail below. In some embodiments, the curved portion 408*a* is concave towards the interior region 422, thereby biasing the arm 406 to bend at or near the curved portion 408*a* when a rotational force is applied to the fourth arm region 406*d* in a direction away from the curved portion 408*a*.

The second arm region 406*b* comprises a shoulder portion of the arm 406 comprising a first shoulder region 410 extending slightly occlusally and laterally (mesially or distally) from the first arm region 406*a* and/or second portion 408*b*, and a second shoulder region 412 extending occlusally away from the first shoulder region 410. The first shoulder region 410 and the second shoulder region 412 can comprise first and second surfaces 414 and 416, respectively, each configured to engage a protrusion on the securing member 500 when the attachment portion 400 is secured to the securing member 500 to oppose rotational and/or translational movement of the arm 406. In some embodiments, the arm 406 has more or fewer portions along its longitudinal axis L.

Referring still to FIGS. 4A and 4B, the head 402 can comprise a plurality of predetermined bends 420 along its longitudinal axis L (only labeled in FIG. 4B). One, some, or all of the bends can be configured to preferentially flex to facilitate securing of the attachment portion 400 to the securing member 500 and/or release of the attachment portion 400 from the securing member 500, as described in greater detail herein. The head 402, for example, can include a first bend 420*a* between the first base region 404*a* and the second base region 404*b*, a second bend 420*b* between the second base region 404*b* and the first arm region 406*a* and/or curved portion 408*a*, a third bend 420*c* between the curved portion 408*a* and the linear portion 408*b*, a fourth bend 420*d* between the first arm region 406*a* and/or the linear portion 408*b* and the second arm region 406*b* and/or the first shoulder region 410, a fifth bend 420*e* between the first shoulder region 410 and the second shoulder region 412, a sixth bend 420*f* between the second shoulder region 412 and/or second arm region 406*b* and the third arm region 406*c*, and an seventh bend 420*g* between the third arm region 406*c* and the fourth arm region 406*d*. In some embodiments, the attachment portion 400 has more or fewer than seven bends along its longitudinal axis L.

Figure 5A:
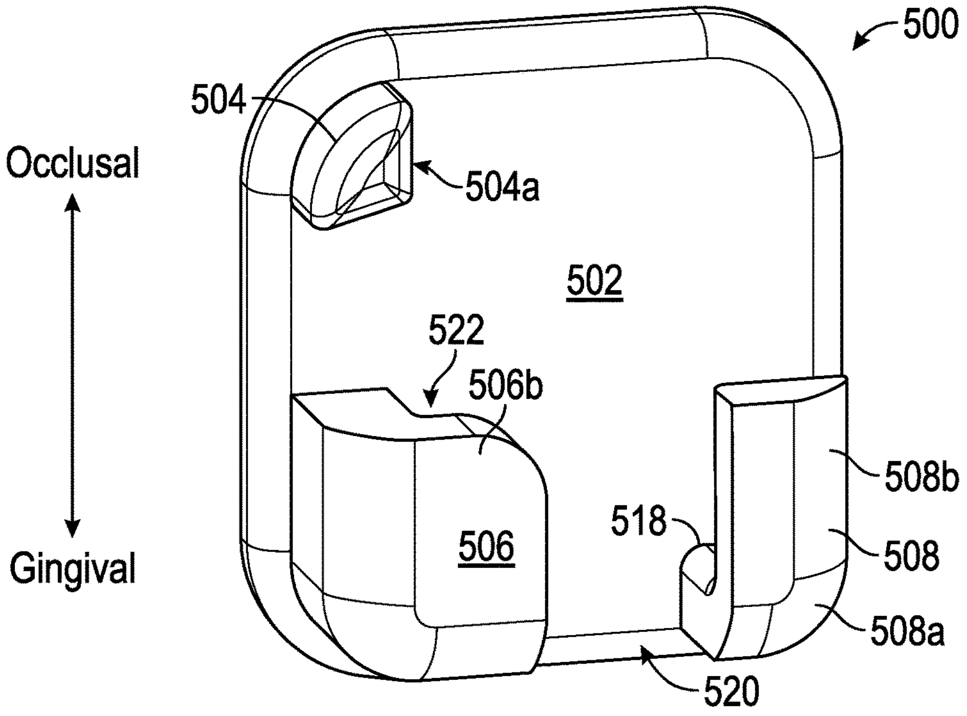
FIGS. 5A and 5B are different views of a securing member configured in accordance with several embodiments of the present technology.
Figure 5B:
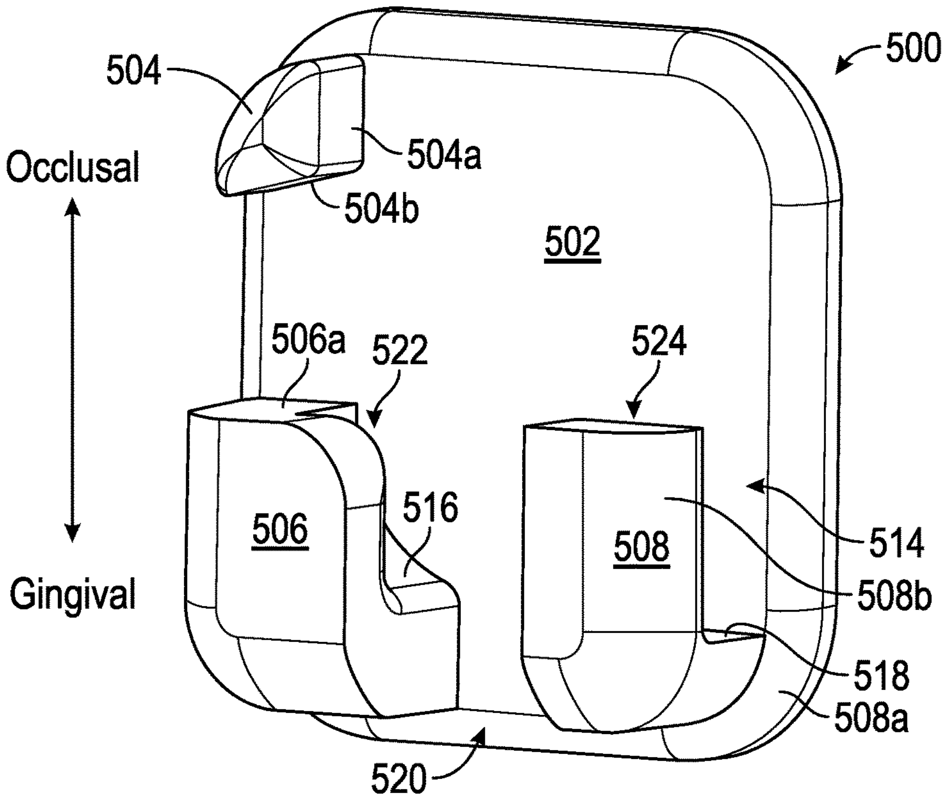

FIGS. 5A and 5B are different views of the securing member 500 configured for use with the attachment portion 400 of the present technology. As shown, the securing member 500 can have a first side (facing out of the page) and a second side (not visible in FIGS. 5A and 5B) opposite the first side and configured to be bonded to a patient's tooth. The securing member 500 can comprise a backing 502 carrying a plurality of protrusions 504, 506, 508 positioned at and extending away from the first side of the backing 502. The first protrusion 504 can be positioned at an occlusal portion of the backing 502, such as an occlusal lateral portion of the backing 502, and can have first and second surfaces 504*a* and 504*b* (labeled in FIG. 5B) that are angled relative to one another. The first surface 504*a* can face distally or mesially and extend along a generally occlusogingival dimension and the second surface 504*b* can face gingivally and extend along a generally mesiodistal dimension. In some embodiments, a gingival edge of the first surface 504*a* is substantially aligned along a mesiodistal dimension with an occlusal edge of the first surface 504*a*. The second surface 504*b* can form a ramped surface such that a mesial end of the second surface 504*b* is more gingival than the distal end of the second surface 504*b*, or vice versa. As discussed in greater detail herein, the slanted second surface 504*b* allows the attachment portion 400 to rotate out of engagement with the second surface 504*b* when the attachment portion 400 is rotated in a direction towards the more occlusal end of the second surface 504*b*, thereby freeing the attachment portion 400 from engagement with the securing member 500.

The second and third protrusions 506 and 508 can be positioned at a gingival portion of the backing 502 and spaced apart by a gap 520 along a mesiodistal dimension. The gap 520 can be sized to receive at least a portion of the connector 403 of the corresponding attachment portion 400 and/or appliance. The second protrusion 506 can be positioned on the same side of the backing 502 (along a mesiodistal dimension) as the first protrusion 504. In some embodiments, the second protrusion 506 has a first region 506*a* extending lingually (or buccally, depending on which side of the tooth the securing member 500 is attached) away from the backing 502 and forming a lateral wall. The second protrusion 506 can also include a second region 506*b* extending away from the first region 506*a* towards a midline or intermediate portion of the securing member 500 and spaced apart from the backing 502 by a gap 522. The gap 522 can have a depth that is slightly greater than a thickness t of the attachment portion 400 so that the attachment portion 400 can fit between the second region 506*b* and the backing 502. The second protrusion 506 can also include a curved inner surface 516 (only visible in FIG. 5B) configured to engage the curved portion 408*a* of the attachment portion 400 and prevent translation of the curved portion 408*a* laterally or gingivally beyond the surface 516. The second region 506*b* of the second protrusion 506 can further include an inner surface (not visible in FIGS. 5A and 5B) facing towards the backing 502 and configured to oppose lingual (or buccal) movement of an attached attachment portion 400. As such, the second protrusion 506 functions as both a side, bottom, and front stop to the attachment portion 400 when the attachment portion 400 is secured to the securing member 500.

The third protrusion 508 can be positioned on the opposite side (along a mesiodistal dimension) of the backing 502 as the first protrusion 504 and the second protrusion 506. In some embodiments, the third protrusion 508 can have a first region 508*a* extending lingually (or buccally, depending on which side of the tooth the securing member 500 is attached) away from the backing 502 and forming a bottom wall. The third protrusion 508 can have a second region 508*b* extending occlusally from the first region 508*a* and spaced apart from the backing 502 by a gap 524 (only labeled in FIG. 5B). The gap 524 can have a depth that is slightly greater than a thickness t of the attachment portion 400 so that the attachment portion 400 can fit between the second region 508*b* and the backing 502. The securing member 500 can include a gap at the lateral side of the second region 508*b* which allows a first base region 404*a* of the attachment portion 400 to flex, bend, rotate, and/or deform laterally beyond the second region 508*b*. The first region 508*a* of the third protrusion 508 can have an inner, occlusally-facing surface 518 that opposes gingival movement of the attachment portion 400, and the second region 508*b* of the third protrusion 508 can have an inner, buccally- (or lingually-)

facing surface (not visible in FIGS. 5A and 5B) that opposes lingual (or buccal) movement of the attachment portion 400.

Figure 6B:
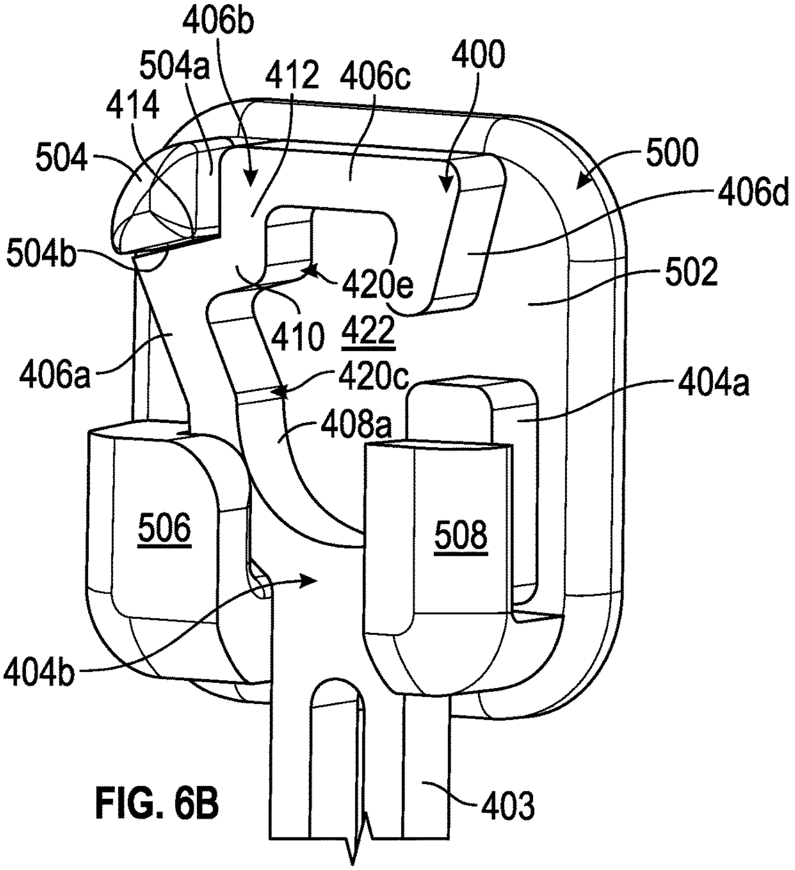

FIGS. 6A and 6B are different front views of the attachment portion 400 secured to the securing member 500. As shown, in a secured state, the attachment portion 400 can be positioned proximate and/or against the backing 502 of the securing member 500 and bound between the first, second, and third protrusions 504, 506, 508. The attachment portion 400 can comprise a resilient and/or superelastic material that, when braced between the first, second, and third protrusions 504, 506, 508, actively exerts an outward force on the surrounding surfaces of the securing member 500. For example, an exterior, occlusally-facing surface of the second arm region 406*b* (e.g., the first surface 414) can abut and press occlusally against the gingivally-facing second surface 504*b* (labeled in FIG. 6B) of the first protrusion 504. The exterior, mesially-facing/distally-facing second surface 416 (see FIG. 4A) of the second arm region 406*b* can abut and press mesially/distally against the first surface 504*a* of the first protrusion 504. An exterior surface of the head 402 along the first arm region 406*a* and/or curved portion 408*a* can abut and press laterally and gingivally against the inner surface 516 (see FIG. 5B) of the second protrusion 506. An exterior surface of the head 402 along the base 404 can abut and press gingivally against a bottom surface 518 of the third protrusion 508. Accordingly, the aforementioned surfaces of the attachment portion 400 and the securing member 500 that are configured to engage when the attachment portion 400 is in the secured state can comprise securing surfaces. In some embodiments, a securing surface of the attachment portion 400 configured to engage a respective securing surface of the securing member 500 can be configured to at least partially conform to the respective securing surface of the securing member 500.

In the secured position, the attachment portion 400 is releasably secured to the securing member 500 such that it cannot be inadvertently displaced or prematurely released by typical patient activity (such as chewing). The attachment portion 400 (or one or more portions thereof) can be configured to press outwardly on the securing member 500 when in the secured position. The active and/or continuous outward force exerted by the attachment portion 400 on the securing member 500 advantageously eliminates or reduces play between the attachment portion 400 and securing member 500 along a mesiodistal dimension, an occlusogingival dimension, and/or a buccolingual dimension, thus providing a more accurate and efficient transfer of force from the appliance to the tooth. As a result, less overcorrection of the planned movement of a tooth from OTA to FTA may be required because less force is lost due to play between the attachment portion and the securing member. In some embodiments, the attachment portion 400 (or one or more portions thereof) does not press outwardly on the securing member 500 and is instead configured to engage the securing member 500 to limit movement of the attachment portion 400 relative to the securing member 500. In some embodiments, one or more of the securing surfaces is configured for transferring orthodontic force between the attachment portion 400 (e.g., to and/or from the connector 403, to and/or from the rest of the appliance, etc.) and the securing member 500 (e.g., to and/or from the tooth, etc.). In various embodiments, one or more of the securing surfaces does not substantially transfer orthodontic force between the attachment portion 400 and the securing member 500.

For any of the attachment portions and/or securing members disclosed herein, the attachment portions can be configured to continuously or intermittently exert an outwardly-directed force on a corresponding securing member along only a buccolingual dimension when the attachment portion is secured to the securing member. For any of the attachment portions and/or securing members disclosed herein, the attachment portions can be configured to continuously or intermittently exert an outwardly-directed force on a corresponding securing member along only a mesiodistal dimension when the attachment portion is secured to the securing member. For any of the attachment portions and/or securing members disclosed herein, the attachment portions can be configured to continuously or intermittently exert an outwardly-directed force on a corresponding securing member along only an occlusogingival dimension when the attachment portion is secured to the securing member. For any of the attachment portions and/or securing members disclosed herein, the attachment portions can be configured to continuously or intermittently exert an outwardly-directed force on a corresponding securing member along a buccolingual dimension and a mesiodistal dimension when the attachment portion is secured to the securing member. For any of the attachment portions and/or securing members disclosed herein, the attachment portions can be configured to continuously or intermittently exert an outwardly-directed force on a corresponding securing member along a buccolingual dimension and an occlusogingival dimension when the attachment portion is secured to the securing member. For any of the attachment portions and/or securing members disclosed herein, the attachment portions can be configured to continuously or intermittently exert an outwardly-directed force on a corresponding securing member along a mesiodistal dimension and an occlusogingival dimension when the attachment portion is secured to the securing member. For any of the attachment portions and/or securing members disclosed herein, the attachment portions can be configured to continuously or intermittently exert an outwardly-directed force on a corresponding securing member along a buccolingual dimension, a mesiodistal dimension, and an occlusogingival dimension when the attachment portion is secured to the securing member. As discussed herein, active and/or continuous outward force exerted by the attachment portion on the securing member advantageously eliminates any play between the attachment portion and securing member along a given dimension, thus providing a more accurate and efficient transfer of force from the appliance to the tooth.

Figure 7B:
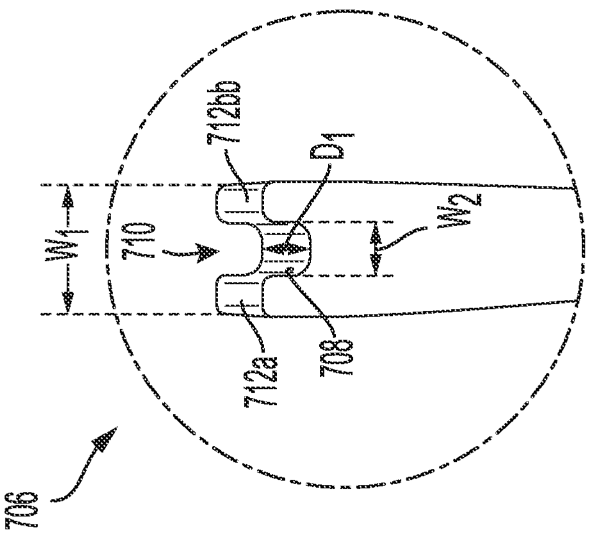
FIG. 7B is an enlarged view of the distal end portion of the tool shown in FIG. 7A.
Figure 7A:
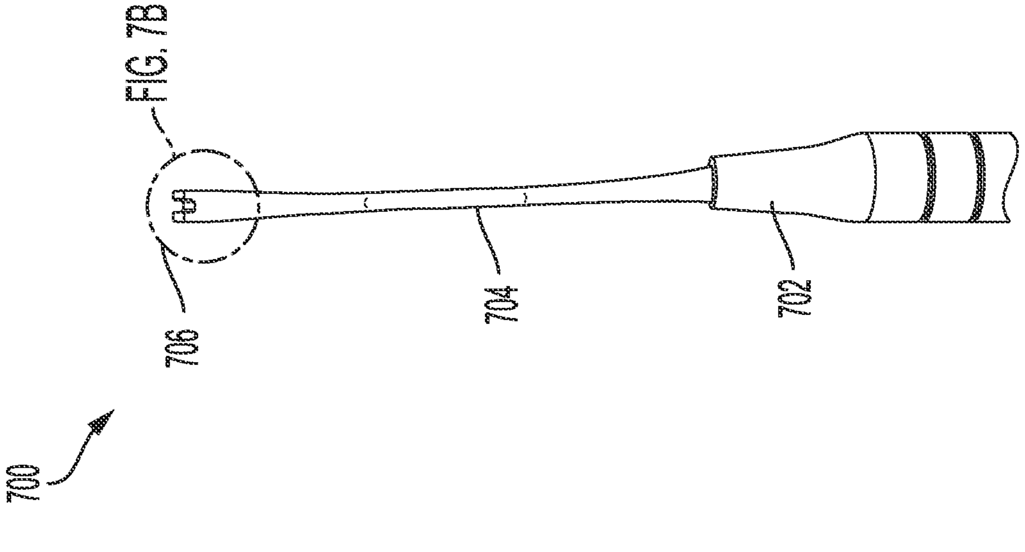
FIG. 7A shows a tool for manipulating orthodontic devices configured in accordance with several embodiments of the present technology.

FIGS. 7A and 7B show an orthodontic tool 700 to be used with the orthodontic appliances of the present technology, for example to facilitate securement and removable of the detachable attachment portions and securing members disclosed herein. As shown in FIG. 7A, the tool 700 includes a handle 702 and a neck 704 extending distally from the handle 702. FIG. 7B shows an enlarged view of a distal end portion 706 of the tool 700. In some embodiments, the tool 700 can include a notch 710 defined by a recessed end surface 708 of the tool 700. The distal end portion 706 can have a generally rectangular cross-sectional shape with a width W1 and a depth D1. In some embodiments, the notch 710 extends through the entire depth of the distal end portion 706. For example, as shown in FIG. 7B, the notch 710 can have a width W2 bound by sidewalls 712*a*, 712*b* and the same depth as the distal end portion 706. In some embodiments, the notch 710 extends through only a portion of the depth of the distal end portion 706. In some embodiments, a cross-sectional shape and/or dimension of the distal end portion 706 can be approximately equal to a cross-sectional shape and/or dimension of the interior region 422 of the attachment portion 400 and/or an opening 430 in the connector 403. As such, insertion of the end portion 706 into an interior region 422 and/or opening 430 allows an operator to manipulate and position the corresponding connector 403 portion and/or attachment portion more easily. This fine control can be beneficial, for example, when positioning the corresponding attachment portion on a tooth or securing member. It will be appreciated that the distal end portion 706 can have other cross-sectional shapes, such as that of a square, a circle, an oval, a polygon, a triangle, and/or any suitable shape. The cross-sectional shape of the distal end portion 706 can match that of any interior region or opening within an attachment portion, connector 403 portion, and/or any other portion of an appliance which, as discussed, can be any shape.

Figure 8:
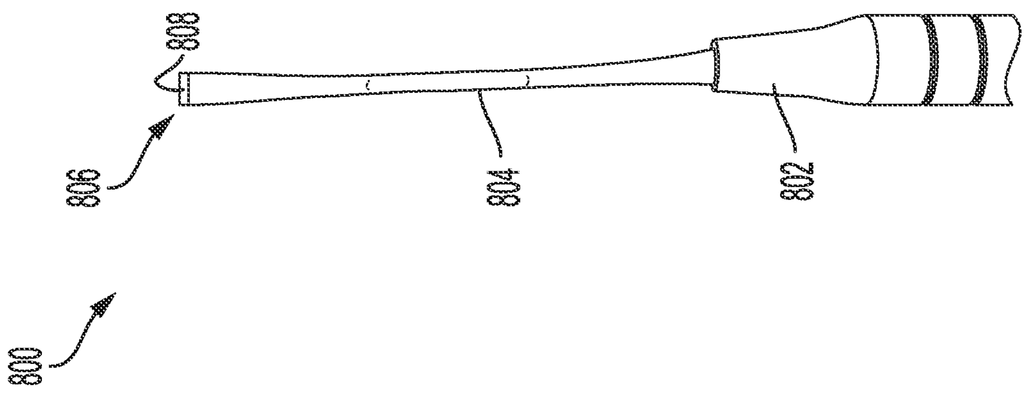
FIG. 8 shows a tool for manipulating orthodontic devices configured in accordance with several embodiments of the present technology.

FIG. 8 shows another tool 800 configured in accordance with several embodiments of the present technology. Tool 800 can be generally similar to tool 700, except tool 800 does not include a notch at its distal end surface 808. Instead, the distal end surface 808 is substantially flat. The distal end portion 806 can have a generally rectangular cross-sectional shape with a width W1 and a depth D1. In some embodiments, a cross-sectional shape and/or dimension of the distal end portion 806 can be approximately equal to a cross-sectional shape and/or dimension of the interior region 422 of the attachment portion 400 and/or the opening 430 in the connector 403. It will be appreciated that the distal end portion 806 can have other cross-sectional shapes, such as that of a square, a circle, an oval, a polygon, a triangle, and/or any suitable shape. The cross-sectional shape of the distal end portion 806 can match that of any interior region or opening within an attachment portion, connector 403 portion, and/or any other portion of an appliance which, as discussed, can be any shape.

Figure 9B:
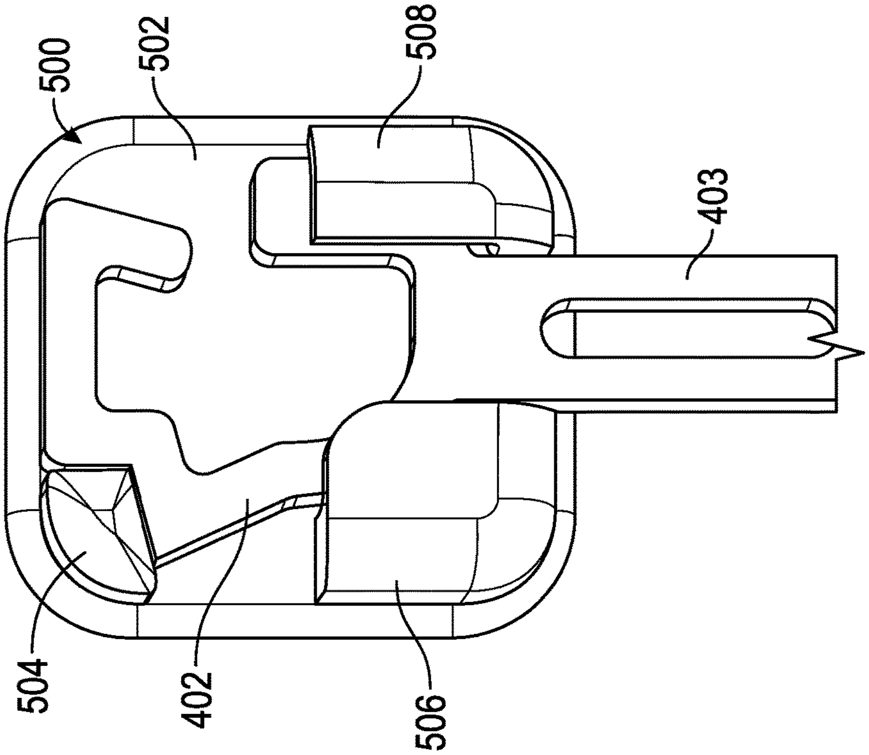
FIGS. 9A and 9B illustrate a method for securing an attachment portion to a securing member in accordance with several embodiments of the present technology.
Figure 9A:
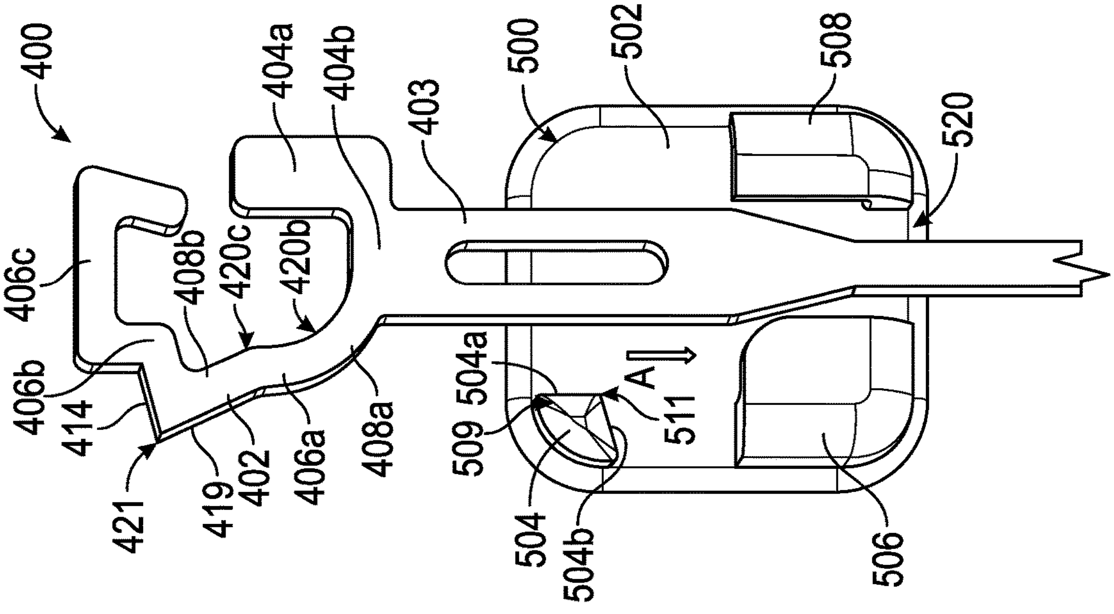

FIGS. 9A and 9B illustrate a method for securing the attachment portion 400 to a securing member 500. As shown, the connector 403 or other portion of the appliance continuous with the attachment portion 400 can be positioned relative to the securing member 500 such that at least a portion of the head 402 of the attachment portion 400 is positioned occlusally of the first protrusion 504 of the securing member 500 and/or at, near, and/or occlusally of an occlusal edge of the backing 502. The portion of the connector 403 connected to the attachment portion 400 can be positioned within the gap 520 between the second and third protrusions 506, 508 of the securing member 500 (e.g., along a mesiodistal dimension). In some embodiments, the back surface of the attachment portion 400 (not visible in FIGS. 9A and 9B) can be positioned proximate and/or in contact with the backing 502 of the securing member 500. As indicated by arrow A, an operator can slide the connector 403 and head 402 gingivally such that an exterior surface of the first arm region 406*a* contacts the first protrusion 504 of the securing member 500. Continued gingival movement of the connector 403 and/or head 402 forces the linear portion 408*b* of the first arm region 406*a* into contact with a top (occlusal) corner 509 of the first protrusion 504. Because the exterior surface 419 of the attachment portion 400 along the linear portion 408*b* faces gingivally and is angled toward the first protrusion 504 during the securing process, the occlusally-oriented force applied to the exterior surface 419 along the linear portion 408*b* when the linear portion 408*b* contacts the first protrusion 504 forces the first arm region 406*a* to bend at one, some, or all of the second bend 420*b*, anywhere along the curved portion 408*a*, and/or at the third bend 420*c*. As a result, the exterior surface 419 of the first arm region 406*a* slides down (e.g., gingivally, etc.) along the first surface 504*a* of the first protrusion 504 until the corner 421 between the first arm region 406*a* and the second arm region 406*b* clears (e.g., is positioned gingival of, etc.) a gingival corner 511 of the first protrusion 504 located between the first and second surfaces 504*a*, 504*b* of the first protrusion 504. Once the corner 421 of the attachment portion 400 is positioned gingival of the gingival corner 511 of the securing member 500, the resilient arm 406 or one or more portions thereof bends back towards its shape in the relaxed state, thereby wedging the attachment portion 400 between the first, second, and third protrusions 504, 506, 508, as shown in FIG. 9B. Accordingly, one or more regions of the attachment portion 400 can comprise a flexure 432 configured to bend and/or otherwise deform to facilitate securing of the attachment portion 400 to the securing member 500. The first arm region 406*a*, for example, can be configured to bend in a first direction to facilitate or enable sliding of the attachment portion 400 gingivally of the first protrusion 504 and/or bend in a second, opposite direction to facilitate or enable locking of the attachment portion 400 to the securing member 500. In some embodiments, deformation of the flexure 432 causes one or more portions of the attachment portion 400 to rotate (e.g., bending of the first arm region 406*a* can cause the second-fourth arm regions 406*b*-406*d* to rotate about the buccolingual dimension).

Figure 10A:
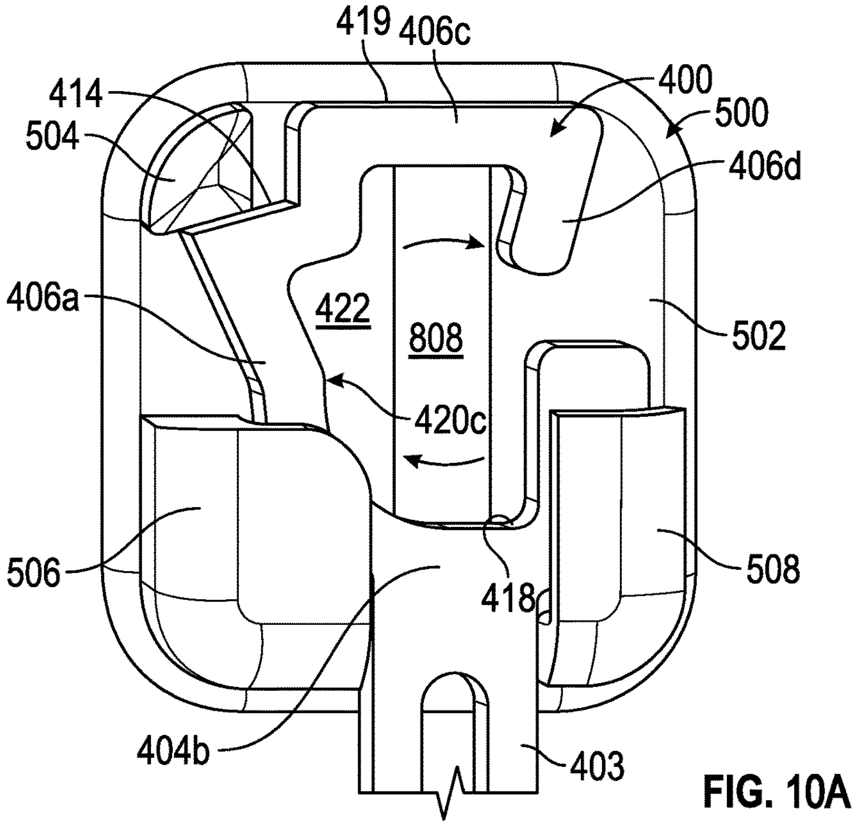
FIGS. 10A and 10B illustrate a method for releasing an attachment portion from a securing member in accordance with several embodiments of the present technology.
Figure 10B:
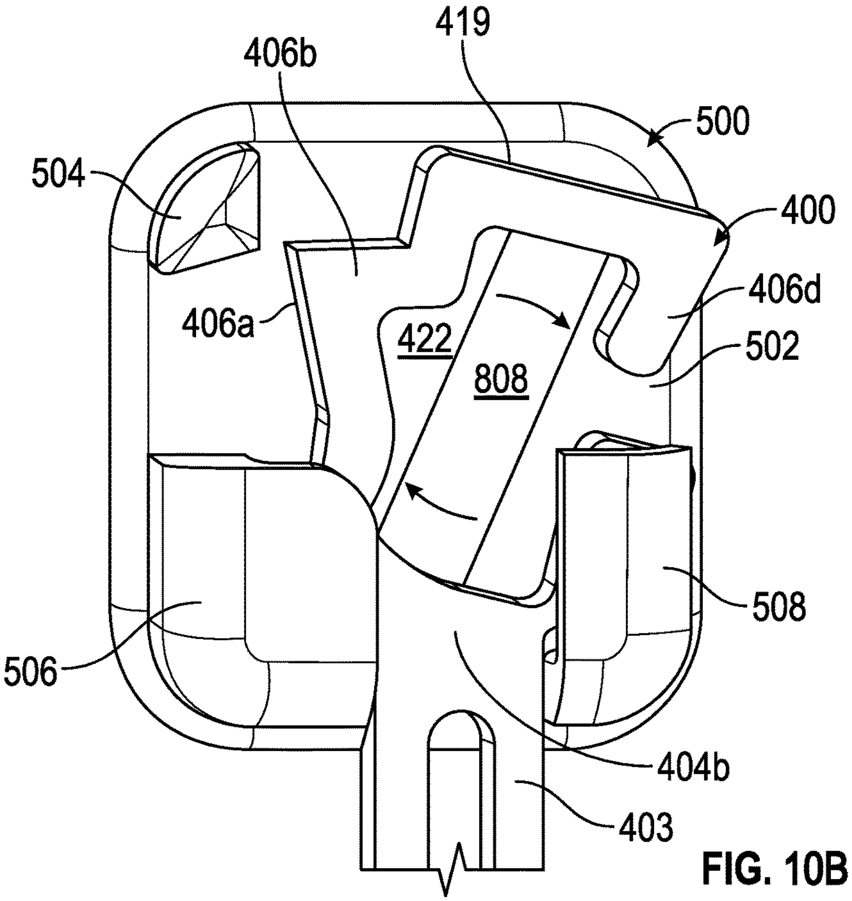

FIGS. 10A and 10B illustrate a method for releasing the attachment portion 400 from the securing member 500. As shown, the operator can insert a tool, such as the distal end surface 808 of tool 800, into the interior region 422 of the head 402 such that an occlusal end of the tool surface 808 is proximate an interior surface 418 of the elongate member along the third arm region 406*c* and a gingival end of the tool surface 808 is proximate an interior surface 418 of the elongate member along the second base region 404*b*. The operator can rotate the tool about a buccolingual dimension (e.g., rotating surface 808 away from the first protrusion 504 and/or towards the fourth arm region 406*d*, etc.) such that an occlusal portion of the tool surface 808 engages and pushes against the fourth arm region 406*d* while the gingival portion of the tool surface 808 slides up the curved interior surface along the curved portion 408*b* (see FIGS. 4A and 4B) of the first arm region 406*a*. When the gingival portion of the tool surface 808 can no longer slide occlusally along the interior surface 418, for example when reaching the third bend 420*c*, the occlusal portion of the tool surface 808 has good and/or maximum leverage against the fourth arm region 406*d* and forces the second and third arm regions 406*b* and 406*c* to rotate with the tool surface 808. This causes the arm 406 to bend at the flexure 432, which can include one, some, or all of the second bend 420*b*, anywhere along the curved portion 408*a* (see FIGS. 4A and 4B), and the third bend 420*c*. Because the opposing first surface 504*a* of the first protrusion 504 and first surface 414 of the arm 406 are angled occlusally in the direction of the rotation, the second arm region 406*b* slides off the first protrusion 504 with continued rotation of the tool surface 808, thereby releasing the attachment portion 400 from the securing member 500. In some embodiments, the attachment portion 400 can pop free of the securing member 500 once the first surface 414 clears the first protrusion 504. Still using the tool 800, the attachment portion 400 can be pulled upwardly until the wider gingival region of the head 402 clears an occlusal surface of the second and third protrusions 506, 508 and can be pulled away from the backing 502.

The attachment portion 400 can comprise a leveraging surface 434 configured to engage the tool surface 808 to facilitate deformation of the attachment portion 400 and cause the attachment portion 400 to release from the securing member 500. The fourth arm region 406*d* can have the leveraging surface 434. Additionally or alternatively, the third arm region 406*c*, the second arm region 406*b*, the first arm region 406*a*, and/or the base 404 can have the leveraging surface 434. In some embodiments, the attachment portion 400 comprises multiple leveraging surfaces 434.

In various embodiments, a feature of the connector 403 such as a location at which the connector 403 connects to the head 402, a dimension along which the connector 403 extends, a property of the connector 403, etc. can be at least partially based on a force to be imparted on a tooth to which the attachment portion 400 is configured to be secured (and/or an intended movement of the tooth) and/or the mechanism by which the attachment portion 400 is attached and/or detached to the securing member 500. For example, as previously noted, the attachment portion 400 can be configured to release from the securing member 500 when the first surface 414 slides occlusally along the second surface 504*b* of the first protrusion 504 and/or mesiodistally away from the first protrusion 504 (e.g., when the head 402 rotates about the buccolingual dimension). Thus, the connector 403 can connect to a gingival portion of the head 402 and/or can be configured to apply little to no occlusally directed force to the head 402 to prevent the first surface 414 from unintentionally sliding relative to the second surface 504*b* and causing the attachment portion 400 to unintentionally separate from the securing member 500. Additionally or alternatively, the connector 403 can be configured to apply little to no force directed in the same mesiodistal direction as the direction along which the first surface 414 is configured to slide mesiodistally relative to the second surface 504*b*. In some cases, for example as shown in FIGS. 4A and 4B, the connector 403 is continuous with the base 404 of the head 402 but not the arm 406. Such a configuration can prevent or limit the connector 403 from applying forces to the arm 406 that inadvertently cause the flexure 432 to deform during orthodontic treatment. Movement of the fourth arm region 406*d* of the attachment portion 400 in response to forces applied to the fourth arm region 406*d* by the tool 800 at the leveraging surface 434 can cause the attachment portion 400 to release from the securing member 500. Accordingly, in some embodiments no connectors attach to the leveraging surface 434 and/or the fourth arm region 406*d* so that little to no force is applied to the leveraging surface 434 and/or the fourth arm region 406*d* during the normal course of treatment.

Figure 11A:
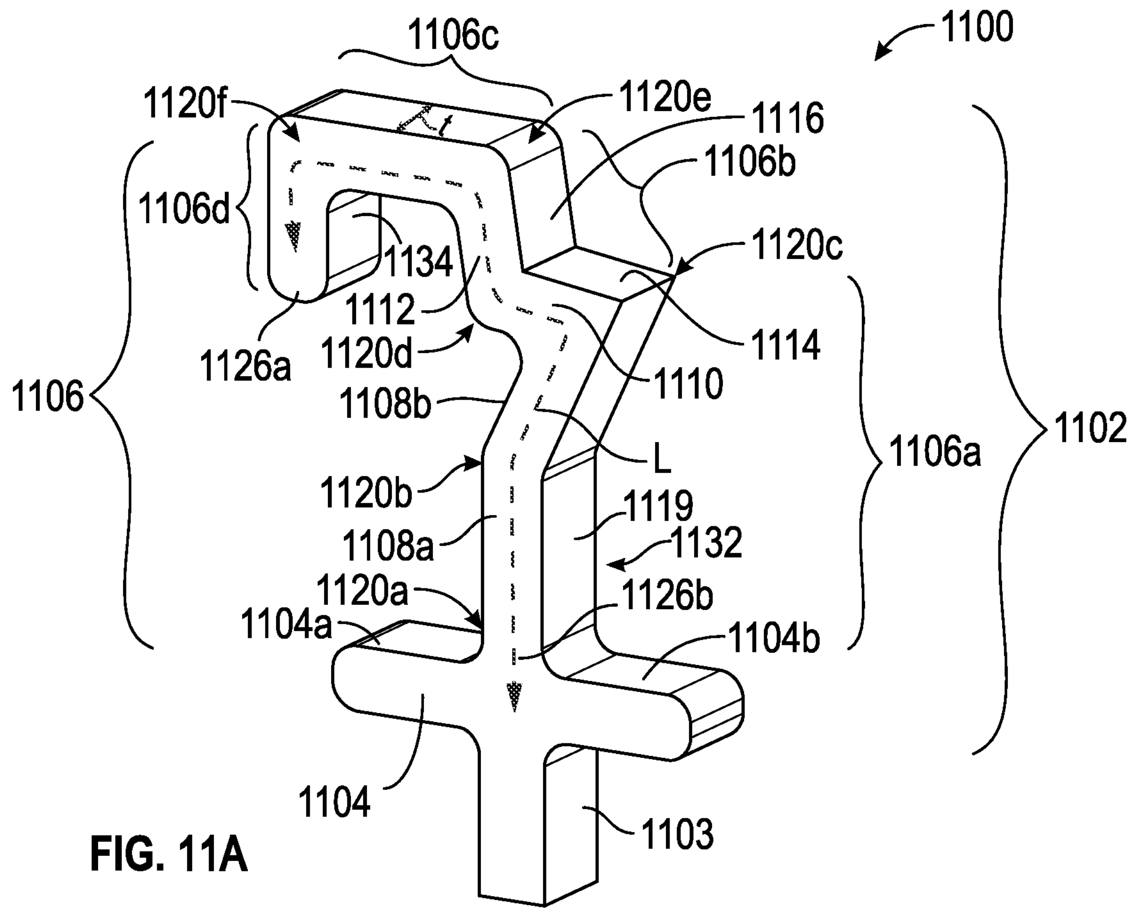
FIGS. 11A and 11B are different views of an attachment portion configured in accordance with several embodiments of the present technology.
Figure 11B:
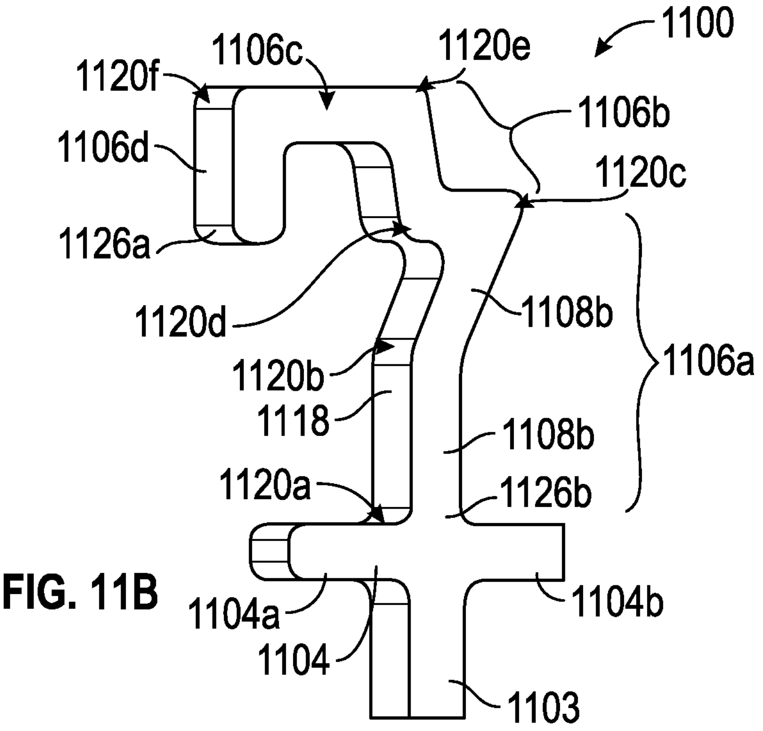

FIGS. 11A and 11B show different views of an attachment portion 1100 configured in accordance with several embodiments of the present technology. The attachment portion 1100 can be configured to be secured to a patient's tooth via a securing member, such as securing member 1200 shown in FIGS. 12A-12C. The attachment portion 1100 and the securing member 1200 are shown in a secured arrangement in FIG. 13. As discussed in greater detail below, the attachment portion 1100 and the securing member 1200 can be configured such that the attachment portion 1100 can be releasably secured to the securing member 1200. The attachment portion 1100 can be continuous with a connector 1103 that connects the attachment portion 1100 to one or more additional portions of an orthodontic appliance (not shown).

Referring first to FIGS. 11A and 11B, the attachment portion 1100 can comprise a head 1102. In some embodiments, the attachment portion comprises the head 1102 and at least a portion of the connector 1103 continuous with the head 1102. The connector 1103, for example, can comprise a second connector as previously described herein and can extend gingivally away from a gingival portion of the head 1102. The connector 1103 can have features similar to any of the connectors disclosed herein (e.g., first connectors, second connectors, third connectors, etc.) and can comprise a single connector or multiple connectors. For example, the connector 1103 can comprise a single, occlusogingivally extending connector 1103, multiple occlusogingivally extending connectors (not shown), one or more occlusogingivally extending connectors 1103 and one or more mesiodistally extending connectors branching off of the occlusogingivally extending connector (e.g., as described with reference to FIG. 4A) and/or attachment portion (not shown), or one or more mesiodistally extending connectors (and no occlusogingivally extending connectors). Accordingly, the attachment portion 1100 can be connected to a single connector 1103 or multiple connectors 1103. The connector(s) 1103 can connect to the head 1102 at a variety of locations. The gingivally extending connector 1103 shown in FIGS. 11A and 11B, for example, can connect to a gingival portion of the head 1102. Any of the connectors 1103 disclosed herein can extend away from the head 1102 along a variety of dimensions (e.g., along an occlusogingival dimension, a mesiodistal dimension, a buccolingual dimension, etc.).

In some embodiments, the head 1102 and the connector 1103 are part of the same, monolithic piece of material (e.g., cut from a sheet of material, a 3D-printed piece, etc.). Thus, the head 1102 and the connector 1103 may refer to different portions of the same component. The attachment portion 1100 can be one portion of a greater orthodontic appliance, or may be formed separately and attached to an orthodontic appliance. The attachment portion 1100 and/or the corresponding appliance can be cut from the same sheet of material and/or may be formed by molding, casting, machining, 3D printing, stamping, extruding, or the like. The attachment portion 1100 may comprise a metal or a plastic and may have superelastic and/or shape memory properties. In some embodiments, the attachment portion 1100 does not have superelastic and/or shape memory properties.

The head 1102 of the attachment portion 1100 can comprise an elongate member having a first end portion 1126*a*, a second end portion 1126*b*, and a longitudinal axis L (labeled in FIG. 11A only) extending between the first and second end portions 1126*a*, 1126*b*. The elongate member can include a plurality of bends along its longitudinal axis L such that it forms an open, generally hook-shaped structure. As discussed in greater detail herein, the hook-shaped structure can partially enclose an opening sized to receive a tool configured to release the attachment portion 1100 from a securing member (such as securing member 1200).

In some embodiments, the head 1102 can comprise a base 1104 and an arm 1106 extending occlusally from the base 1104 and configured to bend and/or rotate relative to the base 1104. The base 1104 can extend along a generally mesiodistal dimension and the arm 1106 can extend occlusally away from the base 1104. As shown in FIGS. 11A and 11B, the base 1104 may comprise a first region 1104*a* extending mesially away from the connector 1103 and/or proximal end portion of the arm 1106 and a second region 1104*b* extending distally away from the connector 1103 and/or proximal end portion of the arm 1106, or vice versa. The first and/or second regions 1104*a*, 1104*b* may extend along a generally mesiodistal dimension.

The elongate member, base 1104, and/or arm 1106 can have an interior surface 1118, an exterior surface 1119 facing away from the head 1102, and a width measured between the interior and exterior surfaces 1118, 1119. The elongate member, base 1104, and/or arm 1106 can also have a front surface (facing out of the page) and a back surface (not visible in FIGS. 11A and 11B), and a thickness measured between the front and back surfaces. The elongate member, base 1104, and/or arm 1106 can have a substantially constant thickness along its longitudinal axis or may have a varying thickness along its longitudinal axis L. Likewise, the elongate member, base 1104, and/or arm 1106 can have a substantially constant width along its longitudinal axis L, or may have a varying width along its longitudinal axis. A width and/or thickness t of the elongate member, base 1104, and/or arm 1106 can be varied to impart a preferred stiffness profile to all or a portion of the elongate member, base 1104, and/or arm 1106.

The arm 1106 can include a first arm region 1106*a* extending occlusally from the base 1104, a second arm region 1106*b* continuous with and extending away from an end of the first arm region 1106*a*, a third arm region 1106*c* continuous with and extending away from an end of the second arm region 1106*b* along a generally mesiodistal dimension, and a fourth arm region 1106*d* continuous with and extending gingivally from an end of the third arm region 1106*c*. In some embodiments, the first arm region 1106*a* comprises a first substantially linear portion 1108*a* and a second substantially linear portion 1108*b* extending away from the first portion 1108*a* such that the first portion 1108*a* is positioned between the connector 1103 and the substantially linear portion 1108*b*. The second portion 1108*b* can be angled relative to the first portion 1108 with a bend 1120*b* therebetween. For example, the second portion 1108*b* can extend occlusally and laterally (mesially or distally) from a distal end portion of the first portion 1108. In some embodiments, the second portion 1108*b* extends away from the first portion 1108*a* in a direction along a mesiodistal dimension that is away from the second end portion 1126*a* of the head 1102. According to several embodiments, one or both of the first and second portions 1108*a*, 1108*b* can be curved. In some embodiments, the first arm region 1106*a* does not include distinct portions separated by a bend and instead is substantially linear along its entire length or forms a continuous curve along its entire length.

The second portion 1108*b* can beneficially provide a ramped surface that forces the arm 1106 to bend or rotate when contacting an abutting surface of the securing member 1200*d* during engagement and/or disengagement, as described in greater detail below. For example, the ramped surface can be configured to force rotation and/or bending of the arm at bend 1120*a* and/or 1120*b*. In some embodiments, the second portion 1108*b* is angled away from the interior region, thereby biasing the arm 1106 to bend at or near the first and/or second bends 1120*a*, 1120*b* towards the interior region when an occlusally-directed force is applied to an exterior surface 1119 of the second portion 1108*b* (for example, during engagement of the attachment portion 1100).

As shown in FIGS. 11A and 11B, the second arm region 1106*b* can comprise a shoulder portion of the arm 1106 comprising a first shoulder region 1110 extending slightly occlusally and laterally (mesially or distally) from the first arm region 1106*a* and/or second portion 1108*b*, and a second shoulder region 1112 (only labeled in FIG. 11A) extending occlusally away from the first shoulder region 1110. The first shoulder region 1110 and the second shoulder region 1112 can comprise first and second surfaces 1114 and 1116, respectively (only labeled in FIG. 11A), each configured to engage a protrusion on the securing member 1200 when the attachment portion 1100 is secured to the securing member 1200 to oppose rotational and/or translational movement of the arm 1106. In some embodiments, the arm 1106 has more or fewer portions along its longitudinal axis L.

Referring still to FIGS. 11A and 11B, the head 1102 can comprise a plurality of predetermined bends 1120 along its longitudinal axis L (only labeled in FIG. 11B). One, some, or all of the bends can be configured to preferentially flex to facilitate securing of the attachment portion 1100 to the securing member 1200 and/or release of the attachment portion 1100 from the securing member 1200, as described in greater detail herein. The head 1102, for example, can include a first bend(s) 1120*a* between the first base region 1104*a* and the second base region 1104*b* and the arm 1106, a second bend 1120*b* along the first arm region 1106*a* between the first portion 1108*a* and the second portion 1108*b*, a third bend 1120*c* between the first arm region 1106*a* and/or second portion 1108*b* and the second arm region 1106*b* and/or first shoulder region 1110, a fourth bend 1120*d* between the first shoulder region 1110 and the second shoulder region 1112, a fifth bend 1120*e* between the second arm region 1106*b* and/or second shoulder region 1112 and the third arm region 1106*c*, and a sixth bend 1120*f* between the third arm region 1106*c* and the fourth arm region 1106*d*. In some embodiments, the attachment portion 1100 has more or fewer than six bends along its longitudinal axis L.

Figure 12A:
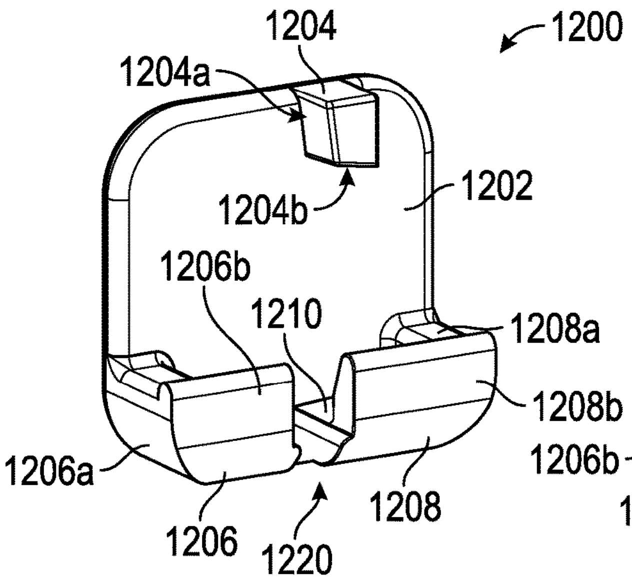
FIGS. 12A-12C are different views of a securing member configured in accordance with several embodiments of the present technology.
Figure 12B:
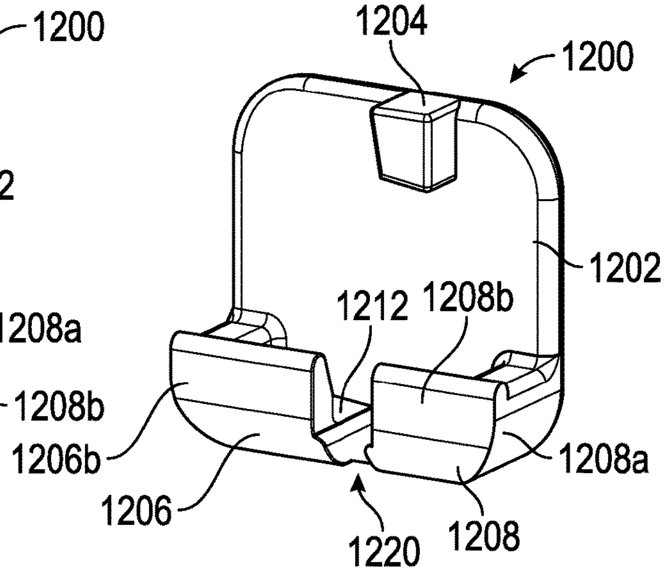
Figure 12C:
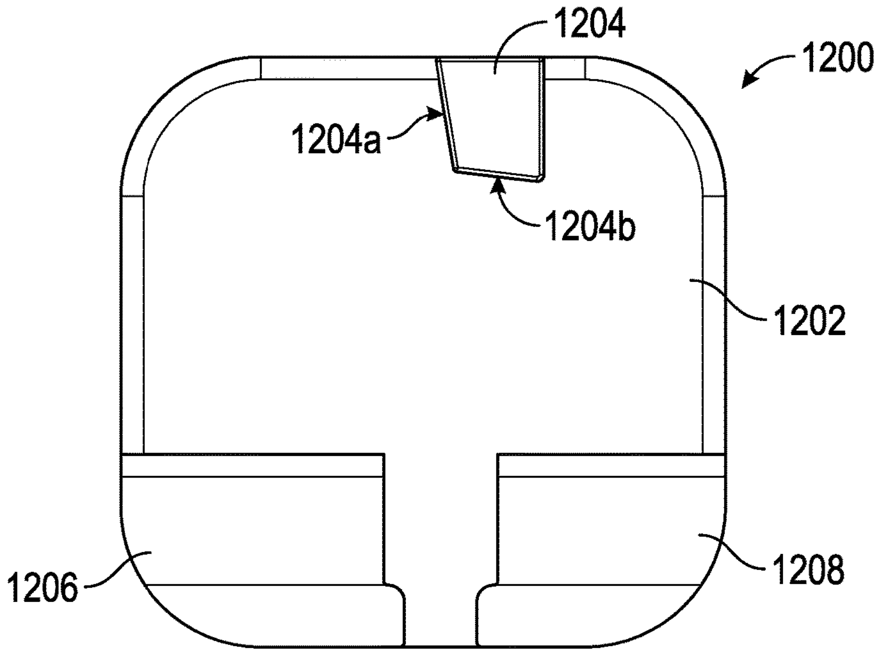

FIGS. 12A-12C are different views of the securing member 1200 configured for use with the attachment portion 1100 of the present technology. As shown, the securing member 1200 can have a first side (facing out of the page) and a second side (not visible in FIGS. 12A-12C) opposite the first side and configured to be bonded to a patient's tooth. The securing member 1200 can comprise a backing 1202 and a plurality of protrusions 1204, 1206, 1208 (referred to collectively as "protrusions 1211") positioned at and extending away from the first side of the backing 1202. The first protrusion 1204 can be positioned at an occlusal portion of the backing 1202, such as at an intermediate location between and/or spaced apart from the mesial and distal sides of the backing 1202. As best shown in FIG. 12C, in some embodiments the first protrusion 1204 is offset from a midline of the securing member 1200 (along a mesiodistal dimension) such that it is all or partially aligned with the third protrusion 1208. In some embodiments the first protrusion 1204 is offset from a midline of the securing member 1200 (along a mesiodistal dimension) such that it is all or partially aligned with the second protrusion 1206. The protrusions 1211 can be configured to engage an attachment portion (such as attachment portion 1100) to secure the attachment portion to the securing member.

The first protrusion 1204 can have first and second surfaces 1204*a* and 1204*b* (labeled in FIG. 12C) that are angled relative to one another. For example, the first and second surfaces 1204*a* and 1204*b* can form an obtuse angle relative to one another. The first surface 1204*a* can face distally or mesially and extend along a generally occlusogingival dimension and the second surface 1204*b* can face gingivally and extend along a generally mesiodistal dimension. In some embodiments, the first surface 1204*a* is angled with respect to the occlusogingival axis such that an occlusal end of the first surface 1204*a* is mesial or distal of the gingival end of the first surface 1204*a*. As discussed in greater detail herein, the leading (occlusal) end of the first surface 1204*a* can be configured to engage the arm 1106 of the attachment portion 1100 as the attachment portion 1100 is pulled downwardly along the backing 1202, thereby forcing the first arm region 1106*a* to bend in a direction away from the first protrusion 1204 (for example at the first bend 1120*a* and/or the second bend 1120*b*) so that the arm

1106 can clear the first protrusion 1204 and lock into place on the securing member 1200. According to some embodiments, the first surface 1204*a* is substantially aligned and/or parallel with the occlusogingival dimension.

The second surface 1204*b* can form a ramp and/or angled (e.g., slanted) surface such that an end of the second surface 1204*b* closest to the first surface 1204*a* is more occlusal than the other end of the second surface 1204*b*. As discussed in greater detail herein, the second surface 1204*b* allows the attachment portion 1100 to rotate out of engagement with the second surface 1204*b* when the attachment portion 1100 is rotated in a direction towards the occlusal end of the second surface 1204*b*, thereby freeing the attachment portion 1100 from engagement with the securing member 1200. According to some embodiments, the second surface 1204*b* is substantially aligned and/or parallel with a mesiodistal dimension.

The second and third protrusions 1206 and 1208 can be positioned at a gingival portion of the backing 1202 and spaced apart by a gap 1220. The gap 1220 can be sized to receive a portion of the connector 1103 of the corresponding attachment portion 1100 and/or appliance therethrough. The second and third protrusions 1206, 1208 can engage and prevent or substantially inhibit movement of the first and second regions 1104*a*, 1104*b*, respectively, of the base 1104.

The second protrusion 1206 can be positioned at a lateral side of the backing 1202. In some embodiments, the second protrusion 1206 has a first region 1206*a* (see FIG. 12A) extending lingually (or buccally, depending on which side of the tooth the securing member 1200 is attached) away from the backing 1202 and forming a lateral wall. The first region 1206*a*, for example, can lie within a plane normal to the occlusogingival dimension. The second protrusion 1206 can also include a second region 1206*b* extending away from the first region 1206*a* towards a midline or intermediate portion of the securing member 1200 and spaced apart from the backing 1202 by a gap. The gap can have a depth that is slightly greater than a thickness t of the attachment portion 1100 so that the attachment portion 1100 can fit between the second region 1206*b* and the backing 1202. The second protrusion 1206 can also include a gingival third region extending between the backing 1202, the first region 1206*a*, and the second region 1206*b* and having an inner surface 1212 (only visible in FIG. 12B) configured to engage the first region 1104*a* of the base 1104 of the attachment portion 1100 and prevent gingival movement of the first region 1104*a*. The first region 1206*a* of the second protrusion 1206 can include an inner surface facing towards a midline or intermediate portion of the securing member 1200 and configured to oppose mesial or distal movement of the attachment portion 1100. The second region 1206*b* of the second protrusion 1206 can further include an inner surface facing towards the backing 1202 and configured to oppose lingual (or buccal) movement of an attached attachment portion 1100. As such, the second protrusion 1206 functions as both a side, bottom, and front stop to the attachment portion 1100 when the attachment portion 1100 is secured to the securing member 1200.

The third protrusion 1208 can be positioned at a lateral side of the backing 1202. In some embodiments, the third protrusion 1208 has a first region 1208*a* (see FIG. 12B) extending lingually (or buccally, depending on which side of the tooth the securing member 1200 is attached) away from the backing 1202 and forming a lateral wall. The first region 1208*a*, for example, can lie within a plane normal to the occlusogingival dimension. The third protrusion 1208 can also include a second region 1208*b* extending away from the first region 1208*a* towards a midline or intermediate portion of the securing member 1200 and spaced apart from the backing 1202 by a gap. The gap can have a depth that is slightly greater than a thickness t of the attachment portion 1100 so that the attachment portion 1100 can fit between the second region 1208*b* and the backing 1202. The third protrusion 1208 can also include a gingival third region extending between the backing 1202, the first region 1208*a*, and the second region 1208*b*, and having an inner surface 1210 (only visible in FIG. 12A) configured to engage the second region 1104*b* of the base 1104 of the attachment portion 1100 and prevent gingival movement of the second region 1104*b*. The first region 1208*a* of the third protrusion 1208 can include an inner surface facing towards a midline of intermediate portion of the securing member 1200 and configured to oppose mesial or distal movement of the attachment portion 1100. The second region 1208*b* of the third protrusion 1208 can further include an inner surface facing towards the backing 1202 and configured to oppose lingual (or buccal) movement of an attached attachment portion 1100. As such, the third protrusion 1208 functions as both a side, bottom, and front stop to the attachment portion 1100 when the attachment portion 1100 is secured to the securing member 1200.

Figure 13:
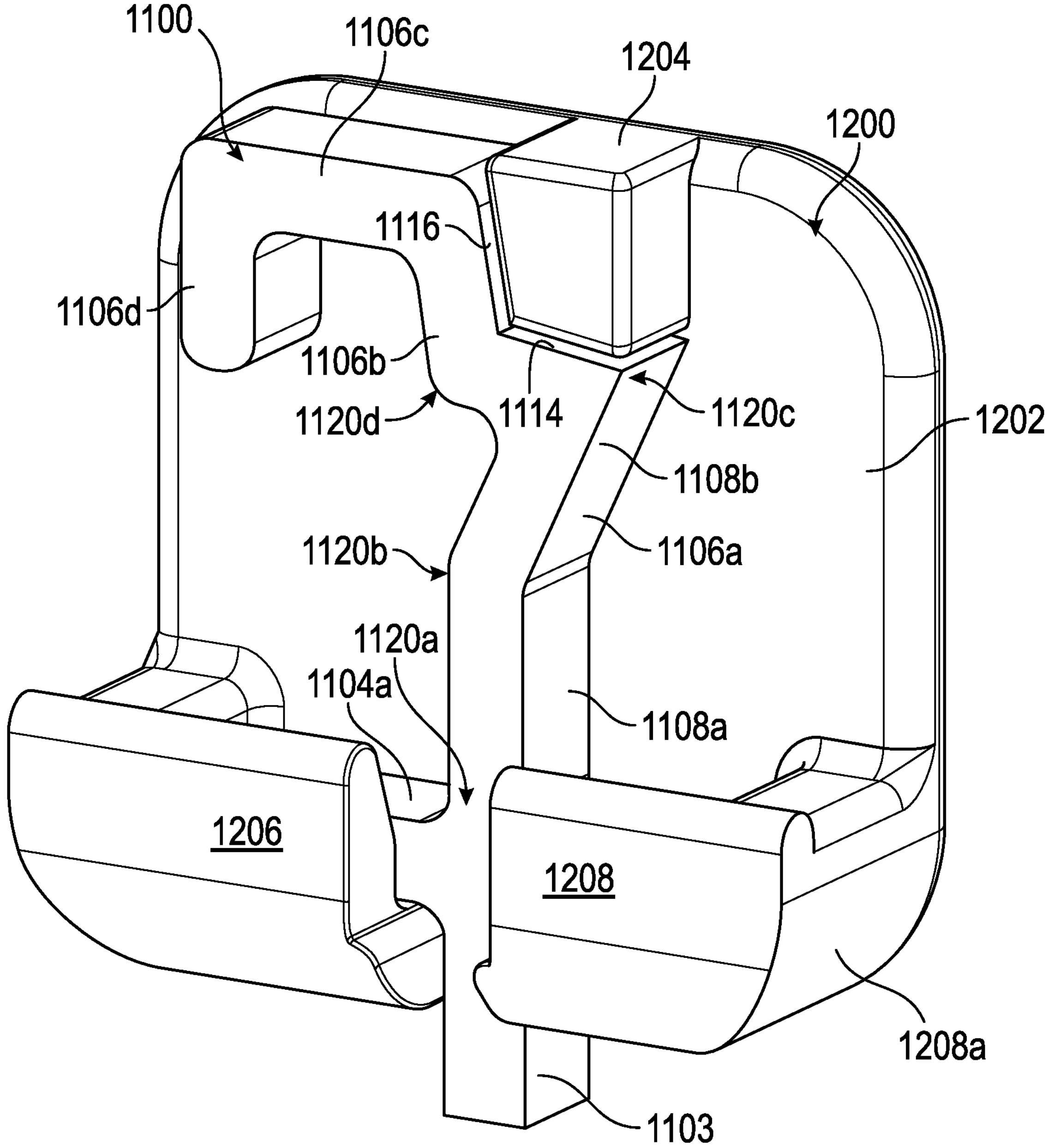
FIG. 13 shows an attachment portion secured to a securing member in accordance with several embodiments of the present technology.

FIG. 13 is an isometric view of the attachment portion 1100 secured to the securing member 1200. As shown, in a secured state, the attachment portion 1100 can be positioned against the backing 1202 of the securing member 1200 and bound between the first, second, and third protrusions 1204, 1206, 1208. The attachment portion 1100 can comprise a resilient and/or superelastic material that, when braced between the protrusions 1211, actively exerts an outward force on the surrounding surfaces. For example, an exterior, occlusally-facing surface 1114 of the second arm region 1106*b* (e.g., the first surface 1114) can abut and press occlusally against the gingivally-facing second surface 1204*b* (see FIG. 12A) of the first protrusion 1204. An exterior, mesially-facing/distally-facing surface of the second arm region 1106*b* (e.g., the second surface 1116) can abut and press mesially/distally against the first surface 1204*a* of the first protrusion 1204. A gingivally-facing surface of the first region 1104*a* of the base 1104 can abut and press gingivally against the inner surface of the third region of the second protrusion 1206, and a gingivally-facing surface of the second region 1104*b* of the base 1104 can abut and press gingivally against the inner surface of the third region of the third protrusion 1208. The inner surfaces of the first regions 1206*a*, 1208*a* of the first and second protrusions 1206, 1208, respectively, can abut and press mesially or distally (or vice versa), respectively, against the mesial/distal facing surfaces of the first and second regions 1104*a*, 1104*b*. Accordingly, the surfaces of the attachment portion 1100 and the surfaces of the securing member 1200 that are configured to engage to when the attachment portion 1100 is in the secured position, such as but not limited to the aforementioned surfaces, can comprise securing surfaces. In some embodiments, a securing surface of the attachment portion 1100 and a respective securing surface of the securing member 1200 that are configured to engage can be configured to conform to one another at least partially.

In the secured position, the attachment portion 1100 is releasably secured to the securing member 1200 such that it cannot be inadvertently displaced or prematurely released by typical patient activity (such as chewing). The attachment portion 1100 (or one or more portions thereof) can be configured to press outwardly on the securing member 1200 in the secured position. The active and/or continuous outward force exerted by the attachment portion 1100 on the securing member 1200 advantageously eliminates or reduces play between the attachment portion 1100 and securing member 1200 along a mesiodistal, occlusogingival, and/or buccolingual dimension, thus providing a more accurate and efficient transfer of force from the appliance to the tooth. In some embodiments, the attachment portion 1100 (or one or more portions thereof) does not press outwardly on the securing member 1200 and is instead configured to engage the securing member 1200 after a limited range of movement relative to the securing member 1200. In some embodiments, one or more of the securing surfaces is configured for transferring orthodontic force between the attachment portion 1100 (e.g., to and/or from the connector 1103, to and/or from the rest of the appliance, etc.) and the securing member 1200 (e.g., to and/or from the tooth, etc.). In various embodiments, one or more of the securing surfaces does not substantially transfer orthodontic force between the attachment portion 1100 and the securing member 1200 during the course of treatment.

Figure 14C:
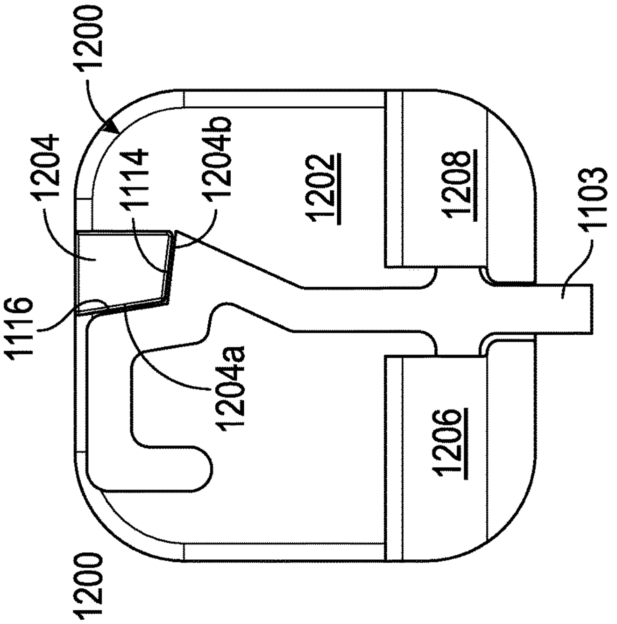
FIGS. 14A-14C illustrate a method for securing an attachment portion to a securing member in accordance with several embodiments of the present technology.
Figure 14B:
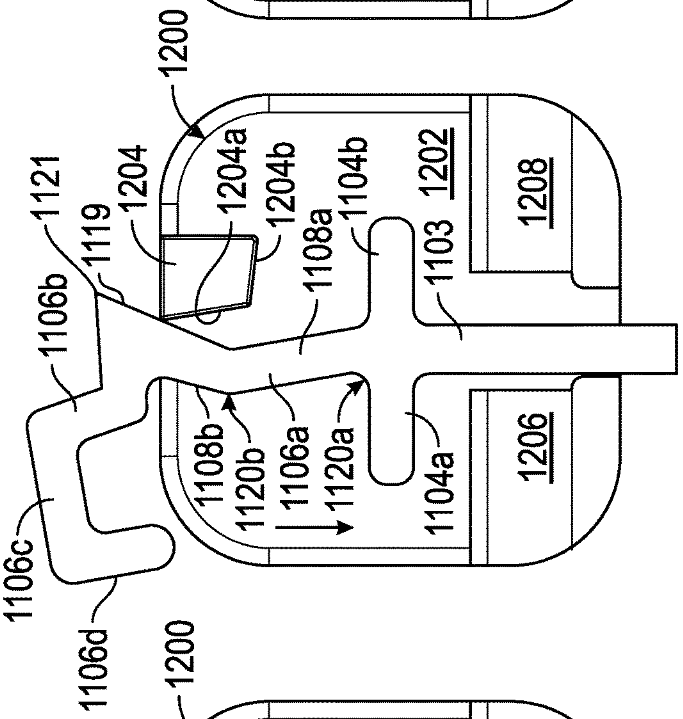
Figure 14A:
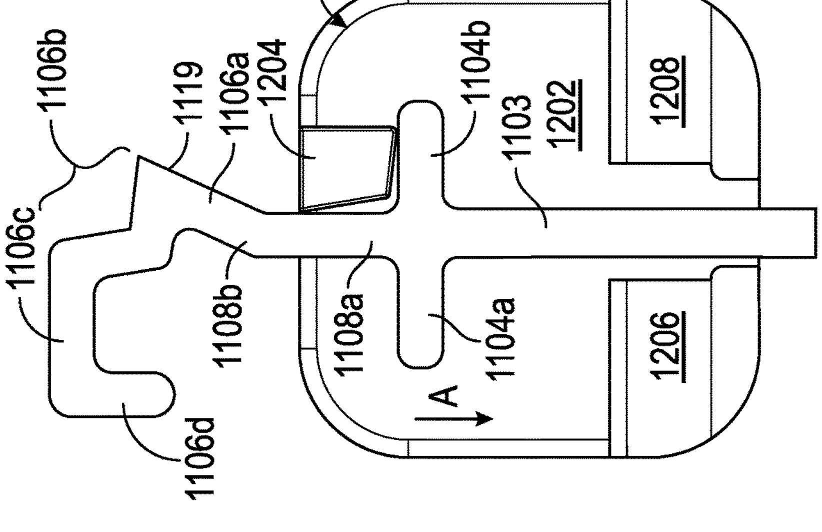

FIGS. 14A-14C illustrate a method for securing the attachment portion 1100 to a securing member 1200. As shown, the connector 1103 or other portion of the appliance continuous with the attachment portion 1100 can be positioned relative to the securing member 1200 such that at least a portion of the head 1102 of the attachment portion 1100 is positioned occlusally of the second and third protrusions 1206, 1208 with the base 1104 between the first protrusion 1204 and the second and third protrusions 1206, 1208. The portion of the connector 1103 connected to the attachment portion 1100 can be positioned within the gap 1220 between the second and third protrusions 1206, 1208 of the securing member 1200. In some embodiments, the backing surface of the attachment portion 1100 (not visible in FIGS. 14A-14C) can be positioned proximate and/or in contact with the backing 1202 of the securing member 1200. As indicated by arrow A, an operator can slide the connector 1103 and head 1102 gingivally such that an exterior surface 1119 of the first arm region 1106*a* engages an occlusal end and/or edge of the first protrusion 1204. As the operator continues to move the head 1102 gingivally, the occlusal end and/or edge of the first protrusion 1204 exerts a lateral (e.g., mesiodistal) force on the second portion 1108*b* of the first arm region 1106*a*. Because the exterior surface 1119 along the second portion 1108*b* faces gingivally and is angled toward the first protrusion 1204 during the securing process, the force applied to the exterior surface 1119 along the second portion 1108*b* forces the first arm region 1106*a* to bend. For example, the first arm region 1106*a* can bend at the first bend 1120*a* and/or second bend 1120*b*. As a result, the exterior surface 1119 of the first arm region 1106*a* slides down along the first surface 1204*a* of the first protrusion 1204 until the corner 1121 (FIG. 14B) between the first arm region 1106*a* and the second arm region 1106*b* of the attachment portion 1100 clears the corner of the first protrusion 1204 between the first and second surfaces 1204*a*, 1204*b*. Once the corner 1121 of the attachment portion 1100 is gingival of the first protrusion corner, the resilient arm 1106 or one or more portions thereof bends back towards its shape in the relaxed state, thereby wedging the attachment portion 1100 between the first, second, and third protrusions 1204, 1206, 1208, as shown in FIG. 14C. Accordingly, one or more regions of the attachment portion 1100 can comprise a flexure 1132 configured to bend and/or otherwise deform to facilitate securing of the attachment portion 1100 to the securing member 1200. The first arm region 1106*a*, for example, can be configured to bend in a first direction to facilitate or enable sliding of the attachment portion 1100 gingivally of the first protrusion 1204 and/or bend in a second, opposite direction to facilitate or enable locking of the attachment portion 1100 to the securing member 1200. In some embodiments, deformation of the flexure 1132 causes one or more portions of the attachment portion 1100 to rotate (e.g., bending of the first arm region 1106*a* can cause the second-fourth arm regions 1106*b*-1106*d* to rotate about the buccolingual dimension).

Figure 15A:
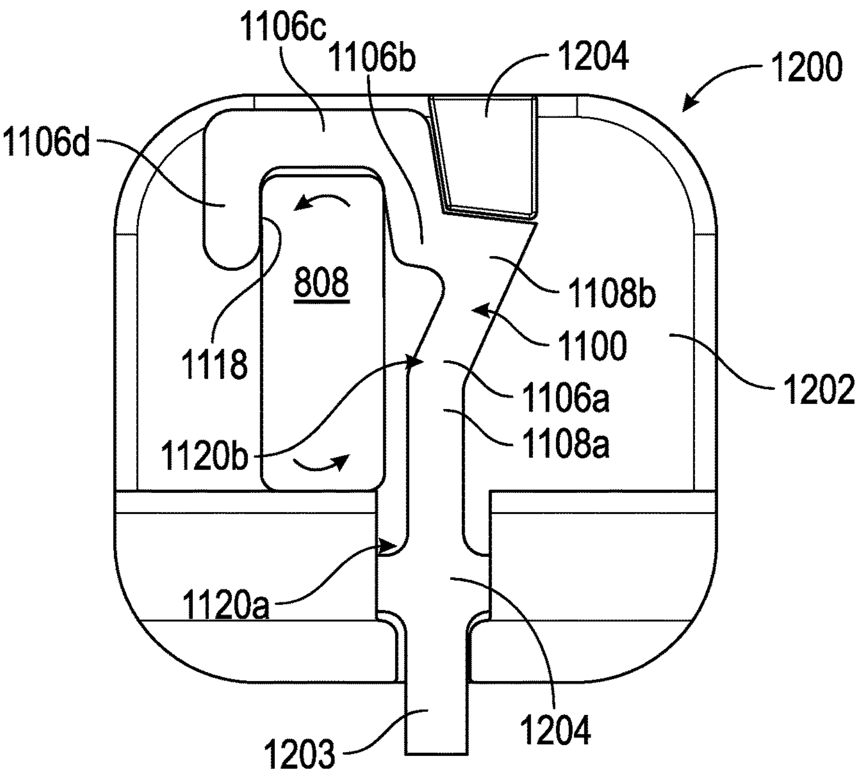
FIGS. 15A and 15B illustrate a method for releasing an attachment portion from a securing member in accordance with several embodiments of the present technology.
Figure 15B:
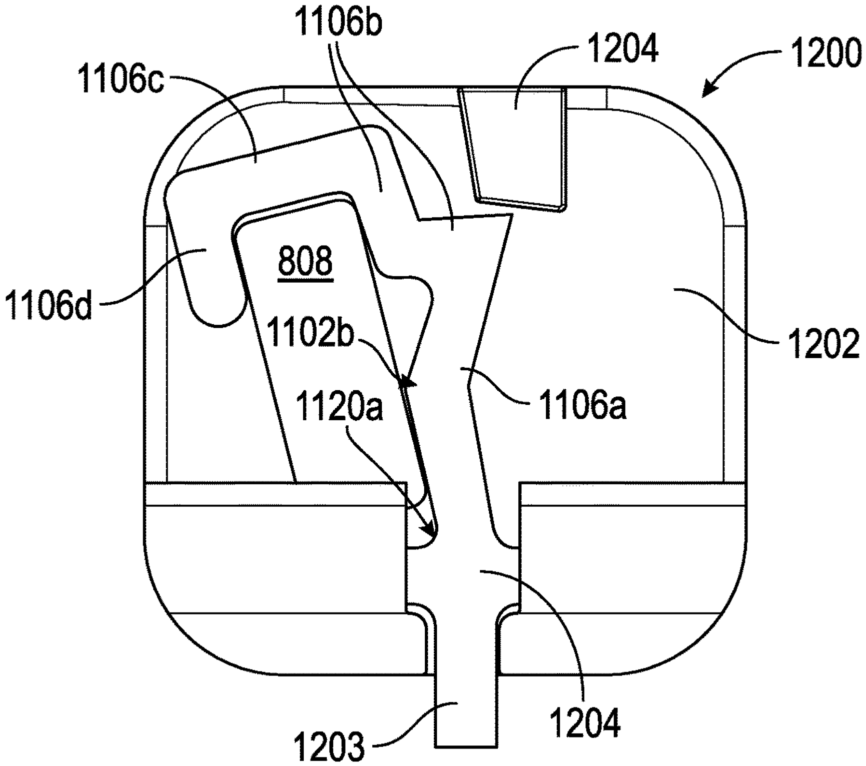

FIGS. 15A and 15B illustrate a method for releasing the attachment portion 1100 from the securing member 1200. As shown, the operator can insert a tool, such as the distal end surface 808 of tool 800, into the interior region of the head 1102 such that an occlusal end of the tool surface 808 is proximate an interior surface 1118 of the arm 1106 along the third arm region 1106*c* and a gingival end of the tool surface 808 is proximate an interior surface 1118 of the elongate member along the base 1104. The operator can rotate the tool about a buccolingual dimension (e.g., rotating surface 808 away from the first protrusion 1204 and/or towards the fourth arm region 1106*d* such that an occlusal portion of the tool surface 808 pushes against the fourth arm region 1106*d* while the gingival portion of the tool surface 808 pushes against the interior surface 1118 along the first arm region 1106*a*. As the tool surface 808 continues to rotate, it forces the second, third, and fourth arm regions 1106*b*, 1106*c*, and 1106*d* to rotate with the tool surface 808, and in some (but not necessarily all) cases forces the second portion 1108*b* of the first arm region 1106*a* to rotate with the tool surface 808. This causes the arm 1106 to bend at the flexure 1132, which can include one or both of the first and second bends 1120*a*, 1120*b*. Because the opposing surfaces 1204*b* and 1114 of the first protrusion 1204 and the arm 1106, respectively, are angled occlusally in the direction of the rotation, the second arm region 1106*b* slides off the first protrusion 1204 with continued rotation of the tool surface 808, thereby releasing the attachment portion 1100 from the securing member 1200. In some embodiments, the attachment portion 1100 can pop or snap free of the securing member 1200 once the first surface 1114 clears the first protrusion 1204. Still using the tool 800, the attachment portion 1100 can be pulled upwardly until the base 1104 clears an occlusal surface of the second and third protrusions 1206, 1208 and can be pulled away from the backing 1202.

The attachment portion 1100 can comprise a leveraging surface 1134 configured to engage a tool (such as tool 800) to facilitate deformation of the attachment portion 1100 and cause the attachment portion 1100 to release from the securing member 1200. In some embodiments, the fourth arm region 1106*d* of the attachment portion 1100 can have the leveraging surface 1134. For example, the interior surface 1118 at the fourth arm region 1106*d* can comprise the leveraging surface 1134. Additionally or alternatively, the third arm region 1106*c*, the second arm region 1106*b*, the first arm region 1106*a*, and/or the base 1104 can have the leveraging surface 1134. In some embodiments, the attachment portion 1100 comprises multiple leveraging surfaces 1134.

As previously described, a feature of the connector 1103 such as a location at which the connector 1103 connects to the head 1102, a dimension along which the connector 1103 extends, a property of the connector 1103, etc. can be at least partially based on a force to be imparted on a tooth to which the attachment portion 1100 is configured to be secured (and/or an intended movement of the tooth) and/or the mechanism by which the attachment portion 1100 is attached and/or detached to the securing member 1200. For example, the attachment portion 1100 is configured to release from the securing member 1200 when the head 1102 (or one or more portions thereof) rotates about a buccolingual dimension away from the first protrusion 1204. Accordingly, the connector 1103 can be connected to the attachment portion 1100 such that the connector 1103 does not apply forces to the head 1102 that tend to rotate the head 1102 in the same direction about the same buccolingual dimension. For example, movement of the fourth arm region 1106*d* of the attachment portion 1100 in response to forces applied by a tool at the leveraging surface 1134 can cause the attachment portion 1100 to release from the securing member 1200. Thus, in some embodiments no connectors attach to the leveraging surface 1134 and/or the fourth arm region 1106*d* so that little to no force is applied to the leveraging surface 1134 and/or the fourth arm region 1106*d* during the normal course of treatment. Because each of the second and third protrusions 1206, 1208 is closed laterally, the base regions 1104*a*, 1104*b* may not connect to a connector 1103.

Figure 16:
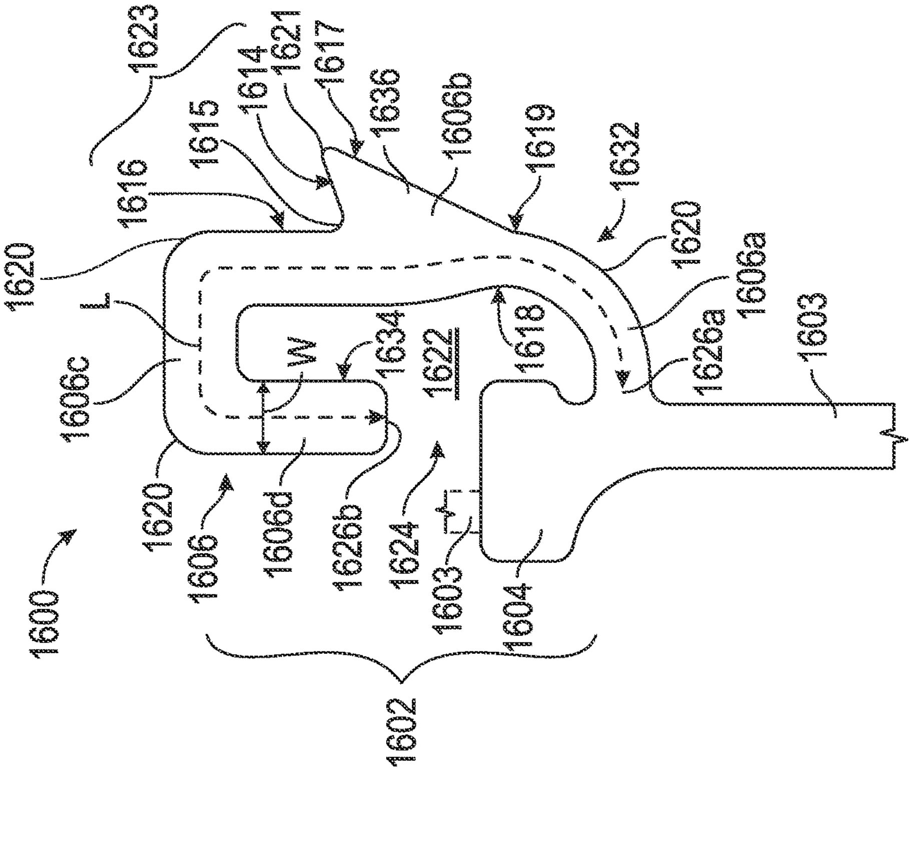
FIG. 16 is a front view of an attachment portion configured in accordance with several embodiments of the present technology.

FIG. 16 shows a planar view of an attachment portion 1600 configured in accordance with several embodiments of the present technology. The attachment portion 1600 can be configured to be secured to a patient's tooth via a securing member, such as securing member 1700 shown in FIG. 17. The attachment portion 1600 and the securing member 1700 are shown in a secured arrangement in FIGS. 18A and 18B. As discussed in greater detail below, the attachment portion 1600 and the securing member 1700 can be configured such that the attachment portion 1600 can be releasably secured to the securing member 1700. The attachment portion 1600 can be continuous with a connector 1603 that connects the attachment portion 1600 to one or more additional portions of an orthodontic appliance (not shown).

Referring to FIG. 16, the attachment portion 1600 can comprise a head 1602. In some embodiments, the attachment portion 1600 comprises a head 1602 and at least a portion of a connector 1603 that is continuous with the head 1602. The connector 1603, for example, can comprise a second connector as previously described herein and/or can extend gingivally away from a gingival portion of the head 1602. The connector 1603 can have features similar to any of the connectors disclosed herein (e.g., first connectors, second connectors, third connectors, etc.) and can comprise a single connector or multiple connectors. For example, the connector 1603 can comprise a single, occlusogingivally extending connector 1603, multiple occlusogingivally extending connectors 1603, one or more occlusogingivally extending connectors 1603 and one or more mesiodistally extending connectors branching off of the one or more occlusogingivally extending connectors 1603 (not shown) and/or the attachment portion (not shown), or one or more mesiodistally extending connectors (and no occlusogingivally extending connectors). Accordingly, the attachment portion 1600 can be connected to a single connector or multiple connectors 1603. As shown schematically in FIG. 16, the connectors 1603 can connect to the head 1602 at a variety of locations. For example, a gingivally extending connector 1603 can connect to a gingival portion of the head 1602 while an occlusally extending connector 1603 can connect to an occlusal portion of a base the head 1602. Any of the connectors 1603 disclosed herein can extend away from the head 1602 along a variety of dimensions (e.g., along an occlusogingival dimension, a mesiodistal dimension, a buccolingual dimension, etc.).

In some embodiments, the head 1602 and the connector 1603 are part of the same, monolithic piece of material (e.g., cut from a sheet of material, a 3D-printed piece, etc.). Thus, the head 1602 and the connector 1603 may refer to different portions of the same continuous component. The attachment portion 1600 can be one portion of a greater orthodontic appliance, or may be formed separately and attached to an orthodontic appliance. The attachment portion 1600 and/or the corresponding appliance can be cut from the same sheet of material and/or may be formed by molding, casting, machining, 3D printing, stamping, extruding, or the like. The attachment portion 1600 may comprise a metal or a plastic and may have superelastic and/or shape memory properties. In some embodiments, the attachment portion 1600 does not have superelastic and/or shape memory properties.

The head 1602 of the attachment portion 1600 can comprise a base 1604 and an arm 1606 extending away from the base 1604. The arm 1606 can be configured to bend and/or rotate relative to the base 1604 while the attachment portion 1600 is being secured to and/or released from the securing member 1700. In some embodiments, the arm 1606 comprises an elongate member having a first end portion 1626*a*, a second end portion 1626*b*, and a longitudinal axis L extending between the first and second end portions 1626*a*, 1626*b*. The base 1604 and the arm 1606 can together partially enclose and define an interior region 1622. The arm 1606 can include a plurality of bends 1620 along its longitudinal axis L that are configured to preferentially flex to facilitate securing and/or release of the attachment portion 1600 to a securing member. As discussed in greater detail herein, the interior region 1622 can be sized to receive a tool configured to release the attachment portion 1600 from a securing member (such as securing member 1700). Additionally or alternatively, the interior region 1622 can be sized to receive a tool to facilitate securing of the attachment portion 1600 to the securing member 1700.

Figure 18B:
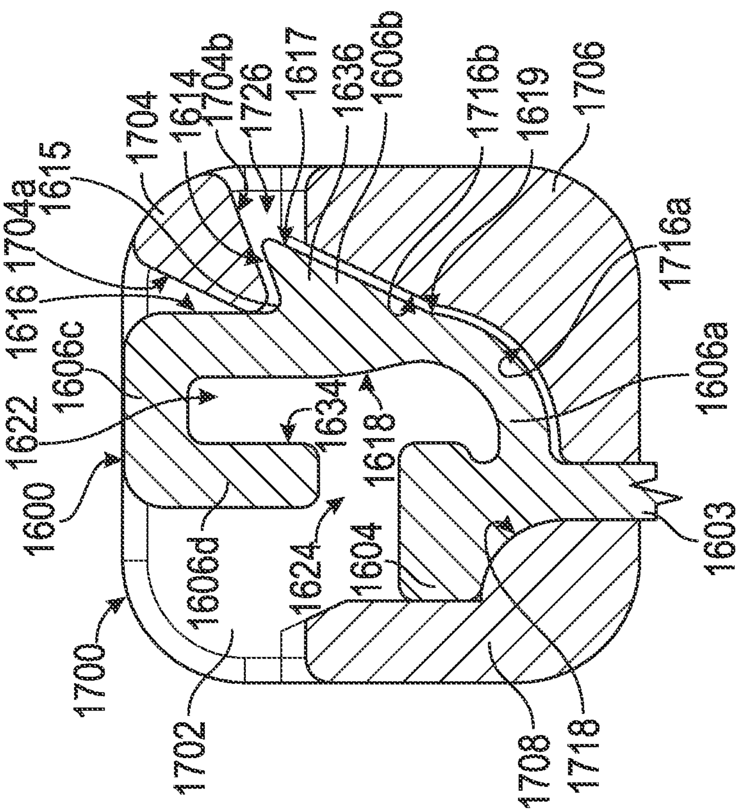
FIGS. 18A and 18B are different views of an attachment portion secured to a securing member in accordance with several embodiments of the present technology.
Figure 18A:
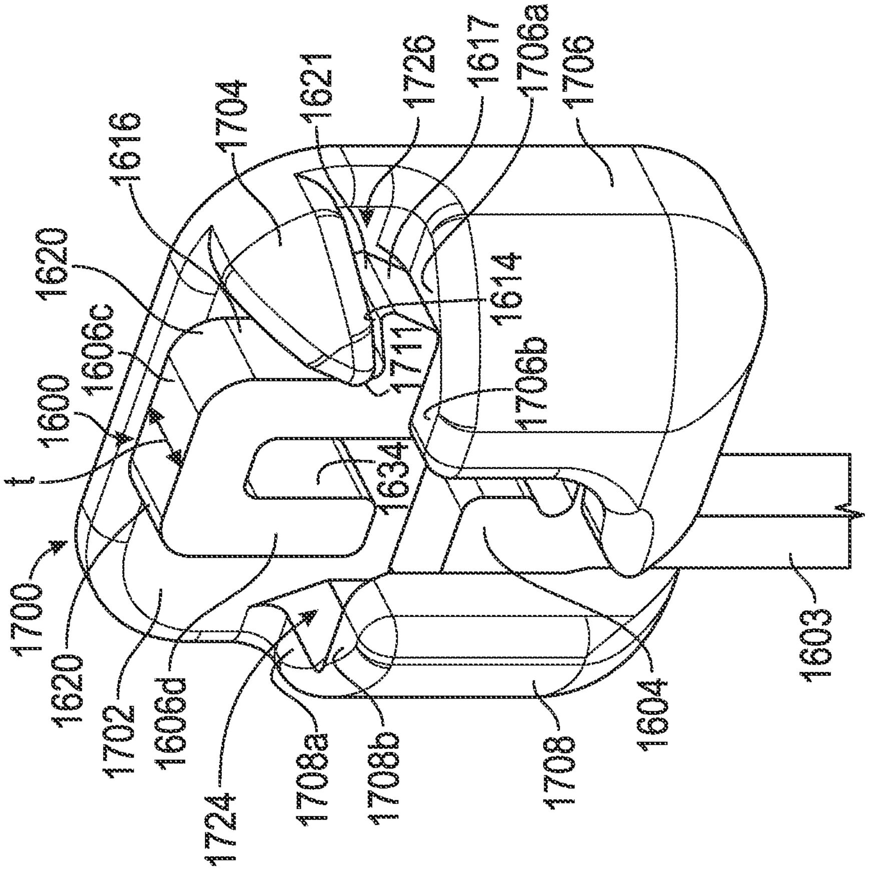

The arm 1606 can extend away from the base 1604 along the occlusogingival dimension, the mesiodistal dimension, and/or the buccolingual dimension. For example, the arm 1606 shown in FIG. 16 extends mesiodistally and occlusally away from the base 1604. At least when the attachment portion 1600 is in a relaxed (unsecured) state (as shown in FIG. 16), the second end portion 1626*b* of the arm 1606 can be spaced apart from the base 1604 along an occlusogingival dimension by a gap 1624 that is continuous with the interior region 1622 of the head 1602. In some embodiments, the second end portion 1626*b* of the arm and the base 1604 can be spaced apart by the gap 1624 even when the attachment portion 1600 is in a compressed (secured) state (for example as shown in FIGS. 18A and 18B). The second end portion 1626*b* and the base 1604 can be spaced apart along an occlusogingival dimension, a mesiodistal dimension, and/or a buccolingual dimension.

The head 1602 of the attachment portion 1600 can have an interior surface 1618 facing the interior region 1622, an exterior surface 1619 facing away from the interior region 1622, and a width w measured between the interior and exterior surfaces 1618, 1619. The head 1602 can also have a front surface (facing out of the page) and a back surface (not visible in FIG. 16), and a thickness t (labeled in FIG. 18A) measured between the front and back surfaces. The base 1604 and/or arm 1606 can have a substantially constant thickness t or may have a varying thickness t. Likewise, the base 1604 and/or arm 1606 can have a substantially constant width w or may have a varying width. A width w and/or thickness t of the base 1604 and/or arm 1606 can be varied to impart a preferred stiffness profile to all or a portion of the base 1604 and/or arm 1606.

As shown in FIG. 16, the base 1604 can be positioned at the first end portion 1626*a* of the arm 1606. The first end portion 1626*a* of the arm 1606 can be continuous with and/or disposed at the base 1604. In some embodiments, the base 1604 is positioned at an occlusal end portion of the connector 1603. The base 1604 can have a width that is smaller at a region of the base 1604 at the first end portion 1626*a* of the arm 1606 and/or the occlusal end portion of the connector 1603 than a width of the base 1604 away from the first end portion 1626*a* of the arm 1606 and/or the occlusal end portion of the connector 1603. The base 1604 can be configured to engage a securing member to facilitate securing of the attachment portion 1600 to the securing member and/or transfer orthodontic force from the connector 1603 to the securing member.

The arm 1606 can include a first arm region 1606*a* extending occlusally and mesially or distally from the base 1604, a second arm region 1606*b* continuous with and extending occlusally away from an end of the first arm region 1606*a*, a third arm region 1606*c* continuous with and extending mesially or distally away from an end of the second arm region 1606*b*, and a fourth arm region 1606*d* continuous with and extending gingivally from an end of the third arm region 1606*c*. In some embodiments, the arm 1606 has more or fewer portions along its longitudinal axis L. In some embodiments, the first arm region 1606*a* is curved. In some embodiments, the first arm region 1606*a* is concave towards the interior region 1622, thereby biasing the arm 1606 to bend at or near the first arm region 1606*a* when a rotational force is applied to the fourth arm region 1606*d* in a direction away from the first arm region 1606*a*.

According to various embodiments, one or more regions of the arm 1606 can include a portion along which the width w of the arm 1606 is greater than along the rest of the arm 1606. For example, as shown in FIG. 16, the arm 1606 can include a protuberance 1636 at an exterior side of the second arm region 1606*b*. Along the protuberance 1636, the exterior surface 1619 of the arm 1606 forms first and second ramped surfaces 1617 and 1614 that meet at a corner 1621. The exterior surface 1619 extends occlusally and away from the longitudinal axis L along the first ramped surface 1617 until turning at the corner 1621 and extending gingivally and toward the longitudinal axis L along the second ramped surface 1614. The second ramped surface 1614 terminates at a corner 1615. The second ramped surface 1614, the corner 1615, and a portion 1616 of the exterior surface 1619 on the other side of the corner 1615 together comprise a shoulder 1623 that is configured to engage a protrusion on a securing member 1700 when the attachment portion 1600 is secured to the securing member 1700 to oppose rotational and/or translational movement of the arm 1606. As described in greater detail below, the first ramped surface 1617 can be configured to force the arm 1606 to bend or rotate (e.g., at the first arm region 1606*a*, etc.) when engaging a protrusion of the securing member 1700 during engagement and/or disengagement.

Figure 17A:
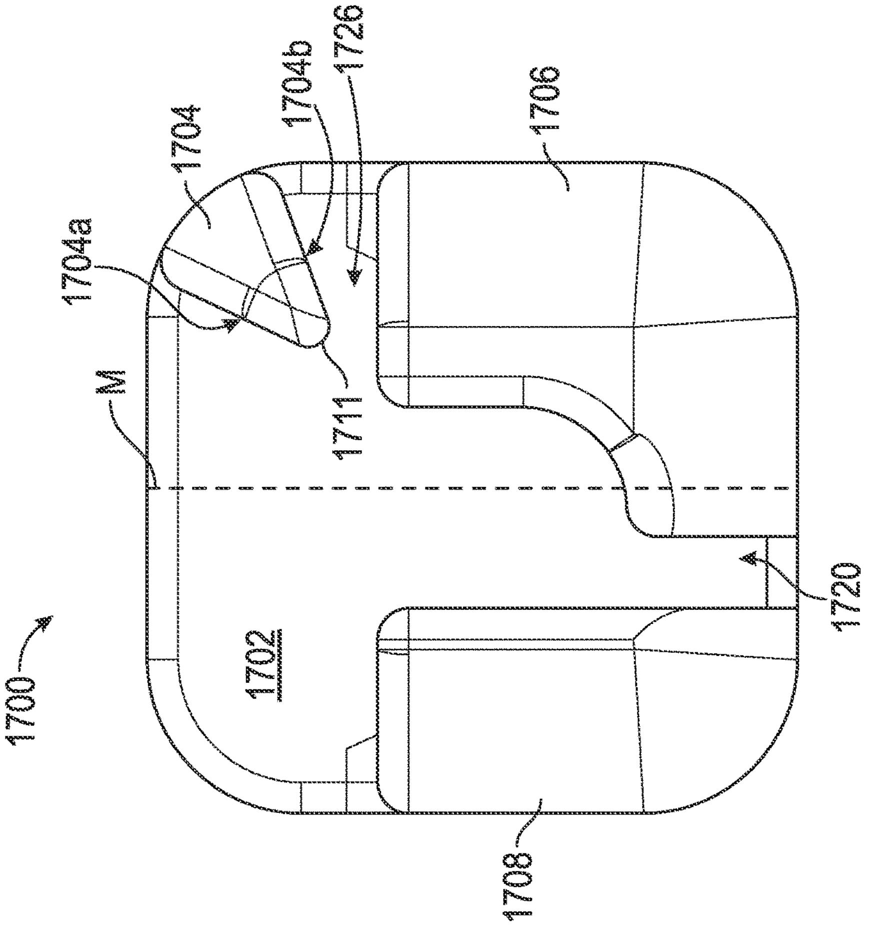
FIG. 17A is a front view of a securing member configured in accordance with several embodiments of the present technology.

FIG. 17 is a front view of the securing member 1700 configured for use with the attachment portion 1600. The securing member 1700 has a first side (facing out of the page) and a second side (not visible in FIG. 17) opposite the first side along a thickness of the securing member 1700 and configured to be bonded to a patient's tooth. The securing member 1700 can comprise a backing 1702 and a plurality of protrusions (e.g., first protrusion 1704, second protrusion 1706, third protrusion 1708, etc.) carried by and extending away from the first side of the backing 1702 along a buccolingual dimension. The protrusions 1704, 1706, 1708 can be configured to engage the attachment portion 1600 to retain the attachment portion 1600 at a specific location relative to the backing 1702 and the patient's tooth.

Figure 17B:
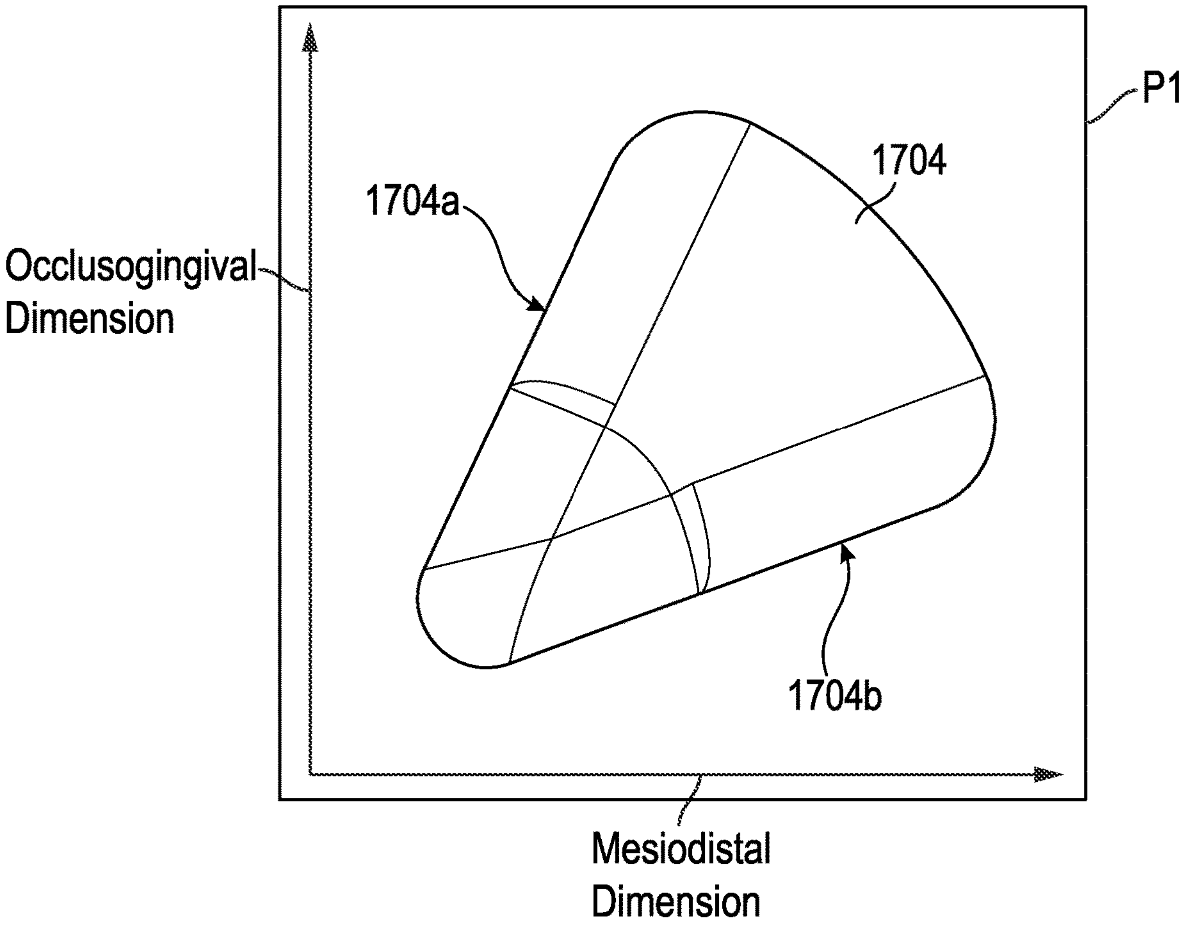
FIG. 17B is an isolated front view of the first protrusion of FIG. 17A.

The first protrusion 1704 can be configured to engage the shoulder 1623 of the arm 1606 of the attachment portion 1600 to prevent or limit motion of the attachment portion 1600 in an occlusal direction and a mesial or distal direction. The first protrusion 1704 can be positioned at an occlusal portion of the backing 1702. In some embodiments, the first protrusion 1704 is positioned to a side of a mesiodistal midline M of the backing 1702. The first protrusion 1704 can be positioned near a perimeter of the backing 1702, for example as shown in FIG. 17, or can be positioned away from the perimeter and towards an intermediate portion of the backing 1702. The first protrusion 1704 can have a first surface 1704*a* and a second surface 1704*b*. In some embodiments, the first surface 1704*a* is angled with respect to the second surface 1704*b*. As shown in FIG. 17B, the first surface 1704*a* can be substantially perpendicular to a first plane P1 in which the occlusogingival dimension and the mesiodistal dimension lie, angled relative to a second plane in which the buccolingual dimension and the mesiodistal dimension lie, and angled relative to a third plane in which the buccolingual dimension and the occlusogingival dimension lie. The first surface 1704*a* can be slanted such that a gingival edge of the first surface 1704*a* is closer to the mesiodistal midline M than an occlusal edge of the first surface 1704*a*. In some embodiments, the second surface 1704*b* can be substantially perpendicular to the first plane P1 in which the occlusogingival dimension and the mesiodistal dimension lie and substantially angled relative to the second plane in which the buccolingual dimension and the mesiodistal dimension lie. In various embodiments, for example as shown in FIG. 17, the second surface 1704*b* can be angled relative to the third plane in which the buccolingual dimension and the occlusogingival dimension lie. The second surface 1704*b* can be slanted surface such that an occlusal edge of the second surface 1704*b* is closer to the mesiodistal midline M than a gingival edge of the second surface 1704*b*. In some embodiments, the mesial edges of the first surface 1704*a* and the second surface 1704*b* are continuous with one another at a corner 1711.

The second protrusion 1706 and/or the third protrusion 1708 can be carried by the backing 1702 at positions opposite the first protrusion 1704 along one or more dimensions. The second protrusion 1706 and/or the third protrusion 1708 can be positioned at a gingival portion of the backing 1702, for example. As shown in FIG. 17, in some embodiments the second protrusion 1706 is spaced apart from the first protrusion 1704 by a gap 1726 along the occlusogingival dimension, and spaced apart from the third protrusion 1708 by a gap 1720 along the mesiodistal dimension. The gap 1720 can be sized to at least partially receive the portion of the connector 1603 connected to the head 1602 of the attachment portion 1600.

As shown in FIG. 17, the second protrusion 1706 can be positioned on the same side of the backing 1702 along the mesiodistal dimension (e.g., on the same side of the mesiodistal midline M) as the first protrusion 1704. As best shown in FIG. 18A, in some embodiments, the second protrusion 1706 has a first region 1706*a* extending lingually (or buccally, depending on which side of the tooth the securing member 1700 is attached) away from the backing 1702. The second protrusion 1706 can also include a second region 1706*b* extending away from the first region 1706*a* towards an intermediate portion of the securing member 1700 and spaced apart from the backing 1702 by a gap along the buccolingual dimension. The gap can have a depth that is slightly greater than a thickness t of the attachment portion 1600 so that the attachment portion 1600 can fit between the second region 1706*b* of the second protrusion 1706 and the backing 1702. The second protrusion 1706 can also include an inner surface 1716 comprising a first portion 1716*a* and a second portion 1716*b* (only visible in FIG. 18B) configured to engage the first arm region 1606*a* and the second arm region 1606*b*, respectively, of the attachment portion 1600 and prevent or limit mesial or distal movement and gingival movement of the first arm region 1606*a*. In some embodiments, the first portion 1716*a* of the inner surface 1716 is curved. For example, the first portion 1716*a* of the inner surface 1716 can have a curvature based on and/or similar to the curvature of the first arm region 1606*a*. In some embodiments, the second portion 1716*b* of the inner surface 1716 is substantially linear and, optionally, can be ramped to substantially conform to the second arm region 1606*b*. The second region 1706*b* of the second protrusion 1706 can include an inner surface (not visible) facing towards the backing 1702 and configured to prevent or limit lingual (or buccal) movement of the first arm region 1606*a*. As such, the second protrusion 1706 prevents or limit movement of the first arm region 1606*a* in at least three directions, for example by functioning as a side, bottom, and front stop.

The third protrusion 1708 can be positioned on the opposite side of the backing 1702 along the mesiodistal dimension from the first protrusion 1704 and/or the second protrusion 1706, or at least spaced apart from the first protrusion 1704 and/or the second protrusion 1706 along a mesiodistal dimension. In some embodiments, the third protrusion 1708 can have a first region 1708*a* extending lingually (or buccally, depending on which side of the tooth the securing member 1700 is attached) away from the backing 1702. The third protrusion 1708 can have a second region 1708*b* extending away from the first region 1708*a* towards an intermediate portion of the securing member 1700 and spaced apart from the backing 1702 by a gap 1724 (see FIG. 18A) along the buccolingual dimension. The gap 1724 can have a depth that is slightly greater than a thickness t of the attachment portion 1600 so that the attachment portion 1600 can fit between the second region 1708*b* and the backing 1702. In some embodiments, the depth of the gap 1724 can be similar to the depth of the gap. In contrast to the third protrusion 508 of the securing member 500 shown in FIG. 5, the third protrusion 1708 of the securing member 1700 of FIGS. 17, 18A and 18B can include an inner surface 1718 (FIG. 18B) configured to engage the base 1604 of the attachment portion 1600 and prevent or limit movement of the base 1604 mesially or distally, gingivally, and lingually or buccally. The third protrusion 1708 can also include an inner surface (not visible) facing towards the backing 1702 and configured to prevent or limit lingual (or buccal) movement of the base 1604. As noted above with respect to the second protrusion 1706, the inner surface 1718 of the third protrusion 1708 can have a curvature based on and/or similar to a curvature of the exterior surface 1619 of the portions of the base 1604 configured to engage the inner surface 1718.

Referring to FIGS. 18A and 18B, in the secured state, the attachment portion 1600 can be positioned proximate and/or against the backing 1702 of the securing member 1700 and bound between the first, second, and third protrusions 1704, 1706, 1708. The connector 1603 can be positioned between the second protrusion 1706 and the third protrusion 1708 (e.g., within the gap 1720). Additionally or alternatively, the base 1604 of the head 1602 can be positioned buccolingually between the third protrusion 1708 and the backing 1702 (e.g., within the gap 1724) and the first arm region 1606*a* and a portion of the second arm region 1606*b* can be positioned buccolingually between the second protrusion 1706 and the backing 1702 (e.g., within the gap). In the secured state, the protuberance 1636 can be positioned occlusogingivally between the first protrusion 1704 and the second protrusion 1706 (e.g., within gap 1726).

The attachment portion 1600 can comprise a resilient and/or superelastic material such that, when the attachment portion 1600 is braced between the first, second, and third protrusions 1704, 1706, 1708, the attachment portion 1600 actively exerts an outward force on the surrounding surfaces. For example, the second ramped surface 1614 of the protuberance 1636 of the attachment portion 1600 can engage the gingivally-facing second surface 1704*b* of the first protrusion 1704 of the securing member 1700. The portion 1616 of the exterior surface 1619 can abut and press mesially or distally against the first surface 1704*a* and/or the corner 1711 of the first protrusion 1704 of the securing member 1700. The exterior surface 1619 of the head 1602 along the first arm region 1606*a* can abut and press mesially or distally and gingivally against the inner surface 1716 of the second protrusion 1706 of the securing member 1700. In some embodiments, the exterior surface 1619 of the head 1602 along the first arm region 1606*a* does not abut the inner surface 1716 of the second protrusion 1706 of the securing member 1700 in the secured state. Such a configuration can provide room for the first arm region 1606*a* and any other regions comprising the flexure 1632 (discussed below) to deform while releasing the attachment portion 1600 from the securing member 1700. The exterior surface 1619 of the head 1602 along the base 1604 can abut and press gingivally and mesially or distally against the inner surface 1718 of the third protrusion 1708 of the securing member 1700. Accordingly, the aforementioned surfaces of the attachment portion 1600 and the securing member 1700 that are configured to engage one another when the attachment portion 1600 is in the secured position can comprise securing surfaces.

In the secured position, the attachment portion 1600 is releasably secured to the securing member 1700 such that it cannot be inadvertently displaced or prematurely or inadvertently released by typical patient activity (such as chewing). The attachment portion 1600 (or one or more portions thereof) can be configured to press outwardly on the securing member 1700 when in the secured position. The active and/or continuous outward force exerted by the attachment portion 1600 on the securing member 1700 advantageously eliminates or reduces play between the attachment portion 1600 and securing member 1700 along a mesiodistal dimension, an occlusogingival dimension, and/or a buccolingual dimension, thus providing a more accurate and efficient transfer of force from the appliance to the tooth. In some embodiments, the attachment portion 1600 (or one or more portions thereof) does not chronically press outwardly on the securing member 1700 and is instead configured to engage the securing member 1700 if the attachment portion 1600 moves into contact with and/or moves such that it exerts a force on one or more portions of the securing member 1700. Thus, the securing member 1700 can be configured to limit movement of the attachment portion 1600 relative to the securing member 1700. In some embodiments, one or more of the securing surfaces is configured for transferring orthodontic force between the attachment portion 1600 (e.g., to and/or from the connector 1603, to and/or from the rest of the appliance, etc.) and the securing member 1700 (e.g., to and/or from the tooth, etc.). In various embodiments, one or more of the securing surfaces does not substantially transfer orthodontic force between the attachment portion 1600 and the securing member 1700.

The attachment portion 1600 of FIGS. 16, 18A and 18B can be secured to the securing member 1700 by positioning the attachment portion 1600 proximate the securing member 1700 and moving the attachment portion 1600 along an occlusogingival path. The connector 1603 or other portion of the appliance continuous with the head 1602 of the attachment portion 1600 can be positioned relative to the securing member 1700 such that at least a portion of the head 1602 is positioned occlusally of the first protrusion 1704 of the securing member 1700 and/or at, near, and/or occlusally of an occlusal edge of the backing 1702. The portion of the connector 1603 connected to the head 1602 can be positioned within the mesiodistal gap 1720 between the second and third protrusions 1706, 1708 of the securing member 1700. In some embodiments, the back surface of the attachment portion 1600 can be positioned proximate and/or in contact with the backing 1702 of the securing member 1700. In some embodiments, the operator slides the connector 1603 and head 1602 occlusogingivally by positioning a tool (e.g., tool 800) within the interior region 1622 and moving the tool occlusogingivally. The tool 800 can contact the first arm region 1606*a*, the base 1604, and/or the junction between the first arm region 1606*a*, the base 1604, and the connector 1603 when sliding the tool 800 gingivally within the interior region 1622. In any case, continued gingival movement of the connector 1603 and/or head 1602 forces the first ramped surface 1617 at the protuberance 1636 into contact with the corner 1711 of the first protrusion 1704. Because the exterior surface 1619 of the attachment portion 1600 along the ramped surface 1617 faces gingivally and is angled toward the first protrusion 1704 during the securing process, the occlusally-oriented force applied to the exterior surface 1619 along the ramped surface 1617 when the ramped surface 1617 contacts the first protrusion 1704 forces the first arm region 1606*a* to bend. Once the corner 1621 of the attachment portion 1600 between the first ramped surface 1617 and the second ramped surface 1614 of the shoulder 1623 is positioned gingival of the corner 1711 of the first protrusion 1704, the resilient arm 1606 and/or one or more portions thereof (e.g., the first arm region 1606*a*, etc.) bends back towards its shape in the relaxed state, thereby wedging the attachment portion 1600 between the first, second, and third protrusions 1704, 1706, 1708, as shown in FIGS. 18A and 18B. Accordingly, one or more regions of the attachment portion 1600 can comprise a flexure 1632 configured to bend and/or otherwise deform to facilitate securing of the attachment portion 1600 to the securing member 1700. In some embodiments, the flexure 1632 comprises the first arm region 1606*a*. The first arm region 1606*a*, for example, can be configured to bend in a first direction to facilitate or enable sliding of the attachment portion 1600 gingivally of the first protrusion 1704 to secure to the securing member 1700 and/or the first arm region 1606*a* can be configured to bend in a second, opposite direction to facilitate or enable locking of the attachment portion 1600 to the securing member 1700. In some embodiments, deformation of the flexure 1632 causes one or more portions of the attachment portion 1600 to rotate (e.g., bending of the first arm region 1606*a* can cause the second-fourth arm regions 1606*b*-1606*d* to rotate about the buccolingual dimension). Moreover, the flexure 1632 can comprise other regions of the attachment portion 1600 in addition to or instead of the first arm region 1606*a* including, but not limited to, the second arm region 1606*b*, the third arm region 1606*c*, the fourth arm region 1606*d*, one or more of the bends 1620, the base 1604, etc.

To release the attachment portion 1600 from the securing member 1700, the attachment portion 1600 can be configured to deform and/or rotate relative to the securing member 1700. For example, an operator can insert a tool, such as the distal end surface 808 of tool 800, into the interior region 1622 of the head 1602. An occlusal end of the tool surface can be positioned proximate the interior surface 1618 of the head 1602 along the third arm region 1606*c* and a gingival end of the tool surface can be positioned proximate the interior surface 1618 of the head 1602 along the first arm region 1606*a*. The operator can rotate the tool about a buccolingual dimension (e.g., rotating the tool surface away from the first protrusion 1704 and/or towards the fourth arm region 1606*d*, etc.) such that an occlusal portion of the tool surface engages and pushes against the fourth arm region 1606*d* while the gingival portion of the tool surface slides up the curved interior surface along the first arm region 1606*a*. When the gingival portion of the tool surface can no longer slide occlusally along the interior surface 1618, for example when reaching the protuberance 1636, the occlusal portion of the tool surface has good and/or maximum leverage against the fourth arm region 1606*d*. The tool can displace the fourth arm region 1604*d* and thereby force the second and third arm regions 1606*b* and 1606*c* to rotate with the tool surface. This causes the arm 1606 to bend at the flexure 1632, which can include the first arm region 1606*a*. The arm 1606 can bend such that the second ramped surface 1614 slides gingivally and mesiodistally along the second surface 1704*b* of the first protrusion 1704 and away from the first protrusion 1704 to release the attachment portion 1600 from the securing member 1700. In some embodiments, the attachment portion 1600 can pop or snap free of the securing member 1700 once the second ramped surface 1614 clears the first protrusion 1704. With or without the tool, the attachment portion 1600 can be moved occlusally until the wider gingival region of the head 1602 clears an occlusal surface of the second and third protrusions 1706, 1708, at which point the attachment portion 1600 can be pulled away from the backing 1702 along the buccolingual dimension.

The attachment portion 1600 can comprise a leveraging surface 1634 configured to engage a tool to facilitate deformation of the attachment portion 1600 to cause the attachment portion 1600 to release from the securing member 1700. In some embodiments, the fourth arm region 1606*d* of the attachment portion 1600 of FIGS. 16, 18A and 18B can have the leveraging surface 1634. Additionally or alternatively, the third arm region 1606*c*, the second arm region 1606*b*, the first arm region 1606*a*, and/or the base 1604 can have the leveraging surface 1634. In some embodiments, the attachment portion 1600 comprises multiple leveraging surfaces 1634.

The location at which the connector 1603 connects to the head 1602, a dimension along which the connector 1603 extends, a property of the connector 1603, etc. can be at least partially based on a force to be imparted on a tooth to which the attachment portion 1600 is configured to be secured (and/or an intended movement of the tooth). For example, as previously noted, the attachment portion 1600 can be configured to release from the securing member 1700 when the second ramped surface 1614 slides gingivally along the second surface 1704*b* of the first protrusion 1704 and/or mesiodistally away from the first protrusion 1704 (e.g., when the head 1602 rotates about the buccolingual dimension). Thus, to avoid any movement of a connector 1603 causing sliding of the second ramped surface 1614 relative to the second surface 1704*b* during treatment, the connector 1603 can connect to a portion of the attachment portion 1600 away from the arm 1606, and in particular in a location that would not cause movement of the arm 1606 in any way that is biased towards disengagement from the securing member 1700. In some cases, for example as shown in FIG. 16, the connector 1603 is continuous with the base 1604 of the head 1602 but not the arm 1606. Such a configuration can prevent or limit the connector 1603 from applying forces to the arm 1606 that inadvertently cause the flexure 1632 to deform during orthodontic treatment. Movement of the fourth arm region 1606*d* of the attachment portion 1600 in response to forces applied to the fourth arm region 1606*d* by a tool at the leveraging surface 1634 can cause the attachment portion 1600 to release from the securing member 1700. Accordingly, in some embodiments no connectors attach to the leveraging surface 1634 and/or the fourth arm region 1606*d* so that little to no force is applied to the leveraging surface 1634 and/or the fourth arm region 1606*d* during the normal course of treatment. Moreover, because each of the inner surfaces 1716, 1718 of the second and third protrusions 1706, 1708 is closed either mesially or distally (e.g., opposite the mesiodistal gap 1720), the head 1602 may not be configured to connect to any connectors at the base 1604 or the first arm region 1606*a* if such connectors would extend mesiodistally away from the base 1604 or the first arm region 1606*a*, respectively. However, as shown schematically in FIG. 16, a connector 1603 can connect to the base 1604 if the connector extends occlusally away from the base 1604 to clear the second protrusion 1706 before extending mesiodistally. The location at which the connector 1603 connects to the head 1602, a dimension along which the connector 1603 extends, a property of the connector 1603, etc. can at least partially be based on the mechanism by which the attachment portion 1600 is attached and/or detached to the securing member 1700 and/or the geometry of the securing member 1700.

Figure 19:
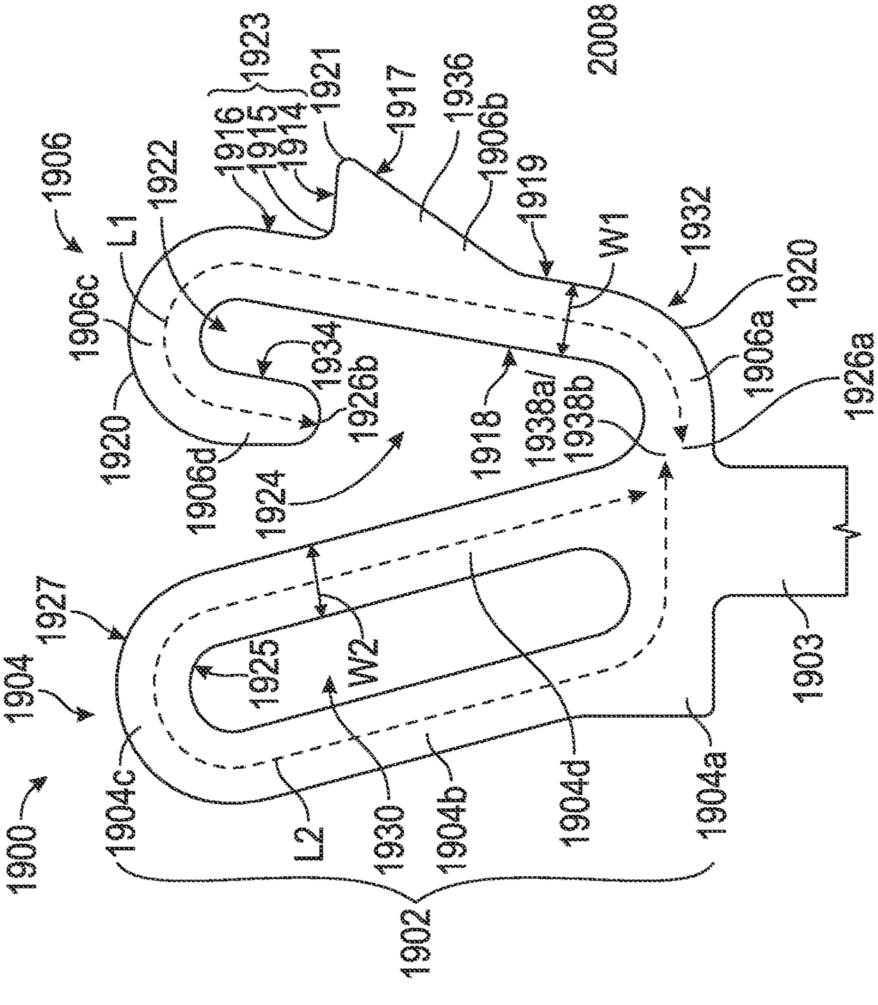
FIG. 19 is a front view of an attachment portion configured in accordance with several embodiments of the present technology.

FIG. 19 shows a planar view of an attachment portion 1900 configured in accordance with several embodiments of the present technology. The attachment portion 1900 can be configured to be secured to a patient's tooth via a securing member, such as securing member 2000 shown in FIG. 20. The attachment portion 1900 and the securing member 2000 are shown in a secured arrangement in FIGS. 21A and 21B. As discussed in greater detail below, the attachment portion 1900 and the securing member 2000 can be configured such that the attachment portion 1900 can be releasably secured to the securing member 2000. The attachment portion 1900 can be continuous with a connector 1903 that connects the attachment portion 1900 to one or more additional portions of an orthodontic appliance (not shown).

Referring to FIG. 19, the attachment portion 1900 can comprise a head 1902. In some embodiments, the attachment portion 1900 comprises a head 1902 and at least a portion of a connector 1903 that is continuous with the head 1902. The connector 1903, for example, can comprise a second connector as previously described herein and/or can extend gingivally away from a gingival portion of the head 1902. The connector 1903 can have features similar to any of the connectors disclosed herein (e.g., first connectors, second connectors, third connectors, etc.) and can comprise a single connector or multiple connectors. For example, the connector 1903 can comprise a single, occlusogingivally extending connector, multiple occlusogingivally extending connectors (not shown), one or more occlusogingivally extending connectors and one or more mesiodistally extending connectors branching off of the one or more occlusogingivally extending connectors and/or the attachment portion, or one or more mesiodistally extending connectors (and no occlusogingivally extending connectors). Accordingly, the attachment portion 1900 can be connected to a single connector or multiple connectors 1903. The connector(s) 1903 can connect to the head 1902 at a variety of locations. For example, a gingivally extending connector 1903 can connect to a gingival portion of the head 1902. Any of the connectors 1903 disclosed herein can extend away from the head 1902 along a variety of dimensions (e.g., along an occlusogingival dimension, a mesiodistal dimension, a buccolingual dimension, etc.).

In some embodiments, the head 1902 and the connector 1903 are part of the same, monolithic piece of material (e.g., cut from a sheet of material, a 3D-printed piece, etc.). Thus, the head 1902 and the connector 1903 may refer to different portions of the same continuous component. The attachment portion 1900 can be one portion of a greater orthodontic appliance, or may be formed separately and attached to an orthodontic appliance. The attachment portion 1900 and/or the corresponding appliance can be cut from the same sheet of material and/or may be formed by molding, casting, machining, 3D printing, stamping, extruding, or the like. The attachment portion 1900 may comprise a metal or a plastic and may have superelastic and/or shape memory properties. In some embodiments, the attachment portion 1900 does not have superelastic and/or shape memory properties.

The head 1902 of the attachment portion 1900 can comprise a base 1904 and an arm 1906 extending away from the base 1904. The arm 1906 can be configured to bend and/or rotate relative to the base 1904 while the attachment portion 1900 is being secured to and/or released from the securing member 2000. In some embodiments, the arm 1906 comprises an elongate member having a first end portion 1926*a*, a second end portion 1926*b*, and a longitudinal axis L1 extending between the first and second end portions 1926*a*, 1926*b*. The arm 1906 can partially enclose and define an interior region 1922. The arm 1906 can include a plurality of bends 1920 along its longitudinal axis L1 that are configured to preferentially flex to facilitate securing and/or release of the attachment portion 1900 to a securing member. As discussed in greater detail herein, the interior region 1922 can be sized to receive a tool configured to release the attachment portion 1900 from a securing member (such as securing member 2000). Additionally or alternatively, the interior region 1922 can be sized to receive a tool to facilitate securing of the attachment portion 1900 to the securing member 2000. As shown in FIG. 19, in some embodiments the base 1904 comprises an elongate member having a first end portion 1938*a*, a second end portion 1938*b*, and a longitudinal axis L2 extending between the first and second end portions 1938*a*, 1938*b*. In some embodiments, the base 1904 at least partially encloses and defines an opening 1930. The opening can be sized to receive a tool to facilitate securing of the attachment portion 1900 to the securing member 2000.

The head 1902 can have a front surface (facing out of the page) and a back surface (not visible in FIG. 19), and a thickness t (labeled in FIG. 21A) measured between the front and back surfaces. The arm 1906 of the attachment portion 1900 can have an interior surface 1918 facing the interior region 1922, an exterior surface 1919 facing away from the interior region 1922, and a width w1 measured between the interior and exterior surfaces 1918, 1919. The base 1904 can have an interior surface 1925 facing the opening 1930, an exterior surface 1927 facing away from the opening 1930, and a width w2 measured between the interior and exterior surfaces 1925, 1927. The base 1904 and/or arm 1906 can have a substantially constant thickness or may have a varying thickness. Likewise, the base 1904 and/or arm 1906 can have a substantially constant width or may have a varying width. A width and/or thickness of the base 1904 and/or arm 1906 can be varied to impart a preferred stiffness profile to all or a portion of the base 1904 and/or arm 1906.

The base 1904 can include a first base region 1904*a* extending away from the first end portion 1938*a* along a generally mesiodistal dimension, a second base region 1904*b* continuous with and extending away from an end of the first base region 1904*a* along a generally occlusal direction, a third base region 1904*c* continuous with and extending away from an end of the second base region 1904*b* along a generally mesiodistal dimension, and a fourth base region 1904*d* continuous with and extending away from an end of the third base region 1904*c* along a generally gingival direction to the second end portion 1938*b*. In some embodiments, the base 1904 has more or fewer portions along its longitudinal axis L2.

Figure 21B:
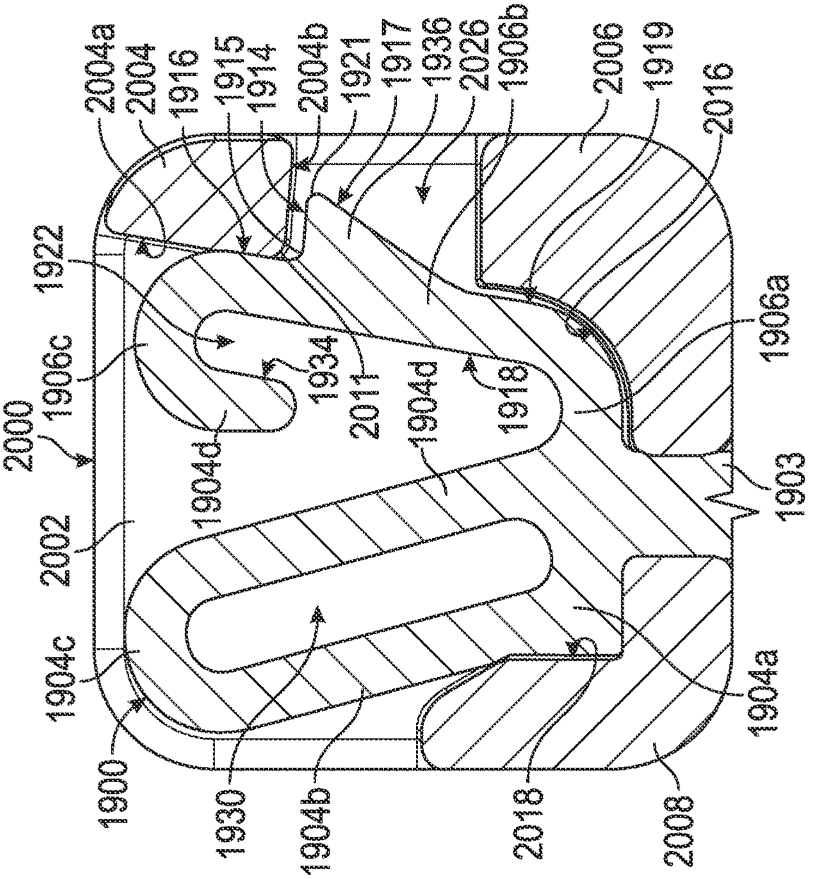
FIGS. 21A and 21B are different views of an attachment portion secured to a securing member in accordance with several embodiments of the present technology.
Figure 21A:
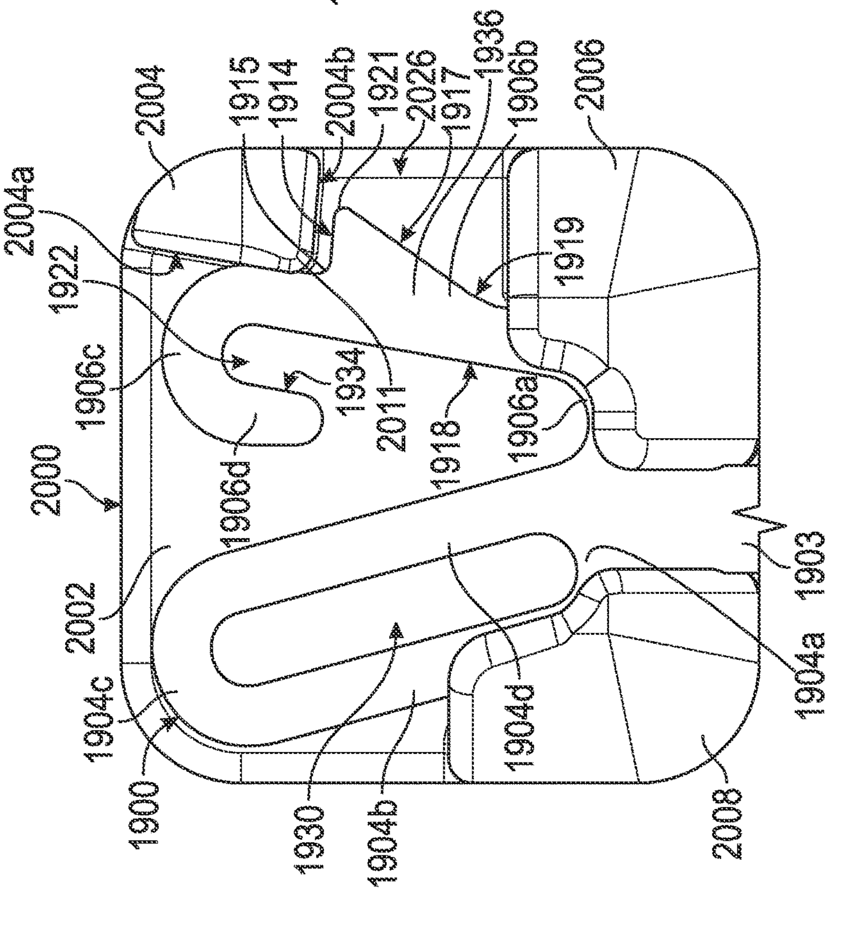

The arm 1906 can extend away from the base 1904 along the occlusogingival dimension, the mesiodistal dimension, and/or the buccolingual dimension. For example, the arm 1906 shown in FIG. 19 extends mesiodistally and occlusally away from the base 1904. In some embodiments, the first end portion 1926*a* of the arm 1906 is continuous with and/or disposed at the first end portion 1938*a* of the base 1904 and/or the second end portion 1938*b* of the base 1904. At least when the attachment portion 1900 is in a relaxed (unsecured) state (as shown in FIG. 19), the second end portion 1926*b* of the arm 1906 can be spaced apart from the first end portion 1926*a* of the arm 1906 along an occlusogingival dimension by a gap 1924 that is continuous with the interior region 1922. In some embodiments, the second end portion 1926*b* of the arm 1906 and the first end portion 1926*a* of the arm 1906 can be spaced apart by the gap 1924 even when the attachment portion 1900 is in a compressed (secured) state (for example as shown in FIGS. 21A and 21B). The second end portion 1926*b* and the first end portion 1926*a* of the arm 1906 can be spaced apart along an occlusogingival dimension, a mesiodistal dimension, and/or a buccolingual dimension.

The arm 1906 can include a first arm region 1906*a* extending occlusally and mesially or distally away from the first end portion 1926*a* of the arm 1906, a second arm region 1906*b* continuous with and extending occlusally away from an end of the first arm region 1906*a*, a third arm region 1906*c* continuous with and extending mesially or distally away from an end of the second arm region 1906*b*, and a fourth arm region 1906*d* continuous with and extending gingivally from an end of the third arm region 1906*c*. In some embodiments, the arm 1906 has more or fewer portions along its longitudinal axis L1. In some embodiments, the first arm region 1906*a* is curved. In some embodiments, the first arm region 1906*a* is concave towards the interior region 1922, thereby biasing the arm 1906 to bend at or near the first arm region 1906*a* when a rotational force is applied to the fourth arm region 1906*d* in a direction away from the first arm region 1906*a*.

According to various embodiments, one or more regions of the arm 1906 can include a portion along which the width w of the arm 1906 is greater than along the rest of the arm 1906. For example, as shown in FIG. 19, the arm 1906 can include a protuberance 1936 at an exterior side of the second arm region 1906*b*. Along the protuberance 1936, the exterior surface 1919 of the arm 1906 forms first and second ramped surfaces 1917 and 1914 that meet at a corner 1921. The exterior surface 1919 extends occlusally and away from the longitudinal axis L1 along the first ramped surface 1917 until turning at the corner 1921 and extending gingivally and toward the longitudinal axis L1 along the second ramped surface 1914. The second ramped surface 1914 terminates at a corner 1915. The second ramped surface 1914, the corner 1915, and a portion 1916 of the exterior surface 1919 on the other side of the corner 1915 together comprise a shoulder 1923 that is configured to engage a protrusion on a securing member 2000 when the attachment portion 1900 is secured to the securing member 2000 to oppose rotational and/or translational movement of the arm 1906. As described in greater detail below, the first ramped surface 1917 can be configured to force the arm 1906 to bend or rotate (e.g., at the first arm region 1906*a*, etc.) when engaging a protrusion of the securing member 2000 during engagement and/or disengagement.

Figure 20:
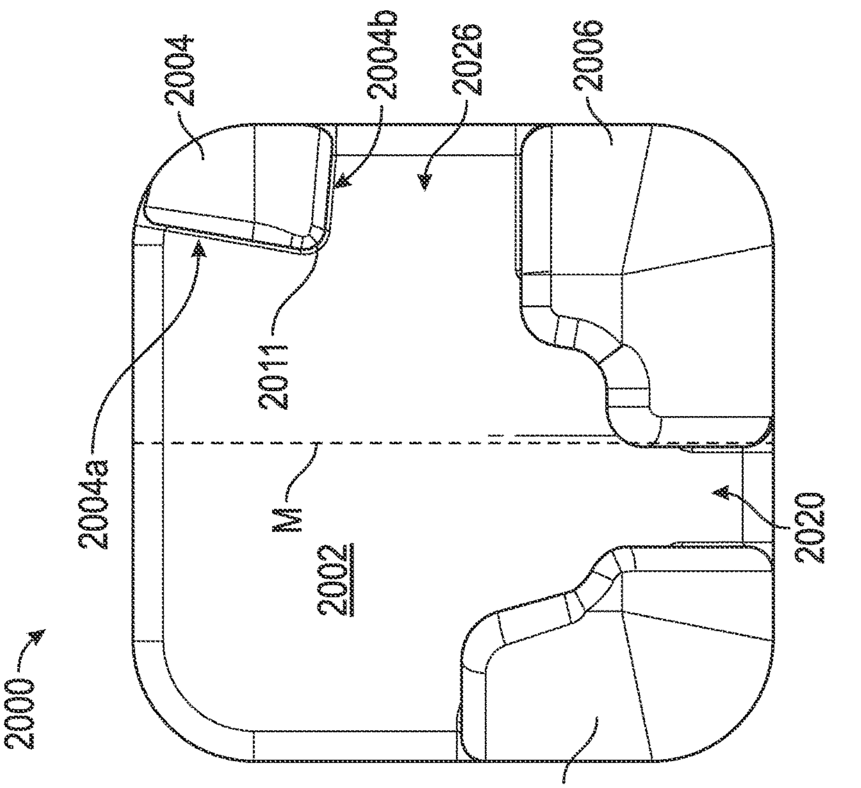
FIG. 20 is a front view of a securing member configured in accordance with several embodiments of the present technology.

FIG. 20 is a front view of the securing member 2000 configured for use with the attachment portion 1900. The securing member 2000 has a first side (facing out of the page) and a second side (not visible in FIG. 20) opposite the first side along a thickness of the securing member 2000 and configured to be bonded to a patient's tooth. The securing member 2000 can comprise a backing 2002 and a plurality of protrusions (e.g., first protrusion 2004, second protrusion 2006, third protrusion 2008, etc.) carried by and extending away from the first side of the backing 2002 along a buccolingual dimension. The protrusions 2004, 2006, 2008 can be configured to engage the attachment portion 1900 to retain the attachment portion 1900 at a specific location relative to the backing 2002 and the patient's tooth.

The first protrusion 2004 can be configured to engage the shoulder 1923 of the arm 1906 of the attachment portion 1900 to prevent or limit motion of the attachment portion 1900 in an occlusal direction and a mesial or distal direction. The first protrusion 2004 can be positioned at an occlusal portion of the backing 2002. In some embodiments, the first protrusion 2004 is positioned to a side of a mesiodistal midline M of the backing 2002. The first protrusion 2004 can be positioned near a perimeter of the backing 2002, for example as shown in FIG. 20, or can be positioned away from the perimeter and towards an intermediate portion of the backing 2002. The first protrusion 2004 can have a first surface 2004*a* and a second surface 2004*b*. In some embodiments, the first surface 2004*a* is angled with respect to the second surface 2004*b*. The first surface 2004*a* can face mesially or distally and extend along an occlusogingival dimension. In some embodiments, the first surface 2004*a* can be substantially perpendicular to a first plane in which the occlusogingival dimension and the mesiodistal dimension lie, angled relative to a second plane in which the buccolingual dimension and the mesiodistal dimension lie, and substantially parallel (or only slightly angled) to a third plane in which the buccolingual dimension and the occlusogingival dimension lie. The first surface 2004*a* can be slanted such that a gingival edge of the first surface 2004*a* is closer to the mesiodistal midline M than an occlusal edge of the first surface 2004*a*. Alternatively, the gingival and occlusal edges of the first surface 2004*a* can be substantially mesiodistally aligned (e.g., the first surface 2004*a* is substantially perpendicular to the second plane). In some embodiments, the second surface 2004*b* can be substantially perpendicular to the first plane in which the occlusogingival dimension and the mesiodistal dimension lie, substantially parallel (or only slightly angled) to the second plane in which the buccolingual dimension and the mesiodistal dimension lie, and angled relative to the third plane in which the buccolingual dimension and the occlusogingival dimension lie. The second surface 2004*b* can be slanted such that a mesial edge of the second surface 2004*b* is more occlusal or gingival than a distal edge of the second surface 2004*b*. Alternatively, the mesial and distal edges of the second surface 2004*b* can be substantially occlusogingivally aligned (e.g., the second surface 2004*b* is substantially perpendicular to the third plane). In some embodiments, the mesial edges of the first surface 2004*a* and the second surface 2004*b* are continuous with one another at a corner 2011.

The second protrusion 2006 and/or the third protrusion 2008 can be carried by the backing 2002 at positions opposite the first protrusion 2004 along one or more dimensions. The second protrusion 2006 and/or the third protrusion 2008 can be positioned at a gingival portion of the backing 2002, for example. As shown in FIG. 20, in some embodiments the second protrusion 2006 is spaced apart from the first protrusion 2004 by a gap 2026 along the occlusogingival dimension, and spaced apart from the third protrusion 2008 by a gap 2020 along the mesiodistal dimension. The gap 2020 can be sized to at least partially receive the portion of the connector 1903 connected to the head 1902 of the attachment portion 1900.

As shown in FIG. 20, the second protrusion 2006 can be positioned on the same side of the backing 2002 along the mesiodistal dimension (e.g., on the same side of the mesiodistal midline M) as the first protrusion 2004. In some embodiments, the second protrusion 2006 has a first region extending lingually (or buccally, depending on which side of the tooth the securing member 2000 is attached) away from the backing 2002. The second protrusion 2006 can also include a second region extending away from the first region 2006*a* towards an intermediate portion of the securing member 2000 and spaced apart from the backing 2002 by a gap along the buccolingual dimension. The gap can have a depth that is slightly greater than a thickness t of the attachment portion 1900 so that the attachment portion 1900 can fit between the second region of the second protrusion 2006 and the backing 2002. The second protrusion 2006 can also include an inner surface 2016 (only visible in FIG. 21B) configured to engage the first arm region 1906*a* of the attachment portion 1900 and prevent or limit mesial or distal movement and gingival movement of the first arm region 1906*a*. In some embodiments, the inner surface 2016 is curved. For example, the inner surface 2016 can have a curvature based on and/or similar to the curvature of the first arm region 1906*a*. The second region of the second protrusion 2006 can include an inner surface (not visible) facing towards the backing 2002 and configured to prevent or limit lingual (or buccal) movement of the first arm region 1906*a*. As such, the second protrusion 2006 prevents or limit movement of the first arm region 1906*a* in at least three directions, for example by functioning as a side, bottom, and front stop.

The third protrusion 2008 can be positioned on the opposite side of the backing 2002 along the mesiodistal dimension from the first protrusion 2004 and/or the second protrusion 2006, or at least spaced apart from the first protrusion 2004 and/or the second protrusion 2006 along a mesiodistal dimension. In some embodiments, the third protrusion 2008 can have a first region extending lingually (or buccally, depending on which side of the tooth the securing member 2000 is attached) away from the backing 2002. The third protrusion 2008 can have a second region extending away from the first region towards an intermediate portion of the securing member 2000 and spaced apart from the backing 2002 by a gap along the buccolingual dimension. The gap can have a depth that is slightly greater than a thickness t of the attachment portion 1900 so that the attachment portion 1900 can fit between the second region and the backing 2002. In some embodiments, the depth of the gap can be similar to the depth of the gap between the second region of the second protrusion 2006 and the backing 2002. The third protrusion 2008 can also include an inner surface facing towards the backing 2002 and configured to prevent or limit lingual (or buccal) movement of the base 1904. The base 1904 (or one or more portions thereof) of the third protrusion 2008 can be configured to be positioned between the third protrusion 2008 and the backing 2002. For example, as shown in FIGS. 21A and 21B, the first base region 1904*a* and the second base region 1904*b* can each be at least partially restrained between the third protrusion 2008 and the backing 2002 in the secured position. The third protrusion 2008 can have an inner surface 2018 configured to engage the first base region 1904*a* and/or the second base region 1904*b*, and in some embodiments can be configured to substantially conform to the exterior surface 1927 of the base 1904 at the respective base regions.

Referring to FIGS. 21A and 21B, in the secured state, the attachment portion 1900 can be positioned proximate and/or against the backing 2002 of the securing member 2000 and bound between the first, second, and third protrusions 2004, 2006, 2008. The connector 1903 can be positioned between the second protrusion 2006 and the third protrusion 2008 (e.g., within the gap 2020). Additionally or alternatively, the first base region 1904*a* of the head 1902 can be positioned buccolingually between the third protrusion 2008 and the backing 2002 and the first arm region 1906*a* can be positioned buccolingually between the second protrusion 2006 and the backing 2002. In the secured state, the protuberance 1936 can be positioned occlusogingivally between the first protrusion 2004 and the second protrusion 2006 (e.g., within gap 2026).

The attachment portion 1900 can comprise a resilient and/or superelastic material such that, when the attachment portion 1900 is braced between the first, second, and third protrusions 2004, 2006, 2008, the attachment portion 1900 actively exerts an outward force on the surrounding surfaces. For example, the second ramped surface 1914 of the protuberance 1936 of the attachment portion 1900 can engage the gingivally-facing second surface 2004*b* of the first protrusion 2004 of the securing member 2000. The portion 1916 of the exterior surface 1919 can abut and press mesially or distally against the first surface 2004*a* and/or the corner 2011 of the first protrusion 2004 of the securing member 2000. The exterior surface 1919 of the arm 1906 along the first arm region 1906*a* can abut and press mesially or distally and gingivally against the inner surface 2016 of the second protrusion 2006 of the securing member 2000. In some embodiments, the exterior surface 1919 of the arm 1906 along the first arm region 1906*a* does not abut the inner surface 2016 of the second protrusion 2006 of the securing member 2000 in the secured state. Such a configuration can provide room for the first arm region 1906*a* and any other regions comprising the flexure 1932 (discussed below) to deform while releasing the attachment portion 1900 from the securing member 2000. The exterior surface 1927 of the base 1904 can abut and press gingivally and mesially or distally against the inner surface 2018 of the third protrusion 2008 of the securing member 2000. Accordingly, the aforementioned surfaces of the attachment portion 1900 and the securing member 2000 that are configured to engage one another when the attachment portion 1900 is in the secured position can comprise securing surfaces.

In the secured position, the attachment portion 1900 is releasably secured to the securing member 2000 such that it cannot be inadvertently displaced or prematurely or inadvertently released by typical patient activity (such as chewing). The attachment portion 1900 (or one or more portions thereof) can be configured to press outwardly on the securing member 2000 when in the secured position. The active and/or continuous outward force exerted by the attachment portion 1900 on the securing member 2000 advantageously eliminates or reduces play between the attachment portion 1900 and securing member 2000 along a mesiodistal dimension, an occlusogingival dimension, and/or a buccolingual dimension, thus providing a more accurate and efficient transfer of force from the appliance to the tooth. In some embodiments, the attachment portion 1900 (or one or more portions thereof) does not chronically press outwardly on the securing member 2000 and is instead configured to engage the securing member 2000 if the attachment portion 1900 moves into contact with and/or moves such that it exerts a force on one or more portions of the securing member 2000. Thus, the securing member 2000 can be configured to limit movement of the attachment portion 1900 relative to the securing member 2000. In some embodiments, one or more of the securing surfaces is configured for transferring orthodontic force between the attachment portion 1900 (e.g., to and/or from the connector 1903, to and/or from the rest of the appliance, etc.) and the securing member 2000 (e.g., to and/or from the tooth, etc.). In various embodiments, one or more of the securing surfaces does not substantially transfer orthodontic force between the attachment portion 1900 and the securing member 2000.

The attachment portion 1900 of FIGS. 19, 21A and 21B can be secured to the securing member 2000 by positioning the attachment portion 1900 proximate the securing member 2000 and moving the attachment portion 1900 along an occlusogingival path. The connector 1903 or other portion of the appliance continuous with the head 1902 of the attachment portion 1900 can be positioned relative to the securing member 2000 such that at least a portion of the head 1902 is positioned occlusally of the first protrusion 2004 of the securing member 2000 and/or at, near, and/or occlusally of an occlusal edge of the backing 2002. The portion of the connector 1903 connected to the head 1902 can be positioned within the mesiodistal gap 2020 between the second and third protrusions 2006, 2008 of the securing member 2000. In some embodiments, the back surface of the attachment portion 1900 can be positioned proximate and/or in contact with the backing 2002 of the securing member 2000. In some embodiments, the operator slides the connector 1903 and head 1902 occlusogingivally by positioning a tool (e.g., tool 800) within the opening 1930 and/or the interior region 1922 and moving the tool occlusogingivally. The tool can contact the first base region 1904*a* (or the first arm region 1906*a* if positioned in the interior region 1922) when sliding the tool gingivally to insert the attachment portion 1900. In any case, continued gingival movement of the connector 1903 and/or head 1902 forces the first ramped surface 1917 at the protuberance 1936 into contact with the corner 2011 of the first protrusion 2004. Because the exterior surface 1919 along the first ramped surface 1917 faces gingivally and is angled toward the first protrusion 2004 during the securing process, the occlusally-oriented force applied to the exterior surface 1919 along the first ramped surface 1917 when the first ramped surface 1917 contacts the first protrusion 2004 forces the first arm region 1906*a* to bend. Once the corner 1921 of the attachment portion 1900 between the first ramped surface 1917 and the second ramped surface 1914 of the shoulder 1923 is positioned gingival of the corner 2011 of the first protrusion 2004, the resilient arm 1906 and/or one or more portions thereof (e.g., the first arm region 1906*a*, etc.) bends back towards its shape in the relaxed state, thereby wedging the attachment portion 1900 between the first, second, and third protrusions 2004, 2006, 2008, as shown in FIGS. 21A and 21B. Accordingly, one or more regions of the attachment portion 1900 can comprise a flexure 1932 configured to bend and/or otherwise deform to facilitate securing of the attachment portion 1900 to the securing member 2000. In some embodiments, the flexure 1932 comprises the first arm region 1906*a*. The first arm region 1906*a*, for example, can be configured to bend in a first direction to facilitate or enable sliding of the attachment portion 1900 gingivally of the first protrusion 2004 to secure to the securing member 2000 and/or the first arm region 1906*a* can be configured to bend in a second, opposite direction to facilitate or enable locking of the attachment portion 1900 to the securing member 2000. In some embodiments, deformation of the flexure 1932 causes one or more portions of the attachment portion 1900 to rotate (e.g., bending of the first arm region 1906*a* can cause the second-fourth arm regions 1906*b*-1906*d* to rotate about the buccolingual dimension). Moreover, the flexure 1932 can comprise other regions of the attachment portion 1900 in addition to or instead of the first arm region 1906*a* including, but not limited to, the second arm region 1906*b*, the third arm region 1906*c*, the fourth arm region 1906*d*, one or more of the bends 1920, the base 1904, etc.

To release the attachment portion 1900 from the securing member 2000, the attachment portion 1900 can be configured to deform and/or rotate relative to the securing member 2000. For example, an operator can insert a tool, such as the distal end surface 808 of tool 800, into the interior region 1922 defined by the arm 1906. An occlusal end of the tool surface can be positioned proximate the interior surface 1918 of the arm 1906 along the third arm region 1906*c* and a gingival end of the tool surface can be positioned proximate the interior surface 1918 of the arm 1906 along the first arm region 1906*a*. The operator can rotate the tool about a buccolingual dimension (e.g., rotating the tool surface away from the first protrusion 2004 and/or towards the fourth arm region 1906*d*, etc.) such that an occlusal portion of the tool surface engages and pushes against the fourth arm region 1906*d* while the gingival portion of the tool surface slides up the curved interior surface along the first arm region 1906*a*. When the gingival portion of the tool surface can no longer slide occlusally along the interior surface 1918, for example when reaching the protuberance 1936, the occlusal portion of the tool surface has good and/or maximum leverage against the fourth arm region 1906*d*. The tool can displace the fourth arm region 1904*d* and thereby force the second and third arm regions 1906*b* and 1906*c* to rotate with the tool surface. This causes the arm 1906 to bend at the flexure 1932, which can include the first arm region 1906*a*. The arm 1906 can bend such that the second ramped surface 1914 slides occlusally and mesiodistally along the second surface 2004*b* of the first protrusion 2004 and away from the first protrusion 2004 to release the attachment portion 1900 from the securing member 2000. In some embodiments, the attachment portion 1900 can pop or snap free of the securing member 2000 once the second ramped surface 1914 clears the first protrusion 2004. With or without the tool, the attachment portion 1900 can be moved occlusally until the wider gingival region of the head 1902 clears an occlusal surface of the second and third protrusions 2006, 2008, at which point the attachment portion 1900 can be pulled away from the backing 2002 along the buccolingual dimension.

The attachment portion 1900 can comprise a leveraging surface 1934 configured to engage a tool to facilitate deformation of the attachment portion 1900 to cause the attachment portion 1900 to release from the securing member 2000. In some embodiments, the fourth arm region 1906*d* of the attachment portion 1900 of FIGS. 19, 21A and 21B can have the leveraging surface 1934. Additionally or alternatively, the third arm region 1906*c*, the second arm region 1906*b*, the first arm region 1906*a*, and/or the base 1904 can have the leveraging surface 1934. In some embodiments, the attachment portion 1900 comprises multiple leveraging surfaces 1934.

The location at which the connector 1903 connects to the head 1902, a dimension along which the connector 1903 extends, a property of the connector 1903, etc. can be at least partially based on a force to be imparted on a tooth to which the attachment portion 1900 is configured to be secured (and/or an intended movement of the tooth). For example, as previously noted, the attachment portion 1900 can be configured to release from the securing member 2000 when the second ramped surface 1914 slides occlusally along the second surface 2004*b* of the first protrusion 2004 and/or mesiodistally away from the first protrusion 2004 (e.g., when the head 1902 rotates about the buccolingual dimension). Thus, to avoid any movement of a connector 1903 causing sliding of the second ramped surface 1914 relative to the second surface 2004*b* during treatment, the connector 1903 can connect to a portion of the attachment portion 1900 away from the arm 1906, and in particular in a location that would not cause movement of the arm 1906 in any way that is biased towards disengagement from the securing member 2000. In some cases, for example as shown in FIG. 19, the connector 1903 is continuous with the base 1904 of the head 1902 but not the arm 1906. Such a configuration can prevent or limit the connector 1903 from applying forces to the arm 1906 that inadvertently cause the flexure 1932 to deform during orthodontic treatment. Movement of the fourth arm region 1906*d* of the attachment portion 1900 in response to forces applied to the fourth arm region 1906*d* by a tool at the leveraging surface 1934 can cause the attachment portion 1900 to release from the securing member 2000. Accordingly, in some embodiments no connectors attach to the leveraging surface 1934 and/or the fourth arm region 1906*d* so that little to no force is applied to the leveraging surface 1934 and/or the fourth arm region 1906*d* during the normal course of treatment. Moreover, because each of the inner surfaces 2016, 2018 of the second and third protrusions 2006, 2008 is closed either mesially or distally (e.g., opposite the mesiodistal gap 2020), the head 1902 may not be configured to connect to any connectors at the base 1904 or the first arm region 1906*a* if such connectors would extend mesiodistally away from the base 1904 or the first arm region 1906*a*, respectively. The location at which the connector 1903 connects to the head 1902, a dimension along which the connector 1903 extends, a property of the connector 1903, etc. can at least partially be based on the mechanism by which the attachment portion 1900 is attached and/or detached to the securing member 2000 and/or the geometry of the securing member 2000.

Figure 22:
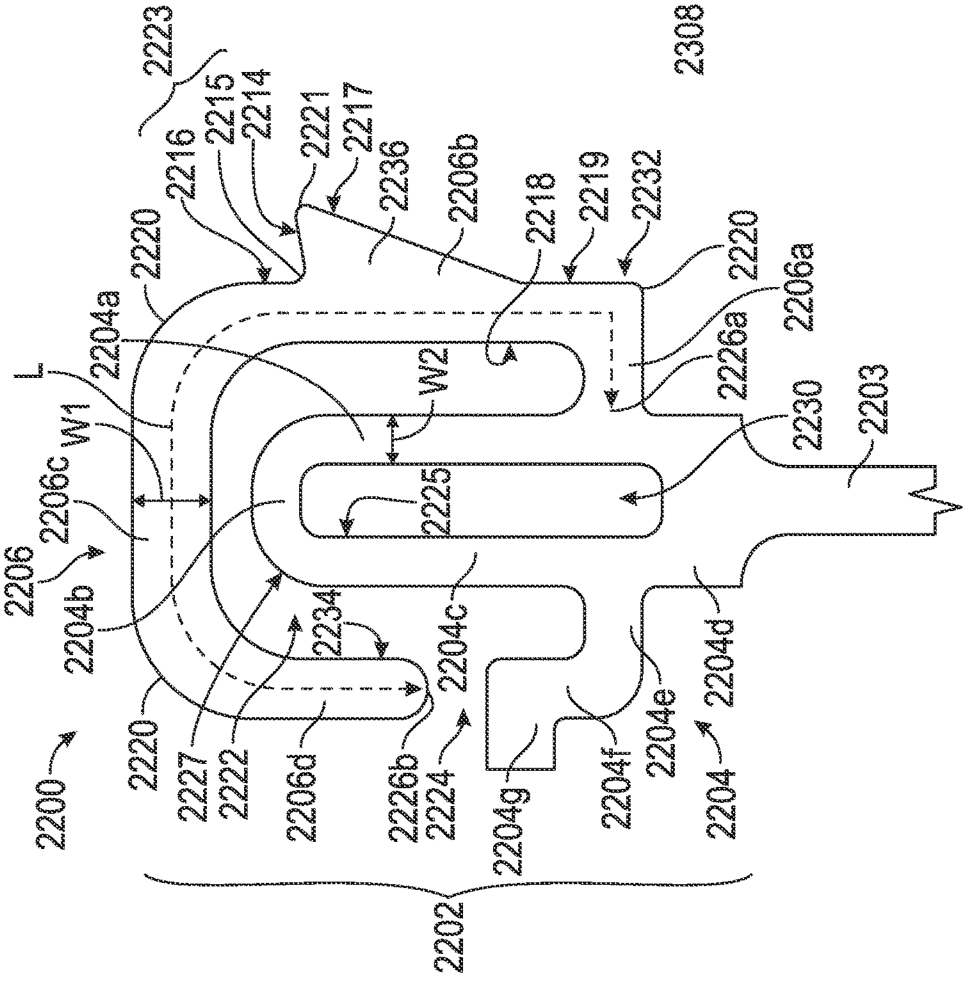
FIG. 22 is a front view of an attachment portion configured in accordance with several embodiments of the present technology.

FIG. 22 shows a planar view of an attachment portion 2200 configured in accordance with several embodiments of the present technology. The attachment portion 2200 can be configured to be secured to a patient's tooth via a securing member, such as securing member 2300 shown in FIG. 23. The attachment portion 2200 and the securing member 2300 are shown in a secured arrangement in FIGS. 24A and 24B. As discussed in greater detail below, the attachment portion 2200 and the securing member 2300 can be configured such that the attachment portion 2200 can be releasably secured to the securing member 2300. The attachment portion 2200 can be continuous with a connector 2203 that connects the attachment portion 2200 to one or more additional portions of an orthodontic appliance (not shown).

Referring to FIG. 22, the attachment portion 2200 can comprise a head 2202. In some embodiments, the attachment portion 2200 comprises a head 2202 and at least a portion of a connector 2203 that is continuous with the head 2202. The connector 2203, for example, can comprise a second connector as previously described herein and/or can extend gingivally away from a gingival portion of the head 2202. The connector 2203 can have features similar to any of the connectors disclosed herein (e.g., first connectors, second connectors, third connectors, etc.) and can comprise a single connector or multiple connectors. For example, the connector 2203 can comprise a single, occlusogingivally extending connector, multiple occlusogingivally extending connectors, one or more occlusogingivally extending connectors and one or more mesiodistally extending connectors branching off of the one or more occlusogingivally extending connectors and/or the attachment portion, or one or more mesiodistally extending connectors (and no occlusogingivally extending connectors). Accordingly, the attachment portion 2200 can be connected to a single connector or multiple connectors 2203. The connectors 2203 can connect to the head 2202 at a variety of locations. For example, a gingivally extending connector 2203 can connect to a gingival portion of the head 2202. Any of the connectors 2203 disclosed herein can extend away from the head 2202 along a variety of dimensions (e.g., along an occlusogingival dimension, a mesiodistal dimension, a buccolingual dimension, etc.).

In some embodiments, the head 2202 and the connector 2203 are part of the same, monolithic piece of material (e.g., cut from a sheet of material, a 3D-printed piece, etc.). Thus, the head 2202 and the connector 2203 may refer to different portions of the same continuous component. The attachment portion 2200 can be one portion of a greater orthodontic appliance, or may be formed separately and attached to an orthodontic appliance. The attachment portion 2200 and/or the corresponding appliance can be cut from the same sheet of material and/or may be formed by molding, casting, machining, 3D printing, stamping, extruding, or the like. The attachment portion 2200 may comprise a metal or a plastic and may have superelastic and/or shape memory properties. In some embodiments, the attachment portion 2200 does not have superelastic and/or shape memory properties.

The head 2202 of the attachment portion 2200 can comprise a base 2204 and an arm 2206 extending from the base 2204. The arm 2206 can be configured to bend and/or rotate relative to the base 2204 while the attachment portion 2200 is being secured to and/or released from the securing member 2300. In some embodiments, the arm 2206 comprises an elongate member having a first end portion 2226*a*, a second end portion 2226*b*, and a longitudinal axis L extending between the first and second end portions 2226*a*, 2226*b*. The arm 2206 can partially enclose and define an interior region 2222. The arm 2206 can include a plurality of bends 2220 along its longitudinal axis L that are configured to preferentially flex to facilitate securing and/or release of the attachment portion 2200 to a securing member. As discussed in greater detail herein, the interior region 2222 can be sized to receive a tool configured to release the attachment portion 2200 from a securing member (such as securing member 2300). Additionally or alternatively, the interior region 2222 can be sized to receive a tool to facilitate securing of the attachment portion 2200 to the securing member 2300. As shown in FIG. 22, in some embodiments the base 2204 at least partially encloses and defines an opening 2230. The opening can be sized to receive a tool to facilitate securing of the attachment portion 2200 to the securing member 2300.

The head 2202 can have a front surface (facing out of the page), a back surface (not visible in FIG. 22), and a thickness t (labeled in FIG. 24A) measured between the front and back surfaces. The arm 2206 of the attachment portion 2200 can have an interior surface 2218 facing the interior region 2222, an exterior surface 2219 facing away from the interior region 2222, and a width w1 measured between the interior and exterior surfaces 2218, 2219. The base 2204 can have an interior surface 2225 facing the opening 2230, an exterior surface 2227 facing away from the opening 2203, and a width w2 measured between the interior and exterior surfaces 2225, 2227. The base 2204 and/or arm 2206 can have a substantially constant thickness or may have a varying thickness. Likewise, the base 2204 and/or arm 2206 can have a substantially constant width or may have a varying width. A width and/or thickness of the base 2204 and/or arm 2206 can be varied to impart a preferred stiffness profile to all or a portion of the base 2204 and/or arm 2206.

The base 2204 can include a first base region 2204*a* extending away from the first end portion 2226*a* of the arm 2206 along a generally occlusal dimension, a second base region 2204*b* continuous with and extending away from an end of the first base region 2204*a* along a generally mesiodistal direction, a third base region 2204*c* continuous with and extending away from an end of the second base region 2204*b* along a generally gingival dimension, a fourth base region 2204*d* continuous with and extending away from an end of the third base region 2204*c* along a generally mesiodistal direction to enclose the opening 2230. In some embodiments, the fourth base region 2204*d* is continuous with the connector 2203. As shown in FIG. 22, the fourth base region 2204*d* can have a width that is greater than a width of one or more other base regions. In various embodiments, the base 2204 can comprise a fifth base region 2204*e* extending from a first end at the third base region 2204*c* along a generally mesiodistal dimension, a sixth base region 2204*f* extending from a first end at the fifth base region 2204*e* along a generally occlusogingival dimension, and/or a seventh base region 2204*g* extending from a first end at the sixth base region 2204*f* along a generally mesiodistal dimension. In some embodiments, the base 2204 has more or fewer regions.

Figure 24B:
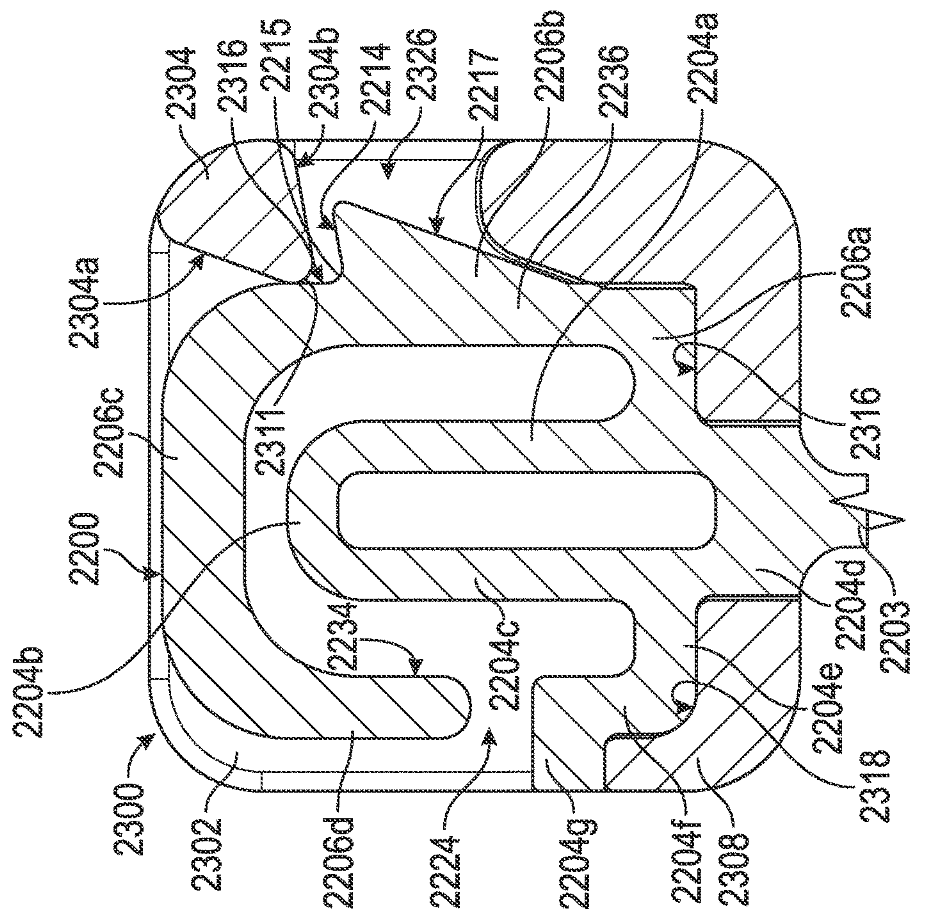
FIGS. 24A and 24B are different views of an attachment portion secured to a securing member in accordance with several embodiments of the present technology.
Figure 24A:
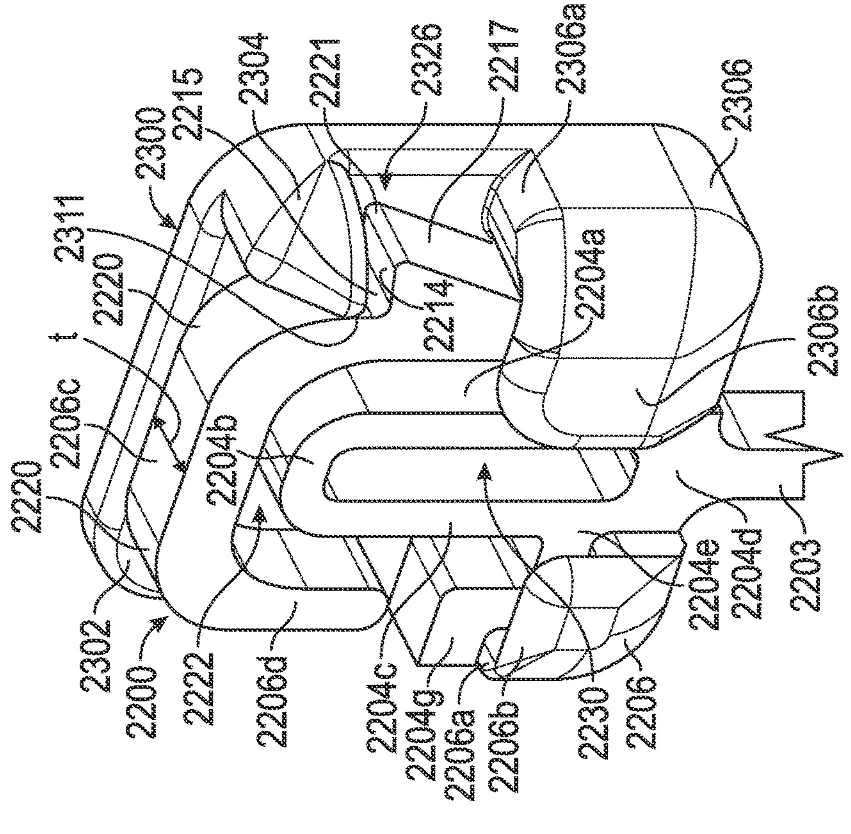

The arm 2206 can extend away from the base 2204 along the occlusogingival dimension, the mesiodistal dimension, and/or the buccolingual dimension. For example, the arm 2206 can extend mesiodistally away from the base 2204. As shown in FIG. 22, the arm 2206 can extend mesiodistally, occlusally, mesiodistally, and then gingivally. In some embodiments, the arm 2206 at least partially encloses the base 2204. In some embodiments, the first end portion 2226*a* of the arm 2206 is continuous with and/or disposed at the first base region 2204*a*. At least when the attachment portion 2200 is in a relaxed (unsecured) state (as shown in FIG. 22), the second end portion 2226*b* of the arm 2206 can be spaced apart from the seventh base region 2204*g* along an occlusogingival dimension by a gap 2224 that is continuous with the interior region 2222. In some embodiments, the second end portion 2226*b* of the arm 2206 and the seventh base region 2204*g* can be spaced apart by the gap 2224 even when the attachment portion 2200 is in a compressed (secured) state (for example as shown in FIGS. 24A and 24B). The second end portion 2226*b* and the seventh base region 2204*g* can be spaced apart along an occlusogingival dimension, a mesiodistal dimension, and/or a buccolingual dimension.

The arm 2206 can include a first arm region 2206*a* extending mesially or distally away from the first end portion 2226*a* of the arm 2206 before extending occlusally, a second arm region 2206*b* continuous with and extending occlusally away from an end of the first arm region 2206*a*, a third arm region 2206*c* continuous with and extending mesially or distally away from an end of the second arm region 2206*b*, and a fourth arm region 2206*d* continuous with and extending gingivally from an end of the third arm region 2206*c*. In some embodiments, the arm 2206 has more or fewer portions along its longitudinal axis L. In some embodiments, the first arm region 2206*a* is bent. Additionally or alternatively, the first arm region 2206*a* can be curved. In some embodiments, the bend in the first arm region 2206*a* biases the arm 2206 to bend at or near the bend of the first arm region 2206*a* when a force is applied to the fourth arm region 2206*d* in a direction away from the first arm region 2206*a*.

According to various embodiments, one or more regions of the arm 2206 can include a portion along which the width w1 of the arm 2206 is greater than along the rest of the arm 2206. For example, as shown in FIG. 22, the arm 2206 can include a protuberance 2236 at an exterior side of the second arm region 2206*b*. Along the protuberance 2236, the exterior surface 2219 of the arm 2206 forms first and second ramped surfaces 2217 and 2214 that meet at a corner 2221. The exterior surface 2219 extends occlusally and away from the longitudinal axis L along the first ramped surface 2217 until turning at the corner 2221 and extending gingivally and toward the longitudinal axis L along the second ramped surface 2214. The second ramped surface 2214 terminates at a corner 2215. The second ramped surface 2214, the corner 2215, and a portion 2216 of the exterior surface 2219 on the other side of the corner 2215 together comprise a shoulder 2223 that is configured to engage a protrusion on a securing member 2300 when the attachment portion 2200 is secured to the securing member 2300 to oppose rotational and/or translational movement of the arm 2206. As described in greater detail below, the first ramped surface 2217 can be configured to force the arm 2206 to deform, bend, and/or rotate (e.g., at the first arm region 2206*a*, etc.) when engaging a protrusion of the securing member 2300 during engagement and/or disengagement.

Figure 23:
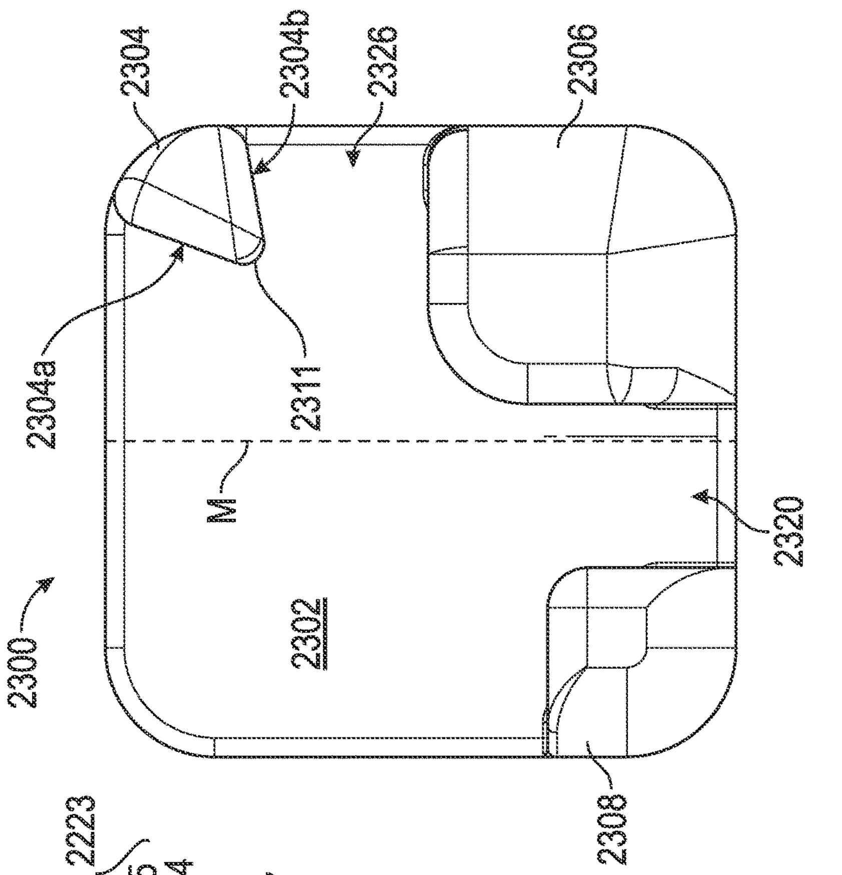
FIG. 23 is a front view of a securing member configured in accordance with several embodiments of the present technology.

FIG. 23 is a front view of the securing member 2300 configured for use with the attachment portion 2200. The securing member 2300 has a first side (facing out of the page) and a second side (not visible in FIG. 23) opposite the first side along a thickness of the securing member 2300 and configured to be bonded to a patient's tooth. The securing member 2300 can comprise a backing 2302 and a plurality of protrusions (e.g., first protrusion 2304, second protrusion 2306, third protrusion 2308, etc.) carried by and extending away from the first side of the backing 2302 along a buccolingual dimension. The protrusions 2304, 2306, 2308 can be configured to engage the attachment portion 2200 to retain the attachment portion 2200 at a specific location relative to the backing 2302 and the patient's tooth.

The first protrusion 2304 can be configured to engage the shoulder 2223 of the arm 2206 of the attachment portion 2200 to prevent or limit motion of the attachment portion 2200 in an occlusal direction and a mesial or distal direction. The first protrusion 2304 can be positioned at an occlusal portion of the backing 2302. In some embodiments, the first protrusion 2304 is positioned to a side of a mesiodistal midline M of the backing 2302. The first protrusion 2304 can be positioned near a perimeter of the backing 2302, for example as shown in FIG. 23, or can be positioned away from the perimeter and towards an intermediate portion of the backing 2302. The first protrusion 2304 can have a first surface 2304*a* and a second surface 2304*b*. In some embodiments, the first surface 2304*a* is angled with respect to the second surface 2304*b*. In some embodiments, the first surface 2304*a* can be substantially perpendicular to a first plane in which the occlusogingival dimension and the mesiodistal dimension lie, angled relative to a second plane in which the buccolingual dimension and the mesiodistal dimension lie, and angled relative to a third plane in which the buccolingual dimension and the occlusogingival dimension lie. The first surface 2304*a* can be slanted such that a gingival edge of the first surface 2304*a* is closer to the mesiodistal midline M than an occlusal edge of the first surface 2304*a*. In some embodiments, the second surface 2304*b* can be substantially perpendicular to the first plane in which the occlusogingival dimension and the mesiodistal dimension lie, angled relative to the second plane in which the buccolingual dimension and the mesiodistal dimension lie, and angled relative to the third plane in which the buccolingual dimension and the occlusogingival dimension lie. The second surface 2304*b* can be slanted such that a gingival edge of the second surface 2304*b* is closer to the mesiodistal midline M than an occlusal edge of the second surface 2304*b*. In some embodiments, the mesial edges of the first surface 2304*a* and the second surface 2304*b* are continuous with one another at a corner 2311.

The second protrusion 2306 and/or the third protrusion 2308 can be carried by the backing 2302 at positions opposite the first protrusion 2304 along one or more dimensions. The second protrusion 2306 and/or the third protrusion 2308 can be positioned at a gingival portion of the backing 2302, for example. As shown in FIG. 23, in some embodiments the second protrusion 2306 is spaced apart from the first protrusion 2304 by a gap 2326 along the occlusogingival dimension, and spaced apart from the third protrusion 2308 by a gap 2320 along the mesiodistal dimension. The gap 2320 can be sized to at least partially receive the portion of the connector 2203 connected to the head 2202 of the attachment portion 2200.

As shown in FIG. 23, the second protrusion 2306 can be positioned on the same side of the backing 2302 along the mesiodistal dimension (e.g., on the same side of the mesiodistal midline M) as the first protrusion 2304. In some embodiments, the second protrusion 2306 has a first region 2306*a* extending lingually (or buccally, depending on which side of the tooth the securing member 2300 is attached) away from the backing 2302. The second protrusion 2306 can also include a second region 2306*b* extending away from the first region 2306*a* towards an intermediate portion of the securing member 2300 and spaced apart from the backing 2302 by a gap along the buccolingual dimension. The gap can have a depth that is slightly greater than a thickness t of the attachment portion 2200 so that the attachment portion 2200 can fit between the second region of the second protrusion 2306 and the backing 2302. The second protrusion 2306 can also include an inner surface 2316 (only visible in FIG. 24B) configured to engage the first arm region 2206*a* of the attachment portion 2200 and prevent or limit mesial or distal movement and gingival movement of the first arm region 2206*a*. In some embodiments, the inner surface 2316 comprises a corner. For example, the inner surface 2316 can be bent forming a corner configured to conform to the bend of the first arm region 2206*a*. The second region 2306*b* of the second protrusion 2306 can include an inner surface (not visible) facing towards the backing 2302 and configured to prevent or limit lingual (or buccal) movement of the first arm region 2206*a*. As such, the second protrusion 2306 prevents or limit movement of the first arm region 2206*a* in at least three directions, for example by functioning as a side, bottom, and front stop.

The third protrusion 2308 can be positioned on the opposite side of the backing 2302 along the mesiodistal dimension from the first protrusion 2304 and/or the second protrusion 2306, or at least spaced apart from the first protrusion 2304 and/or the second protrusion 2306 along a mesiodistal dimension. In some embodiments, the third protrusion 2308 can have a first region 2308*a* extending lingually (or buccally, depending on which side of the tooth the securing member 2300 is attached) away from the backing 2302. The third protrusion 2308 can have a second region 2308*b* extending away from the first region towards an intermediate portion of the securing member 2300 and spaced apart from the backing 2302 by a gap along the buccolingual dimension. The gap can have a depth that is slightly greater than a thickness t of the attachment portion 2200 so that the attachment portion 2200 can fit between the second region and the backing 2302. In some embodiments, the depth of the gap can be similar to the depth of the gap between the second region of the second protrusion 2306 and the backing 2302. The third protrusion 2308 can also include an inner surface facing towards the backing 2302 and configured to prevent or limit lingual (or buccal) movement of the base 2204. The base 2204 (or one or more portions thereof) can be configured to be positioned between the third protrusion 2308 and the backing 2302. For example, as shown in FIGS. 24A and 24B, the fifth base region 2204*e* and the sixth base region 2204*f* can each be at least partially restrained between the third protrusion 2308 and the backing 2302 in the secured position. The third protrusion 2308 can have an inner surface 2318 configured to engage one or more of the fourth-seventh base regions 2204*d*-2204*g*, and in some embodiments can be configured to substantially conform to the corner of the exterior surface 2227 of the base 2204 between the fifth base region 2204*e* and the sixth base region 2204*f*. As shown in FIGS. 23-24B, the first protrusion 2204, the second protrusion 2206, and/or the third protrusion 2208 can have different shapes and/or sizes.

Referring to FIGS. 24A and 24B, in the secured state, the attachment portion 2200 can be positioned proximate and/or against the backing 2302 of the securing member 2300 and bound between the first, second, and third protrusions 2304, 2306, 2308. The connector 2203 can be positioned between the second protrusion 2306 and the third protrusion 2308 (e.g., within the gap 2320). Additionally or alternatively, the fifth base region 2204*e* and the sixth base region 2204*f* can be positioned buccolingually between the third protrusion 2308 and the backing 2302 and the first arm region 2206*a* can be positioned buccolingually between the second protrusion 2306 and the backing 2302. In the secured state, the protuberance 2236 can be positioned occlusogingivally between the first protrusion 2304 and the second protrusion 2306 (e.g., within gap 2326).

The attachment portion 2200 can comprise a resilient and/or superelastic material such that, when the attachment portion 2200 is braced between the first, second, and third protrusions 2304, 2306, 2308, the attachment portion 2200 actively exerts an outward force on the surrounding surfaces. For example, the second ramped surface 2214 of the protuberance 2236 of the attachment portion 2200 can engage the second surface 2304*b* of the first protrusion 2304 of the securing member 2300. The portion 2216 of the exterior surface 2219 can abut and press mesially or distally against the first surface 2304*a* and/or the corner 2311 of the first protrusion 2304 of the securing member 2300. The exterior surface 2219 of the arm 2206 along the first arm region 2206*a* can abut and press mesially or distally and gingivally against the inner surface 2316 of the second protrusion 2306 of the securing member 2300. In some embodiments, the exterior surface 2219 of the arm 2206 along the first arm region 2206*a* does not abut the inner surface 2316 of the second protrusion 2306 of the securing member 2300 in the secured state. Such a configuration can provide room for the first arm region 2206*a* and any other regions comprising the flexure 2232 (discussed below) to deform while releasing the attachment portion 2200 from the securing member 2300. The exterior surface 2227 of the base 2204 can abut and press gingivally and mesially or distally against the inner surface 2318 of the third protrusion 2308 of the securing member 2300. Accordingly, the aforementioned surfaces of the attachment portion 2200 and the securing member 2300 that are configured to engage one another when the attachment portion 2200 is in the secured position can comprise securing surfaces.

In the secured position, the attachment portion 2200 is releasably secured to the securing member 2300 such that it cannot be inadvertently displaced or prematurely or inadvertently released by typical patient activity (such as chewing). The attachment portion 2200 (or one or more portions thereof) can be configured to press outwardly on the securing member 2300 when in the secured position. The active and/or continuous outward force exerted by the attachment portion 2200 on the securing member 2300 advantageously eliminates or reduces play between the attachment portion 2200 and securing member 2300 along a mesiodistal dimension, an occlusogingival dimension, and/or a buccolingual dimension, thus providing a more accurate and efficient transfer of force from the appliance to the tooth. In some embodiments, the attachment portion 2200 (or one or more portions thereof) does not chronically press outwardly on the securing member 2300 and is instead configured to engage the securing member 2300 if the attachment portion 2200 moves into contact with and/or moves such that it exerts a force on one or more portions of the securing member 2300. Thus, the securing member 2300 can be configured to limit movement of the attachment portion 2200 relative to the securing member 2300. In some embodiments, one or more of the securing surfaces is configured for transferring orthodontic force between the attachment portion 2200 (e.g., to and/or from the connector 2203, to and/or from the rest of the appliance, etc.) and the securing member 2300 (e.g., to and/or from the tooth, etc.). In various embodiments, one or more of the securing surfaces does not substantially transfer orthodontic force between the attachment portion 2200 and the securing member 2300.

The attachment portion 2200 of FIGS. 22, 24A and 24B can be secured to the securing member 2300 by positioning the attachment portion 2200 proximate the securing member 2300 and moving the attachment portion 2200 along an occlusogingival path. The connector 2203 or other portion of the appliance continuous with the head 2202 of the attachment portion 2200 can be positioned relative to the securing member 2300 such that at least a portion of the head 2202 is positioned occlusally of the first protrusion 2304 of the securing member 2300 and/or at, near, and/or occlusally of an occlusal edge of the backing 2302. The portion of the connector 2203 connected to the head 2202 can be positioned within the mesiodistal gap 2320 between the second and third protrusions 2306, 2308 of the securing member 2300. In some embodiments, the back surface of the attachment portion 2200 can be positioned proximate and/or in contact with the backing 2302 of the securing member 2300. In some embodiments, the operator slides the connector 2203 and head 2202 occlusogingivally by positioning a tool (e.g., tool 800) within the opening 2230 and/or the interior region 2222 and moving the tool occlusogingivally. The tool can contact the fourth base region 2204*d* (or the fifth base region 2204*e* or the first arm region 2206*a* if positioned in the interior region 2222) when sliding the tool gingivally to insert the attachment portion 2200. In any case, continued gingival movement of the connector 2203 and/or head 2202 forces the first ramped surface 2217 at the protuberance 2236 into contact with the corner 2311 of the first protrusion 2304. Because the exterior surface 2219 along the first ramped surface 2217 faces gingivally and is angled toward the first protrusion 2304 during the securing process, the occlusally-oriented force applied to the exterior surface 2219 along the first ramped surface 2217 when the first ramped surface 2217 contacts the first protrusion 2304 forces the first arm region 2206*a* to bend. Once the corner 2221 of the attachment portion 2200 between the first ramped surface 2217 and the second ramped surface 2214 is positioned gingival of the corner 2311 of the first protrusion 2304, the resilient arm 2206 and/or one or more portions thereof (e.g., the first arm region 2206*a*, etc.) bends back towards its shape in the relaxed state, thereby wedging the attachment portion 2200 between the first, second, and third protrusions 2304, 2306, 2308, as shown in FIGS. 24A and 24B. Accordingly, one or more regions of the attachment portion 2200 can comprise a flexure 2232 configured to bend and/or otherwise deform to facilitate securing of the attachment portion 2200 to the securing member 2300. In some embodiments, the flexure 2232 comprises the first arm region 2206*a*. The first arm region 2206*a*, for example, can be configured to bend in a first direction to facilitate or enable sliding of the attachment portion 2200 gingivally of the first protrusion 2304 to secure to the securing member 2300 and/or the first arm region 2206*a* can be configured to bend in a second, opposite direction to facilitate or enable locking of the attachment portion 2200 to the securing member 2300. In some embodiments, deformation of the flexure 2232 causes one or more portions of the attachment portion 2200 to rotate (e.g., bending of the first arm region 2206*a* can cause the second-fourth arm regions 2206*b*-2206*d* to rotate about the buccolingual dimension). Moreover, the flexure 2232 can comprise other regions of the attachment portion 2200 in addition to or instead of the first arm region 2206*a* including, but not limited to, the second arm region 2206*b*, the third arm region 2206*c*, the fourth arm region 2206*d*, one or more of the bends 2220, the base 2204, etc.

To release the attachment portion 2200 from the securing member 2300, the attachment portion 2200 can be configured to deform and/or rotate relative to the securing member

2300. For example, an operator can insert a tool, such as the distal end surface 808 of tool 800, into the interior region 2222 defined by the arm 2206. An occlusal end of the tool surface can be positioned proximate the interior surface 2218 of the arm 2206 along the third arm region 2206*c* and a gingival end of the tool surface can be positioned proximate the fifth base region 2204*e*. The operator can rotate the tool about a buccolingual dimension (e.g., rotating the tool surface away from the first protrusion 2304 and/or towards the fourth arm region 2206*d*, etc.) such that an occlusal portion of the tool surface engages and pushes against the fourth arm region 2206*d* while the gingival portion of the tool surface engages the base 2204. When the gingival portion of the tool surface can no longer move relative to the base 2204, the occlusal portion of the tool surface has good and/or maximum leverage against the fourth arm region 2206*d*. The tool can displace the fourth arm region 2206*d* and thereby force the second and third arm regions 2206*b* and 2206*c* to rotate with the tool surface. This causes the arm 2206 to bend at the flexure 2232, which can include the first arm region 2206*a*. The arm 2206 can bend such that the second ramped surface 2214 slides gingivally and mesiodistally along the second surface 2304*b* of the first protrusion 2304 and away from the first protrusion 2304 to release the attachment portion 2200 from the securing member 2300. In some embodiments, the attachment portion 2200 can pop or snap free of the securing member 2300 once the second ramped surface 2214 clears the first protrusion 2304. With or without the tool, the attachment portion 2200 can be moved occlusally until the wider gingival region of the head 2202 clears an occlusal surface of the second and third protrusions 2306, 2308, at which point the attachment portion 2200 can be pulled away from the backing 2302 along the buccolingual dimension.

The attachment portion 2200 can comprise a leveraging surface 2234 configured to engage a tool to facilitate deformation of the attachment portion 2200 to cause the attachment portion 2200 to release from the securing member 2300. In some embodiments, the fourth arm region 2206*d* of the attachment portion 2200 of FIGS. 22, 24A and 24B can have the leveraging surface 2234. Additionally or alternatively, the third arm region 2206*c*, the second arm region 2206*b*, the first arm region 2206*a*, and/or the base 2204 can have the leveraging surface 2234. In some embodiments, the attachment portion 2200 comprises multiple leveraging surfaces 2234.

The location at which the connector 2203 connects to the head 2202, a dimension along which the connector 2203 extends, a property of the connector 2203, etc. can be at least partially based on a force to be imparted on a tooth to which the attachment portion 2200 is configured to be secured (and/or an intended movement of the tooth). For example, as previously noted, the attachment portion 2200 can be configured to release from the securing member 2300 when the second ramped surface 2214 slides gingivally along the second surface 2304*b* of the first protrusion 2304 and/or mesiodistally along and/or away from the first protrusion 2304 (e.g., when the head 2202 rotates about the buccolingual dimension). Thus, to avoid any movement of a connector 2203 causing such sliding of the second ramped surface 2214 relative to the second surface 2304*b* during treatment, the connector 2203 can connect to a portion of the attachment portion 2200 away from the arm 2206, and in particular in a location that would not cause movement of the arm 2206 in any way that is biased towards disengagement from the securing member 2300. In some cases, for example as shown in FIG. 22, the connector 2203 is continuous with the base 2204 of the head 2202 but not the arm 2206. Such a configuration can prevent or limit the connector 2203 from applying forces to the arm 2206 that inadvertently cause the flexure 2232 to deform during orthodontic treatment. Movement of the fourth arm region 2206*d* of the attachment portion 2200 in response to forces applied to the fourth arm region 2206*d* by a tool at the leveraging surface 2234 can cause the attachment portion 2200 to release from the securing member 2300. Accordingly, in some embodiments no connectors attach to the leveraging surface 2234 and/or the fourth arm region 2206*d* so that little to no force is applied to the leveraging surface 2234 and/or the fourth arm region 2206*d* during the normal course of treatment. Moreover, because each of the inner surfaces 2316, 2318 of the second and third protrusions 2306, 2308 is closed either mesially or distally (e.g., opposite the mesiodistal gap 2320), the head 2202 may not be configured to connect to any connectors at the first arm region 2206*a*, the fourth base region 2204*d*, the fifth base region 2204*e*, or the sixth base region 2204*f* if such connectors would extend mesiodistally away from the respective region. In some embodiments, the seventh base region 2204*g* can be continuous with a connector 2203 because the seventh base region 2204*g* is not bound occlusally and mesially or distally by the securing member 2300. The location at which the connector 2203 connects to the head 2202, a dimension along which the connector 2203 extends, a property of the connector 2203, etc. can at least partially be based on the mechanism by which the attachment portion 2200 is attached and/or detached to the securing member 2300 and/or the geometry of the securing member 2300.

Figure 25:
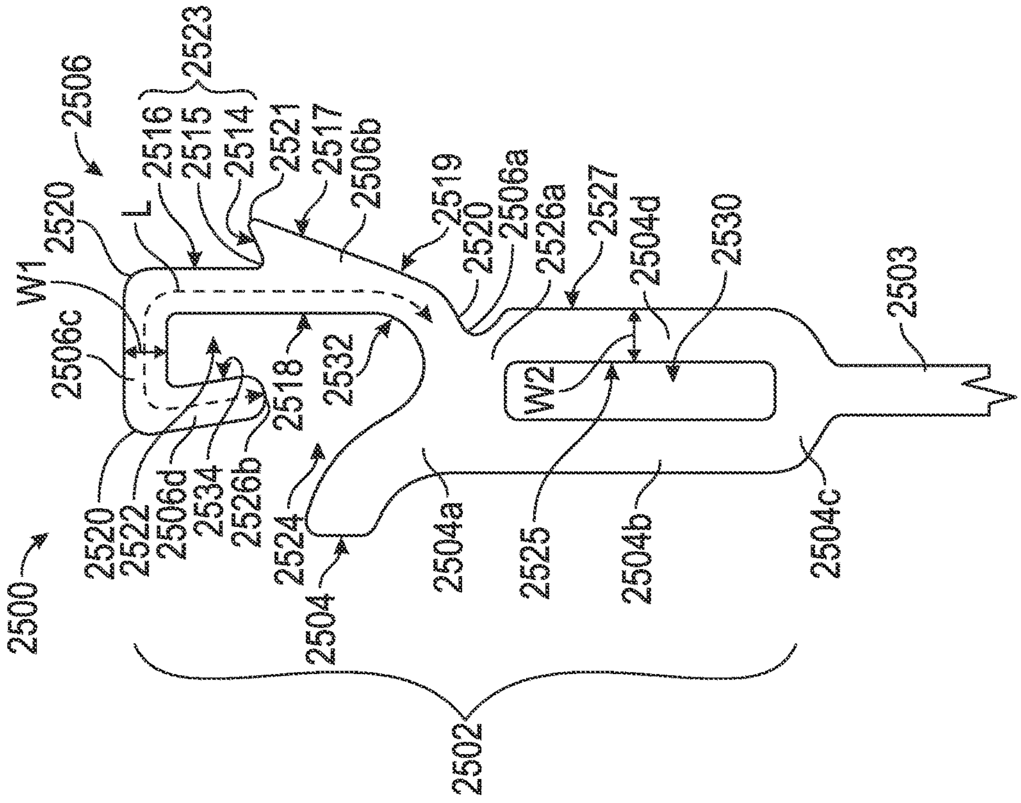
FIG. 25 is a front view of an attachment portion configured in accordance with several embodiments of the present technology.

FIG. 25 shows a planar view of an attachment portion 2500 configured in accordance with several embodiments of the present technology. The attachment portion 2500 can be configured to be secured to a patient's tooth via a securing member, such as securing member 2600 shown in FIG. 26. The attachment portion 2500 and the securing member 2600 are shown in a secured arrangement in FIGS. 27A and 27B. As discussed in greater detail below, the attachment portion 2500 and the securing member 2600 can be configured such that the attachment portion 2500 can be releasably secured to the securing member 2600. The attachment portion 2500 can be continuous with a connector 2503 that connects the attachment portion 2500 to one or more additional portions of an orthodontic appliance (not shown).

Referring to FIG. 25, the attachment portion 2500 can comprise a head 2502. In some embodiments, the attachment portion 2500 comprises a head 2502 and at least a portion of a connector 2503 that is continuous with the head 2502. The connector 2503, for example, can comprise a second connector as previously described herein and/or can extend gingivally away from a gingival portion of the head 2502. The connector 2503 can have features similar to any of the connectors disclosed herein (e.g., first connectors, second connectors, third connectors, etc.) and can comprise a single connector or multiple connectors. For example, the connector 2503 can comprise a single, occlusogingivally extending connector, multiple occlusogingivally extending connectors, one or more occlusogingivally extending connectors and one or more mesiodistally extending connectors branching off of the one or more occlusogingivally extending connectors and/or the attachment portion, or one or more mesiodistally extending connectors (and no occlusogingivally extending connectors). Accordingly, the attachment portion 2500 can be connected to a single connector or multiple connectors 2503. The connectors 2503 can connect to the head 2502 at a variety of locations. For example, a gingivally extending connector 2503 can connect to a gingival portion of the head 2502. Any of the connectors 2503 disclosed herein can extend away from the head 2502 along a variety of dimensions (e.g., along an occlusogingival dimension, a mesiodistal dimension, a buccolingual dimension, etc.).

In some embodiments, the head 2502 and the connector 2503 are part of the same, monolithic piece of material (e.g., cut from a sheet of material, a 3D-printed piece, etc.). Thus, the head 2502 and the connector 2503 may refer to different portions of the same continuous component. The attachment portion 2500 can be one portion of a greater orthodontic appliance, or may be formed separately and attached to an orthodontic appliance. The attachment portion 2500 and/or the corresponding appliance can be cut from the same sheet of material and/or may be formed by molding, casting, machining, 3D printing, stamping, extruding, or the like. The attachment portion 2500 may comprise a metal or a plastic and may have superelastic and/or shape memory properties. In some embodiments, the attachment portion 2500 does not have superelastic and/or shape memory properties.

The head 2502 of the attachment portion 2500 can comprise a base 2504 and an arm 2506 extending from the base 2504. The arm 2506 can be configured to bend and/or rotate relative to the base 2504 while the attachment portion 2500 is being secured to and/or released from the securing member 2600. In some embodiments, the arm 2506 comprises an elongate member having a first end portion 2526*a*, a second end portion 2526*b*, and a longitudinal axis L extending between the first and second end portions 2526*a*, 2526*b*. The arm 2506 can partially enclose and define an interior region 2522. The arm 2506 can include a plurality of bends 2520 along its longitudinal axis L that are configured to preferentially flex to facilitate securing and/or release of the attachment portion 2500 to a securing member. As discussed in greater detail herein, the interior region 2522 can be sized to receive a tool configured to release the attachment portion 2500 from a securing member (such as securing member 2600). Additionally or alternatively, the interior region 2522 can be sized to receive a tool to facilitate securing of the attachment portion 2500 to the securing member 2600. As shown in FIG. 25, in some embodiments the base 2504 at least partially encloses and defines an opening 2530. The opening can be sized to receive a tool to facilitate securing of the attachment portion 2500 to the securing member 2600.

The head 2502 can have a front surface (facing out of the page) and a back surface (not visible in FIG. 25), and a thickness t (labeled in FIG. 27A) measured between the front and back surfaces. The arm 2506 of the attachment portion 2500 can have an interior surface 2518 facing the interior region 2522, an exterior surface 2519 facing away from the interior region 2522, and a width w1 measured between the interior and exterior surfaces 2518, 2519. The base 2504 can have an interior surface 2525 facing the opening 2530, an exterior surface 2527 facing away from the opening 2503, and a width w2 measured between the interior and exterior surfaces 2525, 2527. The base 2504 and/or arm 2506 can have a substantially constant thickness or may have a varying thickness. Likewise, the base 2504 and/or arm 2506 can have a substantially constant width or may have a varying width. A width and/or thickness of the base 2504 and/or arm 2506 can be varied to impart a preferred stiffness profile to all or a portion of the base 2504 and/or arm 2506.

The base 2504 can include a first base region 2504*a* extending away from the first end portion 2526*a* of the arm 2506 along a generally occlusal dimension and a generally mesiodistal dimension, a second base region 2504*b* continuous with and extending away from an end of the first base region 2504*a* along a generally gingival direction, a third base region 2504*c* continuous with and extending away from an end of the second base region 2504*b* along a generally mesiodistal dimension, a fourth base region 2504*d* continuous with and extending away from an end of the third base region 2504*c* along a generally occlusal direction to enclose the opening 2530. In some embodiments, the fourth base region 2504*d* is continuous with the connector 2503. In some embodiments, the base 2504 has more or fewer regions.

Figure 27B:
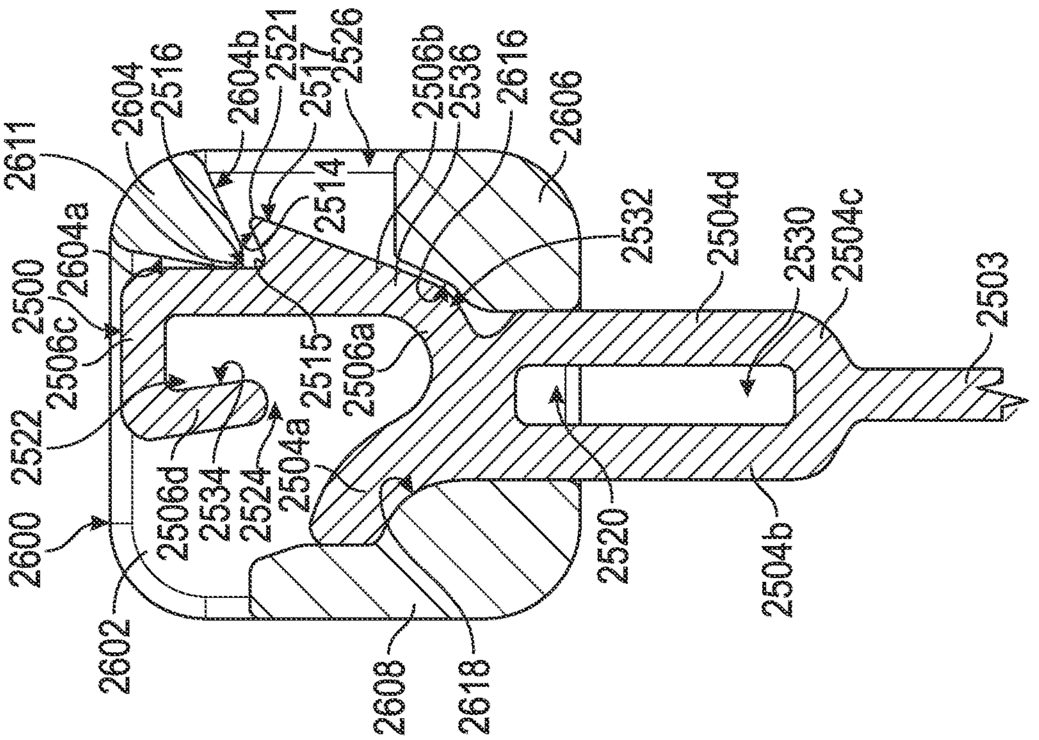
FIGS. 27A and 27B are different views of an attachment portion secured to a securing member in accordance with several embodiments of the present technology.
Figure 27A:
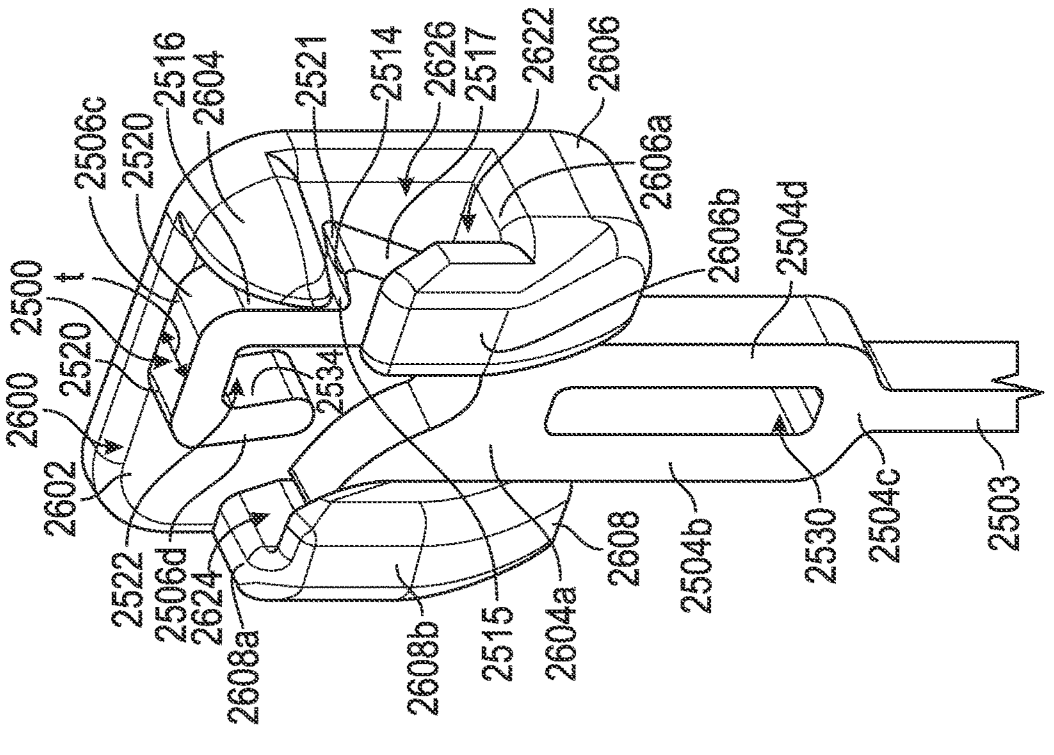

The arm 2506 can extend away from the base 2504 along the occlusogingival dimension, the mesiodistal dimension, and/or the buccolingual dimension. For example, the arm 2506 can extend mesiodistally and occlusally away from the base 2504. As shown in FIG. 25, the arm 2506 can extend mesiodistally and occlusally, occlusally, mesiodistally, and then gingivally. In some embodiments, the first end portion 2526*a* of the arm 2506 is continuous with and/or disposed at the first base region 2504*a*. At least when the attachment portion 2500 is in a relaxed (unsecured) state (as shown in FIG. 25), the second end portion 2526*b* of the arm 2506 can be spaced apart from the first end portion 2526*a* of the arm 2506 along an occlusogingival dimension by a gap 2524 that is continuous with the interior region 2522. In some embodiments, the second end portion 2526*b* of the arm 2506 and the first end portion 2526*a* can be spaced apart by the gap 2524 even when the attachment portion 2500 is in a compressed (secured) state (for example as shown in FIGS. 27A and 27B). The second end portion 2526*b* and the first end portion 2526*a* can be spaced apart along an occlusogingival dimension, a mesiodistal dimension, and/or a buccolingual dimension.

The arm 2506 can include a first arm region 2506*a* extending mesially or distally and occlusally away from the first end portion 2526*a* of the arm 2506, a second arm region 2506*b* continuous with and extending occlusally away from an end of the first arm region 2506*a*, a third arm region 2506*c* continuous with and extending mesially or distally away from an end of the second arm region 2506*b*, and a fourth arm region 2506*d* continuous with and extending gingivally from an end of the third arm region 2506*c*. In some embodiments, the arm 2506 has more or fewer portions along its longitudinal axis L. In some embodiments, the first arm region 2506*a* is curved. Additionally or alternatively, the first arm region 2506*a* can be curved. In some embodiments, the first arm region 2506*a* is concave towards the interior region 2522, thereby biasing the arm 2506 to bend at or near the first arm region 2506*a* when a rotational force is applied to the fourth arm region 2506*d* in a direction away from the first arm region 2506*a*.

According to various embodiments, one or more regions of the arm 2506 can include a portion along which the width w of the arm 2506 is greater than along the rest of the arm 2506. For example, as shown in FIG. 25, the arm 2506 can include a protuberance 2536 at an exterior side of the second arm region 2506*b*. Along the protuberance 2536, the exterior surface 2519 of the arm 2506 forms first and second ramped surfaces 2517 and 2514 that meet at a corner 2521. The exterior surface 2519 extends occlusally and away from the longitudinal axis L along the first ramped surface 2517 until turning at the corner 2521 and extending gingivally and toward the longitudinal axis L along the second ramped surface 2514. The second ramped surface 2514 terminates at a corner 2515. The second ramped surface 2514, the corner 2515, and a portion 2516 of the exterior surface 2519 on the other side of the corner 2515 together comprise a shoulder 2523 that is configured to engage a protrusion on a securing member 2600 when the attachment portion 2500 is secured to the securing member 2600 to oppose rotational and/or translational movement of the arm 2506. As described in greater detail below, the first ramped surface 2517 can be configured to force the arm 2506 to bend or rotate (e.g., at the first arm region 2506*a*, etc.) when engaging a protrusion of the securing member 2600 during engagement and/or disengagement.

Figure 26:
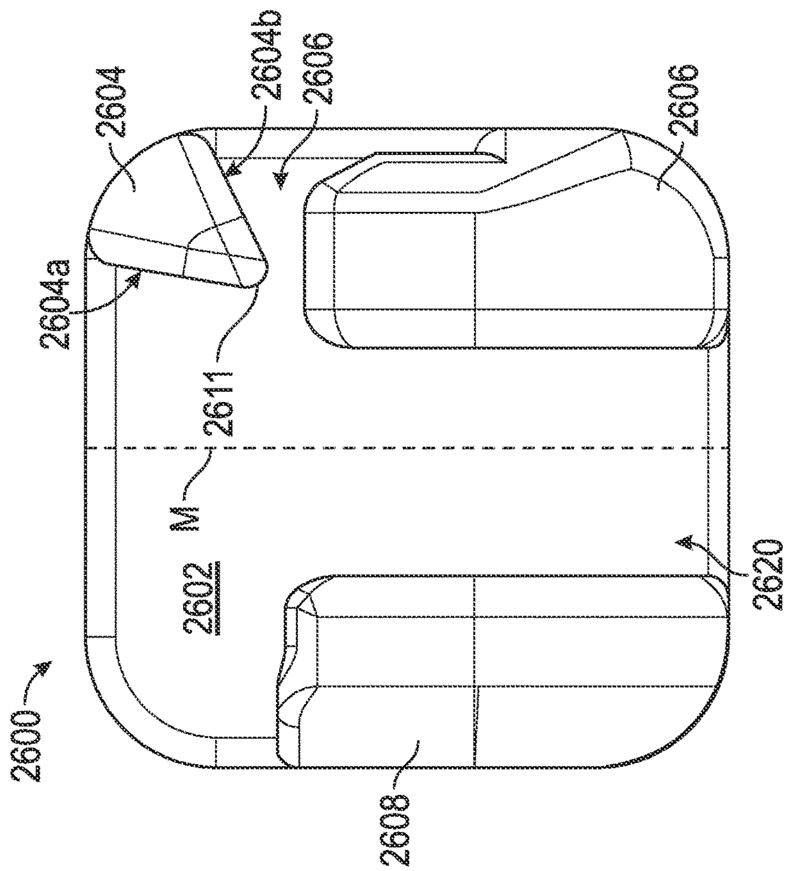
FIG. 26 is a front view of a securing member configured in accordance with several embodiments of the present technology.

FIG. 26 is a front view of the securing member 2600 configured for use with the attachment portion 2500. The securing member 2600 has a first side (facing out of the page) and a second side (not visible in FIG. 26) opposite the first side along a thickness of the securing member 2600 and configured to be bonded to a patient's tooth. The securing member 2600 can comprise a backing 2602 and a plurality of protrusions (e.g., first protrusion 2604, second protrusion 2606, third protrusion 2608, etc.) carried by and extending away from the first side of the backing 2602 along a buccolingual dimension. The protrusions 2604, 2606, 2608 can be configured to engage the attachment portion 2500 to retain the attachment portion 2500 at a specific location relative to the backing 2602 and the patient's tooth.

The first protrusion 2604 can be configured to engage the shoulder 2523 of the arm 2506 of the attachment portion 2500 to prevent or limit motion of the attachment portion 2500 in an occlusal direction and a mesial or distal direction. The first protrusion 2604 can be positioned at an occlusal portion of the backing 2602. In some embodiments, the first protrusion 2604 is positioned to a side of a mesiodistal midline M of the backing 2602. The first protrusion 2604 can be positioned near a perimeter of the backing 2602, for example as shown in FIG. 26, or can be positioned away from the perimeter and towards an intermediate portion of the backing 2602. The first protrusion 2604 can have a first surface 2604*a* and a second surface 2604*b*. In some embodiments, the first surface 2604*a* is angled with respect to the second surface 2604*b*. In some embodiments, the first surface 2604*a* can be substantially perpendicular to a first plane in which the occlusogingival dimension and the mesiodistal dimension lie, angled relative to a second plane in which the buccolingual dimension and the mesiodistal dimension lie, and angled relative to a third plane in which the buccolingual dimension and the occlusogingival dimension lie. The first surface 2604*a* can be slanted such that a gingival edge of the first surface 2604*a* is closer to the mesiodistal midline M than an occlusal edge of the first surface 2604*a*. In some embodiments, the second surface 2604*b* can be substantially perpendicular to the first plane in which the occlusogingival dimension and the mesiodistal dimension lie, angled relative to the second plane in which the buccolingual dimension and the mesiodistal dimension lie, and angled relative to the third plane in which the buccolingual dimension and the occlusogingival dimension lie. The second surface 2604*b* can be slanted such that a gingival edge of the second surface 2604*b* is closer to the mesiodistal midline M than an occlusal edge of the second surface 2604*b*. In some embodiments, the mesial edges of the first surface 2604*a* and the second surface 2604*b* are continuous with one another at a corner 2611.

The second protrusion 2606 and/or the third protrusion 2608 can be carried by the backing 2602 at positions opposite the first protrusion 2604 along one or more dimensions. The second protrusion 2606 and/or the third protrusion 2608 can be positioned at a gingival portion of the backing 2602, for example. As shown in FIG. 26, in some embodiments the second protrusion 2606 is spaced apart from the first protrusion 2604 by a gap 2626 along the occlusogingival dimension, and spaced apart from the third protrusion 2608 by a gap 2620 along the mesiodistal dimension. The gap 2620 can be sized to at least partially receive the portion of the connector 2503 connected to the head 2502 of the attachment portion 2500.

As shown in FIG. 26, the second protrusion 2606 can be positioned on the same side of the backing 2602 along the mesiodistal dimension (e.g., on the same side of the mesiodistal midline M) as the first protrusion 2604. In some embodiments, the second protrusion 2606 has a first region 2606*a* extending lingually (or buccally, depending on which side of the tooth the securing member 2600 is attached) away from the backing 2602. The second protrusion 2606 can also include a second region 2606*b* extending away from the first region 2606*a* towards an intermediate portion of the securing member 2600 and spaced apart from the backing 2602 by a gap 2622 along the buccolingual dimension. The gap 2622 can have a depth that is slightly greater than a thickness t of the attachment portion 2500 so that the attachment portion 2500 can fit between the second region of the second protrusion 2606 and the backing 2602. The second protrusion 2606 can also include an inner surface 2616 (only visible in FIG. 27B) configured to engage the first arm region 2506*a* and/or the fourth base region 2504*d* of the attachment portion 2500 and prevent or limit mesial or distal movement and gingival movement of the first arm region 2506*a*. In some embodiments, the inner surface 2616 has a contour based at least in part on a contour of the exterior surface 2619. The second region 2506*b* of the second protrusion 2606 can include an inner surface (not visible) facing towards the backing 2602 and configured to prevent or limit lingual (or buccal) movement of the first arm region 2506*a*. As such, the second protrusion 2606 prevents or limit movement of the first arm region 2506*a* in at least three directions, for example by functioning as a side, bottom, and front stop.

The third protrusion 2608 can be positioned on the opposite side of the backing 2602 along the mesiodistal dimension from the first protrusion 2604 and/or the second protrusion 2606, or at least spaced apart from the first protrusion 2604 and/or the second protrusion 2606 along a mesiodistal dimension. In some embodiments, the third protrusion 2608 can have a first region 2608*a* extending lingually (or buccally, depending on which side of the tooth the securing member 2600 is attached) away from the backing 2602. The third protrusion 2608 can have a second region 2608*b* extending away from the first region towards an intermediate portion of the securing member 2600 and spaced apart from the backing 2602 by a gap 2624 along the buccolingual dimension. The gap 2624 can have a depth that is slightly greater than a thickness t of the attachment portion 2500 so that the attachment portion 2500 can fit between the second region and the backing 2602. In some embodiments, the depth of the gap 2624 can be similar to the depth of the gap 2622 between the second region 2606*b* of the second protrusion 2606 and the backing 2602. The third protrusion 2608 can also include an inner surface facing towards the backing 2602 and configured to prevent or limit lingual (or buccal) movement of the base 2504. The base 2504 (or one or more portions thereof) can be configured to be positioned between the third protrusion 2608 and the backing 2602. For example, as shown in FIGS. 27A and 27B, the first base region 2504*a* and the second base region 2504*b* can each be at least partially restrained between the third protrusion 2608 and the backing 2602 in the secured position. The third protrusion 2608 can have an inner surface 2618 configured to engage the first base region 2504*a* and/or the second base region 2504*b*. As shown in FIGS. 25-27B, the first protrusion 2504, the second protrusion 2506, and/or the third protrusion 2508 can have different shapes and/or sizes.

Referring to FIGS. 27A and 27B, in the secured state, the attachment portion 2500 can be positioned proximate and/or against the backing 2602 of the securing member 2600 and bound between the first, second, and third protrusions 2604, 2606, 2608. The connector 2503 can be positioned between the second protrusion 2606 and the third protrusion 2608 (e.g., within the gap 2620). Additionally or alternatively, the first base region 2504*a* can be positioned buccolingually between the third protrusion 2608 and the backing 2602 and the first arm region 2506*a* can be positioned buccolingually between the second protrusion 2606 and the backing 2602. In the secured state, the protuberance 2536 can be positioned occlusogingivally between the first protrusion 2604 and the second protrusion 2606 (e.g., within gap 2626).

The attachment portion 2500 can comprise a resilient and/or superelastic material such that, when the attachment portion 2500 is braced between the first, second, and third protrusions 2604, 2606, 2608, the attachment portion 2500 actively exerts an outward force on the surrounding surfaces. For example, the second ramped surface 2514 of the protuberance 2536 of the attachment portion 2500 can engage the gingivally-facing second surface 2604*b* of the first protrusion 2604 of the securing member 2600. The portion 2516 of the exterior surface 2519 can abut and press mesially or distally against the first surface 2604*a* and/or the corner 2611 of the first protrusion 2604 of the securing member 2600. The exterior surface 2519 of the arm 2506 along the first arm region 2506*a* can abut and press mesially or distally and gingivally against the inner surface 2616 of the second protrusion 2606 of the securing member 2600. In some embodiments, the exterior surface 2519 of the arm 2506 along the first arm region 2506*a* does not abut the inner surface 2616 of the second protrusion 2606 of the securing member 2600 in the secured state. Such a configuration can provide room for the first arm region 2506*a* and any other regions comprising the flexure 2532 (discussed below) to deform while releasing the attachment portion 2500 from the securing member 2600. The exterior surface 2527 of the base 2504 can abut and press gingivally and mesially or distally against the inner surface 2618 of the third protrusion 2608 of the securing member 2600. Accordingly, the aforementioned surfaces of the attachment portion 2500 and the securing member 2600 that are configured to engage one another when the attachment portion 2500 is in the secured position can comprise securing surfaces.

In the secured position, the attachment portion 2500 is releasably secured to the securing member 2600 such that it cannot be inadvertently displaced or prematurely or inadvertently released by typical patient activity (such as chewing). The attachment portion 2500 (or one or more portions thereof) can be configured to press outwardly on the securing member 2600 when in the secured position. The active and/or continuous outward force exerted by the attachment portion 2500 on the securing member 2600 advantageously eliminates or reduces play between the attachment portion 2500 and securing member 2600 along a mesiodistal dimension, an occlusogingival dimension, and/or a buccolingual dimension, thus providing a more accurate and efficient transfer of force from the appliance to the tooth. In some embodiments, the attachment portion 2500 (or one or more portions thereof) does not chronically press outwardly on the securing member 2600 and is instead configured to engage the securing member 2600 if the attachment portion 2500 moves into contact with and/or moves such that it exerts a force on one or more portions of the securing member 2600. Thus, the securing member 2600 can be configured to limit movement of the attachment portion 2500 relative to the securing member 2600. In some embodiments, one or more of the securing surfaces is configured for transferring orthodontic force between the attachment portion 2500 (e.g., to and/or from the connector 2503, to and/or from the rest of the appliance, etc.) and the securing member 2600 (e.g., to and/or from the tooth, etc.). In various embodiments, one or more of the securing surfaces does not substantially transfer orthodontic force between the attachment portion 2500 and the securing member 2600.

The attachment portion 2500 of FIGS. 25, 27A and 27B can be secured to the securing member 2600 by positioning the attachment portion 2500 proximate the securing member 2600 and moving the attachment portion 2500 along an occlusogingival path. The connector 2503 or other portion of the appliance continuous with the head 2502 of the attachment portion 2500 can be positioned relative to the securing member 2600 such that at least a portion of the head 2502 is positioned occlusally of the first protrusion 2604 of the securing member 2600 and/or at, near, and/or occlusally of an occlusal edge of the backing 2602. The portion of the connector 2503 connected to the head 2502 can be positioned within the mesiodistal gap 2620 between the second and third protrusions 2606, 2608 of the securing member 2600. In some embodiments, the back surface of the attachment portion 2500 can be positioned proximate and/or in contact with the backing 2602 of the securing member 2600. In some embodiments, the operator slides the connector 2503 and head 2502 occlusogingivally by positioning a tool (e.g., tool 800) within the opening 2530 and/or the interior region 2522 and moving the tool occlusogingivally. The tool can contact the third base region 2504*c* (or the first arm region 2506*a* if positioned in the interior region 2522) when sliding the tool gingivally to insert the attachment portion 2500. In any case, continued gingival movement of the connector 2503 and/or head 2502 forces the first ramped surface 2517 at the protuberance 2536 into contact with the corner 2611 of the first protrusion 2604. Because the exterior surface 2519 along the first ramped surface 2517 faces gingivally and is angled toward the first protrusion 2604 during the securing process, the occlusally-oriented force applied to the exterior surface 2519 along the first ramped surface 2517 when the first ramped surface 2517 contacts the first protrusion 2604 forces the first arm region 2506*a* to bend. Once the corner 2521 of the attachment portion 2500 between the first ramped surface 2517 and the second ramped surface 2514 of the shoulder 2523 is positioned gingival of the corner 2611 of the first protrusion 2604, the resilient arm 2506 and/or one or more portions thereof (e.g., the first arm region 2506*a*, etc.) bends back towards its shape in the relaxed state, thereby wedging the attachment portion 2500 between the first, second, and third protrusions 2604, 2606, 2608, as shown in FIGS. 27A and 27B. Accordingly, one or more regions of the attachment portion 2500 can comprise a flexure 2532 configured to bend and/or otherwise deform to facilitate securing of the attachment portion 2500 to the securing member 2600. In some embodiments, the flexure 2532 comprises the first arm region 2506*a*. The first arm region 2506*a*, for example, can be configured to bend in a first direction to facilitate or enable sliding of the attachment portion 2500 gingivally of the first protrusion 2604 to secure to the securing member 2600 and/or the first arm region 2506*a* can be configured to bend in a second, opposite direction to facilitate or enable locking of the attachment portion 2500 to the securing member 2600. In some embodiments, deformation of the flexure 2532 causes one or more portions of the attachment portion 2500 to rotate (e.g., bending of the first arm region 2506*a* can cause the second-fourth arm regions 2506*b*-2506*d* to rotate about the buccolingual dimension). Moreover, the flexure 2532 can comprise other regions of the attachment portion 2500 in addition to or instead of the first arm region 2506*a* including, but not limited to, the second arm region 2506*b*, the third arm region 2506*c*, the fourth arm region 2506*d*, one or more of the bends 2520, the base 2504, etc.

To release the attachment portion 2500 from the securing member 2600, the attachment portion 2500 can be configured to deform and/or rotate relative to the securing member 2600. For example, an operator can insert a tool, such as the distal end surface 808 of tool 800, into the interior region 2522 defined by the arm 2506. An occlusal end of the tool surface can be positioned proximate the interior surface 2518 of the arm 2506 along the third arm region 2506*c* and a gingival end of the tool surface can be positioned proximate the first arm region 2506*a*. The operator can rotate the tool about a buccolingual dimension (e.g., rotating the tool surface away from the first protrusion 2604 and/or towards the fourth arm region 2506*d*, etc.) such that an occlusal portion of the tool surface engages and pushes against the fourth arm region 2506*d* while the gingival portion of the tool surface engages the first arm region 2506*a*. When the gingival portion of the tool surface can no longer move relative to the first arm region 2506*a*, the occlusal portion of the tool surface has good and/or maximum leverage against the fourth arm region 2506*d*. The tool can displace the fourth arm region 2504*d* and thereby force the second and third arm regions 2506*b* and 2506*c* to rotate with the tool surface. This causes the arm 2506 to bend at the flexure 2532, which can include the first arm region 2506*a*. The arm 2506 can bend such that the second ramped surface 2514 slides gingivally and mesiodistally along the second surface 2604*b* of the first protrusion 2604 and away from the first protrusion 2604 to release the attachment portion 2500 from the securing member 2600. In some embodiments, the attachment portion 2500 can pop or snap free of the securing member 2600 once the second ramped surface 2514 clears the first protrusion 2604. With or without the tool, the attachment portion 2500 can be moved occlusally until the wider gingival region of the head 2502 clears an occlusal surface of the second and third protrusions 2606, 2608, at which point the attachment portion 2500 can be pulled away from the backing 2602 along the buccolingual dimension.

The attachment portion 2500 can comprise a leveraging surface 2534 configured to engage a tool to facilitate deformation of the attachment portion 2500 to cause the attachment portion 2500 to release from the securing member 2600. In some embodiments, the fourth arm region 2506*d* of the attachment portion 2500 of FIGS. 25, 27A and 27B can have the leveraging surface 2534. Additionally or alternatively, the third arm region 2506*c*, the second arm region 2506*b*, the first arm region 2506*a*, and/or the base 2504 can have the leveraging surface 2534. In some embodiments, the attachment portion 2500 comprises multiple leveraging surfaces 2534.

The location at which the connector 2503 connects to the head 2502, a dimension along which the connector 2503 extends, a property of the connector 2503, etc. can be at least partially based on a force to be imparted on a tooth to which the attachment portion 2500 is configured to be secured (and/or an intended movement of the tooth). For example, as previously noted, the attachment portion 2500 can be configured to release from the securing member 2600 when the second ramped surface 2514 slides gingivally along the second surface 2604*b* of the first protrusion 2604 and/or mesiodistally away from the first protrusion 2604 (e.g., when the head 2502 rotates about the buccolingual dimension). Thus, to avoid any movement of a connector 2503 causing sliding of the second ramped surface 2514 relative to the second surface 2604*b* during treatment, the connector 2503 can connect to a portion of the attachment portion 2500 away from the arm 2506, and in particular in a location that would not cause movement of the arm 2506 in any way that is biased towards disengagement from the securing member 2600. In some cases, for example as shown in FIG. 25, the connector 2503 is continuous with the base 2504 of the head 2502 but not the arm 2506. Such a configuration can prevent or limit the connector 2503 from applying forces to the arm 2506 that inadvertently cause the flexure 2532 to deform during orthodontic treatment. Movement of the fourth arm region 2506*d* of the attachment portion 2500 in response to forces applied to the fourth arm region 2506*d* by a tool at the leveraging surface 2534 can cause the attachment portion 2500 to release from the securing member 2600. Accordingly, in some embodiments no connectors attach to the leveraging surface 2534 and/or the fourth arm region 2506*d* so that little to no force is applied to the leveraging surface 2534 and/or the fourth arm region 2506*d* during the normal course of treatment. Because the second protrusion 2606 is open mesiodistally opposite the mesiodistal gap 2620, the head 2502 can be continuous with a mesiodistally extending connector at the second arm region 2506*b*. The location at which the connector 2503 connects to the head 2502, a dimension along which the connector 2503 extends, a property of the connector 2503, etc. can at least partially be based on the mechanism by which the attachment portion 2500 is attached and/or detached to the securing member 2600 and/or the geometry of the securing member 2600.

Figure 28:
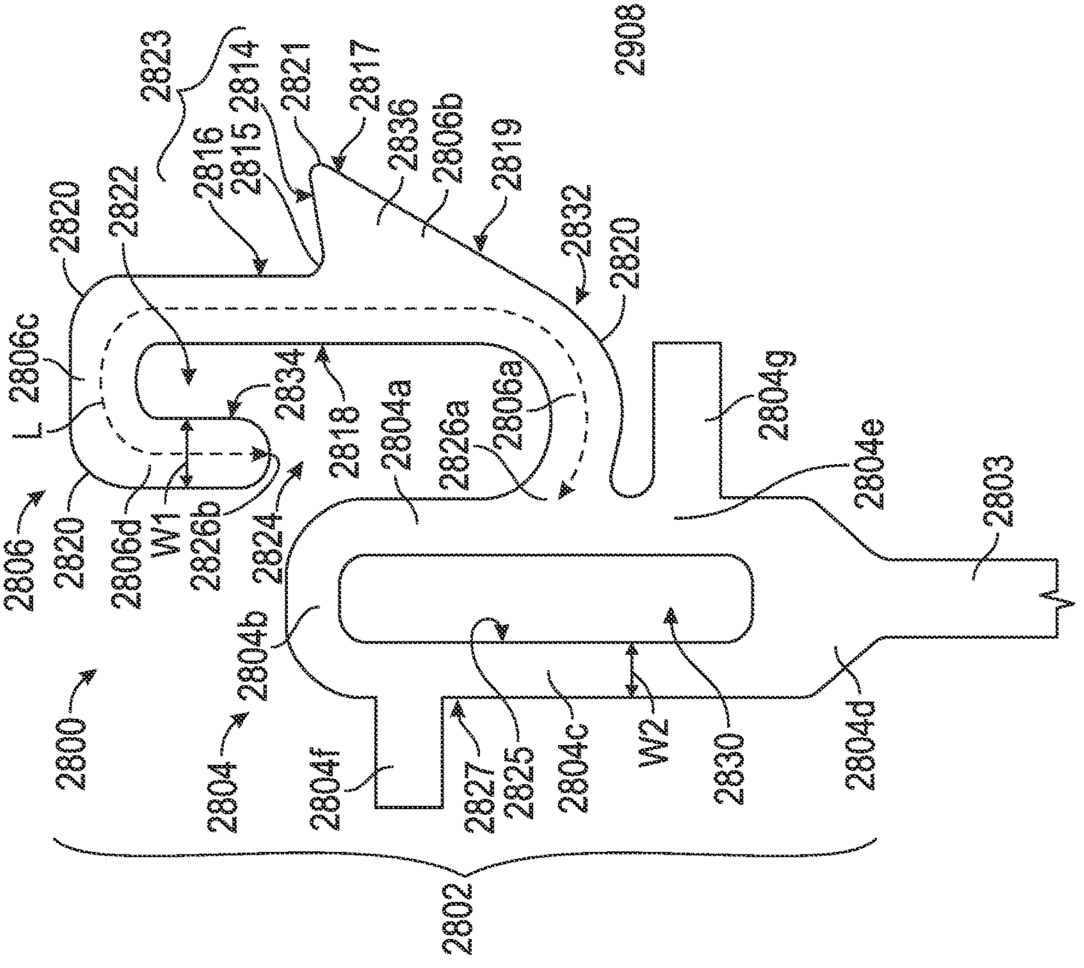
FIG. 28 is a front view of an attachment portion configured in accordance with several embodiments of the present technology.

FIG. 28 shows a planar view of an attachment portion 2800 configured in accordance with several embodiments of the present technology. The attachment portion 2800 can be configured to be secured to a patient's tooth via a securing member, such as securing member 2900 shown in FIG. 29. The attachment portion 2800 and the securing member 2900 are shown in a secured arrangement in FIGS. 30A and 30B. As discussed in greater detail below, the attachment portion 2800 and the securing member 2900 can be configured such that the attachment portion 2800 can be releasably secured to the securing member 2900. The attachment portion 2800 can be continuous with a connector 2803 that connects the attachment portion 2800 to one or more additional portions of an orthodontic appliance (not shown).

Referring to FIG. 28, the attachment portion 2800 can comprise a head 2802. In some embodiments, the attachment portion 2800 comprises a head 2802 and at least a portion of a connector 2803 that is continuous with the head 2802. The connector 2803, for example, can comprise a second connector as previously described herein and/or can extend gingivally away from a gingival portion of the head 2802. The connector 2803 can have features similar to any of the connectors disclosed herein (e.g., first connectors, second connectors, third connectors, etc.) and can comprise a single connector or multiple connectors. For example, the connector 2803 can comprise a single, occlusogingivally extending connector, multiple occlusogingivally extending connectors, one or more occlusogingivally extending connectors and one or more mesiodistally extending connectors branching off of the one or more occlusogingivally extending connectors and/or the attachment portion, or one or more mesiodistally extending connectors (and no occlusogingivally extending connectors). Accordingly, the attachment portion 2800 can be connected to a single connector or multiple connectors 2803. The connectors 2803 can connect to the head 2802 at a variety of locations. For example, a gingivally extending connector 2803 can connect to a gingival portion of the head 2802. Any of the connectors 2803 disclosed herein can extend away from the head 2802 along a variety of dimensions (e.g., along an occlusogingival dimension, a mesiodistal dimension, a buccolingual dimension, etc.).

In some embodiments, the head 2802 and the connector 2803 are part of the same, monolithic piece of material (e.g., cut from a sheet of material, a 3D-printed piece, etc.). Thus, the head 2802 and the connector 2803 may refer to different portions of the same continuous component. The attachment portion 2800 can be one portion of a greater orthodontic appliance, or may be formed separately and attached to an orthodontic appliance. The attachment portion 2800 and/or the corresponding appliance can be cut from the same sheet of material and/or may be formed by molding, casting, machining, 3D printing, stamping, extruding, or the like. The attachment portion 2800 may comprise a metal or a plastic and may have superelastic and/or shape memory properties. In some embodiments, the attachment portion 2800 does not have superelastic and/or shape memory properties.

The head 2802 of the attachment portion 2800 can comprise a base 2804 and an arm 2806 extending from the base 2804. The arm 2806 can be configured to bend and/or rotate relative to the base 2804 while the attachment portion 2800 is being secured to and/or released from the securing member 2900. In some embodiments, the arm 2806 comprises an elongate member having a first end portion 2826*a*, a second end portion 2826*b*, and a longitudinal axis L extending between the first and second end portions 2826*a*, 2826*b*. The arm 2806 can partially enclose and define an interior region 2822. The arm 2806 can include a plurality of bends 2820 along its longitudinal axis L that are configured to preferentially flex to facilitate securing and/or release of the attachment portion 2800 to a securing member. As discussed in greater detail herein, the interior region 2822 can be sized to receive a tool configured to release the attachment portion 2800 from a securing member (such as securing member 2900). Additionally or alternatively, the interior region 2822 can be sized to receive a tool to facilitate securing of the attachment portion 2800 to the securing member 2900. As shown in FIG. 28, in some embodiments the base 2804 at least partially encloses and defines an opening 2830. The opening can be sized to receive a tool to facilitate securing of the attachment portion 2800 to the securing member 2900.

The head 2802 can have a front surface (facing out of the page) and a back surface (not visible in FIG. 28), and a thickness t (labeled in FIG. 30A) measured between the front and back surfaces. The arm 2806 of the attachment portion 2800 can have an interior surface 2818 facing the interior region 2822, an exterior surface 2819 facing away from the interior region 2822, and a width w1 measured between the interior and exterior surfaces 2818, 2819. The base 2804 can have an interior surface 2825 facing the opening 2830, an exterior surface 2827 facing away from the opening 2803, and a width w2 measured between the interior and exterior surfaces 2825, 2827. The base 2804 and/or arm 2806 can have a substantially constant thickness or may have a varying thickness. Likewise, the base 2804 and/or arm 2806 can have a substantially constant width or may have a varying width. A width and/or thickness of the base 2804 and/or arm 2806 can be varied to impart a preferred stiffness profile to all or a portion of the base 2804 and/or arm 2806.

The base 2804 can include a first base region 2804*a* extending away from the first end portion 2826*a* of the arm 2806 along a generally occlusal dimension, a second base region 2804*b* continuous with and extending away from an end of the first base region 2804*a* along a generally mesiodistal dimension, a third base region 2804*c* continuous with and extending away from an end of the second base region 2804*b* along a generally gingival dimension, a fourth base region 2804*d* continuous with and extending away from an end of the third base region 2804*c* along a generally mesiodistal dimension, and a fifth base region 2804*e* continuous with and extending away from an end of the fourth base region 2804*d* along a generally occlusal dimension to enclose the opening 2830. In some embodiments, the fourth base region 2804*d* is continuous with the connector 2803. The base 2804 can include a sixth base region 2804*f* and/or a seventh base region 2804*g*, each extending mesiodistally. For example, the sixth base region 2804*f* can be continuous with and extending away from the third base region 2804*c* and/or the seventh base region 2804*g* can be continuous with and extending away from the fifth base region 2804*e*. In some embodiments, the base 2804 has more or fewer regions.

Figure 30B:
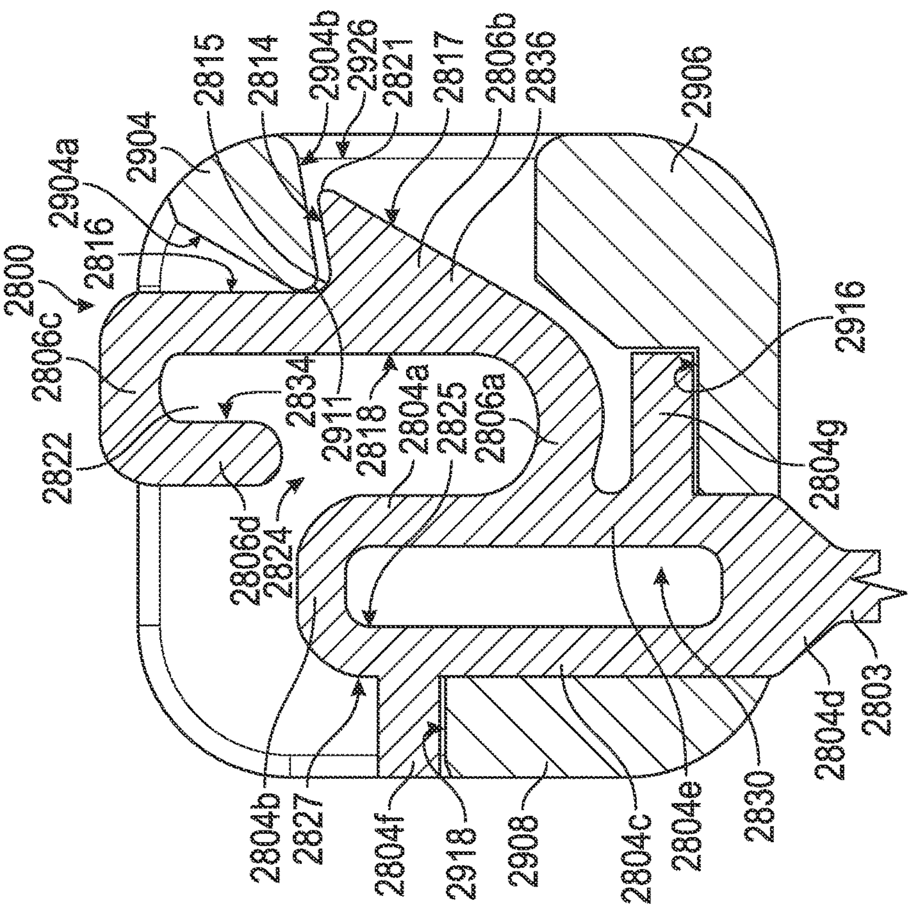
FIGS. 30A and 30B are different views of an attachment portion secured to a securing member in accordance with several embodiments of the present technology.
Figure 30A:
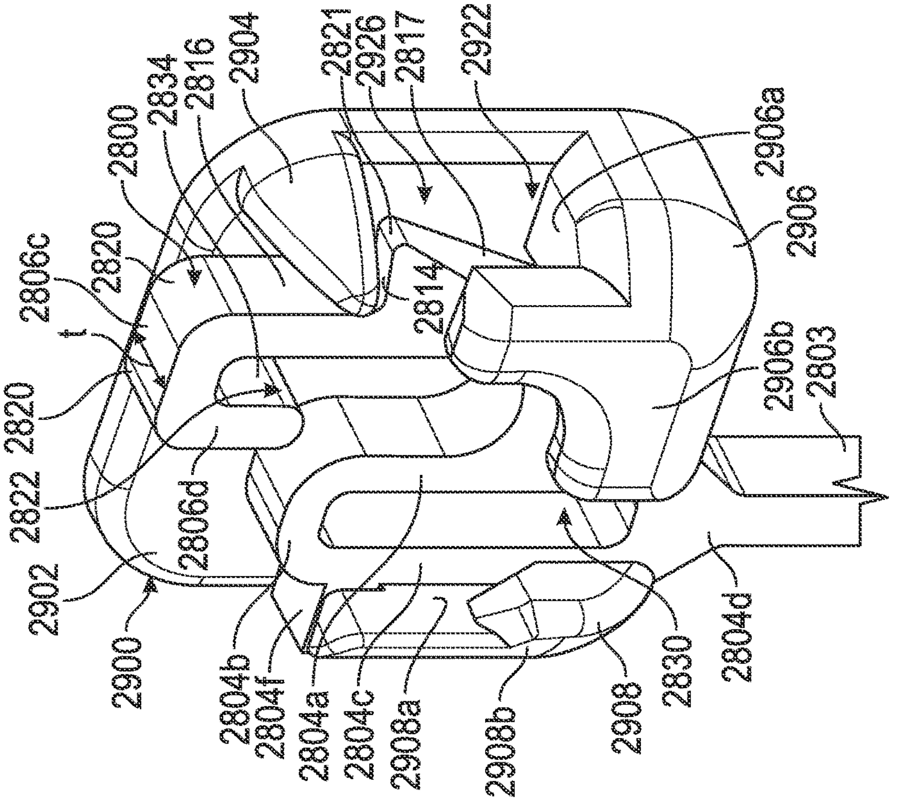

The arm 2806 can extend away from the base 2804 along the occlusogingival dimension, the mesiodistal dimension, and/or the buccolingual dimension. For example, the arm 2806 can extend mesiodistally and occlusally away from the base 2804. As shown in FIG. 28, the arm 2806 can extend mesiodistally and occlusally, occlusally, mesiodistally, and then gingivally. In some embodiments, the first end portion 2826*a* of the arm 2806 is continuous with and/or disposed at the first base region 2804*a*. At least when the attachment portion 2800 is in a relaxed (unsecured) state (as shown in FIG. 28), the second end portion 2826*b* of the arm 2806 can be spaced apart from the first end portion 2826*a* of the arm 2806 along an occlusogingival dimension by a gap 2824 that is continuous with the interior region 2822. In some embodiments, the second end portion 2826*b* of the arm 2806 and the first end portion 2826*a* can be spaced apart by the gap 2824 even when the attachment portion 2800 is in a compressed (secured) state (for example as shown in FIGS. 30A and 30B). The second end portion 2826*b* and the first end portion 2826*a* can be spaced apart along an occlusogingival dimension, a mesiodistal dimension, and/or a buccolingual dimension.

The arm 2806 can include a first arm region 2806*a* extending mesially or distally and occlusally away from the first end portion 2826*a* of the arm 2806, a second arm region 2806*b* continuous with and extending occlusally away from an end of the first arm region 2806*a*, a third arm region 2806*c* continuous with and extending mesially or distally away from an end of the second arm region 2806*b*, and a fourth arm region 2806*d* continuous with and extending gingivally from an end of the third arm region 2806*c*. In some embodiments, the arm 2806 has more or fewer portions along its longitudinal axis L. In some embodiments, the first arm region 2806*a* is curved. In some embodiments, the first arm region 2806*a* is concave towards the interior region 2822, thereby biasing the arm 2806 to bend at or near the first arm region 2806*a* when a rotational force is applied to the fourth arm region 2806*d* in a direction away from the first arm region 2806*a*.

According to various embodiments, one or more regions of the arm 2806 can include a portion along which the width w of the arm 2806 is greater than along the rest of the arm 2806. For example, as shown in FIG. 28, the arm 2806 can include a protuberance 2836 at an exterior side of the second arm region 2806*b*. Along the protuberance 2836, the exterior surface 2819 of the arm 2806 forms first and second ramped surfaces 2817 and 2814 that meet at a corner 2821. The exterior surface 2819 extends occlusally and away from the longitudinal axis L along the first ramped surface 2817 until turning at the corner 2821 and extending gingivally and toward the longitudinal axis L along the second ramped surface 2814. The second ramped surface 2814 terminates at a corner 2815. The second ramped surface 2814, the corner 2815, and a portion 2816 of the exterior surface 2819 on the other side of the corner 2815 together comprise a shoulder 2823 that is configured to engage a protrusion on a securing member 2900 when the attachment portion 2800 is secured to the securing member 2900 to oppose rotational and/or translational movement of the arm 2806. As described in greater detail below, the first ramped surface 2817 can be configured to force the arm 2806 to bend or rotate (e.g., at the first arm region 2806*a*, etc.) when engaging a protrusion of the securing member 2900 during engagement and/or disengagement.

Figure 29:
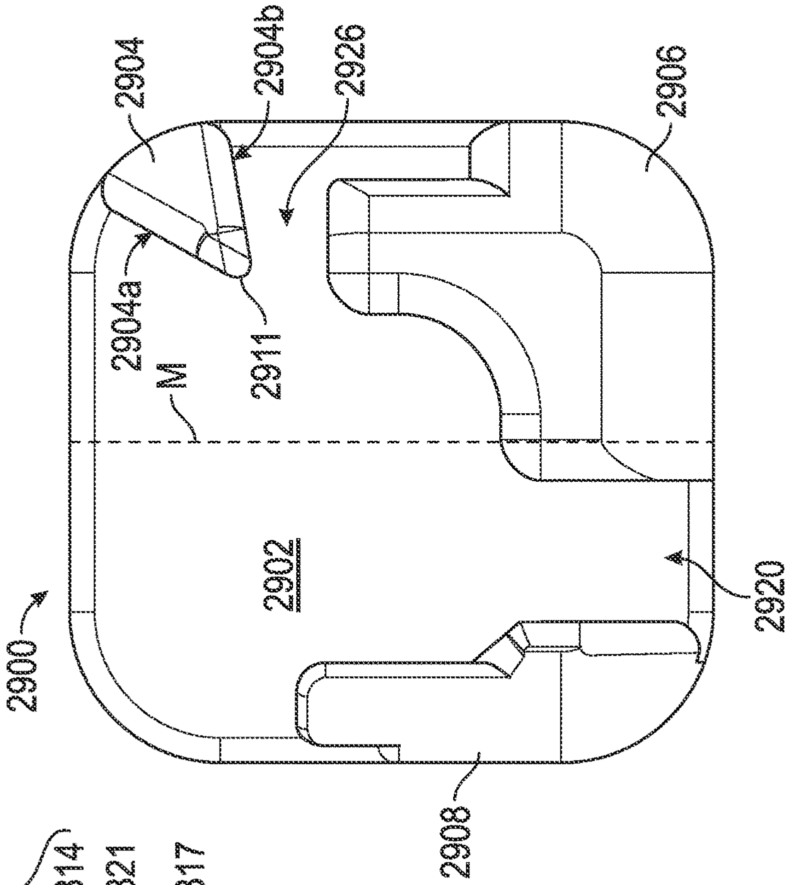
FIG. 29 is a front view of a securing member configured in accordance with several embodiments of the present technology.

FIG. 29 is a front view of the securing member 2900 configured for use with the attachment portion 2800. The securing member 2900 has a first side (facing out of the page) and a second side (not visible in FIG. 29) opposite the first side along a thickness of the securing member 2900 and configured to be bonded to a patient's tooth. The securing member 2900 can comprise a backing 2902 and a plurality of protrusions (e.g., first protrusion 2904, second protrusion 2906, third protrusion 2908, etc.) carried by and extending away from the first side of the backing 2902 along a buccolingual dimension. The protrusions 2904, 2906, 2908 can be configured to engage the attachment portion 2800 to retain the attachment portion 2800 at a specific location relative to the backing 2902 and the patient's tooth.

The first protrusion 2904 can be configured to engage the shoulder 2823 of the arm 2806 of the attachment portion 2800 to prevent or limit motion of the attachment portion 2800 in an occlusal direction and a mesial or distal direction. The first protrusion 2904 can be positioned at an occlusal portion of the backing 2902. In some embodiments, the first protrusion 2904 is positioned to a side of a mesiodistal midline M of the backing 2902. The first protrusion 2904 can be positioned near a perimeter of the backing 2902, for example as shown in FIG. 29, or can be positioned away from the perimeter and towards an intermediate portion of the backing 2902. The first protrusion 2904 can have a first surface 2904*a* and a second surface 2904*b*. In some embodiments, the first surface 2904*a* is angled with respect to the second surface 2904*b*. In some embodiments, the first surface 2904*a* can be substantially perpendicular to a first plane in which the occlusogingival dimension and the mesiodistal dimension lie, angled relative to a second plane in which the buccolingual dimension and the mesiodistal dimension lie, and angled relative to a third plane in which the buccolingual dimension and the occlusogingival dimension lie. The first surface 2904*a* can be slanted such that a gingival edge of the first surface 2904*a* is closer to the mesiodistal midline M than an occlusal edge of the first surface 2904*a*. In some embodiments, the second surface 2904*b* can be substantially perpendicular to the first plane in which the occlusogingival dimension and the mesiodistal dimension lie, angled relative to the second plane in which the buccolingual dimension and the mesiodistal dimension lie, and angled relative to the third plane in which the buccolingual dimension and the occlusogingival dimension lie. The second surface 2904*b* can be slanted such that a gingival edge of the second surface 2904*b* is closer to the mesiodistal midline M than an occlusal edge of the second surface 2904*b*. In some embodiments, the mesial edges of the first surface 2904*a* and the second surface 2904*b* are continuous with one another at a corner 2911.

The second protrusion 2906 and/or the third protrusion 2908 can be carried by the backing 2902 at positions opposite the first protrusion 2904 along one or more dimensions. The second protrusion 2906 and/or the third protrusion 2908 can be positioned at a gingival portion of the backing 2902, for example. As shown in FIG. 29, in some embodiments the second protrusion 2906 is spaced apart from the first protrusion 2904 by a gap 2926 along the occlusogingival dimension, and spaced apart from the third protrusion 2908 by a gap 2920 along the mesiodistal dimension. The gap 2920 can be sized to at least partially receive the portion of the connector 2803 connected to the head 2802 of the attachment portion 2800.

As shown in FIG. 29, the second protrusion 2906 can be positioned on the same side of the backing 2902 along the mesiodistal dimension (e.g., on the same side of the mesiodistal midline M) as the first protrusion 2904. In some embodiments, the second protrusion 2906 has a first region 2906*a* extending lingually (or buccally, depending on which side of the tooth the securing member 2900 is attached) away from the backing 2902. The second protrusion 2906 can also include a second region 2906*b* extending away from the first region 2906*a* towards an intermediate portion of the securing member 2900 and spaced apart from the backing 2902 by a gap 2922 along the buccolingual dimension. The gap 2922 can have a depth that is slightly greater than a thickness t of the attachment portion 2800 so that the attachment portion 2800 can fit between the second region of the second protrusion 2906 and the backing 2902. The second protrusion 2906 can also include an inner surface 2916 (only visible in FIG. 30B) configured to engage the seventh base region 2804*g* of the attachment portion 2800 and prevent or limit mesial or distal movement and gingival movement of the seventh base region 2804*g*. In some embodiments, the inner surface 2916 has a contour based at least in part on a contour of the exterior surface 2619. The second region 2806*b* of the second protrusion 2906 can include an inner surface (not visible) facing towards the backing 2902 and configured to prevent or limit lingual (or buccal) movement of the first arm region 2806*a* and/or the seventh base region 2804*g*. As such, the second protrusion 2906 prevents or limit movement of the seventh base region 2804*g* and/or the first arm region 2806*a* in at least three directions, for example by functioning as a side, bottom, and front stop.

The third protrusion 2908 can be positioned on the opposite side of the backing 2902 along the mesiodistal dimension from the first protrusion 2904 and/or the second protrusion 2906, or at least spaced apart from the first protrusion 2904 and/or the second protrusion 2906 along a mesiodistal dimension. In some embodiments, the third protrusion 2908 can have a first region 2908*a* extending lingually (or buccally, depending on which side of the tooth the securing member 2900 is attached) away from the backing 2902. The third protrusion 2908 can have a second region 2908*b* extending away from the first region towards an intermediate portion of the securing member 2900 and spaced apart from the backing 2902 by a gap along the buccolingual dimension. The gap can have a depth that is slightly greater than a thickness t of the attachment portion 2800 so that the attachment portion 2800 can fit between the second region and the backing 2902. In some embodiments, the depth of the gap can be similar to the depth of the gap 2922 between the second region 2906*b* of the second protrusion 2906 and the backing 2902. The third protrusion 2908 can also include an inner surface facing towards the backing 2902 and configured to prevent or limit lingual (or buccal) movement of the base 2804. The base 2804 (or one or more portions thereof) can be configured to be positioned between the third protrusion 2908 and the backing 2902. For example, as shown in FIGS. 30A and 30B, the third base region 2804*c* and the sixth base region 2804*f* can each be at least partially restrained between the third protrusion 2908 and the backing 2902 in the secured position. The third protrusion 2908 can have an inner surface 2918 configured to engage the third base region 2804*c* and/or the sixth base region 2804*f*. As shown in FIGS. 28-30B, the first protrusion 2804, the second protrusion 2806, and/or the third protrusion 2808 can have different shapes and/or sizes.

Referring to FIGS. 30A and 30B, in the secured state, the attachment portion 2800 can be positioned proximate and/or against the backing 2902 of the securing member 2900 and bound between the first, second, and third protrusions 2904, 2906, 2908. The connector 2803 can be positioned between the second protrusion 2906 and the third protrusion 2908 (e.g., within the gap 2920). Additionally or alternatively, the first base region 2804*a* can be positioned buccolingually between the third protrusion 2908 and the backing 2902 and the first arm region 2806*a* can be positioned buccolingually between the second protrusion 2906 and the backing 2902. In the secured state, the protuberance 2836 can be positioned occlusogingivally between the first protrusion 2904 and the second protrusion 2906 (e.g., within gap 2926).

The attachment portion 2800 can comprise a resilient and/or superelastic material such that, when the attachment portion 2800 is braced between the first, second, and third protrusions 2904, 2906, 2908, the attachment portion 2800 actively exerts an outward force on the surrounding surfaces. For example, the second ramped surface 2814 of the protuberance 2836 of the attachment portion 2800 can engage the gingivally-facing second surface 2904*b* of the first protrusion 2904 of the securing member 2900. The portion 2816 of the exterior surface 2819 can abut and press mesially or distally against the first surface 2904*a* and/or the corner 2911 of the first protrusion 2904 of the securing member 2900. The exterior surface 2827 of the seventh base region 2804*g* can abut and press mesially or distally and gingivally against the inner surface 2916 of the second protrusion 2906 of the securing member 2900. The exterior surface 2819 and/or the front surface of the arm 2806 along the first arm region 2806*a* may or may not abut the second protrusion 2906 of the securing member 2900 in the secured state. The exterior surface 2827 of the base 2804 can abut and press gingivally and mesially or distally against the inner surface 2918 of the third protrusion 2908 of the securing member 2900. Accordingly, the aforementioned surfaces of the attachment portion 2800 and the securing member 2900 that are configured to engage one another when the attachment portion 2800 is in the secured position can comprise securing surfaces.

In the secured position, the attachment portion 2800 is releasably secured to the securing member 2900 such that it cannot be inadvertently displaced or prematurely or inadvertently released by typical patient activity (such as chewing). The attachment portion 2800 (or one or more portions thereof) can be configured to press outwardly on the securing member 2900 when in the secured position. The active and/or continuous outward force exerted by the attachment portion 2800 on the securing member 2900 advantageously eliminates or reduces play between the attachment portion 2800 and securing member 2900 along a mesiodistal dimension, an occlusogingival dimension, and/or a buccolingual dimension, thus providing a more accurate and efficient transfer of force from the appliance to the tooth. In some embodiments, the attachment portion 2800 (or one or more portions thereof) does not chronically press outwardly on the securing member 2900 and is instead configured to engage the securing member 2900 if the attachment portion 2800 moves into contact with and/or moves such that it exerts a force on one or more portions of the securing member 2900. Thus, the securing member 2900 can be configured to limit movement of the attachment portion 2800 relative to the securing member 2900. In some embodiments, one or more of the securing surfaces is configured for transferring orthodontic force between the attachment portion 2800 (e.g., to and/or from the connector 2803, to and/or from the rest of the appliance, etc.) and the securing member 2900 (e.g., to and/or from the tooth, etc.). In various embodiments, one or more of the securing surfaces does not substantially transfer orthodontic force between the attachment portion 2800 and the securing member 2900.

The attachment portion 2800 of FIGS. 28, 30A and 30B can be secured to the securing member 2900 by positioning the attachment portion 2800 proximate the securing member 2900 and moving the attachment portion 2800 along an occlusogingival path. The connector 2803 or other portion of the appliance continuous with the head 2802 of the attachment portion 2800 can be positioned relative to the securing member 2900 such that at least a portion of the head 2802 is positioned occlusally of the first protrusion 2904 of the securing member 2900 and/or at, near, and/or occlusally of an occlusal edge of the backing 2902. The portion of the connector 2803 connected to the head 2802 can be positioned within the mesiodistal gap 2920 between the second and third protrusions 2906, 2908 of the securing member 2900. In some embodiments, the back surface of the attachment portion 2800 can be positioned proximate and/or in contact with the backing 2902 of the securing member 2900. In some embodiments, the operator slides the connector 2803 and head 2802 occlusogingivally by positioning a tool (e.g., tool 800) within the opening 2830 and/or the interior region 2822 and moving the tool occlusogingivally. The tool can contact the fourth base region 2804*d* (or the first arm region 2806*a* if positioned in the interior region 2822) when sliding the tool gingivally to insert the attachment portion 2800. In any case, continued gingival movement of the connector 2803 and/or head 2802 forces the first ramped surface 2817 at the protuberance 2836 into contact with the corner 2911 of the first protrusion 2904. Because the exterior surface 2819 along the first ramped surface 2817 faces gingivally and is angled toward the first protrusion 2904 during the securing process, the occlusally-oriented force applied to the exterior surface 2819 along the first ramped surface 2817 when the first ramped surface 2817 contacts the first protrusion 2904 forces the first arm region 2806*a* to bend. Once the corner 2821 of the attachment portion 2800 between the first ramped surface 2817 and the second ramped surface 2814 of the shoulder 2823 is positioned gingival of the corner 2911 of the first protrusion 2904, the resilient arm 2806 and/or one or more portions thereof (e.g., the first arm region 2806*a*, etc.) bends back towards its shape in the relaxed state, thereby wedging the attachment portion 2800 between the first, second, and third protrusions 2904, 2906, 2908, as shown in FIGS. 30A and 30B. Accordingly, one or more regions of the attachment portion 2800 can comprise a flexure 2832 configured to bend and/or otherwise deform to facilitate securing of the attachment portion 2800 to the securing member 2900. In some embodiments, the flexure 2832 comprises the first arm region 2806*a*. The first arm region 2806*a*, for example, can be configured to bend in a first direction to facilitate or enable sliding of the attachment portion 2800 gingivally of the first protrusion 2904 to secure to the securing member 2900 and/or the first arm region 2806*a* can be configured to bend in a second, opposite direction to facilitate or enable locking of the attachment portion 2800 to the securing member 2900. In some embodiments, deformation of the flexure 2832 causes one or more portions of the attachment portion 2800 to rotate (e.g., bending of the first arm region 2806*a* can cause the second-fourth arm regions 2806*b*-2806*d* to rotate about the buccolingual dimension). Moreover, the flexure 2832 can comprise other regions of the attachment portion 2800 in addition to or instead of the first arm region 2806*a* including, but not limited to, the second arm region 2806*b*, the third arm region 2806*c*, the fourth arm region 2806*d*, one or more of the bends 2820, the base 2804, etc.

To release the attachment portion 2800 from the securing member 2900, the attachment portion 2800 can be configured to deform and/or rotate relative to the securing member 2900. For example, an operator can insert a tool, such as the distal end surface 808 of tool 800, into the interior region 2822 defined by the arm 2806. An occlusal end of the tool surface can be positioned proximate the interior surface 2818 of the arm 2806 along the third arm region 2806*c* and a gingival end of the tool surface can be positioned proximate the first arm region 2806*a*. The operator can rotate the tool about a buccolingual dimension (e.g., rotating the tool surface away from the first protrusion 2904 and/or towards the fourth arm region 2806*d*, etc.) such that an occlusal portion of the tool surface engages and pushes against the fourth arm region 2806*d* while the gingival portion of the tool surface engages the first arm region 2806*a*. When the gingival portion of the tool surface can no longer move relative to the first arm region 2806*a*, the occlusal portion of the tool surface has good and/or maximum leverage against the fourth arm region 2806*d*. The tool can displace the fourth arm region 2804*d* and thereby force the second and third arm regions 2806*b* and 2806*c* to rotate with the tool surface. This causes the arm 2806 to bend at the flexure 2832, which can include the first arm region 2806*a*. The arm 2806 can bend such that the second ramped surface 2814 slides gingivally and mesiodistally along the second surface 2904*b* of the first protrusion 2904 and away from the first protrusion 2904 to release the attachment portion 2800 from the securing member 2900. In some embodiments, the attachment portion 2800 can pop or snap free of the securing member 2900 once the second ramped surface 2814 clears the first protrusion 2904. With or without the tool, the attachment portion 2800 can be moved occlusally until the wider gingival region of the head 2802 clears an occlusal surface of the second and third protrusions 2906, 2908, at which point the attachment portion 2800 can be pulled away from the backing 2902 along the buccolingual dimension.

The attachment portion 2800 can comprise a leveraging surface 2834 configured to engage a tool to facilitate deformation of the attachment portion 2800 to cause the attachment portion 2800 to release from the securing member 2900. In some embodiments, the fourth arm region 2806*d* of the attachment portion 2800 of FIGS. 28, 30A and 30B can have the leveraging surface 2834. Additionally or alternatively, the third arm region 2806*c*, the second arm region 2806*b*, the first arm region 2806*a*, and/or the base 2804 can have the leveraging surface 2834. In some embodiments, the attachment portion 2800 comprises multiple leveraging surfaces 2834.

The location at which the connector 2803 connects to the head 2802, a dimension along which the connector 2803 extends, a property of the connector 2803, etc. can be at least partially based on a force to be imparted on a tooth to which the attachment portion 2800 is configured to be secured (and/or an intended movement of the tooth). For example, as previously noted, the attachment portion 2800 can be configured to release from the securing member 2900 when the second ramped surface 2814 slides gingivally along the second surface 2904*b* of the first protrusion 2904 and/or mesiodistally away from the first protrusion 2904 (e.g., when the head 2802 rotates about the buccolingual dimension). Thus, to avoid any movement of a connector 2803 causing sliding of the second ramped surface 2814 relative to the second surface 2904*b* during treatment, the connector 2803 can connect to a portion of the attachment portion 2800 away from the arm 2806, and in particular in a location that would not cause movement of the arm 2806 in any way that is biased towards disengagement from the securing member 2900. In some cases, for example as shown in FIG. 28, the connector 2803 is continuous with the base 2804 of the head 2802 but not the arm 2806. Such a configuration can prevent or limit the connector 2803 from applying forces to the arm 2806 that inadvertently cause the flexure 2832 to deform during orthodontic treatment. Movement of the fourth arm region 2806*d* of the attachment portion 2800 in response to forces applied to the fourth arm region 2806*d* by a tool at the leveraging surface 2834 can cause the attachment portion 2800 to release from the securing member 2900. Accordingly, in some embodiments no connectors attach to the leveraging surface 2834 and/or the fourth arm region 2806*d* so that little to no force is applied to the leveraging surface 2834 and/or the fourth arm region 2806*d* during the normal course of treatment. Because the sixth base region 2804*f* is not obstructed occlusally and mesially or distally (away from the mesiodistal midline M and/or opposite the mesiodistal gap 2920), the head 2802 can be continuous with a mesiodistally extending connector at the sixth base region 2804*f*. The location at which the connector 2803 connects to the head 2802, a dimension along which the connector 2803 extends, a property of the connector 2803, etc. can at least partially be based on the mechanism by which the attachment portion 2800 is attached and/or detached to the securing member 2900 and/or the geometry of the securing member 2900.

Figure 31:
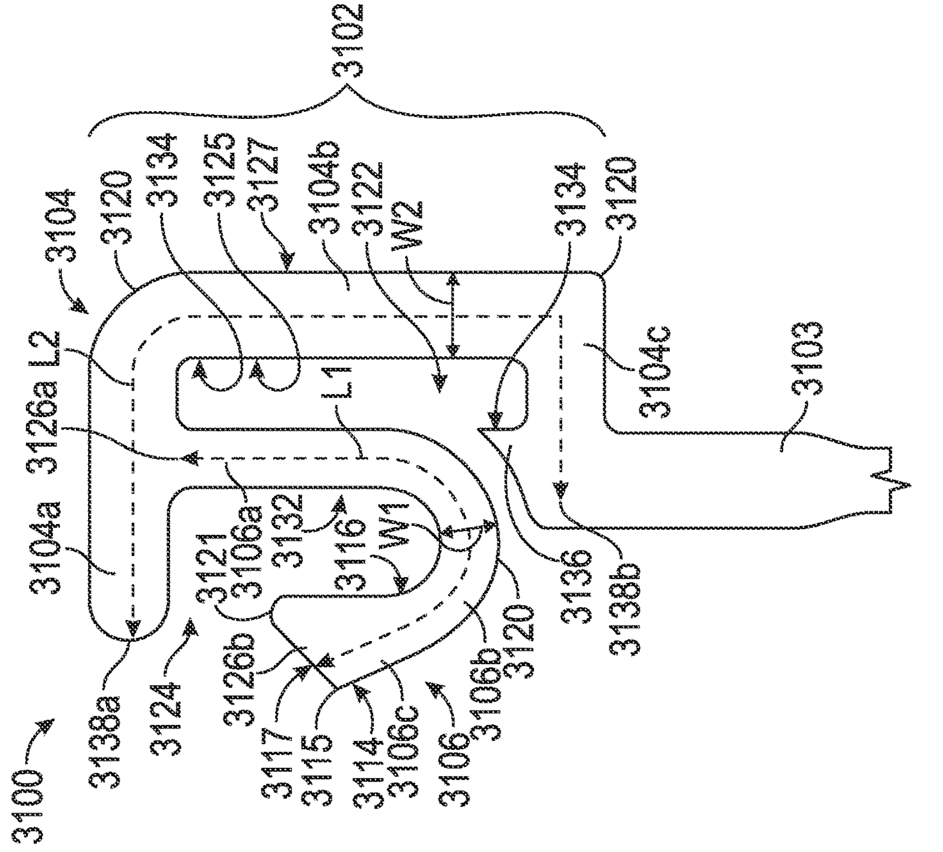
FIG. 31 is a front view of an attachment portion configured in accordance with several embodiments of the present technology.

In some embodiments, an attachment portion can comprise an arm configured to deform to facilitate securing and release of the attachment portion from a securing member as well as a base including one or more leveraging surfaces configured to receive a force tending to cause rotation of the attachment portion and release of the attachment portion from the securing member. Additionally or alternatively, an attachment portion of the present technology may not comprise a shoulder configured to conformably engage a protrusion of a securing member to secure to the securing member. Some attachment portions disclosed herein have a surface configured to frictionally engage a protrusion of a securing member to secure to the securing member. FIG. 31 shows a planar view of an example attachment portion 3100 having such features. The attachment portion 3100 can be configured to be secured to a patient's tooth via a securing member, such as securing member 3200 shown in FIG. 32. The attachment portion 3100 and the securing member 3200 are shown in a secured arrangement in FIGS. 33A and 33B. As discussed in greater detail below, the attachment portion 3100 and the securing member 3200 can be configured such that the attachment portion 3100 can be releasably secured to the securing member 3200. The attachment portion 3100 can be continuous with a connector 3103 that connects the attachment portion 3100 to one or more additional portions of an orthodontic appliance (not shown).

Referring to FIG. 31, the attachment portion 3100 can comprise a head 3102. In some embodiments, the attachment portion 3100 comprises a head 3102 and at least a portion of a connector 3103 that is continuous with the head 3102. The connector 3103, for example, can comprise a second connector as previously described herein and/or can extend gingivally away from a gingival portion of the head 3102. The connector 3103 can have features similar to any of the connectors disclosed herein (e.g., first connectors, second connectors, third connectors, etc.) and can comprise a single connector or multiple connectors. For example, the connector 3103 can comprise a single, occlusogingivally extending connector, multiple occlusogingivally extending connectors, one or more occlusogingivally extending connectors and one or more mesiodistally extending connectors branching off of the one or more occlusogingivally extending connectors and/or the attachment portion, or one or more mesiodistally extending connectors (and no occlusogingivally extending connectors). Accordingly, the attachment portion 3100 can be connected to a single connector or multiple connectors 3103. The connectors 3103 can connect to the head 3102 at a variety of locations. For example, a gingivally extending connector 3103 can connect to a gingival portion of the head 3102. Any of the connectors 3103 disclosed herein can extend away from the head 3102 along a variety of dimensions (e.g., along an occlusogingival dimension, a mesiodistal dimension, a buccolingual dimension, etc.).

In some embodiments, the head 3102 and the connector 3103 are part of the same, monolithic piece of material (e.g., cut from a sheet of material, a 3D-printed piece, etc.). Thus, the head 3102 and the connector 3103 may refer to different portions of the same continuous component. The attachment portion 3100 can be one portion of a greater orthodontic appliance, or may be formed separately and attached to an orthodontic appliance. The attachment portion 3100 and/or the corresponding appliance can be cut from the same sheet of material and/or may be formed by molding, casting, machining, 3D printing, stamping, extruding, or the like. The attachment portion 3100 may comprise a metal or a plastic and may have superelastic and/or shape memory properties. In some embodiments, the attachment portion 3100 does not have superelastic and/or shape memory properties.

The head 3102 of the attachment portion 3100 can comprise a base 3104 and an arm 3106 extending from the base 3104. The arm 3106 can be configured to bend and/or rotate relative to the base 3104 while the attachment portion 3100 is being secured to and/or released from the securing member 3200. In some embodiments, the arm 3106 comprises an elongate member having a first end portion 3126*a*, a second end portion 3126*b*, and a longitudinal axis L1 extending between the first and second end portions 3126*a*, 3126*b*. The arm 3106 can include a plurality of bends 3120 along its longitudinal axis L1 that are configured to preferentially flex to facilitate securing and/or release of the attachment portion 3100 to a securing member. The base 3104 can comprise an elongate member having a first end portion 3138*a*, a second end portion 3138*b*, and a longitudinal axis L2 extending between the first and second end portions 3138*a*, 3138*b*. As shown in FIG. 31, in some embodiments the base 3104 and the arm 3106 least partially enclose and define an interior region 3122. As discussed in greater detail herein, the interior region 3122 can be sized to receive a tool configured to release the attachment portion 3100 from a securing member (such as securing member 3200). Additionally or alternatively, the interior region 3122 can be sized to receive a tool to facilitate securing of the attachment portion 3100 to the securing member 3200.

The head 3102 can have a front surface (facing out of the page) and a back surface (not visible in FIG. 31), and a thickness t (labeled in FIG. 33A) measured between the front and back surfaces. The arm 3106 of the attachment portion 3100 can have a first surface 3114 and a second surface 3116 opposite the first surface 3114 along a width w1 of the arm 3106. The arm 3106 can also have a ramped surface 3117 extending between the first surface 3114 and the second surface 3116. The arm 3106 can comprise a first corner 3115 at an edge between the first surface 3114 and the ramped surface 3117 and a second corner 3121 at an edge between the ramped surface 3117 and the second surface 3116. The first corner 3115 and/or the second corner 3121 can be curved. The base 3104 can have an interior surface 3125 facing the interior region 3122, an exterior surface 3127 facing away from the interior region 3122, and a width w2 measured between the interior and exterior surfaces 3125, 3127. The base 3104 and/or arm 3106 can have a substantially constant thickness or may have a varying thickness. Likewise, the base 3104 and/or arm 3106 can have a substantially constant width or may have a varying width. A width and/or thickness of the base 3104 and/or arm 3106 can be varied to impart a preferred stiffness profile to all or a portion of the base 3104 and/or arm 3106.

The base 3104 can include a first base region 3104*a* extending along a generally mesiodistal dimension and being continuous with and disposed at the first arm region 3106*a*, a second base region 3104*b* continuous with and extending away from an end of the first base region 3104*a* along a generally gingival dimension, and a third base region 3104*c* continuous with and extending away from an end of the second base region 3104*b* along a generally mesiodistal dimension. In some embodiments, the third base region 3104*c* is continuous with the connector 3103. As shown in FIG. 31, the third base region 3104*c* can include a protuberance 3136. In some embodiments, the base 3104 has more or fewer regions.

Figure 33B:
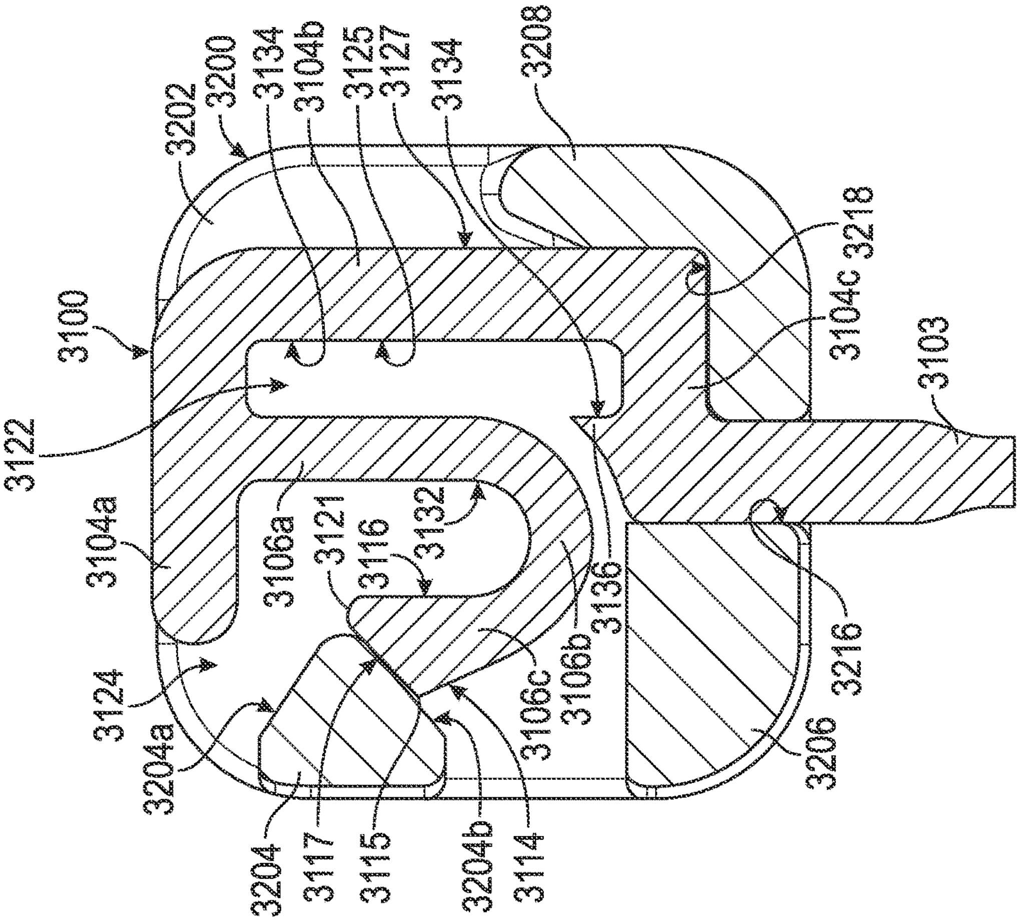
FIGS. 33A and 33B are different views of an attachment portion secured to a securing member in accordance with several embodiments of the present technology.
Figure 33A:
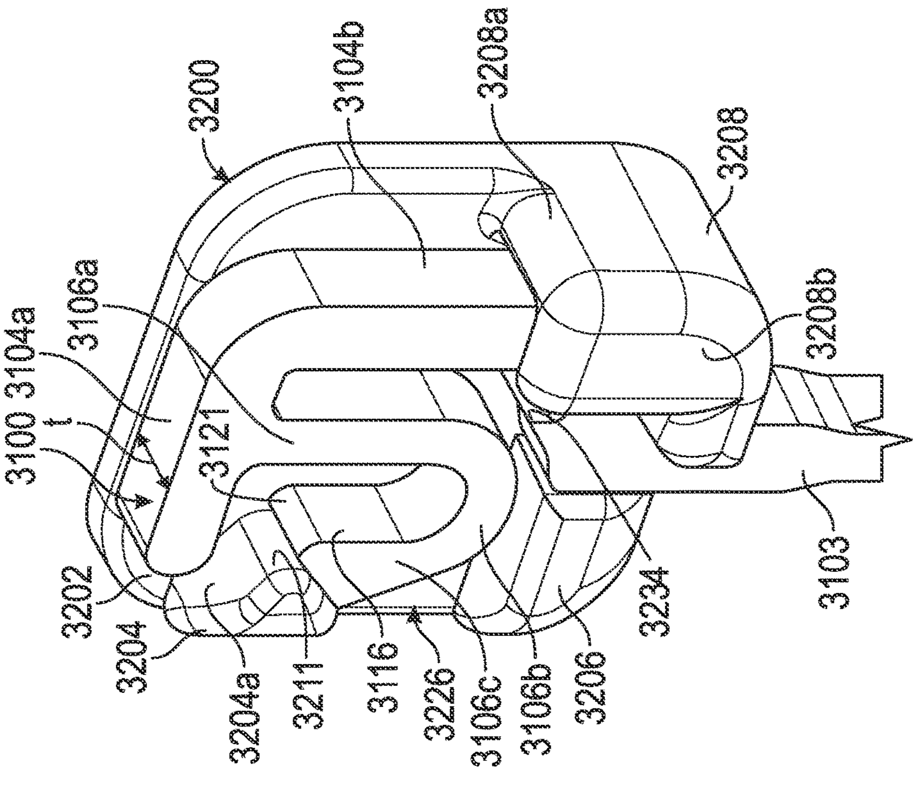

The arm 3106 can extend away from the base 3104 along the occlusogingival dimension, the mesiodistal dimension, and/or the buccolingual dimension. For example, the arm 3106 can extend mesiodistally and gingivally away from the base 3104. As shown in FIG. 31, the arm 3106 can be substantially hook shaped. In some embodiments, the first end portion 3126*a* of the arm 3106 is continuous with and/or disposed at the first base region 3104*a*. At least when the attachment portion 3100 is in a relaxed (unsecured) state (as shown in FIG. 31), the second end portion 3126*b* of the arm 3106 can be spaced apart from the first end portion 3126*a* of the arm 3106 and/or the first base region 3104*a* along an occlusogingival dimension by a gap 3124 that is continuous with the interior region 3122. In some embodiments, the second end portion 3126*b* of the arm 3106 and the first end portion 3126*a* and/or the first base region 3104*a* can be spaced apart by the gap 3124 even when the attachment portion 3100 is in a compressed (secured) state (for example as shown in FIGS. 33A and 33B). The second end portion 3126*b* and the first end portion 3126*a* and/or the first base region 3104*a* can be spaced apart along an occlusogingival dimension, a mesiodistal dimension, and/or a buccolingual dimension.

The arm 3106 can include a first arm region 3106*a* extending gingivally away from the first end portion 3126*a* of the arm 3106, a second arm region 3106*b* continuous with and extending occlusogingivally and mesiodistally away from an end of the first arm region 3106*a* along a curved and/or bent path, and a third arm region 3106*c* continuous with and extending occlusally away from an end of the second arm region 3106*b*. In some embodiments, the arm 3106 has more or fewer portions along its longitudinal axis L1. In some embodiments, the second arm region 3106*b* is curved. In some embodiments, the second arm region 3106*b* is configured to be concave occlusally, thereby biasing the arm 3106 to bend at or near the second arm region 3106*b* during securement and/or release of the attachment portion 3100 from a securing member.

According to various embodiments, one or more regions of the arm 3106 can include a portion along which the width w of the arm 3106 is greater than along the rest of the arm 3106. For example, as shown in FIG. 31, the arm 3106 can include a protuberance 3136 at an exterior side of the second arm region 3106*b*. Along the protuberance 3136, the exterior surface 3119 of the arm 3106 forms first and second ramped surfaces 3117 and 3114 that meet at a corner 3121. The exterior surface 3119 extends occlusally and away from the longitudinal axis L along the first ramped surface 3117 until turning at the corner 3121 and extending gingivally and toward the longitudinal axis L along the second ramped surface 3114. The second ramped surface 3114 terminates at a corner 3115. The second ramped surface 3114, the corner 3115, and a portion 3116 of the exterior surface 3119 on the other side of the corner 3115 together comprise a shoulder 3123 that is configured to engage a protrusion on a securing member 3200 when the attachment portion 3100 is secured to the securing member 3200 to oppose rotational and/or translational movement of the arm 3106. As described in greater detail below, the first ramped surface 3117 can be configured to force the arm 3106 to bend or rotate (e.g., at the first arm region 3106*a*, etc.) when engaging a protrusion of the securing member 3200 during engagement and/or disengagement.

Figure 32:
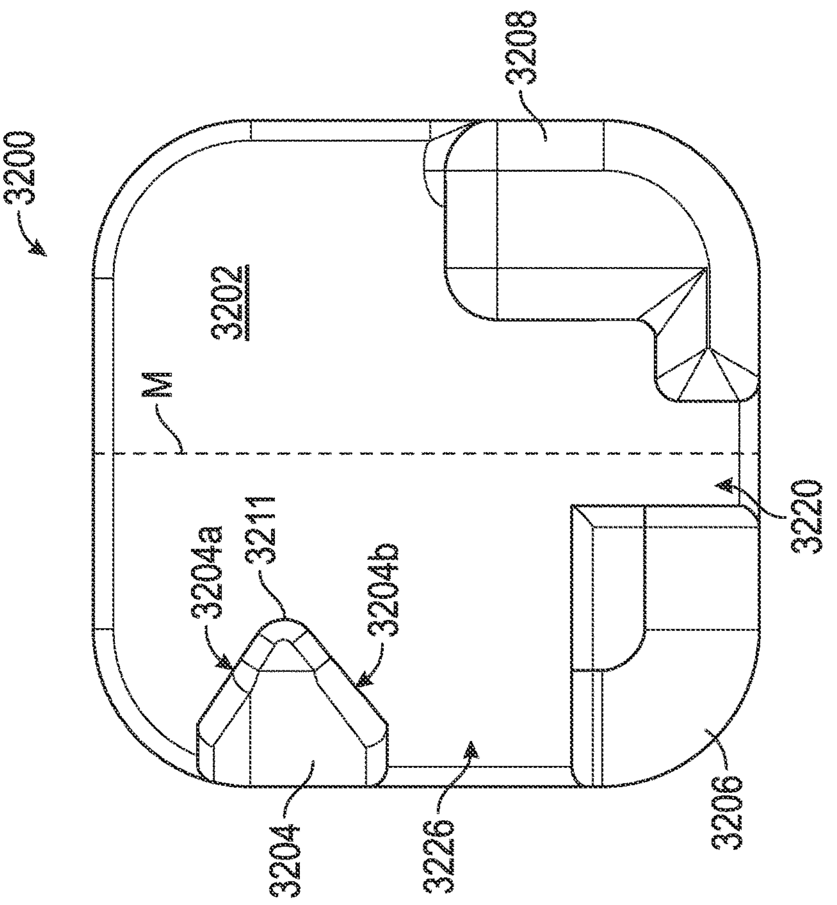
FIG. 32 is a front view of a securing member configured in accordance with several embodiments of the present technology.

FIG. 32 is a front view of the securing member 3200 configured for use with the attachment portion 3100. The securing member 3200 has a first side (facing out of the page) and a second side (not visible in FIG. 32) opposite the first side along a thickness of the securing member 3200 and configured to be bonded to a patient's tooth. The securing member 3200 can comprise a backing 3202 and a plurality of protrusions (e.g., first protrusion 3204, second protrusion 3206, third protrusion 3208, etc.) carried by and extending away from the first side of the backing 3202 along a buccolingual dimension. The protrusions 3204, 3206, 3208 can be configured to engage the attachment portion 3100 to retain the attachment portion 3100 at a specific location relative to the backing 3202 and the patient's tooth.

The first protrusion 3204 can be configured to engage the shoulder 3123 of the arm 3106 of the attachment portion 3100 to prevent or limit motion of the attachment portion 3100 in an occlusal direction and a mesial or distal direction. The first protrusion 3204 can be positioned at an occlusal portion of the backing 3202. In some embodiments, the first protrusion 3204 is positioned to a side of a mesiodistal midline M of the backing 3202. The first protrusion 3204 can be positioned near a perimeter of the backing 3202, for example as shown in FIG. 32, or can be positioned away from the perimeter and towards an intermediate portion of the backing 3202. The first protrusion 3204 can have a first surface 3204*a* and a second surface 3204*b*. In some embodiments, the first surface 3204*a* is angled with respect to the second surface 3204*b*. In some embodiments, the first surface 3204*a* can be substantially perpendicular to a first plane in which the occlusogingival dimension and the mesiodistal dimension lie, angled relative to a second plane in which the buccolingual dimension and the mesiodistal dimension lie, and angled relative to a third plane in which the buccolingual dimension and the occlusogingival dimension lie. The first surface 3204*a* can be slanted such that a gingival edge of the first surface 3204*a* is closer to the mesiodistal midline M than an occlusal edge of the first surface 3204*a*. In some embodiments, the second surface 3204*b* can be substantially perpendicular to the first plane in which the occlusogingival dimension and the mesiodistal dimension lie, angled relative to the second plane in which the buccolingual dimension and the mesiodistal dimension lie, and angled relative to the third plane in which the buccolingual dimension and the occlusogingival dimension lie. The second surface 3204*b* can be slanted such that an occlusal edge of the second surface 3204*b* is closer to the mesiodistal midline M than an occlusal edge of the second surface 3204*b*. In some embodiments, the mesial edges of the first surface 3204*a* and the second surface 3204*b* are continuous with one another at a corner 3211.

The second protrusion 3206 and/or the third protrusion 3208 can be carried by the backing 3202 at positions opposite the first protrusion 3204 along one or more dimensions. The second protrusion 3206 and/or the third protrusion 3208 can be positioned at a gingival portion of the backing 3202, for example. As shown in FIG. 32, in some embodiments the second protrusion 3206 is spaced apart from the first protrusion 3204 by a gap 3226 along the occlusogingival dimension, and spaced apart from the third protrusion 3208 by a gap 3220 along the mesiodistal dimension. The gap 3220 can be sized to at least partially receive the portion of the connector 3103 connected to the head 3102 of the attachment portion 3100.

As shown in FIG. 32, the second protrusion 3206 can be positioned on the same side of the backing 3202 along the mesiodistal dimension (e.g., on the same side of the mesiodistal midline M) as the first protrusion 3204. In some embodiments, the second protrusion 3206 extends lingually (or buccally, depending on which side of the tooth the securing member 3200 is attached) away from the backing 3202. As shown in FIG. 33A, the second protrusion 3206 may not include a second region and a gap along the buccolingual dimension as described with respect to other securing members disclosed herein. In some embodiments, the second protrusion 3206 does include a second region extending towards an intermediate portion of the securing member 3200 to define a buccolingual gap between the second protrusion 3206 and the backing 3202. As shown in FIG. 33B, the second protrusion 3206 can include a securing surface 3216 configured to engage the third base region 3104*c* and/or the connector 3103 to prevent or limit mesial or distal movement of the third base region 3104*c* and/or the connector 3103.

The third protrusion 3208 can be positioned on the opposite side of the backing 3202 along the mesiodistal dimension from the first protrusion 3204 and/or the second protrusion 3206, or at least spaced apart from the first protrusion 3204 and/or the second protrusion 3206 along a mesiodistal dimension. In some embodiments, the third protrusion 3208 can have a first region 3208*a* extending lingually (or buccally, depending on which side of the tooth the securing member 3200 is attached) away from the backing 3202. The third protrusion 3208 can have a second region 3208*b* extending away from the first region towards an intermediate portion of the securing member 3200 and spaced apart from the backing 3202 by a gap along the buccolingual dimension. The gap can have a depth that is slightly greater than a thickness t of the attachment portion 3100 so that the attachment portion 3100 can fit between the second region and the backing 3202. The third protrusion 3208 can also include an inner surface facing towards the backing 3202 and configured to prevent or limit lingual (or buccal) movement of the base 3104. The base 3104 (or one or more portions thereof) can be configured to be positioned between the third protrusion 3208 and the backing 3202. For example, as shown in FIGS. 33A and 33B, the second base region 3104*b* and/or the third base region 3104*c* can be at least partially restrained between the third protrusion 3208 and the backing 3202 in the secured position. The third protrusion 3208 can have a securing surface 3218 configured to engage the second base region 3104*b* and/or the third base region 3104*c*. As shown in FIGS. 31-33B, the first protrusion 3104, the second protrusion 3106, and/or the third protrusion 3108 can have different shapes and/or sizes.

Referring to FIGS. 33A and 33B, in the secured state, the attachment portion 3100 can be positioned proximate and/or against the backing 3202 of the securing member 3200 and bound between the first, second, and third protrusions 3204, 3206, 3208. The connector 3103 can be positioned between the second protrusion 3206 and the third protrusion 3208 (e.g., within the gap 3220). Additionally or alternatively, the second base region 3104*b* and/or the third base region 3104*c* can be positioned buccolingually between the third protrusion 3208 and the backing 3202 and the third arm region 3106*c* can be positioned occlusogingivally between the first protrusion 3204 and the second protrusion 3206 (e.g., within gap 3226).

The attachment portion 3100 can comprise a resilient and/or superelastic material such that, when the attachment portion 3100 is braced between the first, second, and third protrusions 3204, 3206, 3208, the attachment portion 3100 actively exerts an outward force on the surrounding surfaces. For example, the ramped surface 3117 of the arm 3106 can engage the second surface 3204*b* of the first protrusion 3204 of the securing member 3200 and can abut and press mesially or distally and/or gingivally against the second surface 3204*b* and/or the corner 3211 of the first protrusion 3204. The third base region 3104*c* and/or the connector 3203 can abut and press mesially or distally against the inner surface 3216 of the second protrusion 3206 of the securing member 3200. The second base region 3104*b*, the third base region 3104*c*, and/or the connector 3203 can abut and press mesially or distally and gingivally against the securing surface 318 of the third protrusion 3208 of the securing member 3200. Accordingly, the aforementioned surfaces of the attachment portion 3100 and the securing member 3200 that are configured to engage one another when the attachment portion 3100 is in the secured position can comprise securing surfaces.

In the secured position, the attachment portion 3100 is releasably secured to the securing member 3200 such that it cannot be inadvertently displaced or prematurely or inadvertently released by typical patient activity (such as chewing). The attachment portion 3100 (or one or more portions thereof) can be configured to press outwardly on the securing member 3200 when in the secured position. The active and/or continuous outward force exerted by the attachment portion 3100 on the securing member 3200 advantageously eliminates or reduces play between the attachment portion 3100 and securing member 3200 along a mesiodistal dimension, an occlusogingival dimension, and/or a buccolingual dimension, thus providing a more accurate and efficient transfer of force from the appliance to the tooth. In some embodiments, the attachment portion 3100 (or one or more portions thereof) does not chronically press outwardly on the securing member 3200 and is instead configured to engage the securing member 3200 if the attachment portion 3100 moves into contact with and/or moves such that it exerts a force on one or more portions of the securing member 3200. Thus, the securing member 3200 can be configured to limit movement of the attachment portion 3100 relative to the securing member 3200. In some embodiments, one or more of the securing surfaces is configured for transferring orthodontic force between the attachment portion 3100 (e.g., to and/or from the connector 3103, to and/or from the rest of the appliance, etc.) and the securing member 3200 (e.g., to and/or from the tooth, etc.). In various embodiments, one or more of the securing surfaces does not substantially transfer orthodontic force between the attachment portion 3100 and the securing member 3200.

The attachment portion 3100 of FIGS. 31, 33A and 33B can be secured to the securing member 3200 by positioning the attachment portion 3100 proximate the securing member 3200 and moving the attachment portion 3100 along an occlusogingival path. The connector 3103 or other portion of the appliance continuous with the head 3102 of the attachment portion 3100 can be positioned relative to the securing member 3200 such that at least a portion of the head 3102 is positioned occlusally of the first protrusion 3204 of the securing member 3200 and/or at, near, and/or occlusally of an occlusal edge of the backing 3202. The portion of the connector 3103 connected to the head 3102 can be positioned within the mesiodistal gap 3220 between the second and third protrusions 3206, 3208 of the securing member 3200. In some embodiments, the back surface of the attachment portion 3100 can be positioned proximate and/or in contact with the backing 3202 of the securing member 3200. In some embodiments, the operator slides the connector 3103 and head 3102 occlusogingivally by positioning a tool (e.g., tool 800) within the interior region 3122 and moving the tool occlusogingivally. The tool can contact the third base region 3104*c* when sliding the tool gingivally to insert the attachment portion 3100. Continued gingival movement of the connector 3103 and/or head 3102 forces the first surface 3114 of the arm 3106 into contact with the corner 3211 of the first protrusion 3204. Because the first surface 3114 faces gingivally and is angled toward the first protrusion 3204 during the securing process, the occlusally-oriented force applied to the first surface 3114 by the first protrusion 3204 forces the first arm region 3106*a* and/or the second arm region 3106*b* to bend. Once the corner 3115 between the first surface 3114 and the ramped surface 3117 is positioned gingival of the corner 3211 of the first protrusion 3204, the resilient arm 3106 and/or one or more portions thereof (e.g., the first arm region 3106*a*, the second arm region 3106*b*, etc.) bends back towards its shape in the relaxed state, thereby causing the ramped surface 3117 to bear gingivally and mesially or distally on the second surface 3204*b* of the first protrusion 3204 and wedging the attachment portion 3100 between the first, second, and third protrusions 3204, 3206, 3208, as shown in FIGS. 33A and 33B. Accordingly, one or more regions of the attachment portion 3100 can comprise a flexure 3132 configured to bend and/or otherwise deform to facilitate securing of the attachment portion 3100 to the securing member 3200. In some embodiments, the flexure 3132 comprises the first arm region 3106*a* and/or the second arm region 3106*b*. The flexure 3132 can be configured to bend in a first direction to facilitate or enable sliding of the attachment portion 3100 gingivally of the first protrusion 3204 to secure to the securing member 3200 and/or the flexure 3132 can be configured to bend in a second, opposite direction to facilitate or enable locking of the attachment portion 3100 to the securing member 3200. In some embodiments, deformation of the flexure 3132 causes one or more portions of the attachment portion 3100 to rotate. Moreover, the flexure 3132 can comprise other regions of the attachment portion 3100 in addition to or instead of the first arm region 3106*a* and/or the second arm region 3106*b* including, but not limited to, the third arm region 3106*c*, the fourth arm region 3106*d*, one or more of the bends 3120, the base 3104, etc.

To release the attachment portion 3100 from the securing member 3200, the attachment portion 3100 can be configured to deform and/or rotate relative to the securing member 3200. For example, an operator can insert a tool, such as the distal end surface 808 of tool 800, into the interior region 3122 defined by the arm 3106 and base 3104. An occlusal end of the tool surface can be positioned proximate the interior surface 3125 of the base 3104 along the first base region 3104*a* and a gingival end of the tool surface can be positioned proximate the third base region 3104*c*. The operator can rotate the tool about a buccolingual dimension (e.g., rotating the tool surface away from the first protrusion 3204 and/or towards the second base region 3104*b*, etc.) such that an occlusal portion of the tool surface engages and pushes against the second base region 3104*b* while the gingival portion of the tool surface engages the protuberance 3136 carried by the third base region 3104*c*. When the gingival portion of the tool surface bears against the protuberance 3136, the occlusal portion of the tool surface has good and/or maximum leverage against the second base region 3104*b*. The tool can displace the second base region 3104*b* and thereby force the first base region 3104*a* and the arm 3106 to rotate with the tool surface. This causes the arm 3106 to bend at the flexure 3132. The arm 3106 can bend such that the ramped surface 3117 slides occlusally and mesiodistally along the second surface 3204*b* of the first protrusion 3204 and away from the first protrusion 3204 to release the attachment portion 3100 from the securing member 3200. In some embodiments, the attachment portion 3100 can pop or snap free of the securing member 3200 once the ramped surface 3117 clears the first protrusion 3204. With or without the tool, the attachment portion 3100 can be moved occlusally until the wider gingival region of the head 3102 clears an occlusal surface of the second and third protrusions 3206, 3208, at which point the attachment portion 3100 can be pulled away from the backing 3202 along the buccolingual dimension.

The attachment portion 3100 can comprise one or more leveraging surfaces 3134 configured to engage a tool to facilitate deformation of the attachment portion 3100 to cause the attachment portion 3100 to release from the securing member 3200. In some embodiments, the second base region 3104*b* and the protuberance 3136 each have a leveraging surface 3134. In such embodiments, the tool may not directly contact the arm 3106 to cause the arm 3106 to deform. Rather, the tool can engage the leveraging surfaces 3134 of the base 3104 to rotate the head 3102 and cause the arm 3106 to deform. Additionally or alternatively, the first base region 3104*a*, the connector 3103, the first arm region 3106*a*, and/or the second arm region 3106*b* can have a leveraging surface 3134.

The location at which the connector 3103 connects to the head 3102, a dimension along which the connector 3103 extends, a property of the connector 3103, etc. can be at least partially based on a force to be imparted on a tooth to which the attachment portion 3100 is configured to be secured (and/or an intended movement of the tooth). For example, as previously noted, the attachment portion 3100 can be configured to release from the securing member 3200 when the ramped surface 3117 slides occlusally along the second surface 3204*b* of the first protrusion 3204 and/or mesiodistally away from the first protrusion 3204 (e.g., when the head 3102 rotates about the buccolingual dimension). Thus, to avoid any movement of a connector 3103 causing sliding of the ramped surface 3117 relative to the second surface 3204*b* during treatment, the connector 3103 can connect to a portion of the attachment portion 3100 away from the arm 3106, and in particular in a location that would not cause movement of the arm 3106 in any way that is biased towards disengagement from the securing member 3200. In some cases, for example as shown in FIG. 31, the connector 3103 is continuous with the base 3104 of the head 3102 but not the arm 3106. Such a configuration can prevent or limit the connector 3103 from applying forces to the arm 3106 that inadvertently cause the flexure 3132 to deform during orthodontic treatment. Because an occlusal portion of the second base region 3104*b* is not obstructed mesially or distally (away from the mesiodistal midline M and/or opposite the mesiodistal gap 3220) in the secured position, the head 3102 can be continuous with a mesiodistally extending connector at the second base region 3104*b*. Moreover, because the first end portion 3138*a* of the base 3104 is not obstructed mesially or distally (away from the mesiodistal midline M and/or opposite the mesiodistal gap 3220) in the secured position, the head 3102 can be continuous with a mesiodistally extending connector at the first end portion 3138*a*. The location at which the connector 3103 connects to the head 3102, a dimension along which the connector 3103 extends, a property of the connector 3103, etc. can at least partially be based on the mechanism by which the attachment portion 3100 is attached and/or detached to the securing member 3200 and/or the geometry of the securing member 3200.

Figure 34:
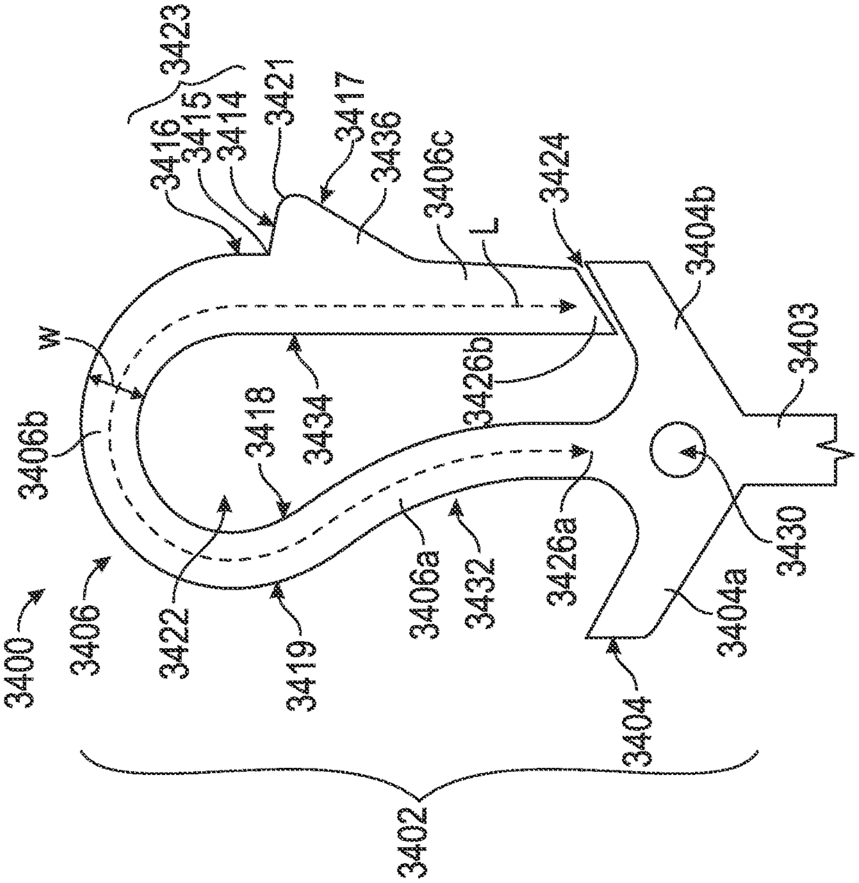
FIG. 34 is a front view of an attachment portion configured in accordance with several embodiments of the present technology.

FIG. 34 shows a planar view of an attachment portion 3400 configured in accordance with several embodiments of the present technology. The attachment portion 3400 can be configured to be secured to a patient's tooth via a securing member, such as securing member 3500 shown in FIG. 35. The attachment portion 3400 and the securing member 3500 are shown in a secured arrangement in FIGS. 36A and 36B. As discussed in greater detail below, the attachment portion 3400 and the securing member 3500 can be configured such that the attachment portion 3400 can be releasably secured to the securing member 3500. The attachment portion 3400 can be continuous with a connector 3403 that connects the attachment portion 3400 to one or more additional portions of an orthodontic appliance (not shown).

Referring to FIG. 34, the attachment portion 3400 can comprise a head 3402. In some embodiments, the attachment portion 3400 comprises a head 3402 and at least a portion of a connector 3403 that is continuous with the head 3402. The connector 3403, for example, can comprise a second connector as previously described herein and/or can extend gingivally away from a gingival portion of the head 3402. The connector 3403 can have features similar to any of the connectors disclosed herein (e.g., first connectors, second connectors, third connectors, etc.) and can comprise a single connector or multiple connectors. For example, the connector 3403 can comprise a single, occlusogingivally extending connector, multiple occlusogingivally extending connectors, one or more occlusogingivally extending connectors and one or more mesiodistally extending connectors branching off of the one or more occlusogingivally extending connectors and/or the attachment portion, or one or more mesiodistally extending connectors (and no occlusogingivally extending connectors). Accordingly, the attachment portion 3400 can be connected to a single connector or multiple connectors 3403. The connectors 3403 can connect to the head 3402 at a variety of locations. For example, a gingivally extending connector 3403 can connect to a gingival portion of the head 3402. Any of the connectors 3403 disclosed herein can extend away from the head 3402 along a variety of dimensions (e.g., along an occlusogingival dimension, a mesiodistal dimension, a buccolingual dimension, etc.).

In some embodiments, the head 3402 and the connector 3403 are part of the same, monolithic piece of material (e.g., cut from a sheet of material, a 3D-printed piece, etc.). Thus, the head 3402 and the connector 3403 may refer to different portions of the same continuous component. The attachment portion 3400 can be one portion of a greater orthodontic appliance, or may be formed separately and attached to an orthodontic appliance. The attachment portion 3400 and/or the corresponding appliance can be cut from the same sheet of material and/or may be formed by molding, casting, machining, 3D printing, stamping, extruding, or the like. The attachment portion 3400 may comprise a metal or a plastic and may have superelastic and/or shape memory properties. In some embodiments, the attachment portion 3400 does not have superelastic and/or shape memory properties.

The head 3402 of the attachment portion 3400 can comprise a base 3404 and an arm 3406 extending from the base 3404. The arm 3406 can be configured to bend and/or rotate relative to the base 3404 while the attachment portion 3400 is being secured to and/or released from the securing member 3500. In some embodiments, the arm 3406 comprises an elongate member having a first end portion 3426*a*, a second end portion 3426*b*, and a longitudinal axis L extending between the first and second end portions 3426*a*, 3426*b*. The arm 3406 can partially enclose and define an interior region 3422. The arm 3406 can include a plurality of bends 3420 along its longitudinal axis L that are configured to preferentially flex to facilitate securing and/or release of the attachment portion 3400 to a securing member. As discussed in greater detail herein, the interior region 3422 can be sized to receive a tool configured to release the attachment portion 3400 from a securing member (such as securing member 3500). Additionally or alternatively, the interior region 3422 can be sized to receive a tool to facilitate securing of the attachment portion 3400 to the securing member 3500. As shown in FIG. 34, in some embodiments the base 3404 at least partially encloses and defines an opening 3430. The opening 3420 can be sized to receive a tool to facilitate securing of the attachment portion 3400 to the securing member 3500. In some embodiments, the opening 3430 can be sized to receive a ligature wire or similar elongated member therein to facilitate securing of the attachment portion 3400 to the securing member 3500.

The head 3402 can have a front surface (facing out of the page) and a back surface (not visible in FIG. 34), and a thickness t (labeled in FIG. 36A) measured between the front and back surfaces. The arm 3406 of the attachment portion 3400 can have an interior surface 3418 facing the interior region 3422, an exterior surface 3419 facing away from the interior region 3422, and a width w1 measured between the interior and exterior surfaces 3418, 3419. The base 3404 and/or arm 3406 can have a substantially constant thickness or may have a varying thickness. Likewise, the base 3404 and/or arm 3406 can have a substantially constant width or may have a varying width. A width and/or thickness of the base 3404 and/or arm 3406 can be varied to impart a preferred stiffness profile to all or a portion of the base 3404 and/or arm 3406.

The base 3404 can be positioned between the connector 3403 and the arm 3406. The base 3404 can include a first base region 3404*a* extending mesiodistally away from the connector 3403 and a second base region 3404*b* extending mesiodistally away from the connector 3403. The base 3404 can enclose the opening 3430. In some embodiments, the base 3404 has more or fewer regions.

Figure 36B:
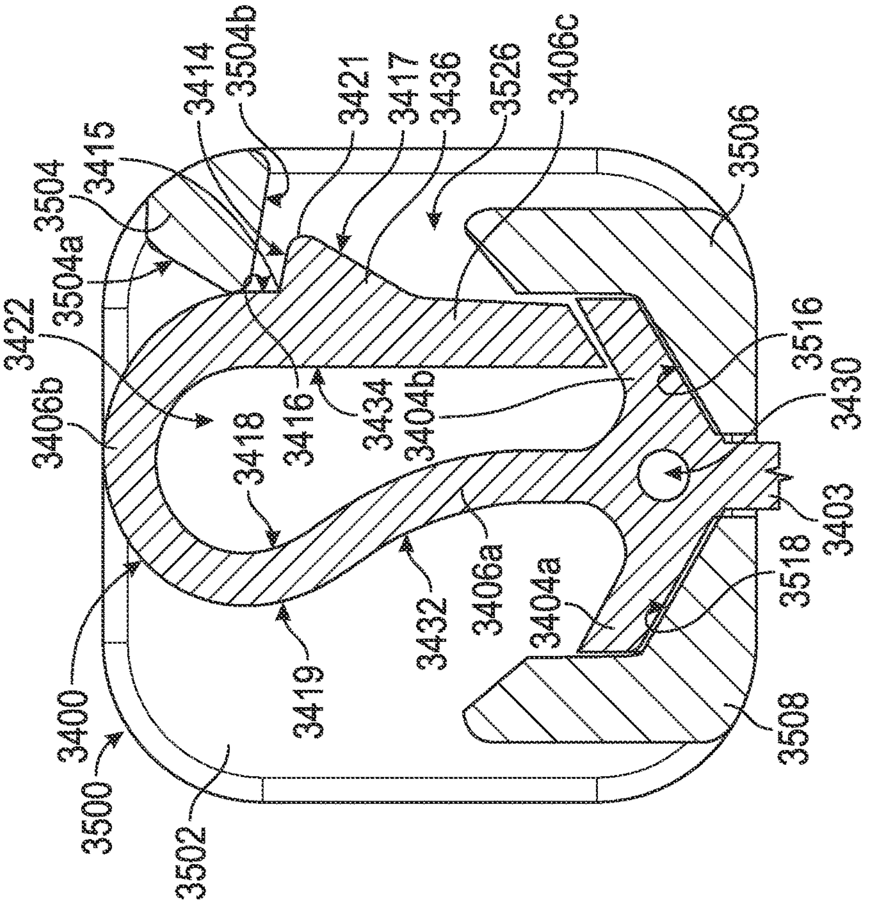
FIGS. 36A and 36B are different views of an attachment portion secured to a securing member in accordance with several embodiments of the present technology.
Figure 36A:
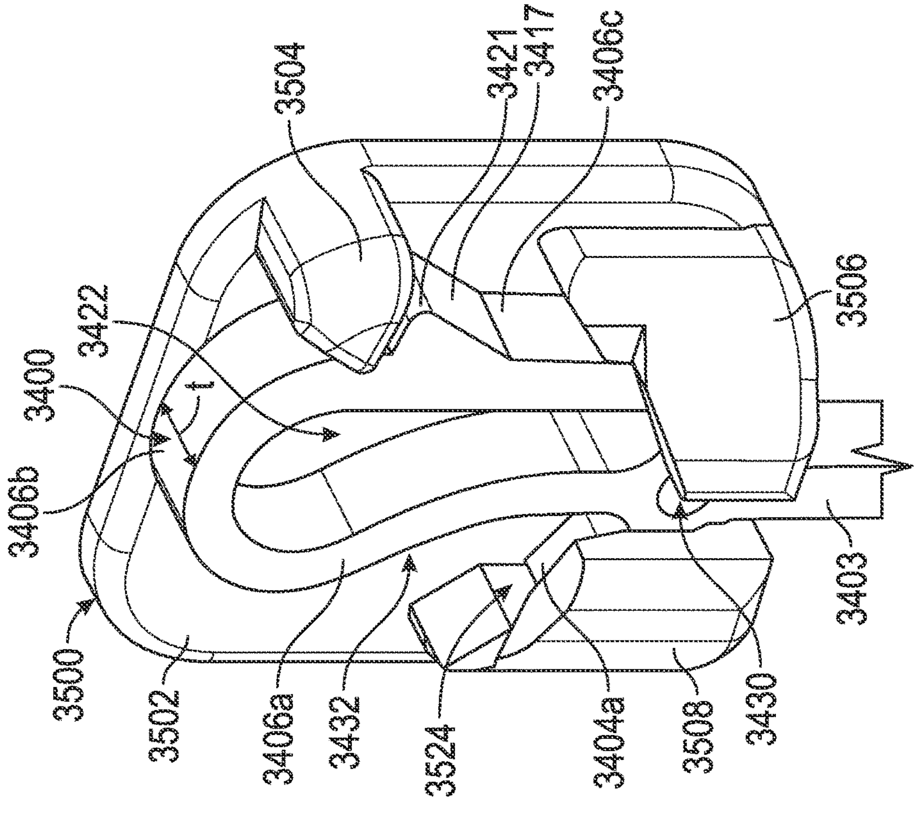

The arm 3406 can extend away from the base 3404 along the occlusogingival dimension, the mesiodistal dimension, and/or the buccolingual dimension. For example, the arm 3406 can extend occlusally away from the base 3404. As shown in FIG. 34, the arm 3406 can extend occlusally away from the base 3404, mesiodistally, and then gingivally back towards the base 3404. At least when the attachment portion 3400 is in a relaxed (unsecured) state (as shown in FIG. 34), the second end portion 3426*b* of the arm 3406 can be spaced apart from the first end portion 3426*a* of the arm 3406 along a mesiodistal dimension. Additionally or alternatively, the second end portion 3426*b* of the arm 3406 can be spaced apart from the base 3404 by a gap 3424 that is continuous with the interior region 3422. In some embodiments, the second end portion 3426*b* of the arm 3406 can be spaced apart from the first end portion 3426*a* and/or the base 3404 even when the attachment portion 3400 is in a compressed (secured) state (for example as shown in FIGS. 36A and 36B). The second end portion 3426*b* and the first end portion 3426*a* can be spaced apart along an occlusogingival dimension, a mesiodistal dimension, and/or a buccolingual dimension. The second end portion 3426*b* and the base 3404 can be spaced apart along an occlusogingival dimension, a mesiodistal dimension, and/or a buccolingual dimension.

The arm 3406 can include a first arm region 3406*a* extending occlusally away from the first end portion 3426*a* of the arm 3406, a second arm region 3406*b* continuous with and extending mesiodistally away from an end of the first arm region 3406*a*, and a third arm region 3406*c* continuous with and extending gingivally away from an end of the second arm region 3406*b*. In some embodiments, the arm 3406 has more or fewer portions along its longitudinal axis L. In some embodiments, the first arm region 3406*a* and/or the second arm region 3406*b* are curved. In some embodiments, the first arm region 3406*a* is convex towards the interior region 3422 and/or the second arm region 3406*b* is concave towards the interior region 3422 thereby biasing the arm 3406 to bend at or near the first arm region 3406*a* and/or second arm region 3406*b* when a rotational force is applied to the head 3402.

According to various embodiments, one or more regions of the arm 3406 can include a portion along which the width w of the arm 3406 is greater than along the rest of the arm 3406. For example, as shown in FIG. 34, the arm 3406 can include a protuberance 3436 at an exterior side of the third arm region 3406*c*. Along the protuberance 3436, the exterior surface 3419 of the arm 3406 forms first and second ramped surfaces 3417 and 3414 that meet at a corner 3421. The exterior surface 3419 extends occlusally and away from the longitudinal axis L along the first ramped surface 3417 until turning at the corner 3421 and extending occlusally and toward the longitudinal axis L along the second ramped surface 3414. The second ramped surface 3414 terminates at a corner 3415. The second ramped surface 3414, the corner 3415, and a portion 3416 of the exterior surface 3419 on the other side of the corner 3415 together comprise a shoulder 3423 that is configured to engage a protrusion on a securing member 3500 when the attachment portion 3400 is secured to the securing member 3500 to oppose rotational and/or translational movement of the arm 3406. As described in greater detail below, the first ramped surface 3417 can be configured to force the arm 3406 to bend or rotate (e.g., at the first arm region 3406*a*, at the second arm region 3406*b*, etc.) when engaging a protrusion of the securing member 3500 during engagement and/or disengagement.

Figure 35:
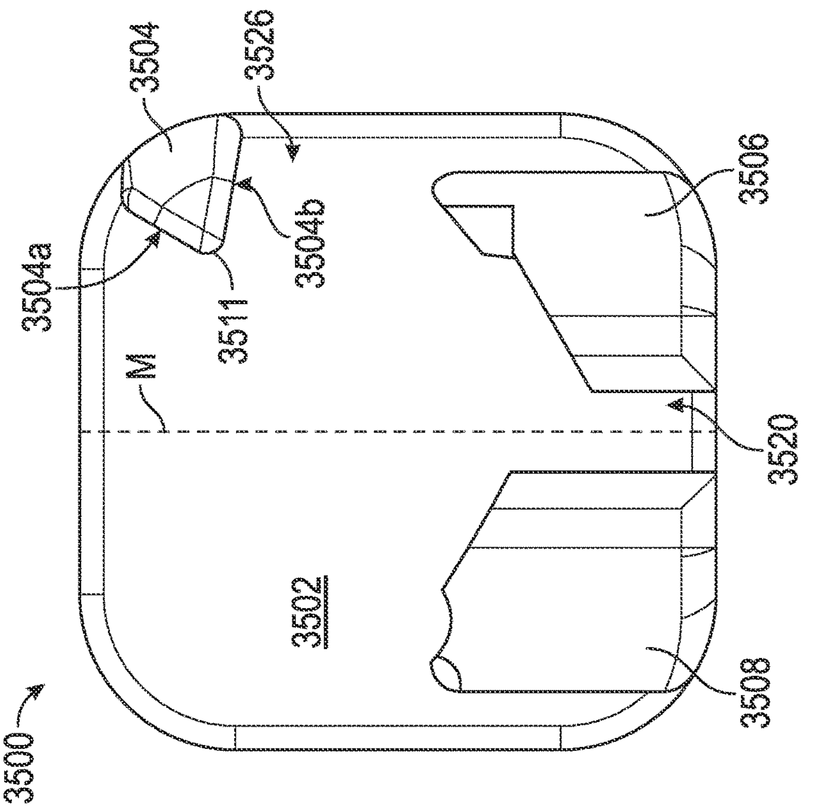
FIG. 35 is a front view of a securing member configured in accordance with several embodiments of the present technology.

FIG. 35 is a front view of the securing member 3500 configured for use with the attachment portion 3400. The securing member 3500 has a first side (facing out of the page) and a second side (not visible in FIG. 35) opposite the first side along a thickness of the securing member 3500 and configured to be bonded to a patient's tooth. The securing member 3500 can comprise a backing 3502 and a plurality of protrusions (e.g., first protrusion 3504, second protrusion 3506, third protrusion 3508, etc.) carried by and extending away from the first side of the backing 3502 along a buccolingual dimension. The protrusions 3504, 3506, 3508 can be configured to engage the attachment portion 3400 to retain the attachment portion 3400 at a specific location relative to the backing 3502 and the patient's tooth.

The first protrusion 3504 can be configured to engage the shoulder 3423 of the arm 3406 of the attachment portion 3400 to prevent or limit motion of the attachment portion 3400 in an occlusal direction and a mesial or distal direction. The first protrusion 3504 can be positioned at an occlusal portion of the backing 3502. In some embodiments, the first protrusion 3504 is positioned to a side of a mesiodistal midline M of the backing 3502. The first protrusion 3504 can be positioned near a perimeter of the backing 3502, for example as shown in FIG. 35, or can be positioned away from the perimeter and towards an intermediate portion of the backing 3502. The first protrusion 3504 can have a first surface 3504*a* and a second surface 3504*b*. In some embodiments, the first surface 3504*a* is angled with respect to the second surface 3504*b*. In some embodiments, the first surface 3504*a* can be substantially perpendicular to a first plane in which the occlusogingival dimension and the mesiodistal dimension lie, angled relative to a second plane in which the buccolingual dimension and the mesiodistal dimension lie, and angled relative to a third plane in which the buccolingual dimension and the occlusogingival dimension lie. The first surface 3504*a* can be slanted such that a gingival edge of the first surface 3504*a* is closer to the mesiodistal midline M than an occlusal edge of the first surface 3504*a*. In some embodiments, the second surface 3504*b* can be substantially perpendicular to the first plane in which the occlusogingival dimension and the mesiodistal dimension lie, angled relative to the second plane in which the buccolingual dimension and the mesiodistal dimension lie, and angled relative to the third plane in which the buccolingual dimension and the occlusogingival dimension lie. The second surface 3504*b* can be slanted such that an occlusal edge of the second surface 3504*b* is closer to the mesiodistal midline M than a gingival edge of the second surface 3504*b*. In some embodiments, the mesial edges of the first surface 3504*a* and the second surface 3504*b* are continuous with one another at a corner 3511.

The second protrusion 3506 and/or the third protrusion 3508 can be carried by the backing 3502 at positions opposite the first protrusion 3504 along one or more dimensions. The second protrusion 3506 and/or the third protrusion 3508 can be positioned at a gingival portion of the backing 3502, for example. As shown in FIG. 35, in some embodiments the second protrusion 3506 is spaced apart from the first protrusion 3504 by a gap 3526 along the occlusogingival dimension, and spaced apart from the third protrusion 3508 by a gap 3520 along the mesiodistal dimension. The gap 3520 can be sized to at least partially receive the portion of the connector 3403 connected to the head 3402 of the attachment portion 3400.

As shown in FIG. 35, the second protrusion 3506 can be positioned on the same side of the backing 3502 along the mesiodistal dimension (e.g., on the same side of the mesiodistal midline M) as the first protrusion 3504. In some embodiments, the second protrusion 3506 has a first region extending lingually (or buccally, depending on which side of the tooth the securing member 3500 is attached) away from the backing 3502. The second protrusion 3506 can also include a second region extending away from the first region towards an intermediate portion of the securing member 3500 and spaced apart from the backing 3502 by a gap along the buccolingual dimension. The gap can have a depth that is slightly greater than a thickness t of the attachment portion 3400 so that the attachment portion 3400 can fit between the second region of the second protrusion 3506 and the backing 3502. The second protrusion 3506 can also include an inner surface 3516 (only visible in FIG. 36B) configured to engage the second base region 3404*b* of the attachment portion 3400 and prevent or limit mesial or distal movement and gingival movement of the second base region 3404*b*. In some embodiments, the inner surface 3516 has a contour based at least in part on a contour of the exterior surface 2619. The second region 3406*b* of the second protrusion 3506 can include an inner surface (not visible) facing towards the backing 3502 and configured to prevent or limit lingual (or buccal) movement of the second base region 3404*b*. As such, the second protrusion 3506 prevents or limit movement of the second base region 3404*b* in at least three directions, for example by functioning as a side, bottom, and front stop.

The third protrusion 3508 can be positioned on the opposite side of the backing 3502 along the mesiodistal dimension from the first protrusion 3504 and/or the second protrusion 3506, or at least spaced apart from the first protrusion 3504 and/or the second protrusion 3506 along a mesiodistal dimension. In some embodiments, the third protrusion 3508 can have a first region extending lingually (or buccally, depending on which side of the tooth the securing member 3500 is attached) away from the backing 3502. The third protrusion 3508 can have a second region extending away from the first region towards an intermediate portion of the securing member 3500 and spaced apart from the backing 3502 by a gap 3524 along the buccolingual dimension. The gap 3524 can have a depth that is slightly greater than a thickness t of the attachment portion 3400 so that the attachment portion 3400 can fit between the second region and the backing 3502. In some embodiments, the depth of the gap 3524 can be similar to the depth of the gap between the second region of the second protrusion 3506 and the backing 3502. The third protrusion 3508 can also include an inner surface facing towards the backing 3502 and configured to prevent or limit lingual (or buccal) movement of the base 3404. The first base region 3504*a* can be configured to be positioned between the third protrusion 3508 and the backing 3502. For example, as shown in FIGS. 36A and 36B, the first base region 3504*a* can be at least partially restrained between the third protrusion 3508 and the backing 3502 in the secured position. The third protrusion 3508 can have an inner surface 3518 configured to engage the first base region 3504*a*. As shown in FIGS. 34-36B, the first protrusion 3404, the second protrusion 3406, and/or the third protrusion 3408 can have different shapes and/or sizes.

Referring to FIGS. 36A and 36B, in the secured state, the attachment portion 3400 can be positioned proximate and/or against the backing 3502 of the securing member 3500 and bound between the first, second, and third protrusions 3504, 3506, 3508. The connector 3403 can be positioned between the second protrusion 3506 and the third protrusion 3508 (e.g., within the gap 3520). Additionally or alternatively, the first base region 3404*a* can be positioned buccolingually between the third protrusion 3508 and the backing 3502 and the first arm region 3406*a* can be positioned buccolingually between the second protrusion 3506 and the backing 3502. In the secured state, the protuberance 3436 can be positioned occlusogingivally between the first protrusion 3504 and the second protrusion 3506 (e.g., within gap 3526).

The attachment portion 3400 can comprise a resilient and/or superelastic material such that, when the attachment portion 3400 is braced between the first, second, and third protrusions 3504, 3506, 3508, the attachment portion 3400 actively exerts an outward force on the surrounding surfaces. For example, the second ramped surface 3414 of the protuberance 3436 of the attachment portion 3400 can engage the gingivally-facing second surface 3504*b* of the first protrusion 3504 of the securing member 3500. The portion 3416 of the exterior surface 3419 can abut and press mesially or distally against the first surface 3504*a* and/or the corner 3511 of the first protrusion 3504 of the securing member 3500. The second base region 3404*b* can abut and press mesially or distally and gingivally against the inner surface 3516 of the second protrusion 3506 of the securing member 3500. The first base region 3404*a* can abut and press gingivally and mesially or distally against the inner surface 3518 of the third protrusion 3508 of the securing member 3500. Accordingly, the aforementioned surfaces of the attachment portion 3400 and the securing member 3500 that are configured to engage one another when the attachment portion 3400 is in the secured position can comprise securing surfaces.

In the secured position, the attachment portion 3400 is releasably secured to the securing member 3500 such that it cannot be inadvertently displaced or prematurely or inadvertently released by typical patient activity (such as chewing). The attachment portion 3400 (or one or more portions thereof) can be configured to press outwardly on the securing member 3500 when in the secured position. The active and/or continuous outward force exerted by the attachment portion 3400 on the securing member 3500 advantageously eliminates or reduces play between the attachment portion 3400 and securing member 3500 along a mesiodistal dimension, an occlusogingival dimension, and/or a buccolingual dimension, thus providing a more accurate and efficient transfer of force from the appliance to the tooth. In some embodiments, the attachment portion 3400 (or one or more portions thereof) does not chronically press outwardly on the securing member 3500 and is instead configured to engage the securing member 3500 if the attachment portion 3400 moves into contact with and/or moves such that it exerts a force on one or more portions of the securing member 3500. Thus, the securing member 3500 can be configured to limit movement of the attachment portion 3400 relative to the securing member 3500. In some embodiments, one or more of the securing surfaces is configured for transferring orthodontic force between the attachment portion 3400 (e.g., to and/or from the connector 3403, to and/or from the rest of the appliance, etc.) and the securing member 3500 (e.g., to and/or from the tooth, etc.). In various embodiments, one or more of the securing surfaces does not substantially transfer orthodontic force between the attachment portion 3400 and the securing member 3500.

The attachment portion 3400 of FIGS. 34, 36A and 36B can be secured to the securing member 3500 by positioning the attachment portion 3400 proximate the securing member 3500 and moving the attachment portion 3400 along an occlusogingival path. The connector 3403 or other portion of the appliance continuous with the head 3402 of the attachment portion 3400 can be positioned relative to the securing member 3500 such that at least a portion of the head 3402 is positioned occlusally of the first protrusion 3504 of the securing member 3500 and/or at, near, and/or occlusally of an occlusal edge of the backing 3502. The portion of the connector 3403 connected to the head 3402 can be positioned within the mesiodistal gap 3520 between the second and third protrusions 3506, 3508 of the securing member 3500. In some embodiments, the back surface of the attachment portion 3400 can be positioned proximate and/or in contact with the backing 3502 of the securing member 3500. In some embodiments, the operator slides the connector 3403 and head 3402 occlusogingivally by positioning a tool (e.g., tool 800) within the interior region 3422 and/or opening 3430 and moving the tool occlusogingivally. When the tool is positioned within the interior region 3422 and moved gingivally to insert the attachment portion 3400, the tool can contact the second base region 3404*b*. Continued gingival movement of the connector 3403 and/or head 3402 forces the first ramped surface 3417 at the protuberance 3436 into contact with the corner 3511 of the first protrusion 3504. Because the exterior surface 3419 along the first ramped surface 3417 faces gingivally and is angled toward the first protrusion 3504 during the securing process, the occlusally-oriented force applied to the exterior surface 3419 along the first ramped surface 3417 when the first ramped surface 3417 contacts the first protrusion 3504 forces the first arm region 3406*a* to bend. Once the corner 3421 of the attachment portion 3400 between the first ramped surface 3417 and the second ramped surface 3414 of the shoulder 3423 is positioned gingival of the corner 3511 of the first protrusion 3504, the resilient arm 3406 and/or one or more portions thereof (e.g., the first arm region 3406*a*, etc.) bends back towards its shape in the relaxed state, thereby wedging the attachment portion 3400 between the first, second, and third protrusions 3504, 3506, 3508, as shown in FIGS. 36A and 36B. Accordingly, one or more regions of the attachment portion 3400 can comprise a flexure 3432 configured to bend and/or otherwise deform to facilitate securing of the attachment portion 3400 to the securing member 3500. In some embodiments, the flexure 3432 comprises the first arm region 3406*a* and/or the second arm region 3406*b*. The first arm region 3406*a*, for example, can be configured to bend in a first direction to facilitate or enable sliding of the attachment portion 3400 gingivally of the first protrusion 3504 to secure to the securing member 3500 and/or the first arm region 3406*a* can be configured to bend in a second, opposite direction to facilitate or enable locking of the attachment portion 3400 to the securing member 3500. In some embodiments, deformation of the flexure 3432 causes one or more portions of the attachment portion 3400 to rotate (e.g., bending of the first arm region 3406*a* can cause the second-fourth arm regions 3406*b*-3406*d* to rotate about the buccolingual dimension). Moreover, the flexure 3432 can comprise other regions of the attachment portion 3400 in addition to or instead of the first arm region 3406*a* including, but not limited to, the second arm region 3406*b*, the third arm region 3406*c*, the fourth arm region 3406*d*, one or more of the bends 3420, the base 3404, etc.

To release the attachment portion 3400 from the securing member 3500, the attachment portion 3400 can be configured to deform and/or rotate relative to the securing member 3500. For example, an operator can insert a tool, such as the distal end surface 808 of tool 800, into the interior region 3422 defined by the arm 3406. An occlusal end of the tool surface can be positioned proximate the interior surface 3418 of the arm 3406 along the third arm region 3406*c* and a gingival end of the tool surface can be positioned proximate the second base region 3404*b*. The operator can rotate the tool about a buccolingual dimension (e.g., rotating the tool surface away from the first protrusion 3504 and/or towards the first arm region 3406*a*, etc.) such that a gingival portion of the tool surface engages and pushes against the third arm region 3406*c* and/or the second end portion 3426*b* of the arm 3406 and/or the occlusal portion of the tool surface can engage the first arm region 3406*a* and/or the second arm region 3406*b*. The tool can displace the second end portion 3426*b* of the arm 3406 and thereby force the arm 3406 to rotate with the tool surface. This causes the arm 3406 to bend at the flexure 3432, which can include the first arm region 3406*a*. The arm 3406 can bend such that the second ramped surface 3414 slides occlusally and mesiodistally along the second surface 3504*b* of the first protrusion 3504 and away from the first protrusion 3504 to release the attachment portion 3400 from the securing member 3500. In some embodiments, the attachment portion 3400 can pop or snap free of the securing member 3500 once the second ramped surface 3414 clears the first protrusion 3504. With or without the tool, the attachment portion 3400 can be moved occlusally until the wider gingival region of the head 3402 clears an occlusal surface of the second and third protrusions 3506, 3508, at which point the attachment portion 3400 can be pulled away from the backing 3502 along the buccolingual dimension.

The attachment portion 3400 can comprise a leveraging surface 3434 configured to engage a tool to facilitate deformation of the attachment portion 3400 to cause the attachment portion 3400 to release from the securing member 3500. In some embodiments, the third arm region 3406*c* can have the leveraging surface 3434. Additionally or alternatively, the second arm region 3406*b*, the first arm region 3406*a*, and/or the base 3404 can have the leveraging surface 3434. In some embodiments, the attachment portion 3400 comprises multiple leveraging surfaces 3434.

The location at which the connector 3403 connects to the head 3402, a dimension along which the connector 3403 extends, a property of the connector 3403, etc. can be at least partially based on a force to be imparted on a tooth to which the attachment portion 3400 is configured to be secured (and/or an intended movement of the tooth). For example, as previously noted, the attachment portion 3400 can be configured to release from the securing member 3500 when the second ramped surface 3414 slides occlusally along the second surface 3504*b* of the first protrusion 3504 and/or mesiodistally away from the first protrusion 3504 (e.g., when the head 3402 rotates about the buccolingual dimension). Thus, to avoid any movement of a connector 3403 causing sliding of the second ramped surface 3414 relative to the second surface 3504*b* during treatment, the connector 3403 can connect to a portion of the attachment portion 3400 away from the arm 3406, and in particular in a location that would not cause movement of the arm 3406 in any way that is biased towards disengagement from the securing member 3500. In some cases, for example as shown in FIG. 34, the connector 3403 is continuous with the base 3404 of the head 3402 but not the arm 3406. Such a configuration can prevent or limit the connector 3403 from applying forces to the arm 3406 that inadvertently cause the flexure 3432 to deform during orthodontic treatment. In some embodiments no connectors attach to the leveraging surface 3434 so that little to no force is applied to the leveraging surface 3434 during the normal course of treatment. Because the first and second base regions 3404*a*, 3404*b* are obstructed mesially and distally (away from the mesiodistal midline M and/or opposite the mesiodistal gap 3520) when in the secured position, the head 3402 may not be continuous with mesiodistally extending connectors at the first and second base regions 3404*a*, 3404*b*. The location at which the connector 3403 connects to the head 3402, a dimension along which the connector 3403 extends, a property of the connector 3403, etc. can at least partially be based on the mechanism by which the attachment portion 3400 is attached and/or detached to the securing member 3500 and/or the geometry of the securing member 3500.

Figure 37:
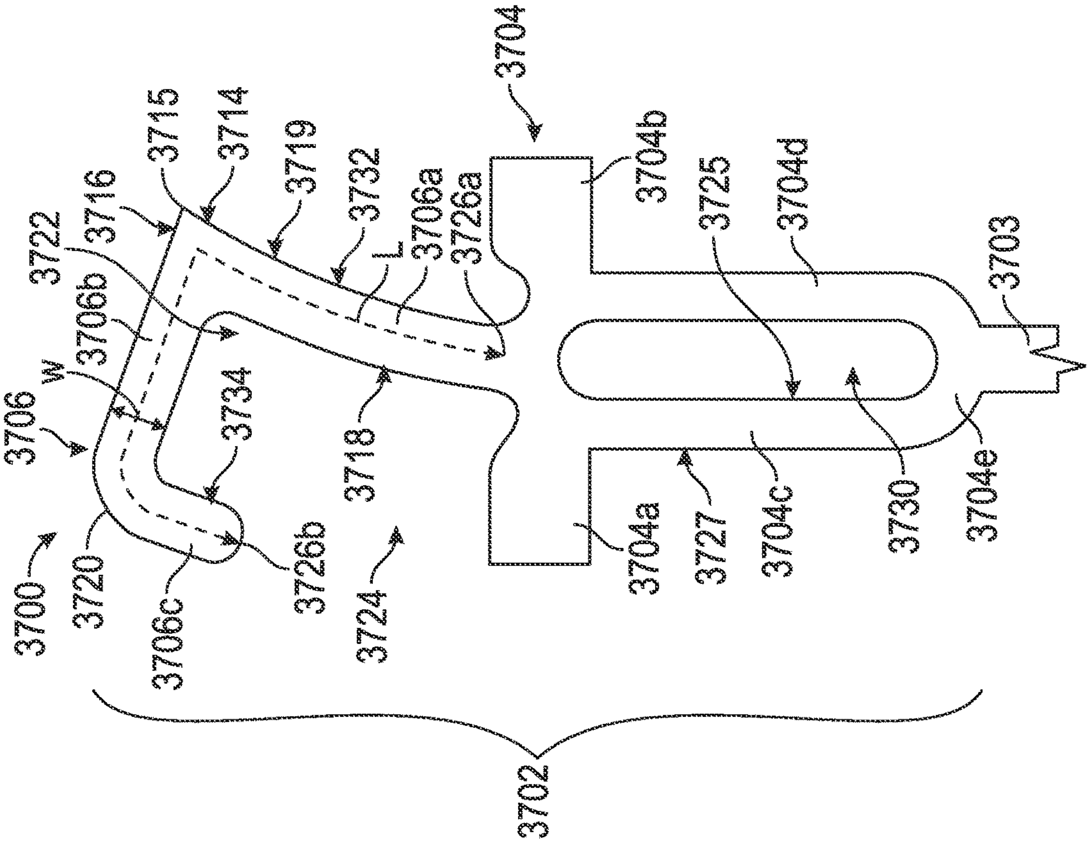
FIG. 37 is a front view of an attachment portion configured in accordance with several embodiments of the present technology.

In some embodiments, an attachment portion of the present technology does not comprise a shoulder configured to conformably engage a protrusion of a securing member to secure to the securing member. Some attachment portions disclosed herein have a surface configured to frictionally engage a protrusion of a securing member to secure to the securing member. FIG. 37 shows a planar view of an attachment portion 3700 configured in accordance with several embodiments of the present technology. The attachment portion 3700 can be configured to be secured to a patient's tooth via a securing member, such as securing member 3800 shown in FIG. 38. The attachment portion 3700 and the securing member 3800 are shown in a secured arrangement in FIGS. 39A and 39B. As discussed in greater detail below, the attachment portion 3700 and the securing member 3800 can be configured such that the attachment portion 3700 can be releasably secured to the securing member 3800. The attachment portion 3700 can be continuous with a connector 3703 that connects the attachment portion 3700 to one or more additional portions of an orthodontic appliance (not shown).

Referring to FIG. 37, the attachment portion 3700 can comprise a head 3702. In some embodiments, the attachment portion 3700 comprises a head 3702 and at least a portion of a connector 3703 that is continuous with the head 3702. The connector 3703, for example, can comprise a second connector as previously described herein and/or can extend gingivally away from a gingival portion of the head 3702. The connector 3703 can have features similar to any of the connectors disclosed herein (e.g., first connectors, second connectors, third connectors, etc.) and can comprise a single connector or multiple connectors. For example, the connector 3703 can comprise a single, occlusogingivally extending connector, multiple occlusogingivally extending connectors, one or more occlusogingivally extending connectors and one or more mesiodistally extending connectors branching off of the one or more occlusogingivally extending connectors and/or the attachment portion, or one or more mesiodistally extending connectors (and no occlusogingivally extending connectors). Accordingly, the attachment portion 3700 can be connected to a single connector or multiple connectors 3703. The connectors 3703 can connect to the head 3702 at a variety of locations. For example, a gingivally extending connector 3703 can connect to a gingival portion of the head 3702. Any of the connectors 3703 disclosed herein can extend away from the head 3702 along a variety of dimensions (e.g., along an occlusogingival dimension, a mesiodistal dimension, a buccolingual dimension, etc.).

In some embodiments, the head 3702 and the connector 3703 are part of the same, monolithic piece of material (e.g., cut from a sheet of material, a 3D-printed piece, etc.). Thus, the head 3702 and the connector 3703 may refer to different portions of the same continuous component. The attachment portion 3700 can be one portion of a greater orthodontic appliance, or may be formed separately and attached to an orthodontic appliance. The attachment portion 3700 and/or the corresponding appliance can be cut from the same sheet of material and/or may be formed by molding, casting, machining, 3D printing, stamping, extruding, or the like. The attachment portion 3700 may comprise a metal or a plastic and may have superelastic and/or shape memory properties. In some embodiments, the attachment portion 3700 does not have superelastic and/or shape memory properties.

The head 3702 of the attachment portion 3700 can comprise a base 3704 and an arm 3706 extending from the base 3704. The arm 3706 can be configured to bend and/or rotate relative to the base 3704 while the attachment portion 3700 is being secured to and/or released from the securing member 3800. In some embodiments, the arm 3706 comprises an elongate member having a first end portion 3726*a*, a second end portion 3726*b*, and a longitudinal axis L extending between the first and second end portions 3726*a*, 3726*b*. The arm 3706 can partially enclose and define an interior region 3722. The arm 3706 can include one or more bends 3720 along its longitudinal axis L. As discussed in greater detail herein, the interior region 3722 can be sized to receive a tool configured to release the attachment portion 3700 from a securing member (such as securing member 3800). Additionally or alternatively, the interior region 3722 can be sized to receive a tool to facilitate securing of the attachment portion 3700 to the securing member 3800. As shown in FIG. 37, in some embodiments the base 3704 at least partially encloses and defines an opening 3730. The opening can be sized to receive a tool to facilitate securing of the attachment portion 3700 to the securing member 3800.

The head 3702 can have a front surface (facing out of the page) and a back surface (not visible in FIG. 37), and a thickness t (labeled in FIG. 39A) measured between the front and back surfaces. The arm 3706 of the attachment portion 3700 can have an interior surface 3718 facing the interior region 3722, an exterior surface 3719 facing away from the interior region 3722, and a width w1 measured between the interior and exterior surfaces 3718, 3719. The base 3704 can have an interior surface 3725 facing the opening 3730, an exterior surface 3727 facing away from the opening 3703, and a width measured between the interior and exterior surfaces 3725, 3727. The base 3704 and/or arm 3706 can have a substantially constant thickness or may have a varying thickness. Likewise, the base 3704 and/or arm 3706 can have a substantially constant width or may have a varying width. A width and/or thickness of the base 3704 and/or arm 3706 can be varied to impart a preferred stiffness profile to all or a portion of the base 3704 and/or arm 3706.

The base 3704 can include a first base region 3704*a* extending away from the first end portion 3726*a* of the arm 3706 along one of a mesial or distal dimension and a second base region 3704*b* extending away from the first end portion 3726*a* of the arm 3706 along the other of a mesial or distal dimension. The base 3704 can include a third base region 3704*c* continuous with and extending away from the first base region 3704*a* along a generally gingival dimension, a fourth base region 3704*d* continuous with and extending away from the second base region 3704*b* along a generally gingival dimension, and a fifth base region 3704*e* continuous with and extending from the third base region 3704*c* to the fourth base region 3704*d* along a curved mesiodistal dimension. The base 3704 can enclose the opening 3730. In some embodiments, the fifth base region 3704*e* is continuous with the connector 3703. In some embodiments, the base 3704 has more or fewer regions.

Figure 39B:
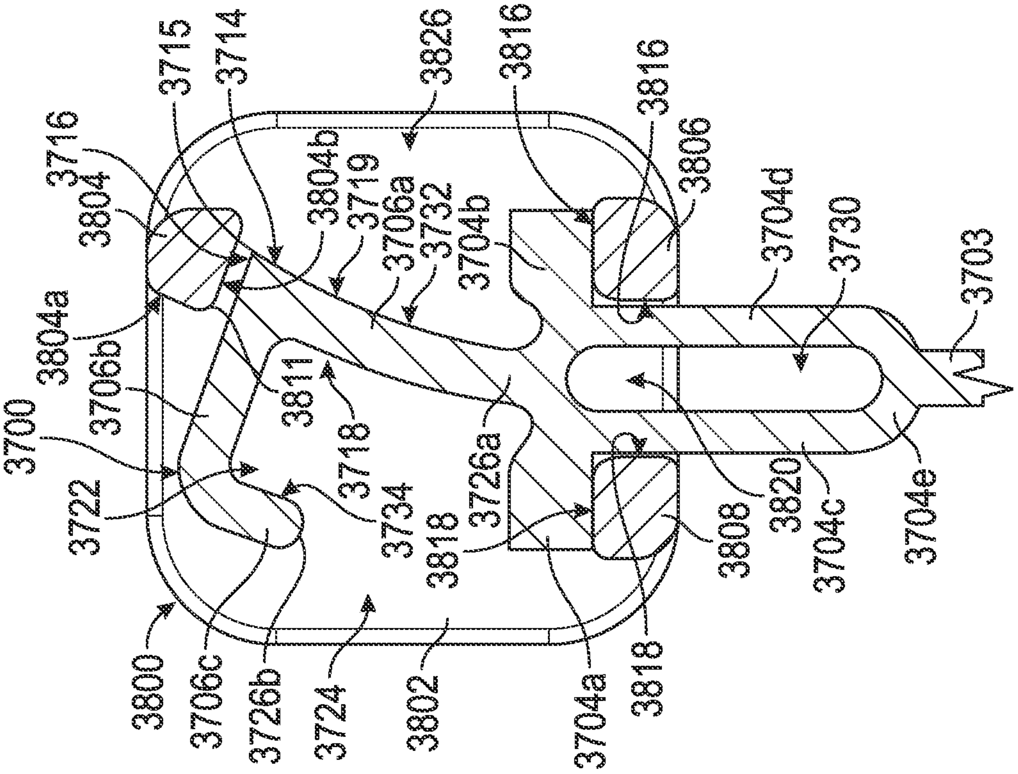
FIGS. 39A and 39B are different views of an attachment portion secured to a securing member in accordance with several embodiments of the present technology.
Figure 39A:
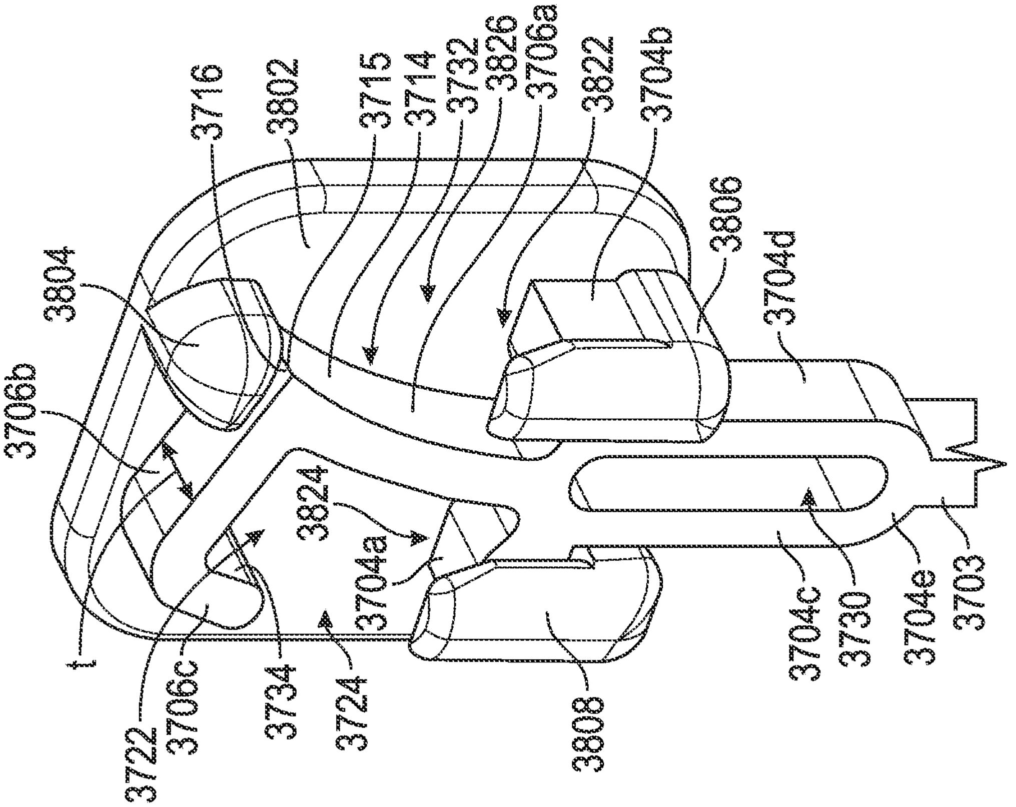

The arm 3706 can extend away from the base 3704 along the occlusogingival dimension, the mesiodistal dimension, and/or the buccolingual dimension. For example, the arm 3706 can extend mesiodistally and occlusally away from the base 3704. As shown in FIG. 37, the arm 3706 can extend occlusally, mesiodistally, and then gingivally. In some embodiments, the first end portion 3726*a* of the arm 3706 is continuous with and/or disposed at the base 3704. At least when the attachment portion 3700 is in a relaxed (unsecured) state (as shown in FIG. 37), the second end portion 3726*b* of the arm 3706 can be spaced apart from the first base region 3704*a* along an occlusogingival dimension by a gap 3724 that is continuous with the interior region 3722. In some embodiments, the second end portion 3726*b* of the arm 3706 and the first base region 3704*a* can be spaced apart by the gap 3724 even when the attachment portion 3700 is in a compressed (secured) state (for example as shown in FIGS. 39A and 39B). The second end portion 3726*b* and the first base region 3704*a* can be spaced apart along an occlusogingival dimension, a mesiodistal dimension, and/or a buccolingual dimension.

The arm 3706 can include a first arm region 3706*a* extending occlusally away from the first end portion 3726*a* of the arm 3706, a second arm region 3706*b* continuous with and extending mesiodistally and, optionally occlusally, away from an end of the first arm region 3706*a*, a third arm region 3706*c* continuous with and extending gingivally away from an end of the second arm region 3706*b*. In some embodiments, the exterior surface 3719 at the first arm region 3706*a* extends occlusally and mesiodistally away from the first end portion 3726*a* of the arm 3706 such that the exterior surface 3719 at the first arm region 3706*a* comprises a ramped surface. The exterior surface 3719 at the first arm region 3706*a* can be configured to force the arm 3706 to bend or rotate (e.g., at the first arm region 3706*a*, etc.) when engaging a protrusion of the securing member 3800 during engagement and/or disengagement. As shown in FIG. 37, a first portion 3714 of the exterior surface 3719 at the first arm region 3706*a* can meet a second portion 3716 of the exterior surface 3719 at the second arm region 3706*b* at a corner 3715. The second portion 3716 of the exterior surface 3719 and/or the corner 3715 can be configured to engage a protrusion on a securing member 3800 to oppose rotational and/or translational movement of the arm 3706 relative to the securing member 3800. In some embodiments, the second portion 3716 of the exterior surface 3719 and/or the corner 3715 can be configured to frictionally engage a portion of a protrusion.

Figure 38:
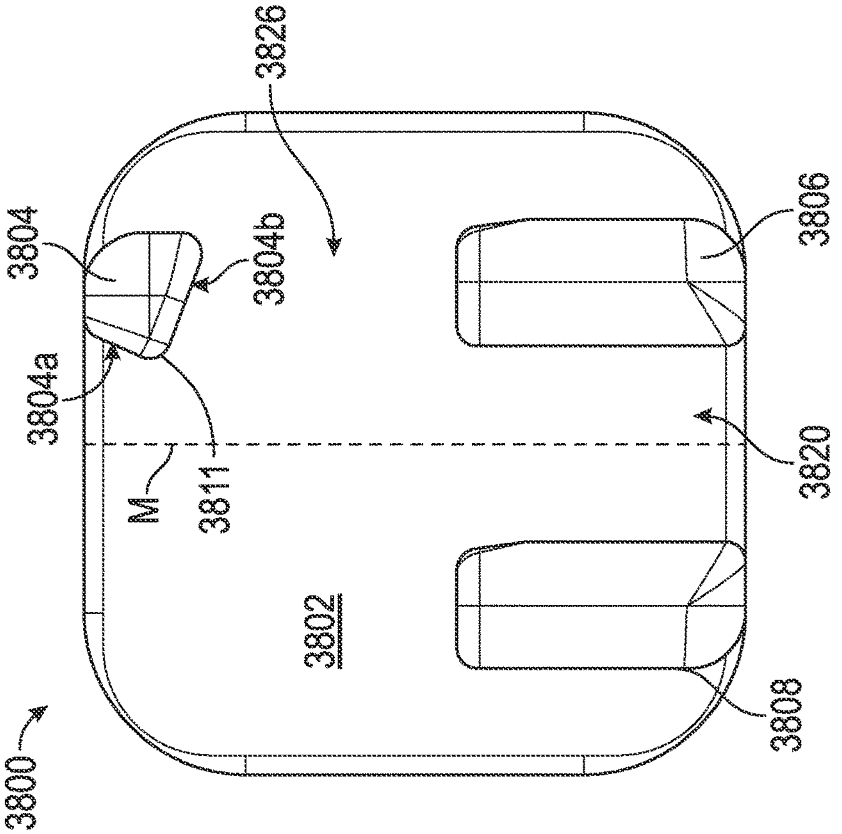
FIG. 38 is a front view of a securing member configured in accordance with several embodiments of the present technology.

FIG. 38 is a front view of the securing member 3800 configured for use with the attachment portion 3700. The securing member 3800 has a first side (facing out of the page) and a second side (not visible in FIG. 38) opposite the first side along a thickness of the securing member 3800 and configured to be bonded to a patient's tooth. The securing member 3800 can comprise a backing 3802 and a plurality of protrusions (e.g., first protrusion 3804, second protrusion 3806, third protrusion 3808, etc.) carried by and extending away from the first side of the backing 3802 along a buccolingual dimension. The protrusions 3804, 3806, 3808 can be configured to engage the attachment portion 3700 to retain the attachment portion 3700 at a specific location relative to the backing 3802 and the patient's tooth.

The first protrusion 3804 can be configured to engage the second portion 3716 of the exterior surface 3719 and/or the corner 3715 of the arm 3706 to prevent or limit motion of the attachment portion 3700 in an occlusal direction and a mesial or distal direction. The first protrusion 3804 can be positioned at an occlusal portion of the backing 3802. In some embodiments, the first protrusion 3804 is positioned to a side of a mesiodistal midline M of the backing 3802. The first protrusion 3804 can be positioned near a perimeter of the backing 3802, for example as shown in FIG. 38, or can be positioned away from the perimeter and towards an intermediate portion of the backing 3802. The first protrusion 3804 can have a first surface 3804*a* and a second surface 3804*b*. In some embodiments, the first surface 3804*a* is angled with respect to the second surface 3804*b*. In some embodiments, the first surface 3804*a* can be substantially perpendicular to a first plane in which the occlusogingival dimension and the mesiodistal dimension lie, angled relative to a second plane in which the buccolingual dimension and the mesiodistal dimension lie, and angled relative to a third plane in which the buccolingual dimension and the occlusogingival dimension lie. The first surface 3804*a* can be slanted such that a gingival edge of the first surface 3804*a* is closer to the mesiodistal midline M than an occlusal edge of the first surface 3804*a*. In some embodiments, the second surface 3804*b* can be substantially perpendicular to the first plane in which the occlusogingival dimension and the mesiodistal dimension lie, angled relative to the second plane in which the buccolingual dimension and the mesiodistal dimension lie, and angled relative to the third plane in which the buccolingual dimension and the occlusogingival dimension lie. The second surface 3804*b* can be slanted such that an occlusal edge of the second surface 3804*b* is closer to the mesiodistal midline M than an occlusal edge of the second surface 3804*b*. In some embodiments, the mesial edges of the first surface 3804*a* and the second surface 3804*b* are continuous with one another at a corner 3811.

The second protrusion 3806 and/or the third protrusion 3808 can be carried by the backing 3802 at positions opposite the first protrusion 3804 along one or more dimensions. The second protrusion 3806 and/or the third protrusion 3808 can be positioned at a gingival portion of the backing 3802, for example. As shown in FIG. 38, in some embodiments the second protrusion 3806 is spaced apart from the first protrusion 3804 by a gap 3826 along the occlusogingival dimension, and spaced apart from the third protrusion 3808 by a gap 3820 along the mesiodistal dimension. The gap 3820 can be sized to at least partially receive the portion of the connector 3703 connected to the head 3702 of the attachment portion 3700.

As shown in FIG. 38, the second protrusion 3806 can be positioned on the same side of the backing 3802 along the mesiodistal dimension (e.g., on the same side of the mesiodistal midline M) as the first protrusion 3804. In some embodiments, the second protrusion 3806 has a first region extending lingually (or buccally, depending on which side of the tooth the securing member 3800 is attached) away from the backing 3802. The second protrusion 3806 can also include a second region extending away from the first region towards an intermediate portion of the securing member 3800 and spaced apart from the backing 3802 by a gap 3822 along the buccolingual dimension. The gap 3822 can have a depth that is slightly greater than a thickness t of the attachment portion 3700 so that the attachment portion 3700 can fit between the second region of the second protrusion 3806 and the backing 3802. The second protrusion 3806 can also include securing surfaces 3816 configured to engage the second base region 3704*b* to prevent or limit gingival movement of the second base region 3704*b* and/or configured to engage the fourth base region 3704*d* to prevent or limit mesial or distal movement of the fourth base region 3704*d*. The second region 3706*b* of the second protrusion 3806 can include an inner surface (not visible) facing towards the backing 3802 and configured to prevent or limit lingual (or buccal) movement of the second base region 3704*b*. As such, the second protrusion 3806 prevents or limit movement of the second base region 3704*b* and/or the fourth base region 3704*d* in at least three directions, for example by functioning as a side, bottom, and front stop.

The third protrusion 3808 can be positioned on the opposite side of the backing 3802 along the mesiodistal dimension from the first protrusion 3804 and/or the second protrusion 3806, or at least spaced apart from the first protrusion 3804 and/or the second protrusion 3806 along a mesiodistal dimension. In some embodiments, the third protrusion 3808 can have a first region extending lingually (or buccally, depending on which side of the tooth the securing member 3800 is attached) away from the backing 3802. The third protrusion 3808 can have a second region extending away from the first region towards an intermediate portion of the securing member 3800 and spaced apart from the backing 3802 by a gap 3824 along the buccolingual dimension. The gap 3824 can have a depth that is slightly greater than a thickness t of the attachment portion 3700 so that the attachment portion 3700 can fit between the second region and the backing 3802. In some embodiments, the depth of the gap 3824 can be similar to the depth of the gap 3822 between the second region of the second protrusion 3806 and the backing 3802. The third protrusion 3808 can also include an inner surface facing towards the backing 3802 and configured to prevent or limit lingual (or buccal) movement of the base 3704. The first base region 3704*a* can positioned in the gap 3824 and restrained between the third protrusion 3808 and the backing 3802 in the secured position. The third protrusion 3808 can have securing surfaces 3818 configured to engage the first base region 3704*a* and/or the third base region 3704*c*. As shown in FIGS. 37-39B, the first protrusion 3704, the second protrusion 3706, and/or the third protrusion 3708 can have different shapes and/or sizes.

Referring to FIGS. 39A and 39B, in the secured state, the attachment portion 3700 can be positioned proximate and/or against the backing 3802 of the securing member 3800 and bound between the first, second, and third protrusions 3804, 3806, 3808. The connector 3703 can be positioned between the second protrusion 3806 and the third protrusion 3808 (e.g., within the gap 3820). Additionally or alternatively, the first base region 3704*a* can be positioned buccolingually between the third protrusion 3808 and the backing 3802 and the second base region 3704*b* can be positioned buccolingually between the second protrusion 3806 and the backing 3802. In the secured state, the first arm region 3706*a* can be positioned occlusogingivally between the first protrusion 3804 and the second protrusion 3806 (e.g., within gap 3826).

The attachment portion 3700 can comprise a resilient and/or superelastic material such that, when the attachment portion 3700 is braced between the first, second, and third protrusions 3804, 3806, 3808, the attachment portion 3700 actively exerts an outward force on the surrounding surfaces. For example, the second portion 3716 of the exterior surface 3719 of the arm 3706 can engage the gingivally-facing second surface 3804*b* of the first protrusion 3804 of the securing member 3800. The second portion 3716 of the exterior surface 3719 can frictionally engage the second surface 3804*b* of the first protrusion 3804 to prevent or limit occlusal and/or mesial or distal movement of the arm 3706 relative to the securing member 3800. The second base region 3704*b* can bear gingivally against an occlusal one of the securing surfaces 3716 of the second protrusion 3806 and/or the fourth base region 3704*d* can bear mesially or distally against a lateral one of the securing surface 3716 of the second protrusion 3806. The first base region 3704*a* can bear gingivally against an occlusal one of the securing surfaces 3718 of the third protrusion 3808 and/or the third base region 3704*c* can bear mesially or distally against a lateral one of the securing surface 3718 of the third protrusion 3808. Accordingly, the aforementioned surfaces of the attachment portion 3700 and the securing member 3800 that are configured to engage one another when the attachment portion 3700 is in the secured position can comprise securing surfaces.

In the secured position, the attachment portion 3700 is releasably secured to the securing member 3800 such that it cannot be inadvertently displaced or prematurely or inadvertently released by typical patient activity (such as chewing). The attachment portion 3700 (or one or more portions thereof) can be configured to press outwardly on the securing member 3800 when in the secured position. The active and/or continuous outward force exerted by the attachment portion 3700 on the securing member 3800 advantageously eliminates or reduces play between the attachment portion 3700 and securing member 3800 along a mesiodistal dimension, an occlusogingival dimension, and/or a buccolingual dimension, thus providing a more accurate and efficient transfer of force from the appliance to the tooth. In some embodiments, the attachment portion 3700 (or one or more portions thereof) does not chronically press outwardly on the securing member 3800 and is instead configured to engage the securing member 3800 if the attachment portion 3700 moves into contact with and/or moves such that it exerts a force on one or more portions of the securing member 3800. Thus, the securing member 3800 can be configured to limit movement of the attachment portion 3700 relative to the securing member 3800. In some embodiments, one or more of the securing surfaces is configured for transferring orthodontic force between the attachment portion 3700 (e.g., to and/or from the connector 3703, to and/or from the rest of the appliance, etc.) and the securing member 3800 (e.g., to and/or from the tooth, etc.). In various embodiments, one or more of the securing surfaces does not substantially transfer orthodontic force between the attachment portion 3700 and the securing member 3800.

The attachment portion 3700 of FIGS. 37, 39A and 39B can be secured to the securing member 3800 by positioning the attachment portion 3700 proximate the securing member 3800 and moving the attachment portion 3700 along an occlusogingival path. The connector 3703 or other portion of the appliance continuous with the head 3702 of the attachment portion 3700 can be positioned relative to the securing member 3800 such that at least a portion of the head 3702 is positioned occlusally of the first protrusion 3804 of the securing member 3800 and/or at, near, and/or occlusally of an occlusal edge of the backing 3802. The portion of the connector 3703 connected to the head 3702 can be positioned within the mesiodistal gap 3820 between the second and third protrusions 3806, 3808 of the securing member 3800. In some embodiments, the back surface of the attachment portion 3700 can be positioned proximate and/or in contact with the backing 3802 of the securing member 3800. In some embodiments, the operator slides the connector 3703 and head 3702 occlusogingivally by positioning a tool (e.g., tool 800) within the opening 3730 and/or the interior region 3722 and moving the tool occlusogingivally. The tool can contact the fifth base region 3704*e* (or the first base region 3704*a* if positioned in the interior region 3722) when sliding the tool gingivally to insert the attachment portion 3700. In any case, continued gingival movement of the connector 3703 and/or head 3702 forces the exterior surface 3719 of the arm 3706 at the first arm region 3706*a* into contact with the corner 3811 of the first protrusion 3804. Because the exterior surface 3719 along the first arm region 3706*a* faces gingivally and is angled toward the first protrusion 3804 during the securing process, the occlusally-oriented force applied to the exterior surface 3719 along the exterior surface 3719 along the first arm region 3706*a* during securement forces the first arm region 3706*a* to bend. Once the corner 3715 of the attachment portion 3700 is positioned gingival of the corner 3811 of the first protrusion 3804, the resilient arm 3706 and/or one or more portions thereof (e.g., the first arm region 3706*a*, etc.) bends back towards its shape in the relaxed state, thereby wedging the second portion 3716 of the external surface 3719 against the second surface 3804*b* of the first protrusion 3804 and wedging the attachment portion 3700 between the first, second, and third protrusions 3804, 3806, 3808, as shown in FIGS. 39A and 39B. Accordingly, one or more regions of the attachment portion 3700 can comprise a flexure 3732 configured to bend and/or otherwise deform to facilitate securing of the attachment portion 3700 to the securing member 3800. In some embodiments, the flexure 3732 comprises the first arm region 3706*a*. The first arm region 3706*a*, for example, can be configured to bend in a first direction to facilitate or enable sliding of the attachment portion 3700 gingivally of the first protrusion 3804 to secure to the securing member 3800 and/or the first arm region 3706*a* can be configured to bend in a second, opposite direction to facilitate or enable locking of the attachment portion 3700 to the securing member 3800. In some embodiments, deformation of the flexure 3732 causes one or more portions of the attachment portion 3700 to rotate. Moreover, the flexure 3732 can comprise other regions of the attachment portion 3700 in addition to or instead of the first arm region 3706*a* including, but not limited to, the second arm region 3706*b*, the third arm region 3706*c*, one or more of the bends 3720, the base 3704, etc.

To release the attachment portion 3700 from the securing member 3800, the attachment portion 3700 can be configured to deform and/or rotate relative to the securing member 3800. For example, an operator can insert a tool, such as the distal end surface 808 of tool 800, into the interior region 3722 defined by the arm 3706. An occlusal end of the tool surface can be positioned proximate the interior surface 3718 of the arm 3706 along the second arm region 3706*b* and a gingival end of the tool surface can be positioned proximate the first base region 3704*a*. The operator can rotate the tool about a buccolingual dimension (e.g., rotating the tool surface away from the first protrusion 3804 and/or towards the third arm region 3706*c*, etc.) such that an occlusal portion of the tool surface engages and pushes against the third arm region 3706*c* while the gingival portion of the tool surface engages the first base region 3704*a* and/or the first arm region 3706*a*. When the gingival portion of the tool surface can no longer move relative to the head 3702, the occlusal portion of the tool surface has good and/or maximum leverage against the third arm region 3706*c*. The tool can displace the third arm region 3704*c* and thereby force the second arm region 3706*b* to rotate with the tool surface. This causes the arm 3706 to bend at the flexure 3732, which can include the first arm region 3706*a*. The arm 3706 can bend such that the second portion 3716 of the external surface 3719 slides occlusally and mesiodistally along the second surface 3804*b* of the first protrusion 3804 and away from the first protrusion 3804 to release the attachment portion 3700 from the securing member 3800. In some embodiments, the attachment portion 3700 can pop or snap free of the securing member 3800 once the corner 3715 clears the first protrusion 3804. With or without the tool, the attachment portion 3700 can be moved occlusally until the wider gingival region of the head 3702 clears an occlusal surface of the second and third protrusions 3806, 3808, at which point the attachment portion 3700 can be pulled away from the backing 3802 along the buccolingual dimension.

The attachment portion 3700 can comprise a leveraging surface 3734 configured to engage a tool to facilitate deformation of the attachment portion 3700 to cause the attachment portion 3700 to release from the securing member 3800. In some embodiments, the third arm region 3706*c* of the attachment portion 3700 of FIGS. 37, 39A and 39B can have the leveraging surface 3734. Additionally or alternatively, the second arm region 3706*b*, the first arm region 3706*a*, and/or the base 3704 can have the leveraging surface 3734. In some embodiments, the attachment portion 3700 comprises multiple leveraging surfaces 3734.

The location at which the connector 3703 connects to the head 3702, a dimension along which the connector 3703 extends, a property of the connector 3703, etc. can be at least partially based on a force to be imparted on a tooth to which the attachment portion 3700 is configured to be secured (and/or an intended movement of the tooth). For example, as previously noted, the attachment portion 3700 can be configured to release from the securing member 3800 when the second ramped surface 3714 slides occlusally along the second surface 3804*b* of the first protrusion 3804 and/or mesiodistally away from the first protrusion 3804 (e.g., when the head 3702 rotates about the buccolingual dimension). Thus, to avoid any movement of a connector 3703 causing sliding of the second ramped surface 3714 relative to the second surface 3804*b* during treatment, the connector 3703 can connect to a portion of the attachment portion 3700 away from the arm 3706, and in particular in a location that would not cause movement of the arm 3706 in any way that is biased towards disengagement from the securing member 3800. In some cases, for example as shown in FIG. 37, the connector 3703 is continuous with the base 3704 of the head 3702 but not the arm 3706. Such a configuration can prevent or limit the connector 3703 from applying forces to the arm 3706 that inadvertently cause the flexure 3732 to deform during orthodontic treatment. Movement of the third arm region 3706*c* of the attachment portion 3700 in response to forces applied to the third arm region 3706*c* by a tool at the leveraging surface 3734 can cause the attachment portion 3700 to release from the securing member 3800. Accordingly, in some embodiments no connectors attach to the leveraging surface 3734 and/or the third arm region 3706*c* so that little to no force is applied to the leveraging surface 3734 and/or the third arm region 3706*c* during the normal course of treatment. Because the first and second base regions 3704*a*, 3704*b* are not obstructed mesially or distally (away from the mesiodistal midline M and/or opposite the mesiodistal gap 3820) when in the secured position, the head 3702 can be continuous with a mesiodistally extending connector at the first base region 3704*a* and/or the second base region 3704*b*. The location at which the connector 3703 connects to the head 3702, a dimension along which the connector 3703 extends, a property of the connector 3703, etc. can at least partially be based on the mechanism by which the attachment portion 3700 is attached and/or detached to the securing member 3800 and/or the geometry of the securing member 3800.

Figure 40:
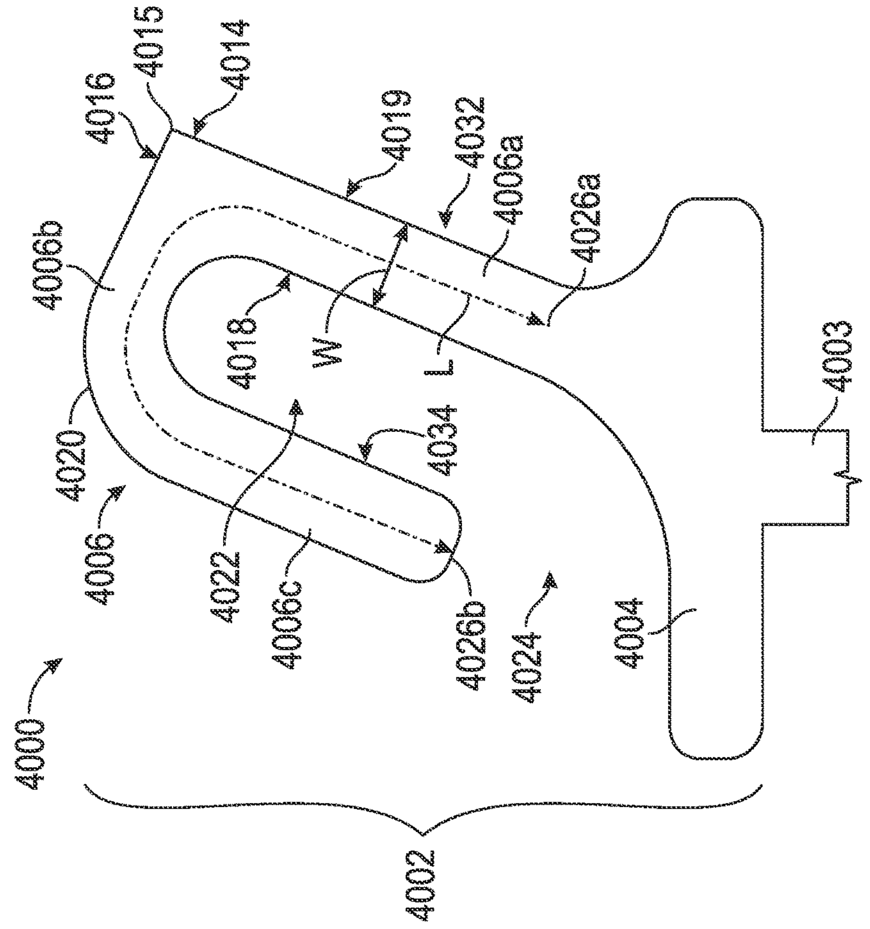
FIG. 40 is a front view of an attachment portion configured in accordance with several embodiments of the present technology.

In some embodiments, an attachment portion of the present technology does not comprise a shoulder configured to conformably engage a protrusion of a securing member to secure to the securing member. Some attachment portions disclosed herein have a surface configured to frictionally engage a protrusion of a securing member to secure to the securing member. FIG. 40 shows a planar view of an attachment portion 4000 configured in accordance with several embodiments of the present technology. The attachment portion 4000 can be configured to be secured to a patient's tooth via a securing member, such as securing member 4100 shown in FIG. 41. The attachment portion 4000 and the securing member 4100 are shown in a secured arrangement in FIGS. 42A and 42B. As discussed in greater detail below, the attachment portion 4000 and the securing member 4100 can be configured such that the attachment portion 4000 can be releasably secured to the securing member 4100. The attachment portion 4000 can be continuous with a connector 4003 that connects the attachment portion 4000 to one or more additional portions of an orthodontic appliance (not shown).

Referring to FIG. 40, the attachment portion 4000 can comprise a head 4002. In some embodiments, the attachment portion 4000 comprises a head 4002 and at least a portion of a connector 4003 that is continuous with the head 4002. The connector 4003, for example, can comprise a second connector as previously described herein and/or can extend gingivally away from a gingival portion of the head 4002. The connector 4003 can have features similar to any of the connectors disclosed herein (e.g., first connectors, second connectors, third connectors, etc.) and can comprise a single connector or multiple connectors. For example, the connector 4003 can comprise a single, occlusogingivally extending connector, multiple occlusogingivally extending connectors, one or more occlusogingivally extending connectors and one or more mesiodistally extending connectors branching off of the one or more occlusogingivally extending connectors and/or the attachment portion, or one or more mesiodistally extending connectors (and no occlusogingivally extending connectors). Accordingly, the attachment portion 4000 can be connected to a single connector or multiple connectors 4003. The connectors 4003 can connect to the head 4002 at a variety of locations. For example, a gingivally extending connector 4003 can connect to a gingival portion of the head 4002. Any of the connectors 4003 disclosed herein can extend away from the head 4002 along a variety of dimensions (e.g., along an occlusogingival dimension, a mesiodistal dimension, a buccolingual dimension, etc.).

In some embodiments, the head 4002 and the connector 4003 are part of the same, monolithic piece of material (e.g., cut from a sheet of material, a 3D-printed piece, etc.). Thus, the head 4002 and the connector 4003 may refer to different portions of the same continuous component. The attachment portion 4000 can be one portion of a greater orthodontic appliance, or may be formed separately and attached to an orthodontic appliance. The attachment portion 4000 and/or the corresponding appliance can be cut from the same sheet of material and/or may be formed by molding, casting, machining, 3D printing, stamping, extruding, or the like. The attachment portion 4000 may comprise a metal or a plastic and may have superelastic and/or shape memory properties. In some embodiments, the attachment portion 4000 does not have superelastic and/or shape memory properties.

The head 4002 of the attachment portion 4000 can comprise a base 4004 and an arm 4006 extending from the base 4004. The arm 4006 can be configured to bend and/or rotate relative to the base 4004 while the attachment portion 4000 is being secured to and/or released from the securing member 4100. In some embodiments, the arm 4006 comprises an elongate member having a first end portion 4026*a*, a second end portion 4026*b*, and a longitudinal axis L extending between the first and second end portions 4026*a*, 4026*b*. The arm 4006 can partially enclose and define an interior region 4022. The arm 4006 can include one or more bends 4020 along its longitudinal axis L. As discussed in greater detail herein, the interior region 4022 can be sized to receive a tool configured to release the attachment portion 4000 from a securing member (such as securing member 4100). Additionally or alternatively, the interior region 4022 can be sized to receive a tool to facilitate securing of the attachment portion 4000 to the securing member 4100. As shown in FIG. 40, in some embodiments the base 4004 does not define an opening 4030.

The head 4002 can have a front surface (facing out of the page) and a back surface (not visible in FIG. 40), and a thickness t (labeled in FIG. 42A) measured between the front and back surfaces. The arm 4006 of the attachment portion 4000 can have an interior surface 4018 facing the interior region 4022, an exterior surface 4019 facing away from the interior region 4022, and a width w measured between the interior and exterior surfaces 4018, 4019. The base 4004 and/or arm 4006 can have a substantially constant thickness or may have a varying thickness. Likewise, the base 4004 and/or arm 4006 can have a substantially constant width or may have a varying width. A width and/or thickness of the base 4004 and/or arm 4006 can be varied to impart a preferred stiffness profile to all or a portion of the base 4004 and/or arm 4006.

The base 4004 can be disposed at and/or continuous with a junction between the first end portion 4026*a* of the arm 4006*a* and the connector 4003. In some embodiments, the base 4004 extends mesially and distally away from the first end portion 4026*a* and/or the connector 4003. As shown in FIG. 40, the base 4004 can comprise a neck portion proximate the first end portion 4026*a* of the arm 4006*a* at which a mesiodistal dimension of the base 4004 is smaller.

Figure 42B:
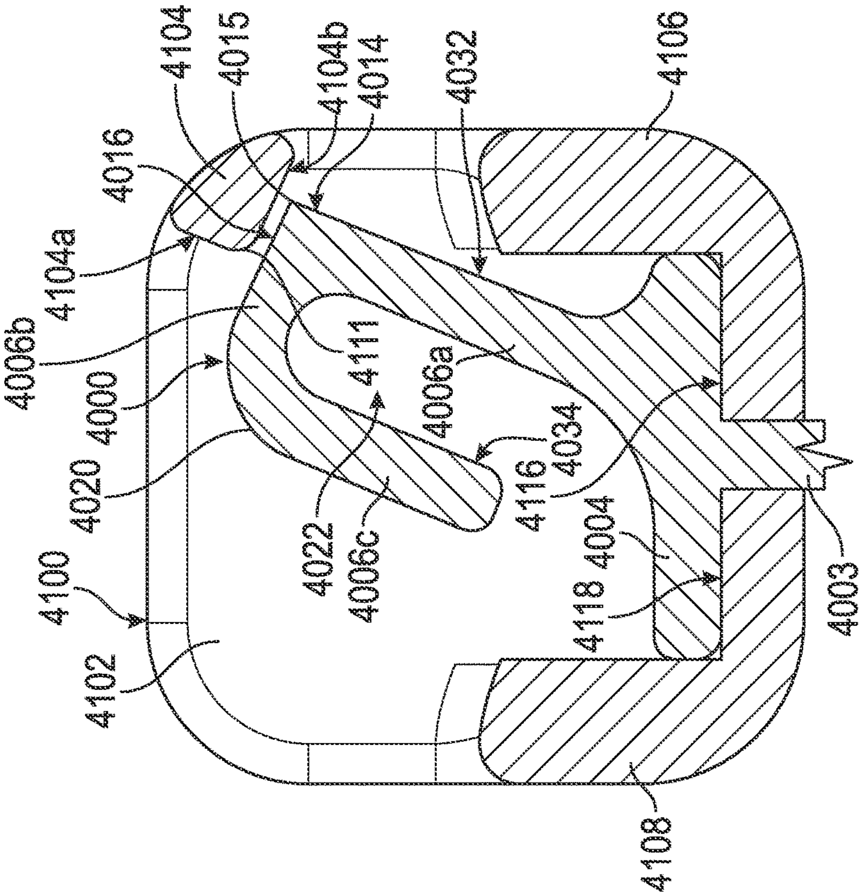
FIGS. 42A and 42B are different views of an attachment portion secured to a securing member in accordance with several embodiments of the present technology.
Figure 42A:
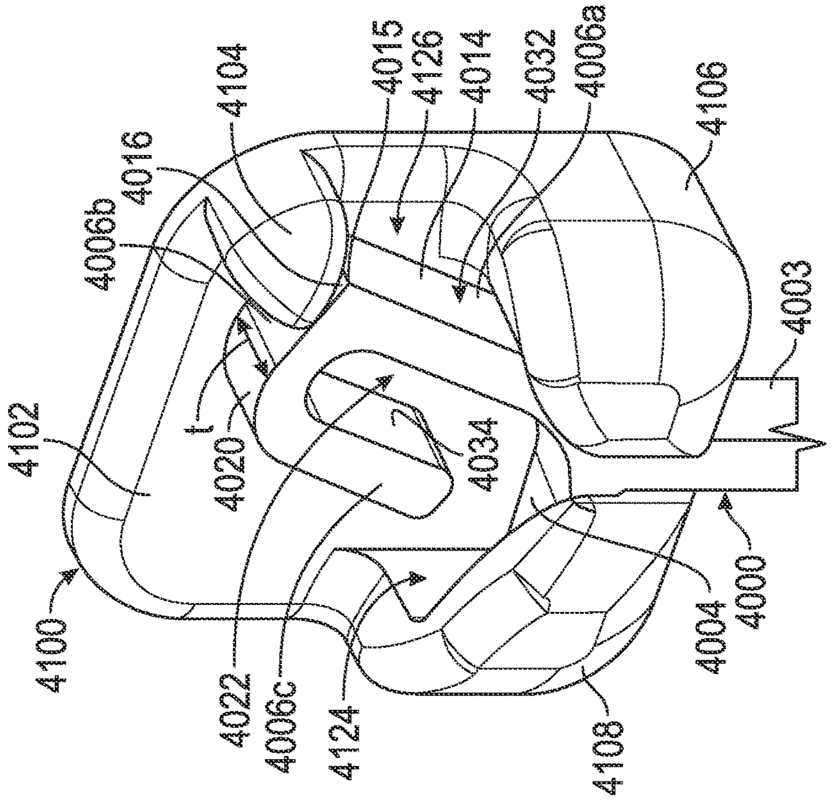

The arm 4006 can extend away from the base 4004 along the occlusogingival dimension, the mesiodistal dimension, and/or the buccolingual dimension. For example, the arm 4006 can extend mesiodistally and occlusally away from the base 4004. As shown in FIG. 40, the arm 4006 can extend occlusally, mesiodistally, and then gingivally. In some embodiments, the first end portion 4026*a* of the arm 4006 is continuous with and/or disposed at the base 4004. At least when the attachment portion 4000 is in a relaxed (unsecured) state (as shown in FIG. 40), the second end portion 4026*b* of the arm 4006 can be spaced apart from the base 4004 along an occlusogingival dimension by a gap 4024 that is continuous with the interior region 4022. In some embodiments, the second end portion 4026*b* of the arm 4006 and the base 4004 can be spaced apart by the gap 4024 even when the attachment portion 4000 is in a compressed (secured) state (for example as shown in FIGS. 42A and 42B). The second end portion 4026*b* and the base 4004 can be spaced apart along an occlusogingival dimension, a mesiodistal dimension, and/or a buccolingual dimension.

The arm 4006 can include a first arm region 4006*a* extending occlusally away from the first end portion 4026*a* of the arm 4006, a second arm region 4006*b* continuous with and extending mesiodistally and, optionally occlusally, away from an end of the first arm region 4006*a*, a third arm region 4006*c* continuous with and extending gingivally away from an end of the second arm region 4006*b*. In some embodiments, the exterior surface 4019 at the first arm region 4006*a* extends occlusally and mesiodistally away from the first end portion 4026*a* of the arm 4006 such that the exterior surface 4019 at the first arm region 4006*a* comprises a ramped surface. The exterior surface 4019 at the first arm region 4006*a* can be configured to force the arm 4006 to bend or rotate (e.g., at the first arm region 4006*a*, etc.) when engaging a protrusion of the securing member 4100 during engagement and/or disengagement. As shown in FIG. 40, a first portion 4014 of the exterior surface 4019 at the first arm region 4006*a* can meet a second portion 4016 of the exterior surface 4019 at the second arm region 4006*b* at a corner 4015. The second portion 4016 of the exterior surface 4019 and/or the corner 4015 can be configured to engage a protrusion on a securing member 4100 to oppose rotational and/or translational movement of the arm 4006 relative to the securing member 4100. In some embodiments, the second portion 4016 of the exterior surface 4019 and/or the corner 4015 can be configured to frictionally engage a portion of a protrusion.

Figure 41:
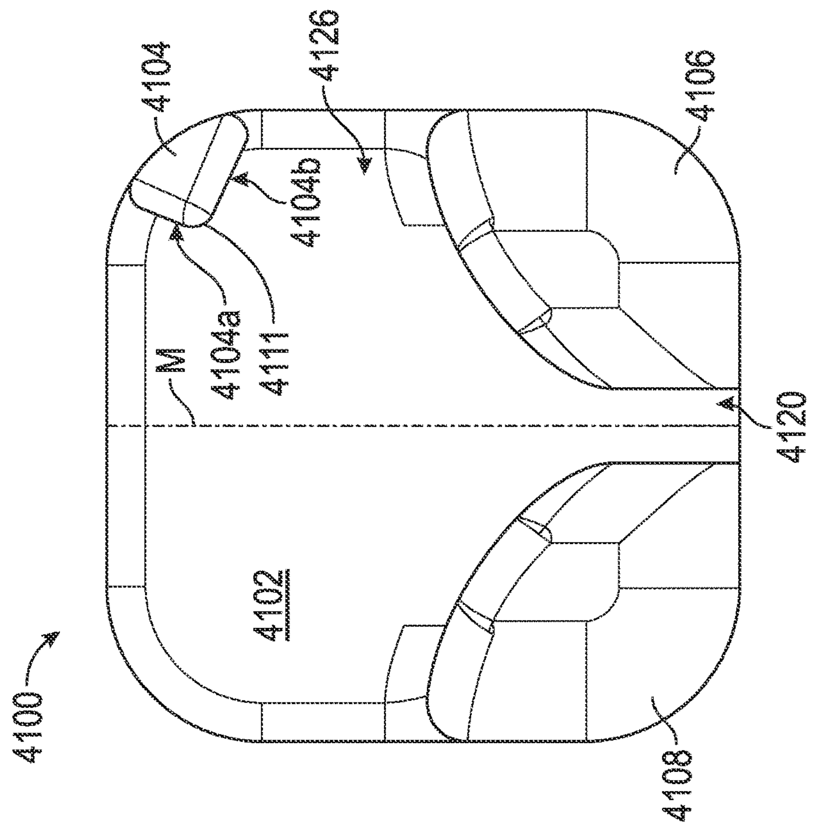
FIG. 41 is a front view of a securing member configured in accordance with several embodiments of the present technology.

FIG. 41 is a front view of the securing member 4100 configured for use with the attachment portion 4000. The securing member 4100 has a first side (facing out of the page) and a second side (not visible in FIG. 41) opposite the first side along a thickness of the securing member 4100 and configured to be bonded to a patient's tooth. The securing member 4100 can comprise a backing 4102 and a plurality of protrusions (e.g., first protrusion 4104, second protrusion 4106, third protrusion 4108, etc.) carried by and extending away from the first side of the backing 4102 along a buccolingual dimension. The protrusions 4104, 4106, 4108 can be configured to engage the attachment portion 4000 to retain the attachment portion 4000 at a specific location relative to the backing 4102 and the patient's tooth.

The first protrusion 4104 can be configured to engage the second portion 4016 of the exterior surface 4019 and/or the corner 4015 of the arm 4006 to prevent or limit motion of the attachment portion 4000 in an occlusal direction and a mesial or distal direction. The first protrusion 4104 can be positioned at an occlusal portion of the backing 4102. In some embodiments, the first protrusion 4104 is positioned to a side of a mesiodistal midline M of the backing 4102. The first protrusion 4104 can be positioned near a perimeter of the backing 4102, for example as shown in FIG. 41, or can be positioned away from the perimeter and towards an intermediate portion of the backing 4102. The first protrusion 4104 can have a first surface 4104*a* and a second surface 4104*b*. In some embodiments, the first surface 4104*a* is angled with respect to the second surface 4104*b*. In some embodiments, the first surface 4104*a* can be substantially perpendicular to a first plane in which the occlusogingival dimension and the mesiodistal dimension lie, angled relative to a second plane in which the buccolingual dimension and the mesiodistal dimension lie, and angled relative to a third plane in which the buccolingual dimension and the occlusogingival dimension lie. The first surface 4104*a* can be slanted such that a gingival edge of the first surface 4104*a* is closer to the mesiodistal midline M than an occlusal edge of the first surface 4104*a*. In some embodiments, the second surface 4104*b* can be substantially perpendicular to the first plane in which the occlusogingival dimension and the mesiodistal dimension lie, angled relative to the second plane in which the buccolingual dimension and the mesiodistal dimension lie, and angled relative to the third plane in which the buccolingual dimension and the occlusogingival dimension lie. The second surface 4104*b* can be slanted such that an occlusal edge of the second surface 4104*b* is closer to the mesiodistal midline M than an occlusal edge of the second surface 4104*b*. In some embodiments, the mesial edges of the first surface 4104*a* and the second surface 4104*b* are continuous with one another at a corner 4111.

The second protrusion 4106 and/or the third protrusion 4108 can be carried by the backing 4102 at positions opposite the first protrusion 4104 along one or more dimensions. The second protrusion 4106 and/or the third protrusion 4108 can be positioned at a gingival portion of the backing 4102, for example. As shown in FIG. 41, in some embodiments the second protrusion 4106 is spaced apart from the first protrusion 4104 by a gap 4126 along the occlusogingival dimension, and spaced apart from the third protrusion 4108 by a gap 4120 along the mesiodistal dimension. The gap 4120 can be sized to at least partially receive the portion of the connector 4003 connected to the head 4002 of the attachment portion 4000.

As shown in FIG. 41, the second protrusion 4106 can be positioned on the same side of the backing 4102 along the mesiodistal dimension (e.g., on the same side of the mesiodistal midline M) as the first protrusion 4104. In some embodiments, the second protrusion 4106 has a first region extending lingually (or buccally, depending on which side of the tooth the securing member 4100 is attached) away from the backing 4102. The second protrusion 4106 can also include a second region extending away from the first region towards an intermediate portion of the securing member 4100 and spaced apart from the backing 4102 by a gap along the buccolingual dimension. The gap can have a depth that is slightly greater than a thickness t of the attachment portion 4000 so that the attachment portion 4000 can fit between the second region of the second protrusion 4106 and the backing 4102. The second protrusion 4106 can also include an internal surface 4116 configured to engage the base 4004 to prevent or limit gingival and mesial or distal movement of the base 4004. The second region of the second protrusion 4106 can include an inner surface (not visible) facing towards the backing 4102 and configured to prevent or limit lingual (or buccal) movement of the base 4004. As such, the second protrusion 4106 prevents or limit movement of the base 4004 in at least three directions, for example by functioning as a side, bottom, and front stop.

The third protrusion 4108 can be positioned on the opposite side of the backing 4102 along the mesiodistal dimension from the first protrusion 4104 and/or the second protrusion 4106, or at least spaced apart from the first protrusion 4104 and/or the second protrusion 4106 along a mesiodistal dimension. In some embodiments, the third protrusion 4108 can have a first region extending lingually (or buccally, depending on which side of the tooth the securing member 4100 is attached) away from the backing 4102. The third protrusion 4108 can have a second region extending away from the first region towards an intermediate portion of the securing member 4100 and spaced apart from the backing 4102 by a gap 4124 along the buccolingual dimension. The gap 4124 can have a depth that is slightly greater than a thickness t of the attachment portion 4000 so that the attachment portion 4000 can fit between the second region and the backing 4102. In some embodiments, the depth of the gap 4124 can be similar to the depth of the gap between the second region of the second protrusion 4106 and the backing 4102. The third protrusion 4108 can also include an inner surface facing towards the backing 4102 and configured to prevent or limit lingual (or buccal) movement of the base 4004. The base 4004 can positioned in the gap 4124 and restrained between the third protrusion 4108 and the backing 4102 in the secured position. The third protrusion 4108 can have an internal surface 4118 configured to engage the base 4004. As shown in FIGS. 40-42B, the first protrusion 4004, the second protrusion 4006, and/or the third protrusion 4008 can have different shapes and/or sizes.

Referring to FIGS. 42A and 42B, in the secured state, the attachment portion 4000 can be positioned proximate and/or against the backing 4102 of the securing member 4100 and bound between the first, second, and third protrusions 4104, 4106, 4108. The connector 4003 can be positioned between the second protrusion 4106 and the third protrusion 4108 (e.g., within the gap 4120). Additionally or alternatively, the base 4004 can be positioned buccolingually between the second protrusion 4106 and the backing 4102 and between the third protrusion 4108 and the backing 4102. In the secured state, the first arm region 4006*a* can be positioned occlusogingivally between the first protrusion 4104 and the second protrusion 4106 (e.g., within gap 4126).

The attachment portion 4000 can comprise a resilient and/or superelastic material such that, when the attachment portion 4000 is braced between the first, second, and third protrusions 4104, 4106, 4108, the attachment portion 4000 actively exerts an outward force on the surrounding surfaces. For example, the second portion 4016 of the exterior surface 4019 of the arm 4006 can engage the gingivally-facing second surface 4104*b* of the first protrusion 4104 of the securing member 4100. The second portion 4016 of the exterior surface 4019 can frictionally engage the second surface 4104*b* of the first protrusion 4104 to prevent or limit occlusal and/or mesial or distal movement of the arm 4006 relative to the securing member 4100. The base 4004 can bear gingivally, mesially, and distally against the internal surface 4016 of the second protrusion 4106 and/or the internal surface 4018 of the third protrusion 4108. Accordingly, the aforementioned surfaces of the attachment portion 4000 and the securing member 4100 that are configured to engage one another when the attachment portion 4000 is in the secured position can comprise securing surfaces.

In the secured position, the attachment portion 4000 is releasably secured to the securing member 4100 such that it cannot be inadvertently displaced or prematurely or inadvertently released by typical patient activity (such as chewing). The attachment portion 4000 (or one or more portions thereof) can be configured to press outwardly on the securing member 4100 when in the secured position. The active and/or continuous outward force exerted by the attachment portion 4000 on the securing member 4100 advantageously eliminates or reduces play between the attachment portion 4000 and securing member 4100 along a mesiodistal dimension, an occlusogingival dimension, and/or a buccolingual dimension, thus providing a more accurate and efficient transfer of force from the appliance to the tooth. In some embodiments, the attachment portion 4000 (or one or more portions thereof) does not chronically press outwardly on the securing member 4100 and is instead configured to engage the securing member 4100 if the attachment portion 4000 moves into contact with and/or moves such that it exerts a force on one or more portions of the securing member 4100. Thus, the securing member 4100 can be configured to limit movement of the attachment portion 4000 relative to the securing member 4100. In some embodiments, one or more of the securing surfaces is configured for transferring orthodontic force between the attachment portion 4000 (e.g., to and/or from the connector 4003, to and/or from the rest of the appliance, etc.) and the securing member 4100 (e.g., to and/or from the tooth, etc.). In various embodiments, one or more of the securing surfaces does not substantially transfer orthodontic force between the attachment portion 4000 and the securing member 4100.

The attachment portion 4000 of FIGS. 40, 42A and 42B can be secured to the securing member 4100 by positioning the attachment portion 4000 proximate the securing member 4100 and moving the attachment portion 4000 along an occlusogingival path. The connector 4003 or other portion of the appliance continuous with the head 4002 of the attachment portion 4000 can be positioned relative to the securing member 4100 such that at least a portion of the head 4002 is positioned occlusally of the first protrusion 4104 of the securing member 4100 and/or at, near, and/or occlusally of an occlusal edge of the backing 4102. The portion of the connector 4003 connected to the head 4002 can be positioned within the mesiodistal gap 4120 between the second and third protrusions 4106, 4108 of the securing member 4100. In some embodiments, the back surface of the attachment portion 4000 can be positioned proximate and/or in contact with the backing 4102 of the securing member 4100. In some embodiments, the operator slides the connector 4003 and head 4002 occlusogingivally by positioning a tool (e.g., tool 800) within the interior region 4022 and moving the tool occlusogingivally. The tool can contact the base 4004 when sliding the tool gingivally to insert the attachment portion 4000. In any case, continued gingival movement of the connector 4003 and/or head 4002 forces the exterior surface 4019 of the arm 4006 at the first arm region 4006*a* into contact with the corner 4111 of the first protrusion 4104. Because the exterior surface 4019 along the first arm region 4006*a* faces gingivally and is angled toward the first protrusion 4104 during the securing process, the occlusally-oriented force applied to the exterior surface 4019 along the exterior surface 4019 along the first arm region 4006*a* during securement forces the first arm region 4006*a* to bend. Once the corner 4015 of the attachment portion 4000 is positioned gingival of the corner 4111 of the first protrusion 4104, the resilient arm 4006 and/or one or more portions thereof (e.g., the first arm region 4006*a*, etc.) bends back towards its shape in the relaxed state, thereby wedging the second portion 4016 of the external surface 4019 against the second surface 4104*b* of the first protrusion 4104 and wedging the attachment portion 4000 between the first, second, and third protrusions 4104, 4106, 4108, as shown in FIGS. 42A and 42B. Accordingly, one or more regions of the attachment portion 4000 can comprise a flexure 4032 configured to bend and/or otherwise deform to facilitate securing of the attachment portion 4000 to the securing member 4100. In some embodiments, the flexure 4032 comprises the first arm region 4006*a*. The first arm region 4006*a*, for example, can be configured to bend in a first direction to facilitate or enable sliding of the attachment portion 4000 gingivally of the first protrusion 4104 to secure to the securing member 4100 and/or the first arm region 4006*a* can be configured to bend in a second, opposite direction to facilitate or enable locking of the attachment portion 4000 to the securing member 4100. In some embodiments, deformation of the flexure 4032 causes one or more portions of the attachment portion 4000 to rotate. Moreover, the flexure 4032 can comprise other regions of the attachment portion 4000 in addition to or instead of the first arm region 4006*a* including, but not limited to, the second arm region 4006*b*, the third arm region 4006*c*, one or more of the bends 4020, the base 4004, etc.

To release the attachment portion 4000 from the securing member 4100, the attachment portion 4000 can be configured to deform and/or rotate relative to the securing member 4100. For example, an operator can insert a tool, such as the distal end surface 808 of tool 800, into the interior region 4022 defined by the arm 4006. An occlusal end of the tool surface can be positioned proximate the interior surface 4018 of the arm 4006 along the second arm region 4006*b* and a gingival end of the tool surface can be positioned proximate the base 4004. The operator can rotate the tool about a buccolingual dimension (e.g., rotating the tool surface away from the first protrusion 4104 and/or towards the third arm region 4006*c*, etc.) such that an occlusal portion of the tool surface engages and pushes against the third arm region 4006*c* while the gingival portion of the tool surface engages the base 4004 and/or the first arm region 4006*a*. When the gingival portion of the tool surface can no longer move relative to the head 4002, the occlusal portion of the tool surface has good and/or maximum leverage against the third arm region 4006*c*. The tool can displace the third arm region 4004*c* and thereby force the second arm region 4006*b* to rotate with the tool surface. This causes the arm 4006 to bend at the flexure 4032, which can include the first arm region 4006*a*. The arm 4006 can bend such that the second portion 4016 of the external surface 4019 slides occlusally and mesiodistally along the second surface 4104*b* of the first protrusion 4104 and away from the first protrusion 4104 to release the attachment portion 4000 from the securing member 4100. In some embodiments, the attachment portion 4000 can pop or snap free of the securing member 4100 once the corner 4015 clears the first protrusion 4104. With or without the tool, the attachment portion 4000 can be moved occlusally until the wider gingival region of the head 4002 clears an occlusal surface of the second and third protrusions 4106, 4108, at which point the attachment portion 4000 can be pulled away from the backing 4102 along the buccolingual dimension.

The attachment portion 4000 can comprise a leveraging surface 4034 configured to engage a tool to facilitate deformation of the attachment portion 4000 to cause the attachment portion 4000 to release from the securing member 4100. In some embodiments, the third arm region 4006*c* of the attachment portion 4000 of FIGS. 40, 42A and 42B can have the leveraging surface 4034. Additionally or alternatively, the second arm region 4006*b*, the first arm region 4006*a*, and/or the base 4004 can have the leveraging surface 4034. In some embodiments, the attachment portion 4000 comprises multiple leveraging surfaces 4034.

The location at which the connector 4003 connects to the head 4002, a dimension along which the connector 4003 extends, a property of the connector 4003, etc. can be at least partially based on a force to be imparted on a tooth to which the attachment portion 4000 is configured to be secured (and/or an intended movement of the tooth). For example, as previously noted, the attachment portion 4000 can be configured to release from the securing member 4100 when the second ramped surface 4014 slides occlusally along the second surface 4104*b* of the first protrusion 4104 and/or mesiodistally away from the first protrusion 4104 (e.g., when the head 4002 rotates about the buccolingual dimension). Thus, to avoid any movement of a connector 4003 causing sliding of the second ramped surface 4014 relative to the second surface 4104*b* during treatment, the connector 4003 can connect to a portion of the attachment portion 4000 away from the arm 4006, and in particular in a location that would not cause movement of the arm 4006 in any way that is biased towards disengagement from the securing member 4100. In some cases, for example as shown in FIG. 40, the connector 4003 is continuous with the base 4004 of the head 4002 but not the arm 4006. Such a configuration can prevent or limit the connector 4003 from applying forces to the arm 4006 that inadvertently cause the flexure 4032 to deform during orthodontic treatment. Movement of the third arm region 4006*c* of the attachment portion 4000 in response to forces applied to the third arm region 4006*c* by a tool at the leveraging surface 4034 can cause the attachment portion 4000 to release from the securing member 4100. Accordingly, in some embodiments no connectors attach to the leveraging surface 4034 and/or the third arm region 4006*c* so that little to no force is applied to the leveraging surface 4034 and/or the third arm region 4006*c* during the normal course of treatment. Because the second protrusion 4106 and the third protrusion 4108 are each closed mesially or distally (away from the mesiodistal midline M and/or opposite the mesiodistal gap 4120) when in the secured position, the head 4002 may not be continuous with a mesiodistally extending connector at the base 4004. The location at which the connector 4003 connects to the head 4002, a dimension along which the connector 4003 extends, a property of the connector 4003, etc. can at least partially be based on the mechanism by which the attachment portion 4000 is attached and/or detached to the securing member 4100 and/or the geometry of the securing member 4100.

Figure 43:
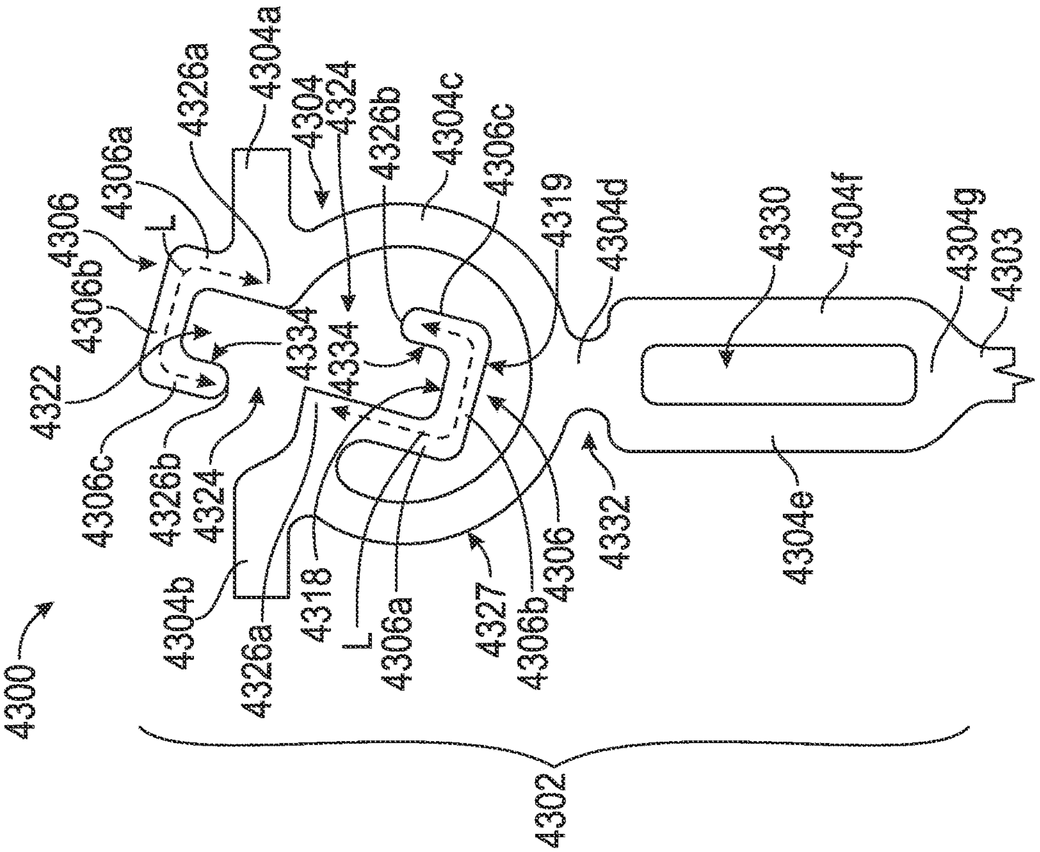
FIG. 43 is a front view of an attachment portion configured in accordance with several embodiments of the present technology.

In some embodiments, an attachment portion of the present technology can comprise multiple arms. FIG. 43 shows a planar view of an attachment portion 4300 configured in accordance with several of such embodiments. The attachment portion 4300 can be configured to be secured to a patient's tooth via a securing member, such as securing member 4400 shown in FIG. 44. The attachment portion 4300 and the securing member 4400 are shown in a secured arrangement in FIGS. 45A and 45B. As discussed in greater detail below, the attachment portion 4300 and the securing member 4400 can be configured such that the attachment portion 4300 can be releasably secured to the securing member 4400. The attachment portion 4300 can be continuous with a connector 4303 that connects the attachment portion 4300 to one or more additional portions of an orthodontic appliance (not shown).

Referring to FIG. 43, the attachment portion 4300 can comprise a head 4302. In some embodiments, the attachment portion 4300 comprises a head 4302 and at least a portion of a connector 4303 that is continuous with the head 4302. The connector 4303, for example, can comprise a second connector as previously described herein and/or can extend gingivally away from a gingival portion of the head 4302. The connector 4303 can have features similar to any of the connectors disclosed herein (e.g., first connectors, second connectors, third connectors, etc.) and can comprise a single connector or multiple connectors. For example, the connector 4303 can comprise a single, occlusogingivally extending connector, multiple occlusogingivally extending connectors, one or more occlusogingivally extending connectors and one or more mesiodistally extending connectors branching off of the one or more occlusogingivally extending connectors and/or the attachment portion, or one or more mesiodistally extending connectors (and no occlusogingivally extending connectors). Accordingly, the attachment portion 4300 can be connected to a single connector or multiple connectors 4303. The connectors 4303 can connect to the head 4302 at a variety of locations. For example, a gingivally extending connector 4303 can connect to a gingival portion of the head 4302. Any of the connectors 4303 disclosed herein can extend away from the head 4302 along a variety of dimensions (e.g., along an occlusogingival dimension, a mesiodistal dimension, a buccolingual dimension, etc.).

In some embodiments, the head 4302 and the connector 4303 are part of the same, monolithic piece of material (e.g., cut from a sheet of material, a 3D-printed piece, etc.). Thus, the head 4302 and the connector 4303 may refer to different portions of the same continuous component. The attachment portion 4300 can be one portion of a greater orthodontic appliance, or may be formed separately and attached to an orthodontic appliance. The attachment portion 4300 and/or the corresponding appliance can be cut from the same sheet of material and/or may be formed by molding, casting, machining, 3D printing, stamping, extruding, or the like. The attachment portion 4300 may comprise a metal or a plastic and may have superelastic and/or shape memory properties. In some embodiments, the attachment portion 4000 does not have superelastic and/or shape memory properties.

The head 4302 of the attachment portion 4300 can comprise a base 4304 and one or more arms 4306 extending from the base 4304. For example, the attachment portion 4300 in FIG. 43 comprises two arms 4306. The arms 4306 can be configured to bend and/or rotate relative to the base 4304 while the attachment portion 4300 is being secured to and/or released from the securing member 4400. In some embodiments, each of the arms 4306 comprises an elongate member having a first end portion 4326*a*, a second end portion 4326*b*, and a longitudinal axis L extending between the first and second end portions 4326*a*, 4326*b*. The arms 4306 can together partially enclose and define an interior region 4322. Each of the arms 4306 can include one or more bends 4320 along its longitudinal axis L. The interior region 4322 can be sized to receive a tool configured to release the attachment portion 4300 from a securing member (such as securing member 4400). Additionally or alternatively, the interior region 4322 can be sized to receive a tool to facilitate securing of the attachment portion 4300 to the securing member 4400. As shown in FIG. 43, in some embodiments the base 4304 at least partially encloses and defines an opening 4330. The opening 4330 can be sized to receive a tool to facilitate securing of the attachment portion 4300 to the securing member 4400.

The head 4302 can have a front surface (facing out of the page) and a back surface (not visible in FIG. 43), and a thickness t (labeled in FIG. 45A) measured between the front and back surfaces. The arms 4306 of the attachment portion 4300 can have an interior surface 4318 facing the interior region 4322, an exterior surface 4319 facing away from the interior region 4322, and a width measured between the interior and exterior surfaces 4318, 4319. The base 4304 and/or arms 4306 can have a substantially constant thickness or may have a varying thickness. Likewise, the base 4304 and/or arms 4306 can have a substantially constant width or may have a varying width. A width and/or thickness of the base 4304 and/or arms 4306 can be varied to impart a preferred stiffness profile to all or a portion of the base 4304 and/or arms 4306.

The base 4304 can include a first base region 4304*a* extending away from the first end portion 4326*a* of an occlusal one of the arms 4306 along one of a mesial or distal dimension and a second base region 4304*b* extending away from the first end portion 4326*a* of a gingival one of the arms 4306 along the other of the mesial or distal dimensions. The base 4304 can include a third base region 4304*c* continuous with the first and second base regions 4304*a*, 4304*b*. In some embodiments, for example as shown in FIG. 43, the third base region 4304*c* can be curved. The base 4304 can include a fourth base region 4304*d* continuous with and gingival of a gingival portion of the third base region 4304*c*. In some embodiments, the base 4304 comprises a fifth base region 4304*e* and a sixth base region 4304*f*, each branching laterally from and extending gingivally away from the fourth base region 4304*d*. Additionally or alternatively, the base 4304 can comprise a seventh base region 4304*g* continuous with and extending gingivally away from the fifth base region 4304*e* and the sixth base region 4304*f*. The base 4304 (e.g., the fourth-seventh base regions 4304*d*-4304*g*, etc.) can enclose the opening 4330. In some embodiments, the base 4004 has more or fewer regions.

The arms 4306 can extend away from the base 4304 along the occlusogingival dimension, the mesiodistal dimension, and/or the buccolingual dimension. As shown in FIG. 43, a first one of the arms 4306 can extend occlusally, mesiodistally, and then gingivally from the first base region 4304*a*. In some embodiments, a second one of the arms 4306 can extend gingivally, mesiodistally, and then occlusally from the second base region 4304*b*. At least when the attachment portion 4300 is in a relaxed (unsecured) state (as shown in FIG. 43), the second end portion 4326*b* of the first arm 4306 can be spaced apart from the first end portion 4326*a* of the second arm 4306 along an occlusogingival dimension by a gap 4324 that is continuous with the interior region 4322 and/or the second end portion 4326*b* of the second arm 4306 can be spaced apart from the first end portion 4326*a* of the first arm 4306 along an occlusogingival dimension by a gap 4324 that is continuous with the interior region 4322.

Each of the arms 4306 can include a first arm region 4306*a* extending away from the first end portion 4326*a* of the arm 4306, a second arm region 4306*b* continuous with and extending away from an end of the first arm region 4306*a*, and a third arm region 4006*c* continuous with and extending away from an end of the second arm region 4306*b*. In some embodiments, the first arm region 4306*a* of the first one of the arms 4306 extends occlusally and one of mesially or distally away from the first end portion 4326*a* of the first arm 4306 and/or the first arm region 4306*a* of the second one of the arms 4306 extends gingivally and the other of mesially or distally away from the first end portion 4326*a* of the second arm 4306. Accordingly, the first arm regions 4306*a* can be angled relative to an occlusogingival dimension. The second arm regions 4306*b* of the arms 4306 can extend in opposing directions along a mesiodistal dimension. Additionally or alternatively, the second arm region 4306*b* of the first one of the arms 4306 can extend occlusally away from the first arm region 4306*a* and/or the second arm region 4306*b* of the second one of the arms 4306 can extend gingivally away from the first arm region 4306*a*. Accordingly, the second arm regions 4306*b* can be angled relative to a mesiodistal dimension. As shown in FIG. 43, the third arm region 4306*c* of the first one of the arms 4306 extends gingivally away from the second arm regions 4306*b* and/or the third arm region 4306*c* of the second one of the arms 4306 extends occlusally away from the second arm region 4306*b*. In some embodiments, the second arm regions 4306*b* can be angled relative to the occlusogingival dimension.

Figure 44:
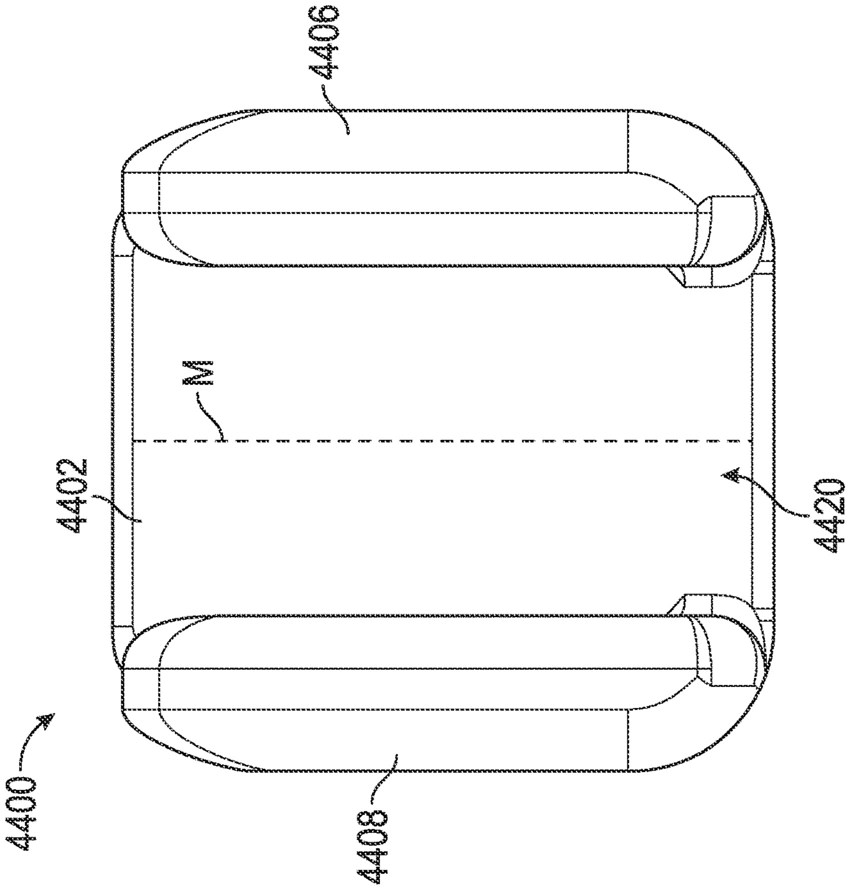
FIG. 44 is a front view of a securing member configured in accordance with several embodiments of the present technology.

FIG. 44 is a front view of the securing member 4400 configured for use with the attachment portion 4300. The securing member 4400 has a first side (facing out of the page) and a second side (not visible in FIG. 44) opposite the first side along a thickness of the securing member 4400 and configured to be bonded to a patient's tooth. The securing member 4400 can comprise a backing 4402 and a plurality of protrusions (e.g., first protrusion 4406, second protrusion 4408, etc.) carried by and extending away from the first side of the backing 4402 along a buccolingual dimension. In some embodiments, the second protrusion 4408 is spaced apart from the first protrusion 4406 by a gap 4126 by a gap 4420 along the mesiodistal dimension. The gap 4420 can be sized to at least partially receive the base 4304 of the attachment portion 4300. The protrusions 4406, 4408 can be configured to engage the attachment portion 4300 to retain the attachment portion 4300 at a specific location relative to the backing 4402 and the patient's tooth.

The first protrusion 4406 can be configured to engage the first base region 4304*a* and/or the third base region 4304*c* to prevent or limit motion of the attachment portion 4300 in a gingival direction, an occlusal direction, and a mesial or distal direction. The first protrusion 4406 can be positioned at a mesial or distal portion of the backing 4402 (e.g., to a side of a mesiodistal midline M of the backing 4402). The first protrusion 4406 can be positioned near a perimeter of the backing 4402, for example as shown in FIG. 44, or can be positioned away from the perimeter and towards an intermediate portion of the backing 4402. In some embodiments, the first protrusion 4406 has a first region extending lingually (or buccally, depending on which side of the tooth the securing member 4400 is attached) away from the backing 4402. The first protrusion 4406 can also include a second region extending away from the first region towards an intermediate portion of the securing member 4400 and spaced apart from the backing 4402 by a gap 4422 along the buccolingual dimension. The gap 4422 can have a depth that is slightly greater than a thickness t of the attachment portion 4300 so that the attachment portion 4300 can fit between the second region of the first protrusion 4406 and the backing 4402. The first protrusion 4406 can also include securing surfaces 4416 configured to engage the first base region 4304*a* to prevent or limit gingival movement of the first base region 4304*a* and/or configured to engage the third base region 4304*c* to prevent or limit mesial or distal movement, occlusal movement, and/or gingival movement of the third base region 4304*c*. The second region of the first protrusion 4406 can include an inner surface (not visible) facing towards the backing 4402 and configured to prevent or limit lingual (or buccal) movement of the first base region 4304*a* and/or the third base region 4304*c*. As such, the first protrusion 4406 prevents or limit movement of the first base region 4304*a* and/or the third base region 4304*c* in at least three directions, for example by functioning as a side, bottom, and front stop.

The second protrusion 4408 can be configured to engage the second base region 4304*b* and/or the third base region 4304*c* to prevent or limit motion of the attachment portion 4300 in a gingival direction, an occlusal direction, and a mesial or distal direction. The second protrusion 4408 can be positioned at a mesial or distal portion of the backing 4402 (e.g., to a side of a mesiodistal midline M of the backing 4402). The second protrusion 4408 can be positioned near a perimeter of the backing 4402, for example as shown in FIG. 44, or can be positioned away from the perimeter and towards an intermediate portion of the backing 4402. In some embodiments, the second protrusion 4408 has a first region extending lingually (or buccally, depending on which side of the tooth the securing member 4400 is attached) away from the backing 4402. The second protrusion 4408 can also include a second region extending away from the first region towards an intermediate portion of the securing member 4400 and spaced apart from the backing 4402 by a gap 4424 along the buccolingual dimension. The gap 4424 can have a depth that is slightly greater than a thickness t of the attachment portion 4300 so that the attachment portion 4300 can fit between the second region of the second protrusion 4408 and the backing 4402. The second protrusion 4408 can also include securing surfaces 4418 configured to engage the second base region 4304*b* to prevent or limit gingival movement of the second base region 4304*b* and/or configured to engage the third base region 4304*c* to prevent or limit mesial or distal movement, occlusal movement, and/or gingival movement of the third base region 4304*c*. The second region of the second protrusion 4408 can include an inner surface (not visible) facing towards the backing 4402 and configured to prevent or limit lingual (or buccal) movement of the second base region 4304*b* and/or the third base region 4304*c*. As such, the second protrusion 4408 prevents or limit movement of the second base region 4304*b* and/or the third base region 4304*c* in at least three directions, for example by functioning as a side, bottom, and front stop.

Figure 45A:
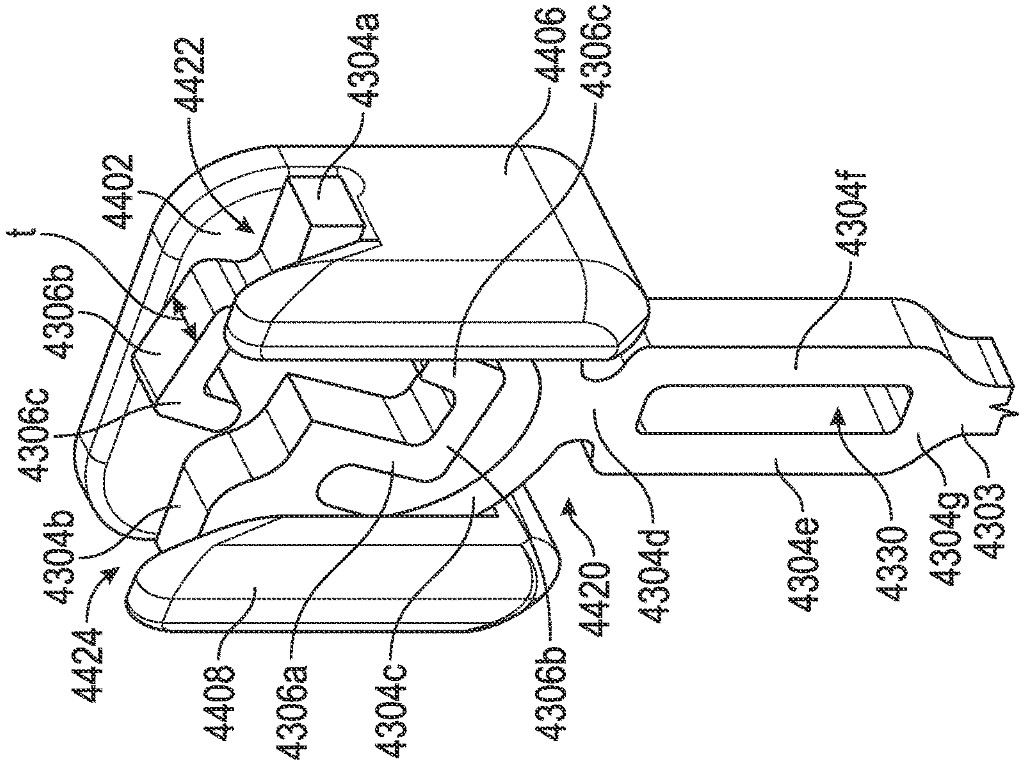
FIGS. 45A and 45B are different views of an attachment portion secured to a securing member in accordance with several embodiments of the present technology.
Figure 45B:
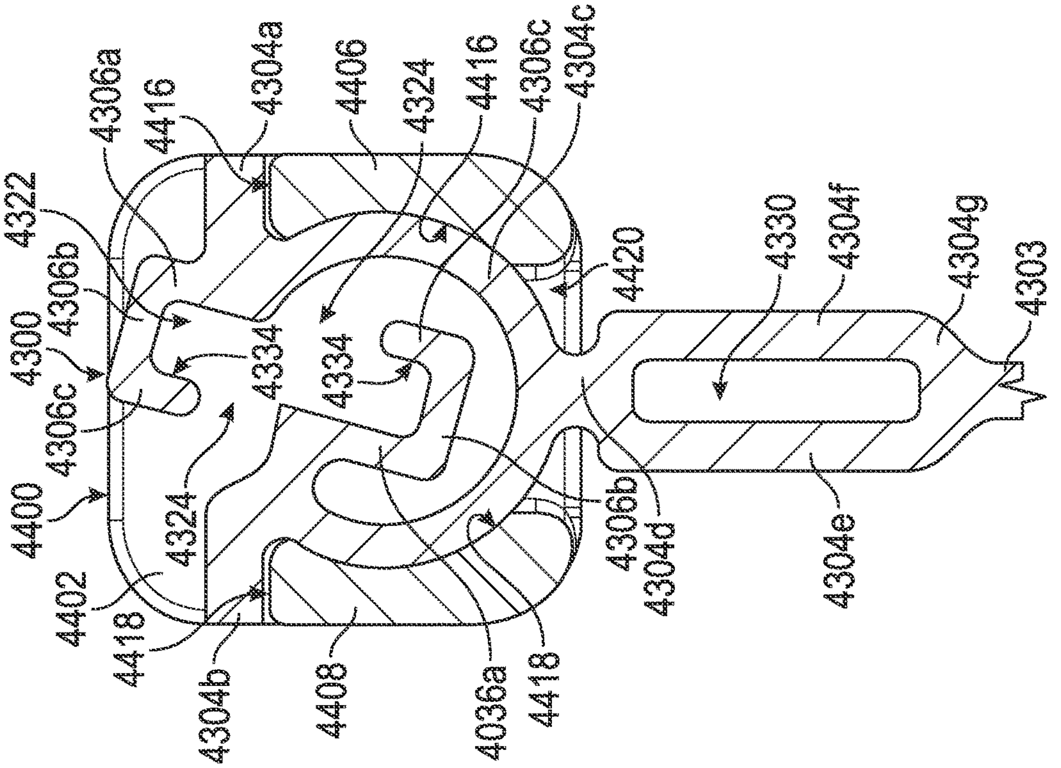

Referring to FIGS. 45A and 45B, in the secured state, the attachment portion 4300 can be positioned proximate and/or against the backing 4402 of the securing member 4400 and bound between the first and second protrusions 4406, 4408. The third base region 4304*c*, the arms 4306, and the interior region 4322 defined by the arms 4322 can be positioned between the first protrusion 4406 and the second protrusion 4408 (e.g., within the gap 4420). Additionally or alternatively, the first base region 4304*a* can be positioned buccolingually between the first protrusion 4406 and the backing 4402 and the second base region 4304*b* can be positioned buccolingually between the second protrusion 4408 and the backing 4402.

The attachment portion 4300 can comprise a resilient and/or superelastic material such that, when the attachment portion 4300 is braced between the first and second protrusions 4406, 4408, the attachment portion 4300 actively exerts an outward force on the surrounding surfaces. For example, the third base region 4304*c* can engage the securing surfaces 4416, 4418 of the first and second protrusions 4406, 4408. In some embodiments, the third base region 4304*c* can press outwardly against one or more of the securing surfaces 4416, 4418 of the first and second protrusions 4406, 4408 along the mesiodistal dimension and/or the occlusal dimension. In some embodiments, one or more of the securing surfaces 4416, 4418 can have a curvature substantially corresponding to a curvature of the third base region 4304*c*. For example, as shown in FIG. 45B, in the secured state the third base region 4304*c* can substantially conform to inner securing surfaces 4416, 4418. The first base region 4304*b* can be bound gingivally by an occlusal securing surface 4416 of the first protrusion 4406 and/or the second base region 4304*b* be bound gingivally by an occlusal securing surface 4418 of the second protrusion 4408. The aforementioned surfaces of the attachment portion 4300 and the securing member 4400 that are configured to engage one another when the attachment portion 4300 is in the secured position can comprise securing surfaces.

In the secured position, the attachment portion 4300 is releasably secured to the securing member 4400 such that it cannot be inadvertently displaced or prematurely or inadvertently released by typical patient activity (such as chewing). The attachment portion 4300 (or one or more portions thereof) can be configured to press outwardly on the securing member 4400 when in the secured position. The active and/or continuous outward force exerted by the attachment portion 4300 on the securing member 4400 advantageously eliminates or reduces play between the attachment portion 4300 and securing member 4400 along a mesiodistal dimension, an occlusogingival dimension, and/or a buccolingual dimension, thus providing a more accurate and efficient transfer of force from the appliance to the tooth. In some embodiments, the attachment portion 4300 (or one or more portions thereof) does not chronically press outwardly on the securing member 4400 and is instead configured to engage the securing member 4400 if the attachment portion 4300 moves into contact with and/or moves such that it exerts a force on one or more portions of the securing member 4400. Thus, the securing member 4400 can be configured to limit movement of the attachment portion 4300 relative to the securing member 4400. In some embodiments, one or more of the securing surfaces is configured for transferring orthodontic force between the attachment portion 4300 (e.g., to and/or from the connector 4303, to and/or from the rest of the appliance, etc.) and the securing member 4400 (e.g., to and/or from the tooth, etc.). In various embodiments, one or more of the securing surfaces does not substantially transfer orthodontic force between the attachment portion 4300 and the securing member 4400.

The attachment portion 4300 of FIGS. 43, 45A and 45B can be secured to the securing member 4400 by positioning the attachment portion 4300 proximate the securing member 4400 and moving the attachment portion 4300 along an occlusogingival path. The base 4304 of the attachment portion 4300 can be positioned relative to the securing member 4400 such that at least a portion of the base 4304 is positioned occlusally of the first and second protrusions 4406, 4408 of the securing member 4400 and/or at, near, and/or occlusally of an occlusal edge of the backing 4402. In some embodiments, the fourth base region 4304*d* can be positioned between the first and second protrusions 4406, 4408 (e.g., within the mesiodistal gap 4420, etc.). In some embodiments, the back surface of the attachment portion 4300 can be positioned proximate and/or in contact with the backing 4402 of the securing member 4400. In some embodiments, the operator slides the attachment portion 4300 occlusogingivally relative to the securing member 4400 by positioning a tool (e.g., tool 800) within the opening 4330 and/or the interior region 4322 and moving the tool occlusogingivally. The tool can contact the seventh base region 4304*g* (or the second, gingival arm 4306 if positioned in the interior region 4322 instead of the opening 4330) when sliding the tool gingivally to insert the attachment portion 4300. In any case, continued gingival movement of the base 4304 forces thane exterior surface 4327 of third base region 4304*c* into contact with occlusal corners of the first and second protrusions 4406, 4408, which can cause the third base region 4304*c* and/or the fourth base region 4304*d* to rotate and/or deform to facilitate gingival movement of the third base region 4304*c* beyond the occlusal corners of the protrusions. Once a mesiodistally widest portion of the third base region 4304*c* is positioned gingival of the corners of the protrusions, the resilient arm 4006 and/or one or more portions thereof (e.g., the third base region 4304*c*, the fourth base region 4304*d*, etc.) deforms and/or rotates back towards its shape in the relaxed state, thereby wedging the third base region 4304*c* against the internal securing surfaces 4416, 4418 of the first protrusion and second protrusions 4406, 4408. In some embodiments, instead of rotating and/or in addition to rotating, the third base region 4304*c* can deform so that a mesiodistal dimension of the third base region 4304*c* is reduced while passing between the occlusal corners of the first and second protrusions 4406, 4408. As shown in FIG. 45B, in the secured state the third base region 4304*c* can substantially conform to the internal securing surfaces 4416, 4418 and can press outwardly on the internal securing surfaces 4416, 4418. Accordingly, one or more regions of the attachment portion 4300 can comprise a flexure 4332 configured to bend and/or otherwise deform to facilitate securing of the attachment portion 4300 to the securing member 4400. In some embodiments, the flexure 4332 comprises the third base region 4304*c* and/or the fourth base region 4304*d*. The third base region 4304*c* and/or the fourth base region 4304*d*, for example, can be configured to bend in a first direction to facilitate or enable sliding of the attachment portion 4300 gingivally of the occlusal corners of the first and second protrusions 4406, 4408 to secure to the securing member 4400. The third base region 4304*c* and/or the fourth base region 4304*d* can be configured to bend in a second, opposite direction to facilitate or enable locking of the attachment portion 4300 to the securing member 4300. In some embodiments, deformation of the flexure 4332 causes one or more portions of the attachment portion 4300 to rotate. Moreover, the flexure 4332 can comprise other regions of the attachment portion 4300 in addition to or instead of the third base region 4304*c* and/or the fourth base region 4304*d* including, but not limited to, the first base region 4304*a*, second base region 4306*b*, the one or more of the arms 4306, etc.

To release the attachment portion 4300 from the securing member 4400, the attachment portion 4300 can be configured to deform and/or rotate relative to the securing member 4400. For example, an operator can insert a tool, such as the distal end surface 808 of tool 800, into the interior region 4322 defined by the arms 4306. An occlusal end of the tool surface can be positioned proximate the interior surface 4218 of the first, more occlusal arm 4306 along the second arm region 4306*b* and a gingival end of the tool surface can be positioned proximate the second, more gingival arm 4306 along the second arm region 4306*b*. The operator can rotate the tool about a buccolingual dimension such that an occlusal portion of the tool surface engages and pushes against the third arm region 4306*c* of the first arm 4306 and the gingival portion of the tool surface engages the third arm region 4306*c* of the second arm 4306. The tool can displace the third arm regions 4304*c* and thereby force the second arm regions 4306*b* to rotate with the tool surface. This causes the flexure 4332 to bend (e.g., at the third base region 4304*c* and/or the fourth base region 4304*d*). The flexure 4332 can bend such that a mesiodistal dimension of the third base region 4304*c* reduces (e.g., via elongation of the mesial and distal portions of the third base region 4304*c*, etc.), which permits the head 4302 to slide occlusally past the occlusal corners of the first and second protrusions 4406, 4408 to release the attachment portion 4300 from the securing member 4400.

The attachment portion 4300 can comprise a leveraging surface 4334 configured to engage a tool to facilitate deformation of the attachment portion 4300 to cause the attachment portion 4300 to release from the securing member 4400. In some embodiments, the third arm regions 4306*c* of the arms 4306 each have a leveraging surface 4334. Additionally or alternatively, the second arm regions 4306*b*, the first arm regions 4306*a*, and/or one or more regions of the base 4304 can have the leveraging surface(s) 4334. In some embodiments, the attachment portion 4300 comprises multiple leveraging surfaces 4334.

The location at which the connector 4303 connects to the head 4302, a dimension along which the connector 4303 extends, a property of the connector 4303, etc. can be at least partially based on a force to be imparted on a tooth to which the attachment portion 4300 is configured to be secured (and/or an intended movement of the tooth). For example, as previously noted, the attachment portion 4300 can be configured to release from the securing member 4400 when arms 4306 are rotated and/or deformed to cause deformation of the third base region 4304*c* and/or the fourth base region 4304*d*. Thus, to avoid any movement of a connector 4303 causing rotation of the arms 4306 and/or deformation of the third base region 4304*c* and/or the fourth base region 4304*d* during treatment, the connector 4303 can connect to a portion of the attachment portion 4300 away from the arms 4306, the third base region 4304*c*, and/or the fourth base region 4304*d*, and in particular in a location that would not cause movement of the arms 4306 in any way that is biased towards disengagement from the securing member 4400. In some cases, for example as shown in FIG. 43, the connector 4303 is continuous with a gingival portion of the base 4304 of the head 4302 but not the arms 4306. Such a configuration can prevent or limit the connector 4303 from applying forces to the arms 4306 that inadvertently cause the flexure 4332 to deform during orthodontic treatment. Movement of the third arm regions 4306*c* in response to forces applied to the third arm regions 4306*c* by a tool at the leveraging surfaces 4334 can cause the attachment portion 4300 to release from the securing member 4400. Accordingly, in some embodiments no connectors attach to the leveraging surface 4334 and/or the third arm regions 4306*c* so that little to no force is applied to the leveraging surface 4334 and/or the third arm regions 4306*c* during the normal course of treatment. Because the first and second base regions 4304*a*, 4304*b* are not obstructed mesially or distally (away from the mesiodistal midline M and/or opposite the mesiodistal gap 4420) when in the secured position, the head 4302 can be continuous with a mesiodistally extending connector at the first base region 4304*a* and/or the second base region 4304*b*. However, in some embodiments it may be advantageous to avoid connecting the first base region 4304*a* and/or the second base region 4304*b* to a mesiodistally extending connector because the first and second base regions 4304*a*, 4304*b* are connected to the arms 4306 and deformation of the first and second base regions 4304*a*, 4304*b* during treatment could cause unintentional deformation and/or movement of the arms 4306. The location at which the connector 4303 connects to the head 4302, a dimension along which the connector 4303 extends, a property of the connector 4303, etc. can at least partially be based on the mechanism by which the attachment portion 4300 is attached and/or detached to the securing member 4400 and/or the geometry of the securing member 4400.

Figure 46:
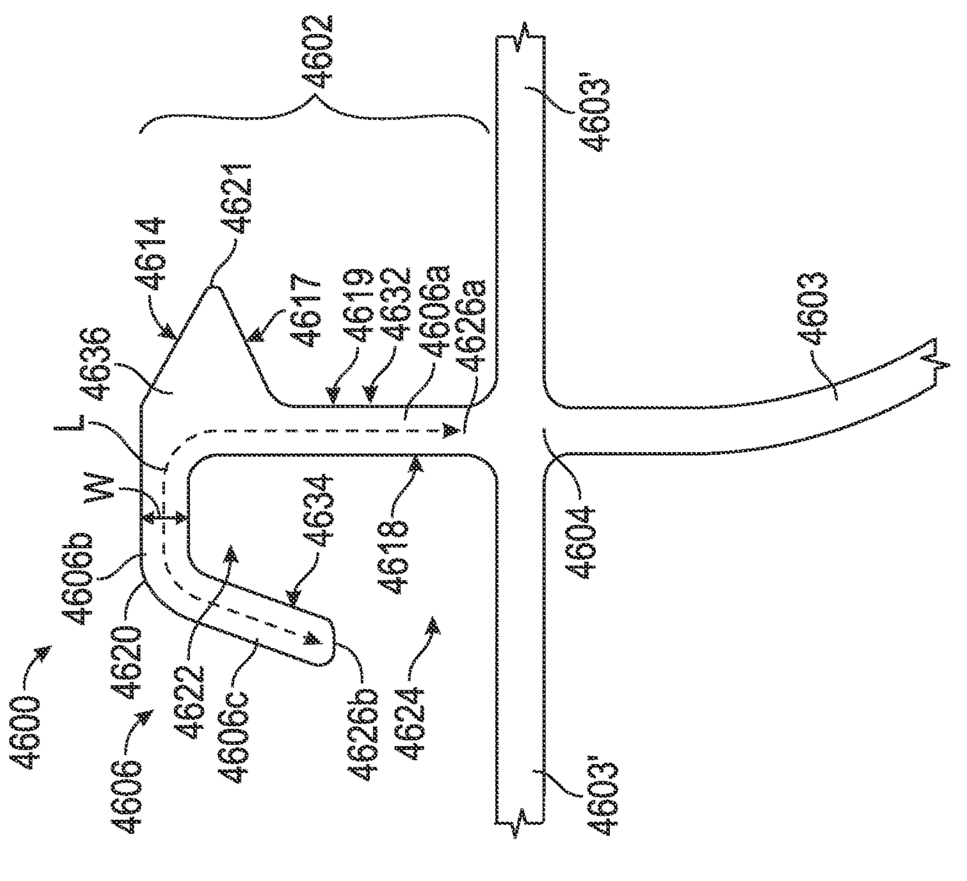
FIG. 46 is a front view of an attachment portion configured in accordance with several embodiments of the present technology.

FIG. 46 shows a planar view of an attachment portion 4600 configured in accordance with several embodiments of the present technology. The attachment portion 4600 can be configured to be secured to a patient's tooth via a securing member, such as securing member 4700 shown in FIG. 47. The attachment portion 4600 and the securing member 4700 are shown in a secured arrangement in FIGS. 48A and 48B. As discussed in greater detail below, the attachment portion 4600 and the securing member 4700 can be configured such that the attachment portion 4600 can be releasably secured to the securing member 4700. The attachment portion 4600 can be continuous with a connector 4603 that connects the attachment portion 4600 to one or more additional portions of an orthodontic appliance (not shown).

Referring to FIG. 46, the attachment portion 4600 can comprise a head 4602. In some embodiments, the attachment portion 4600 comprises a head 4602 and at least a portion of a connector 4603 that is continuous with the head 4602. The connector 4603, for example, can comprise a second connector as previously described herein and/or can extend gingivally away from a gingival portion of the head 4602. The connector 4603 can have features similar to any of the connectors disclosed herein (e.g., first connectors, second connectors, third connectors, etc.) and can comprise a single connector or multiple connectors. For example, the connector 4603 can comprise a single, occlusogingivally extending connector 4603, multiple occlusogingivally extending connectors (not shown), one or more occlusogingivally extending connectors 4603 and one or more mesiodistally extending connectors 4603' branching off of the one or more occlusogingivally extending connectors 4603 and/or the head 4602, or one or more mesiodistally extending connectors 4603' (and no occlusogingivally extending connectors). Accordingly, the attachment portion 4600 can be connected to a single connector or multiple connectors 4603. As shown in FIG. 46, the connectors 4603, 4603' can connect to the head 4602 at a variety of locations and/or at the same location as one another. For example, a gingivally extending connector 4603 can connect to a gingival portion of the head 4602 and mesiodistally extending connectors 4603' can also connect to a gingival portion of the head 4602. Any of the connectors 4603, 4603' disclosed herein can extend away from the head 4602 along a variety of dimensions (e.g., along an occlusogingival dimension, a mesiodistal dimension, a buccolingual dimension, etc.).

In some embodiments, the head 4602 and the connector(s) 4603, 4603' are part of the same, monolithic piece of material (e.g., cut from a sheet of material, a 3D-printed piece, etc.). Thus, the head 4602 and the connector(s) 4603, 4603' may refer to different portions of the same continuous component. The attachment portion 4600 can be one portion of a greater orthodontic appliance, or may be formed separately and attached to an orthodontic appliance. The attachment portion 4600 and/or the corresponding appliance can be cut from the same sheet of material and/or may be formed by molding, casting, machining, 3D printing, stamping, extruding, or the like. The attachment portion 4600 may comprise a metal or a plastic and may have superelastic and/or shape memory properties. In some embodiments, the attachment portion 4600 does not have superelastic and/or shape memory properties.

The head 4602 of the attachment portion 4600 can comprise a base 4604 and an arm 4606 extending away from the base 4604. The arm 4606 can be configured to bend and/or rotate relative to the base 4604 while the attachment portion 4600 is being secured to and/or released from the securing member 4700. In some embodiments, the arm 4606 comprises an elongate member having a first end portion 4626*a*, a second end portion 4626*b*, and a longitudinal axis L extending between the first and second end portions 4626*a*, 4626*b*. The arm 4606 can partially enclose and define an interior region 4622. The arm 4606 can include one or more bends 4620 along its longitudinal axis L that may be configured to preferentially flex to facilitate securing and/or release of the attachment portion 4600 to a securing member. As discussed in greater detail herein, the interior region 4622 can be sized to receive a tool configured to release the attachment portion 4600 from a securing member (such as securing member 4700). Additionally or alternatively, the interior region 4622 can be sized to receive a tool to facilitate securing of the attachment portion 4600 to the securing member 4700.

Figure 48B:
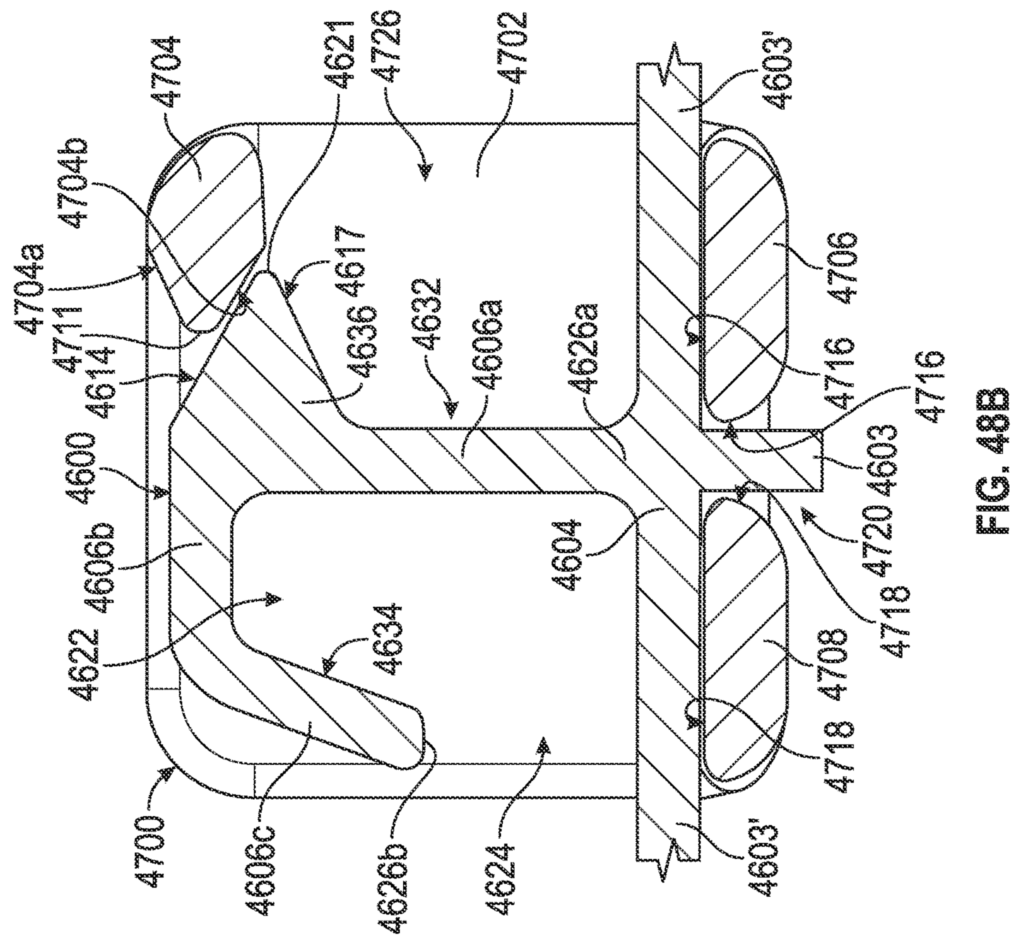
FIGS. 48A and 48B are different views of an attachment portion secured to a securing member in accordance with several embodiments of the present technology.
Figure 48A:
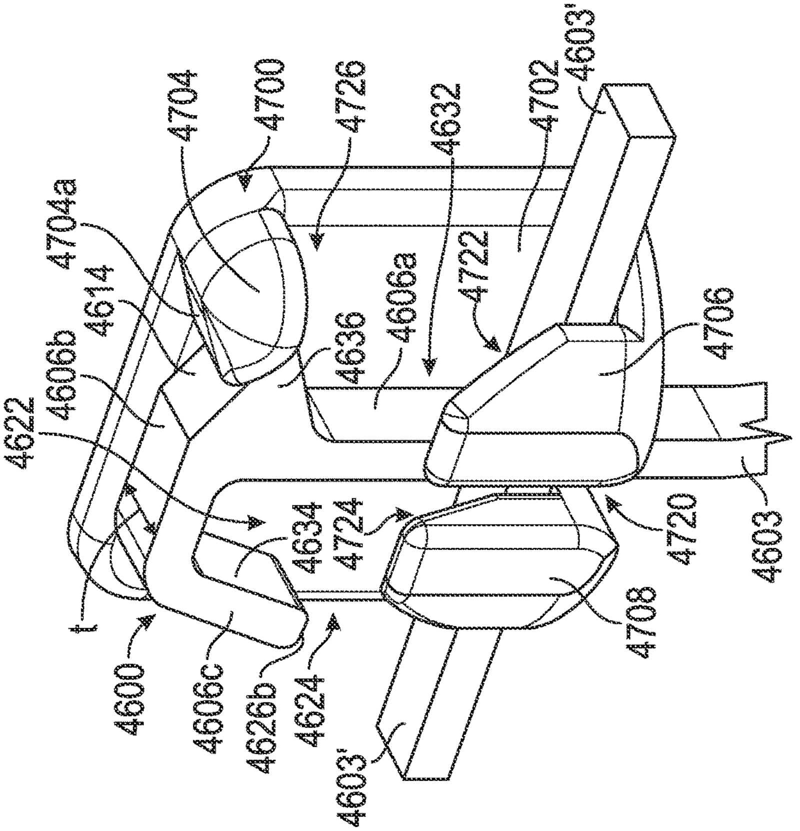

The arm 4606 can extend away from the base 4604 along the occlusogingival dimension, the mesiodistal dimension, and/or the buccolingual dimension. For example, the arm 4606 shown in FIG. 46 extends occlusally away from the base 4604. At least when the attachment portion 4600 is in a relaxed (unsecured) state (as shown in FIG. 46), the second end portion 4626*b* of the arm 4606 can be spaced apart from the base 4604 and/or the mesiodistally extending connector 4603' connected to the base 4604 along an occlusogingival dimension by a gap 4624 that is continuous with the interior region 4622 of the head 4602. In some embodiments, the second end portion 4626*b* of the arm and the base 4604 can be spaced apart by the gap 4624 even when the attachment portion 4600 is in a compressed (secured) state (for example as shown in FIGS. 48A and 48B). The second end portion 4626*b* and the base 4604 can be spaced apart along an occlusogingival dimension, a mesiodistal dimension, and/or a buccolingual dimension.

The head 4602 of the attachment portion 4600 can have an interior surface 4618 facing the interior region 4622, an exterior surface 4619 facing away from the interior region 4622, and a width w measured between the interior and exterior surfaces 4618, 4619. The head 4602 can also have a front surface (facing out of the page) and a back surface (not visible in FIG. 46), and a thickness t (labeled in FIG. 48A) measured between the front and back surfaces. The base 4604 and/or arm 4606 can have a substantially constant thickness t or may have a varying thickness t. Likewise, the base 4604 and/or arm 4606 can have a substantially constant width w or may have a varying width. A width w and/or thickness t of the base 4604 and/or arm 4606 can be varied to impart a preferred stiffness profile to all or a portion of the base 4604 and/or arm 4606.

As shown in FIG. 46, the base 4604 can be positioned at the first end portion 4626*a* of the arm 4606. The first end portion 4626*a* of the arm 4606 can be continuous with and/or disposed at the base 4604. In some embodiments, the base 4604 is positioned at an occlusal end portion of an occlusogingivally extending connector and/or at a mesial or distal end portion of a mesiodistally extending connector. The base 4604 can extend mesially and/or distally away from the first end portion 4626*a* of the arm 4606. The base 4604 can be configured to engage a securing member to facilitate securing of the attachment portion 4600 to the securing member and/or transfer orthodontic force from the connector(s) to the securing member.

The arm 4606 can include a first arm region 4606*a* extending occlusally away from the first end portion 4626*a* of the arm 4606 at the base 4604, a second arm region 4606*b* continuous with and extending mesiodistally away from an end of the first arm region 4606*a*, and a third arm region 4606*c* continuous with and extending gingivally and mesially or distally away from an end of the second arm region 4606*b*. In some embodiments, the arm 4606 has more or fewer portions along its longitudinal axis L. According to various embodiments, one or more regions of the arm 4606 can include a portion along which the width w of the arm 4606 is greater than along the rest of the arm 4606. For example, as shown in FIG. 46, the arm 4606 can include a protuberance 4636 at an exterior side of the first arm region 4606*a*. The protuberance 4636 can be located at any suitable location at the longitudinal axis L along the first arm region 4606*a*, for example at an occlusal portion of the first arm region 4606*a* as shown in FIG. 46. Along the protuberance 4636, the exterior surface 4619 of the arm 4606 forms first and second ramped surfaces 4617 and 4614 that meet at a corner 4621. The exterior surface 4619 extends occlusally and away from the longitudinal axis L along the first ramped surface 4617 until turning at the corner 4621 and extending occlusally and toward the longitudinal axis L along the second ramped surface 4614. The second ramped surface 4614 can be configured to engage a protrusion on a securing member 4700 when the attachment portion 4600 is secured to the securing member 4700 to oppose rotational and/or translational movement of the arm 4606. As described in greater detail below, the first ramped surface 4617 can be configured to force the arm 4606 to bend or rotate (e.g., at the first arm region 4606*a*, etc.) when engaging a protrusion of the securing member 4700 during engagement and/or disengagement.

Figure 47:
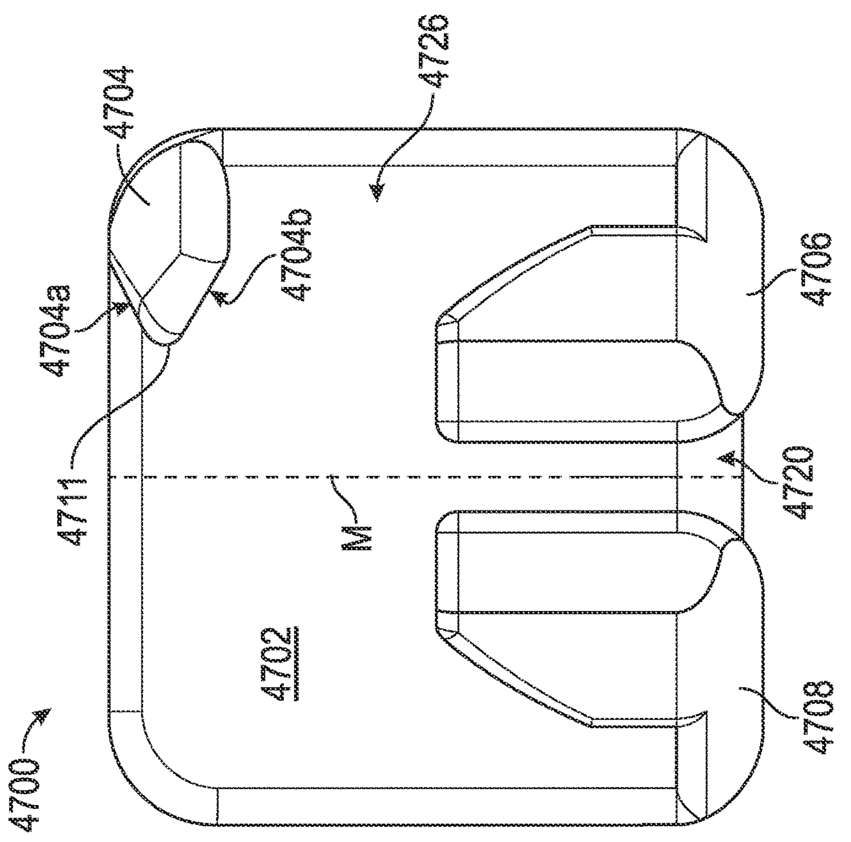
FIG. 47 is a front view of a securing member configured in accordance with several embodiments of the present technology.

FIG. 47 is a front view of the securing member 4700 configured for use with the attachment portion 4600. The securing member 4700 has a first side (facing out of the page) and a second side (not visible in FIG. 47) opposite the first side along a thickness of the securing member 4700 and configured to be bonded to a patient's tooth. The securing member 4700 can comprise a backing 4702 and a plurality of protrusions (e.g., first protrusion 4704, second protrusion 4706, third protrusion 4708, etc.) carried by and extending away from the first side of the backing 4702 along a buccolingual dimension. The protrusions 4704, 4706, 4708 can be configured to engage the attachment portion 4600 to retain the attachment portion 4600 at a specific location relative to the backing 4702 and the patient's tooth.

The first protrusion 4704 can be configured to engage the second ramped surface 4614 of the arm 4606 of the attachment portion 4600 to prevent or limit motion of the attachment portion 4600 in an occlusal direction and, optionally, in a mesial or distal direction. The first protrusion 4704 can be positioned at an occlusal portion of the backing 4702. In some embodiments, the first protrusion 4704 is positioned to a side of a mesiodistal midline M of the backing 4702. The first protrusion 4704 can be positioned near a perimeter of the backing 4702, for example as shown in FIG. 47, or can be positioned away from the perimeter and towards an intermediate portion of the backing 4702. The first protrusion 4704 can have a first surface 4704*a* and a second surface 4704*b*. In some embodiments, the first surface 4704*a* is angled with respect to the second surface 4704*b*. In some embodiments, the first surface 4704*a* can be substantially perpendicular to a first plane in which the occlusogingival dimension and the mesiodistal dimension lie, angled relative to a second plane in which the buccolingual dimension and the mesiodistal dimension lie, and angled relative to a third plane in which the buccolingual dimension and the occlusogingival dimension lie. The first surface 4704*a* can be slanted such that a gingival edge of the first surface 4704*a* is closer to the mesiodistal midline M than an occlusal edge of the first surface 4704*a*. In some embodiments, the second surface 4704*b* can be substantially perpendicular to the first plane in which the occlusogingival dimension and the mesiodistal dimension lie and substantially angled relative to the second plane in which the buccolingual dimension and the mesiodistal dimension lie. In various embodiments, for example as shown in FIG. 47, the second surface 4704*b* can be angled relative to the third plane in which the buccolingual dimension and the occlusogingival dimension lie. The second surface 4704*b* can be slanted surface such that an occlusal edge of the second surface 4704*b* is closer to the mesiodistal midline M than a gingival edge of the second surface 4704*b*. In some embodiments, the mesial edges of the first surface 4704*a* and the second surface 4704*b* are continuous with one another at a corner 4711.

The second protrusion 4706 and/or the third protrusion 4708 can be carried by the backing 4702 at positions opposite the first protrusion 4704 along one or more dimensions. The second protrusion 4706 and/or the third protrusion 4708 can be positioned at a gingival portion of the backing 4702, for example. As shown in FIG. 47, in some embodiments the second protrusion 4706 is spaced apart from the first protrusion 4704 by a gap 4726 along the occlusogingival dimension, and spaced apart from the third protrusion 4708 by a gap 4720 along the mesiodistal dimension. The gap 4720 can be sized to at least partially receive the portion of the gingivally extending connector 4603.

As shown in FIG. 47, the second protrusion 4706 can be positioned on the same side of the backing 4702 along the mesiodistal dimension (e.g., on the same side of the mesiodistal midline M) as the first protrusion 4704. As best shown in FIG. 48A, in some embodiments, the second protrusion 4706 has a first region extending lingually (or buccally, depending on which side of the tooth the securing member 4700 is attached) away from the backing 4702. The second protrusion 4706 can also include a second region extending away from the first region towards an intermediate portion of the securing member 4700 and spaced apart from the backing 4702 by a gap 4722 along the buccolingual dimension. The gap 4722 can have a depth that is slightly greater than a thickness t of the attachment portion 4600 so that the attachment portion 4600 can fit between the second region of the second protrusion 4706 and the backing 4702. The second protrusion 4706 can also include one or more securing surfaces 4716 configured to engage the base 4604 and/or the mesiodistally extending connector 4603' to prevent or limit mesial or distal movement and gingival movement of the attachment portion 4600. The second region of the second protrusion 4706 can include an inner surface (not visible) facing towards the backing 4702 and configured to prevent or limit lingual (or buccal) movement of the base 4604 and/or the mesiodistally extending connector 4603'. As such, the second protrusion 4706 prevents or limit movement of the base 4604 and/or the mesiodistally extending connector 4603' in at least three directions, for example by functioning as a side, bottom, and front stop.

The third protrusion 4708 can be positioned on the opposite side of the backing 4702 along the mesiodistal dimension from the first protrusion 4704 and/or the second protrusion 4706, or at least spaced apart from the first protrusion 4704 and/or the second protrusion 4706 along a mesiodistal dimension. In some embodiments, the third protrusion 4708 can have a first region extending lingually (or buccally, depending on which side of the tooth the securing member 4700 is attached) away from the backing 4702. The third protrusion 4708 can have a second region extending away from the first region towards an intermediate portion of the securing member 4700 and spaced apart from the backing 4702 by a gap 4724 (see FIG. 48A) along the buccolingual dimension. The gap 4724 can have a depth that is slightly greater than a thickness t of the attachment portion 4600 so that the attachment portion 4600 can fit between the second region 4708*b* and the backing 4702. In some embodiments, the depth of the gap 4724 can be similar to the depth of the gap 4722. The third protrusion 4708 can also include one or more securing surfaces 4718 configured to engage the base 4604 and/or the mesiodistally extending connector 4603' to prevent or limit mesial or distal movement and gingival movement of the attachment portion 4600. The second region of the third protrusion 4708 can include an inner surface (not visible) facing towards the backing 4702 and configured to prevent or limit lingual (or buccal) movement of the base 4604 and/or the mesiodistally extending connector 4603'. As such, the third protrusion 4708 prevents or limit movement of the base 4604 and/or the mesiodistally extending connector 4603' in at least three directions, for example by functioning as a side, bottom, and front stop.

Referring to FIGS. 48A and 48B, in the secured state, the attachment portion 4600 can be positioned proximate and/or against the backing 4702 of the securing member 4700 and bound between the first, second, and third protrusions 4704, 4706, 4708. The gingivally extending connector 4603 can be positioned between the second protrusion 4706 and the third protrusion 4708 (e.g., within the gap 4720). Additionally or alternatively, the base 4604 of the head 4602 and/or the mesiodistally extending connectors 4603' can be positioned buccolingually between the second protrusion 4706 and the third protrusion 4708 and the backing 4702 (e.g., within the gaps 4722, 4724). In the secured state, the protuberance 4636 can be positioned occlusogingivally between the first protrusion 4704 and the second protrusion 4706 (e.g., within gap 4726). The attachment portion 4600 can comprise a resilient and/or superelastic material such that, when the attachment portion 4600 is braced between the first, second, and third protrusions 4704, 4706, 4708, the attachment portion 4600 actively exerts an outward force on the surrounding surfaces. For example, the second ramped surface 4614 of the protuberance 4636 of the attachment portion 4600 can engage the gingivally-facing second surface 4704*b* of the first protrusion 4704 of the securing member 4700. Accordingly, the aforementioned surfaces of the attachment portion 4600 and the securing member 4700 that are configured to engage one another when the attachment portion 4600 is in the secured position can comprise securing surfaces.

In the secured position, the attachment portion 4600 is releasably secured to the securing member 4700 such that it cannot be inadvertently displaced or prematurely or inadvertently released by typical patient activity (such as chewing). The attachment portion 4600 (or one or more portions thereof) can be configured to press outwardly on the securing member 4700 when in the secured position. The active and/or continuous outward force exerted by the attachment portion 4600 on the securing member 4700 advantageously eliminates or reduces play between the attachment portion 4600 and securing member 4700 along a mesiodistal dimension, an occlusogingival dimension, and/or a buccolingual dimension, thus providing a more accurate and efficient transfer of force from the appliance to the tooth. In some embodiments, the attachment portion 4600 (or one or more portions thereof) does not chronically press outwardly on the securing member 4700 and is instead configured to engage the securing member 4700 if the attachment portion 4600 moves into contact with and/or moves such that it exerts a force on one or more portions of the securing member 4700. Thus, the securing member 4700 can be configured to limit movement of the attachment portion 4600 relative to the securing member 4700. In some embodiments, one or more of the securing surfaces is configured for transferring orthodontic force between the attachment portion 4600 (e.g., to and/or from the connector 4603, to and/or from the rest of the appliance, etc.) and the securing member 4700 (e.g., to and/or from the tooth, etc.). In various embodiments, one or more of the securing surfaces does not substantially transfer orthodontic force between the attachment portion 4600 and the securing member 4700.

The attachment portion 4600 of FIGS. 46, 48A and 48B can be secured to the securing member 4700 by positioning the attachment portion 4600 proximate the securing member 4700 and moving the attachment portion 4600 along an occlusogingival path. The connector(s) 4603, 4603' or other portion of the appliance continuous with the head 4602 of the attachment portion 4600 can be positioned relative to the securing member 4700 such that at least a portion of the head 4602 is positioned occlusally of the first protrusion 4704 of the securing member 4700 and/or at, near, and/or occlusally of an occlusal edge of the backing 4702. The portion of the gingivally extending connector 4603 connected to the head 4602 can be positioned within the mesiodistal gap 4720 between the second and third protrusions 4706, 4708 of the securing member 4700. In some embodiments, the back surface of the attachment portion 4600 can be positioned proximate and/or in contact with the backing 4702 of the securing member 4700. In some embodiments, the operator slides the connector 4603 and head 4602 occlusogingivally by positioning a tool (e.g., tool 800) within the interior region 4622 and moving the tool occlusogingivally. The tool can contact the base 4604 and/or the mesiodistally extending connector 4603' when sliding the tool gingivally within the interior region 4622. In any case, continued gingival movement of the connector(s) 4603, 4603' and/or head 4602 forces the first ramped surface 4617 at the protuberance 4636 into contact with the corner 4711 of the first protrusion 4704. Because the exterior surface 4619 of the attachment portion 4600 along the ramped surface 4617 faces gingivally and is angled toward the first protrusion 4704 during the securing process, the occlusally-oriented force applied to the exterior surface 4619 along the ramped surface 4617 when the ramped surface 4617 contacts the first protrusion 4704 forces the first arm region 4606*a* to bend. Once the corner 4621 of the attachment portion 4600 between the first ramped surface 4617 and the second ramped surface 4614 is positioned gingival of the corner 4711 of the first protrusion 4704, the resilient arm 4606 and/or one or more portions thereof (e.g., the first arm region 4606*a*, etc.) bends back towards its shape in the relaxed state, thereby wedging the attachment portion 4600 between the first, second, and third protrusions 4704, 4706, 4708, as shown in FIGS. 48A and 48B. Accordingly, one or more regions of the attachment portion 4600 can comprise a flexure 4632 configured to bend and/or otherwise deform to facilitate securing of the attachment portion 4600 to the securing member 4700. In some embodiments, the flexure 4632 comprises the first arm region 4606*a*. The first arm region 4606*a*, for example, can be configured to bend in a first direction to facilitate or enable sliding of the attachment portion 4600 gingivally of the first protrusion 4704 to secure to the securing member 4700 and/or the first arm region 4606*a* can be configured to bend in a second, opposite direction to facilitate or enable locking of the attachment portion 4600 to the securing member 4700. In some embodiments, deformation of the flexure 4632 causes one or more portions of the attachment portion 4600 to rotate (e.g., bending of the first arm region 4606*a* can cause the second and third arm regions 4606*b*, 4606*d* to rotate about the buccolingual dimension). Moreover, the flexure 4632 can comprise other regions of the attachment portion 4600 in addition to or instead of the first arm region 4606*a* including, but not limited to, the second arm region 4606*b*, the third arm region 4606*c*, one or more bends 4620, etc.

To release the attachment portion 4600 from the securing member 4700, the attachment portion 4600 can be configured to deform and/or rotate relative to the securing member 4700. For example, an operator can insert a tool, such as the distal end surface 808 of tool 800, into the interior region 4622 of the head 4602. An occlusal end of the tool surface can be positioned proximate the interior surface 4618 of the head 4602 along the second arm region 4606*b* and rotated about a buccolingual dimension such that an occlusal portion of the tool surface engages and pushes against the third arm region 4606*c*, thereby forcing the second arm region 4606*b* to rotate with the tool surface. This causes the arm 4606 to bend at the flexure 4632, which can include the first arm region 4606*a*. The arm 4606 can bend such that the second ramped surface 4614 slides occlusally and mesiodistally along the second surface 4704*b* of the first protrusion 4704 and away from the first protrusion 4704 to release the attachment portion 4600 from the securing member 4700. In some embodiments, the attachment portion 4600 can pop or snap free of the securing member 4700 once the second ramped surface 4614 clears the first protrusion 4704. In some embodiments, the attachment portion 4600 can be released without rotation of a tool and/or the head 4602. For example, in some embodiments the second protrusion 4706 and/or the third protrusion 4708 can include a fulcrum upon which a tool is positioned to remove the attachment portion 4600. The tool can be used to apply leverage to the arm 4606 (e.g., at the third arm region 4606*c*, etc.) with the tool positioned on the fulcrum to cause the flexure 4632 to deform and allow the attachment portion 4600 to be released.

The attachment portion 4600 can comprise a leveraging surface 4634 configured to engage a tool to facilitate deformation of the attachment portion 4600 to cause the attachment portion 4600 to release from the securing member 4700. In some embodiments, the third arm region 4606*c* of the attachment portion 4600 of FIGS. 46, 48A and 48B can have the leveraging surface 4634. Additionally or alternatively, the second arm region 4606*b*, the first arm region 4606*a*, and/or the base 4604 can have the leveraging surface 4634. In some embodiments, the attachment portion 4600 comprises multiple leveraging surfaces 4634.

The location at which the connector(s) 4603, 4603' connect to the head 4602, a dimension along which the connector(s) 4603, 4603' extend, a property of the connector(s) 4603, 4603', etc. can be at least partially based on a force to be imparted on a tooth to which the attachment portion 4600 is configured to be secured (and/or an intended movement of the tooth). For example, as previously noted, the attachment portion 4600 can be configured to release from the securing member 4700 when the second ramped surface 4614 slides occlusally along the second surface 4704*b* of the first protrusion 4704 and/or mesiodistally away from the first protrusion 4704 (e.g., when the head 4602 rotates about the buccolingual dimension). Thus, to avoid any movement of a connector 4603, 4603' that may cause sliding of the second ramped surface 4614 relative to the second surface 4704*b* during treatment, the connector(s) 4603, 4603' can connect to a portion of the attachment portion 4600 away from the arm 4606, and in particular in a location that would not cause movement of the arm 4606 in any way that is biased towards disengagement from the securing member 4700. In some cases, for example as shown in FIG. 46, the connector(s) 4603, 4603' are continuous with the base 4604 of the head 4602 but not the arm 4606. Such a configuration can prevent or limit the connector 4603 from applying forces to the arm 4606 that inadvertently cause the flexure 4632 to deform during orthodontic treatment. Movement of the third arm region 4606*c* of the attachment portion 4600 in response to forces applied to the third arm region 4606*c* by a tool at the leveraging surface 4634 can cause the attachment portion 4600 to release from the securing member 4700. Accordingly, in some embodiments no connectors attach to the leveraging surface 4634 and/or the third arm region 4606*c* so that little to no force is applied to the leveraging surface 4634 and/or the third arm region 4606*c* during the normal course of treatment. Moreover, because each of the second and third protrusions 4706, 4708 is open either mesially or distally (e.g., opposite the mesiodistal gap 4720), the attachment portion 4600 can comprise mesiodistally extending connectors 4603' (as shown in FIG. 46). The location at which the connector(s) 4603, 4603' connect to the head 4602, a dimension along which the connector(s) 4603, 4603' extend, a property of the connector(s) 4603, 4603', etc. can at least partially be based on the mechanism by which the attachment portion 4600 is attached and/or detached to the securing member 4700 and/or the geometry of the securing member 4700.

Figure 50:
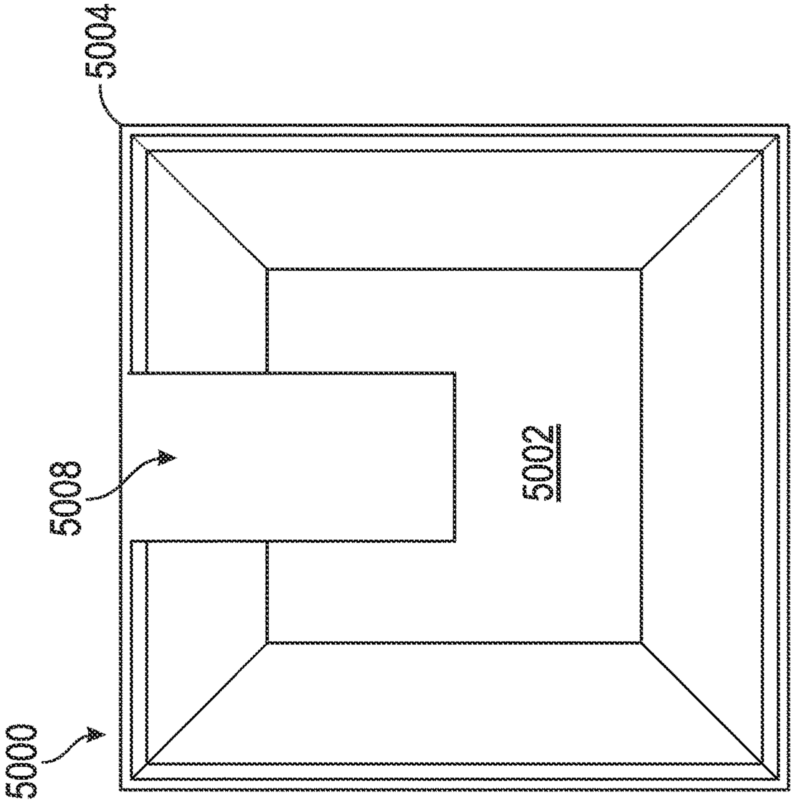
FIG. 50 is a front view of a securing member configured in accordance with several embodiments of the present technology.
Figure 49:
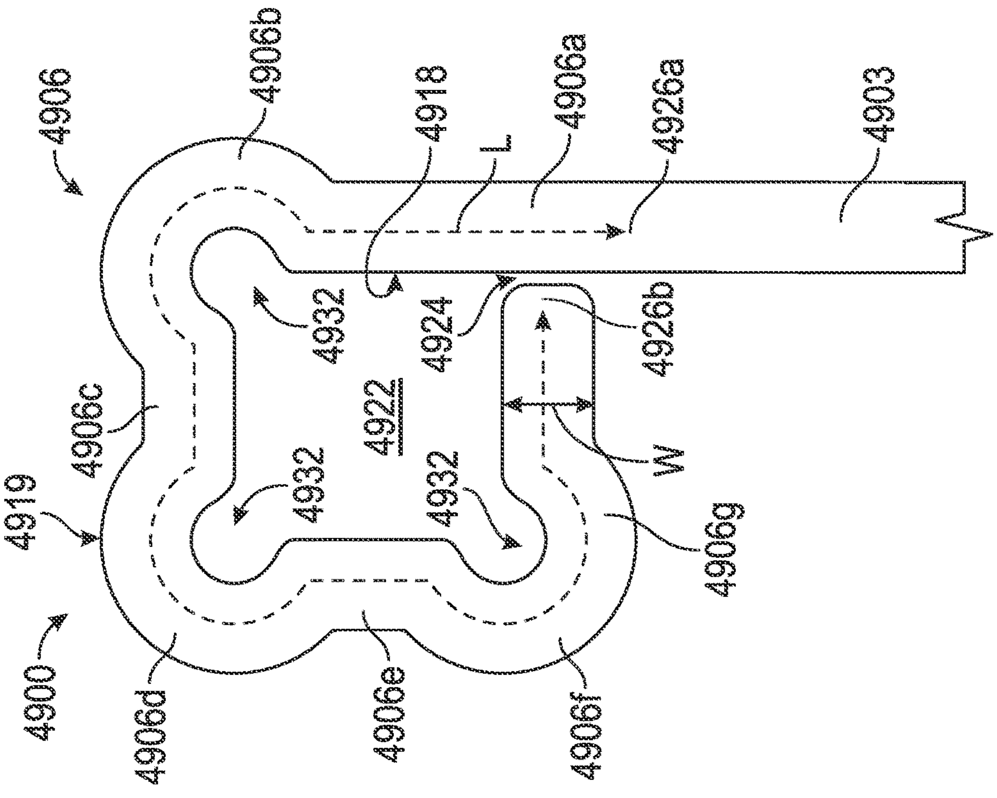
FIG. 49 is a front view of an attachment portion configured in accordance with several embodiments of the present technology.

FIGS. 49 and 50 show front views of an attachment portion 4900 and a securing member 5000 configured in accordance with several embodiments of the present technology. The attachment portion 4900 and the securing member 5000 are shown in a secured arrangement in FIGS. 51A and 51B. As discussed in greater detail below, the attachment portion 4900 and the securing member 5000 can be configured such that the attachment portion 4900 can be releasably secured to the securing member 5000. The attachment portion 4900 can be continuous with a connector 4903 that connects the attachment portion 4900 to one or more additional portions of an orthodontic appliance (not shown).

Referring to FIG. 49, the attachment portion 4900 can comprise an arm 4906. In some embodiments, the attachment portion 4900 comprises an arm 4906 and at least a portion of a connector 4903 that is continuous with the arm 4906. The connector 4903, for example, can comprise a second connector as previously described herein and/or can extend gingivally away from the arm 4906. The connector 4903 can have features similar to any of the connectors disclosed herein (e.g., first connectors, second connectors, third connectors, etc.) and can comprise a single connector or multiple connectors. For example, the connector 4903 can comprise a single, occlusogingivally extending connector, multiple occlusogingivally extending connectors, one or more occlusogingivally extending connectors and one or more mesiodistally extending connectors branching off of the one or more occlusogingivally extending connectors (not shown) and/or the attachment portion (not shown), or one or more mesiodistally extending connectors (and no occlusogingivally extending connectors). Accordingly, the attachment portion 4900 can be connected to a single connector or multiple connectors 4903. The connector 4903 can connect to the arm 4906 at a variety of locations. Any of the connectors 4903 disclosed herein can extend away from the arm 4906 along a variety of dimensions (e.g., along an occlusogingival dimension, a mesiodistal dimension, a buccolingual dimension, etc.).

In some embodiments, the arm 4906 and the connector 4903 are part of the same, monolithic piece of material (e.g., cut from a sheet of material, a 3D-printed piece, etc.). Thus, the arm 4906 and the connector 4903 may refer to different portions of the same continuous component. The attachment portion 4900 can be one portion of a greater orthodontic appliance, or may be formed separately and attached to an orthodontic appliance. The attachment portion 4900 and/or the corresponding appliance can be cut from the same sheet of material and/or may be formed by molding, casting, machining, 3D printing, stamping, extruding, or the like. The attachment portion 4900 may comprise a metal or a plastic and may have superelastic and/or shape memory properties. In some embodiments, the attachment portion 4900 does not have superelastic and/or shape memory properties.

Figure 51B:
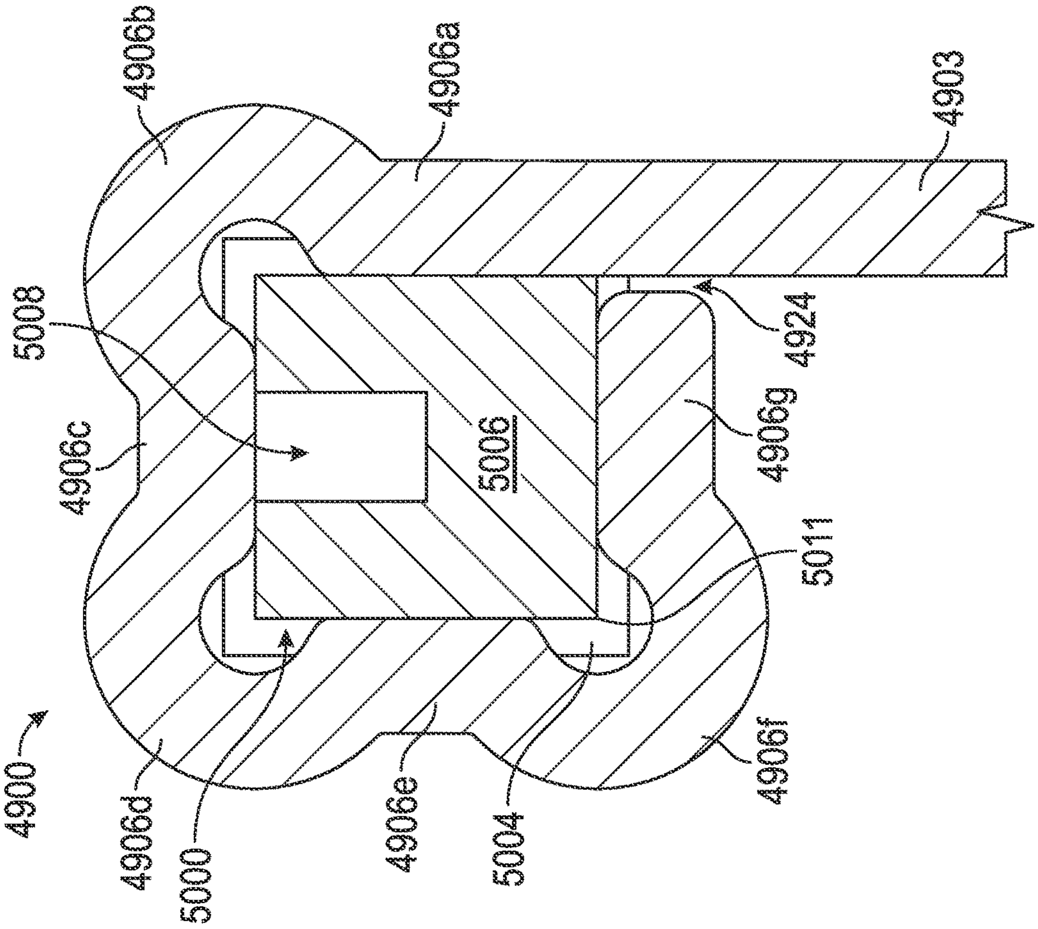
FIGS. 51A and 51B are different views of an attachment portion secured to a securing member in accordance with several embodiments of the present technology.
Figure 51A:
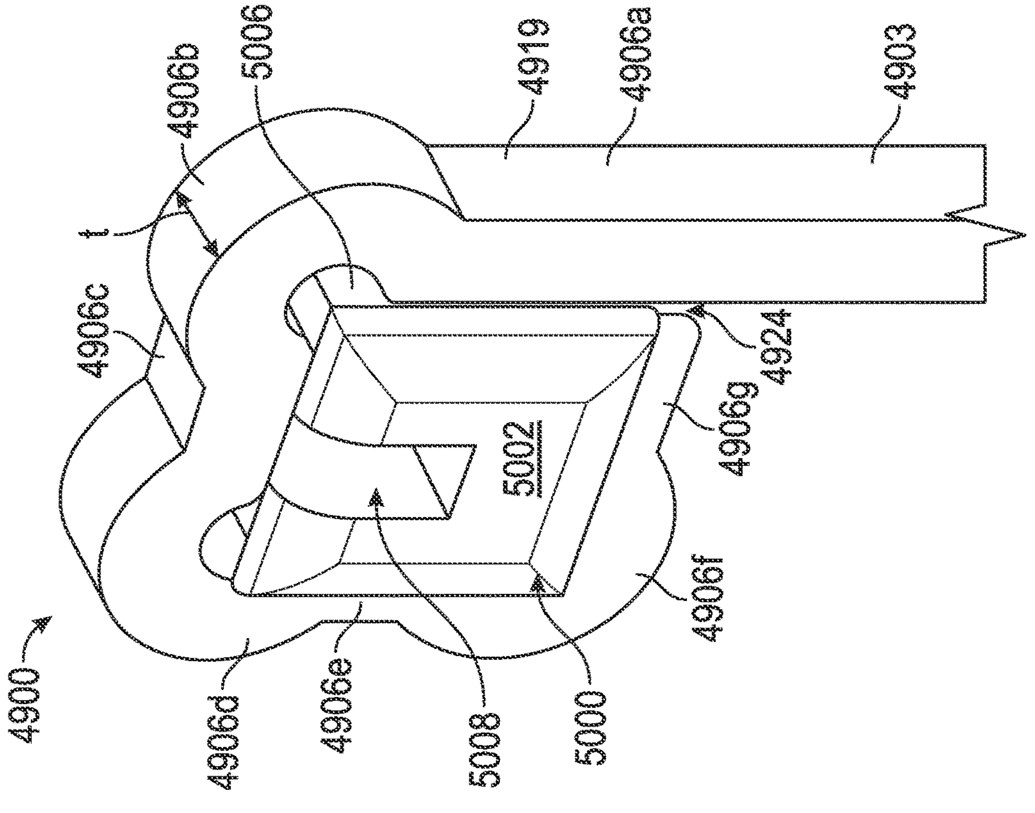

The arm 4906 can comprise an elongate member having a first end portion 4926*a*, a second end portion 4926*b*, and a longitudinal axis L extending between the first and second end portions 4926*a*, 4926*b*. In some embodiments, the arm 4906 at least partially encloses and defines an interior region 4922 configured to receive a securing member at least partially therein. At least when the attachment portion 4900 is in a relaxed (unsecured) state (as shown in FIG. 49), the second end portion 4926*b* of the arm 4906 can be spaced apart from the first end portion 4926*a* of the arm 4906 by a gap 4924 that is continuous with the interior region 4922. In some embodiments, the second end portion 4926*b* and the first end portion 4926*a* can be spaced apart by the gap 4924 even when the attachment portion 4900 is in a secured state (for example as shown in FIGS. 51A and 51B). The second end portion 4926*b* and the first end portion 4926*a* can be spaced apart along an occlusogingival dimension, a mesiodistal dimension (see FIG. 49), and/or a buccolingual dimension.

The arm 4906 can have an interior surface 4918 facing the interior region 4922, an exterior surface 4919 facing away from the interior region 4922, and a width w measured between the interior and exterior surfaces 4918, 4919. The arm 4906 can also have a front surface (facing out of the page) and a back surface (not visible in FIG. 49), and a thickness t (labeled in FIG. 51A) measured between the front and back surfaces. The arm 4906 can have a substantially constant thickness t or may have a varying thickness t. Likewise, the arm 4906 can have a substantially constant width w or may have a varying width. A width w and/or thickness t of the arm 4906 can be varied to impart a preferred stiffness profile to all or a portion of the arm 4906.

The arm 4906 can include a first arm region 4906*a* extending from a first end at the first end portion 4926*a* of the arm 4906 to a second end continuous with and/or disposed at a first end of a second arm region 4906*b*, which extends from its first end to a second end continuous with and/or disposed at a first end of a third arm region 4906*c*, which extends from its first end to a second end continuous with and/or disposed at a first end of a fourth arm region 4906*d*, which extends from its first end to a second end continuous with and/or disposed at a first end of a fifth arm region 4906*e*, which extends from its first end to a second end continuous with and/or disposed at a first end of a sixth arm region 4906*f*, which extends from its first end to a second end continuous with and/or disposed at a first end of a seventh arm region 4906*f*, which extends from its first end to a second end continuous with and/or disposed at the second end portion 4926*b* of the arm 4906. In some embodiments, the first arm region 4906*a*, the third arm region 4906*c*, the fifth arm region 4906*e*, and/or the seventh arm region 4906*g* are substantially linear. For example, as shown in FIG. 49, the first arm region 4906*a* can extend substantially occlusally, the third arm region 4906*c* can extend substantially mesially or distally, the fifth arm region 4906*e* can extend substantially gingivally, and/or the seventh arm region 4906*g* can extend substantially mesially or distally. Additionally or alternatively, the second arm region 4906*b*, the fourth arm region 4906*d*, and/or the sixth arm region 4906*f* can be curved. In some embodiments, the second arm region 4906*b*, the fourth arm region 4906*d*, and/or the sixth arm region 4906*f* can be concave towards the interior region 4922 thereby biasing the arm 4606 to bend at or near the second arm region 4906*b*, the fourth arm region 4906*d*, and/or the sixth arm region 4906*f* during securement and/or release of the attachment portion 4900 from a securing member.

FIG. 50 is a front view of a securing member 5000 configured for use with an attachment portion such as attachment portion 4900. The securing member 5000 has a first side 5002, a second side 5004 opposite the first side 5002 along a thickness of the securing member 5000 and configured to be bonded to a patient's tooth. As best shown in FIGS. 51A and 51B, the securing member 5000 can comprise an intermediate portion 5006 extending between the first side 5002 and the second side 5004 along a substantially buccolingual dimension. In some embodiments, the intermediate portion 5006 has a cross-sectional area taken along the buccolingual dimension that is less than an area of the first side 5002 and/or the second side 5004. The first side 5002 and/or the intermediate portion 5006 can comprise an opening 5008 configured to receive a tool to facilitate securing the attachment portion 4900 to the securing member 5000 and/or the facilitate releasing the attachment portion 4900 from the securing member 5000.

Referring to FIGS. 51A and 51B, in the secured state, the arm 4906 of the attachment portion 4900 can be positioned proximate and/or substantially surrounding the intermediate portion 5006 of the securing member 5000. For example, the arm 4906 can be positioned between the first side 5002 and the second side 5004 of the securing member 5000 along a buccolingual dimension. As best shown in FIG. 51B, the first arm region 4906*a*, the third arm region 4906*c*, the fifth arm region 4906*e*, and/or the seventh arm region 4906*g* can contact the intermediate portion 5006 of the securing member 5000. Because of the curvature of the second arm region 4906*b*, the fourth arm region 4906*d*, and the sixth arm region 4906*f*, these regions may not contact the intermediate portion 5006 of the securing member 5000 in the secured state. Because the first side 5002 and the second side 5004 of the securing member 5000 have a larger area than a cross-sectional area of the intermediate portion 5006, the first and second sides 5002, 5004 can prevent or limit movement of the arm 4906 along the buccolingual dimension in the secured state.

In some embodiments, the attachment portion 4900 (or one or more portions thereof) is configured to engage the securing member 5000 if the attachment portion 4900 moves into contact with the securing member 5000 and/or moves such that it exerts a force on one or more portions of the securing member 5000. Thus, the securing member 5000 can be configured to limit movement of the attachment portion 4900 relative to the securing member 5000. In some embodiments, one or more of the securing surfaces is configured for transferring orthodontic force between the attachment portion 4900 (e.g., to and/or from the connector 4903, to and/or from the rest of the appliance, etc.) and the securing member 5000 (e.g., to and/or from the tooth, etc.). In various embodiments, one or more of the securing surfaces does not substantially transfer orthodontic force between the attachment portion 4900 and the securing member 5000.

The attachment portion 4900 can be secured to the securing member 5000 by positioning the attachment portion 4900 proximate the securing member 5000 and moving the attachment portion 4900 such that the gap 4924 between the first and second end portions 4926*a*, 4926*b* of the arm 4906 enlarges. For example, the interior region 4922 of the arm 4906 can be mesiodistally and occlusogingivally aligned with and positioned buccally or lingually (depending on the location of the securing member 5000 on the tooth) of the first side 5002 of the securing member 5000. The attachment portion 4900 can then be moved buccally or lingually towards the first side 5002 such that the arm 4906 comes into contact with the first side 5002. Because of the resilience and/or geometry of the attachment portion 4900, the arm 4906 can bend at the second arm region 4906*b*, the fourth arm region 4906*d*, and/or the sixth arm region 4906*f* as the arm 4906 is moved into contact with the first side 5002. Thus, the second arm region 4906*b*, the fourth arm region 4906*d*, and/or the sixth arm region 4906*f* can comprise a flexure 4932 configured to bend or otherwise deform. The arm 4906 can be biased to deform upon contact with the first side 5002 such that the gap 4924 enlarges and the interior region 4922 enlarges. In this manner, the arm 4906 is can move buccolingually past the first side 5002 despite the interior region 4922 having a smaller area than the area of the first side 5002 when the arm 4906 is in a passive state. Once the arm 4906 is aligned buccolingually with the intermediate portion 5006 of the securing member 5000, the arm 4906 can bend back to its passive state in which the area of the interior region 4922 is smaller than the area of the first side 5002 and the gap 4924 can reduce. In this secured position, the first arm region 4906*a*, the third arm region 4906*c*, the fifth arm region 4906*e*, and/or the seventh arm region 4906*g* can be positioned proximate and/or in contact with the intermediate portion 5006 of the securing member 5000.

The attachment portion 4900 can be configured to deform to release from the securing member 5000. For example, an operator an insert a tool, such as the distal end surface 808 of tool 800, into the opening 5008 in the securing member 5000. An occlusal end of the tool surface can be positioned proximate the third arm region 4906*c*. The operator can move the tool occlusally such that the occlusal end of the tool surface engages and pushes against the third arm region 4906*c*. The tool can displace the third arm region 4906*c* occlusally, which can cause the seventh arm region 4906*g* to bear occlusally on the intermediate portion 5006 of the securing member 5000 and can cause the arm 4906 to bend at the fourth arm region 4906*d* and/or the sixth arm region 4906*f*. Such movement and deformation of the arm 4906 can cause the seventh arm region 4906*g* to slide mesially or distally relative to the intermediate portion 5006 such that the gap 4924 and the interior region 4922 enlarge. With continued occlusal movement of the third arm region 4906*c*, the seventh arm region 4906*g* can slide mesially or distally past a respective mesial or distal gingival corner 5011 of the intermediate portion 5006, after which point the seventh arm region 4906*g* is no longer obstructed occlusally by the securing member 5000. The arm 4906 can then be separated from the securing member 5000.

Figure 52:
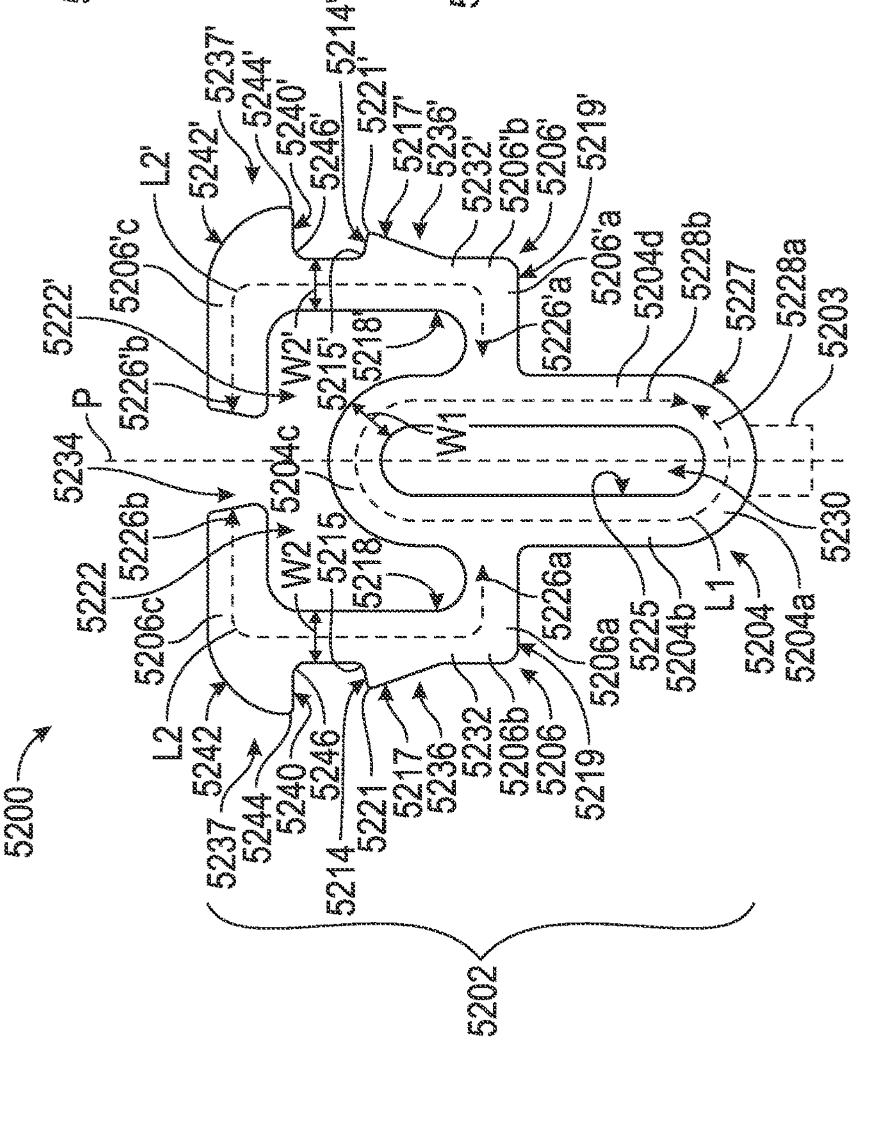
FIG. 52 is a front view of an attachment portion configured in accordance with several embodiments of the present technology.

FIG. 52 shows a planar view of an attachment portion 5200 configured in accordance with several embodiments of the present technology. The attachment portion 5200 can be configured to be secured to a patient's tooth via a securing member, such as securing member 5300 shown in FIG. 53. The attachment portion 5200 and the securing member 5300 are shown in a secured arrangement in FIGS. 54A and 54B. As discussed in greater detail below, the attachment portion 5200 and the securing member 5300 can be configured such that the attachment portion 5200 can be releasably secured to the securing member 5300. The attachment portion 5200 can be continuous with a connector 5203 that connects the attachment portion 5200 to one or more additional portions (not shown) of the overall orthodontic appliance. The attachment portion 5200 can have an attached state in which the orthodontic appliance exerts active and/or retentive orthodontic force (e.g., from a biasing portion (not shown) of the orthodontic appliance) on the tooth via the connector 5203, the attachment portion 5200, and the securing member 5300. Correspondingly, the attachment portion 5200 can have a detached state in which the orthodontic appliance is operably disconnected from the securing member 5300.

The attachment portion 5200 can be configured to move from the detached state to the attached state in response to relative movement between the attachment portion 5200 and the securing member 5300 in an occlusogingival dimension. This relative movement and/or another action can cause the attachment portion 5200 to resiliently deform and then at least partially return to its original form. In this or another manner, the attachment portion 5200 can pop and/or snap from the detached state to the attached state. Furthermore, the attachment portion 5200 can be configured to move from the attached state toward the detached state in response to leverage. These and other features of processes for moving the attachment portion 5200 between the attached and detached states as well as structures of the attachment portion 5200 and the securing member 5300 associated with these features are further discussed below with reference to FIGS. 52-54B.

In at least some cases, the attachment portion 5200 and the securing member 5300 are symmetrical about an occlusogingival plane P that bisects the attachment portion 5200 and the securing member 5300 at an occlusogingival midline when the attachment portion 5200 is in the attached state. In FIGS. 52-54B, symmetrical features of the attachment portion 5200 and the securing member 5300 at a distal side of the occlusogingival plane P are assigned a reference number with no apostrophe whereas symmetrical features at a mesial side of the occlusogingival plane P are assigned a reference number with an apostrophe. In the discussion of FIGS. 52-54B below, the symmetrical features at the distal side of the occlusogingival plane P may be referred to as "distal" whereas the symmetrical features at the mesial side of the occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth. Also, "occlusal" and "gingival" features can be occlusal and gingival, respectively, when the appliance is installed in the illustrated orientation or be gingival and occlusal, respectively, when the appliance is installed in an opposite orientation rotated 180 degrees about a buccolingual axis relative to the illustrated orientation.

Referring to FIG. 52, the attachment portion 5200 can comprise a head 5202. In some embodiments, the attachment portion 5200 comprises a head 5202 and at least a portion of the connector 5203 that is continuous with the head 5202. The connector 5203, for example, can comprise a second connector as previously described herein and/or can extend gingivally away from a gingival portion of the head 5202. The connector 5203 can have features similar to any of the connectors disclosed herein (e.g., first connectors, second connectors, third connectors, etc.) and can comprise a single connector or multiple connectors. For example, the connector 5203 can comprise a single, occlusogingivally extending connector (as shown in FIG. 52), multiple occlusogingivally extending connectors, one or more occlusogingivally extending connectors and one or more mesiodistally extending connectors branching off of the one or more occlusogingivally extending connectors and/or the attachment portion 5200, or one or more mesiodistally extending connectors (and no occlusogingivally extending connectors). Accordingly, the attachment portion 5200 can be connected to a single connector or to multiple connectors also referred to herein as a connector 5203. The connector 5203 can connect to the head 5202 at a variety of locations. For example, a gingivally extending connector can connect to a gingival portion of the head 5202. Any connector 5203 disclosed herein can extend away from the head 5202 along a variety of dimensions (e.g., along an occlusogingival dimension, a mesiodistal dimension, a buccolingual dimension, etc.).

The head 5202 can have a front surface (facing out of the page) and a back surface (not visible in FIG. 52), and a thickness t (labeled in FIG. 54A) measured between the front and back surfaces. In some embodiments, the head 5202 and the connector 5203 are part of the same, monolithic piece of material (e.g., cut from a sheet of material, a 3D-printed piece, etc.). Thus, the head 5202 and the connector 5203 may refer to different portions of the same continuous component. The attachment portion 5200 can be one portion of a greater orthodontic appliance, or may be formed separately and attached to an orthodontic appliance. The attachment portion 5200 and/or the corresponding appliance can be cut from the same sheet of material and/or may be formed by molding, casting, machining, 3D printing, stamping, extruding, or the like. The attachment portion 5200 may comprise a metal or a plastic and may have superelastic and/or shape memory properties. In some embodiments, the attachment portion 5200 does not have superelastic and/or shape memory properties.

As parts of the head 5202, the attachment portion 5200 can comprise various structures associated with one or more functional objectives. These functional objectives can include establishing and maintaining a secure connection between the attachment portion 5200 and the securing member 5300 when the attachment portion 5200 is in the attached state, establishing and maintaining efficient transfer of orthodontic force from the appliance to the tooth via the attachment portion 5200 and the securing member 5300 when the attachment portion 5200 is in the attached state, allowing convenient movement of the attachment portion 5200 from the attached state to the detached state, allowing convenient movement of the attachment portion 5200 from the detached state to the attached state, and providing a tactile indication of movement of the attachment portion 5200 to the attached state, among others.

With reference to FIG. 52, the attachment portion 5200 at the head 5202 can comprise a centrally positioned base 5204 and distal and mesial arms 5206, 5206' extending distally and mesially, respectively, from the base 5204. The base 5204 can comprise an elongate member forming a closed loop and extending along a longitudinal axis L1 from a first end portion 5228*a* to a second end portion 5228*b*. Starting at the first end portion 5228*a* and extending along the longitudinal axis L1 to the second end portion 5228*b*, the base 5204 can include a gingivally located curved first base region 5204*a*, a second base region 5204*b* continuous with and extending occlusally from the first base region 5204*a*, an occlusally located curved third base region 5204*c* continuous with and extending mesially from the second base region 5204*b*, and a fourth base region 5204*d* continuous with and extending gingivally from the third base region 5204*c*. The base 5204 can at least partially enclose and define an opening 5230 and can comprise an interior surface 5225 at the opening 5230 and an exterior surface 5227 spaced apart from the opening 5230. In at least some cases, the opening 5230 is sized to receive a tool to facilitate securing the attachment portion 5200 to the securing member 5300.

The distal arm 5206 can comprise an elongate member extending along a longitudinal axis L2 from a first end portion 5226*a* to a second end portion 5226*b*. Starting at the first end portion 5226*a* and extending along the longitudinal axis L2 to the second end portion 5226*b*, the distal arm 5206 can include a first arm region 5206*a* continuous with and extending distally from an occlusal part of the second base region 5204*b*, a second arm region 5206*b* continuous with and extending occlusally from the first arm region 5206*a*, and a third arm region 5206*c* continuous with and extending mesially from the second arm region 5206*b*. The distal arm 5206 can partially enclose and define an interior region 5222 and can comprise an interior surface 5218 at the interior region 5222 and an exterior surface 5219 spaced apart from the interior region 5222. The mesial arm 5206' can include features as described for the distal arm 5206 but mirrored about the occlusogingival plane P. Together, the interior regions 5222, 5222' can form a slot shaped to receive a tool used to move the attachment portion 5200 from the attached state toward the detached state.

The base 5204 can have a width w1 measured between the interior surface 5225 and the exterior surface 5227. Similarly, the arms 5206, 5206' can have respective widths w2, w2' measured between the respective interior surfaces 5218, 5218' and exterior surfaces 5219, 5219'. The base 5204 and/or arms 5206, 5206' can have a substantially constant thickness or may have a varying thickness. Likewise, the base 5204 and/or arms 5206, 5206' can have a substantially constant width or may have a varying width. A width and/or thickness of the base 5204 and/or arms 5206, 5206' can be varied, for example, to impart a preferred stiffness profile to all or a portion of the base 5204 and/or arms 5206, 5206'. Furthermore, the arms 5206, 5206' can include a plurality of bends along the respective longitudinal axes L2, L2' that are configured to preferentially flex to facilitate securing and/or release of the attachment portion 5200 to a securing member. A gap 5234 between the second end portions 5226*b*, 5226'*b* of the arms 5206, 5206' can accommodate mesiodistal movement of the arms 5206, 5206' toward one another in connection with this flexing.

According to various embodiments, one or more regions of the arms 5206, 5206' can include a portion along which the width w2, w2' is greater than at other portions. For example, as shown in FIG. 52, the distal arm 5206 can include a first protuberance 5236 at the second arm region 5206*b*. At the first protuberance 5236, the exterior surface 5219 of the distal arm 5206 can form first and second ramped surfaces 5217 and 5214 that meet at an apex 5221. The exterior surface 5219 can extend occlusally and away from the longitudinal axis L2 along the first ramped surface 5217 until turning at the apex 5221 and extending occlusally and toward the longitudinal axis L2 along the second ramped surface 5214. The second ramped surface 5214 can terminate at a corner 5215. The second ramped surface 5214, the corner 5215, and a portion of the exterior surface 5219 on the other side of the corner 5215 together can comprise a shoulder that is configured to engage a portion of a protrusion of the securing member 5300 when the attachment portion 5200 is secured to the securing member 5300 to oppose rotational and/or translational movement of the arm 5206. As described in greater detail below, the first ramped surface 5217 can be configured to force the arm 5206 to bend or rotate (e.g., at the second arm region 5206*b*, etc.) when engaging a protrusion of the securing member 5300 as the attachment portion 5200 moves from the detached state toward the attached state. In addition or alternatively, the second ramped surface 5214 can be configured to force the arm 5206 to bend or rotate (e.g., at the second arm region 5206*b*, etc.) when engaging a protrusion of the securing member 5300 as the attachment portion 5200 moves from the attached state toward the detached state. The mesial arm 5206' can include a first protuberance 5236' and associated features as described for the distal arm 5206 but mirrored about the occlusogingival plane P.

The distal arm 5206 can further include a second protuberance 5237 at a junction between the second and third arm regions 5206*b*, 5206*c*. At the second protuberance 5237, the exterior surface 5219 of the distal arm 5206 can form a ledge 5240 and a curved surface 5242 that meet at an apex 5244. The exterior surface 5219 can extend away from the longitudinal axis L2 distally along the ledge 5240 until turning at the apex 5244 and extending occlusally and mesially along the curved surface 5242. The ledge 5240 can begin at a corner 5246. The ledge 5240, the corner 5246, and a portion of the exterior surface 5219 on the other side of the corner 5246 together can comprise a shoulder that is configured to engage a portion of a protrusion of the securing member 5300 when the attachment portion 5200 is secured to the securing member 5300 to oppose rotational and/or translational movement of the arm 5206. The mesial arm 5206' can include a second protuberance 5237' and associated features as described for the distal arm 5206 but mirrored about the occlusogingival plane P.

Figure 53:
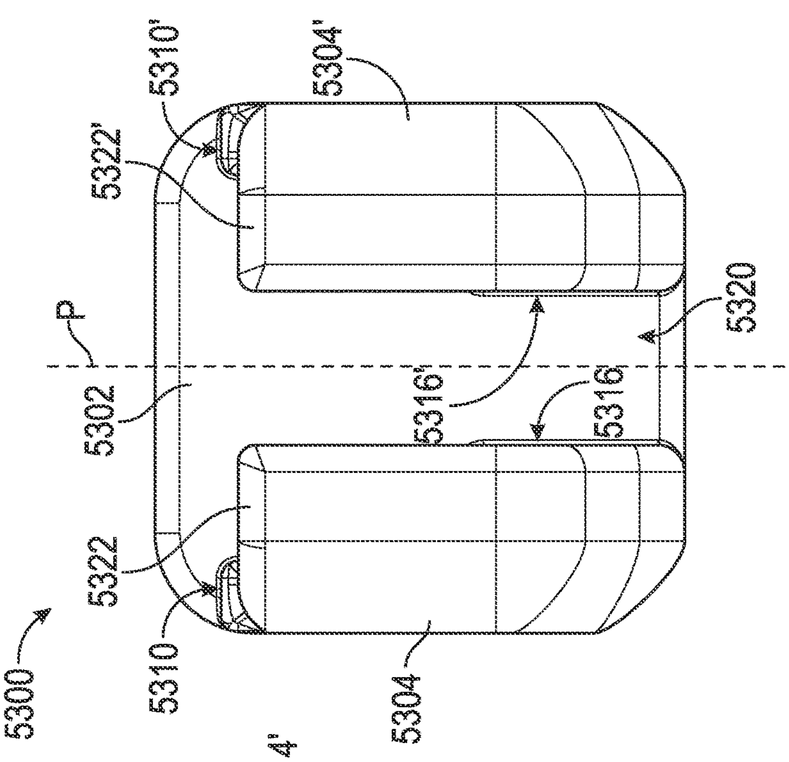
FIG. 53 is a front view of a securing member configured in accordance with several embodiments of the present technology.

FIG. 53 is a front view of the securing member 5300 configured for use with the attachment portion 5200. The securing member 5300 has a first side (facing out of the page) and a second side (not visible in FIG. 53) opposite the first side along a thickness of the securing member 5300 and configured to be bonded to a patient's tooth. The securing member 5300 can comprise a backing 5302 and distal and mesial protrusions 5304, 5304' carried by and extending away from the first side of the backing 5302 along a buccolingual dimension. The protrusions 5304, 5304' can be configured to engage the attachment portion 5200 and to retain the attachment portion 5200 at a specific location relative to the backing 5302 and the patient's tooth. Furthermore, as discussed below, the protrusions 5304, 5304' can be configured to support a lever used to move the attachment portion 5200 from the attached state toward the detached state.

Portions of the protrusions 5304, 5304' closest to the backing 5302 can be configured to engage the shoulders of the arms 5206, 5206' of the attachment portion 5200 to prevent or limit motion of the attachment portion 5200 in an occlusogingival dimension when the attachment portion 5200 is in the attached state. For example, the securing member 5300 at the protrusion 5304 can define a recess 5306 in which the first protuberance 5236 of the attachment portion 5200 is seated when the attachment portion 5200 is in the attached state. The securing member 5300 at the recess 5306 can include a first securing surface 5308 that, together with the second ramped surface 5214 of the first protuberance 5236 of the attachment portion 5200 (as a second securing surface) conformably restricts occlusal movement of the attachment portion 5200 relative to the securing member 5300 when the attachment portion 5200 is in the attached state. As another example, the securing member 5300 at the protrusion 5304 can define a ledge 5310 that (as a third securing surface) together with the ledge 5240 of the second protuberance 5237 of the attachment portion 5200 (as a fourth securing surface) conformably restricts gingival movement of the attachment portion 5200 relative to the securing member 5300 when the attachment portion 5200 is in the attached state. The mesial protrusion 5304' can define a recess a 5306', a first securing surface 5308', a ledge 5310', and other features as described for the distal protrusion 5304 but mirrored about the occlusogingival plane P.

In some embodiments, the protrusion 5304 has a first region extending lingually (or buccally, depending on which side of the tooth the securing member 5300 is attached) away from the backing 5302 and a second region extending away from the first region towards the occlusogingival plane P and spaced apart from the backing 5302 by a gap along the buccolingual dimension. This gap can have a depth that is slightly greater than a thickness t of the attachment portion 5200 so that the attachment portion 5200 can fit between the second region of the protrusion 5304 and the backing 5302. The second region of the protrusion 5304 can include an inner surface (not visible) facing towards the backing 5302 and configured to prevent or limit lingual (or buccal) movement of the attachment portion 5200. The first region of the protrusion 5304 can include an inner surface 5316 configured to engage the second base region 5204*b* of the attachment portion 5200 and prevent or limit mesial or distal movement of the attachment portion 5200. In at least some cases, the inner surface 5316 of the protrusion 5304 and the exterior surface 5227 of the second base region 5204*b* of the attachment portion 5200 are primary force-transferring surfaces through which active and/or retentive orthodontic force is transferred to the tooth. In addition or alternatively, other surfaces of the securing member 5300 and the attachment portion 5200 that contact one another when the attachment portion 5200 is in the attached state can serve as force-transferring surfaces. The mesial protrusion 5304' can include features as described for the distal protrusion 5304 but mirrored about the occlusogingival plane P.

Figure 54B:
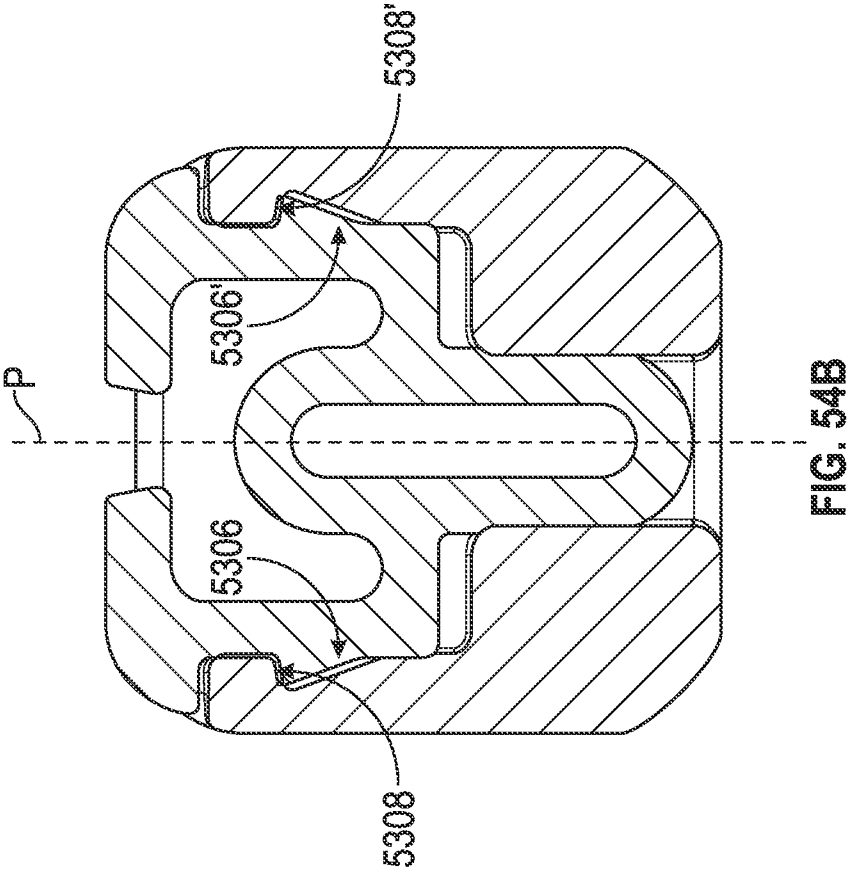
FIGS. 54A and 54B are different views of an attachment portion secured to a securing member in accordance with several embodiments of the present technology.
Figure 54A:
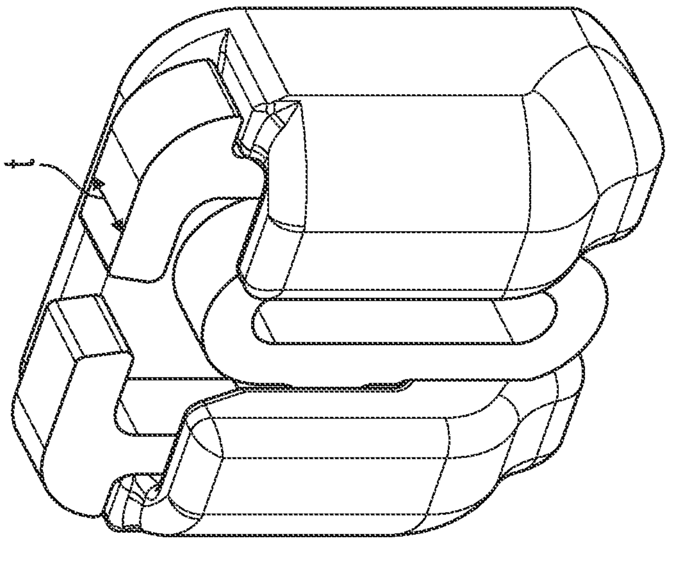

The protrusions 5304, 5304' can be spaced apart from one another by a gap 5320 along the mesiodistal dimension. The gap 5320 can be sized to at least partially receive a portion of the connector 5203 connected to the head 5202 of the attachment portion 5200. Referring to FIGS. 54A and 54B, in the secured state, the attachment portion 5200 can be positioned proximate and/or against the backing 5302 of the securing member 5300 and bound between the protrusions 5304, 5304'. The connector 5203 can also be positioned between the protrusions 5304, 5304' (e.g., within the gap 5320). Additionally or alternatively, the distal arm 5206 can be positioned buccolingually between the distal protrusion 5304 and the backing 5302 and the mesial arm 5206' can be positioned buccolingually between the mesial protrusion 5304' and the backing 5302.

The attachment portion 5200 can comprise a resilient and/or superelastic material such that, when the attachment portion 5200 is braced between the protrusions 5304, 5304', the attachment portion 5200 actively exerts an outward force on the surrounding surfaces. For example, the exterior surface 5219 of the arm 5206 along the second arm region 5206*b*, the first protuberance 5236, and the second protuberance 5237 can abut and press distally and gingivally against the distal protrusion 5304 via the inner surface 5316 and the ledge 5310. In some cases, the exterior surface 5219 of the arm 5206 along the first arm region 5206*a* does not abut the inner surface 5316 of the protrusion 5304 in the secured state. Such a configuration can provide room for the first arm region 5206*a* and any other regions comprising a flexure (discussed below) to deform while releasing the attachment portion 5200 from the securing member 5300. The mesial arm 5306' can include features as described for the distal arm 5306 but mirrored about the occlusogingival plane P.

In the secured position, the attachment portion 5200 can be releasably secured to the securing member 5300 such that it cannot be inadvertently displaced or prematurely or inadvertently released by typical patient activity (such as chewing). The attachment portion 5200 (or one or more portions thereof) can be configured to press outwardly on the securing member 5300 when in the secured position. Active and/or continuous outward force exerted by the attachment portion 5200 on the securing member 5300 can advantageously eliminate or reduce play between the attachment portion 5200 and the securing member 5300 along a mesiodistal dimension, an occlusogingival dimension, and/or a buccolingual dimension, thus providing a more accurate and efficient transfer of force from the appliance to the tooth. In some embodiments, the attachment portion 5200 (or one or more portions thereof) does not chronically press outwardly on the securing member 5300 and is instead configured to engage the securing member 5300 if the attachment portion 5200 moves into contact with and/or moves such that it exerts a force on one or more portions of the securing member 5300. Thus, the securing member 5300 can be configured to limit movement of the attachment portion 5200 relative to the securing member 5300. In some embodiments, one or more of the securing surfaces is configured for transferring orthodontic force between the attachment portion 5200 (e.g., to and/or from the connector 5203, to and/or from the rest of the appliance, etc.) and the securing member 5300 (e.g., to and/or from the tooth, etc.). In various embodiments, one or more of the securing surfaces does not substantially transfer orthodontic force between the attachment portion 5200 and the securing member 5300.

The attachment portion 5200 of FIGS. 52, 54A and 54B can be secured to the securing member 5300 by positioning the attachment portion 5200 proximate the securing member 5300 and moving the attachment portion 5200 along an occlusogingival path. The connector 5203 and/or other portion of the appliance continuous with the head 5202 of the attachment portion 5200 can be positioned relative to the securing member 5300 such that at least a portion of the head 5202 is positioned occlusally of the protrusions 5304, 5304' of the securing member 5300 and/or at, near, and/or occlusally of an occlusal edge of the backing 5302. The portion of the connector 5203 connected to the head 5202 can be positioned within the mesiodistal gap 5320 between the protrusions 5304, 5304' of the securing member 5300. In some embodiments, the back surface of the attachment portion 5200 can be positioned proximate and/or in contact with the backing 5302 of the securing member 5300. In some embodiments, an operator slides the connector 5203 and head 5202 occlusogingivally by positioning a tool (e.g., tool 800 in FIG. 8) within the opening 5230 and moving the tool occlusogingivally. The tool can contact the first base region 5204*a* when sliding the tool gingivally to insert the attachment portion 5200. Continued gingival movement of the connector 5203 and/or head 5202 can force the first ramped surfaces 5217, 5217' at the first protuberances 5236, 5236' into contact with the protrusions 5304, 5304', respectively. Because of the shapes and positions of the first ramped surfaces 5217, 5217', occlusogingival force applied to the exterior surfaces 5219, 5219' along the first ramped surfaces 5217, 5217' when the first ramped surfaces 5217, 5217' contact the protrusions 5304, 5304' can force the arms 5206, 5206' to bend mesiodistally. Once the apexes 5221, 5221' are aligned occlusogingivally with the recesses 5306, 5306', the arms 5206, 5206' and/or one or more portions thereof (e.g., the second and third arm regions 5206*b*, 5206'*b*, 5206*c*, 5206'*c* etc.) can bend back towards their shapes in the relaxed state, thereby wedging the attachment portion 5200 between the protrusions 5304, 5304' as shown in FIGS. 54A and 54B.

The attachment portion 5200 can comprise distal and mesial flexures 5232, 5232' configured to bend and/or otherwise deform to facilitate securing of the attachment portion 5200 to the securing member 5300. In some embodiments, the flexures 5232, 5232' comprise all or portions of the second arm regions 5206*b*, 5206'*b*. The second arm regions 5206*b*, 5206'*b*, for example, can be configured to bend in a first direction to facilitate or enable sliding of the attachment portion 5200 gingivally to secure to the securing member 5300 and/or the second arm regions 5206*b*, 5206'*b* can be configured to bend in a second, opposite direction to facilitate or enable locking of the attachment portion 5200 to the securing member 5300. Furthermore, the flexures 5232, 5232' can carry the first protuberances 5236, 5236' and surfaces thereof. In some embodiments, deformation of the flexures 5232, 5232' causes one or more portions of the attachment portion 5200 to rotate (e.g., bending of the second arm regions 5206*b*, 5206'*b* can cause the third arm regions 5206*c*, 5206'*c* to rotate about the buccolingual dimension). Moreover, the flexures 5232, 5232' can comprise other regions of the attachment portion 5200 in addition to or instead of the second arm regions 5206*b*, 5206'*b*. In the illustrated embodiment, deformation of the flexures 5232, 5232' while moving the attachment portion 5200 from the detached state to the attached state is primarily a mesiodistal dimension. In other embodiments, this deformation can be primarily in a buccolingual dimension and/or equally in mesiodistal and buccolingual dimensions. In any of these cases, the deformation can also be occlusogingival.

To release the attachment portion 5200 from the securing member 5300, the attachment portion 5200 can be configured to deform and/or rotate relative to the securing member 5300. For example, an operator can insert a tool, such as the distal end surface 808 of the tool 800 (FIG. 8), into the interior regions 5222, 5222' defined by the arms 5206, 5206'. An occlusal end of the tool surface can be positioned proximate the interior surfaces 5218, 5218' of the arms 5206, 5206' along the third arm regions 5206*c*, 5206'*c*. The portions of the interior surfaces 5218, 5218' that contact the tool can serve as leveraging surfaces through which the tool exerts leverage on the attachment portion 5200. For example, the securing member 5300 can include distal and mesial fulcrums 5322, 5322' at the protrusions 5304, 5304' that support the tool while the tool exerts the leveraging force on the attachment portion 5200. In at least some embodiments, the leveraging surfaces together and the slot formed by the interior regions 5222, 5222' are elongate with lengths substantially perpendicular (e.g., within degrees of perpendicular) to an occlusogingival axis. This can dictate horizontal positioning of the distal end surface 808 of the tool 800 to increase contact between the tool and the attachment portion 5200.

The operator can rotate the tool about a mesiodistal dimension while supported by the fulcrums 5322, 5322'. Accordingly, the tool can act as a lever. Leverage from the tool exerted on the attachment portion 5200 via the leveraging surface can forcefully move the attachment portion 5200 occlusally such that sliding contact between the second ramped surfaces 5214, 5214' of the first protuberances 5236, 5236' and the inner surfaces 5316, 5316' of the protrusions 5304, 5304' causes the flexures 5232, 5232' to resiliently deform in a mesiodistal dimension sufficiently to allow the first protuberances 5236, 5236' to exit the recesses 5306, 5306'. In connection with this deformation, the gap 5234 can at least partially close. In some embodiments, the attachment portion 5200 pops and/or snaps free of the securing member 5300 once the first protuberances 5236, 5236' clear the inner surfaces 5316, 5316' of the protrusions 5304, 5304'. With or without the tool, the attachment portion 5200 can then be pulled away from the backing 5302 along the buccolingual dimension.

The use of leverage (e.g., by incorporation of the fulcrums 5322, 5322' into the protrusions 5304, 5304') can allow the practical application of greater occlusal force to the attachment portion 5200 than would otherwise be possible. Accordingly, the second ramped surfaces 5214, 5214' of the first protuberances 5236, 5236' and the corresponding portions of the inner surfaces 5316, 5316' of the protrusions 5304, 5304' can be closer to perpendicular to the occlusogingival plane P than the first ramped surfaces 5217, 5217' of the first protuberances 5236, 5236' and the corresponding portions of the inner surfaces 5316, 5316' of the protrusions 5304, 5304'. This can be useful, for example, because the second ramped surfaces 5214, 5214' may act as second securing surfaces limiting occlusal movement of the attachment portion 5200 relative to the securing member 5300 in addition to acting as surfaces that transfer occlusogingival force from the lever into mesiodistal force that resiliently deforms the flexures 5232, 5232' during the detaching process. In contrast, the second protuberance 5237, 5237 can limit gingival movement of the attachment portion 5200 relative to the securing member 5300, thereby reducing or eliminating any need for the first ramped surfaces 5217, 5217' to perform this function.

The location at which the connector 5203 connects to the head 5202, a dimension along which the connector 5203 extends, a property of the connector 5203, etc. can be at least partially based on a force to be imparted on a tooth to which the attachment portion 5200 is configured to be secured (and/or an intended movement of the tooth). For example, as previously noted, movement of the attachment portion 5200 between the attached state to the detached state can include movement of the arms 5206, 5206' in a mesiodistal dimension. Thus, to avoid any movement of a connector 5203 unintentionally causing the attachment portion 5200 to move toward the detached state during treatment and/or to avoid inhibiting useful movement of the arms 5206, 5206' related to attaching and/or detaching processes, the connector 5203 can connect to a portion of the attachment portion 5200 away from the arms 5206, 5206' and in particular a location that would not cause movement of the arms 5206, 5206' in any way that is biased towards disengagement from the securing member 5300. In some cases, for example as shown in FIG. 52, the connector 5203 is continuous with the base 5204 of the head 5202 but not the arms 5206, 5206'. Such a configuration can prevent or limit the connector 5203 from applying forces to the arms 5206, 5206' that inadvertently cause the flexures 5232, 5232' to deform during orthodontic treatment. The location at which the connector 5203 connects to the head 5202, a dimension along which the connector 5203 extends, a property of the connector 5203, etc. can at least partially be based on the mechanism by which the attachment portion 5200 is attached to and/or detached from the securing member 5300 and/or the geometry of the securing member 5300.

Figure 55:
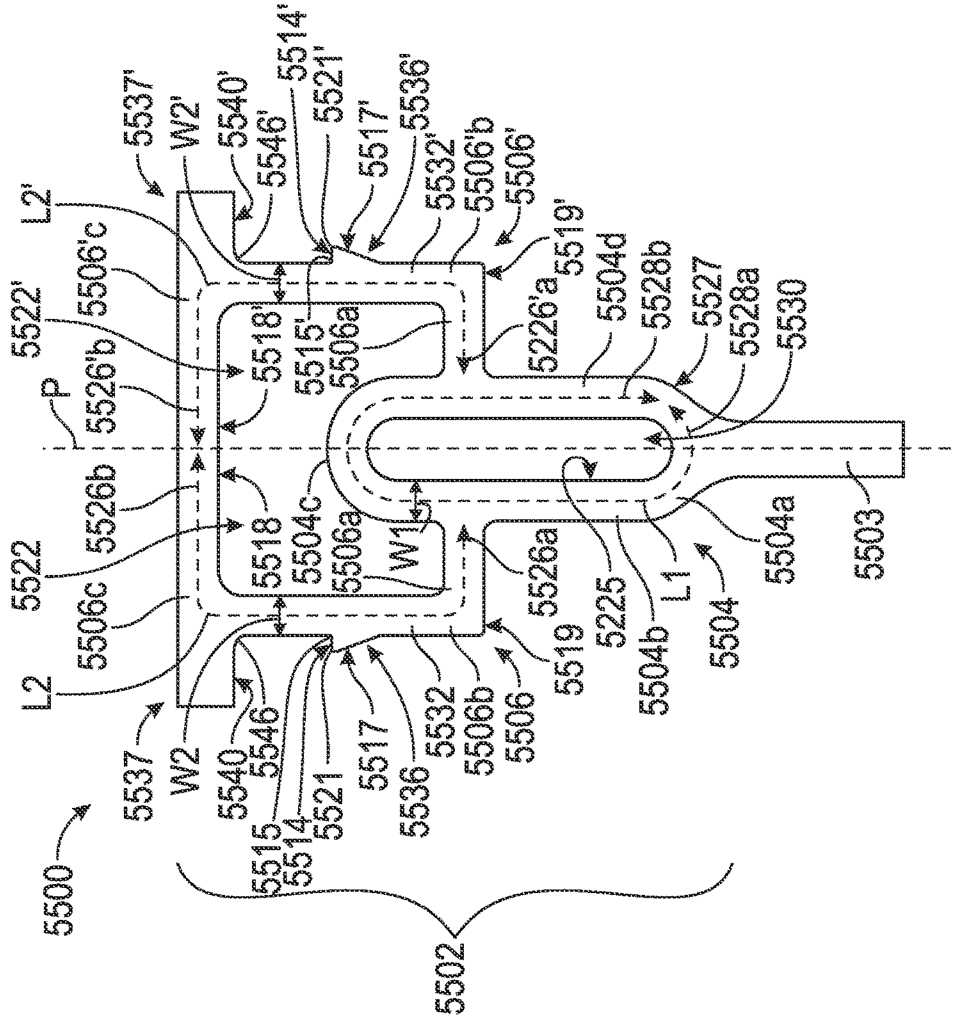
FIG. 55 is a front view of an attachment portion configured in accordance with several embodiments of the present technology.

FIG. 55 shows a planar view of an attachment portion 5500 configured in accordance with several embodiments of the present technology. The attachment portion 5500 can be configured to be secured to a patient's tooth via a securing member, such as securing member 5600 shown in FIG. 56. The attachment portion 5500 and the securing member 5600 are shown in a secured arrangement in FIGS. 57A and 57B. As discussed in greater detail below, the attachment portion 5500 and the securing member 5600 can be configured such that the attachment portion 5500 can be releasably secured to the securing member 5600. The attachment portion 5500 can be continuous with a connector 5503 that connects the attachment portion 5500 to one or more additional portions (not shown) of the overall orthodontic appliance. The attachment portion 5500 can have an attached state in which the orthodontic appliance exerts active and/or retentive orthodontic force (e.g., from a biasing portion (not shown) of the orthodontic appliance) on the tooth via the connector 5503, the attachment portion 5500, and the securing member 5600. Correspondingly, the attachment portion 5500 can have a detached state in which the orthodontic appliance is operably disconnected from the securing member 5600.

The attachment portion 5500 can be configured to move from the detached state to the attached state in response to relative movement between the attachment portion 5500 and the securing member 5600 in an occlusogingival dimension. This relative movement and/or another action can cause the attachment portion 5500 to resiliently deform and then at least partially return to its original form. In this or another manner, the attachment portion 5500 can pop and/or snap from the detached state to the attached state. Furthermore, the attachment portion 5500 can be configured to move from the attached state toward the detached state in response to leverage. These and other features of processes for moving the attachment portion 5500 between the attached and detached states as well as structures of the attachment portion 5500 and the securing member 5600 associated with these features are further discussed below with reference to FIGS. 55-57B.

In at least some cases, the attachment portion 5500 and the securing member 5600 are symmetrical about an occlusogingival plane P that bisects the attachment portion 5500 and the securing member 5600 at an occlusogingival midline when the attachment portion 5500 is in the attached state. In FIGS. 55-57B, symmetrical features of the attachment portion 5500 and the securing member 5600 at a distal side of the occlusogingival plane P are assigned a reference number with no apostrophe whereas symmetrical features at a mesial side of the occlusogingival plane P are assigned a reference number with an apostrophe. In the discussion of FIGS. 55-57B below, the symmetrical features at the distal side of the occlusogingival plane P may be referred to as "distal" whereas the symmetrical features at the mesial side of the occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth. Also, "occlusal" and "gingival" features can be occlusal and gingival, respectively, when the appliance is installed in the illustrated orientation or be gingival and occlusal, respectively, when the appliance is installed in an opposite orientation rotated 180 degrees about a buccolingual axis relative to the illustrated orientation.

Referring to FIG. 55, the attachment portion 5500 can comprise a head 5502. In some embodiments, the attachment portion 5500 comprises a head 5502 and at least a portion of the connector 5503 that is continuous with the head 5502. The connector 5503, for example, can comprise a second connector as previously described herein and/or can extend gingivally away from a gingival portion of the head 5502. The connector 5503 can have features similar to any of the connectors disclosed herein (e.g., first connectors, second connectors, third connectors, etc.) and can comprise a single connector or multiple connectors. For example, the connector 5503 can comprise a single, occlusogingivally extending connector (as shown in FIG. 55), multiple occlusogingivally extending connectors, one or more occlusogingivally extending connectors and one or more mesiodistally extending connectors branching off of the one or more occlusogingivally extending connectors and/or the attachment portion 5500, or one or more mesiodistally extending connectors (and no occlusogingivally extending connectors). Accordingly, the attachment portion 5500 can be connected to a single connector or to multiple connectors also referred to herein as a connector 5503. The connector 5503 can connect to the head 5502 at a variety of locations. For example, a gingivally extending connector can connect to a gingival portion of the head 5502. Any connector 5503 disclosed herein can extend away from the head 5502 along a variety of dimensions (e.g., along an occlusogingival dimension, a mesiodistal dimension, a buccolingual dimension, etc.).

The head 5502 can have a front surface (facing out of the page) and a back surface (not visible in FIG. 55), and a thickness t (labeled in FIG. 57A) measured between the front and back surfaces. In some embodiments, the head 5502 and the connector 5503 are part of the same, monolithic piece of material (e.g., cut from a sheet of material, a 3D-printed piece, etc.). Thus, the head 5502 and the connector 5503 may refer to different portions of the same continuous component. The attachment portion 5500 can be one portion of a greater orthodontic appliance, or may be formed separately and attached to an orthodontic appliance. The attachment portion 5500 and/or the corresponding appliance can be cut from the same sheet of material and/or may be formed by molding, casting, machining, 3D printing, stamping, extruding, or the like. The attachment portion 5500 may comprise a metal or a plastic and may have superelastic and/or shape memory properties. In some embodiments, the attachment portion 5500 does not have superelastic and/or shape memory properties.

As parts of the head 5502, the attachment portion 5500 can comprise various structures associated with one or more functional objectives. These functional objectives can include establishing and maintaining a secure connection between the attachment portion 5500 and the securing member 5600 when the attachment portion 5500 is in the attached state, establishing and maintaining efficient transfer of orthodontic force from the appliance to the tooth via the attachment portion 5500 and the securing member 5600 when the attachment portion 5500 is in the attached state, allowing convenient movement of the attachment portion 5500 from the attached state to the detached state, allowing convenient movement of the attachment portion 5500 from the detached state to the attached state, and providing a tactile indication of movement of the attachment portion 5500 to the attached state, among others.

With reference to FIG. 55, the attachment portion 5500 at the head 5502 can comprise a centrally positioned base 5504 and distal and mesial arms 5506, 5506' extending distally and mesially, respectively, from the base 5504. The base 5504 can comprise an elongate member forming a closed loop and extending along a longitudinal axis L1 from a first end portion 5528*a* to a second end portion 5528*b*. Starting at the first end portion 5528*a* and extending along the longitudinal axis L1 to the second end portion 5528*b*, the base 5504 can include a gingivally located curved first base region 5504*a*, a second base region 5504*b* continuous with and extending occlusally from the first base region 5504*a*, an occlusally located curved third base region 5504*c* continuous with and extending mesially from the second base region 5504*b*, and a fourth base region 5504*d* continuous with and extending gingivally from the third base region 5504*c*. The base 5504 can at least partially enclose and define an opening 5530 and can comprise an interior surface 5525 at the opening 5530 and an exterior surface 5527 spaced apart from the opening 5530. In at least some cases, the opening 5530 is sized to receive a tool to facilitate securing the attachment portion 5500 to the securing member 5600.

The distal arm 5506 can comprise an elongate member extending along a longitudinal axis L2 from a first end portion 5526*a* to a second end portion 5526*b*. Starting at the first end portion 5526*a* and extending along the longitudinal axis L2 to the second end portion 5526*b*, the distal arm 5506 can include a first arm region 5506*a* continuous with and extending distally from an occlusal part of the second base region 5504*b*, a second arm region 5506*b* continuous with and extending occlusally from the first arm region 5506*a*, and a third arm region 5506*c* continuous with and extending mesially from the second arm region 5506*b*. The distal arm 5506 can comprise an interior surface 5518 at the interior region 5522 and an exterior surface 5519 spaced apart from the interior region 5522. The mesial arm 5506' can include features as described for the distal arm 5506 but mirrored about the occlusogingival plane P. Together, the interior regions 5522, 5522' can form a slot shaped to receive a tool used to move the attachment portion 5500 from the attached state toward the detached state.

The base 5504 can have a width w1 measured between the interior surface 5525 and the exterior surface 5527. Similarly, the arms 5506, 5506' can have respective widths w2, w2' measured between the respective interior surfaces 5518, 5518' and exterior surfaces 5519, 5519'. The base 5504 and/or arms 5506, 5506' can have a substantially constant thickness or may have a varying thickness. Likewise, the base 5504 and/or arms 5506, 5506' can have a substantially constant width or may have a varying width. A width and/or thickness of the base 5504 and/or arms 5506, 5506' can be varied, for example, to impart a preferred stiffness profile to all or a portion of the base 5504 and/or arms 5506, 5506'. Furthermore, the arms 5506, 5506' can include a plurality of bends along the respective longitudinal axes L2, L2' that are configured to preferentially flex to facilitate securing and/or release of the attachment portion 5500 to a securing member.

According to various embodiments, one or more regions of the arms 5506, 5506' can include a portion along which the width w2, w2' is greater than at other portions. For example, as shown in FIG. 55, the distal arm 5506 can include a first protuberance 5536 at the second arm region **5506*b*. At the first protuberance 5536, the exterior surface 5519 of the distal arm 5506 can form first and second ramped surfaces 5517 and 5514 that meet at an apex 5521. The exterior surface 5519 can extend occlusally and away from the longitudinal axis L2 along the first ramped surface 5517 until turning at the apex 5521 and extending occlusally and toward the longitudinal axis L2 along the second ramped surface 5514. The second ramped surface 5514 can terminate at a corner 5515. The second ramped surface 5514, the corner 5515, and a portion of the exterior surface 5519 on the other side of the corner 5515 together can comprise a shoulder that is configured to engage a portion of a protrusion of the securing member 5600 when the attachment portion 5500 is secured to the securing member 5600 to oppose rotational and/or translational movement of the arm 5506. As described in greater detail below, the first ramped surface 5517 can be configured to force the arm 5506 to bend when engaging a protrusion of the securing member 5600 as the attachment portion 5500 moves from the detached state toward the attached state. In addition or alternatively, the second ramped surface 5514 can be configured to force the arm 5506 to bend when engaging a protrusion of the securing member 5600 as the attachment portion 5500 moves from the attached state toward the detached state. The mesial arm 5506' can include a first protuberance 5536' and associated features as described for the distal arm 5506** but mirrored about the occlusogingival plane P.

The distal arm 5506 can further include a distally extending second protuberance 5537 at a junction between the second and third arm regions **5506*b*, 5506*c*. At the second protuberance 5537, the exterior surface 5519 of the distal arm 5506 can form a ledge 5540. The ledge 5540 can begin at a corner 5546. The ledge 5540, the corner 5546, and a portion of the exterior surface 5519 on the other side of the corner 5546 together can comprise a shoulder that is configured to engage a portion of a protrusion of the securing member 5600 when the attachment portion 5500 is secured to the securing member 5600 to oppose rotational and/or translational movement of the arm 5506. The mesial arm 5506' can include a second protuberance 5537' and associated features as described for the distal arm 5506** but mirrored about the occlusogingival plane P.

Figure 56:
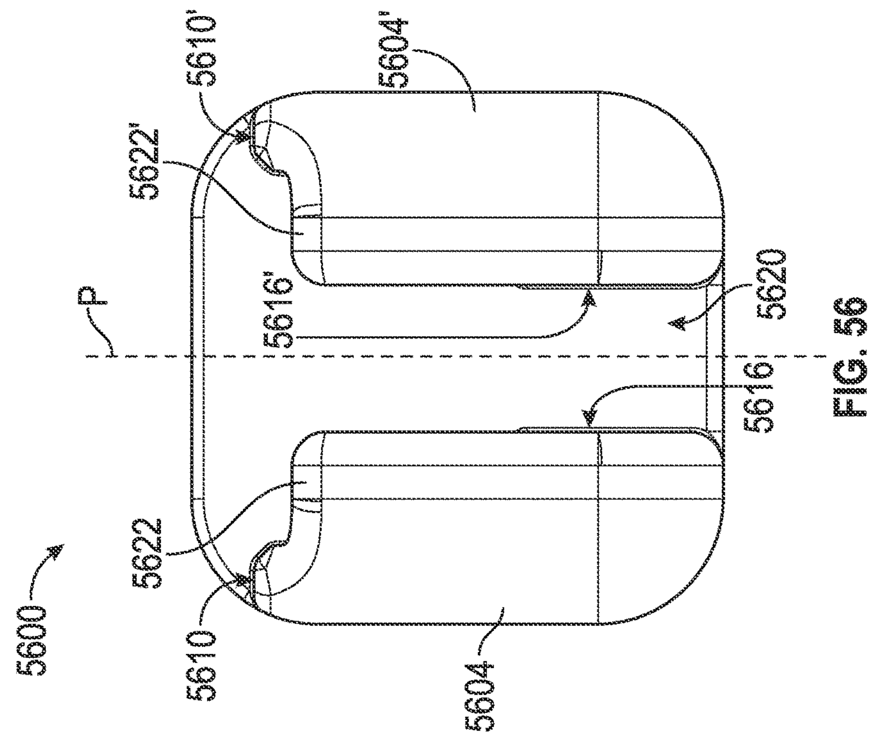
FIG. 56 is a front view of a securing member configured in accordance with several embodiments of the present technology.

FIG. 56 is a front view of the securing member 5600 configured for use with the attachment portion 5500. The securing member 5600 has a first side (facing out of the page) and a second side (not visible in FIG. 56) opposite the first side along a thickness of the securing member 5600 and configured to be bonded to a patient's tooth. The securing member 5600 can comprise a backing 5602 and distal and mesial protrusions 5604, 5604' carried by and extending away from the first side of the backing 5602 along a buccolingual dimension. The protrusions 5604, 5604' can be configured to engage the attachment portion 5500 and to retain the attachment portion 5500 at a specific location relative to the backing 5602 and the patient's tooth. Furthermore, as discussed below, the protrusions 5604, 5604' can be configured to support a lever used to move the attachment portion 5500 from the attached state toward the detached state.

Portions of the protrusions 5604, 5604' closest to the backing 5602 can be configured to engage the shoulders of the arms 5506, 5506' of the attachment portion 5500 to prevent or limit motion of the attachment portion 5500 in an occlusogingival dimension when the attachment portion 5500 is in the attached state. For example, the securing member 5600 at the protrusion 5604 can define a recess 5606 in which the first protuberance 5536 of the attachment portion 5500 is seated when the attachment portion 5500 is in the attached state. The securing member 5600 at the recess 5606 can include a first securing surface 5608 that, together with the second ramped surface 5514 of the first protuberance 5536 of the attachment portion 5500 (as a second securing surface) conformably restricts occlusal movement of the attachment portion 5500 relative to the securing member 5600 when the attachment portion 5500 is in the attached state. As another example, the securing member 5600 at the protrusion 5604 can define a ledge 5610 that (as a third securing surface) together with the ledge 5540 of the second protuberance 5537 of the attachment portion 5500 (as a fourth securing surface) conformably restricts gingival movement of the attachment portion 5500 relative to the securing member 5600 when the attachment portion 5500 is in the attached state. The mesial protrusion 5604' can define a recess a 5606', a first securing surface 5608', a ledge 5610', and other features as described for the distal protrusion 5604 but mirrored about the occlusogingival plane P.

In some embodiments, the protrusion 5604 has a first region extending lingually (or buccally, depending on which side of the tooth the securing member 5600 is attached) away from the backing 5602 and a second region extending away from the first region towards the occlusogingival plane P and spaced apart from the backing 5602 by a gap along the buccolingual dimension. This gap can have a depth that is slightly greater than a thickness t of the attachment portion 5500 so that the attachment portion 5500 can fit between the second region of the protrusion 5604 and the backing 5602. The second region of the protrusion 5604 can include an inner surface (not visible) facing towards the backing 5602 and configured to prevent or limit lingual (or buccal) movement of the attachment portion 5500. The first region of the protrusion 5604 can include an inner surface 5616 configured to engage the second base region **5504*b* of the attachment portion 5500 and prevent or limit mesial or distal movement of the attachment portion 5500. In at least some cases, the inner surface 5616 of the protrusion 5604 and the exterior surface 5527 of the second base region 5504*b* of the attachment portion 5500 are primary force-transferring surfaces through which active and/or retentive orthodontic force is transferred to the tooth. In addition or alternatively, other surfaces of the securing member 5600 and the attachment portion 5500 that contact one another when the attachment portion 5500 is in the attached state can serve as force-transferring surfaces. The mesial protrusion 5604' can have features as described for the distal protrusion 5604** but mirrored about the occlusogingival plane P.

Figure 57B:
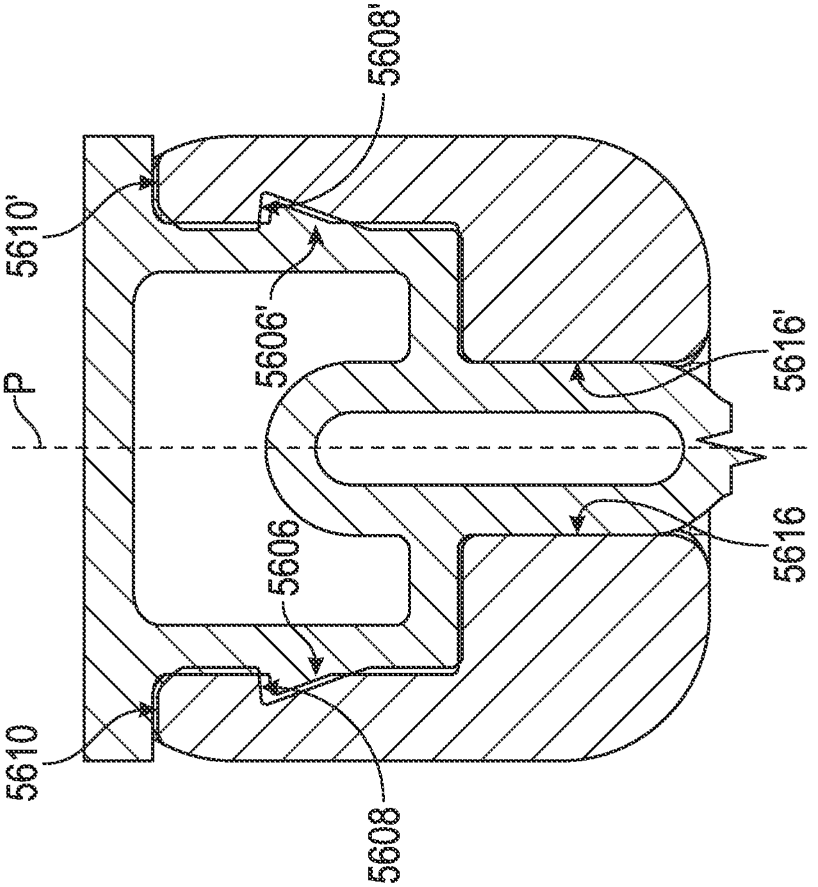
FIGS. 57A and 57B are different views of an attachment portion secured to a securing member in accordance with several embodiments of the present technology.
Figure 57A:
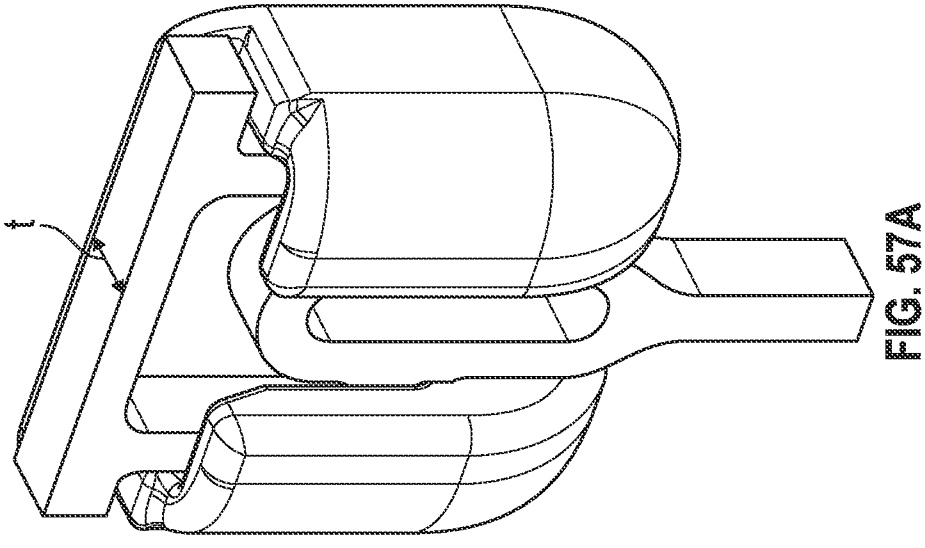

The protrusions 5604, 5604' can be spaced apart from one another by a gap 5620 along the mesiodistal dimension. The gap 5620 can be sized to at least partially receive a portion of the base 5504 and/or the connector 5503 connected to the head 5502 of the attachment portion 5500. Referring to FIGS. 57A and 57B, in the secured state, the attachment portion 5500 can be positioned proximate and/or against the backing 5602 of the securing member 5600 and bound between the protrusions 5604, 5604'. The connector 5503 can also be positioned between the protrusions 5604, 5604' (e.g., within the gap 5620). Additionally or alternatively, the distal arm 5506 can be positioned buccolingually between the distal protrusion 5604 and the backing 5602 and the mesial arm 5506' can be positioned buccolingually between the mesial protrusion 5604' and the backing 5602.

The attachment portion 5500 can comprise a resilient and/or superelastic material such that, when the attachment portion 5500 is braced between the protrusions 5604, 5604', the attachment portion 5500 actively exerts an outward force on the surrounding surfaces. For example, the exterior surface 5519 of the arm 5506 along the second arm region 5506*b*, the first protuberance 5536, and the second protuberance 5537 can abut and press distally and gingivally against the distal protrusion 5604 via the inner surface 5616 and the ledge 5610. In some cases, the exterior surface 5519 of the arm 5506 along the first arm region 5506*a* does not abut the inner surface 5616 of the protrusion 5604 in the secured state. Such a configuration can provide room for the first arm region 5506*a* and any other regions comprising a flexure (discussed below) to deform while releasing the attachment portion 5500 from the securing member 5600. The mesial arm 5506' can include features as described for the distal arm 5506 but mirrored about the occlusogingival plane P.

In the secured position, the attachment portion 5500 can be releasably secured to the securing member 5600 such that it cannot be inadvertently displaced or prematurely or inadvertently released by typical patient activity (such as chewing). The attachment portion 5500 (or one or more portions thereof) can be configured to press outwardly on the securing member 5600 when in the secured position. Active and/or continuous outward force exerted by the attachment portion 5500 on the securing member 5600 can advantageously eliminate or reduce play between the attachment portion 5500 and the securing member 5600 along a mesiodistal dimension, an occlusogingival dimension, and/or a buccolingual dimension, thus providing a more accurate and efficient transfer of force from the appliance to the tooth. In some embodiments, the attachment portion 5500 (or one or more portions thereof) does not chronically press outwardly on the securing member 5600 and is instead configured to engage the securing member 5600 if the attachment portion 5500 moves into contact with and/or moves such that it exerts a force on one or more portions of the securing member 5600. Thus, the securing member 5600 can be configured to limit movement of the attachment portion 5500 relative to the securing member 5600. In some embodiments, one or more of the securing surfaces is configured for transferring orthodontic force between the attachment portion 5500 (e.g., to and/or from the connector 5503, to and/or from the rest of the appliance, etc.) and the securing member 5600 (e.g., to and/or from the tooth, etc.). In various embodiments, one or more of the securing surfaces does not substantially transfer orthodontic force between the attachment portion 5500 and the securing member 5600.

The attachment portion 5500 of FIGS. 55, 57A and 57B can be secured to the securing member 5600 by positioning the attachment portion 5500 proximate the securing member 5600 and moving the attachment portion 5500 along an occlusogingival path. The connector 5503 and/or other portion of the appliance continuous with the head 5502 of the attachment portion 5500 can be positioned relative to the securing member 5600 such that at least a portion of the head 5502 is positioned occlusally of the protrusions 5604, 5604' of the securing member 5600 and/or at, near, and/or occlusally of an occlusal edge of the backing 5602. The portion of the connector 5503 connected to the head 5502 can be positioned within the mesiodistal gap 5620 between the protrusions 5604, 5604' of the securing member 5600. In some embodiments, the back surface of the attachment portion 5500 can be positioned proximate and/or in contact with the backing 5602 of the securing member 5600. In some embodiments, an operator slides the connector 5503 and head 5502 occlusogingivally by positioning a tool (e.g., tool 800 in FIG. 8) within the opening 5530 and moving the tool occlusogingivally. The tool can contact the first base region 5504*a* when sliding the tool gingivally to insert the attachment portion 5500. Continued gingival movement of the connector 5503 and/or head 5502 can force the first ramped surfaces 5517, 5517' at the first protuberances 5536, 5536' into contact with the protrusions 5604, 5604', respectively. Because of the shapes and positions of the first ramped surfaces 5517, 5517', occlusogingival force applied to the exterior surfaces 5519, 5519' along the first ramped surfaces 5517, 5517' when the first ramped surfaces 5517, 5517' contact the protrusions 5604, 5604' can force the arms 5506, 5506' to bend mesiodistally. Once the apexes 5521, 5521' are aligned occlusogingivally with the recesses 5606, 5606', the arms 5506, 5506' and/or one or more portions thereof (e.g., the second and third arm regions 5506*b*, 5506'*b*, 5506*c*, 5506'*c* etc.) can bend back towards their shapes in the relaxed state, thereby wedging the attachment portion 5500 between the protrusions 5604, 5604' as shown in FIGS. 57A and 57B.

The attachment portion 5500 can comprise distal and mesial flexures 5532, 5532' configured to bend and/or otherwise deform to facilitate securing of the attachment portion 5500 to the securing member 5600. In some embodiments, the flexures 5532, 5532' comprise all or portions of the second arm regions 5506*b*, 5506'*b*. The second arm regions 5506*b*, 5506'*b*, for example, can be configured to bend in a first direction to facilitate or enable sliding of the attachment portion 5500 gingivally to secure to the securing member 5600 and/or the second arm regions 5506*b*, 5506'*b* can be configured to bend in a second, opposite direction to facilitate or enable locking of the attachment portion 5500 to the securing member 5600. Furthermore, the flexures 5532, 5532' can carry the first protuberances 5536, 5536' and surfaces thereof. In some embodiments, the flexures 5532, 5532' comprise other regions of the attachment portion 5500 in addition to or instead of the second arm regions 5506*b*, 5506'*b*. In the illustrated embodiment, deformation of the flexures 5532, 5532' while moving the attachment portion 5500 from the detached state to the attached state is primarily a mesiodistal dimension. In other embodiments, this deformation can be primarily in a buccolingual dimension and/or equally in mesiodistal and buccolingual dimensions. In any of these cases, the deformation can also be occlusogingival.

To release the attachment portion 5500 from the securing member 5600, the attachment portion 5500 can be configured to deform and/or rotate relative to the securing member 5600. For example, an operator can insert a tool, such as the distal end surface 808 of the tool 800 (FIG. 8), into the interior regions 5522, 5522' defined by the arms 5506, 5506'. An occlusal end of the tool surface can be positioned proximate the interior surfaces 5518, 5518' of the arms 5506, 5506' along the third arm regions 5506*c*, 5506'*c*. The portions of the interior surfaces 5518, 5518' that contact the tool can serve as leveraging surfaces through which the tool exerts leverage on the attachment portion 5500. For example, the securing member 5600 can include distal and mesial fulcrums 5622, 5622' at the protrusions 5604, 5604' that support the tool while the tool exerts the leveraging force on the attachment portion 5500. In at least some embodiments, the leveraging surfaces together and the slot formed by the interior regions 5522, 5522' are elongate with lengths substantially perpendicular (e.g., within degrees of perpendicular) to an occlusogingival axis. This can dictate horizontal positioning of the distal end surface 808 of the tool 800 to increase contact between the tool and the attachment portion 5500.

The operator can rotate the tool about a mesiodistal dimension while supported by the fulcrums 5622, 5622'. Accordingly, the tool can act as a lever. Leverage from the tool exerted on the attachment portion 5500 via the leveraging surface can forcefully move the attachment portion 5500 occlusally such that sliding contact between the second ramped surfaces 5514, 5514' of the first protuberances 5536, 5536' and the inner surfaces 5616, 5616' of the protrusions 5604, 5604' causes the flexures 5532, 5532' to resiliently deform in a mesiodistal dimension sufficiently to allow the first protuberances 5536, 5536' to exit the recesses 5606, 5606'. In some embodiments, the attachment portion 5500 pops and/or snaps free of the securing member 5600 once the first protuberances 5536, 5536' clear the inner surfaces 5616, 5616' of the protrusions 5604, 5604'. With or without the tool, the attachment portion 5500 can then be pulled away from the backing 5602 along the buccolingual dimension.

The use of leverage (e.g., by incorporation of the fulcrums 5622, 5622' into the protrusions 5604, 5604') can allow the practical application of greater occlusal force to the attachment portion 5500 than would otherwise be possible. Accordingly, the second ramped surfaces 5514, 5514' of the first protuberances 5536, 5536' and the corresponding portions of the inner surfaces 5616, 5616' of the protrusions 5604, 5604' can be closer to perpendicular to the occlusogingival plane P than the first ramped surfaces 5517, 5517' of the first protuberances 5536, 5536' and the corresponding portions of the inner surfaces 5616, 5616' of the protrusions 5604, 5604'. This can be useful, for example, because the second ramped surfaces 5514, 5514' may act as second securing surfaces limiting occlusal movement of the attachment portion 5500 relative to the securing member 5600 in addition to acting as surfaces that transfer occlusogingival force from the lever into mesiodistal force that resiliently deforms the flexures 5532, 5532' during the detaching process. In contrast, the second protuberances 5537, 5537' can limit gingival movement of the attachment portion 5500 relative to the securing member 5600, thereby reducing or eliminating any need for the first ramped surfaces 5517, 5517' to perform this function.

The location at which the connector 5503 connects to the head 5502, a dimension along which the connector 5503 extends, a property of the connector 5503, etc. can be at least partially based on a force to be imparted on a tooth to which the attachment portion 5500 is configured to be secured (and/or an intended movement of the tooth). For example, as previously noted, movement of the attachment portion 5500 between the attached state to the detached state can include movement of the arms 5506, 5506' in a mesiodistal dimension. Thus, to avoid any movement of a connector 5503 unintentionally causing the attachment portion 5500 to move toward the detached state during treatment and/or to avoid inhibiting useful movement of the arms 5506, 5506' related to attaching and/or detaching processes, the connector 5503 can connect to a portion of the attachment portion 5500 away from the arms 5506, 5506' and in particular a location that would not cause movement of the arms 5506, 5506' in any way that is biased towards disengagement from the securing member 5600. In some cases, for example as shown in FIG. 55, the connector 5503 is continuous with the base 5504 of the head 5502 but not the arms 5506, 5506'. Such a configuration can prevent or limit the connector 5503 from applying forces to the arms 5506, 5506' that inadvertently cause the flexures 5532, 5532' to deform during orthodontic treatment. The location at which the connector 5503 connects to the head 5502, a dimension along which the connector 5503 extends, a property of the connector 5503, etc. can at least partially be based on the mechanism by which the attachment portion 5500 is attached to and/or detached from the securing member 5600 and/or the geometry of the securing member 5600.

Figure 58:
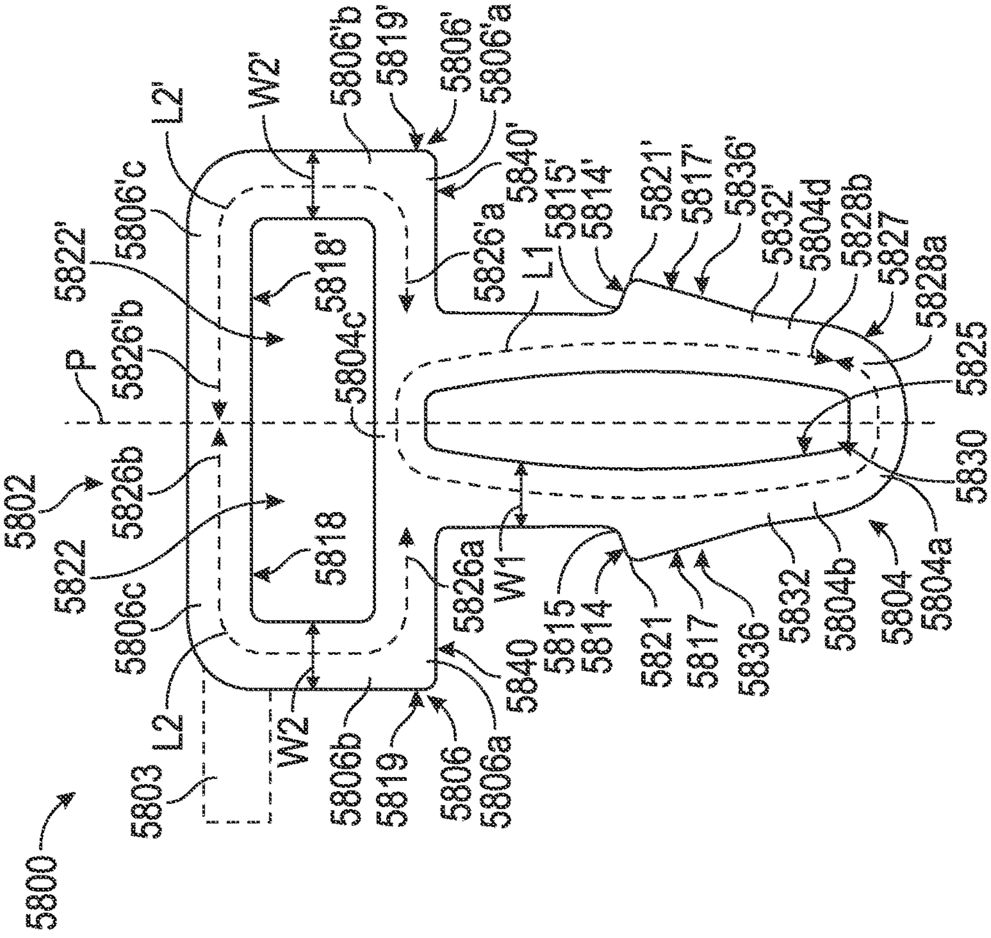
FIG. 58 is a front view of an attachment portion configured in accordance with several embodiments of the present technology.

FIG. 58 shows a planar view of an attachment portion 5800 configured in accordance with several embodiments of the present technology. The attachment portion 5800 can be configured to be secured to a patient's tooth via a securing member, such as securing member 5900 shown in FIG. 59. The attachment portion 5800 and the securing member 5900 are shown in a secured arrangement in FIGS. 60A and 60B. As discussed in greater detail below, the attachment portion 5800 and the securing member 5900 can be configured such that the attachment portion 5800 can be releasably secured to the securing member 5900. The attachment portion 5800 can be continuous with a connector 5803 that connects the attachment portion 5800 to one or more additional portions (not shown) of the overall orthodontic appliance. The attachment portion 5800 can have an attached state in which the orthodontic appliance exerts active and/or retentive orthodontic force (e.g., from a biasing portion (not shown) of the orthodontic appliance) on the tooth via the connector 5803, the attachment portion 5800, and the securing member 5900. Correspondingly, the attachment portion 5800 can have a detached state in which the orthodontic appliance is operably disconnected from the securing member 5900.

The attachment portion 5800 can be configured to move from the detached state to the attached state in response to relative movement between the attachment portion 5800 and the securing member 5900 in an occlusogingival dimension. This relative movement and/or another action can cause the attachment portion 5800 to resiliently deform and then at least partially return to its original form. In this or another manner, the attachment portion 5800 can pop and/or snap from the detached state to the attached state. Furthermore, the attachment portion 5800 can be configured to move from the attached state toward the detached state in response to leverage. These and other features of processes for moving the attachment portion 5800 between the attached and detached states as well as structures of the attachment portion 5800 and the securing member 5900 associated with these features are further discussed below with reference to FIGS. 58-60B.

In at least some cases, the attachment portion 5800 and the securing member 5900 are symmetrical about an occlusogingival plane P that bisects the attachment portion 5800 and the securing member 5900 at an occlusogingival midline when the attachment portion 5800 is in the attached state. In FIGS. 58-60B, symmetrical features of the attachment portion 5800 and the securing member 5900 at a distal side of the occlusogingival plane P are assigned a reference number with no apostrophe whereas symmetrical features at a mesial side of the occlusogingival plane P are assigned a reference number with an apostrophe. In the discussion of FIGS. 58-60B below, the symmetrical features at the distal side of the occlusogingival plane P may be referred to as "distal" whereas the symmetrical features at the mesial side of the occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth. Also, "occlusal" and "gingival" features can be occlusal and gingival, respectively, when the appliance is installed in the illustrated orientation or be gingival and occlusal, respectively, when the appliance is installed in an opposite orientation rotated 180 degrees about a buccolingual axis relative to the illustrated orientation.

Referring to FIG. 58, the attachment portion 5800 can comprise a head 5802. In some embodiments, the attachment portion 5800 comprises a head 5802 and at least a portion of the connector 5803 that is continuous with the head 5802. The connector 5803, for example, can comprise a second connector as previously described herein and/or can extend gingivally away from a gingival portion of the head 5802. The connector 5803 can have features similar to any of the connectors disclosed herein (e.g., first connectors, second connectors, third connectors, etc.) and can comprise a single connector or multiple connectors. For example, the connector 5803 can comprise a single, occlusogingivally extending connector (as shown in FIG. 58), multiple occlusogingivally extending connectors, one or more occlusogingivally extending connectors and one or more mesiodistally extending connectors branching off of the one or more occlusogingivally extending connectors and/or the attachment portion 5800, or one or more mesiodistally extending connectors (and no occlusogingivally extending connectors). Accordingly, the attachment portion 5800 can be connected to a single connector or to multiple connectors also referred to herein as a connector 5803. The connector 5803 can connect to the head 5802 at a variety of locations. For example, a gingivally extending connector can connect to a gingival portion of the head 5802. Any connector 5803 disclosed herein can extend away from the head 5802 along a variety of dimensions (e.g., along an occlusogingival dimension, a mesiodistal dimension, a buccolingual dimension, etc.).

The head 5802 can have a front surface (facing out of the page) and a back surface (not visible in FIG. 58), and a thickness t (labeled in FIG. 60A) measured between the front and back surfaces. In some embodiments, the head 5802 and the connector 5803 are part of the same, monolithic piece of material (e.g., cut from a sheet of material, a 3D-printed piece, etc.). Thus, the head 5802 and the connector 5803 may refer to different portions of the same continuous component. The attachment portion 5800 can be one portion of a greater orthodontic appliance, or may be formed separately and attached to an orthodontic appliance. The attachment portion 5800 and/or the corresponding appliance can be cut from the same sheet of material and/or may be formed by molding, casting, machining, 3D printing, stamping, extruding, or the like. The attachment portion 5800 may comprise a metal or a plastic and may have superelastic and/or shape memory properties. In some embodiments, the attachment portion 5800 does not have superelastic and/or shape memory properties.

As parts of the head 5802, the attachment portion 5800 can comprise various structures associated with one or more functional objectives. These functional objectives can include establishing and maintaining a secure connection between the attachment portion 5800 and the securing member 5900 when the attachment portion 5800 is in the attached state, establishing and maintaining efficient transfer of orthodontic force from the appliance to the tooth via the attachment portion 5800 and the securing member 5900 when the attachment portion 5800 is in the attached state, allowing convenient movement of the attachment portion 5800 from the attached state to the detached state, allowing convenient movement of the attachment portion 5800 from the detached state to the attached state, and providing a tactile indication of movement of the attachment portion 5800 to the attached state, among others.

With reference to FIG. 58, the attachment portion 5800 at the head 5802 can comprise a centrally positioned base 5804 and distal and mesial arms 5806, 5806' extending distally and mesially, respectively, from the base 5804. The base 5804 can comprise an elongate member forming a closed loop and extending along a longitudinal axis L1 from a first end portion **5828*a* to a second end portion 5828*b*. Starting at the first end portion 5828*a* and extending along the longitudinal axis L1 to the second end portion 5828*b*, the base 5804 can include a gingivally located curved first base region 5804*a*, a second base region 5804*b* continuous with and extending occlusally from the first base region 5804*a*, an occlusally located third base region 5804*c* continuous with and extending mesially from the second base region 5804*b*, and a fourth base region 5804*d* continuous with and extending gingivally from the third base region 5804*c*. The base 5804 can at least partially enclose and define an opening 5830 and can comprise an interior surface 5825 at the opening 5830 and an exterior surface 5827 spaced apart from the opening 5830. In at least some cases, the opening 5830 is sized to receive a tool to facilitate securing the attachment portion 5800 to the securing member 5900**.

The distal arm 5806 can comprise an elongate member extending along a longitudinal axis L2 from a first end portion **5826*a* to a second end portion 5826*b*. Starting at the first end portion 5826*a* and extending along the longitudinal axis L2 to the second end portion 5826*b*, the distal arm 5806 can include a first arm region 5806*a* continuous with and extending distally from the third base region 5804*c*, a second arm region 5806*b* continuous with and extending occlusally from the first arm region 5806*a*, and a third arm region 5806*c* continuous with and extending mesially from the second arm region 5806*b*. The distal arm 5806 can comprise an interior surface 5818 at the interior region 5822 and an exterior surface 5819 spaced apart from the interior region 5822. The mesial arm 5806' can include features as described for the distal arm 5806 but mirrored about the occlusogingival plane P. Together, the interior regions 5822, 5822' can form a slot shaped to receive a tool used to move the attachment portion 5800** from the attached state toward the detached state.

The base 5804 can have a width w1 measured between the interior surface 5825 and the exterior surface 5827. Similarly, the arms 5806, 5806' can have respective widths w2, w2' measured between the respective interior surfaces 5818, 5818' and exterior surfaces 5819, 5819'. The base 5804 and/or arms 5806, 5806' can have a substantially constant thickness or may have a varying thickness. Likewise, the base 5804 and/or arms 5806, 5806' can have a substantially constant width or may have a varying width. A width and/or thickness of the base 5804 and/or arms 5806, 5806' can be varied, for example, to impart a preferred stiffness profile to all or a portion of the base 5804 and/or arms 5806, 5806'.

According to various embodiments, one or more regions of the base 5804 can include a portion along which the width w1 is greater than at other portions. For example, as shown in FIG. 58, the base 5804 can include a protuberance 5836 at the second base region 5804*b*. At the protuberance 5836, the exterior surface 5827 of the base 5804 can form first and second ramped surfaces 5817 and 5814 that meet at an apex 5821. The exterior surface 5827 can extend occlusally and away from the longitudinal axis L1 along the first ramped surface 5817 until turning at the apex 5821 and extending occlusally and toward the longitudinal axis L1 along the second ramped surface 5814. The second ramped surface 5814 can terminate at a corner 5815. The second ramped surface 5814, the corner 5815, and a portion of the exterior surface 5827 on the other side of the corner 5815 together can comprise a shoulder that is configured to engage a portion of a protrusion of the securing member 5900 when the attachment portion 5800 is secured to the securing member 5900 to oppose rotational and/or translational movement of the arm 5806. As described in greater detail below, the first ramped surface 5817 can be configured to force the second base region 5804*b* to bend when engaging a protrusion of the securing member 5900 as the attachment portion 5800 moves from the detached state toward the attached state. In addition or alternatively, the second ramped surface 5814 can be configured to force the second base region 5804*b* to bend when engaging a protrusion of the securing member 5900 as the attachment portion 5800 moves from the attached state toward the detached state. The base 5804 can also include a mesial protuberance 5836' and associated features as described for the distal protuberance 5836 but mirrored about the occlusogingival plane P.

At the first arm region 5806*a*, the exterior surface 5819 of the distal arm 5806 can form a ledge 5840. The ledge 5840, an occlusal portion of the exterior surface 5827 of the base 5804 at the second base region 5804*b* and a corner therebetween together can comprise a shoulder that is configured to engage a portion of the securing member 5900 when the attachment portion 5800 is secured to the securing member 5900 to oppose rotational and/or translational movement of the arm 5806. The mesial arm 5806' can include a ledge 5840' and associated features as described for the distal arm 5806 but mirrored about the occlusogingival plane P.

Figure 59:
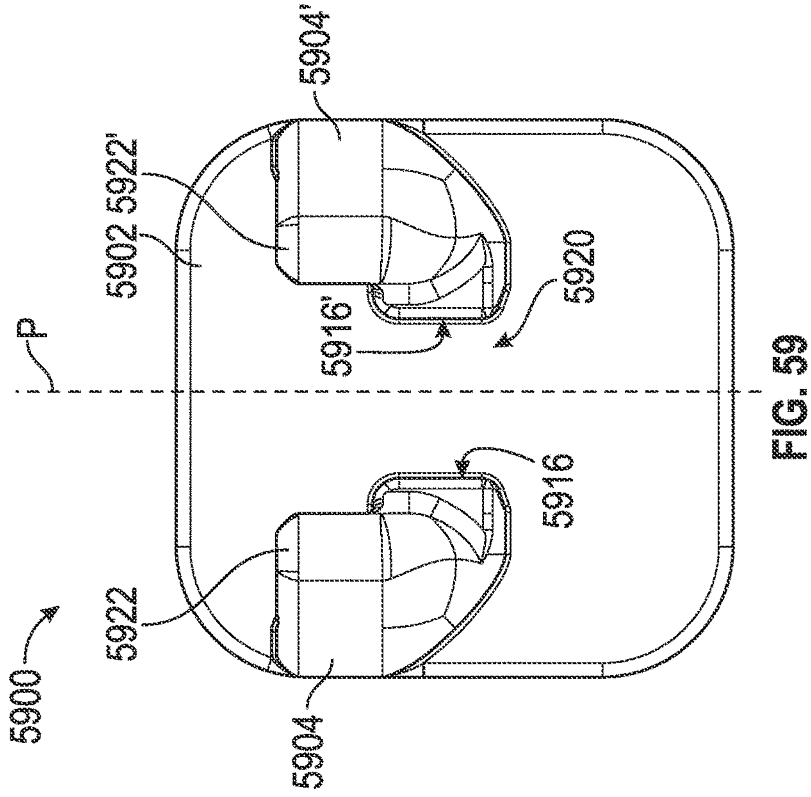
FIG. 59 is a front view of a securing member configured in accordance with several embodiments of the present technology.

FIG. 59 is a front view of the securing member 5900 configured for use with the attachment portion 5800. The securing member 5900 has a first side (facing out of the page) and a second side (not visible in FIG. 59) opposite the first side along a thickness of the securing member 5900 and configured to be bonded to a patient's tooth. The securing member 5900 can comprise a backing 5902 and distal and mesial protrusions 5904, 5904' carried by and extending away from the first side of the backing 5902 along a buccolingual dimension. The protrusions 5904, 5904' can be configured to engage the attachment portion 5800 and to retain the attachment portion 5800 at a specific location relative to the backing 5902 and the patient's tooth. Furthermore, as discussed below, the protrusions 5904, 5904' can be configured to support a lever used to move the attachment portion 5800 from the attached state toward the detached state.

Portions of the protrusions 5904, 5904' closest to the backing 5902 can be configured to engage the shoulders of the arms 5806, 5806' of the attachment portion 5800 to prevent or limit motion of the attachment portion 5800 in an occlusogingival dimension when the attachment portion 5800 is in the attached state. For example, the securing member 5900 at the protrusion 5904 can define a first securing surface 5908 that, together with the second ramped surface 5814 of the protuberance 5836 of the attachment portion 5800 (as a second securing surface) conformably restricts occlusal movement of the attachment portion 5800 relative to the securing member 5900 when the attachment portion 5800 is in the attached state. As another example, the securing member 5900 at the protrusion 5904 can define a ledge 5910 that (as a third securing surface) together with the ledge 5840 of the attachment portion 5800 (as a fourth securing surface) conformably restricts gingival movement of the attachment portion 5800 relative to the securing member 5900 when the attachment portion 5800 is in the attached state. The mesial protrusion 5904' can define a first securing surface 5908', a ledge 5910', and other features as described for the distal protrusion 5904 but mirrored about the occlusogingival plane P.

In some embodiments, the protrusion 5904 has a first region extending lingually (or buccally, depending on which side of the tooth the securing member 5900 is attached) away from the backing 5902 and a second region extending away from the first region towards the occlusogingival plane P and spaced apart from the backing 5902 by a gap along the buccolingual dimension. This gap can have a depth that is slightly greater than a thickness t of the attachment portion 5800 so that the attachment portion 5800 can fit between the second region of the protrusion 5904 and the backing 5902. The second region of the protrusion 5904 can include an inner surface (not visible) facing towards the backing 5902 and configured to prevent or limit lingual (or buccal) movement of the attachment portion 5800. The first region of the protrusion 5904 can include an inner surface 5916 configured to engage the second base region 5804*b* and the first arm region 5806*a* of the attachment portion 5800 and prevent or limit mesial or distal movement of the attachment portion 5800. In at least some cases, the inner surface 5916 of the protrusion 5904 and the exterior surface 5827 of the second base region 5804*b* of the attachment portion 5800 are primary force-transferring surfaces through which active and/or retentive orthodontic force is transferred to the tooth. In addition or alternatively, other surfaces of the securing member 5900 and the attachment portion 5800 that contact one another when the attachment portion 5800 is in the attached state can serve as force-transferring surfaces. The mesial protrusion 5904' can have features as described for the distal protrusion 5904 but mirrored about the occlusogingival plane P.

Figure 60B:
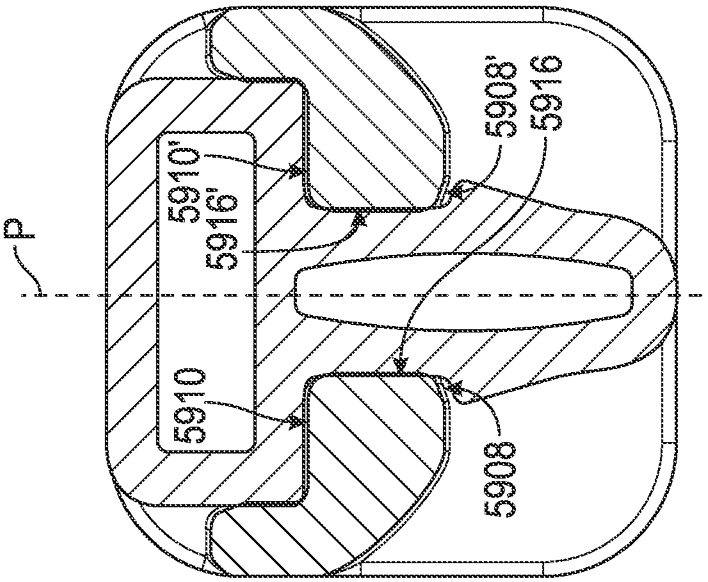
FIGS. 60A and 60B are different views of an attachment portion secured to a securing member in accordance with several embodiments of the present technology.
Figure 60A:
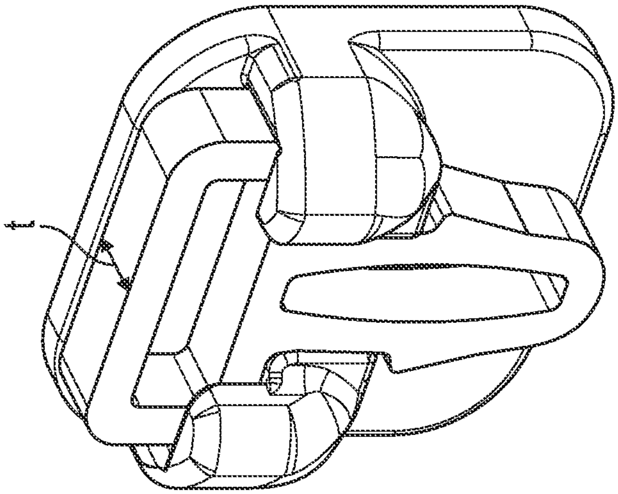

The protrusions 5904, 5904' can be spaced apart from one another by a gap 5920 along the mesiodistal dimension. The gap 5920 can be sized to at least partially receive a portion of the base 5804 and/or the connector 5803 connected to the head 5802 of the attachment portion 5800. Referring to FIGS. 60A and 60B, in the secured state, the attachment portion 5800 can be positioned proximate and/or against the backing 5902 of the securing member 5900 and bound between the protrusions 5904, 5904'. The connector 5803 can also be positioned between the protrusions 5904, 5904' (e.g., within the gap 5920). Additionally or alternatively, the distal arm 5806 can be positioned buccolingually between the distal protrusion 5904 and the backing 5902 and the mesial arm 5806' can be positioned buccolingually between the mesial protrusion 5904' and the backing 5902.

The attachment portion 5800 can comprise a resilient and/or superelastic material such that, when the attachment portion 5800 is braced between the protrusions 5904, 5904', the attachment portion 5800 actively exerts an outward force on the surrounding surfaces. For example, the exterior surface 5827 of the base 5804 along the second and fourth base regions 5804*b*, 5804*d* and the exterior surfaces of the arm 5806, 5806' along the first arm regions 5806*a*, 5806'*a* can abut and press distally and gingivally against the protrusions 5904, 5904' via the inner surfaces 5916, 5916' and the ledges 5910, 5910'.

In the secured position, the attachment portion 5800 can be releasably secured to the securing member 5900 such that it cannot be inadvertently displaced or prematurely or inadvertently released by typical patient activity (such as chewing). The attachment portion 5800 (or one or more portions thereof) can be configured to press outwardly on the securing member 5900 when in the secured position. Active and/or continuous outward force exerted by the attachment portion 5800 on the securing member 5900 can advantageously eliminate or reduce play between the attachment portion 5800 and the securing member 5900 along a mesiodistal dimension, an occlusogingival dimension, and/or a buccolingual dimension, thus providing a more accurate and efficient transfer of force from the appliance to the tooth. In some embodiments, the attachment portion 5800 (or one or more portions thereof) does not chronically press outwardly on the securing member 5900 and is instead configured to engage the securing member 5900 if the attachment portion 5800 moves into contact with and/or moves such that it exerts a force on one or more portions of the securing member 5900. Thus, the securing member 5900 can be configured to limit movement of the attachment portion 5800 relative to the securing member 5900. In some embodiments, one or more of the securing surfaces is configured for transferring orthodontic force between the attachment portion 5800 (e.g., to and/or from the connector 5803, to and/or from the rest of the appliance, etc.) and the securing member 5900 (e.g., to and/or from the tooth, etc.). In various embodiments, one or more of the securing surfaces does not substantially transfer orthodontic force between the attachment portion 5800 and the securing member 5900.

The attachment portion 5800 of FIGS. 58, 60A and 60B can be secured to the securing member 5900 by positioning the attachment portion 5800 proximate the securing member 5900 and moving the attachment portion 5800 along an occlusogingival path. The connector 5803 and/or other portion of the appliance continuous with the head 5802 of the attachment portion 5800 can be positioned relative to the securing member 5900 such that at least a portion of the head 5802 is positioned occlusally of the protrusions 5904, 5904' of the securing member 5900 and/or at, near, and/or occlusally of an occlusal edge of the backing 5902. The portion of the connector 5803 connected to the head 5802 can be positioned within the mesiodistal gap 5920 between the protrusions 5904, 5904' of the securing member 5900. In some embodiments, the back surface of the attachment portion 5800 can be positioned proximate and/or in contact with the backing 5902 of the securing member 5900. In some embodiments, an operator slides the connector 5803 and head 5802 occlusogingivally by positioning a tool (e.g., tool 800 in FIG. 8) within the opening 5830 and moving the tool occlusogingivally. The tool can contact the first base region 5804*a* when sliding the tool gingivally to insert the attachment portion 5800. Continued gingival movement of the connector 5803 and/or head 5802 can force the first ramped surfaces 5817, 5817' at the protuberances 5836, 5836' into contact with the protrusions 5904, 5904', respectively. Because of the shapes and positions of the first ramped surfaces 5817, 5817', occlusogingival force applied to the exterior surfaces 5827, 5827' along the first ramped surfaces 5817, 5817' when the first ramped surfaces 5817, 5817' contact the protrusions 5904, 5904' can force the second and fourth base regions 5904*b*, 5904*d* to bend mesiodistally. Once the apexes 5821, 5821' clear the protrusions 5904, 5904', the second and fourth base regions 5904*b*, 5904*d* can bend back towards their shapes in the relaxed state, thereby wedging the attachment portion 5800 between the protrusions 5904, 5904' as shown in FIGS. 60A and 60B.

The attachment portion 5800 can comprise distal and mesial flexures 5832, 5832' configured to bend and/or otherwise deform to facilitate securing of the attachment portion 5800 to the securing member 5900. In some embodiments, the flexures 5832, 5832' comprise all or portions of the second and fourth base regions 5904*b*, 5904*d*, respectively. The second and fourth base regions 5904*b*, 5904*d*, for example, can be configured to bend in a first direction to facilitate or enable sliding of the attachment portion 5800 gingivally to secure to the securing member 5900 and/or the second and fourth base regions 5904*b*, 5904*d* can be configured to bend in a second, opposite direction to facilitate or enable locking of the attachment portion 5800 to the securing member 5900. Furthermore, the flexures 5832, 5832' can carry the protuberances 5836, 5836' and surfaces thereof. In the illustrated embodiment, deformation of the flexures 5832, 5832' while moving the attachment portion 5800 from the detached state to the attached state is primarily a mesiodistal dimension. In other embodiments, this deformation can be primarily in a buccolingual dimension and/or equally in mesiodistal and buccolingual dimensions. In any of these cases, the deformation can also be occlusogingival.

To release the attachment portion 5800 from the securing member 5900, the attachment portion 5800 can be configured to deform and/or rotate relative to the securing member 5900. For example, an operator can insert a tool, such as the distal end surface 808 of the tool 800 (FIG. 8), into the interior regions 5822, 5822' defined by the arms 5806, 5806'. An occlusal end of the tool surface can be positioned proximate the interior surfaces 5818, 5818' of the arms 5806, 5806' along the third arm regions 5806*c*, 5806'*c*. The portions of the interior surfaces 5818, 5818' that contact the tool can serve as leveraging surfaces through which the tool exerts leverage on the attachment portion 5800. For example, the securing member 5900 can include distal and mesial fulcrums 5922, 5922' at the protrusions 5904, 5904' that support the tool while the tool exerts the leveraging force on the attachment portion 5800. In at least some embodiments, the leveraging surfaces together and the slot formed by the interior regions 5822, 5822' are elongate with lengths substantially perpendicular (e.g., within degrees of perpendicular) to an occlusogingival axis. This can dictate horizontal positioning of the distal end surface 808 of the tool 800 to increase contact between the tool and the attachment portion 5800.

The operator can rotate the tool about a mesiodistal dimension while supported by the fulcrums 5922, 5922'.

Accordingly, the tool can act as a lever. Leverage from the tool exerted on the attachment portion 5800 via the leveraging surface can forcefully move the attachment portion 5800 occlusally such that sliding contact between the second ramped surfaces 5814, 5814' of the protuberances 5836, 5836' and the protrusions 5904, 5904' causes the flexures 5832, 5832' to resiliently deform in a mesiodistal dimension sufficiently to allow the first protuberances 5836, 5836' to clear the protrusions 5904, 5904'. In connection with this deformation, the opening 5830 can at least partially close and then open. In some embodiments, the attachment portion 5800 pops and/or snaps free of the securing member 5900 once the protuberances 5836, 5836' clear the inner surfaces 5916, 5916' of the protrusions 5904, 5904'. With or without the tool, the attachment portion 5800 can then be pulled away from the backing 5902 along the buccolingual dimension.

The use of leverage (e.g., by incorporation of the fulcrums 5922, 5922' into the protrusions 5904, 5904') can allow the practical application of greater occlusal force to the attachment portion 5800 than would otherwise be possible. Accordingly, the second ramped surfaces 5814, 5814' of the first protuberances 5836, 5836' and the first securing surfaces 5908, 5908' of the protrusions 5904, 5904' can be closer to perpendicular to the occlusogingival plane P than the first ramped surfaces 5817, 5817' of the first protuberances 5836, 5836'. This can be useful, for example, because the second ramped surfaces 5814, 5814' may act as second securing surfaces limiting occlusal movement of the attachment portion 5800 relative to the securing member 5900 in addition to acting as surfaces that transfer occlusogingival force from the lever into mesiodistal force that resiliently deforms the flexures 5832, 5832' during the detaching process. Interaction between the ledges 5840, 5840' of the attachment member 5800 and the ledges 5910, 5910' of the protrusions 5904, 5904' can limit gingival movement of the attachment portion 5800 relative to the securing member 5900, thereby reducing or eliminating any need for the first ramped surfaces 5817, 5817' to perform this function.

The location at which the connector 5803 connects to the head 5802, a dimension along which the connector 5803 extends, a property of the connector 5803, etc. can be at least partially based on a force to be imparted on a tooth to which the attachment portion 5800 is configured to be secured (and/or an intended movement of the tooth). For example, as previously noted, movement of the attachment portion 5800 between the attached state to the detached state can include movement of the second and fourth base regions **5804*b*, 5804*d* in a mesiodistal dimension. Thus, to avoid any movement of a connector 5803 unintentionally causing the attachment portion 5800 to move toward the detached state during treatment and/or to avoid inhibiting useful movement of the second and fourth base regions 5804*b*, 5804*d* related to attaching and/or detaching processes, the connector 5803 can connect to a portion of the attachment portion 5800 away from the second and fourth base regions 5804*b*, 5804*d* and in particular a location that would not cause movement of the second and fourth base regions 5804*b*, 5804*d* in any way that is biased towards disengagement from the securing member 5900. In some cases, for example as shown in FIG. 58, the connector 5803 is continuous with one or both of the arms 5806, 5806'. Such a configuration can prevent or limit the connector 5803 from applying forces to the second and fourth base regions 5804*b*, 5804*d* that inadvertently cause the flexures 5832, 5832' to deform during orthodontic treatment. The location at which the connector 5803 connects to the head 5802, a dimension along which the connector 5803 extends, a property of the connector 5803, etc. can at least partially be based on the mechanism by which the attachment portion 5800 is attached to and/or detached from the securing member 5900 and/or the geometry of the securing member 5900**.

Figure 61:
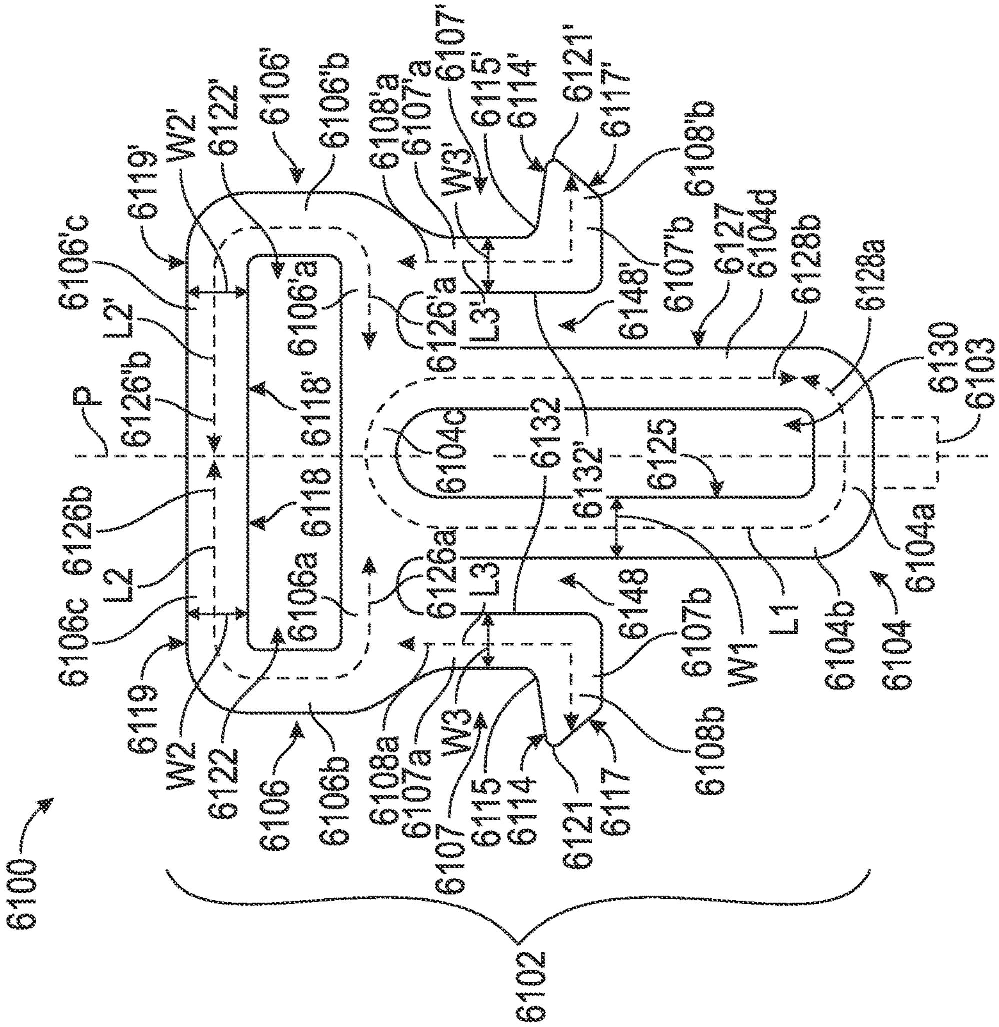
FIG. 61 is a front view of an attachment portion configured in accordance with several embodiments of the present technology.

FIG. 61 shows a planar view of an attachment portion 6100 configured in accordance with several embodiments of the present technology. The attachment portion 6100 can be configured to be secured to a patient's tooth via a securing member, such as securing member 6200 shown in FIG. 62. The attachment portion 6100 and the securing member 6200 are shown in a secured arrangement in FIGS. 63A and 63B. As discussed in greater detail below, the attachment portion 6100 and the securing member 6200 can be configured such that the attachment portion 6100 can be releasably secured to the securing member 6200. The attachment portion 6100 can be continuous with a connector 6103 that connects the attachment portion 6100 to one or more additional portions (not shown) of the overall orthodontic appliance. The attachment portion 6100 can have an attached state in which the orthodontic appliance exerts active and/or retentive orthodontic force (e.g., from a biasing portion (not shown) of the orthodontic appliance) on the tooth via the connector 6103, the attachment portion 6100, and the securing member 6200. Correspondingly, the attachment portion 6100 can have a detached state in which the orthodontic appliance is operably disconnected from the securing member 6200.

The attachment portion 6100 can be configured to move from the detached state to the attached state in response to relative movement between the attachment portion 6100 and the securing member 6200 in an occlusogingival dimension. This relative movement and/or another action can cause the attachment portion 6100 to resiliently deform and then at least partially return to its original form. In this or another manner, the attachment portion 6100 can pop and/or snap from the detached state to the attached state. Furthermore, the attachment portion 6100 can be configured to move from the attached state toward the detached state in response to leverage. These and other features of processes for moving the attachment portion 6100 between the attached and detached states as well as structures of the attachment portion 6100 and the securing member 6200 associated with these features are further discussed below with reference to FIGS. 61-63B.

In at least some cases, the attachment portion 6100 and the securing member 6200 are symmetrical about an occlusogingival plane P that bisects the attachment portion 6100 and the securing member 6200 at an occlusogingival midline when the attachment portion 6100 is in the attached state. In FIGS. 61-63B, symmetrical features of the attachment portion 6100 and the securing member 6200 at a distal side of the occlusogingival plane P are assigned a reference number with no apostrophe whereas symmetrical features at a mesial side of the occlusogingival plane P are assigned a reference number with an apostrophe. In the discussion of FIGS. 61-63B below, the symmetrical features at the distal side of the occlusogingival plane P may be referred to as "distal" whereas the symmetrical features at the mesial side of the occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth. Also, "occlusal" and "gingival" features can be occlusal and gingival, respectively, when the appliance is installed in the illustrated orientation or be gingival and occlusal, respectively, when the appliance is installed in an opposite orientation rotated 180 degrees about a buccolingual axis relative to the illustrated orientation.

Referring to FIG. 61, the attachment portion 6100 can comprise a head 6102. In some embodiments, the attachment portion 6100 comprises a head 6102 and at least a portion of the connector 6103 that is continuous with the head 6102. The connector 6103, for example, can comprise a second connector as previously described herein and/or can extend gingivally away from a gingival portion of the head 6102. The connector 6103 can have features similar to any of the connectors disclosed herein (e.g., first connectors, second connectors, third connectors, etc.) and can comprise a single connector or multiple connectors. For example, the connector 6103 can comprise a single, occlusogingivally extending connector (as shown in FIG. 61), multiple occlusogingivally extending connectors, one or more occlusogingivally extending connectors and one or more mesiodistally extending connectors branching off of the one or more occlusogingivally extending connectors and/or the attachment portion 6100, or one or more mesiodistally extending connectors (and no occlusogingivally extending connectors). Accordingly, the attachment portion 6100 can be connected to a single connector or to multiple connectors also referred to herein as a connector 6103. The connector 6103 can connect to the head 6102 at a variety of locations. For example, a gingivally extending connector can connect to a gingival portion of the head 6102. Any connector 6103 disclosed herein can extend away from the head 6102 along a variety of dimensions (e.g., along an occlusogingival dimension, a mesiodistal dimension, a buccolingual dimension, etc.).

The head 6102 can have a front surface (facing out of the page) and a back surface (not visible in FIG. 61), and a thickness t (labeled in FIG. 63A) measured between the front and back surfaces. In some embodiments, the head 6102 and the connector 6103 are part of the same, monolithic piece of material (e.g., cut from a sheet of material, a 3D-printed piece, etc.). Thus, the head 6102 and the connector 6103 may refer to different portions of the same continuous component. The attachment portion 6100 can be one portion of a greater orthodontic appliance, or may be formed separately and attached to an orthodontic appliance. The attachment portion 6100 and/or the corresponding appliance can be cut from the same sheet of material and/or may be formed by molding, casting, machining, 3D printing, stamping, extruding, or the like. The attachment portion 6100 may comprise a metal or a plastic and may have superelastic and/or shape memory properties. In some embodiments, the attachment portion 6100 does not have superelastic and/or shape memory properties.

As parts of the head 6102, the attachment portion 6100 can comprise various structures associated with one or more functional objectives. These functional objectives can include establishing and maintaining a secure connection between the attachment portion 6100 and the securing member 6200 when the attachment portion 6100 is in the attached state, establishing and maintaining efficient transfer of orthodontic force from the appliance to the tooth via the attachment portion 6100 and the securing member 6200 when the attachment portion 6100 is in the attached state, allowing convenient movement of the attachment portion 6100 from the attached state to the detached state, allowing convenient movement of the attachment portion 6100 from the detached state to the attached state, and providing a tactile indication of movement of the attachment portion 6100 to the attached state, among others.

With reference to FIG. 61, the attachment portion 6100 at the head 6102 can comprise a centrally positioned base 6104 and distal and mesial arms 6106, 6106' extending distally and mesially, respectively, from the base 6104. The attachment portion 6100 can further include distal and mesial branches 6107, 6107' extending gingivally from the arms 6106, 6106', respectively. The base 6104 can comprise an elongate member forming a closed loop and extending along a longitudinal axis L1 from a first end portion 6128*a* to a second end portion 6128*b*. Starting at the first end portion 6128*a* and extending along the longitudinal axis L1 to the second end portion 6128*b*, the base 6104 can include a gingivally located first base region 6104*a*, a second base region 6104*b* continuous with and extending occlusally from the first base region 6104*a*, an occlusally located third base region 6104*c* continuous with and extending mesially from the second base region 6104*b*, and a fourth base region 6104*d* continuous with and extending gingivally from the third base region 6104*c*. The base 6104 can at least partially enclose and define an opening 6130 and can comprise an interior surface 6125 at the opening 6130 and an exterior surface 6127 spaced apart from the opening 6130. In at least some cases, the opening 6130 is sized to receive a tool to facilitate securing the attachment portion 6100 to the securing member 6200.

The distal arm 6106 can comprise an elongate member extending along a longitudinal axis L2 from a first end portion 6126*a* to a second end portion 6126*b*. Starting at the first end portion 6126*a* and extending along the longitudinal axis L2 to the second end portion 6126*b*, the distal arm 6106 can include a first arm region 6106*a* continuous with and extending distally from the third base region 6104*c*, a second arm region 6106*b* continuous with and extending occlusally from the first arm region 6106*a*, and a third arm region 6106*c* continuous with and extending mesially from the second arm region 6106*b*. The distal arm 6106 can partially enclose and define an interior region 6122 and can comprise an interior surface 6118 at the interior region 6122 and an exterior surface 6119 spaced apart from the interior region 6122. The mesial arm 6106' can include features as described for the distal arm 6106 but mirrored about the occlusogingival plane P. Together, the interior regions 6122, 6122' can form a slot shaped to receive a tool used to move the attachment portion 6100 from the attached state toward the detached state.

The distal branch 6107 can comprise an elongate member extending along a longitudinal axis L3 from a first end portion 6108*a* to a second end portion 6108*b*. Starting at the first end portion 6108*a* and extending along the longitudinal axis L3 to the second end portion 6108*b*, the distal branch 6107 can include a first branch region 6107*a* continuous with and extending gingivally from the first arm region 6106*a* and a second branch region 6107*b* continuous with and extending distally from the first branch region 6107*a*. The mesial branch 6107' can include features as described for the distal branch 6107 but mirrored about the occlusogingival plane P.

The base 6104 can have a width w1 measured between the interior surface 6125 and the exterior surface 6127. Similarly, the arms 6106, 6106' can have respective widths w2, w2' measured between the respective interior surfaces 6118, 6118' and exterior surfaces 6119, 6119'. The branches 6107, 6107' can have respective widths w3, w3' perpendicular to the longitudinal axes L3, L3'. The base 6104, arms 6106, 6106', and/or branches 6107, 6107' can have a substantially constant thickness or may have a varying thickness. Likewise, the base 6104, arms 6106, 6106', and/or branches 6107, 6107' can have a substantially constant width or may have a varying width. A width and/or thickness of the base 6104, arms 6106, 6106', and/or branches 6107, 6107' can be varied, for example, to impart a preferred stiffness profile to all or a portion of the base 6104, arms 6106, 6106', and/or branches 6107, 6107'. Furthermore, the branches 6107, 6107' can include a plurality of bends along the respective longitudinal axes L3, L3' that are configured to preferentially flex to facilitate securing and/or release of the attachment portion 6100 to a securing member. Gaps 6148, 6148' between the first branch regions 6107*a*, 6107'*a* and the base 6104, respectively, can accommodate mesiodistal movement of the branches 6107, 6107' toward one another in connection with this flexing.

According to various embodiments, one or more regions of the branches 6107, 6107' can include a portion along which the width w3, w3' is greater than at other portions. For example, as shown in FIG. 61, a distalmost portion of the second region 6107*b* of the branch 6107 can include first and second ramped surfaces 6117 and 6114 that meet at an apex 6121. The second ramped surface 6114 and a portion of the exterior surface 6119 of the arm 6106 at a connection between the first and second arm regions 6106*a*, 6106*b* can comprise respective shoulders that are configured to engage portions of a protrusion of the securing member 6200 when the attachment portion 6100 is secured to the securing member 6200 to oppose rotational and/or translational movement of the arm 6106. As described in greater detail below, the first ramped surface 6117 can be configured to force the branch 6107 to bend or rotate (e.g., at the second branch region 6107*b*, etc.) when engaging a protrusion of the securing member 6200 as the attachment portion 6100 moves from the detached state toward the attached state. In addition or alternatively, the second ramped surface 6114 can be configured to force the branch 6107 to bend or rotate (e.g., at the second branch region 6106*b*, etc.) when engaging a protrusion of the securing member 6200 as the attachment portion 6100 moves from the attached state toward the detached state. The mesial branch 6107' can include first and second ramped surfaces 6117' and 6114' and associated features as described for the distal branch 6107' but mirrored about the occlusogingival plane P.

Figure 62:
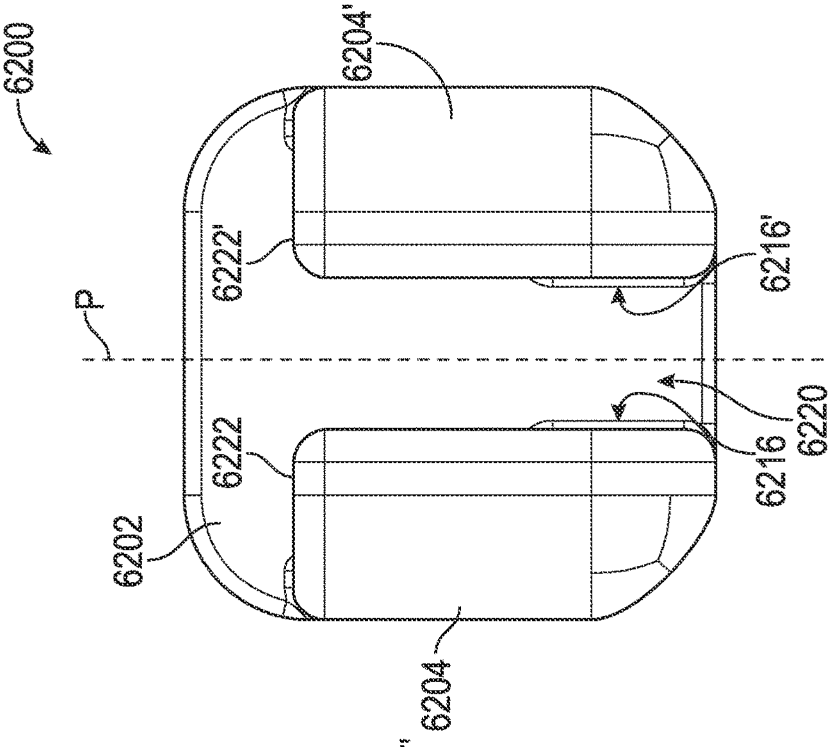
FIG. 62 is a front view of a securing member configured in accordance with several embodiments of the present technology.

FIG. 62 is a front view of the securing member 6200 configured for use with the attachment portion 6100. The securing member 6200 has a first side (facing out of the page) and a second side (not visible in FIG. 62) opposite the first side along a thickness of the securing member 6200 and configured to be bonded to a patient's tooth. The securing member 6200 can comprise a backing 6202 and distal and mesial protrusions 6204, 6204' carried by and extending away from the first side of the backing 6202 along a buccolingual dimension. The protrusions 6204, 6204' can be configured to engage the attachment portion 6100 and to retain the attachment portion 6100 at a specific location relative to the backing 6202 and the patient's tooth. Furthermore, as discussed below, the protrusions 6204, 6204' can be configured to support a lever used to move the attachment portion 6100 from the attached state toward the detached state.

Portions of the protrusions 6204, 6204' closest to the backing 6202 can be configured to engage portions of the attachment portion 6100 to prevent or limit motion of the attachment portion 6100 in an occlusogingival dimension when the attachment portion 6100 is in the attached state. The securing member 6200 at the protrusion 6204 can define a recess 6206 in which the distalmost portion of the second region 6107*b* of the branch 6107 is seated when the attachment portion 6100 is in the attached state. The securing member 6200 at the recess 6206 can include a first securing surface 6208 that, together with the second ramped surface 6114 of the branch 6107 of the attachment portion 6100 (as a second securing surface) conformably restricts occlusal movement of the attachment portion 6100 relative to the securing member 6200 when the attachment portion 6100 is in the attached state. The securing member 6200 at the protrusion 6204 can also define a lip 6224 that (as a third securing surface) together with a portion of the exterior surface 6119 of the arm 6106 at a connection between the first and second arm regions 6106*a*, 6106*b* (as a fourth securing surface) conformably restricts gingival movement of the attachment portion 6100 relative to the securing member 6200 when the attachment portion 6100 is in the attached state. The mesial protrusion 6204' can define a recess a 6206', a lip 6224', and other features as described for the distal protrusion 6204 but mirrored about the occlusogingival plane P.

In some embodiments, the protrusion 6204 has a first region extending lingually (or buccally, depending on which side of the tooth the securing member 6200 is attached) away from the backing 6202 and a second region extending away from the first region towards the occlusogingival plane P and spaced apart from the backing 6202 by a gap along the buccolingual dimension. This gap can have a depth that is slightly greater than a thickness t of the attachment portion 6100 so that the attachment portion 6100 can fit between the second region of the protrusion 6204 and the backing 6202. The second region of the protrusion 6204 can include an inner surface (not visible) facing towards the backing 6202 and configured to prevent or limit lingual (or buccal) movement of the attachment portion 6100. The first region of the protrusion 6204 can include an inner surface 6216 (only visible in FIG. 63B) configured to engage the second base region 6104*b* of the attachment portion 6100 and prevent or limit mesial or distal movement of the attachment portion 6100. In at least some cases, the inner surface 6216 of the protrusion 6204 and the exterior surface 6127 of the second base region 6104*b* of the attachment portion 6100 are primary force-transferring surfaces through which active and/or retentive orthodontic force is transferred to the tooth. In addition or alternatively, other surfaces of the securing member 6200 and the attachment portion 6100 that contact one another when the attachment portion 6100 is in the attached state can serve as force-transferring surfaces. The mesial protrusion 6204' can include features as described for the distal protrusion 6204 but mirrored about the occlusogingival plane P.

Figure 63B:
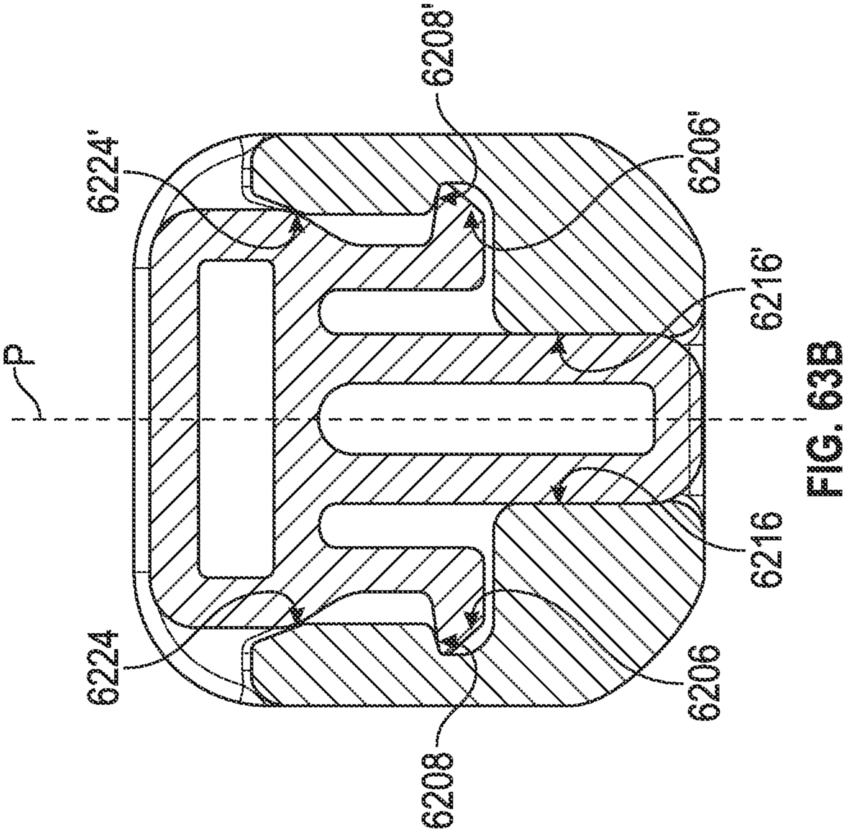
FIGS. 63A and 63B are different views of an attachment portion secured to a securing member in accordance with several embodiments of the present technology.
Figure 63A:
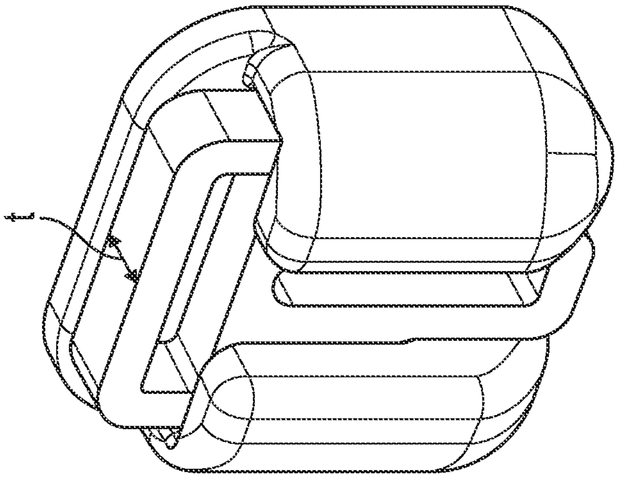

The protrusions 6204, 6204' can be spaced apart from one another by a gap 6220 along the mesiodistal dimension. The gap 6220 can be sized to at least partially receive a portion of the base 6104 and/or a portion of the connector 6103 connected to the head 6102 of the attachment portion 6100. Referring to FIGS. 63A and 63B, in the secured state, the attachment portion 6100 can be positioned proximate and/or against the backing 6202 of the securing member 6200 and bound between the protrusions 6204, 6204'. The connector 6103 can also be positioned between the protrusions 6204, 6204' (e.g., within the gap 6220). Additionally or alternatively, the distal arm 6106 can be positioned buccolingually between the distal protrusion 6204 and the backing 6202 and the mesial arm 6106' can be positioned buccolingually between the mesial protrusion 6204' and the backing 6202. The attachment portion 6100 can comprise a resilient and/or superelastic material such that, when the attachment portion 6100 is braced between the protrusions 6204, 6204', the attachment portion 6100 actively exerts an outward force on the surrounding surfaces. For example, the exterior surfaces 6119, 6119' of the arms 6106, 6106' can abut and press distally and gingivally against the protrusions 6204, 6204' via the lips 6224, 6224'.

In the secured position, the attachment portion 6100 can be releasably secured to the securing member 6200 such that it cannot be inadvertently displaced or prematurely or inadvertently released by typical patient activity (such as chewing). The attachment portion 6100 (or one or more portions thereof) can be configured to press outwardly on the securing member 6200 when in the secured position. Active and/or continuous outward force exerted by the attachment portion 6100 on the securing member 6200 can advantageously eliminate or reduce play between the attachment portion 6100 and the securing member 6200 along a mesiodistal dimension, an occlusogingival dimension, and/or a buccolingual dimension, thus providing a more accurate and efficient transfer of force from the appliance to the tooth. In some embodiments, the attachment portion 6100 (or one or more portions thereof) does not chronically press outwardly on the securing member 6200 and is instead configured to engage the securing member 6200 if the attachment portion 6100 moves into contact with and/or moves such that it exerts a force on one or more portions of the securing member 6200. Thus, the securing member 6200 can be configured to limit movement of the attachment portion 6100 relative to the securing member 6200. In some embodiments, one or more of the securing surfaces is configured for transferring orthodontic force between the attachment portion 6100 (e.g., to and/or from the connector 6103, to and/or from the rest of the appliance, etc.) and the securing member 6200 (e.g., to and/or from the tooth, etc.). In various embodiments, one or more of the securing surfaces does not substantially transfer orthodontic force between the attachment portion 6100 and the securing member 6200.

The attachment portion 6100 of FIGS. 61, 63A and 63B can be secured to the securing member 6200 by positioning the attachment portion 6100 proximate the securing member 6200 and moving the attachment portion 6100 along an occlusogingival path. The connector 6103 and/or other portion of the appliance continuous with the head 6102 of the attachment portion 6100 can be positioned relative to the securing member 6200 such that at least a portion of the head 6102 is positioned occlusally of the protrusions 6204, 6204' of the securing member 6200 and/or at, near, and/or occlusally of an occlusal edge of the backing 6202. The portion of the connector 6103 connected to the head 6102 can be positioned within the mesiodistal gap 6220 between the protrusions 6204, 6204' of the securing member 6200. In some embodiments, the back surface of the attachment portion 6100 can be positioned proximate and/or in contact with the backing 6202 of the securing member 6200. In some embodiments, an operator slides the connector 6103 and head 6102 occlusogingivally by positioning a tool (e.g., tool 800 in FIG. 8) within the opening 6130 and moving the tool occlusogingivally. The tool can contact the first base region 6104*a* when sliding the tool gingivally to insert the attachment portion 6100. Continued gingival movement of the connector 6103 and/or head 6102 can force the first ramped surfaces 6117, 6117' into contact with the protrusions 6204, 6204', respectively. Because of the shapes and positions of the first ramped surfaces 6117, 6117', occlusogingival force applied to the branches 6107, 6107' along the first ramped surfaces 6117, 6117' can force the branches 6107, 6107' to bend mesiodistally. Once the apexes 6121, 6121' reach the recesses 6206, 6206', the branches 6107, 6107' can bend back towards their shapes in the relaxed state, thereby wedging the attachment portion 6100 between the protrusions 6204, 6204' as shown in FIGS. 63A and 63B.

The attachment portion 6100 can comprise distal and mesial flexures 6132, 6132' configured to bend and/or otherwise deform to facilitate securing of the attachment portion 6100 to the securing member 6200. In some embodiments, the flexures 6132, 6132' comprise all or portions of the first branch regions 6107*a*, 6107'*a*. The first branch regions 6107*a*, 6107'*a*, for example, can be configured to bend in a first direction to facilitate or enable sliding of the attachment portion 6100 gingivally to secure to the securing member 6200 and/or the first branch regions 6107*a*, 6107'*a* can be configured to bend in a second, opposite direction to facilitate or enable locking of the attachment portion 6100 to the securing member 6200. In some embodiments, deformation of the flexures 6132, 6132' causes one or more portions of the attachment portion 6100 to rotate (e.g., bending of the first branch regions 6107*a*, 6107'*a* can cause the second branch regions 6107*b*, 6107'*b* to rotate about the buccolingual dimension). Moreover, the flexures 6132, 6132' can comprise other regions of the attachment portion 6100 in addition to or instead of the first branch regions 6107*a*, 6107'*a*. In the illustrated embodiment, deformation of the flexures 6132, 6132' while moving the attachment portion 6100 from the detached state to the attached state is primarily a mesiodistal dimension. In other embodiments, this deformation can be primarily in a buccolingual dimension and/or equally in mesiodistal and buccolingual dimensions. In any of these cases, the deformation can also be occlusogingival.

To release the attachment portion 6100 from the securing member 6200, the attachment portion 6100 can be configured to deform and/or rotate relative to the securing member 6200. For example, an operator can insert a tool, such as the distal end surface 808 of the tool 800 (FIG. 8), into the interior regions 6122, 6122' defined by the arms 6106, 6106'. An occlusal end of the tool surface can be positioned proximate the interior surfaces 6118, 6118' of the arms 6106, 6106' along the third arm regions 6106*c*, 6106'*c*. The portions of the interior surfaces 6118, 6118' that contact the tool can serve as leveraging surfaces through which the tool exerts leverage on the attachment portion 6100. For example, the securing member 6200 can include distal and mesial fulcrums 6222, 6222' at the protrusions 6204, 6204' that support the tool while the tool exerts the leveraging force on the attachment portion 6100. In at least some embodiments, the leveraging surfaces together and the slot formed by the interior regions 6122, 6122' are elongate with lengths substantially perpendicular (e.g., within degrees of perpendicular) to an occlusogingival axis. This can dictate horizontal positioning of the distal end surface 808 of the tool 800 to increase contact between the tool and the attachment portion 6100.

The operator can rotate the tool about a mesiodistal dimension while supported by the fulcrums 6222, 6222'. Accordingly, the tool can act as a lever. Leverage from the tool exerted on the attachment portion 6100 via the leveraging surface can forcefully move the attachment portion

6100 occlusally such that sliding contact between the second ramped surfaces 6114, 6114' and the inner surfaces 6216, 6216' of the protrusions 6204, 6204' causes the flexures 6132, 6132' to resiliently deform in a mesiodistal dimension sufficiently to allow the distalmost and mesialmost portions, respectively, of the second branch regions 6107*b*, 6107'*b* of the branches 6107, 6107' to exit the recesses 6206, 6206'. In connection with this deformation, the gaps 6148, 6148' can at least partially close. In some embodiments, the attachment portion 6100 pops and/or snaps free of the securing member 6200 once the distalmost and mesialmost portions, respectively, of the second branch regions 6107*b*, 6107'*b* clear the inner surfaces 6216, 6216' of the protrusions 6204, 6204' and the gaps 6148, 6148' at least partially open. With or without the tool, the attachment portion 6100 can then be pulled away from the backing 6202 along the buccolingual dimension.

The use of leverage (e.g., by incorporation of the fulcrums 6222, 6222' into the protrusions 6204, 6204') can allow the practical application of greater occlusal force to the attachment portion 6100 than would otherwise be possible. Accordingly, the second ramped surfaces 6114, 6114' and the first securing surfaces 6208, 6208' can be closer to perpendicular to the occlusogingival plane P than the first ramped surfaces 6117, 6117'. This can be useful, for example, because the second ramped surfaces 6114, 6114' may act as second securing surfaces limiting occlusal movement of the attachment portion 6100 relative to the securing member 6200 in addition to acting as surfaces that transfer occlusogingival force from the lever into mesiodistal force that resiliently deforms the flexures 6132, 6132' during the detaching process. In contrast, the exterior surfaces 6119, 6119' of the arms together with the lips 6224, 6224' can limit gingival movement of the attachment portion 6100 relative to the securing member 6200, thereby reducing or eliminating any need for the first ramped surfaces 6117, 6117' to perform this function.

The location at which the connector 6103 connects to the head 6102, a dimension along which the connector 6103 extends, a property of the connector 6103, etc. can be at least partially based on a force to be imparted on a tooth to which the attachment portion 6100 is configured to be secured (and/or an intended movement of the tooth). For example, as previously noted, movement of the attachment portion 6100 between the attached state to the detached state can include movement of the branches 6107, 6107' in a mesiodistal dimension. Thus, to avoid any movement of a connector 6103 unintentionally causing the attachment portion 6100 to move toward the detached state during treatment and/or to avoid inhibiting useful movement of the branches 6107, 6107' related to attaching and/or detaching processes, the connector 6103 can connect to a portion of the attachment portion 6100 away from the branches 6107, 6107' and in particular a location that would not cause movement of the branches 6107, 6107' in any way that is biased towards disengagement from the securing member 6200. In some cases, for example as shown in FIG. 61, the connector 6103 is continuous with the base 6104 or the arms 6106, 6106' but not the branches 6107, 6107'. Such a configuration can prevent or limit the connector 6103 from applying forces to the branches 6107, 6107' that inadvertently cause the flexures 6132, 6132' to deform during orthodontic treatment. The location at which the connector 6103 connects to the head 6102, a dimension along which the connector 6103 extends, a property of the connector 6103, etc. can at least partially be based on the mechanism by which the attachment portion 6100 is attached to and/or detached from the securing member 6200 and/or the geometry of the securing member 6200.

Figure 64:
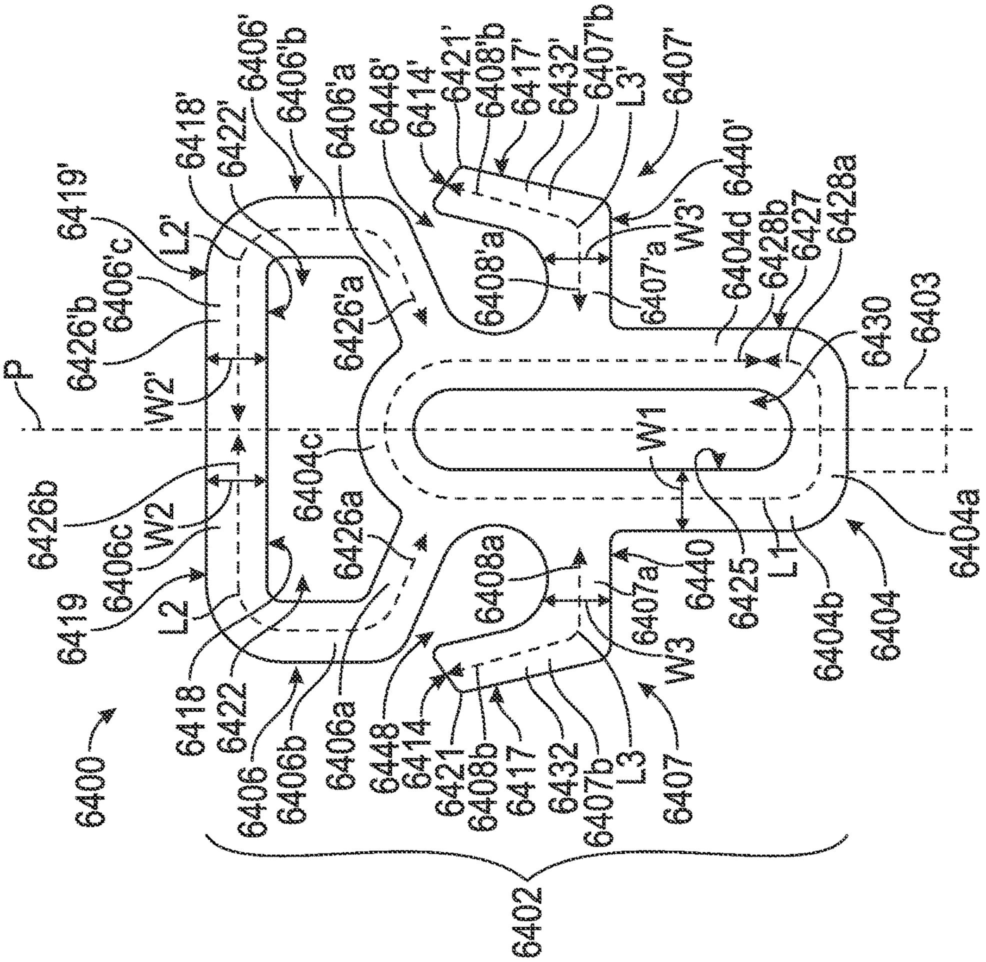
FIG. 64 is a front view of an attachment portion configured in accordance with several embodiments of the present technology.

FIG. 64 shows a planar view of an attachment portion 6400 configured in accordance with several embodiments of the present technology. The attachment portion 6400 can be configured to be secured to a patient's tooth via a securing member, such as securing member 6500 shown in FIG. 65. The attachment portion 6400 and the securing member 6500 are shown in a secured arrangement in FIGS. 66A and 66B. As discussed in greater detail below, the attachment portion 6400 and the securing member 6500 can be configured such that the attachment portion 6400 can be releasably secured to the securing member 6500. The attachment portion 6400 can be continuous with a connector 6403 that connects the attachment portion 6400 to one or more additional portions (not shown) of the overall orthodontic appliance. The attachment portion 6400 can have an attached state in which the orthodontic appliance exerts active and/or retentive orthodontic force (e.g., from a biasing portion (not shown) of the orthodontic appliance) on the tooth via the connector 6403, the attachment portion 6400, and the securing member 6500. Correspondingly, the attachment portion 6400 can have a detached state in which the orthodontic appliance is operably disconnected from the securing member 6500.

The attachment portion 6400 can be configured to move from the detached state to the attached state in response to relative movement between the attachment portion 6400 and the securing member 6500 in an occlusogingival dimension. This relative movement and/or another action can cause the attachment portion 6400 to resiliently deform and then at least partially return to its original form. In this or another manner, the attachment portion 6400 can pop and/or snap from the detached state to the attached state. Furthermore, the attachment portion 6400 can be configured to move from the attached state toward the detached state in response to leverage. These and other features of processes for moving the attachment portion 6400 between the attached and detached states as well as structures of the attachment portion 6400 and the securing member 6500 associated with these features are further discussed below with reference to FIGS. 64-66B.

In at least some cases, the attachment portion 6400 and the securing member 6500 are symmetrical about an occlusogingival plane P that bisects the attachment portion 6400 and the securing member 6500 at an occlusogingival midline when the attachment portion 6400 is in the attached state. In FIGS. 64-66B, symmetrical features of the attachment portion 6400 and the securing member 6500 at a distal side of the occlusogingival plane P are assigned a reference number with no apostrophe whereas symmetrical features at a mesial side of the occlusogingival plane P are assigned a reference number with an apostrophe. In the discussion of FIGS. 64-66B below, the symmetrical features at the distal side of the occlusogingival plane P may be referred to as "distal" whereas the symmetrical features at the mesial side of the occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth. Also, "occlusal" and "gingival" features can be occlusal and gingival, respectively, when the appliance is installed in the illustrated orientation or be gingival and occlusal, respectively, when the appliance is installed in an opposite orientation rotated 180 degrees about a buccolingual axis relative to the illustrated orientation.

Referring to FIG. 64, the attachment portion 6400 can comprise a head 6402. In some embodiments, the attachment portion 6400 comprises a head 6402 and at least a portion of the connector 6403 that is continuous with the head 6402. The connector 6403, for example, can comprise a second connector as previously described herein and/or can extend gingivally away from a gingival portion of the head 6402. The connector 6403 can have features similar to any of the connectors disclosed herein (e.g., first connectors, second connectors, third connectors, etc.) and can comprise a single connector or multiple connectors. For example, the connector 6403 can comprise a single, occlusogingivally extending connector (as shown in FIG. 64), multiple occlusogingivally extending connectors, one or more occlusogingivally extending connectors and one or more mesiodistally extending connectors branching off of the one or more occlusogingivally extending connectors and/or the attachment portion 6400, or one or more mesiodistally extending connectors (and no occlusogingivally extending connectors). Accordingly, the attachment portion 6400 can be connected to a single connector or to multiple connectors also referred to herein as a connector 6403. The connector 6403 can connect to the head 6402 at a variety of locations. For example, a gingivally extending connector can connect to a gingival portion of the head 6402. Any connector 6403 disclosed herein can extend away from the head 6402 along a variety of dimensions (e.g., along an occlusogingival dimension, a mesiodistal dimension, a buccolingual dimension, etc.).

The head 6402 can have a front surface (facing out of the page) and a back surface (not visible in FIG. 64), and a thickness t (labeled in FIG. 66A) measured between the front and back surfaces. In some embodiments, the head 6402 and the connector 6403 are part of the same, monolithic piece of material (e.g., cut from a sheet of material, a 3D-printed piece, etc.). Thus, the head 6402 and the connector 6403 may refer to different portions of the same continuous component. The attachment portion 6400 can be one portion of a greater orthodontic appliance, or may be formed separately and attached to an orthodontic appliance. The attachment portion 6400 and/or the corresponding appliance can be cut from the same sheet of material and/or may be formed by molding, casting, machining, 3D printing, stamping, extruding, or the like. The attachment portion 6400 may comprise a metal or a plastic and may have superelastic and/or shape memory properties. In some embodiments, the attachment portion 6400 does not have superelastic and/or shape memory properties.

As parts of the head 6402, the attachment portion 6400 can comprise various structures associated with one or more functional objectives. These functional objectives can include establishing and maintaining a secure connection between the attachment portion 6400 and the securing member 6500 when the attachment portion 6400 is in the attached state, establishing and maintaining efficient transfer of orthodontic force from the appliance to the tooth via the attachment portion 6400 and the securing member 6500 when the attachment portion 6400 is in the attached state, allowing convenient movement of the attachment portion 6400 from the attached state to the detached state, allowing convenient movement of the attachment portion 6400 from the detached state to the attached state, and providing a tactile indication of movement of the attachment portion 6400 to the attached state, among others.

With reference to FIG. 64, the attachment portion 6400 at the head 6402 can comprise a centrally positioned base 6404 and distal and mesial arms 6406, 6406' extending distally and mesially, respectively, from the base 6404. The attachment portion 6400 can further include distal and mesial branches 6407, 6407' also extending distally and mesially, respectively, from the base 6404. The base 6404 can comprise an elongate member forming a closed loop and extending along a longitudinal axis L1 from a first end portion 6428*a* to a second end portion 6428*b*. Starting at the first end portion 6428*a* and extending along the longitudinal axis L1 to the second end portion 6428*b*, the base 6404 can include a gingivally located first base region 6404*a*, a second base region 6404*b* continuous with and extending occlusally from the first base region 6404*a*, an occlusally located third base region 6404*c* continuous with and extending mesially from the second base region 6404*b*, and a fourth base region 6404*d* continuous with and extending gingivally from the third base region 6404*c*. The base 6404 can at least partially enclose and define an opening 6430 and can comprise an interior surface 6425 at the opening 6430 and an exterior surface 6427 spaced apart from the opening 6430. In at least some cases, the opening 6430 is sized to receive a tool to facilitate securing the attachment portion 6400 to the securing member 6500.

The distal arm 6406 can comprise an elongate member extending along a longitudinal axis L2 from a first end portion 6426*a* to a second end portion 6426*b*. Starting at the first end portion 6426*a* and extending along the longitudinal axis L2 to the second end portion 6426*b*, the distal arm 6406 can include a first arm region 6406*a* continuous with and extending distally and occlusally from the third base region 6404*c*, a second arm region 6406*b* continuous with and extending occlusally from the first arm region 6406*a*, and a third arm region 6406*c* continuous with and extending mesially from the second arm region 6406*b*. The distal arm 6406 can partially enclose and define an interior region 6422 and can comprise an interior surface 6418 at the interior region 6422 and an exterior surface 6419 spaced apart from the interior region 6422. The mesial arm 6406' can include features as described for the distal arm 6406 but mirrored about the occlusogingival plane P. Together, the interior regions 6422, 6422' can form a slot shaped to receive a tool used to move the attachment portion 6400 from the attached state toward the detached state.

The distal branch 6407 can comprise an elongate member extending along a longitudinal axis L3 from a first end portion 6408*a* to a second end portion 6408*b*. Starting at the first end portion 6408*a* and extending along the longitudinal axis L3 to the second end portion 6408*b*, the distal branch 6407 can include a first branch region 6407*a* continuous with and extending distally from the second base region 6404*b* and a second branch region 6407*b* continuous with and extending occlusally and distally from the first branch region 6407*a*. The mesial branch 6407' can include features as described for the distal branch 6407 but mirrored about the occlusogingival plane P.

The base 6404 can have a width w1 measured between the interior surface 6425 and the exterior surface 6427. Similarly, the arms 6406, 6406' can have respective widths w2, w2' measured between the respective interior surfaces 6418, 6418' and exterior surfaces 6419, 6419'. The branches 6407, 6407' can have respective widths w3, w3' perpendicular to the longitudinal axes L3, L3'. The base 6404, arms 6406, 6406', and/or branches 6407, 6407' can have a substantially constant thickness or may have a varying thickness. Likewise, the base 6404, arms 6406, 6406', and/or branches 6407, 6407' can have a substantially constant width or may have a varying width. A width and/or thickness of the base 6404, arms 6406, 6406', and/or branches 6407, 6407' can be varied, for example, to impart a preferred stiffness profile to all or a portion of the base 6404, arms 6406, 6406', and/or branches 6407, 6407'. Furthermore, the branches 6407, 6407' can include a plurality of bends along the respective longitudinal axes L3, L3' that are configured to preferentially flex to facilitate securing and/or release of the attachment portion 6400 to a securing member. Gaps 6448, 6448' between the second branch regions **6407*b*, 6407'*b* and the first arm regions 6406*a*, 6406'*a*, respectively, can accommodate mesiodistal movement of the branches 6407, 6407'** toward one another in connection with this flexing.

According to various embodiments, one or more regions of the branches 6407, 6407' can include a portion along which the width w3, w3' is greater than at other portions. For example, as shown in FIG. 64, a distalmost portion of the second region **6407*b* of the branch 6407 can include first and second ramped surfaces 6417 and 6414 that meet at an apex 6421. The first and second ramped surfaces 6417 and 6414 can be configured to engage portions of a protrusion of the securing member 6500 when the attachment portion 6400 is secured to the securing member 6500 to oppose rotational and/or translational movement of the arm 6406. As described in greater detail below, the first ramped surface 6417 can be configured to force the branch 6407 to bend or rotate (e.g., at the second branch region 6407*b*, etc.) when engaging a protrusion of the securing member 6500 as the attachment portion 6400 moves from the detached state toward the attached state. In addition or alternatively, the second ramped surface 6414 can be configured to force the branch 6407 to bend or rotate (e.g., at the second branch region 6406*b*, etc.) when engaging a protrusion of the securing member 6500 as the attachment portion 6400 moves from the attached state toward the detached state. Furthermore, at the gingival side of the first branch portion 6507*a*, the exterior surface of the branch 6407 can form a ledge 6440 configured to engage a portion of a protrusion of the securing member 6500 when the attachment portion 6400 is secured to the securing member 6500 to oppose rotational and/or translational movement of the arm 6406. The mesial branch 6407' can include first and second ramped surfaces 6417' and 6414', a ledge 6440', and associated features as described for the distal branch 6407'** but mirrored about the occlusogingival plane P.

Figure 65:
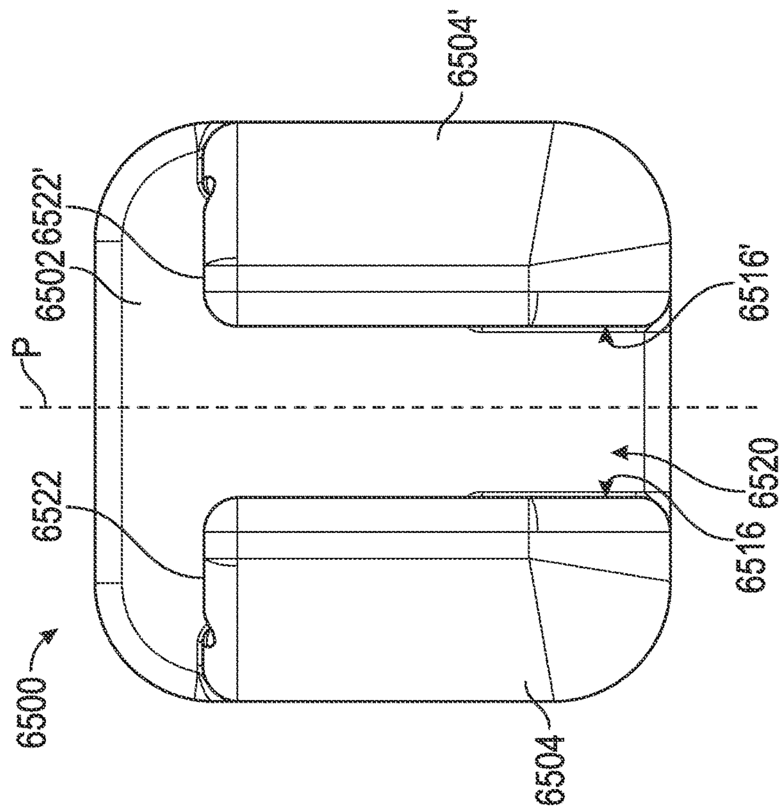
FIG. 65 is a front view of a securing member configured in accordance with several embodiments of the present technology.

FIG. 65 is a front view of the securing member 6500 configured for use with the attachment portion 6400. The securing member 6500 has a first side (facing out of the page) and a second side (not visible in FIG. 65) opposite the first side along a thickness of the securing member 6500 and configured to be bonded to a patient's tooth. The securing member 6500 can comprise a backing 6502 and distal and mesial protrusions 6504, 6504' carried by and extending away from the first side of the backing 6502 along a buccolingual dimension. The protrusions 6504, 6504' can be configured to engage the attachment portion 6400 and to retain the attachment portion 6400 at a specific location relative to the backing 6502 and the patient's tooth. Furthermore, as discussed below, the protrusions 6504, 6504' can be configured to support a lever used to move the attachment portion 6400 from the attached state toward the detached state.

Portions of the protrusions 6504, 6504' closest to the backing 6502 can be configured to engage portions of the attachment portion 6400 to prevent or limit motion of the attachment portion 6400 in an occlusogingival dimension when the attachment portion 6400 is in the attached state. The securing member 6500 at the protrusion 6504 can define a recess 6506 in which the distalmost portion of the second region **6407*b* of the branch 6407 is seated when the attachment portion 6400 is in the attached state. The securing member 6500 at the recess 6506 can include a first securing surface 6508 that, together with the second ramped surface 6414 of the branch 6407 of the attachment portion 6400 (as a second securing surface) conformably restricts occlusal movement of the attachment portion 6400 relative to the securing member 6500 when the attachment portion 6400 is in the attached state. The securing member 6500 at the protrusion 6504 can also define a ledge 6510 that (as a third securing surface) together with the ledge 6140 (as a fourth securing surface) conformably restricts gingival movement of the attachment portion 6400 relative to the securing member 6500 when the attachment portion 6400 is in the attached state. The mesial protrusion 6504' can define a recess a 6506', a ledge 6510', and other features as described for the distal protrusion 6504** but mirrored about the occlusogingival plane P.

In some embodiments, the protrusion 6504 has a first region extending lingually (or buccally, depending on which side of the tooth the securing member 6500 is attached) away from the backing 6502 and a second region extending away from the first region towards the occlusogingival plane P and spaced apart from the backing 6502 by a gap along the buccolingual dimension. This gap can have a depth that is slightly greater than a thickness t of the attachment portion 6400 so that the attachment portion 6400 can fit between the second region of the protrusion 6504 and the backing 6502. The second region of the protrusion 6504 can include an inner surface (not visible) facing towards the backing 6502 and configured to prevent or limit lingual (or buccal) movement of the attachment portion 6400. The first region of the protrusion 6504 can include an inner surface 6516 (only visible in FIG. 66B) configured to engage the second base region **6404*b* of the attachment portion 6400 and prevent or limit mesial or distal movement of the attachment portion 6400. In at least some cases, the inner surface 6516 of the protrusion 6504 and the exterior surface 6427 of the second base region 6404*b* of the attachment portion 6400 are primary force-transferring surfaces through which active and/or retentive orthodontic force is transferred to the tooth. In addition or alternatively, other surfaces of the securing member 6500 and the attachment portion 6400 that contact one another when the attachment portion 6400 is in the attached state can serve as force-transferring surfaces. The mesial protrusion 6504' can have features as described for the distal protrusion 6504** but mirrored about the occlusogingival plane P.

Figure 66B:
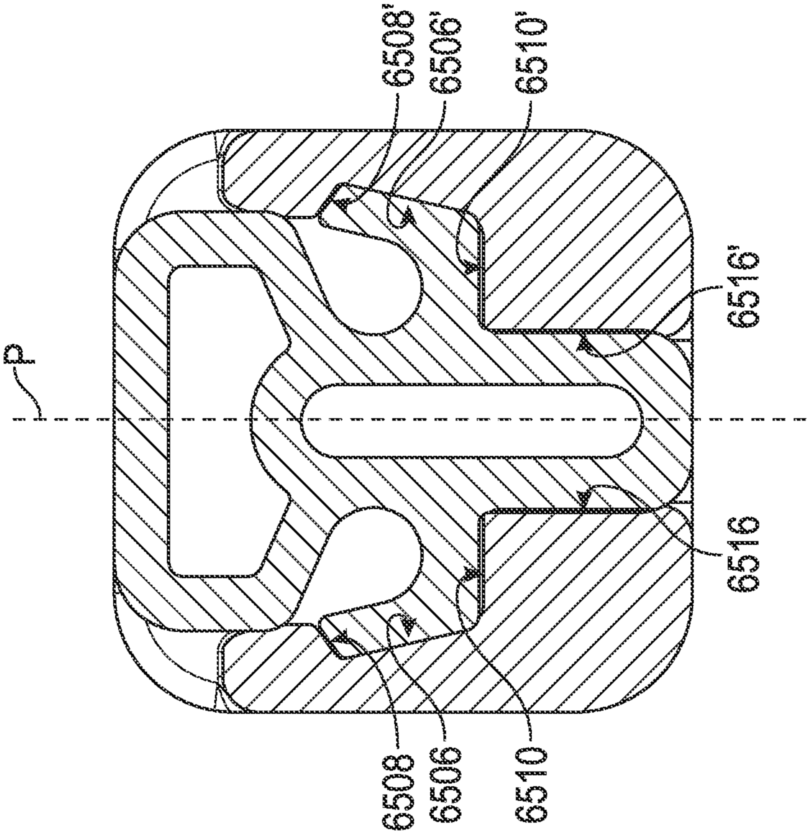
FIGS. 66A and 66B are different views of an attachment portion secured to a securing member in accordance with several embodiments of the present technology.
Figure 66A:
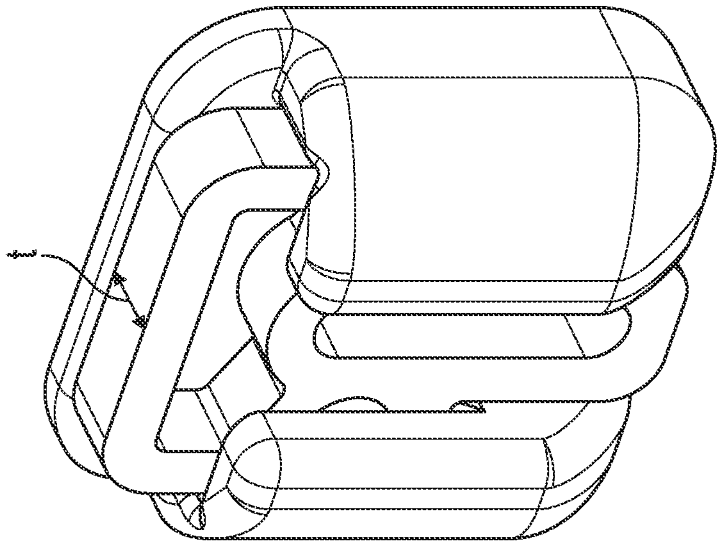

The protrusions 6504, 6504' can be spaced apart from one another by a gap 6520 along the mesiodistal dimension. The gap 6520 can be sized to at least partially receive a portion of the base 6404 and/or a portion of the connector 6403 connected to the head 6402 of the attachment portion 6400. Referring to FIGS. 66A and 66B, in the secured state, the attachment portion 6400 can be positioned proximate and/or against the backing 6502 of the securing member 6500 and bound between the protrusions 6504, 6504'. The connector 6403 can also be positioned between the protrusions 6504, 6504' (e.g., within the gap 6520). Additionally or alternatively, the distal arm 6406 can be positioned buccolingually between the distal protrusion 6504 and the backing 6502 and the mesial arm 6406' can be positioned buccolingually between the mesial protrusion 6504' and the backing 6502. The attachment portion 6400 can comprise a resilient and/or superelastic material such that, when the attachment portion 6400 is braced between the protrusions 6504, 6504', the attachment portion 6400 actively exerts an outward force on the surrounding surfaces. For example, the exterior surfaces of the branches 6407, 6407' can abut and press distally and gingivally against the protrusions 6504, 6504' via the inner surfaces 6516, 6516'.

In the secured position, the attachment portion 6400 can be releasably secured to the securing member 6500 such that it cannot be inadvertently displaced or prematurely or inadvertently released by typical patient activity (such as chewing). The attachment portion 6400 (or one or more portions thereof) can be configured to press outwardly on the securing member 6500 when in the secured position. Active and/or continuous outward force exerted by the attachment portion 6400 on the securing member 6500 can advantageously eliminate or reduce play between the attachment portion 6400 and the securing member 6500 along a mesiodistal dimension, an occlusogingival dimension, and/or a buccolingual dimension, thus providing a more accurate and efficient transfer of force from the appliance to the tooth. In some embodiments, the attachment portion 6400 (or one or more portions thereof) does not chronically press outwardly on the securing member 6500 and is instead configured to engage the securing member 6500 if the attachment portion 6400 moves into contact with and/or moves such that it exerts a force on one or more portions of the securing member 6500. Thus, the securing member 6500 can be configured to limit movement of the attachment portion 6400 relative to the securing member 6500. In some embodiments, one or more of the securing surfaces is configured for transferring orthodontic force between the attachment portion 6400 (e.g., to and/or from the connector 6403, to and/or from the rest of the appliance, etc.) and the securing member 6500 (e.g., to and/or from the tooth, etc.). In various embodiments, one or more of the securing surfaces does not substantially transfer orthodontic force between the attachment portion 6400 and the securing member 6500.

The attachment portion 6400 of FIGS. 64, 66A and 66B can be secured to the securing member 6500 by positioning the attachment portion 6400 proximate the securing member 6500 and moving the attachment portion 6400 along an occlusogingival path. The connector 6403 and/or other portion of the appliance continuous with the head 6402 of the attachment portion 6400 can be positioned relative to the securing member 6500 such that at least a portion of the head 6402 is positioned occlusally of the protrusions 6504, 6504' of the securing member 6500 and/or at, near, and/or occlusally of an occlusal edge of the backing 6502. The portion of the connector 6403 connected to the head 6402 can be positioned within the mesiodistal gap 6520 between the protrusions 6504, 6504' of the securing member 6500. In some embodiments, the back surface of the attachment portion 6400 can be positioned proximate and/or in contact with the backing 6502 of the securing member 6500. In some embodiments, an operator slides the connector 6403 and head 6402 occlusogingivally by positioning a tool (e.g., tool 800 in FIG. 8) within the opening 6430 and moving the tool occlusogingivally. The tool can contact the first base region 6404*a* when sliding the tool gingivally to insert the attachment portion 6400. Continued gingival movement of the connector 6403 and/or head 6402 can force the first ramped surfaces 6417, 6417' into contact with the protrusions 6504, 6504', respectively. Because of the shapes and positions of the first ramped surfaces 6417, 6417', occlusogingival force applied to the branches 6407, 6407' along the first ramped surfaces 6417, 6417' can force the branches 6407, 6407' to bend mesiodistally. Once the apexes 6421, 6421' reach the recesses 6506, 6506', the branches 6407, 6407' can bend back towards their shapes in the relaxed state, thereby wedging the attachment portion 6400 between the protrusions 6504, 6504' as shown in FIGS. 66A and 66B.

The attachment portion 6400 can comprise distal and mesial flexures 6432, 6432' configured to bend and/or otherwise deform to facilitate securing of the attachment portion 6400 to the securing member 6500. In some embodiments, the flexures 6432, 6432' comprise all or portions of the second branch regions 6407*b*, 6407'*b*. The second branch regions 6407*b*, 6407'*b*, for example, can be configured to bend in a first direction to facilitate or enable sliding of the attachment portion 6400 gingivally to secure to the securing member 6500 and/or the second branch regions 6407*b*, 6407'*b* can be configured to bend in a second, opposite direction to facilitate or enable locking of the attachment portion 6400 to the securing member 6500. In some embodiments, deformation of the flexures 6432, 6432' causes one or more portions of the attachment portion 6400 to rotate. Moreover, the flexures 6432, 6432' can comprise other regions of the attachment portion 6400 in addition to or instead of the second branch regions 6407*b*, 6407'*b*. In the illustrated embodiment, deformation of the flexures 6432, 6432' while moving the attachment portion 6400 from the detached state to the attached state is primarily a mesiodistal dimension. In other embodiments, this deformation can be primarily in a buccolingual dimension and/or equally in mesiodistal and buccolingual dimensions. In any of these cases, the deformation can also be occlusogingival.

To release the attachment portion 6400 from the securing member 6500, the attachment portion 6400 can be configured to deform and/or rotate relative to the securing member 6500. For example, an operator can insert a tool, such as the distal end surface 808 of the tool 800 (FIG. 8), into the interior regions 6422, 6422' defined by the arms 6406, 6406'. An occlusal end of the tool surface can be positioned proximate the interior surfaces 6418, 6418' of the arms 6406, 6406' along the third arm regions 6406*c*, 6406'*c*. The portions of the interior surfaces 6418, 6418' that contact the tool can serve as leveraging surfaces through which the tool exerts leverage on the attachment portion 6400. For example, the securing member 6500 can include distal and mesial fulcrums 6522, 6522' at the protrusions 6504, 6504' that support the tool while the tool exerts the leveraging force on the attachment portion 6400. In at least some embodiments, the leveraging surfaces together and the slot formed by the interior regions 6422, 6422' are elongate with lengths substantially perpendicular (e.g., within degrees of perpendicular) to an occlusogingival axis. This can dictate horizontal positioning of the distal end surface 808 of the tool 800 to increase contact between the tool and the attachment portion 6400.

The operator can rotate the tool about a mesiodistal dimension while supported by the fulcrums 6522, 6522'. Accordingly, the tool can act as a lever. Leverage from the tool exerted on the attachment portion 6400 via the leveraging surface can forcefully move the attachment portion 6400 occlusally such that sliding contact between the second ramped surfaces 6414, 6414' and the inner surfaces 6516,

6516' of the protrusions 6504, 6504' causes the flexures 6432, 6432' to resiliently deform in a mesiodistal dimension sufficiently to allow the branches 6407, 6407' to exit the recesses 6506, 6506'. In connection with this deformation, the gaps 6448, 6448' can at least partially close. In some embodiments, the attachment portion 6400 pops and/or snaps free of the securing member 6500 once the branches 6407, 6470' clear the inner surfaces 6516, 6516' of the protrusions 6504, 6504'. The gaps 6448, 6448' can then at least partially open. With or without the tool, the attachment portion 6400 can then be pulled away from the backing 6502 along the buccolingual dimension.

The use of leverage (e.g., by incorporation of the fulcrums 6522, 6522' into the protrusions 6504, 6504') can allow the practical application of greater occlusal force to the attachment portion 6400 than would otherwise be possible. Accordingly, the second ramped surfaces 6414, 6414' and the corresponding portions of the inner surfaces 6516, 6516' of the protrusions 6504, 6504' can be closer to perpendicular to the occlusogingival plane P than the first ramped surfaces 6417, 6417' and the corresponding portions of the inner surfaces 6516, 6516' of the protrusions 6504, 6504'. This can be useful, for example, because the second ramped surfaces 6414, 6414' may act as second securing surfaces limiting occlusal movement of the attachment portion 6400 relative to the securing member 6500 in addition to acting as surfaces that transfer occlusogingival force from the lever into mesiodistal force that resiliently deforms the flexures 6432, 6432' during the detaching process. Interaction between the ledges 6440, 6440' of the attachment portion 6400 and the ledges 6510, 6510' of the securing member 6500 can limit gingival movement of the attachment portion 6400 relative to the securing member 6500, thereby reducing or eliminating any need for the first ramped surfaces 6417, 6417' to perform this function.

The location at which the connector 6403 connects to the head 6402, a dimension along which the connector 6403 extends, a property of the connector 6403, etc. can be at least partially based on a force to be imparted on a tooth to which the attachment portion 6400 is configured to be secured (and/or an intended movement of the tooth). For example, as previously noted, movement of the attachment portion 6400 between the attached state to the detached state can include movement of the branches 6407, 6407' in a mesiodistal dimension. Thus, to avoid any movement of a connector 6403 unintentionally causing the attachment portion 6400 to move toward the detached state during treatment and/or to avoid inhibiting useful movement of the branches 6407, 6407' related to attaching and/or detaching processes, the connector 6403 can connect to a portion of the attachment portion 6400 away from the branches 6407, 6407' and in particular a location that would not cause movement of the branches 6407, 6407' in any way that is biased towards disengagement from the securing member 6500. In some cases, for example as shown in FIG. 64, the connector 6403 is continuous with the base 6404 or the arms 6406, 6406' but not the branches 6407, 6407'. Such a configuration can prevent or limit the connector 6403 from applying forces to the branches 6407, 6407' that inadvertently cause the flexures 6432, 6432' to deform during orthodontic treatment. The location at which the connector 6403 connects to the head 6402, a dimension along which the connector 6403 extends, a property of the connector 6403, etc. can at least partially be based on the mechanism by which the attachment portion 6400 is attached to and/or detached from the securing member 6500 and/or the geometry of the securing member 6500.

Figure 67:
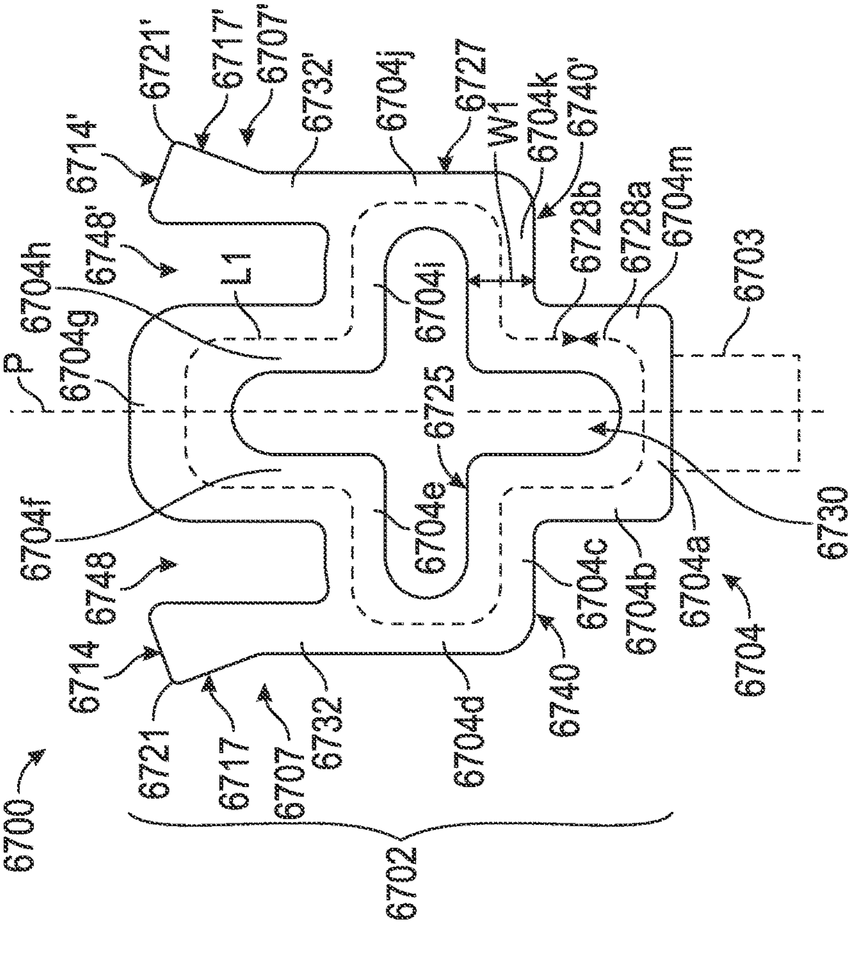
FIG. 67 is a front view of an attachment portion configured in accordance with several embodiments of the present technology.

FIG. 67 shows a planar view of an attachment portion 6700 configured in accordance with several embodiments of the present technology. The attachment portion 6700 can be configured to be secured to a patient's tooth via a securing member, such as securing member 6800 shown in FIG. 68. The attachment portion 6700 and the securing member 6800 are shown in a secured arrangement in FIGS. 69A and 69B. As discussed in greater detail below, the attachment portion 6700 and the securing member 6800 can be configured such that the attachment portion 6700 can be releasably secured to the securing member 6800. The attachment portion 6700 can be continuous with a connector 6703 that connects the attachment portion 6700 to one or more additional portions (not shown) of the overall orthodontic appliance. The attachment portion 6700 can have an attached state in which the orthodontic appliance exerts active and/or retentive orthodontic force (e.g., from a biasing portion (not shown) of the orthodontic appliance) on the tooth via the connector 6703, the attachment portion 6700, and the securing member 6800. Correspondingly, the attachment portion 6700 can have a detached state in which the orthodontic appliance is operably disconnected from the securing member 6800.

The attachment portion 6700 can be configured to move from the detached state to the attached state in response to relative movement between the attachment portion 6700 and the securing member 6800 in an occlusogingival dimension. This relative movement and/or another action can cause the attachment portion 6700 to resiliently deform and then at least partially return to its original form. In this or another manner, the attachment portion 6700 can pop and/or snap from the detached state to the attached state. Furthermore, the attachment portion 6700 can be configured to move from the attached state toward the detached state in response to leverage. These and other features of processes for moving the attachment portion 6700 between the attached and detached states as well as structures of the attachment portion 6700 and the securing member 6800 associated with these features are further discussed below with reference to FIGS. 67-69B.

In at least some cases, the attachment portion 6700 and the securing member 6800 are symmetrical about an occlusogingival plane P that bisects the attachment portion 6700 and the securing member 6800 at an occlusogingival midline when the attachment portion 6700 is in the attached state. In FIGS. 67-69B, symmetrical features of the attachment portion 6700 and the securing member 6800 at a distal side of the occlusogingival plane P are assigned a reference number with no apostrophe whereas symmetrical features at a mesial side of the occlusogingival plane P are assigned a reference number with an apostrophe. In the discussion of FIGS. 67-69B below, the symmetrical features at the distal side of the occlusogingival plane P may be referred to as "distal" whereas the symmetrical features at the mesial side of the occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth. Also, "occlusal" and "gingival" features can be occlusal and gingival, respectively, when the appliance is installed in the illustrated orientation or be gingival and occlusal, respectively, when the appliance is installed in an opposite orientation rotated 180 degrees about a buccolingual axis relative to the illustrated orientation.

Referring to FIG. 67, the attachment portion 6700 can comprise a head 6702. In some embodiments, the attachment portion 6700 comprises a head 6702 and at least a portion of the connector 6703 that is continuous with the head 6702. The connector 6703, for example, can comprise a second connector as previously described herein and/or can extend gingivally away from a gingival portion of the head 6702. The connector 6703 can have features similar to any of the connectors disclosed herein (e.g., first connectors, second connectors, third connectors, etc.) and can comprise a single connector or multiple connectors. For example, the connector 6703 can comprise a single, occlusogingivally extending connector (as shown in FIG. 67), multiple occlusogingivally extending connectors, one or more occlusogingivally extending connectors and one or more mesiodistally extending connectors branching off of the one or more occlusogingivally extending connectors and/or the attachment portion 6700, or one or more mesiodistally extending connectors (and no occlusogingivally extending connectors). Accordingly, the attachment portion 6700 can be connected to a single connector or to multiple connectors also referred to herein as a connector 6703. The connector 6703 can connect to the head 6702 at a variety of locations. For example, a gingivally extending connector can connect to a gingival portion of the head 6702. Any connector 6703 disclosed herein can extend away from the head 6702 along a variety of dimensions (e.g., along an occlusogingival dimension, a mesiodistal dimension, a buccolingual dimension, etc.).

The head 6702 can have a front surface (facing out of the page) and a back surface (not visible in FIG. 67), and a thickness t (labeled in FIG. 69A) measured between the front and back surfaces. In some embodiments, the head 6702 and the connector 6703 are part of the same, monolithic piece of material (e.g., cut from a sheet of material, a 3D-printed piece, etc.). Thus, the head 6702 and the connector 6703 may refer to different portions of the same continuous component. The attachment portion 6700 can be one portion of a greater orthodontic appliance, or may be formed separately and attached to an orthodontic appliance. The attachment portion 6700 and/or the corresponding appliance can be cut from the same sheet of material and/or may be formed by molding, casting, machining, 3D printing, stamping, extruding, or the like. The attachment portion 6700 may comprise a metal or a plastic and may have superelastic and/or shape memory properties. In some embodiments, the attachment portion 6700 does not have superelastic and/or shape memory properties.

As parts of the head 6702, the attachment portion 6700 can comprise various structures associated with one or more functional objectives. These functional objectives can include establishing and maintaining a secure connection between the attachment portion 6700 and the securing member 6800 when the attachment portion 6700 is in the attached state, establishing and maintaining efficient transfer of orthodontic force from the appliance to the tooth via the attachment portion 6700 and the securing member 6800 when the attachment portion 6700 is in the attached state, allowing convenient movement of the attachment portion 6700 from the attached state to the detached state, allowing convenient movement of the attachment portion 6700 from the detached state to the attached state, and providing a tactile indication of movement of the attachment portion 6700 to the attached state, among others.

With reference to FIG. 67, the attachment portion 6700 at the head 6702 can comprise a centrally positioned base 6704 and distal and mesial branches 6707, 6707' extending occlusally from the base 6704. The base 6704 can comprise an elongate member forming a closed loop and extending along a longitudinal axis L1 from a first end portion 6728*a* to a second end portion 6728*b*. Starting at the first end portion 6728*a* and extending along the longitudinal axis L1 to the second end portion 6728*b*, the base 6704 can include a gingivally located first base region 6704*a*, a second base region 6704*b* continuous with and extending occlusally from the first base region 6704*a*, a third base region 6704*c* continuous with and extending distally from the second base region 6704*b*, a fourth base region 6704*d* continuous with and extending occlusally from the third base region 6704*c*, a fifth base region 6704*e* continuous with and extending mesially from the fourth base region 6704*d*, a sixth base region 6704*f* continuous with and extending occlusally from the fifth base region 6704*e*, a seventh base region 6704*g* continuous with and extending mesially from sixth base region 6704*f*, an eighth base region 6704*h* continuous with and extending gingivally from the seventh base region 6704*g*, a ninth base region 6704*i* continuous with and extending mesially from the eighth base region 6704*h*, a tenth base region 6704*j* continuous with and extending gingivally from the ninth base region 6704*i*, an eleventh base region 6704*k* continuous with and extending distally from the tenth base region 6704*j*, and a twelfth base region 6704*m* continuous with and extending gingivally from the eleventh base region 6704*k*. The distal branch 6707 can comprise an elongate member continuous with and extending gingivally from a distal side of the fifth base region 6704*e*. The mesial branch 6707' can include features as described for the distal branch 6707 but mirrored about the occlusogingival plane P.

The base 6704 can at least partially enclose and define a plus-shaped opening 6730 and can comprise an interior surface 6725 at the opening 6730 and an exterior surface 6727 spaced apart from the opening 6730. In at least some cases, the opening 6730 is sized to receive a tool in a first orientation (e.g. an occlusogingival orientation) to facilitate securing the attachment portion 6700 to the securing member 6800 and/or to receive the same or a different tool in a second orientation (e.g. a mesiodistal orientation) to facilitate detaching the attachment portion 6700 from the securing member 6800. The base 6704 can have a width w1 measured between the interior surface 6725 and the exterior surface 6727. Similarly, the branches 6707, 6707' can have respective widths w2, w2' perpendicular to their lengths (e.g., measured mesiodistally). The base 6704 and/or branches 6707, 6707' can have a substantially constant thickness or may have a varying thickness. Likewise, the base 6704 and/or branches 6707, 6707' can have a substantially constant width or may have a varying width. A width and/or thickness of the base 6704 and/or branches 6707, 6707' can be varied, for example, to impart a preferred stiffness profile to all or a portion of the base 6704 and/or branches 6707, 6707'. Gaps 6748, 6748' between the branches 6707, 6707' and the base 6704 can accommodate mesiodistal movement of the branches 6707, 6707' toward one another.

According to various embodiments, one or more regions of the branches 6707, 6707' can include a portion along which the width w2, w2' is greater than at other portions. For example, as shown in FIG. 67, the branch 6707 can include a protuberance 6736 at an occlusalmost portion thereof. At the protuberance 6736, the exterior surface of the branch 6707 can form first and second ramped surfaces 6717 and 6714 that meet at an apex 6721. As described in greater detail below, the first ramped surface 6717 can be configured to force the branch 6707 to bend or rotate when engaging a protrusion of the securing member 6800 as the attachment portion 6700 moves from the detached state toward the attached state. In addition or alternatively, the second ramped surface 6714 can be configured to force the branch 6707 to bend or rotate when engaging a protrusion of the securing member 6800 as the attachment portion 6700 moves from the attached state toward the detached state. The mesial branch 6707' can include a protuberance 6736' and associated features as described for the distal branch 6707 but mirrored about the occlusogingival plane P.

A portion of the exterior surface 6727 of the base 6704 at the third base region 6704*c* can form a ledge 6740. The ledge 6740, a portion of the exterior surface 6727 of the base 6704 at the second base region 6704*b*, and a corner therebetween can comprise a shoulder that is configured to engage a portion of a protrusion of the securing member 6800 when the attachment portion 6700 is secured to the securing member 6800 to oppose rotational and/or translational movement of the base 6704. The mesial side of the base 6704 can include the same or similar features but mirrored about the occlusogingival plane P.

Figure 68:
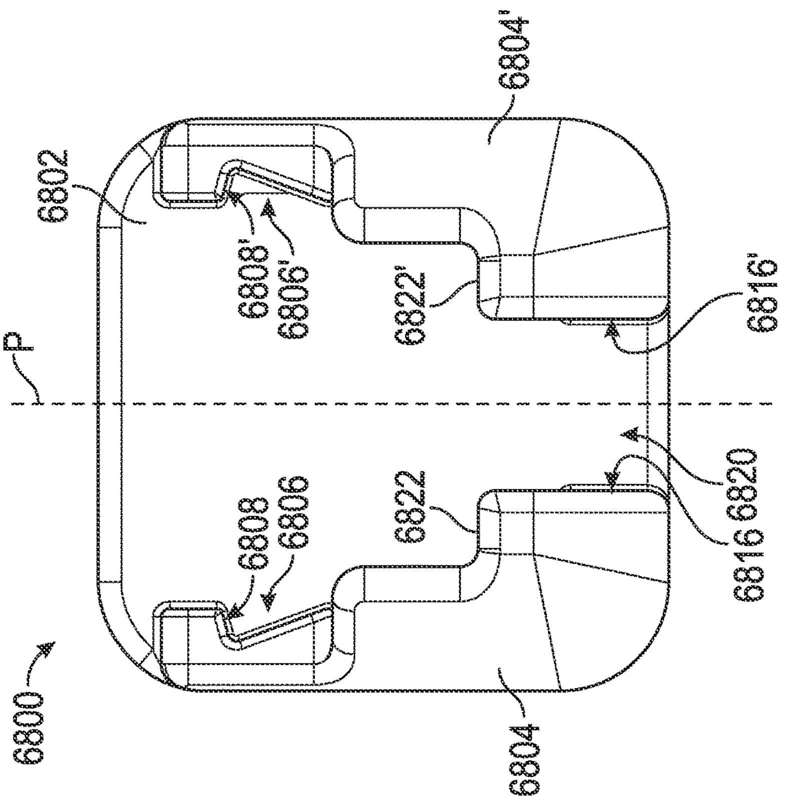
FIG. 68 is a front view of a securing member configured in accordance with several embodiments of the present technology.

FIG. 68 is a front view of the securing member 6800 configured for use with the attachment portion 6700. The securing member 6800 has a first side (facing out of the page) and a second side (not visible in FIG. 68) opposite the first side along a thickness of the securing member 6800 and configured to be bonded to a patient's tooth. The securing member 6800 can comprise a backing 6802 and distal and mesial protrusions 6804, 6804' carried by and extending away from the first side of the backing 6802 along a buccolingual dimension. The protrusions 6804, 6804' can be configured to engage the attachment portion 6700 and to retain the attachment portion 6700 at a specific location relative to the backing 6802 and the patient's tooth. Furthermore, as discussed below, the protrusions 6804, 6804' can be configured to support a lever used to move the attachment portion 6700 from the attached state toward the detached state.

Portions of the protrusions 6804, 6804' closest to the backing 6802 can be configured to engage portions of the attachment portion 6700 to prevent or limit motion of the attachment portion 6700 in an occlusogingival dimension when the attachment portion 6700 is in the attached state. For example, the securing member 6800 at the protrusion 6804 can define a recess 6806 in which the protuberance 6736 of the attachment portion 6700 is seated when the attachment portion 6700 is in the attached state. The securing member 6800 at the recess 6806 can include a first securing surface 6808 that, together with the second ramped surface 6714 of the protuberance 6736 of the attachment portion 6700 (as a second securing surface) conformably restricts occlusal movement of the attachment portion 6700 relative to the securing member 6800 when the attachment portion 6700 is in the attached state. The securing member 6800 at the protrusion 6804 can further define a ledge 6810 that (as a third securing surface) together with the ledge 6740 of the base 6704 of the attachment portion 6700 (as a fourth securing surface) conformably restricts gingival movement of the attachment portion 6700 relative to the securing member 6800 when the attachment portion 6700 is in the attached state. The mesial protrusion 6804' can define a recess a 6806', a ledge 6810', and other features as described for the distal protrusion 6804 but mirrored about the occlusogingival plane P.

In some embodiments, the protrusion 6804 has a first region extending lingually (or buccally, depending on which side of the tooth the securing member 6800 is attached) away from the backing 6802 and a second region extending away from the first region towards the occlusogingival plane P and spaced apart from the backing 6802 by a gap along the buccolingual dimension. This gap can have a depth that is slightly greater than a thickness t of the attachment portion 6700 so that the attachment portion 6700 can fit between the second region of the protrusion 6804 and the backing 6802. The second region of the protrusion 6804 can include an inner surface (not visible) facing towards the backing 6802 and configured to prevent or limit lingual (or buccal) movement of the attachment portion 6700. The first region of the protrusion 6804 can also include an inner surface 6816 (only visible in FIG. 69B) configured to engage the second base region 6704*b* of the attachment portion 6700 and prevent or limit mesial or distal movement of the attachment portion 6700. In at least some cases, the inner surface 6816 of the protrusion 6804 and the exterior surface 6727 of the second base region 6704*b* of the attachment portion 6700 are primary force-transferring surfaces through which active and/or retentive orthodontic force is transferred to the tooth. In addition or alternatively, other surfaces of the securing member 6800 and the attachment portion 6700 that contact one another when the attachment portion 6700 is in the attached state can serve as force-transferring surfaces. The mesial protrusion 6804' can have features as described for the distal protrusion 6804 but mirrored about the occlusogingival plane P.

Figure 69B:
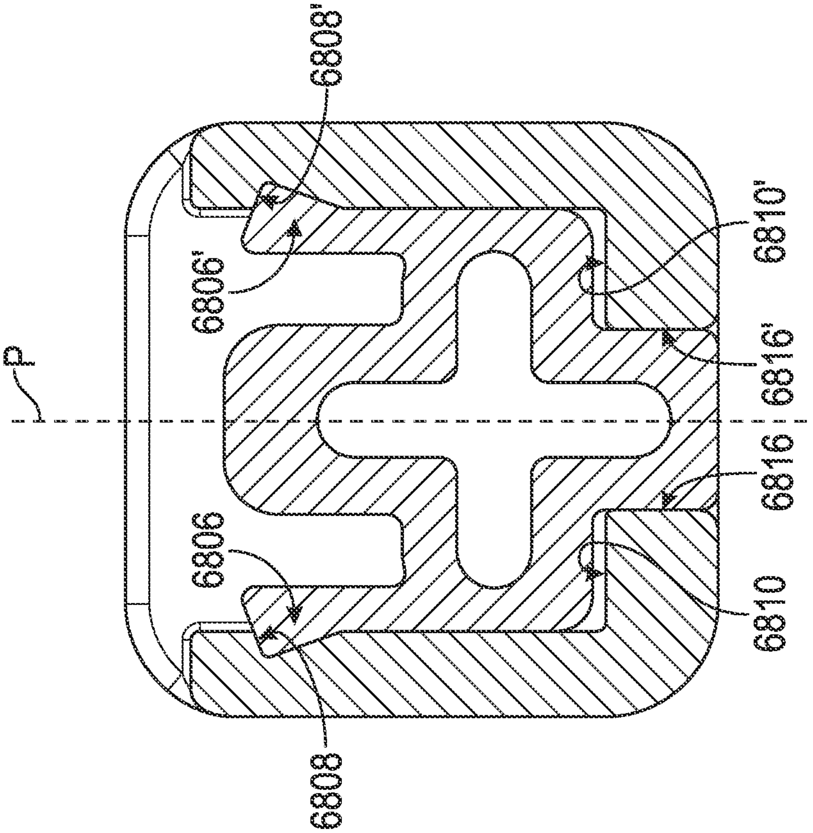
FIGS. 69A and 69B are different views of an attachment portion secured to a securing member in accordance with several embodiments of the present technology.
Figure 69A:
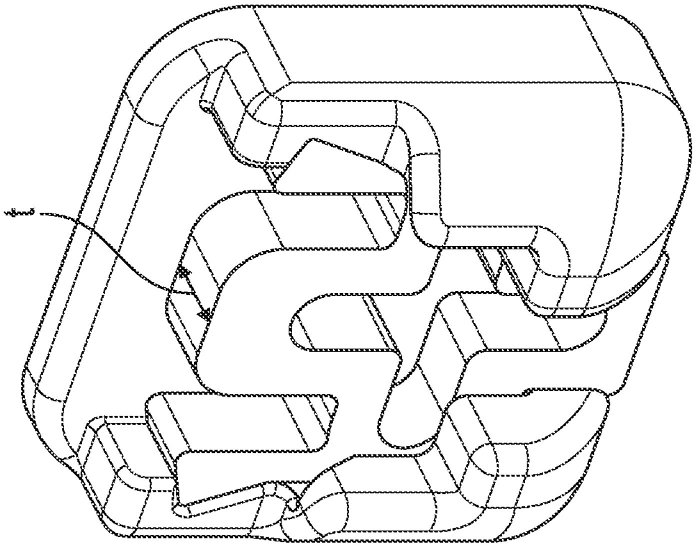

The protrusions 6804, 6804' can be spaced apart from one another by a gap 6820 along the mesiodistal dimension. The gap 6820 can be sized to at least partially receive a portion of the base 6704 and/or the connector 6703 connected to the head 6702 of the attachment portion 6700. Referring to FIGS. 69A and 69B, in the secured state, the attachment portion 6700 can be positioned proximate and/or against the backing 6802 of the securing member 6800 and bound between the protrusions 6804, 6804'. The connector 6703 can also be positioned between the protrusions 6804, 6804' (e.g., within the gap 6820). The attachment portion 6700 can comprise a resilient and/or superelastic material such that, when the attachment portion 6700 is braced between the protrusions 6804, 6804', the attachment portion 6700 actively exerts an outward force on the surrounding surfaces. For example, the exterior surfaces of the branches 6707, 6707' and the exterior surfaces 6727, 6727' of the base 6704 can abut and press distally and gingivally against the protrusions 6804, 6804' via the inner surfaces 6816, 6816' and the ledges 6810, 6810'.

In the secured position, the attachment portion 6700 can be releasably secured to the securing member 6800 such that it cannot be inadvertently displaced or prematurely or inadvertently released by typical patient activity (such as chewing). The attachment portion 6700 (or one or more portions thereof) can be configured to press outwardly on the securing member 6800 when in the secured position. Active and/or continuous outward force exerted by the attachment portion 6700 on the securing member 6800 can advantageously eliminate or reduce play between the attachment portion 6700 and the securing member 6800 along a mesiodistal dimension, an occlusogingival dimension, and/or a buccolingual dimension, thus providing a more accurate and efficient transfer of force from the appliance to the tooth. In some embodiments, the attachment portion 6700 (or one or more portions thereof) does not chronically press outwardly on the securing member 6800 and is instead configured to engage the securing member 6800 if the attachment portion 6700 moves into contact with and/or moves such that it exerts a force on one or more portions of the securing member 6800. Thus, the securing member 6800 can be configured to limit movement of the attachment portion 6700 relative to the securing member 6800. In some embodiments, one or more of the securing surfaces is configured for transferring orthodontic force between the attachment portion 6700 (e.g., to and/or from the connector 6703, to and/or from the rest of the appliance, etc.) and the securing member 6800 (e.g., to and/or from the tooth, etc.). In various embodiments, one or more of the securing surfaces does not substantially transfer orthodontic force between the attachment portion 6700 and the securing member 6800.

The attachment portion 6700 of FIGS. 67, 69A and 69B can be secured to the securing member 6800 by positioning the attachment portion 6700 proximate the securing member 6800 and moving the attachment portion 6700 along an occlusogingival path. The connector 6703 and/or other portion of the appliance continuous with the head 6702 of the attachment portion 6700 can be positioned relative to the securing member 6800 such that at least a portion of the head 6702 is positioned occlusally of the protrusions 6804, 6804' of the securing member 6800 and/or at, near, and/or occlusally of an occlusal edge of the backing 6802. The portion of the connector 6703 connected to the head 6702 can be positioned within the mesiodistal gap 6820 between the protrusions 6804, 6804' of the securing member 6800. In some embodiments, the back surface of the attachment portion 6700 can be positioned proximate and/or in contact with the backing 6802 of the securing member 6800. In some embodiments, an operator slides the connector 6703 and head 6702 occlusogingivally by positioning a tool (e.g., tool 800 in FIG. 8) within the opening 6730 and moving the tool occlusogingivally. The tool can contact the first base region 6704*a* when sliding the tool gingivally to insert the attachment portion 6700. Continued gingival movement of the connector 6703 and/or head 6702 can force the first ramped surfaces 6717, 6717' at the protuberances 6736, 6736' into contact with the protrusions 6804, 6804', respectively. Because of the shapes and positions of the first ramped surfaces 6717, 6717', occlusogingival force applied to the exterior surfaces 6719, 6719' along the first ramped surfaces 6717, 6717' when the first ramped surfaces 6717, 6717' contact the protrusions 6804, 6804' can force the branches 6707, 6707' to bend mesiodistally. Once the apexes 6721, 6721' are aligned occlusogingivally with the recesses 6806, 6806', the branches 6707, 6707' can bend back towards their shapes in the relaxed state, thereby wedging the attachment portion 6700 between the protrusions 6804, 6804' as shown in FIGS. 69A and 69B.

The attachment portion 6700 can comprise distal and mesial flexures 6732, 6732' configured to bend and/or otherwise deform to facilitate securing of the attachment portion 6700 to the securing member 6800. In some embodiments, the flexures 6732, 6732' comprise all or portions of the branches 6707, 6707'. The branches 6707, 6707', for example, can be configured to bend in a first direction to facilitate or enable sliding of the attachment portion 6700 gingivally to secure to the securing member 6800 and/or the branches 6707, 6707' can be configured to bend in a second, opposite direction to facilitate or enable locking of the attachment portion 6700 to the securing member 6800. Furthermore, the flexures 6732, 6732' can carry the protuberances 6736, 6736' and surfaces thereof. In some embodiments, deformation of the flexures 6732, 6732' causes one or more portions of the attachment portion 6700 to rotate. Moreover, the flexures 6732, 6732' can comprise other regions of the attachment portion 6700 in addition to or instead of the branches 6707, 6707'. In the illustrated embodiment, deformation of the flexures 6732, 6732' while moving the attachment portion 6700 from the detached state to the attached state is primarily a mesiodistal dimension. In other embodiments, this deformation can be primarily in a buccolingual dimension and/or equally in mesiodistal and buccolingual dimensions. In any of these cases, the deformation can also be occlusogingival.

To release the attachment portion 6700 from the securing member 6800, the attachment portion 6700 can be configured to deform and/or rotate relative to the securing member 6800. For example, an operator can insert a tool, such as the distal end surface 808 of the tool 800 (FIG. 8), into a mesiodistal portion of the opening 6830 defined by the base 6704. An occlusal end of the tool surface can be positioned proximate portions of the interior surface 6725 of the base 6704 at the fifth and ninth base regions 6704*e*, 6704*i*. The portions of the portions of the interior surface 6725 of the base 6704 at the fifth and ninth base regions 6704*e*, 6704*i* that contact the tool can serve as leveraging surfaces through which the tool exerts leverage on the attachment portion 6700. For example, the securing member 6800 can include distal and mesial fulcrums 6822, 6822' at the protrusions 6804, 6804' that support the tool while the tool exerts the leveraging force on the attachment portion 6700. In at least some embodiments, the leveraging surfaces together and the slot formed by the opening 6730 are elongate with lengths substantially perpendicular (e.g., within degrees of perpendicular) to an occlusogingival axis. This can dictate horizontal positioning of the distal end surface 808 of the tool 800 to increase contact between the tool and the attachment portion 6700.

The operator can rotate the tool about a mesiodistal dimension while supported by the fulcrums 6822, 6822'. Accordingly, the tool can act as a lever. Leverage from the tool exerted on the attachment portion 6700 via the leveraging surface can forcefully move the attachment portion 6700 occlusally such that sliding contact between the second ramped surfaces 6714, 6714' of the protuberances 6736, 6736' and the inner surfaces 6816, 6816' of the protrusions 6804, 6804' causes the flexures 6732, 6732' to resiliently deform in a mesiodistal dimension sufficiently to allow the protuberances 6736, 6736' to exit the recesses 6806, 6806'. In connection with this deformation, the gaps 6748, 6748' can at least partially close and then open. In some embodiments, the attachment portion 6700 pops and/or snaps free of the securing member 6800 once the protuberances 6736, 6736' clear the inner surfaces 6816, 6816' of the protrusions 6804, 6804'. With or without the tool, the attachment portion 6700 can then be pulled away from the backing 6802 along the buccolingual dimension.

The use of leverage (e.g., by incorporation of the fulcrums 6822, 6822' into the protrusions 6804, 6804') can allow the practical application of greater occlusal force to the attachment portion 6700 than would otherwise be possible. Accordingly, the second ramped surfaces 6714, 6714' of the protuberances 6736, 6736' and the corresponding portions of the inner surfaces 6816, 6816' of the protrusions 6804, 6804' can be closer to perpendicular to the occlusogingival plane P than the first ramped surfaces 6717, 6717' of the protuberances 6736, 6736' and the corresponding portions of the inner surfaces 6816, 6816' of the protrusions 6804, 6804'.

This can be useful, for example, because the second ramped surfaces 6714, 6714' may act as second securing surfaces limiting occlusal movement of the attachment portion 6700 relative to the securing member 6800 in addition to acting as surfaces that transfer occlusogingival force from the lever into mesiodistal force that resiliently deforms the flexures 6732, 6732' during the detaching process. In contrast, interaction between the ledges 6740, 6740' of the attachment portion 6700 and the ledges 6810, 6810' of the securing member 6800 can limit gingival movement of the attachment portion 6700 relative to the securing member 6800, thereby reducing or eliminating any need for the first ramped surfaces 6717, 6717' to perform this function.

The location at which the connector 6703 connects to the head 6702, a dimension along which the connector 6703 extends, a property of the connector 6703, etc. can be at least partially based on a force to be imparted on a tooth to which the attachment portion 6700 is configured to be secured (and/or an intended movement of the tooth). For example, as previously noted, movement of the attachment portion 6700 between the attached state to the detached state can include movement of the branches 6707, 6707' in a mesiodistal dimension. Thus, to avoid any movement of a connector 6703 unintentionally causing the attachment portion 6700 to move toward the detached state during treatment and/or to avoid inhibiting useful movement of the branches 6707, 6707' related to attaching and/or detaching processes, the connector 6703 can connect to a portion of the attachment portion 6700 away from the branches 6707, 6707' and in particular a location that would not cause movement of the branches 6707, 6707' in any way that is biased towards disengagement from the securing member 6800. In some cases, for example as shown in FIG. 67, the connector 6703 is continuous with the base 6704 of the head 6702 but not the branches 6707, 6707'. Such a configuration can prevent or limit the connector 6703 from applying forces to the branches 6707, 6707' that inadvertently cause the flexures 6732, 6732' to deform during orthodontic treatment. The location at which the connector 6703 connects to the head 6702, a dimension along which the connector 6703 extends, a property of the connector 6703, etc. can at least partially be based on the mechanism by which the attachment portion 6700 is attached to and/or detached from the securing member 6800 and/or the geometry of the securing member 6800.

Figure 70:
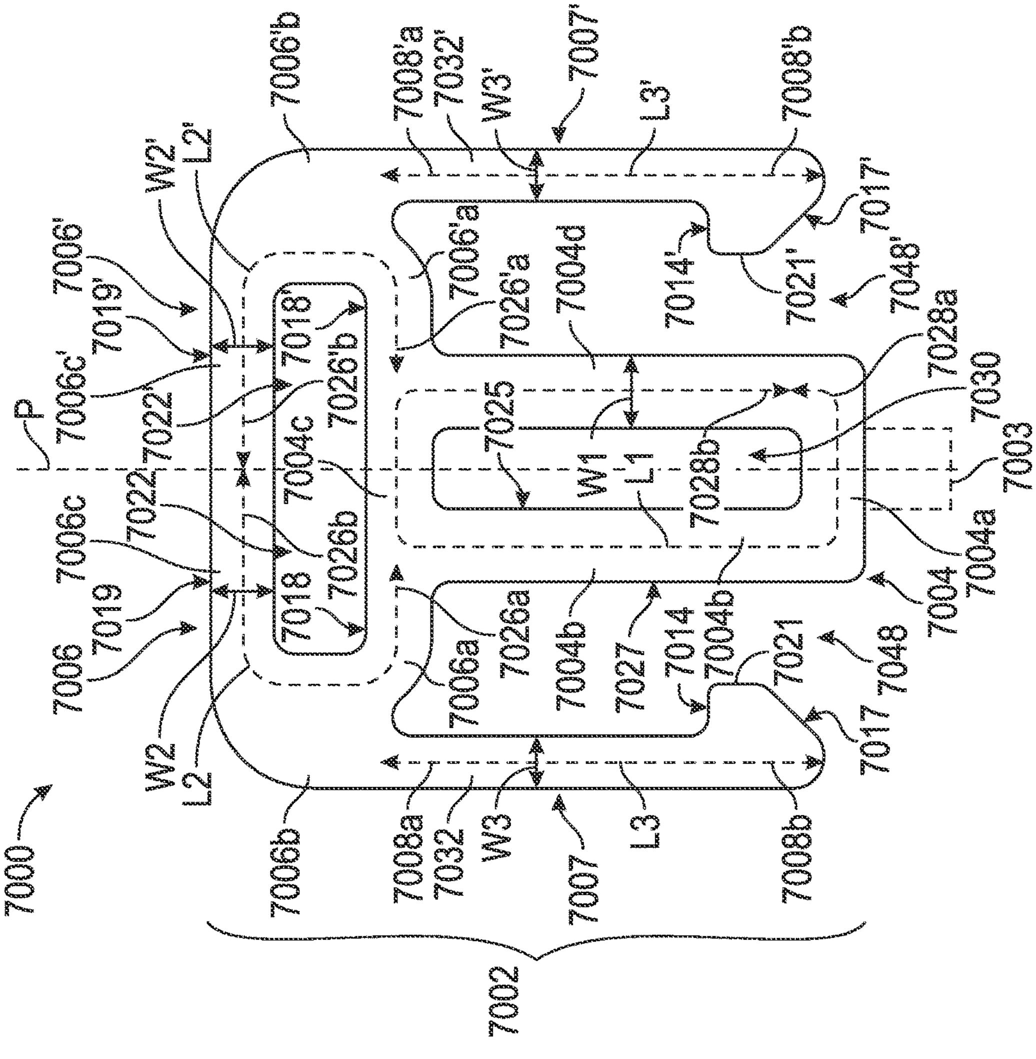
FIG. 70 is a front view of an attachment portion configured in accordance with several embodiments of the present technology.

FIG. 70 shows a planar view of an attachment portion 7000 configured in accordance with several embodiments of the present technology. The attachment portion 7000 can be configured to be secured to a patient's tooth via a securing member, such as securing member 7100 shown in FIG. 71. The attachment portion 7000 and the securing member 7100 are shown in a secured arrangement in FIGS. 72A and 72B. As discussed in greater detail below, the attachment portion 7000 and the securing member 7100 can be configured such that the attachment portion 7000 can be releasably secured to the securing member 7100. The attachment portion 7000 can be continuous with a connector 7003 that connects the attachment portion 7000 to one or more additional portions (not shown) of the overall orthodontic appliance. The attachment portion 7000 can have an attached state in which the orthodontic appliance exerts active and/or retentive orthodontic force (e.g., from a biasing portion (not shown) of the orthodontic appliance) on the tooth via the connector 7003, the attachment portion 7000, and the securing member 7100. Correspondingly, the attachment portion 7000 can have a detached state in which the orthodontic appliance is operably disconnected from the securing member 7100.

The attachment portion 7000 can be configured to move from the detached state to the attached state in response to relative movement between the attachment portion 7000 and the securing member 7100 in an occlusogingival dimension. This relative movement and/or another action can cause the attachment portion 7000 to resiliently deform and then at least partially return to its original form. In this or another manner, the attachment portion 7000 can pop or snap from the detached state to the attached state. Furthermore, the attachment portion 7000 can be configured to move from the attached state toward the detached state in response to leverage. These and other features of processes for moving the attachment portion 7000 between the attached and detached states as well as structures of the attachment portion 7000 and the securing member 7100 associated with these features are further discussed below with reference to FIGS. 70-72B.

In at least some cases, the attachment portion 7000 and the securing member 7100 are symmetrical about an occlusogingival plane P that bisects the attachment portion 7000 and the securing member 7100 at an occlusogingival midline when the attachment portion 7000 is in the attached state. In FIGS. 70-72B, symmetrical features of the attachment portion 7000 and the securing member 7100 at a distal side of the occlusogingival plane P are assigned a reference number with no apostrophe whereas symmetrical features at a mesial side of the occlusogingival plane P are assigned a reference number with an apostrophe. In the discussion of FIGS. 70-72B below, the symmetrical features at the distal side of the occlusogingival plane P may be referred to as "distal" whereas the symmetrical features at the mesial side of the occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth.

Referring to FIG. 70, the attachment portion 7000 can comprise a head 7002. In some embodiments, the attachment portion 7000 comprises a head 7002 and at least a portion of the connector 7003 that is continuous with the head 7002. The connector 7003, for example, can comprise a second connector as previously described herein and/or can extend gingivally away from a gingival portion of the head 7002. The connector 7003 can have features similar to any of the connectors disclosed herein (e.g., first connectors, second connectors, third connectors, etc.) and can comprise a single connector or multiple connectors. For example, the connector 7003 can comprise a single, occlusogingivally extending connector (as shown in FIG. 70), multiple occlusogingivally extending connectors, one or more occlusogingivally extending connectors and one or more mesiodistally extending connectors branching off of the one or more occlusogingivally extending connectors and/or the attachment portion 7000, or one or more mesiodistally extending connectors (and no occlusogingivally extending connectors). Accordingly, the attachment portion 7000 can be connected to a single connector or to multiple connectors also referred to herein as a connector 7003. The connector 7003 can connect to the head 7002 at a variety of locations. For example, a gingivally extending connector can connect to a gingival portion of the head 7002. Any connector 7003 disclosed herein can extend away from the head 7002 along a variety of dimensions (e.g., along an occlusogingival dimension, a mesiodistal dimension, a buccolingual dimension, etc.).

The head 7002 can have a front surface (facing out of the page) and a back surface (not visible in FIG. 70), and a thickness t (labeled in FIG. 72A) measured between the front and back surfaces. In some embodiments, the head 7002 and the connector 7003 are part of the same, monolithic piece of material (e.g., cut from a sheet of material, a 3D-printed piece, etc.). Thus, the head 7002 and the connector 7003 may refer to different portions of the same continuous component. The attachment portion 7000 can be one portion of a greater orthodontic appliance, or may be formed separately and attached to an orthodontic appliance. The attachment portion 7000 and/or the corresponding appliance can be cut from the same sheet of material and/or may be formed by molding, casting, machining, 3D printing, stamping, extruding, or the like. The attachment portion 7000 may comprise a metal or a plastic and may have superelastic and/or shape memory properties. In some embodiments, the attachment portion 7000 does not have superelastic and/or shape memory properties.

As parts of the head 7002, the attachment portion 7000 can comprise various structures associated with one or more functional objectives. These functional objectives can include establishing and maintaining a secure connection between the attachment portion 7000 and the securing member 7100 when the attachment portion 7000 is in the attached state, establishing and maintaining efficient transfer of orthodontic force from the appliance to the tooth via the attachment portion 7000 and the securing member 7100 when the attachment portion 7000 is in the attached state, allowing convenient movement of the attachment portion 7000 from the attached state to the detached state, allowing convenient movement of the attachment portion 7000 from the detached state to the attached state, and providing a tactile indication of movement of the attachment portion 7000 to the attached state, among others.

With reference to FIG. 70, the attachment portion 7000 at the head 7002 can comprise a centrally positioned base 7004 and distal and mesial arms 7006, 7006' extending distally and mesially, respectively, from the base 7004. The attachment portion 7000 can further include distal and mesial branches 7007, 7007' extending gingivally from the arms 7006, 7006', respectively. The base 7004 can comprise an elongate member forming a closed loop and extending along a longitudinal axis L1 from a first end portion 7028*a* to a second end portion 7028*b*. Starting at the first end portion 7028*a* and extending along the longitudinal axis L1 to the second end portion 7028*b*, the base 7004 can include a gingivally located first base region 7004*a*, a second base region 7004*b* continuous with and extending occlusally from the first base region 7004*a*, an occlusally located third base region 7004*c* continuous with and extending mesially from the second base region 7004*b*, and a fourth base region 7004*d* continuous with and extending gingivally from the third base region 7004*c*. The base 7004 can at least partially enclose and define an opening 7030 and can comprise an interior surface 7025 at the opening 7030 and an exterior surface 7027 spaced apart from the opening 7030. In at least some cases, the opening 7030 is sized to receive a tool to facilitate securing the attachment portion 7000 to the securing member 7100.

The distal arm 7006 can comprise an elongate member extending along a longitudinal axis L2 from a first end portion 7026*a* to a second end portion 7026*b*. Starting at the first end portion 7026*a* and extending along the longitudinal axis L2 to the second end portion 7026*b*, the distal arm 7006 can include a first arm region 7006*a* continuous with and extending distally from the third base region 7004*c*, a second arm region 7006*b* continuous with and extending occlusally from the first arm region 7006*a*, and a third arm region 7006*c* continuous with and extending mesially from the second arm region 7006*b*. The distal arm 7006 can partially enclose and define an interior region 7022 and can comprise an interior surface 7018 at the interior region 7022 and an exterior surface 7019 spaced apart from the interior region 7022. The mesial arm 7006' can include features as described for the distal arm 7006 but mirrored about the occlusogingival plane P. Together, the interior regions 7022, 7022' can form a slot shaped to receive a tool used to move the attachment portion 7000 from the attached state toward the detached state. The distal branch 7007 can comprise an elongate member extending along a longitudinal axis L3 from a first end portion 7008*a* to a second end portion 7008*b*. The mesial branch 7007' can comprise an elongate member extending along a longitudinal axis L3' from a first end portion 7008'*a* to a second end portion 7008'*b*.

The base 7004 can have a width w1 measured between the interior surface 7025 and the exterior surface 7027. Similarly, the arms 7006, 7006' can have respective widths w2, w2' measured between the respective interior surfaces 7018, 7018' and exterior surfaces 7019, 7019'. The branches 7007, 7007' can have respective widths w3, w3' perpendicular to the longitudinal axes L3, L3'. The base 7004, arms 7006, 7006', and/or branches 7007, 7007' can have a substantially constant thickness or may have a varying thickness. Likewise, the base 7004, arms 7006, 7006', and/or branches 7007, 7007' can have a substantially constant width or may have a varying width. A width and/or thickness of the base 7004, arms 7006, 7006', and/or branches 7007, 7007' can be varied, for example, to impart a preferred stiffness profile to all or a portion of the base 7004, arms 7006, 7006', and/or branches 7007, 7007'. Furthermore, the branches 7007, 7007' can include a plurality of bends along the respective longitudinal axes L3, L3' that are configured to preferentially flex to facilitate securing and/or release of the attachment portion 7000 to a securing member. Gaps 7048, 7048' between the first branch regions 7007*a*, 7007'*a* and the base 7004, respectively, can accommodate mesiodistal movement of the branches 7007, 7007' in connection with this flexing.

According to various embodiments, one or more regions of the branches 7007, 7007' can include a portion along which the width w3, w3' is greater than at other portions. For example, as shown in FIG. 70, a gingivalmost portion of the second region 7007*b* of the branch 7007 can include a ramped surface 7017, a mesiodistal surface 7014, and an occlusogingival surface 7021 therebetween. The mesiodistal surface 7014 can be configured to engage a protrusion of the securing member 7100 when the attachment portion 7000 is secured to the securing member 7100 to oppose rotational and/or translational movement of the arm 7006. As described in greater detail below, the ramped surface 7017 can be configured to force the branch 7007 to bend or rotate when engaging a protrusion of the securing member 7100 as the attachment portion 7000 moves from the detached state toward the attached state. In addition or alternatively, the mesiodistal surface 7014 can be configured to force the branch 7007 to bend or rotate when engaging a protrusion of the securing member 7100 as the attachment portion 7000 moves from the attached state toward the detached state. The mesial branch 7007' can include features as described for the distal branch 7007' but mirrored about the occlusogingival plane P.

Figure 71:
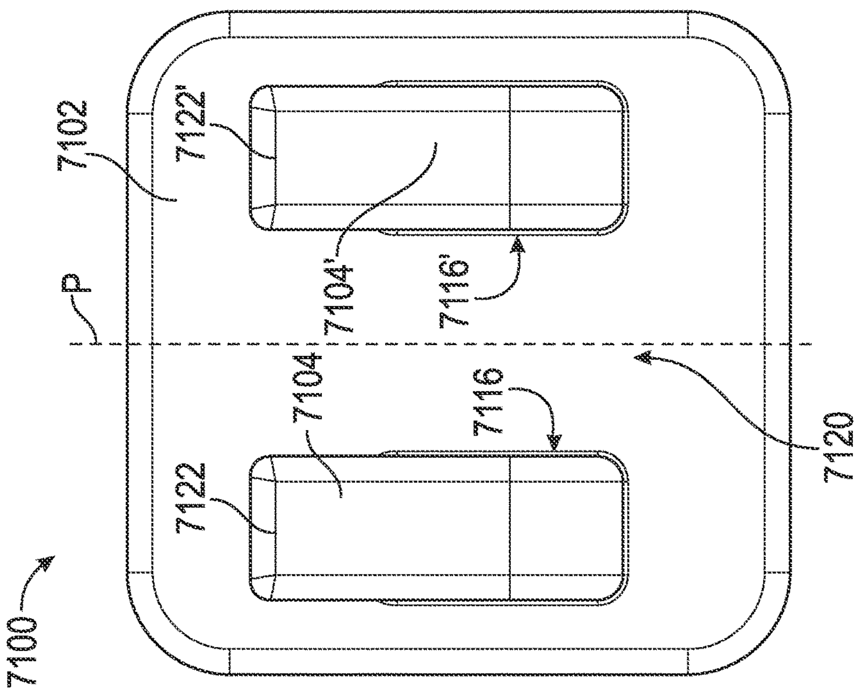
FIG. 71 is a front view of a securing member configured in accordance with several embodiments of the present technology.

FIG. 71 is a front view of the securing member 7100 configured for use with the attachment portion 7000. The securing member 7100 has a first side (facing out of the page) and a second side (not visible in FIG. 71) opposite the first side along a thickness of the securing member 7100 and configured to be bonded to a patient's tooth. The securing member 7100 can comprise a backing 7102 and distal and mesial protrusions 7104, 7104' carried by and extending away from the first side of the backing 7102 along a buccolingual dimension. The protrusions 7104, 7104' can be configured to engage the attachment portion 7000 and to retain the attachment portion 7000 at a specific location relative to the backing 7102 and the patient's tooth. Furthermore, as discussed below, the protrusions 7104, 7104' can be configured to support a lever used to move the attachment portion 7000 from the attached state toward the detached state.

Portions of the protrusions 7104, 7104' closest to the backing 7102 can be configured to engage portions of the attachment portion 7000 to prevent or limit motion of the attachment portion 7000 in an occlusogingival dimension when the attachment portion 7000 is in the attached state. The securing member 7100 at the protrusion 7104 can include a first securing surface 7108 that, together with the mesiodistal surface 7014 of the branch 7007 of the attachment portion 7000 (as a second securing surface) conformably restricts occlusal movement of the attachment portion 7000 relative to the securing member 7100 when the attachment portion 7000 is in the attached state. The securing member 7100 at the protrusion 7104 can also define a ledge 7110 that (as a third securing surface) together with a portion of the exterior surface 7019 of the arm 7006 at the first arm region 7006*a* (as a fourth securing surface) conformably restricts gingival movement of the attachment portion 7000 relative to the securing member 7100 when the attachment portion 7000 is in the attached state. The mesial protrusion 7104' can define features as described for the distal protrusion 7104 but mirrored about the occlusogingival plane P.

In some embodiments, the protrusion 7104 has a first region extending lingually (or buccally, depending on which side of the tooth the securing member 7100 is attached) away from the backing 7102 and a second region extending away from the first region towards the occlusogingival plane P and spaced apart from the backing 7102 by a gap along the buccolingual dimension. This gap can have a depth that is slightly greater than a thickness t of the attachment portion 7000 so that the attachment portion 7000 can fit between the second region of the protrusion 7104 and the backing 7102. The second region of the protrusion 7104 can include an inner surface (not visible) facing towards the backing 7102 and configured to prevent or limit lingual (or buccal) movement of the attachment portion 7000. The first region of the protrusion 7104 can include an inner surface 7116 configured to engage the second base region 7004*b* of the attachment portion 7000 and prevent or limit mesial or distal movement of the attachment portion 7000. In at least some cases, the inner surface 7116 of the protrusion 7104 and the exterior surface 7027 of the second base region 7004*b* of the attachment portion 7000 are primary force-transferring surfaces through which active and/or retentive orthodontic force is transferred to the tooth. In addition or alternatively, other surfaces of the securing member 7100 and the attachment portion 7000 that contact one another when the attachment portion 7000 is in the attached state can serve as force-transferring surfaces. The mesial protrusion 7104' can include features as described for the distal protrusion 7104 but mirrored about the occlusogingival plane P.

Figure 72A:
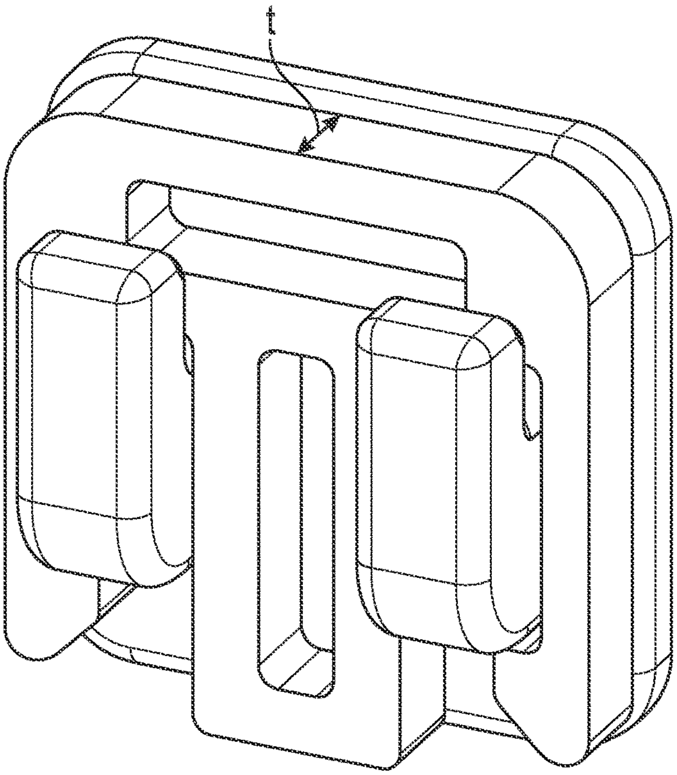
FIGS. 72A and 72B are different views of an attachment portion secured to a securing member in accordance with several embodiments of the present technology.
Figure 72B:
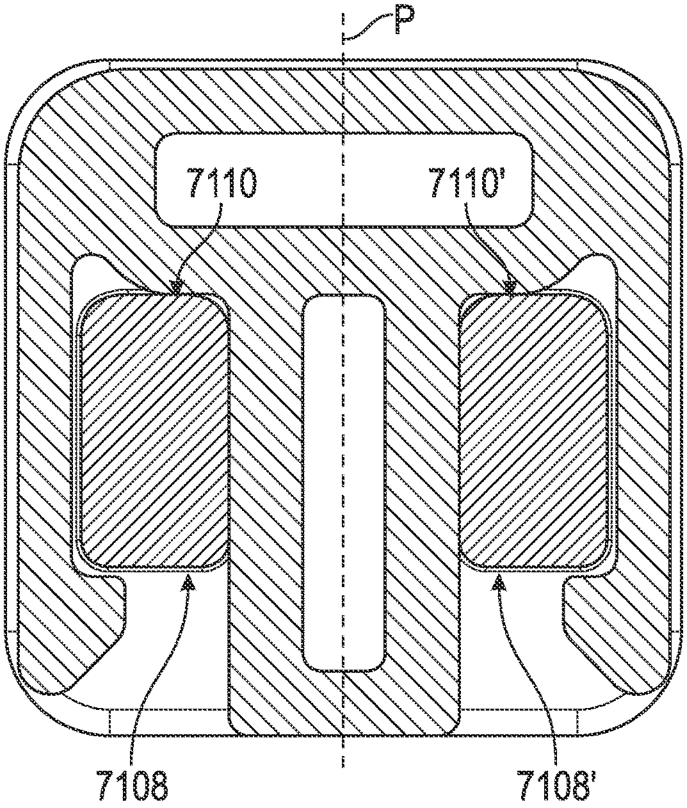

The protrusions 7104, 7104' can be spaced apart from one another by a gap 7120 along the mesiodistal dimension. The gap 7120 can be sized to at least partially receive a portion of the base 7004 and/or a portion of the connector 7003 connected to the head 7002 of the attachment portion 7000. Referring to FIGS. 72A and 72B, in the secured state, the attachment portion 7000 can be positioned proximate and/or against the backing 7102 of the securing member 7100 and bound between the protrusions 7104, 7104'. The connector 7003 can also be positioned between the protrusions 7104, 7104' (e.g., within the gap 7120). Additionally or alternatively, the distal arm 7006 can be positioned buccolingually between the distal protrusion 7104 and the backing 7102 and the mesial arm 7006' can be positioned buccolingually between the mesial protrusion 7104' and the backing 7102.

In the secured position, the attachment portion 7000 can be releasably secured to the securing member 7100 such that it cannot be inadvertently displaced or prematurely or inadvertently released by typical patient activity (such as chewing). The attachment portion 7000 (or one or more portions thereof) can be configured to press inwardly on the securing member 7100 when in the secured position. Active and/or continuous inward force exerted by the attachment portion 7000 on the securing member 7100 can advantageously eliminate or reduce play between the attachment portion 7000 and the securing member 7100 along a mesiodistal dimension, an occlusogingival dimension, and/or a buccolingual dimension, thus providing a more accurate and efficient transfer of force from the appliance to the tooth. In some embodiments, the attachment portion 7000 (or one or more portions thereof) does not chronically press inwardly on the securing member 7100 and is instead configured to engage the securing member 7100 if the attachment portion 7000 moves into contact with and/or moves such that it exerts a force on one or more portions of the securing member 7100. Thus, the securing member 7100 can be configured to limit movement of the attachment portion 7000 relative to the securing member 7100. In some embodiments, one or more of the securing surfaces is configured for transferring orthodontic force between the attachment portion 7000 (e.g., to and/or from the connector 7003, to and/or from the rest of the appliance, etc.) and the securing member 7100 (e.g., to and/or from the tooth, etc.). In various embodiments, one or more of the securing surfaces does not substantially transfer orthodontic force between the attachment portion 7000 and the securing member 7100.

The attachment portion 7000 of FIGS. 70, 72A and 72B can be secured to the securing member 7100 by positioning the attachment portion 7000 proximate the securing member 7100 and moving the attachment portion 7000 along an occlusogingival path. The connector 7003 and/or other portion of the appliance continuous with the head 7002 of the attachment portion 7000 can be positioned relative to the securing member 7100 such that at least a portion of the head 7002 is positioned occlusally of the protrusions 7104, 7104' of the securing member 7100 and/or at, near, and/or occlusally of an occlusal edge of the backing 7102. The portion of the connector 7003 connected to the head 7002 can be positioned within the mesiodistal gap 7120 between the protrusions 7104, 7104' of the securing member 7100. In some embodiments, the back surface of the attachment portion 7000 can be positioned proximate and/or in contact with the backing 7102 of the securing member 7100. In some embodiments, an operator slides the connector 7003 and head 7002 occlusogingivally by positioning a tool (e.g., tool 800 in FIG. 8) within the opening 7030 and moving the tool occlusogingivally. The tool can contact the first base region 7004*a* when sliding the tool gingivally to insert the attachment portion 7000. Continued gingival movement of the connector 7003 and/or head 7002 can force the ramped surfaces 7017, 7017' into contact with the protrusions 7104, 7104', respectively. Because of the shapes and positions of the ramped surfaces 7017, 7017', occlusogingival force applied to the branches 7007, 7007' along the ramped surfaces 7017, 7017' can force the branches 7007, 7007' to bend mesiodistally. Once the occlusogingival surfaces 7021, 7021' clear the protrusions 7104, 7104', the branches 7007, 7007' can bend back towards their shapes in the relaxed state, thereby wedging the attachment portion 7000 between the protrusions 7104, 7104' as shown in FIGS. 72A and 72B.

The attachment portion 7000 can comprise distal and mesial flexures 7032, 7032' configured to bend and/or otherwise deform to facilitate securing of the attachment portion 7000 to the securing member 7100. In some embodiments, the flexures 7032, 7032' comprise all or portions of the branches 7007, 7007'. The branches 7007, 7007', for example, can be configured to bend in a first direction to facilitate or enable sliding of the attachment portion 7000 gingivally to secure to the securing member 7100 and/or the branches 7007, 7007' can be configured to bend in a second, opposite direction to facilitate or enable locking of the attachment portion 7000 to the securing member 7100. In some embodiments, deformation of the flexures 7032, 7032' causes one or more portions of the attachment portion 7000 to rotate. Moreover, the flexures 7032, 7032' can comprise other regions of the attachment portion 7000 in addition to or instead of the branches 7007, 7007'. In the illustrated embodiment, deformation of the flexures 7032, 7032' while moving the attachment portion 7000 from the detached state to the attached state is primarily a mesiodistal dimension. In other embodiments, this deformation can be primarily in a buccolingual dimension and/or equally in mesiodistal and buccolingual dimensions. In any of these cases, the deformation can also be occlusogingival.

To release the attachment portion 7000 from the securing member 7100, the attachment portion 7000 can be configured to deform and/or rotate relative to the securing member 7100. For example, an operator can insert a tool, such as the distal end surface 808 of the tool 800 (FIG. 8), into the interior regions 7022, 7022' defined by the arms 7006, 7006'. An occlusal end of the tool surface can be positioned proximate the interior surfaces 7018, 7018' of the arms 7006, 7006' along the third arm regions 7006*c*, 7006'*c*. The portions of the interior surfaces 7018, 7018' that contact the tool can serve as leveraging surfaces through which the tool exerts leverage on the attachment portion 7000. For example, the securing member 7100 can include distal and mesial fulcrums 7122, 7122' at the protrusions 7104, 7104' that support the tool while the tool exerts the leveraging force on the attachment portion 7000. In at least some embodiments, the leveraging surfaces together and the slot formed by the interior regions 7022, 7022' are elongate with lengths substantially perpendicular (e.g., within degrees of perpendicular) to an occlusogingival axis. This can dictate horizontal positioning of the distal end surface 808 of the tool 800 to increase contact between the tool and the attachment portion 7000.

The operator can rotate the tool about a mesiodistal dimension while supported by the fulcrums 7122, 7122'. Accordingly, the tool can act as a lever. Leverage from the tool exerted on the attachment portion 7000 via the leveraging surface can forcefully move the attachment portion 7000 occlusally such that sliding contact between the mesiodistal surfaces 7014, 7014' and the first securing surfaces 7108, 7108' of the protrusions 7104, 7104' causes the flexures 7032, 7032' to resiliently deform in a mesiodistal dimension sufficiently to allow the gingivalmost portions of the branches 7007, 7007' to clear the protrusions 7104, 7104'. In connection with this deformation, the gaps 7048, 7048' can expand mesiodistally. In some embodiments, the attachment portion 7000 pops and/or snaps free of the securing member 7100 once the gingivalmost portions of the branches 7007, 7007' clear the protrusions 7104, 7104' and the gaps 7048, 7048' contract mesiodistally. With or without the tool, the attachment portion 7000 can then be pulled away from the backing 7102 along the buccolingual dimension.

The use of leverage (e.g., by incorporation of the fulcrums 7122, 7122' into the protrusions 7104, 7104') can allow the practical application of greater occlusal force to the attachment portion 7000 than would otherwise be possible. Accordingly, the mesiodistal surfaces 7014, 7014' and the first securing surfaces 7108, 7108' of the protrusions 7104, 7104' can be closer to perpendicular to the occlusogingival plane P than the ramped surfaces 7017, 7017'. This can be useful, for example, because the mesiodistal surfaces 7014, 7014' may act as second securing surfaces limiting occlusal movement of the attachment portion 7000 relative to the securing member 7100 in addition to acting as surfaces that transfer occlusogingival force from the lever into mesiodistal force that resiliently deforms the flexures 7032, 7032' during the detaching process.

The location at which the connector 7003 connects to the head 7002, a dimension along which the connector 7003 extends, a property of the connector 7003, etc. can be at least partially based on a force to be imparted on a tooth to which the attachment portion 7000 is configured to be secured (and/or an intended movement of the tooth). For example, as previously noted, movement of the attachment portion 7000 between the attached state to the detached state can include movement of the branches 7007, 7007' in a mesiodistal dimension. Thus, to avoid any movement of a connector 7003 unintentionally causing the attachment portion 7000 to move toward the detached state during treatment and/or to avoid inhibiting useful movement of the branches 7007, 7007' related to attaching and/or detaching processes, the connector 7003 can connect to a portion of the attachment portion 7000 away from the branches 7007, 7007' and in particular a location that would not cause movement of the branches 7007, 7007' in any way that is biased towards disengagement from the securing member 7100. In some cases, for example as shown in FIG. 70, the connector 7003 is continuous with the base 7004 or the arms 7006, 7006' but not the branches 7007, 7007'. Such a configuration can prevent or limit the connector 7003 from applying forces to the branches 7007, 7007' that inadvertently cause the flexures 7032, 7032' to deform during orthodontic treatment. The location at which the connector 7003 connects to the head 7002, a dimension along which the connector 7003 extends, a property of the connector 7003, etc. can at least partially be based on the mechanism by which the attachment portion 7000 is attached to and/or detached from the securing member 7100 and/or the geometry of the securing member 7100.

Figure 73:
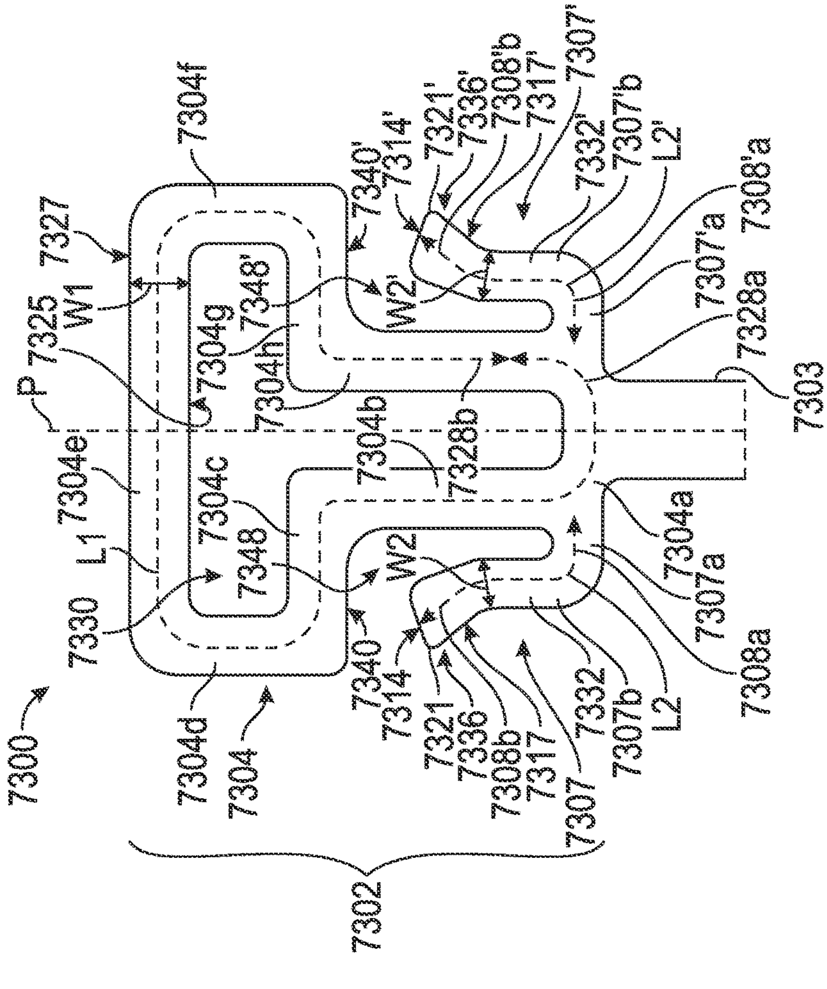
FIG. 73 is a front view of an attachment portion configured in accordance with several embodiments of the present technology.

FIG. 73 shows a planar view of an attachment portion 7300 configured in accordance with several embodiments of the present technology. The attachment portion 7300 can be configured to be secured to a patient's tooth via a securing member, such as securing member 7400 shown in FIG. 74. The attachment portion 7300 and the securing member 7400 are shown in a secured arrangement in FIGS. 75A and 75B.

As discussed in greater detail below, the attachment portion 7300 and the securing member 7400 can be configured such that the attachment portion 7300 can be releasably secured to the securing member 7400. The attachment portion 7300 can be continuous with a connector 7303 that connects the attachment portion 7300 to one or more additional portions (not shown) of the overall orthodontic appliance. The attachment portion 7300 can have an attached state in which the orthodontic appliance exerts active and/or retentive orthodontic force (e.g., from a biasing portion (not shown) of the orthodontic appliance) on the tooth via the connector 7303, the attachment portion 7300, and the securing member 7400. Correspondingly, the attachment portion 7300 can have a detached state in which the orthodontic appliance is operably disconnected from the securing member 7400.

The attachment portion 7300 can be configured to move from the detached state to the attached state in response to relative movement between the attachment portion 7300 and the securing member 7400 in an occlusogingival dimension. This relative movement and/or another action can cause the attachment portion 7300 to resiliently deform and then at least partially return to its original form. In this or another manner, the attachment portion 7300 can pop and/or snap from the detached state to the attached state. Furthermore, the attachment portion 7300 can be configured to move from the attached state toward the detached state in response to leverage. These and other features of processes for moving the attachment portion 7300 between the attached and detached states as well as structures of the attachment portion 7300 and the securing member 7400 associated with these features are further discussed below with reference to FIGS. 73-75B.

In at least some cases, the attachment portion 7300 and the securing member 7400 are symmetrical about an occlusogingival plane P that bisects the attachment portion 7300 and the securing member 7400 at an occlusogingival midline when the attachment portion 7300 is in the attached state. In FIGS. 73-75B, symmetrical features of the attachment portion 7300 and the securing member 7400 at a distal side of the occlusogingival plane P are assigned a reference number with no apostrophe whereas symmetrical features at a mesial side of the occlusogingival plane P are assigned a reference number with an apostrophe. In the discussion of FIGS. 73-75B below, the symmetrical features at the distal side of the occlusogingival plane P may be referred to as "distal" whereas the symmetrical features at the mesial side of the occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth. Also, "occlusal" and "gingival" features can be occlusal and gingival, respectively, when the appliance is installed in the illustrated orientation or be gingival and occlusal, respectively, when the appliance is installed in an opposite orientation rotated 180 degrees about a buccolingual axis relative to the illustrated orientation.

Referring to FIG. 73, the attachment portion 7300 can comprise a head 7302. In some embodiments, the attachment portion 7300 comprises the head 7302 and at least a portion of the connector 7303 that is continuous with the head 7302. The connector 7303, for example, can comprise a second connector as previously described herein and/or can extend gingivally away from a gingival portion of the head 7302. The connector 7303 can have features similar to any of the connectors disclosed herein (e.g., first connectors, second connectors, third connectors, etc.) and can comprise a single connector or multiple connectors. For example, the connector 7303 can comprise a single, occlusogingivally extending connector (as shown in FIG. 73), multiple occlusogingivally extending connectors, one or more occlusogingivally extending connectors and one or more mesiodistally extending connectors branching off of the one or more occlusogingivally extending connectors and/or the attachment portion 7300, or one or more mesiodistally extending connectors (and no occlusogingivally extending connectors). Accordingly, the attachment portion 7300 can be connected to a single connector or to multiple connectors also referred to herein as a connector 7303. The connector 7303 can connect to the head 7302 at a variety of locations. For example, a gingivally extending connector can connect to a gingival portion of the head 7302. Any connector 7303 disclosed herein can extend away from the head 7302 along a variety of dimensions (e.g., along an occlusogingival dimension, a mesiodistal dimension, a buccolingual dimension, etc.).

The head 7302 can have a front surface (facing out of the page) and a back surface (not visible in FIG. 73), and a thickness t (labeled in FIG. 75A) measured between the front and back surfaces. In some embodiments, the head 7302 and the connector 7303 are part of the same, monolithic piece of material (e.g., cut from a sheet of material, a 3D-printed piece, etc.). Thus, the head 7302 and the connector 7303 may refer to different portions of the same continuous component. The attachment portion 7300 can be one portion of a greater orthodontic appliance, or may be formed separately and attached to an orthodontic appliance. The attachment portion 7300 and/or the corresponding appliance can be cut from the same sheet of material and/or may be formed by molding, casting, machining, 3D printing, stamping, extruding, or the like. The attachment portion 7300 may comprise a metal or a plastic and may have superelastic and/or shape memory properties. In some embodiments, the attachment portion 7300 does not have superelastic and/or shape memory properties.

As parts of the head 7302, the attachment portion 7300 can comprise various structures associated with one or more functional objectives. These functional objectives can include establishing and maintaining a secure connection between the attachment portion 7300 and the securing member 7400 when the attachment portion 7300 is in the attached state, establishing and maintaining efficient transfer of orthodontic force from the appliance to the tooth via the attachment portion 7300 and the securing member 7400 when the attachment portion 7300 is in the attached state, allowing convenient movement of the attachment portion 7300 from the attached state to the detached state, allowing convenient movement of the attachment portion 7300 from the detached state to the attached state, and providing a tactile indication of movement of the attachment portion 7300 to the attached state, among others.

With reference to FIG. 73, the attachment portion 7300 at the head 7302 can comprise a centrally positioned base 7304 and distal and mesial branches 7307, 7307' extending distally and mesially, respectively, from the base 7304. The base 7304 can comprise an elongate member forming a closed loop and extending along a longitudinal axis L1 from a first end portion 7328*a* to a second end portion 7328*b*. Starting at the first end portion 7328*a* and extending along the longitudinal axis L1 to the second end portion 7328*b*, the base 7304 can include a gingivally located first base region 7304*a*, a second base region 7304*b* continuous with and extending occlusally from the first base region 7304*a*, a third base region 7304*c* continuous with and extending distally from the second base region 7304*b*, a fourth base region 7304*d* continuous with and extending occlusally from the third base region 7304*c*, a fifth base region 7304*e* continuous with and extending mesially from the fourth base region 7304*d*, a sixth base region 7304*f* continuous with and extending gingivally from the fifth base region 7304*e*, a seventh base region 7304*g* continuous with and extending distally from sixth first base region 7304*f*, and an eighth base region 7304*h* continuous with and extending gingivally from the seventh base region 7304*g*.

The distal branch 7307 can comprise an elongate member extending along a longitudinal axis L2 from a first end portion 7308*a* to a second end portion 7308*b*. Starting at the first end portion 7308*a* and extending along the longitudinal axis L2 to the second end portion 7308*b*, the distal branch 7307 can include a first branch region 7307*a* continuous with and extending distally from the first base region 7304*a* and a second branch region 7307*b* continuous with and extending occlusally from the first branch region 7307*a*. The mesial branch 7307' can include features as described for the distal branch 7307 but mirrored about the occlusogingival plane P.

The base 7304 can at least partially enclose and define a T-shaped opening 7330 and can comprise an interior surface 7325 at the opening 7330 and an exterior surface 7327 spaced apart from the opening 7330. In at least some cases, the opening 7330 is sized to receive a tool in a first orientation (e.g. an occlusogingival orientation) to facilitate securing the attachment portion 7300 to the securing member 7400 and/or to receive the same or a different tool in a second orientation (e.g. a mesiodistal orientation) to facilitate detaching the attachment portion 7300 from the securing member 7400. The base 7304 can have a width w1 measured between the interior surface 7325 and the exterior surface 7327. Similarly, the branches 7307, 7307' can have respective widths w2, w2' perpendicular to the respective lengths L2, L2'. The base 7304 and/or branches 7307, 7307' can have a substantially constant thickness or may have a varying thickness. Likewise, the base 7304 and/or branches 7307, 7307' can have a substantially constant width or may have a varying width. A width and/or thickness of the base 7304 and/or branches 7307, 7307' can be varied, for example, to impart a preferred stiffness profile to all or a portion of the base 7304 and/or branches 7307, 7307'. Gaps 7348, 7348' between the branches 7307, 7307' and the base 7304 can accommodate mesiodistal movement of the branches 7307, 7307' toward one another.

According to various embodiments, one or more regions of the branches 7307, 7307' can include a portion along which the width w2, w2' is greater than at other portions. For example, as shown in FIG. 73, the second branch portion 7307*b* can include a protuberance 7336 at an occlusalmost portion thereof. At the protuberance 7336, the exterior surface of the branch 7307 can form first and second ramped surfaces 7317 and 7314 that meet at an apex 7321. As described in greater detail below, the first ramped surface 7317 can be configured to force the branch 7307 to bend or rotate when engaging a protrusion of the securing member 7400 as the attachment portion 7300 moves from the detached state toward the attached state. In addition or alternatively, the second ramped surface 7314 can be configured to force the branch 7307 to bend or rotate when engaging a protrusion of the securing member 7400 as the attachment portion 7300 moves from the attached state toward the detached state. The mesial branch 7307' can include a protuberance 7336' and associated features as described for the distal branch 7307 but mirrored about the occlusogingival plane P.

A portion of the exterior surface 7327 of the base 7304 at the third base region 7304*c* can form a ledge 7340. The ledge 7340, a portion of the exterior surface 7327 of the base 7304 at the second base region 7304*c*, and a corner therebetween can comprise a shoulder that is configured to engage a portion of a protrusion of the securing member 7400 when the attachment portion 7300 is secured to the securing member 7400 to oppose rotational and/or translational movement of the base 7304. The mesial side of the base 7304 can include the same or similar features but mirrored about the occlusogingival plane P.

Figure 74:
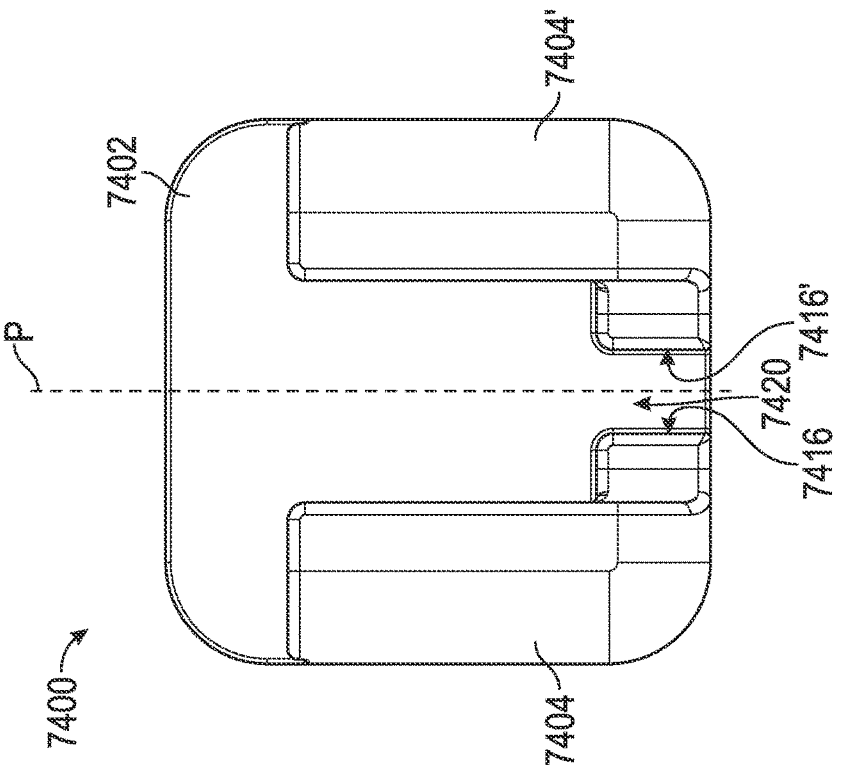
FIG. 74 is a front view of a securing member configured in accordance with several embodiments of the present technology.

FIG. 74 is a front view of the securing member 7400 configured for use with the attachment portion 7300. The securing member 7400 has a first side (facing out of the page) and a second side (not visible in FIG. 74) opposite the first side along a thickness of the securing member 7400 and configured to be bonded to a patient's tooth. The securing member 7400 can comprise a backing 7402 and distal and mesial protrusions 7404, 7404' carried by and extending away from the first side of the backing 7402 along a buccolingual dimension. The protrusions 7404, 7404' can be configured to engage the attachment portion 7300 and to retain the attachment portion 7300 at a specific location relative to the backing 7402 and the patient's tooth. Furthermore, as discussed below, the protrusions 7404, 7404' can be configured to support a lever used to move the attachment portion 7300 from the attached state toward the detached state.

Portions of the protrusions 7404, 7404' closest to the backing 7402 can be configured to engage portions of the attachment portion 7300 to prevent or limit motion of the attachment portion 7300 in an occlusogingival dimension when the attachment portion 7300 is in the attached state. For example, the securing member 7400 at the protrusion 7404 can define a recess 7406 in which the protuberance 7336 of the attachment portion 7300 is seated when the attachment portion 7300 is in the attached state. The securing member 7400 at the recess 7406 can include a first securing surface 7408 that, together with the second ramped surface 7314 of the protuberance 7336 of the attachment portion 7300 (as a second securing surface) conformably restricts occlusal movement of the attachment portion 7300 relative to the securing member 7400 when the attachment portion 7300 is in the attached state. The securing member 7400 at the protrusion 7404 can also define a ledge 7410 that can act as a third securing surface and, together with the ledge 7340 of the base 7304 of the attachment portion 7300 (as a fourth securing surface) conformably restricts gingival movement of the attachment portion 7300 relative to the securing member 7400 when the attachment portion 7300 is in the attached state. The mesial protrusion 7404' can define a recess a 7406', a ledge 7410', and other features as described for the distal protrusion 7404 but mirrored about the occlusogingival plane P.

In some embodiments, the protrusion 7404 has a first region extending lingually (or buccally, depending on which side of the tooth the securing member 7400 is attached) away from the backing 7402 and a second region extending away from the first region towards the occlusogingival plane P and spaced apart from the backing 7402 by a gap along the buccolingual dimension. This gap can have a depth that is slightly greater than a thickness t of the attachment portion 7300 so that the attachment portion 7300 can fit between the second region of the protrusion 7404 and the backing 7402. The protrusion 7404 can include an inner surface (not visible) facing towards the backing 7402 and configured to prevent or limit lingual (or buccal) movement of the attachment portion 7300. The distal protrusion 7404 can also include an inner surface 7416 (only visible in FIG. 75B) configured to engage the second base region 7304*b* of the attachment portion 7300 and prevent or limit mesial or distal movement of the attachment portion 7300. In at least some cases, the inner surface 7416 of the protrusion 7404 and the exterior surface 7327 of the second base region 7304*b* of the attachment portion 7300 are primary force-transferring surfaces through which active and/or retentive orthodontic force is transferred to the tooth. In addition or alternatively, other surfaces of the securing member 7400 and the attachment portion 7300 that contact one another when the attachment portion 7300 is in the attached state can serve as force-transferring surfaces. The mesial protrusion 7404' can have features as described for the distal protrusion 7404 but mirrored about the occlusogingival plane P.

Figure 75B:
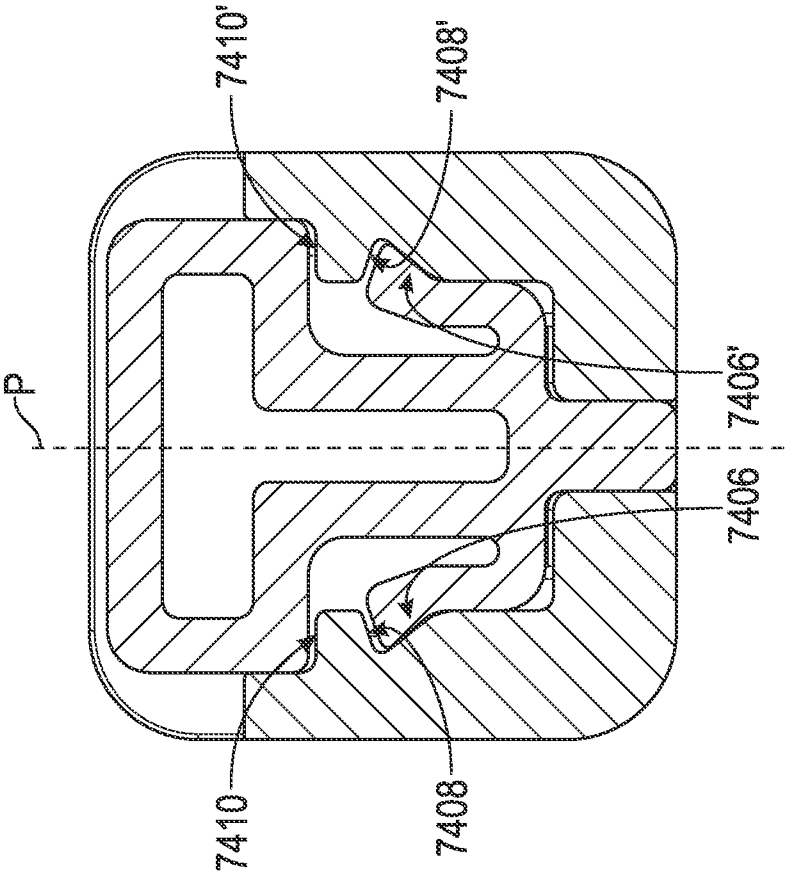
FIGS. 75A and 75B are different views of an attachment portion secured to a securing member in accordance with several embodiments of the present technology.
Figure 75A:
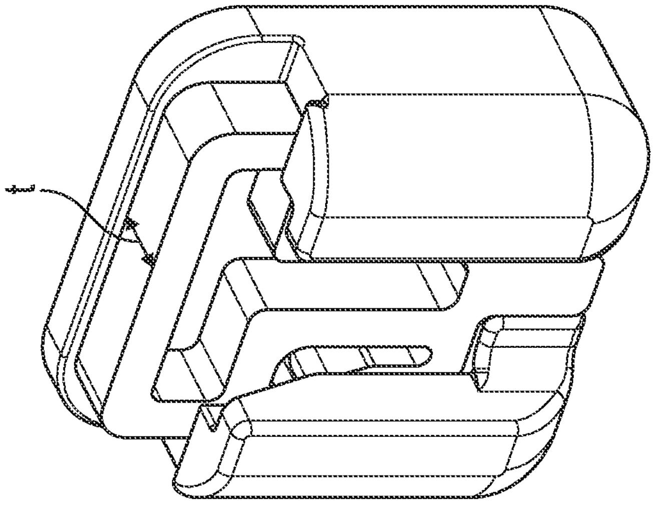

The protrusions 7404, 7404' can be spaced apart from one another by a gap 7420 along the mesiodistal dimension. The gap 7420 can be sized to at least partially receive a portion of the connector 7303 connected to the head 7302 of the attachment portion 7300. Referring to FIGS. 75A and 75B, in the secured state, the attachment portion 7300 can be positioned proximate and/or against the backing 7402 of the securing member 7400 and bound between the protrusions 7404, 7404'. The connector 7303 can also be positioned between the protrusions 7404, 7404' (e.g., within the gap 7420). Additionally or alternatively, the distal arm 7306 can be positioned buccolingually between the distal protrusion 7404 and the backing 7402 and the mesial arm 7306' can be positioned buccolingually between the mesial protrusion 7404' and the backing 7402.

The attachment portion 7300 can comprise a resilient and/or superelastic material such that, when the attachment portion 7300 is braced between the protrusions 7404, 7404', the attachment portion 7300 actively exerts an outward force on the surrounding surfaces. For example, the exterior surface of the branch 7307 and the exterior surface 7327 of the base 7304 can abut and press distally and gingivally against the distal protrusion 7404 via the inner surface 7416 and the ledge 7410.

In the secured position, the attachment portion 7300 can be releasably secured to the securing member 7400 such that it cannot be inadvertently displaced or prematurely or inadvertently released by typical patient activity (such as chewing). The attachment portion 7300 (or one or more portions thereof) can be configured to press outwardly on the securing member 7400 when in the secured position. Active and/or continuous outward force exerted by the attachment portion 7300 on the securing member 7400 can advantageously eliminate or reduce play between the attachment portion 7300 and the securing member 7400 along a mesiodistal dimension, an occlusogingival dimension, and/or a buccolingual dimension, thus providing a more accurate and efficient transfer of force from the appliance to the tooth. In some embodiments, the attachment portion 7300 (or one or more portions thereof) does not chronically press outwardly on the securing member 7400 and is instead configured to engage the securing member 7400 if the attachment portion 7300 moves into contact with and/or moves such that it exerts a force on one or more portions of the securing member 7400. Thus, the securing member 7400 can be configured to limit movement of the attachment portion 7300 relative to the securing member 7400. In some embodiments, one or more of the securing surfaces is configured for transferring orthodontic force between the attachment portion 7300 (e.g., to and/or from the connector 7303, to and/or from the rest of the appliance, etc.) and the securing member 7400 (e.g., to and/or from the tooth, etc.). In various embodiments, one or more of the securing surfaces does not substantially transfer orthodontic force between the attachment portion 7300 and the securing member 7400.

The attachment portion 7300 of FIGS. 73, 75A and 75B can be secured to the securing member 7400 by positioning the attachment portion 7300 proximate the securing member 7400 and moving the attachment portion 7300 along an occlusogingival path. The connector 7303 and/or other portion of the appliance continuous with the head 7302 of the attachment portion 7300 can be positioned relative to the securing member 7400 such that at least a portion of the head 7302 is positioned occlusally of the protrusions 7404, 7404' of the securing member 7400 and/or at, near, and/or occlusally of an occlusal edge of the backing 7402. The portion of the connector 7303 connected to the head 7302 can be positioned within the mesiodistal gap 7420 between the protrusions 7404, 7404' of the securing member 7400. In some embodiments, the back surface of the attachment portion 7300 can be positioned proximate and/or in contact with the backing 7402 of the securing member 7400. In some embodiments, an operator slides the connector 7303 and head 7302 occlusogingivally by positioning a tool (e.g., tool 800 in FIG. 8) within the opening 7330 and moving the tool occlusogingivally. The tool can contact the first base region 7304*a* when sliding the tool gingivally to insert the attachment portion 7300. Continued gingival movement of the connector 7303 and/or head 7302 can force the first ramped surfaces 7317, 7317' at the first protuberances 7336, 7336' into contact with the protrusions 7404, 7404', respectively. Because of the shapes and positions of the first ramped surfaces 7317, 7317', occlusogingival force applied to the exterior surfaces 7319, 7319' along the first ramped surfaces 7317, 7317' when the first ramped surfaces 7317, 7317' contact the protrusions 7404, 7404' can force the branches 7307, 7307' to bend mesiodistally. Once the apexes 7321, 7321' are aligned occlusogingivally with the recesses 7406, 7406', the branches 7307, 7307' can bend back towards their shapes in the relaxed state, thereby wedging the attachment portion 7300 between the protrusions 7404, 7404' as shown in FIGS. 75A and 75B.

The attachment portion 7300 can comprise distal and mesial flexures 7332, 7332' configured to bend and/or otherwise deform to facilitate securing of the attachment portion 7300 to the securing member 7400. In some embodiments, the flexures 7332, 7332' comprise all or portions of the branches 7307, 7307'. The branches 7307, 7307', for example, can be configured to bend in a first direction to facilitate or enable sliding of the attachment portion 7300 gingivally to secure to the securing member 7400 and/or the branches 7307, 7307' can be configured to bend in a second, opposite direction to facilitate or enable locking of the attachment portion 7300 to the securing member 7400. Furthermore, the flexures 7332, 7332' can carry the protuberances 7336, 7336' and surfaces thereof. In some embodiments, deformation of the flexures 7332, 7332' causes one or more portions of the attachment portion 7300 to rotate. Moreover, the flexures 7332, 7332' can comprise other regions of the attachment portion 7300 in addition to or instead of the branches 7307, 7307'. In the illustrated embodiment, deformation of the flexures 7332, 7332' while moving the attachment portion 7300 from the detached state to the attached state is primarily a mesiodistal dimension. In other embodiments, this deformation can be primarily in a buccolingual dimension and/or equally in mesiodistal and buccolingual dimensions. In any of these cases, the deformation can also be occlusogingival.

To release the attachment portion 7300 from the securing member 7400, the attachment portion 7300 can be configured to deform and/or rotate relative to the securing member 7400. For example, an operator can insert a tool, such as the distal end surface 808 of the tool 800 (FIG. 8), into a mesiodistal portion of the opening 7430 defined by the base 7304. An occlusal end of the tool surface can be positioned proximate portions of the interior surface 7325 of the base 7304 at the fifth and ninth base regions **7304*e*, 7304*i*. The portions of the portions of the interior surface 7325 of the base 7304 at the fifth and ninth base regions 7304*e*, 7304*i* that contact the tool can serve as leveraging surfaces through which the tool exerts leverage on the attachment portion 7300. For example, the securing member 7400 can include distal and mesial fulcrums 7422, 7422' at the protrusions 7404, 7404' that support the tool while the tool exerts the leveraging force on the attachment portion 7300. In at least some embodiments, the leveraging surfaces together and the slot formed by the opening 7330 are elongate with lengths substantially perpendicular (e.g., within degrees of perpendicular) to an occlusogingival axis. This can dictate horizontal positioning of the distal end surface 808 of the tool 800 to increase contact between the tool and the attachment portion 7300**.

The operator can rotate the tool about a mesiodistal dimension while supported by the fulcrums 7422, 7422'. Accordingly, the tool can act as a lever. Leverage from the tool exerted on the attachment portion 7300 via the leveraging surface can forcefully move the attachment portion 7300 occlusally such that sliding contact between the second ramped surfaces 7314, 7314' of the protuberances 7336, 7336' and the inner surfaces 7416, 7416' of the protrusions 7404, 7404' causes the flexures 7332, 7332' to resiliently deform in a mesiodistal dimension sufficiently to allow the first protuberances 7336, 7336' to exit the recesses 7406, 7406'. In connection with this deformation, the gaps 7348, 7348' can at least partially close and then open. In some embodiments, the attachment portion 7300 pops and/or snaps free of the securing member 7400 once the first protuberances 7336, 7336' clear the inner surfaces 7416, 7416' of the protrusions 7404, 7404'. With or without the tool, the attachment portion 7300 can then be pulled away from the backing 7402 along the buccolingual dimension.

The use of leverage (e.g., by incorporation of the fulcrums 7422, 7422' into the protrusions 7404, 7404') can allow the practical application of greater occlusal force to the attachment portion 7300 than would otherwise be possible. Accordingly, the second ramped surfaces 7314, 7314' of the protuberances 7336, 7336' and the corresponding portions of the inner surfaces 7416, 7416' of the protrusions 7404, 7404' can be closer to perpendicular to the occlusogingival plane P than the first ramped surfaces 7317, 7317' of the protuberances 7336, 7336' and the corresponding portions of the inner surfaces 7416, 7416' of the protrusions 7404, 7404'. This can be useful, for example, because the second ramped surfaces 7314, 7314' may act as second securing surfaces limiting occlusal movement of the attachment portion 7300 relative to the securing member 7400 in addition to acting as surfaces that transfer occlusogingival force from the lever into mesiodistal force that resiliently deforms the flexures 7332, 7332' during the detaching process. In contrast, the second protuberance 7337, 7337 can limit gingival movement of the attachment portion 7300 relative to the securing member 7400, thereby reducing or eliminating any need for the first ramped surfaces 7317, 7317' to perform this function.

The location at which the connector 7303 connects to the head 7302, a dimension along which the connector 7303 extends, a property of the connector 7303, etc. can be at least partially based on a force to be imparted on a tooth to which the attachment portion 7300 is configured to be secured (and/or an intended movement of the tooth). For example, as previously noted, movement of the attachment portion 7300 between the attached state to the detached state can include movement of the branches 7307, 7307' in a mesiodistal dimension. Thus, to avoid any movement of a connector 7303 unintentionally causing the attachment portion 7300 to move toward the detached state during treatment and/or to avoid inhibiting useful movement of the branches 7307, 7307' related to attaching and/or detaching processes, the connector 7303 can connect to a portion of the attachment portion 7300 away from the branches 7307, 7307' and in particular a location that would not cause movement of the branches 7307, 7307' in any way that is biased towards disengagement from the securing member 7400. In some cases, for example as shown in FIG. 73, the connector 7303 is continuous with the base 7304 of the head 7302 but not the branches 7307, 7307'. Such a configuration can prevent or limit the connector 7303 from applying forces to the branches 7307, 7307' that inadvertently cause the flexures 7332, 7332' to deform during orthodontic treatment. The location at which the connector 7303 connects to the head 7302, a dimension along which the connector 7303 extends, a property of the connector 7303, etc. can at least partially be based on the mechanism by which the attachment portion 7300 is attached to and/or detached from the securing member 7400 and/or the geometry of the securing member 7400.

Figure 76:
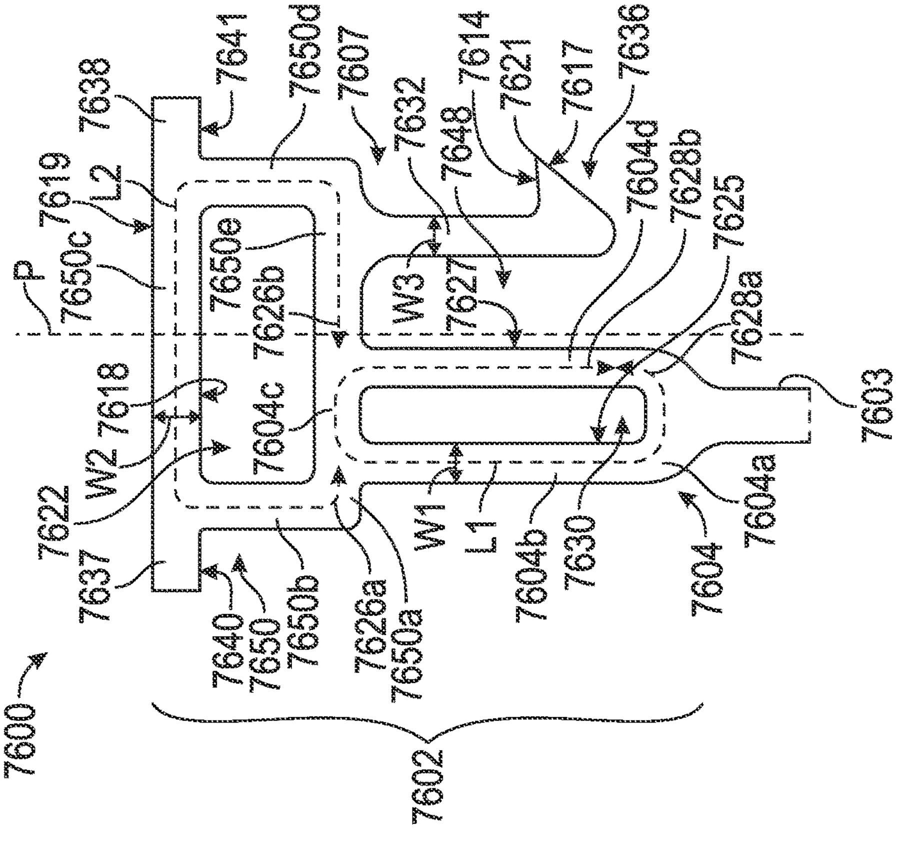
FIG. 76 is a front view of an attachment portion configured in accordance with several embodiments of the present technology.

FIG. 76 shows a planar view of an attachment portion 7600 configured in accordance with several embodiments of the present technology. The attachment portion 7600 can be configured to be secured to a patient's tooth via a securing member, such as securing member 7700 shown in FIG. 77. The attachment portion 7600 and the securing member 7700 are shown in a secured arrangement in FIGS. 78A and 78B. As discussed in greater detail below, the attachment portion 7600 and the securing member 7700 can be configured such that the attachment portion 7600 can be releasably secured to the securing member 7700. The attachment portion 7600 can be continuous with a connector 7603 that connects the attachment portion 7600 to one or more additional portions (not shown) of the overall orthodontic appliance. The attachment portion 7600 can have an attached state in which the orthodontic appliance exerts active and/or retentive orthodontic force (e.g., from a biasing portion (not shown) of the orthodontic appliance) on the tooth via the connector 7603, the attachment portion 7600, and the securing member 7700. Correspondingly, the attachment portion 7600 can have a detached state in which the orthodontic appliance is operably disconnected from the securing member 7700.

The attachment portion 7600 can be configured to move from the detached state to the attached state in response to relative movement between the attachment portion 7600 and the securing member 7700 in an occlusogingival dimension. This relative movement and/or another action can cause the attachment portion 7600 to resiliently deform and then at least partially return to its original form. In this or another manner, the attachment portion 7600 can pop and/or snap from the detached state to the attached state. Furthermore, the attachment portion 7600 can be configured to move from the attached state toward the detached state in response to leverage. These and other features of processes for moving the attachment portion 7600 between the attached and detached states as well as structures of the attachment portion 7600 and the securing member 7700 associated with these features are further discussed below with reference to FIGS. 76-78B.

Referring to FIG. 76, the attachment portion 7600 can comprise a head 7602. In some embodiments, the attachment portion 7600 comprises a head 7602 and at least a portion of the connector 7603 that is continuous with the head 7602. The connector 7603, for example, can comprise a second connector as previously described herein and/or can extend gingivally away from a gingival portion of the head 7602. The connector 7603 can have features similar to any of the connectors disclosed herein (e.g., first connectors, second connectors, third connectors, etc.) and can comprise a single connector or multiple connectors. For example, the connector 7603 can comprise a single, occlusogingivally extending connector (as shown in FIG. 76), multiple occlusogingivally extending connectors, one or more occlusogingivally extending connectors and one or more mesiodistally extending connectors branching off of the one or more occlusogingivally extending connectors and/or the attachment portion 7600, or one or more mesiodistally extending connectors (and no occlusogingivally extending connectors). Accordingly, the attachment portion 7600 can be connected to a single connector or to multiple connectors also referred to herein as a connector 7603. The connector 7603 can connect to the head 7602 at a variety of locations. For example, a gingivally extending connector can connect to a gingival portion of the head 7602. Any connector 7603 disclosed herein can extend away from the head 7602 along a variety of dimensions (e.g., along an occlusogingival dimension, a mesiodistal dimension, a buccolingual dimension, etc.).

The head 7602 can have a front surface (facing out of the page) and a back surface (not visible in FIG. 76), and a thickness t (labeled in FIG. 78A) measured between the front and back surfaces. In some embodiments, the head 7602 and the connector 7603 are part of the same, monolithic piece of material (e.g., cut from a sheet of material, a 3D-printed piece, etc.). Thus, the head 7602 and the connector 7603 may refer to different portions of the same continuous component. The attachment portion 7600 can be one portion of a greater orthodontic appliance, or may be formed separately and attached to an orthodontic appliance. The attachment portion 7600 and/or the corresponding appliance can be cut from the same sheet of material and/or may be formed by molding, casting, machining, 3D printing, stamping, extruding, or the like. The attachment portion 7600 may comprise a metal or a plastic and may have superelastic and/or shape memory properties. In some embodiments, the attachment portion 7600 does not have superelastic and/or shape memory properties.

As parts of the head 7602, the attachment portion 7600 can comprise various structures associated with one or more functional objectives. These functional objectives can include establishing and maintaining a secure connection between the attachment portion 7600 and the securing member 7700 when the attachment portion 7600 is in the attached state, establishing and maintaining efficient transfer of orthodontic force from the appliance to the tooth via the attachment portion 7600 and the securing member 7700 when the attachment portion 7600 is in the attached state, allowing convenient movement of the attachment portion 7600 from the attached state to the detached state, allowing convenient movement of the attachment portion 7600 from the detached state to the attached state, and providing a tactile indication of movement of the attachment portion 7600 to the attached state, among others.

With reference to FIG. 76, the attachment portion 7600 at the head 7602 can comprise a distally positioned base 7604, an occlusally positioned loop 7650 and a mesially positioned branch 7607 extending gingivally from the loop 7650. The base 7604 can comprise an elongate member forming a closed loop and extending along a longitudinal axis L1 from a first end portion 7628*a* to a second end portion 7628*b*. Starting at the first end portion 7628*a* and extending along the longitudinal axis L1 to the second end portion 7628*b*, the base 7604 can include a gingivally located curved first base region 7604*a*, a second base region 7604*b* continuous with and extending occlusally from the first base region 7604*a*, an occlusally located third base region 7604*c* continuous with and extending mesially from the second base region 7604*b*, and a fourth base region 7604*d* continuous with and extending gingivally from the third base region 7604*c*. The base 7604 can at least partially enclose and define an opening 7630 and can comprise an interior surface 7625 at the opening 7630 and an exterior surface 7627 spaced apart from the opening 7630. In at least some cases, the opening 7630 is sized to receive a tool to facilitate securing the attachment portion 7600 to the securing member 7700.

The loop 7650 can comprise an elongate member extending along a longitudinal axis L2 from a first end portion 7626*a* to a second end portion 7626*b*. Starting at the first end portion 7626*a* and extending along the longitudinal axis L2 to the second end portion 7626*b*, the loop 7650 can include a first loop region 7650*a* continuous with and extending distally from the third base region 7604*c*, a second loop region 7650*b* continuous with and extending occlusally from the first loop region 7650*a*, a third loop region 7650*c* continuous with and extending mesially from the second loop region 7650*b*, a fourth loop region 7650*d* continuous with and extending gingivally from the third loop region 7650*c*, and a fifth loop region 7650*e* continuous with and extending distally from the fourth loop region 7650*d*. The loop 7650 can enclose and define an interior region 7622 and can comprise an interior surface 7618 at the interior region 7622 and an exterior surface 7619 spaced apart from the interior region 7622. The interior region 7622 can form a slot shaped to receive a tool used to move the attachment portion 7600 from the attached state toward the detached state. The branch 7607 can comprise an elongate member extending gingivally from the fifth loop region 7650*e*.

The base 7604 can have a width w1 measured between the interior surface 7625 and the exterior surface 7627. Similarly, the loop 7650 can have a width w2 measured between the interior surface 7618 and the exterior surface 7619. Also similarly, the branch 7607 can have a mesiodistal width w3. The base 7604, loop 7650, and/or branch 7607 can have a substantially constant thickness or may have a varying thickness. Likewise, the base 7604, loop 7650, and/or branch 7607 can have a substantially constant width or may have a varying width. A width and/or thickness of the base 7604, loop 7650, and/or branch 7607 can be varied, for example, to impart a preferred stiffness profile to all or a portion of the base 7604, loop 7650, and/or branch 7607. A gap 7648 between the branch 7607 and the base 7604 can accommodate mesiodistal movement of the branch 7607. The loop 7650 can include a distal protuberance 7637 extending distally from a distal end of the third loop region 7650*c* and a mesial protuberance 7638 extending mesially from a mesial end of the third loop region 7650*c*. At the distal and mesial protuberances 7637, 7638, the exterior surface 7619 of the loop 7650 can form distal and mesial ledges 7640, 7641, respectively.

According to various embodiments, one or more regions of the branch 7607 can include a portion along which the width w3 is greater than at other portions. For example, as shown in FIG. 76, the branch 7607 can include a protuberance 7636 at a gingivalmost portion thereof. At the protuberance 7636, the branch 7607 can include first and second ramped surfaces 7617, 7614 that meet at an apex 7621. As described in greater detail below, the first ramped surface 7617 can be configured to force the branch 7607 to bend or rotate when engaging a protrusion of the securing member 7700 as the attachment portion 7600 moves from the detached state toward the attached state. In addition or alternatively, the second ramped surface 7614 can be configured to force the branch 7607 to bend or rotate when engaging a protrusion of the securing member 7700 as the attachment portion 7600 moves from the attached state toward the detached state.

Figure 77:
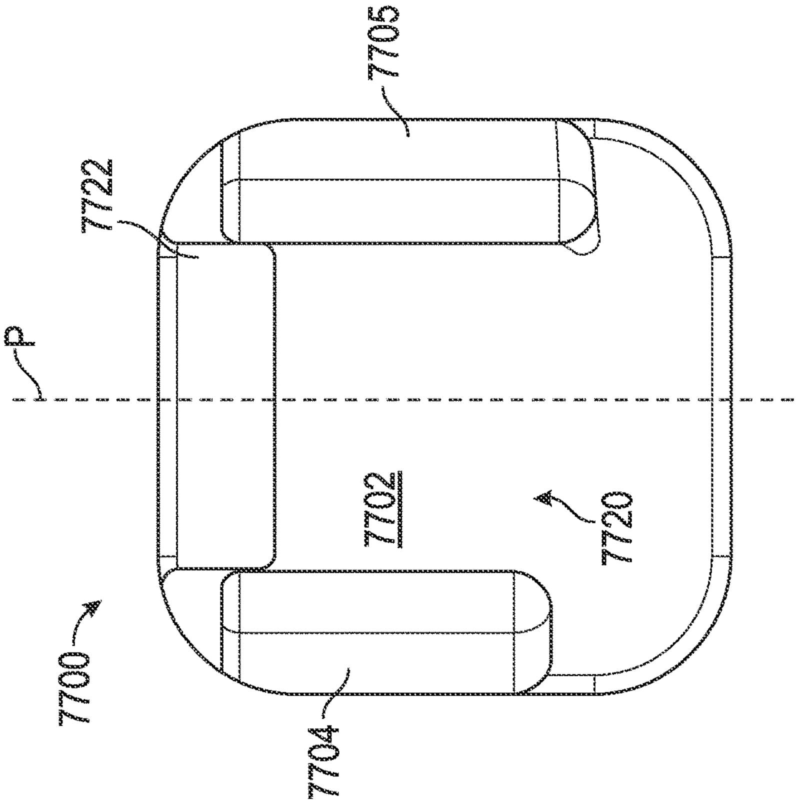
FIG. 77 is a front view of a securing member configured in accordance with several embodiments of the present technology.

FIG. 77 is a front view of the securing member 7700 configured for use with the attachment portion 7600. The securing member 7700 has a first side (facing out of the page) and a second side (not visible in FIG. 77) opposite the first side along a thickness of the securing member 7700 and configured to be bonded to a patient's tooth. The securing member 7700 can comprise a backing 7702 and distal and mesial protrusions 7704, 7705 carried by and extending away from the first side of the backing 7702 along a buccolingual dimension. The protrusions 7704, 7705 can be configured to engage the attachment portion 7600 and to retain the attachment portion 7600 at a specific location relative to the backing 7702 and the patient's tooth. Furthermore, as discussed below, the backing 7702 can be configured to support a lever used to move the attachment portion 7600 from the attached state toward the detached state.

Portions of the distal and mesial protrusions 7704, 7705 closest to the backing 7702 can be configured to engage portions of the attachment portion 7600 to prevent or limit motion of the attachment portion 7600 in an occlusogingival dimension when the attachment portion 7600 is in the attached state. The securing member 7700 at the mesial protrusion 7705 can define a first securing surface 7708 that, together with the second ramped surface 7614 of the branch 7607 of the attachment portion 7600 (as a second securing surface) conformably restricts occlusal movement of the attachment portion 7600 relative to the securing member 7700 when the attachment portion 7600 is in the attached state. The securing member 7700 at the mesial protrusion 7705 can also define a ramped surface 7718 that meets the first securing surface at an apex 7718. The securing member 7700 at the distal and mesial protrusions 7704, 7705 can further define distal and mesial third securing surfaces 7712, 7713, respectively, that, together with the ledges 7640, 7541 (as fourth securing surfaces) conformably restrict gingival movement of the attachment portion 7600 relative to the securing member 7700 when the attachment portion 7600 is in the attached state.

In some embodiments, the distal and mesial protrusions 7704, 7705 have first regions extending lingually (or buccally, depending on which side of the tooth the securing member 7700 is attached) away from the backing 7702 and second regions extending away from the first regions towards the occlusogingival plane P and spaced apart from the backing 7702 by a gap along the buccolingual dimension. This gap can have a depth that is slightly greater than a thickness t of the attachment portion 7600 so that the attachment portion 7600 can fit between the second region of the distal and mesial protrusions 7704 and the backing 7702. The distal and mesial protrusions 7704, 7705 can include respective inner surfaces (not visible) facing towards the backing 7702 and configured to prevent or limit lingual (or buccal) movement of the attachment portion 7600. The distal and mesial protrusions 7704, 7705 can also include respective inner surfaces 7716, 7717 (only visible in FIG. 78B) configured to engage the exterior surface 7619 of the loop 7650 at the second and fourth loop regions 7650*b*, 7650*d*, respectively, and thereby prevent or limit mesial or distal movement of the attachment portion 7600. In at least some cases, the inner surfaces 7716, 7717 and the corresponding portions of the exterior surface 7619 of the loop 7650 are primary force-transferring surfaces through which active and/or retentive orthodontic force is transferred to the tooth. In addition or alternatively, other surfaces of the securing member 7700 and the attachment portion 7600 that contact one another when the attachment portion 7600 is in the attached state can serve as force-transferring surfaces.

Figure 78B:
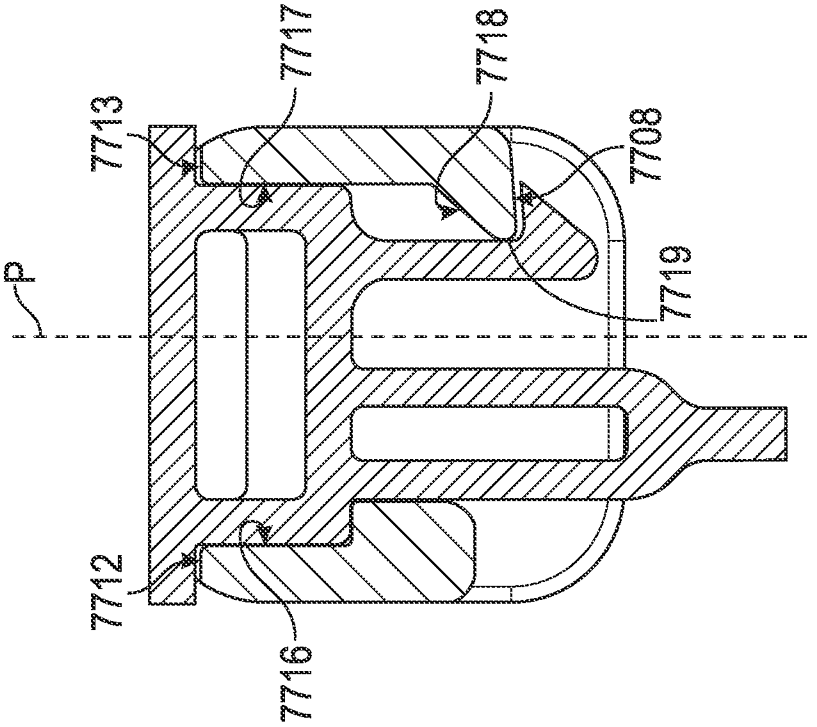
FIGS. 78A and 78B are different views of an attachment portion secured to a securing member in accordance with several embodiments of the present technology.
Figure 78A:
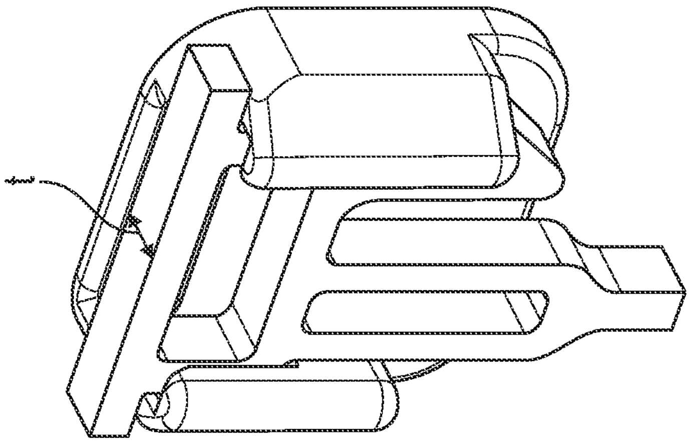

The distal and mesial protrusions 7704, 7705 can be spaced apart from one another by a gap 7720 along the mesiodistal dimension. The gap 7720 can be sized to at least partially receive the loop 7650 and/or a portion of the connector 7603 connected to the head 7602 of the attachment portion 7600. Referring to FIGS. 78A and 78B, in the secured state, the attachment portion 7600 can be positioned proximate and/or against the backing 7702 of the securing member 7700 and bound between the distal and mesial protrusions 7704, 7705. The connector 7603 can also be positioned between the distal and mesial protrusions 7704, 7705 (e.g., within the gap 7720) or be gingivally spaced apart from the distal and mesial protrusions 7704, 7705. The attachment portion 7600 can comprise a resilient and/or superelastic material such that, when the attachment portion 7600 is braced between the distal and mesial protrusions 7704, 7705, the attachment portion 7600 actively exerts an outward force on the surrounding surfaces.

In the secured position, the attachment portion 7600 can be releasably secured to the securing member 7700 such that it cannot be inadvertently displaced or prematurely or inadvertently released by typical patient activity (such as chewing). The attachment portion 7600 (or one or more portions thereof) can be configured to press outwardly on the securing member 7700 when in the secured position. Active and/or continuous outward force exerted by the attachment portion 7600 on the securing member 7700 can advantageously eliminate or reduce play between the attachment portion 7600 and the securing member 7700 along a mesiodistal dimension, an occlusogingival dimension, and/or a buccolingual dimension, thus providing a more accurate and efficient transfer of force from the appliance to the tooth. In some embodiments, the attachment portion 7600 (or one or more portions thereof) does not chronically press outwardly on the securing member 7700 and is instead configured to engage the securing member 7700 if the attachment portion 7600 moves into contact with and/or moves such that it exerts a force on one or more portions of the securing member 7700. Thus, the securing member 7700 can be configured to limit movement of the attachment portion 7600 relative to the securing member 7700. In some embodiments, one or more of the securing surfaces is configured for transferring orthodontic force between the attachment portion 7600 (e.g., to and/or from the connector 7603, to and/or from the rest of the appliance, etc.) and the securing member 7700 (e.g., to and/or from the tooth, etc.). In various embodiments, one or more of the securing surfaces does not substantially transfer orthodontic force between the attachment portion 7600 and the securing member 7700.

The attachment portion 7600 of FIGS. 76, 78A and 78B can be secured to the securing member 7700 by positioning the attachment portion 7600 proximate the securing member 7700 and moving the attachment portion 7600 along an occlusogingival path. The connector 7603 and/or other portion of the appliance continuous with the head 7602 of the attachment portion 7600 can be positioned relative to the securing member 7700 such that at least a portion of the head 7602 is positioned occlusally of the distal and mesial protrusions 7704, 7705 of the securing member 7700 and/or at, near, and/or occlusally of an occlusal edge of the backing 7702. The portion of the connector 7603 connected to the head 7602 can be positioned within the mesiodistal gap 7720 between the protrusions 7704, 7705 of the securing member 7700. In some embodiments, the back surface of the attachment portion 7600 can be positioned proximate and/or in contact with the backing 7702 of the securing member 7700. In some embodiments, an operator slides the connector 7603 and head 7602 occlusogingivally by positioning a tool (e.g., tool 800 in FIG. 8) within the opening 7630 and moving the tool occlusogingivally. The tool can contact the first base region 7604*a* when sliding the tool gingivally to insert the attachment portion 7600. Continued gingival movement of the connector 7603 and/or head 7602 can force the first ramped surfaces 7617 into contact with the protrusion 7705. Because of the shape and position of the first ramped surface 7617, occlusogingival force applied to the branch 7607 along the first ramped surfaces 7617 can force the branch 7607 to bend mesiodistally. Once the apex 7621 clears the protrusion 7704 the branch 7607 can bend back towards its shape in the relaxed state, thereby wedging the attachment portion 7600 between the protrusions 7704, 7705 as shown in FIGS. 78A and 78B.

The attachment portion 7600 can comprise a flexure 7632 configured to bend and/or otherwise deform to facilitate securing of the attachment portion 7600 to the securing member 7700. In some embodiments, the flexure 7632 comprises all or portions of the branch 7607. The branch 7607, for example, can be configured to bend in a first direction to facilitate or enable sliding of the attachment portion 7600 gingivally to secure to the securing member 7700 and/or the branch 7607 can be configured to bend in a second, opposite direction to facilitate or enable locking of the attachment portion 7600 to the securing member 7700. In the illustrated embodiment, deformation of the flexure 7632 while moving the attachment portion 7600 from the detached state to the attached state is primarily a mesiodistal dimension. In other embodiments, this deformation can be primarily in a buccolingual dimension and/or equally in mesiodistal and buccolingual dimensions. In any of these cases, the deformation can also be occlusogingival.

To release the attachment portion 7600 from the securing member 7700, the attachment portion 7600 can be configured to deform and/or rotate relative to the securing member 7700. For example, an operator can insert a tool, such as the distal end surface 808 of the tool 800 (FIG. 8), into and through the interior region 7622 defined by the loop 7650. An occlusal surface of the tool can be positioned proximate the interior surface 7618 of the loop 7650 along the third loop region 7650*c*. The portion of the interior surface 7618 of the loop 7650 that contacts the tool can serve as a leveraging surface through which the tool exerts leverage on the attachment portion 7600. For example, the securing member 7700 can include a fulcrum 7722 at an occlusal portion of the backing 7702 that supports the tool while the tool exerts the leveraging force on the attachment portion 7600. In at least some embodiments, the leveraging surface and the slot formed by the interior region 7622 at the leveraging surface are elongate with lengths substantially perpendicular (e.g., within degrees of perpendicular) to an occlusogingival axis. This can dictate horizontal positioning of the distal end surface 808 of the tool 800 to increase contact between the tool and the attachment portion 7600.

The operator can rotate the tool about a mesiodistal dimension while supported by the fulcrum 7722. Accordingly, the tool can act as a lever. Leverage from the tool exerted on the attachment portion 7600 via the leveraging surface can forcefully move the attachment portion 7600 occlusally such that sliding contact between the second ramped surface 7614 and the first securing surface 7708 of the protrusion 7705 causes the flexure 7632 to resiliently deform in a mesiodistal dimension. In connection with this deformation, the gap 7648 can at least partially close and then open. In some embodiments, the attachment portion 7600 pops and/or snaps free of the securing member 7700 once the apex 7621 clears the first securing surface 7708. With or without the tool, the attachment portion 7600 can then be pulled away from the backing 7702 along the buccolingual dimension.

The use of leverage (e.g., by incorporation of the fulcrum 7722 into the backing 7702 can allow the practical application of greater occlusal force to the attachment portion 7600 than would otherwise be possible. Accordingly, the second ramped surfaces 7614 and first securing surface 7708 can be closer to perpendicular to the occlusogingival plane P than the first ramped surface 7617. This can be useful, for example, because the second ramped surface 7614 may act as second securing surfaces limiting occlusal movement of the attachment portion 7600 relative to the securing member 7700 in addition to acting as a surface that transfers occlusal force from the lever into mesiodistal force that resiliently deforms the flexure 7632 during the detaching process. In contrast, the ledges 7640 can limit gingival movement of the attachment portion 7600 relative to the securing member 7700, thereby reducing or eliminating any need for the first ramped surface 7617 to perform this function.

The location at which the connector 7603 connects to the head 7602, a dimension along which the connector 7603 extends, a property of the connector 7603, etc. can be at least partially based on a force to be imparted on a tooth to which the attachment portion 7600 is configured to be secured (and/or an intended movement of the tooth). For example, as previously noted, movement of the attachment portion 7600 between the attached state to the detached state can include movement of the branch 7607 in a mesiodistal dimension. Thus, to avoid any movement of a connector 7603 unintentionally causing the attachment portion 7600 to move toward the detached state during treatment and/or to avoid inhibiting useful movement of the branch 7607 related to attaching and/or detaching processes, the connector 7603 can connect to a portion of the attachment portion 7600 away from the branch 7607 and in particular a location that would not cause movement of the branch 7607 in any way that is biased towards disengagement from the securing member 7700. In some cases, for example as shown in FIG. 76, the connector 7603 is continuous with the base 7604 but not the branch 7607. In addition or alternatively, the connector 7603 can be continuous with one of both of the distal and mesial protuberances 7637, 7638. Such configurations can prevent or limit the connector 7603 from applying forces to the branch 7607 that inadvertently cause the flexure 7632 to deform during orthodontic treatment. The location at which the connector 7603 connects to the head 7602, a dimension along which the connector 7603 extends, a property of the connector 7603, etc. can at least partially be based on the mechanism by which the attachment portion 7600 is attached to and/or detached from the securing member 7700 and/or the geometry of the securing member 7700.

Figure 79:
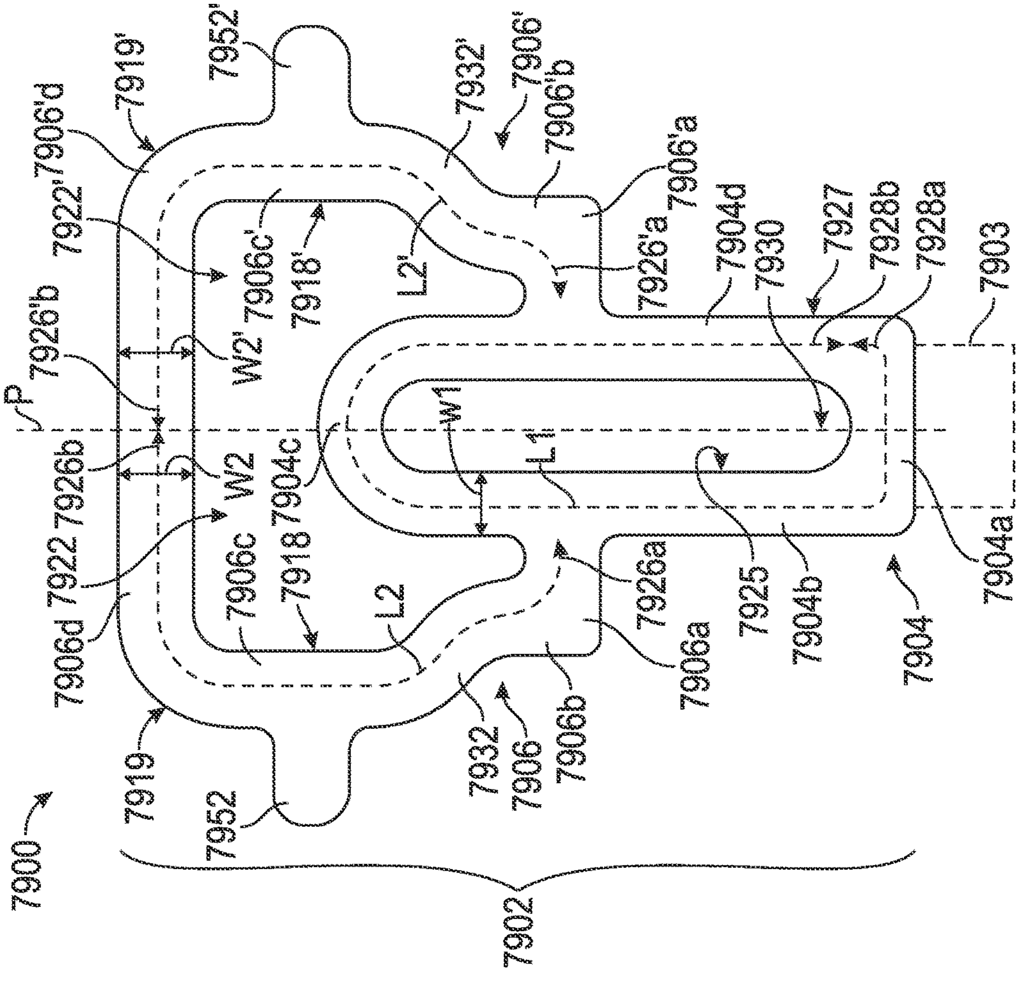
FIG. 79 is a front view of an attachment portion configured in accordance with several embodiments of the present technology.

FIG. 79 shows a planar view of an attachment portion 7900 configured in accordance with several embodiments of the present technology. The attachment portion 7900 can be configured to be secured to a patient's tooth via a securing member, such as securing member 8000 shown in FIG. 80. The attachment portion 7900 and the securing member 8000 are shown in a secured arrangement in FIGS. 81A and 81B. As discussed in greater detail below, the attachment portion 7900 and the securing member 8000 can be configured such that the attachment portion 7900 can be releasably secured to the securing member 8000. The attachment portion 7900 can be continuous with a connector 7903 that connects the attachment portion 7900 to one or more additional portions (not shown) of the overall orthodontic appliance. The attachment portion 7900 can have an attached state in which the orthodontic appliance exerts active and/or retentive orthodontic force (e.g., from a biasing portion (not shown) of the orthodontic appliance) on the tooth via the connector 7903, the attachment portion 7900, and the securing member 8000. Correspondingly, the attachment portion 7900 can have a detached state in which the orthodontic appliance is operably disconnected from the securing member 8000.

The attachment portion 7900 can be configured to move from the detached state to the attached state in response to relative movement between the attachment portion 7900 and the securing member 8000 in an occlusogingival dimension. This relative movement and/or another action can cause the attachment portion 7900 to resiliently deform and then at least partially return to its original form. In this or another manner, the attachment portion 7900 can pop and/or snap from the detached state to the attached state. Furthermore, the attachment portion 7900 can be configured to move from the attached state toward the detached state in response to leverage. These and other features of processes for moving the attachment portion 7900 between the attached and detached states as well as structures of the attachment portion 7900 and the securing member 8000 associated with these features are further discussed below with reference to FIGS. 79-81B.

In at least some cases, the attachment portion 7900 and the securing member 8000 are symmetrical about an occlusogingival plane P that bisects the attachment portion 7900 and the securing member 8000 at an occlusogingival midline when the attachment portion 7900 is in the attached state. In FIGS. 79-81B, symmetrical features of the attachment portion 7900 and the securing member 8000 at a distal side of the occlusogingival plane P are assigned a reference number with no apostrophe whereas symmetrical features at a mesial side of the occlusogingival plane P are assigned a reference number with an apostrophe. In the discussion of FIGS. 79-81B below, the symmetrical features at the distal side of the occlusogingival plane P may be referred to as "distal" whereas the symmetrical features at the mesial side of the occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth. Also, "occlusal" and "gingival" features can be occlusal and gingival, respectively, when the appliance is installed in the illustrated orientation or be gingival and occlusal, respectively, when the appliance is installed in an opposite orientation rotated 180 degrees about a buccolingual axis relative to the illustrated orientation.

Referring to FIG. 79, the attachment portion 7900 can comprise a head 7902. In some embodiments, the attachment portion 7900 comprises a head 7902 and at least a portion of the connector 7903 that is continuous with the head 7902. The connector 7903, for example, can comprise a second connector as previously described herein and/or can extend gingivally away from a gingival portion of the head 7902. The connector 7903 can have features similar to any of the connectors disclosed herein (e.g., first connectors, second connectors, third connectors, etc.) and can comprise a single connector or multiple connectors. For example, the connector 7903 can comprise a single, occlusogingivally extending connector (as shown in FIG. 79), multiple occlusogingivally extending connectors, one or more occlusogingivally extending connectors and one or more mesiodistally extending connectors branching off of the one or more occlusogingivally extending connectors and/or the attachment portion 7900, or one or more mesiodistally extending connectors (and no occlusogingivally extending connectors). Accordingly, the attachment portion 7900 can be connected to a single connector or to multiple connectors also referred to herein as a connector 7903. The connector 7903 can connect to the head 7902 at a variety of locations. For example, a gingivally extending connector can connect to a gingival portion of the head 7902. Any connector 7903 disclosed herein can extend away from the head 7902 along a variety of dimensions (e.g., along an occlusogingival dimension, a mesiodistal dimension, a buccolingual dimension, etc.).

The head 7902 can have a front surface (facing out of the page) and a back surface (not visible in FIG. 79), and a thickness t (labeled in FIG. 81A) measured between the front and back surfaces. In some embodiments, the head 7902 and the connector 7903 are part of the same, monolithic piece of material (e.g., cut from a sheet of material, a 3D-printed piece, etc.). Thus, the head 7902 and the connector 7903 may refer to different portions of the same continuous component. The attachment portion 7900 can be one portion of a greater orthodontic appliance, or may be formed separately and attached to an orthodontic appliance. The attachment portion 7900 and/or the corresponding appliance can be cut from the same sheet of material and/or may be formed by molding, casting, machining, 3D printing, stamping, extruding, or the like. The attachment portion 7900 may comprise a metal or a plastic and may have superelastic and/or shape memory properties. In some embodiments, the attachment portion 7900 does not have superelastic and/or shape memory properties.

As parts of the head 7902, the attachment portion 7900 can comprise various structures associated with one or more functional objectives. These functional objectives can include establishing and maintaining a secure connection between the attachment portion 7900 and the securing member 8000 when the attachment portion 7900 is in the attached state, establishing and maintaining efficient transfer of orthodontic force from the appliance to the tooth via the attachment portion 7900 and the securing member 8000 when the attachment portion 7900 is in the attached state, allowing convenient movement of the attachment portion 7900 from the attached state to the detached state, allowing convenient movement of the attachment portion 7900 from the detached state to the attached state, and providing a tactile indication of movement of the attachment portion 7900 to the attached state, among others.

With reference to FIG. 79, the attachment portion 7900 at the head 7902 can comprise a centrally positioned base 7904 and distal and mesial arms 7906, 7906' extending distally and mesially, respectively, from the base 7904. The base 7904 can comprise an elongate member forming a closed loop and extending along a longitudinal axis L1 from a first end portion **7928*a* to a second end portion 7928*b*. Starting at the first end portion 7928*a* and extending along the longitudinal axis L1 to the second end portion 7928*b*, the base 7904 can include a gingivally located first base region 7904*a*, a second base region 7904*b* continuous with and extending occlusally from the first base region 7904*a*, an occlusally located curved third base region 7904*c* continuous with and extending mesially from the second base region 7904*b*, and a fourth base region 7904*d* continuous with and extending gingivally from the third base region 7904*c*. The base 7904 can at least partially enclose and define an opening 7930 and can comprise an interior surface 7925 at the opening 7930 and an exterior surface 7927 spaced apart from the opening 7930. In at least some cases, the opening 7930 is sized to receive a tool to facilitate securing the attachment portion 7900 to the securing member 8000**.

The distal arm 7906 can comprise an elongate member extending along a longitudinal axis L2 from a first end portion **7926*a* to a second end portion 7926*b*. Starting at the first end portion 7926*a* and extending along the longitudinal axis L2 to the second end portion 7926*b*, the distal arm 7906 can include a first arm region 7906*a* continuous with and extending distally from an occlusal part of the second base region 7904*b*, a second arm region 7906*b* continuous with and extending distally and occlusally from the first arm region 7906*a*, a third arm region 7906*c* continuous with and extending occlusally from the second arm region 7906*b*, and a fourth arm region 7906*d* continuous with and extending mesially from the third arm region 7906*c*. The distal arm 7906 can comprise an interior surface 7918 at the interior region 7922 and an exterior surface 7919 spaced apart from the interior region 7922. The mesial arm 7906' can include features as described for the distal arm 7906 but mirrored about the occlusogingival plane P. Together, the arms 7906, 7906' can enclose and define an interior region 7922 and form a slot shaped to receive a tool used to move the attachment portion 7900** from the attached state toward the detached state.

The base 7904 can have a width w1 measured between the interior surface 7925 and the exterior surface 7927. Similarly, the arms 7906, 7906' can have respective widths w2, w2' measured between the respective interior surfaces 7918, 7918' and exterior surfaces 7919, 7919'. The base 7904 and/or arms 7906, 7906' can have a substantially constant thickness or may have a varying thickness. Likewise, the base 7904 and/or arms 7906, 7906' can have a substantially constant width or may have a varying width. A width and/or thickness of the base 7904 and/or arms 7906, 7906' can be varied, for example, to impart a preferred stiffness profile to all or a portion of the base 7904 and/or arms 7906, 7906'. Furthermore, the arms 7906, 7906' can include a plurality of bends along the respective longitudinal axes L2, L2' that are configured to preferentially flex to facilitate securing and/or release of the attachment portion 7900 to a securing member.

According to various embodiments, one or more regions of the arms 7906, 7906' can include a portion along which the width w2, w2' is greater than at other portions. For example, as shown in FIG. 79, the distal arm 7906 can include a projection 7952 at the third arm region **7906*c*. At the projection 7952, the exterior surface 7919 of the distal arm 7906 can extend distally away from the longitudinal axis L2, curve occlusally, extend occlusally, curve gingivally, and then extend gingivally back to the original spacing from the longitudinal axis L2. As described in greater detail below, the gingival side of the projection 7952 can be configured to force the arm 7906 to bend when engaging a protrusion of the securing member 8000 as the attachment portion 7900 moves from the detached state toward the attached state. In addition or alternatively, the occlusal side of the projection 7952 can be configured to force the arm 7906 to bend when engaging a protrusion of the securing member 8000 as the attachment portion 7900 moves from the attached state toward the detached state. The mesial arm 7906' can include a projection 7952' and associated features as described for the distal arm 7906** but mirrored about the occlusogingival plane P.

Figure 80:
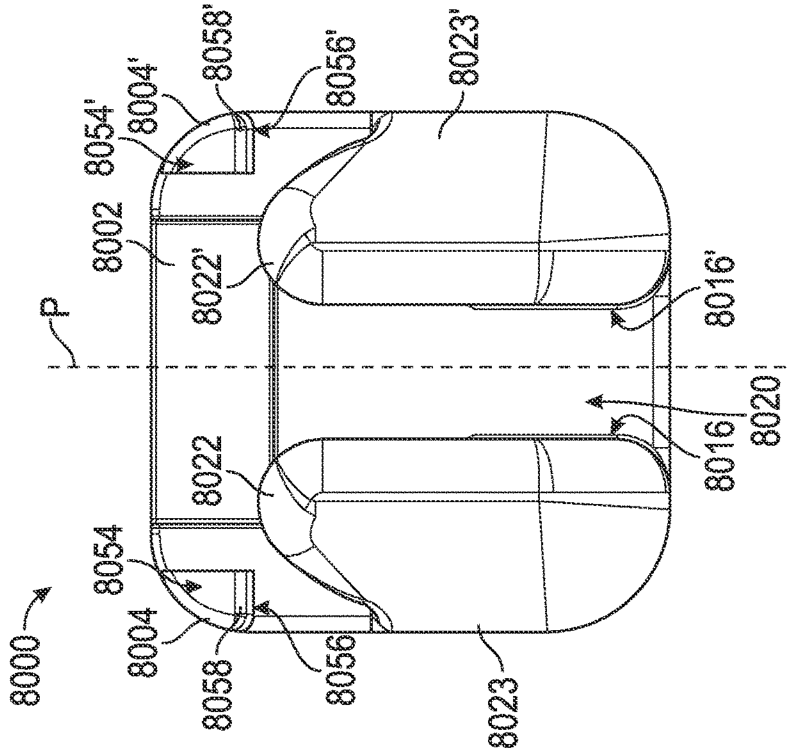
FIG. 80 is a front view of a securing member configured in accordance with several embodiments of the present technology.

FIG. 80 is a front view of the securing member 8000 configured for use with the attachment portion 7900. The securing member 8000 has a first side (facing out of the page) and a second side (not visible in FIG. 80) opposite the first side along a thickness of the securing member 8000 and configured to be bonded to a patient's tooth. The securing member 8000 can comprise a backing 8002 and distal and mesial occlusal protrusions 8004, 8004' carried by and extending away from the first side of the backing 8002 along a buccolingual dimension and distal and mesial gingival protrusions 8023, 8023' carried by and extending away from the first side of the backing 8002 along the buccolingual dimension. The occlusal and gingival protrusions 8004, 8004', 8023, 8023' can be configured to engage the attachment portion 7900 and to retain the attachment portion 7900 at a specific location relative to the backing 8002 and the patient's tooth. Furthermore, as discussed below, the gingival protrusions 8023, 8023' can be configured to support a lever used to move the attachment portion 7900 from the attached state toward the detached state.

The distal occlusal protrusion 8004 can be configured to engage the projection 7952 of the attachment portion 7900 to prevent or limit occlusal motion of the attachment portion 7900 when the attachment portion 7900 is in the attached state. The securing member 8000 at the occlusal protrusion 8004 can define a first ramped surface 8054 that extends lingually and gingivally from the backing 8002 and a second ramped surface 8056 that extends lingually and occlusally from the backing 8002. The first and second ramped surfaces 8354, 8356 can meet at an apex 8058. The second ramped surface 8056 together with the occlusal surface of the projection 7952 can restrict occlusal movement of the attachment portion 7900 relative to the securing member 8000 when the attachment portion 7900 is in the attached state. The securing member 8000 at the gingival protrusion 8023 can also define a ledge 8010 that, together with the gingival surface of the first arm region **7906*a* conformably restricts gingival movement of the attachment portion 7900 relative to the securing member 8000 when the attachment portion 7900 is in the attached state. The mesial occlusal and gingival protrusions 8004', 8023' can have features as described for the distal occlusal and gingival protrusion 8004, 8023** but mirrored about the occlusogingival plane P.

In some embodiments, the gingival protrusion 8023 has a first region extending lingually (or buccally, depending on which side of the tooth the securing member 8000 is attached) away from the backing 8002 and a second region extending away from the first region towards the occlusogingival plane P and spaced apart from the backing 8002 by a gap along the buccolingual dimension. This gap can have a depth that is slightly greater than a thickness t of the attachment portion 7900 so that the attachment portion 7900 can fit between the second region of the gingival protrusion 8004 and the backing 8002. The second region of the gingival protrusion 8023 can include an inner surface (not visible) facing towards the backing 8002 and configured to prevent or limit lingual (or buccal) movement of the attachment portion 7900. In at least some cases, the first region of the gingival protrusion 8023 includes an inner surface 8016 facing mesially and occlusally. In some cases, this inner surface 8016 and the exterior surface 7927 of the second base region **7904*b* of the attachment portion 7900 are primary force-transferring surfaces through which active and/or retentive orthodontic force is transferred to the tooth. In addition or alternatively, other surfaces of the securing member 8000 and the attachment portion 7900 that contact one another when the attachment portion 7900 is in the attached state can serve as force-transferring surfaces. The mesial gingival protrusion 8023' can include features as described for the distal gingival protrusion 8023** but mirrored about the occlusogingival plane P.

Figure 81B:
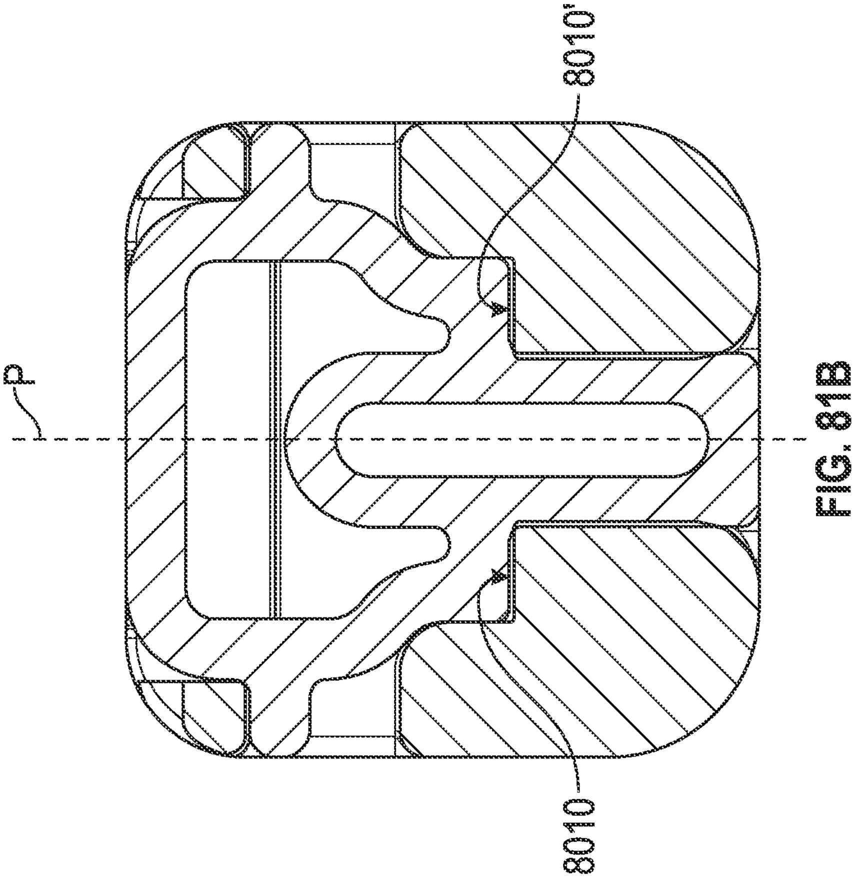
FIGS. 81A and 81B are different views of an attachment portion secured to a securing member in accordance with several embodiments of the present technology.
Figure 81A:
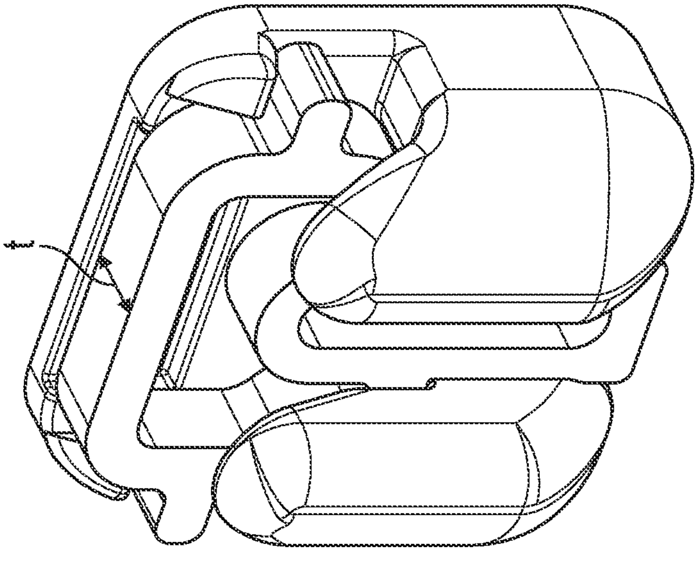

The gingival protrusions 8023, 8023' can be spaced apart from one another by a gap 8020 along the mesiodistal dimension. The gap 8020 can be sized to at least partially receive a portion of the base 7904 and/or the connector 7903 connected to the head 7902 of the attachment portion 7900. Referring to FIGS. 81A and 81B, in the secured state, the attachment portion 7900 can be positioned proximate and/or against the backing 8002 of the securing member 8000 and bound between the occlusal protrusions 8004, 8004'. The connector 7903 can be positioned between the gingival protrusions 8023, 8023' (e.g., within the gap 8020). Additionally or alternatively, the distal arm 7906 can be positioned buccolingually between the gingival protrusion 8023 and the backing 8002 and the mesial arm 7906' can be positioned buccolingually between the gingival protrusion 8023' and the backing 8002.

The attachment portion 7900 can comprise a resilient and/or superelastic material such that, when the attachment portion 7900 is braced between the occlusal protrusions 8004, 8004', the attachment portion 7900 actively exerts force on the surrounding surfaces. For example, the projections 7952, 7952' can abut and press occlusally and buccolingually against the occlusal protrusions 8004, 8004' via the second ramped surfaces 8056, 8056'. In some cases, the exterior surfaces 7919, 7919' of the arms 7906, 7906' along the first arm regions **7906*a*, 7906'*a* abut and press gingivally against the gingival protrusions 8023, 8023'. In the secured position, the attachment portion 7900 can be releasably secured to the securing member 8000 such that it cannot be inadvertently displaced or prematurely or inadvertently released by typical patient activity (such as chewing). The attachment portion 7900 (or one or more portions thereof) can be configured to press on the securing member 8000 when in the secured position. Active and/or continuous force exerted by the attachment portion 7900 on the securing member 8000 can advantageously eliminate or reduce play between the attachment portion 7900 and the securing member 8000 along a mesiodistal dimension, an occlusogingival dimension, and/or a buccolingual dimension, thus providing a more accurate and efficient transfer of force from the appliance to the tooth. In some embodiments, the attachment portion 7900 (or one or more portions thereof) does not chronically press outwardly on the securing member 8000 and is instead configured to engage the securing member 8000 if the attachment portion 7900 moves into contact with and/or moves such that it exerts a force on one or more portions of the securing member 8000. Thus, the securing member 8000 can be configured to limit movement of the attachment portion 7900 relative to the securing member 8000. In some embodiments, one or more of the securing surfaces is configured for transferring orthodontic force between the attachment portion 7900 (e.g., to and/or from the connector 7903, to and/or from the rest of the appliance, etc.) and the securing member 8000 (e.g., to and/or from the tooth, etc.). In various embodiments, one or more of the securing surfaces does not substantially transfer orthodontic force between the attachment portion 7900 and the securing member 8000**.

The attachment portion 7900 of FIGS. 79, 81A and 81B can be secured to the securing member 8000 by positioning the attachment portion 7900 proximate the securing member 8000 and moving the attachment portion 7900 along an occlusogingival path. The connector 7903 and/or other portion of the appliance continuous with the head 7902 of the attachment portion 7900 can be positioned relative to the securing member 8000 such that at least a portion of the head 7902 is positioned occlusally of the occlusal protrusions 8004, 8004' of the securing member 8000 and/or at, near, and/or occlusally of an occlusal edge of the backing 8002. The portion of the connector 7903 connected to the head 7902 can be positioned within the mesiodistal gap 8020 between the occlusal protrusions 8004, 8004' of the securing member 8000. In some embodiments, the back surface of the attachment portion 7900 can be positioned proximate and/or in contact with the backing 8002 of the securing member 8000. In some embodiments, an operator slides the connector 7903 and head 7902 occlusogingivally by positioning a tool (e.g., tool 800 in FIG. 8) within the opening 7930 and moving the tool occlusogingivally. The tool can contact the first base region **7904*a* when sliding the tool gingivally to insert the attachment portion 7900. Continued gingival movement of the connector 7903 and/or head 7902 can force the first ramped surfaces 8054, 8054' at the occlusal protrusions 8004, 8004' into contact with the projections 7952, 7952'. Because of the shapes and positions of the first ramped surfaces 8054, 8054', occlusogingival force applied to the first ramped surfaces 8054, 8054' can force the arms 7906, 7906' to bend buccolingually. Once the projections 7952, 7952' clear the apexes 8058, 8058', the arms 7906, 7906' and/or one or more portions thereof (e.g., the second and third arm regions 7906*b*, 7906'*b*, 7906*c*, 7906'*c* etc.) can bend back towards their shapes in the relaxed state, thereby wedging the attachment portion 7900 into the securing member 8000 as shown in FIGS. 81A and 81**B.

The attachment portion 7900 can comprise distal and mesial flexures 7932, 7932' configured to bend and/or otherwise deform to facilitate securing of the attachment portion 7900 to the securing member 8000. In some embodiments, the flexures 7932, 7932' comprise all or portions of the second arm regions **7906*b*, 7906'*b*. The second arm regions 7906***b*, 7906'*b*, for example, can be configured to bend in a first direction to facilitate or enable sliding of the attachment portion 7900 gingivally to secure to the securing member 8000 and/or the second arm regions 7906*b*, 7906'*b* can be configured to bend in a second, opposite direction to facilitate or enable locking of the attachment portion 7900 to the securing member 8000. Furthermore, the flexures 7932, 7932' can carry the projections 7952, 7952' and surfaces thereof. In some embodiments, deformation of the flexures 7932, 7932' causes one or more portions of the attachment portion 7900 to rotate (e.g., bending of the second arm regions 7906*b*, 7906'*b* can cause the third arm regions 7906*c*, 7906'*c* to rotate about the buccolingual dimension). Moreover, the flexures 7932, 7932' can comprise other regions of the attachment portion 7900 in addition to or instead of the second arm regions 7906*b*, 7906'*b*. In the illustrated embodiment, deformation of the flexures 7932, 7932' while moving the attachment portion 7900 from the detached state to the attached state is primarily a buccolingual dimension. In other embodiments, this deformation can be primarily in a mesiodistal dimension and/or equally in mesiodistal and buccolingual dimensions. In any of these cases, the deformation can also be occlusogingival.

To release the attachment portion 7900 from the securing member 8000, the attachment portion 7900 can be configured to deform and/or rotate relative to the securing member 8000. For example, an operator can insert a tool, such as the distal end surface 808 of the tool 800 (FIG. 8), into the interior regions 7922, 7922' defined by the arms 7906, 7906'. An occlusal end of the tool surface can be positioned proximate the interior surfaces 7918, 7918' of the arms 7906, 7906' along the third arm regions 7906*c*, 7906'*c*. The portions of the interior surfaces 7918, 7918' that contact the tool can serve as leveraging surfaces through which the tool exerts leverage on the attachment portion 7900. For example, the securing member 8000 can include distal and mesial fulcrums 8022, 8022' at the gingival protrusions 8023, 8023' that support the tool while the tool exerts the leveraging force on the attachment portion 7900. In at least some embodiments, the leveraging surfaces together and the slot formed by the interior regions 7922, 7922' are elongate with lengths substantially perpendicular (e.g., within degrees of perpendicular) to an occlusogingival axis. This can dictate horizontal positioning of the distal end surface 808 of the tool 800 to increase contact between the tool and the attachment portion 7900.

The operator can rotate the tool about a mesiodistal dimension while supported by the fulcrums 8022, 8022'. Accordingly, the tool can act as a lever. Leverage from the tool exerted on the attachment portion 7900 via the leveraging surface can forcefully move the attachment portion 7900 occlusally such that sliding contact between the second ramped surfaces 8056, 8056' of the occlusal protrusions 8004, 8004' causes the flexures 7932, 7932' to resiliently deform in a buccolingual dimension sufficiently to allow the projections 7952, 7952' to clear the occlusal protrusions 8004, 8004'. In some embodiments, the attachment portion 7900 pops and/or snaps free of the securing member 8000 once the first protuberances 7936, 7936' clear the inner surfaces 8016, 8016' of the occlusal protrusions 8004, 8004'. With or without the tool, the attachment portion 7900 can then be pulled away from the backing 8002 along the buccolingual dimension.

The use of leverage (e.g., by incorporation of the fulcrums 8022, 8022' into the gingival protrusions 8023, 8023') can allow the practical application of greater occlusal force to the attachment portion 7900 than would otherwise be possible. Accordingly, the second ramped surfaces 8056, 8056' can be closer to perpendicular to the occlusogingival plane P than the first ramped surfaces 8054, 8054'. This can be useful, for example, because the second ramped surfaces 8056, 8056' may act as securing surfaces limiting occlusal movement of the attachment portion 7900 relative to the securing member 8000 in addition to acting as surfaces that transfer occlusogingival force from the lever into buccolingual force that resiliently deforms the flexures 7932, 7932' during the detaching process. Interaction between the ledges 8010, 8010' and the gingival surfaces of the first arm regions 7906*a*, 7906'*a* can limit gingival movement of the attachment portion 7900 relative to the securing member 8000, thereby reducing or eliminating any need for the first ramped surfaces 8054, 8054' to perform this function.

The location at which the connector 7903 connects to the head 7902, a dimension along which the connector 7903 extends, a property of the connector 7903, etc. can be at least partially based on a force to be imparted on a tooth to which the attachment portion 7900 is configured to be secured (and/or an intended movement of the tooth). For example, as previously noted, movement of the attachment portion 7900 between the attached state to the detached state can include movement of the arms 7906, 7906' in a mesiodistal dimension. Thus, to avoid any movement of a connector 7903 unintentionally causing the attachment portion 7900 to move toward the detached state during treatment and/or to avoid inhibiting useful movement of the arms 7906, 7906' related to attaching and/or detaching processes, the connector 7903 can connect to a portion of the attachment portion 7900 away from the arms 7906, 7906' and in particular a location that would not cause movement of the arms 7906, 7906' in any way that is biased towards disengagement from the securing member 8000. In some cases, for example as shown in FIG. 79, the connector 7903 is continuous with the base 7904 of the head 7902 but not the arms 7906, 7906'. Such a configuration can prevent or limit the connector 7903 from applying forces to the arms 7906, 7906' that inadvertently cause the flexures 7932, 7932' to deform during orthodontic treatment. The location at which the connector 7903 connects to the head 7902, a dimension along which the connector 7903 extends, a property of the connector 7903, etc. can at least partially be based on the mechanism by which the attachment portion 7900 is attached to and/or detached from the securing member 8000 and/or the geometry of the securing member 8000.

Figure 82:
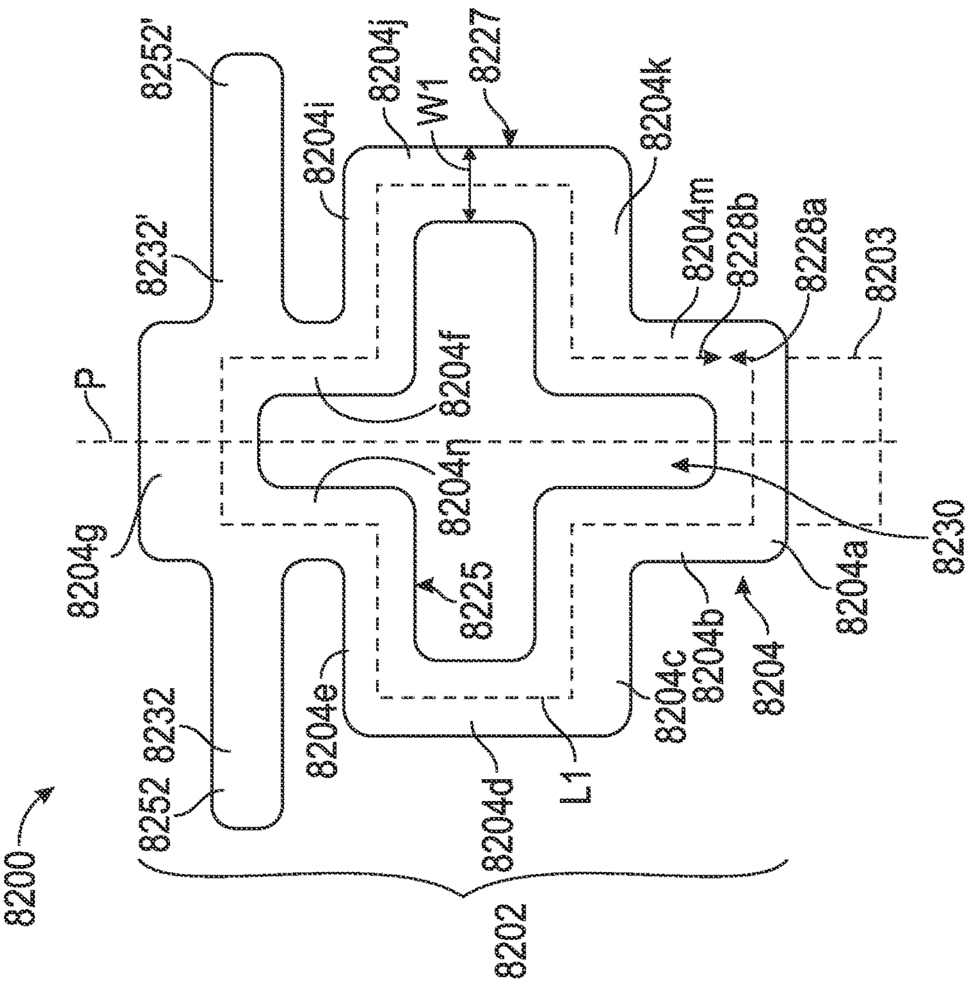
FIG. 82 is a front view of an attachment portion configured in accordance with several embodiments of the present technology.

FIG. 82 shows a planar view of an attachment portion 8200 configured in accordance with several embodiments of the present technology. The attachment portion 8200 can be configured to be secured to a patient's tooth via a securing member, such as securing member 8300 shown in FIG. 83. The attachment portion 8200 and the securing member 8300 are shown in a secured arrangement in FIGS. 84A and 84B. As discussed in greater detail below, the attachment portion 8200 and the securing member 8300 can be configured such that the attachment portion 8200 can be releasably secured to the securing member 8300. The attachment portion 8200 can be continuous with a connector 8203 that connects the attachment portion 8200 to one or more additional portions (not shown) of the overall orthodontic appliance. The attachment portion 8200 can have an attached state in which the orthodontic appliance exerts active and/or retentive orthodontic force (e.g., from a biasing portion (not shown) of the orthodontic appliance) on the tooth via the connector 8203, the attachment portion 8200, and the securing member 8300. Correspondingly, the attachment portion 8200 can have a detached state in which the orthodontic appliance is operably disconnected from the securing member 8300.

The attachment portion 8200 can be configured to move from the detached state to the attached state in response to relative movement between the attachment portion 8200 and the securing member 8300 in an occlusogingival dimension. This relative movement and/or another action can cause the attachment portion 8200 to resiliently deform and then at least partially return to its original form. In this or another manner, the attachment portion 8200 can pop and/or snap from the detached state to the attached state. Furthermore, the attachment portion 8200 can be configured to move from the attached state toward the detached state in response to leverage. These and other features of processes for moving the attachment portion 8200 between the attached and detached states as well as structures of the attachment portion 8200 and the securing member 8300 associated with these features are further discussed below with reference to FIGS. 82-84B.

In at least some cases, the attachment portion 8200 and the securing member 8300 are symmetrical about an occlusogingival plane P that bisects the attachment portion 8200 and the securing member 8300 at an occlusogingival midline when the attachment portion 8200 is in the attached state. In FIGS. 82-84B, symmetrical features of the attachment portion 8200 and the securing member 8300 at a distal side of the occlusogingival plane P are assigned a reference number with no apostrophe whereas symmetrical features at a mesial side of the occlusogingival plane P are assigned a reference number with an apostrophe. In the discussion of FIGS. 82-84B below, the symmetrical features at the distal side of the occlusogingival plane P may be referred to as "distal" whereas the symmetrical features at the mesial side of the occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth. Also, "occlusal" and "gingival" features can be occlusal and gingival, respectively, when the appliance is installed in the illustrated orientation or be gingival and occlusal, respectively, when the appliance is installed in an opposite orientation rotated 180 degrees about a buccolingual axis relative to the illustrated orientation.

Referring to FIG. 82, the attachment portion 8200 can comprise a head 8202. In some embodiments, the attachment portion 8200 comprises a head 8202 and at least a portion of the connector 8203 that is continuous with the head 8202. The connector 8203, for example, can comprise a second connector as previously described herein and/or can extend gingivally away from a gingival portion of the head 8202. The connector 8203 can have features similar to any of the connectors disclosed herein (e.g., first connectors, second connectors, third connectors, etc.) and can comprise a single connector or multiple connectors. For example, the connector 8203 can comprise a single, occlusogingivally extending connector (as shown in FIG. 82), multiple occlusogingivally extending connectors, one or more occlusogingivally extending connectors and one or more mesiodistally extending connectors branching off of the one or more occlusogingivally extending connectors and/or the attachment portion 8200, or one or more mesiodistally extending connectors (and no occlusogingivally extending connectors). Accordingly, the attachment portion 8200 can be connected to a single connector or to multiple connectors also referred to herein as a connector 8203. The connector 8203 can connect to the head 8202 at a variety of locations. For example, a gingivally extending connector can connect to a gingival portion of the head 8202. Any connector 8203 disclosed herein can extend away from the head 8202 along a variety of dimensions (e.g., along an occlusogingival dimension, a mesiodistal dimension, a buccolingual dimension, etc.).

The head 8202 can have a front surface (facing out of the page) and a back surface (not visible in FIG. 82), and a thickness t (labeled in FIG. 84A) measured between the front and back surfaces. In some embodiments, the head 8202 and the connector 8203 are part of the same, monolithic piece of material (e.g., cut from a sheet of material, a 3D-printed piece, etc.). Thus, the head 8202 and the connector 8203 may refer to different portions of the same continuous component. The attachment portion 8200 can be one portion of a greater orthodontic appliance, or may be formed separately and attached to an orthodontic appliance. The attachment portion 8200 and/or the corresponding appliance can be cut from the same sheet of material and/or may be formed by molding, casting, machining, 3D printing, stamping, extruding, or the like. The attachment portion 8200 may comprise a metal or a plastic and may have superelastic and/or shape memory properties. In some embodiments, the attachment portion 8200 does not have superelastic and/or shape memory properties.

As parts of the head 8202, the attachment portion 8200 can comprise various structures associated with one or more functional objectives. These functional objectives can include establishing and maintaining a secure connection between the attachment portion 8200 and the securing member 8300 when the attachment portion 8200 is in the attached state, establishing and maintaining efficient transfer of orthodontic force from the appliance to the tooth via the attachment portion 8200 and the securing member 8300 when the attachment portion 8200 is in the attached state, allowing convenient movement of the attachment portion 8200 from the attached state to the detached state, allowing convenient movement of the attachment portion 8200 from the detached state to the attached state, and providing a tactile indication of movement of the attachment portion 8200 to the attached state, among others.

With reference to FIG. 82, the attachment portion 8200 at the head 8202 can comprise a centrally positioned base 8204 and distal and mesial projections 8252, 8252' extending distally and mesially, respectively, from the base 8204. The base 8204 can comprise an elongate member forming a closed loop and extending along a longitudinal axis L1 from a first end portion 8228*a* to a second end portion 8228*b*. Starting at the first end portion 8228*a* and extending along the longitudinal axis L1 to the second end portion 8228*b*, the base 8204 can include a gingivally located first base region 8204*a*, a second base region 8204*b* continuous with and extending occlusally from the first base region 8204*a*, a third base region 8204*c* continuous with and extending distally from the second base region 8204*b*, a fourth base region 8204*d* continuous with and extending occlusally from the third base region 8204*c*, a fifth base region 8204*e* continuous with and extending mesially from the fourth base region 8204*d*, a sixth base region 8204*f* continuous with and extending occlusally from the fifth base region 8204*e*, a seventh base region 8204*g* continuous with and extending mesially from sixth first base region 8204*f*, an eighth base region 8204*h* continuous with and extending gingivally from the seventh base region 8204*g*, a ninth base region 8204*i* continuous with and extending mesially from the eighth base region 8204*h*, a tenth base region 8204*j* continuous with and extending gingivally from the ninth base region 8204*i*, an eleventh base region 8204*k* continuous with and extending distally from the tenth base region 8204*j*, and a twelfth base region 8204*m* continuous with and extending gingivally from the eleventh base region 8204*k*. The distal projection 8252 can comprise an elongate member continuous with and extending gingivally from a distal side of the sixth base region 8204*f*. The mesial projection 8252' can include features as described for the distal projection 8252 but mirrored about the occlusogingival plane P.

The base 8204 can at least partially enclose and define a plus-shaped opening 8230 and can comprise an interior surface 8225 at the opening 8230 and an exterior surface 8227 spaced apart from the opening 8230. In at least some cases, the opening 8230 is sized to receive a tool in a first orientation (e.g. an occlusogingival orientation) to facilitate securing the attachment portion 8200 to the securing member 8300 and/or to receive the same or a different tool in a second orientation (e.g. a mesiodistal orientation) to facilitate detaching the attachment portion 8200 from the securing member 8300. The base 8204 can have a width w1 measured between the interior surface 8225 and the exterior surface 8227. A width and/or thickness of the base 8204 can be varied, for example, to impart a preferred stiffness profile to all or a portion of the base 8204.

Figure 83:
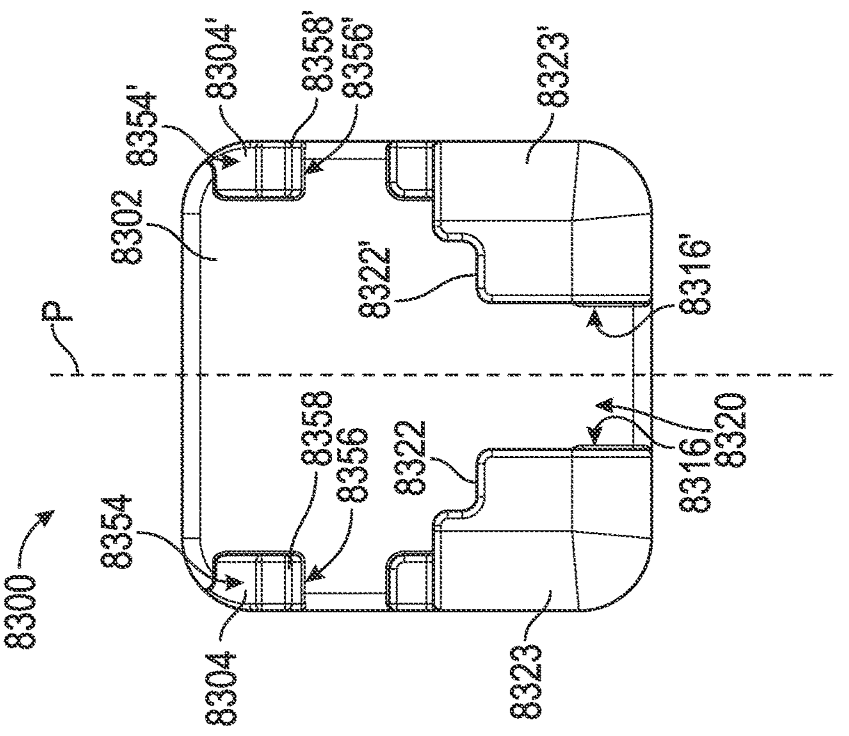
FIG. 83 is a front view of a securing member configured in accordance with several embodiments of the present technology.

FIG. 83 is a front view of the securing member 8300 configured for use with the attachment portion 8200. The securing member 8300 has a first side (facing out of the page) and a second side (not visible in FIG. 83) opposite the first side along a thickness of the securing member 8300 and configured to be bonded to a patient's tooth. The securing member 8300 can comprise a backing 8302 and distal and mesial occlusal protrusions 8304, 8304' carried by and extending away from the first side of the backing 8302 along a buccolingual dimension and distal and mesial gingival protrusions 8323, 8323' carried by and extending away from the first side of the backing 8302 along the buccolingual dimension. The occlusal and gingival protrusions 8004, 8004', 8323, 8323' can be configured to engage the attachment portion 8200 and to retain the attachment portion 8200 at a specific location relative to the backing 8302 and the patient's tooth. Furthermore, as discussed below, the gingival protrusions 8323, 8323' can be configured to support a lever used to move the attachment portion 8200 from the attached state toward the detached state.

The distal occlusal protrusion 8304 can be configured to engage the projection 8252 of the attachment portion 8200 to prevent or limit occlusal motion of the attachment portion 8200 when the attachment portion 8200 is in the attached state. The securing member 8300 at the occlusal protrusion 8304 can define a first ramped surface 8354 that extends lingually and gingivally from the backing 8302 and a second ramped surface 8356 that extends lingually and occlusally from the backing 8302. The first and second ramped surfaces 8354, 8356 can meet at an apex 8358. The second ramped surface 8356 together with the occlusal surface of the projection 8252 can restrict occlusal movement of the attachment portion 8200 relative to the securing member 8300 when the attachment portion 8200 is in the attached state. The securing member 8300 at the gingival protrusion 8323 can also define a ledge 8310 (FIG. 84B) that, together with the gingival surface of the third base region 8204*c* conformably restricts gingival movement of the attachment portion 8200 relative to the securing member 8300 when the attachment portion 8200 is in the attached state. The mesial occlusal and gingival protrusion 8304', 8323' can have features as described for the distal occlusal and gingival protrusions 8304, 8323 but mirrored about the occlusogingival plane P.

In some embodiments, the gingival protrusion 8323 has a first region extending lingually (or buccally, depending on which side of the tooth the securing member 8300 is attached) away from the backing 8302 and a second region extending away from the first region towards the occlusogingival plane P and spaced apart from the backing 8302 by a gap along the buccolingual dimension. This gap can have a depth that is slightly greater than a thickness t of the attachment portion 8200 so that the attachment portion 8200 can fit between the second region of the protrusion 8304 and the backing 8302. The second region of the gingival protrusion 8323 can include an inner surface (not visible) facing towards the backing 8302 and configured to prevent or limit lingual (or buccal) movement of the attachment portion 8200. In at least some cases, the first region of the gingival protrusion 8323 includes an inner surface 8316 facing mesially and occlusally. In some cases, this inner surface 8316 and the exterior surface 8227 at the second base region 8204*b* of the attachment portion 8200 are primary force-transferring surfaces through which active and/or retentive orthodontic force is transferred to the tooth. In addition or alternatively, other surfaces of the securing member 8300 and the attachment portion 8200 that contact one another when the attachment portion 8200 is in the attached state can serve as force-transferring surfaces. The mesial gingival protrusion 8323' can include features as described for the distal gingival protrusion 8323 but mirrored about the occlusogingival plane P.

Figure 84B:
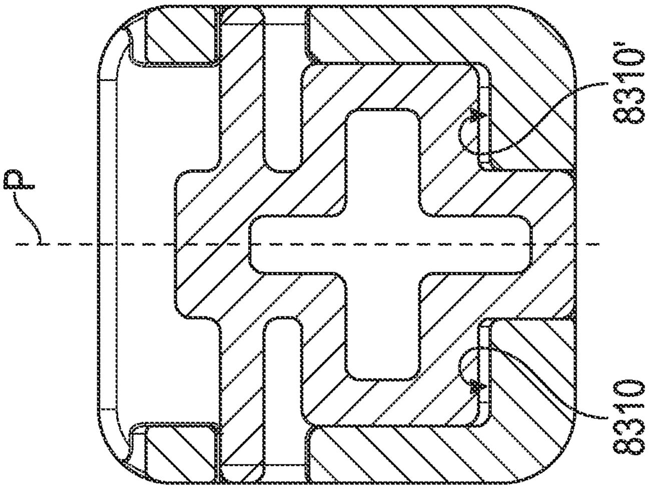
FIGS. 84A and 84B are different views of an attachment portion secured to a securing member in accordance with several embodiments of the present technology.
Figure 84A:
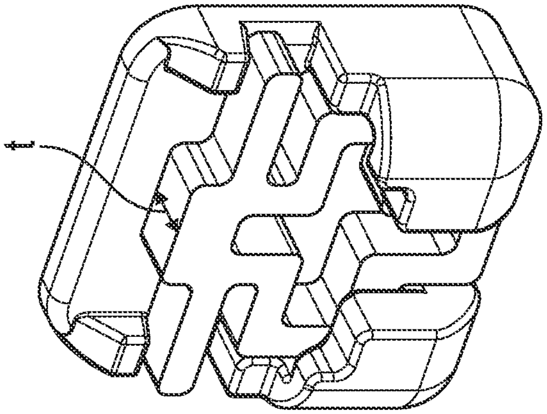

The gingival protrusions 8323, 8323' can be spaced apart from one another by a gap 8320 along the mesiodistal dimension. The gap 8320 can be sized to at least partially receive a portion of the base 8204 and/or the connector 8203 connected to the head 8202 of the attachment portion 8200. Referring to FIGS. 84A and 84B, in the secured state, the attachment portion 8200 can be positioned proximate and/or against the backing 8302 of the securing member 8300 and bound between the occlusal protrusions 8304, 8304'. The connector 8203 can be positioned between the gingival protrusions 8323, 8323' (e.g., within the gap 8320). The base 8204 can be positioned buccolingually between the gingival protrusion 8323 and the backing 8302.

The attachment portion 8200 can comprise a resilient and/or superelastic material such that, when the attachment portion 8200 is braced between the gingival protrusions 8323, 8323', the attachment portion 8200 actively exerts force on the surrounding surfaces. The attachment portion 8200 (or one or more portions thereof) can be configured to press on the securing member 8300 when in the secured position. Active and/or continuous force exerted by the attachment portion 8200 on the securing member 8300 can advantageously eliminate or reduce play between the attachment portion 8200 and the securing member 8300 along a mesiodistal dimension, an occlusogingival dimension, and/or a buccolingual dimension, thus providing a more accurate and efficient transfer of force from the appliance to the tooth. In some embodiments, the attachment portion 8200 (or one or more portions thereof) does not chronically press outwardly on the securing member 8300 and is instead configured to engage the securing member 8300 if the attachment portion 8200 moves into contact with and/or moves such that it exerts a force on one or more portions of the securing member 8300. Thus, the securing member 8300 can be configured to limit movement of the attachment portion 8200 relative to the securing member 8300. In some embodiments, one or more of the securing surfaces is configured for transferring orthodontic force between the attachment portion 8200 (e.g., to and/or from the connector 8203, to and/or from the rest of the appliance, etc.) and the securing member 8300 (e.g., to and/or from the tooth, etc.). In various embodiments, one or more of the securing surfaces does not substantially transfer orthodontic force between the attachment portion 8200 and the securing member 8300.

The attachment portion 8200 of FIGS. 82, 84A and 84B can be secured to the securing member 8300 by positioning the attachment portion 8200 proximate the securing member 8300 and moving the attachment portion 8200 along an occlusogingival path. The connector 8203 and/or other portion of the appliance continuous with the head 8202 of the attachment portion 8200 can be positioned relative to the securing member 8300 such that at least a portion of the head 8202 is positioned occlusally of the occlusal protrusions 8304, 8304' of the securing member 8300 and/or at, near, and/or occlusally of an occlusal edge of the backing 8302. The portion of the connector 8203 connected to the head 8202 can be positioned within the mesiodistal gap 8320 between the gingival protrusions 8323, 8323' of the securing member 8300. In some embodiments, the back surface of the attachment portion 8200 can be positioned proximate and/or in contact with the backing 8302 of the securing member 8300. In some embodiments, an operator slides the connector 8203 and head 8202 occlusogingivally by positioning a tool (e.g., tool 830 in FIG. 8) within the opening 8230 (e.g., within an occlusogingival slot within the opening 8230) and moving the tool occlusogingivally. The tool can contact the first base region 8204*a* when sliding the tool gingivally to insert the attachment portion 8200. Continued gingival movement of the connector 8203 and/or head 8202 can force the first ramped surfaces 8354, 8354' at the occlusal protrusions 8304, 8304' into contact with the projections 8252, 8252'. Because of the shapes and positions of the first ramped surfaces 8354, 8354', occlusogingival force applied to the projections 8252, 8252' can force the projections 8252, 8252' to bend buccolingually. Once the projections 8252, 8252' clear the apexes 8358, 8358', the projections 8252, 8252' can bend back towards their shapes in the relaxed state, thereby wedging the attachment portion 8200 into the securing member 8300 as shown in FIGS. 84A and 84B.

The attachment portion 8200 can comprise distal and mesial flexures 8232, 8232' configured to bend and/or otherwise deform to facilitate securing of the attachment portion 8200 to the securing member 8300. In some embodiments, the flexures 8232, 8232' comprise all or portions of the projections 8252, 8252'. The projections 8252, 8252', for example, can be configured to bend in a first direction to facilitate or enable sliding of the attachment portion 8200 gingivally to secure to the securing member 8300 and/or the projections 8252, 8252' can be configured to bend in a second, opposite direction to facilitate or enable locking of the attachment portion 8200 to the securing member 8300. In the illustrated embodiment, deformation of the flexures 8232, 8232' while moving the attachment portion 8200 from the detached state to the attached state is primarily a buccolingual dimension. In other embodiments, this deformation can be primarily in a mesiodistal dimension and/or equally in mesiodistal and buccolingual dimensions. In any of these cases, the deformation can also be occlusogingival.

To release the attachment portion 8200 from the securing member 8300, the attachment portion 8200 can be configured to deform and/or rotate relative to the securing member 8300. For example, an operator can insert a tool, such as the distal end surface 838 of the tool 830 (FIG. 8), into the opening 8230. An occlusal end of the tool surface can be positioned proximate the interior surface 8225 of the base 8204 along the fifth and eighth base regions 8204*e*, 8204*i*. The portions of the interior surface 8225 that contact the tool can serve as leveraging surfaces through which the tool exerts leverage on the attachment portion 8200. For example, the securing member 8300 can include distal and mesial fulcrums 8322, 8322' at the gingival protrusions 8323, 8323' that support the tool while the tool exerts the leveraging force on the attachment portion 8200. In at least some embodiments, the leveraging surfaces together and the slot formed by a mesiodistal portion of the opening 8230 are elongate with lengths substantially perpendicular (e.g., within degrees of perpendicular) to an occlusogingival axis. This can dictate horizontal positioning of the distal end surface 838 of the tool 830 to increase contact between the tool and the attachment portion 8200.

The operator can rotate the tool about a mesiodistal dimension while supported by the fulcrums 8322, 8322'. Accordingly, the tool can act as a lever. Leverage from the tool exerted on the attachment portion 8200 via the leveraging surface can forcefully move the attachment portion 8200 occlusally such that sliding contact between the second ramped surfaces 8356, 8356' of the occlusal protrusions 8304, 8304' causes the flexures 8232, 8232' to resiliently deform in a buccolingual dimension sufficiently to allow the projections 8252, 8252' to clear the occlusal protrusions 8304, 8304'. In some embodiments, the attachment portion 8200 pops and/or snaps free of the securing member 8300 once the projections 8252, 8252' clear the occlusal protrusions 8304, 8304'. With or without the tool, the attachment portion 8200 can then be pulled away from the backing 8302 along the buccolingual dimension.

The use of leverage (e.g., by incorporation of the fulcrums 8322, 8322' into the gingival protrusions 8323, 8323') can allow the practical application of greater occlusal force to the attachment portion 8200 than would otherwise be possible. Accordingly, the second ramped surfaces 8356, 8356' can be closer to perpendicular to the occlusogingival plane P than the first ramped surfaces 8354, 8354'. This can be useful, for example, because the second ramped surfaces 8356, 8356' may act as securing surfaces limiting occlusal movement of the attachment portion 8200 relative to the securing member 8300 in addition to acting as surfaces that transfer occlusogingival force from the lever into buccolingual force that resiliently deforms the flexures 8232, 8232' during the detaching process. Interaction between the ledges 8310, 8310' and the gingival surfaces of the third and eleventh base regions 8204*c*, 8204*k* can limit gingival movement of the attachment portion 8200 relative to the securing member 8300, thereby reducing or eliminating any need for the first ramped surfaces 8354, 8354' to perform this function.

The location at which the connector 8203 connects to the head 8202, a dimension along which the connector 8203 extends, a property of the connector 8203, etc. can be at least partially based on a force to be imparted on a tooth to which the attachment portion 8200 is configured to be secured (and/or an intended movement of the tooth). For example, as previously noted, movement of the attachment portion 8200 between the attached state to the detached state can include movement of the projections 8252, 8252' in a buccolingual and/or mesiodistal dimension. Thus, to avoid any movement of a connector 8203 unintentionally causing the attachment portion 8200 to move toward the detached state during treatment and/or to avoid inhibiting useful movement of the projections 8252, 8252' related to attaching and/or detaching processes, the connector 8203 can connect to a portion of the attachment portion 8200 away from the projections 8252, 8252' and in particular a location that would not cause movement of the projections 8252, 8252' in any way that is biased towards disengagement from the securing member 8300. In some cases, for example as shown in FIG. 82, the connector 8203 is continuous with the base 8204 of the head 8202 but not with the projections 8252, 8252'. Such a configuration can prevent or limit the connector 8203 from applying forces to the projections 8252, 8252' that inadvertently cause the flexures 8232, 8232' to deform during orthodontic treatment. The location at which the connector 8203 connects to the head 8202, a dimension along which the connector 8203 extends, a property of the connector 8203, etc. can at least partially be based on the mechanism by which the attachment portion 8200 is attached to and/or detached from the securing member 8300 and/or the geometry of the securing member 8300.

Figure 85:
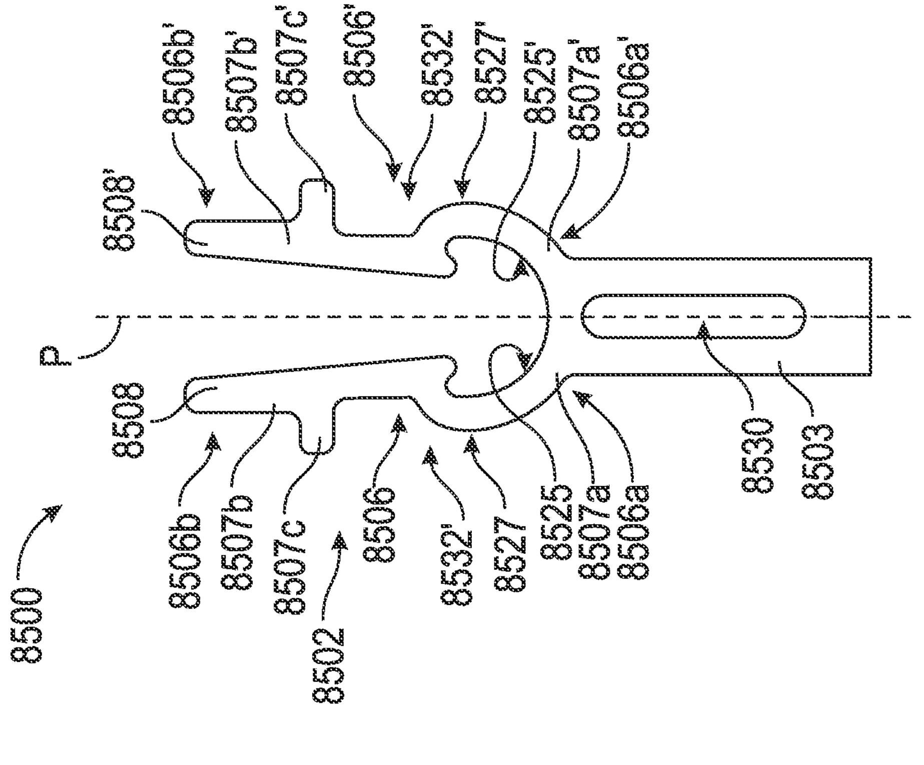
FIG. 85 is a front view of an attachment portion configured in accordance with several embodiments of the present technology.

FIG. 85 shows a planar view of an attachment portion 8500 configured in accordance with several embodiments of the present technology. The attachment portion 8500 can be configured to be secured to a patient's tooth via a securing member, such as securing member 8600 shown in FIG. 86. The attachment portion 8500 and the securing member 8600 are shown in a secured arrangement in FIGS. 87A and 87B. As discussed in greater detail below, the attachment portion 8500 and the securing member 8600 can be configured such that the attachment portion 8500 can be releasably secured to the securing member 8600. The attachment portion 8500 can be continuous with a connector 8503 that connects the attachment portion 8500 to one or more additional portions (not shown) of the overall orthodontic appliance. The attachment portion 8500 can have an attached state in which the orthodontic appliance exerts active and/or retentive orthodontic force (e.g., from a biasing portion (not shown) of the orthodontic appliance) on the tooth via the connector 8503, the attachment portion 8500, and the securing member 8600. Correspondingly, the attachment portion 8500 can have a detached state in which the orthodontic appliance is operably disconnected from the securing member 8600.

The attachment portion 8500 can be configured to move from the detached state to the attached state in response to relative movement between the attachment portion 8500 and the securing member 8600 in an occlusogingival dimension. This relative movement and/or another action can cause the attachment portion 8500 to resiliently deform and then at least partially return to its original form. In this or another manner, the attachment portion 8500 can pop and/or snap from the detached state to the attached state. Furthermore, the attachment portion 8500 can be configured to move from the attached state toward the detached state in response to leverage. These and other features of processes for moving the attachment portion 8500 between the attached and detached states as well as structures of the attachment portion 8500 and the securing member 8600 associated with these features are further discussed below with reference to FIGS. 85-87B.

In at least some cases, the attachment portion 8500 and the securing member 8600 are symmetrical about an occlusogingival plane P that bisects the attachment portion 8500 and the securing member 8600 at an occlusogingival midline when the attachment portion 8500 is in the attached state. In FIGS. 85-87B, symmetrical features of the attachment portion 8500 and the securing member 8600 at a distal side of the occlusogingival plane P are assigned a reference number with no apostrophe whereas symmetrical features at a mesial side of the occlusogingival plane P are assigned a reference number with an apostrophe. In the discussion of FIGS. 85-87B herein, the symmetrical features at the distal side of the occlusogingival plane P may be referred to as "distal" whereas the symmetrical features at the mesial side of the occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth. Also, "occlusal" and "gingival" features can be occlusal and gingival, respectively, when the appliance is installed in the illustrated orientation or be gingival and occlusal, respectively, when the appliance is installed in an opposite orientation rotated 180 degrees about a buccolingual axis relative to the illustrated orientation.

Referring to FIG. 85, the attachment portion 8500 can comprise a head 8502. In some embodiments, the attachment portion 8500 comprises a head 8502 and at least a portion of the connector 8503 that is continuous with the head 8502. The connector 8503, for example, can comprise a second connector as previously described herein and/or can extend gingivally away from a gingival portion of the head 8502. The connector 8503 can have features similar to any of the connectors disclosed herein (e.g., first connectors, second connectors, third connectors, etc.) and can comprise a single connector or multiple connectors. For example, the connector 8503 can comprise a single, occlusogingivally extending connector (as shown in FIG. 85), multiple occlusogingivally extending connectors, one or more occlusogingivally extending connectors and one or more mesiodistally extending connectors branching off of the one or more occlusogingivally extending connectors and/or the attachment portion 8500, or one or more mesiodistally extending connectors (and no occlusogingivally extending connectors). Accordingly, the attachment portion 8500 can be connected to a single connector or to multiple connectors also referred to herein as a connector 8503. The connector 8503 can connect to the head 8502 at a variety of locations. For example, a gingivally extending connector can connect to a gingival portion of the head 8502. Any connector 8503 disclosed herein can extend away from the head 8502 along a variety of dimensions (e.g., along an occlusogingival dimension, a mesiodistal dimension, a buccolingual dimension, etc.).

The portion of the connector 8503 immediately adjacent the attachment portion 8500 can at least partially enclose and define an opening 8530. In at least some cases, the opening 8530 is sized to receive a tool in a first orientation (e.g. an occlusogingival orientation) to facilitate securing the attachment portion 8500 to the securing member 8600. Other orientations are possible.

The head 8502 can have a front surface (facing out of the page) and a back surface (not visible in FIG. 85), and a thickness t (labeled in FIG. 87A) measured between the front and back surfaces. In some embodiments, the head 8502 and the connector 8503 are part of the same, monolithic piece of material (e.g., cut from a sheet of material, a 3D-printed piece, etc.). Thus, the head 8502 and the connector 8503 may refer to different portions of the same continuous component. The attachment portion 8500 can be one portion of a greater orthodontic appliance, or may be formed separately and attached to an orthodontic appliance. The attachment portion 8500 and/or the corresponding appliance can be cut from the same sheet of material and/or may be formed by molding, casting, machining, 3D printing, stamping, extruding, or the like. The attachment portion 8500 may comprise a metal or a plastic and may have superelastic and/or shape memory properties. In some embodiments, the attachment portion 8500 does not have superelastic and/or shape memory properties.

As parts of the head 8502, the attachment portion 8500 can comprise various structures associated with one or more functional objectives. These functional objectives can include establishing and maintaining a secure connection between the attachment portion 8500 and the securing member 8600 when the attachment portion 8500 is in the attached state, establishing and maintaining efficient transfer of orthodontic force from the appliance to the tooth via the attachment portion 8500 and the securing member 8600 when the attachment portion 8500 is in the attached state, allowing convenient movement of the attachment portion 8500 from the attached state to the detached state, allowing convenient movement of the attachment portion 8500 from the detached state to the attached state, and providing a tactile indication of movement of the attachment portion 8500 to the attached state, among others.

With reference to FIG. 85, the attachment portion 8500 at the head 8502 can comprise distal and mesial projections 8506, 8506' extending from a distal and mesial aspect, respectively, of an occlusal end portion of the connector 8503. Each of the distal and mesial projections 8506, 8506' comprise an interior surface 8525 and 8525', respectively, and an exterior surface 8527 and 8527', respectively. The distal projection 8506 can comprise an elongate member extending along a longitudinal axis from a first end portion **8506*a* to a second end portion 8506*b*. Starting at the first end portion 8506*a* and extending along the longitudinal axis to the second end portion 8506*b*, the distal projection 8506 can include a curved, gingivally located first region 8507*a* and a linear second region 8507*b* continuous with and extending occlusally from the first region 8507*a*. In some embodiments the first region 8507*a* is linear. The distal projection 8506 can comprise a third region 8507*c* extending distally from a distal side of the second region 8507*b*. As shown in FIG. 85, in some embodiments the third region 8507*c* extends distally away from a location along the longitudinal axis of the second region 8507*b* that is spaced apart from the second end portion 8506*b* such that the second region 8507*b* includes an occlusal portion 8508 that is occlusal of the proximal end of the third region 8507*c* along the longitudinal axis of the second region 8507*b*. Each of the occlusal portions of the distal and mesial projections 8506, 8506' can provide a surface configured to be engaged by a tool that pinches the occlusal portions 8508, 8508' toward one another (and thus the distal and mesial projections 8506, 8506' toward one another). In some embodiments, the third region 8507*c* extends distally away from the second end portion 8506*b*. The mesial projection 8506' can include features as described for the distal projection 8506** but mirrored about the occlusogingival plane P.

Figure 86:
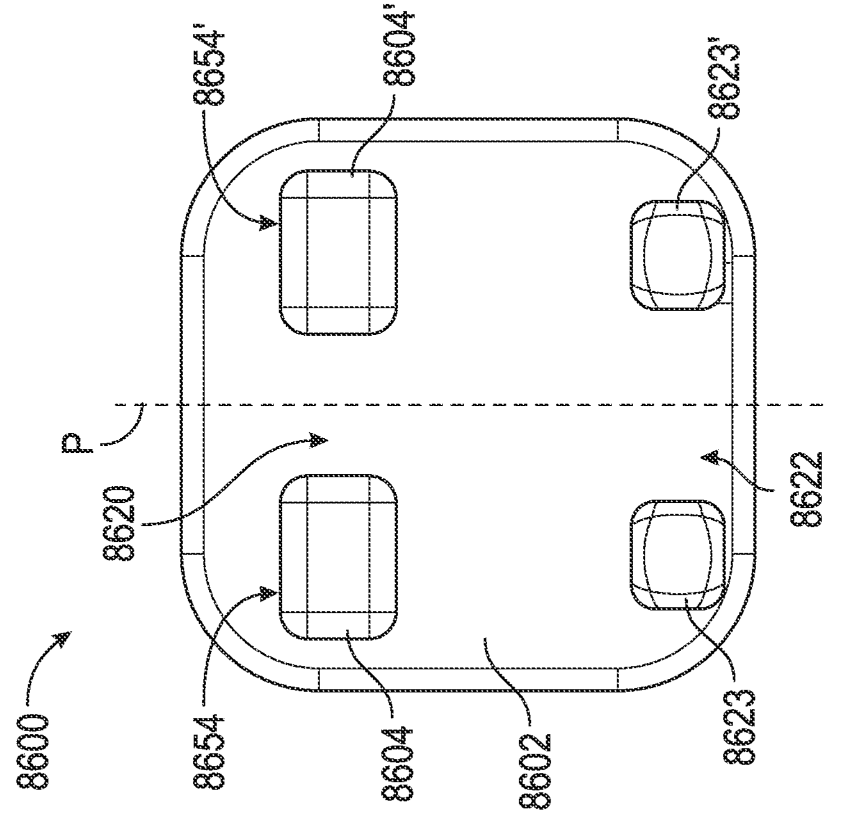
FIG. 86 is a front view of a securing member configured in accordance with several embodiments of the present technology.

FIG. 86 is a front view of the securing member 8600 configured for use with the attachment portion 8500. The securing member 8600 has a first side (facing out of the page) and a second side (not visible in FIG. 86) opposite the first side along a thickness of the securing member 8600 and configured to be bonded to a patient's tooth. The securing member 8600 can comprise a backing 8602 and distal and mesial occlusal protrusions 8604, 8604' carried by and extending away from the first side of the backing 8602 along a buccolingual dimension and distal and mesial gingival protrusions 8623, 8623' carried by and extending away from the first side of the backing 8602 along the buccolingual dimension. The occlusal and gingival protrusions 8604, 8604', 8623, 8623' can be configured to engage the attachment portion 8500 and to retain the attachment portion 8500 at a specific location relative to the backing 8602 and the patient's tooth.

The distal occlusal protrusion 8604 can be configured to engage the distal projection 8506 of the attachment portion 8500 to prevent or limit gingival, distal, and lingual motion of the attachment portion 8500 when the attachment portion 8500 is in the attached state. The occlusal protrusions 8604, 8604' can be spaced apart from one another by a gap 8620 along the mesiodistal dimension. In some embodiments, the distal protrusion 8604 has a first region extending lingually (or buccally, depending on which side of the tooth the securing member 8600 is attached) away from the backing 8602 and a second region extending away from the first region towards the occlusogingival plane P and spaced apart from the backing 8602 by a gap along the buccolingual dimension. This gap can have a depth that is slightly greater than a thickness t of the attachment portion 8500 so that the attachment portion 8500 can fit between the second region of the protrusion 8604 and the backing 8602. In at least some cases, an inner surface 8616 (see FIG. 87B) of the distal occlusal protrusion 8604 and a portion of the interior surface 8225 of the attachment portion 8500 along the second region **8507*b* are primary force-transferring surfaces through which active and/or retentive orthodontic force is transferred to the tooth. In addition or alternatively, other surfaces of the securing member 8600 and the attachment portion 8500 that contact one another when the attachment portion 8500 is in the attached state can serve as force-transferring surfaces. The distal occlusal protrusion 8604 can also define a surface 8654 that extends lingually from the backing 8602 and faces occlusally. The surface 8654 together with the third region 8507*c* of the distal projection 8506 can restrict gingival movement of the attachment portion 8500 relative to the securing member 8600 when the attachment portion 8500 is in the attached state. The distal occlusal protrusion 8604 can further include an inner surface (not visible) facing towards the backing 8602 and configured to prevent or limit lingual (or buccal) movement of the attachment portion 8500. The mesial occlusal protrusion 8604' can have features as described for the distal occlusal protrusion 8604** but mirrored about the occlusogingival plane P.

Figure 87A:
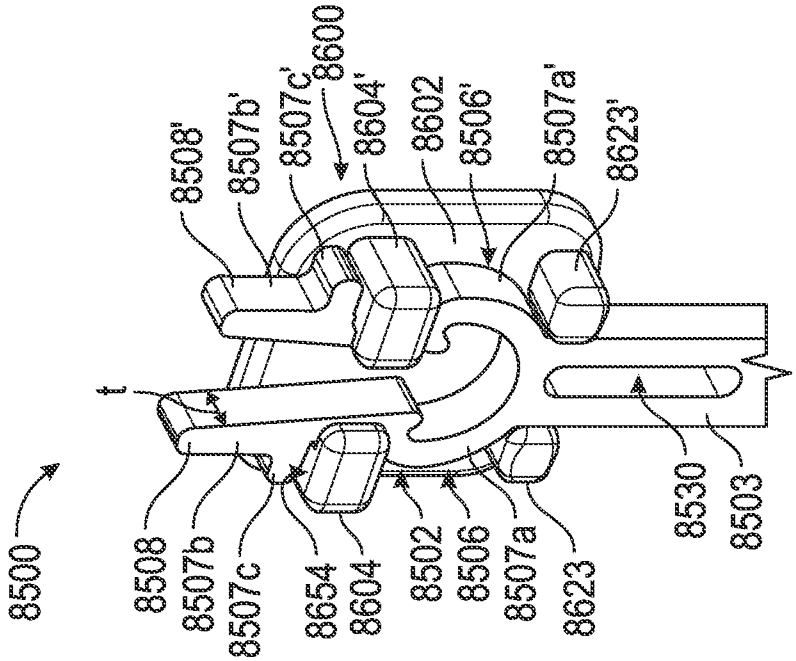
FIGS. 87A and 87B are different views of an attachment portion secured to a securing member in accordance with several embodiments of the present technology.
Figure 87B:
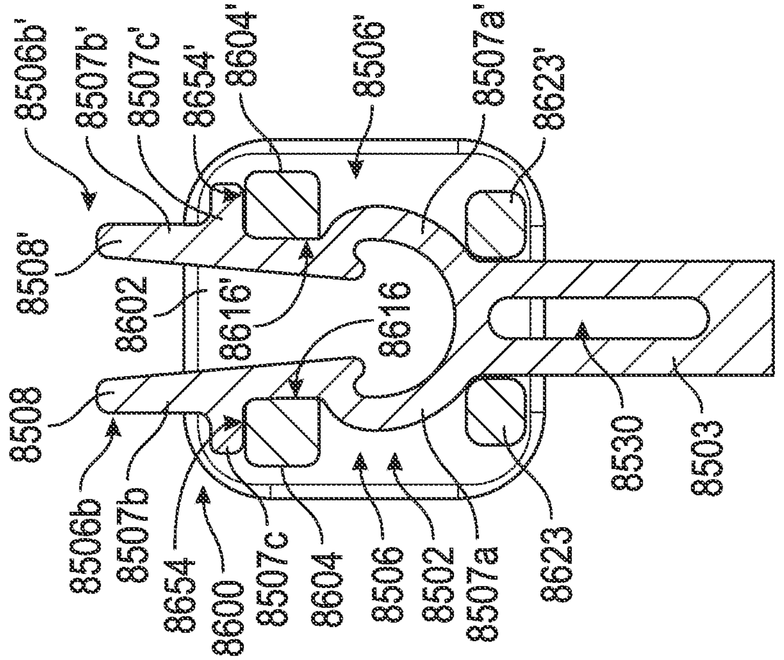

The gingival protrusions 8623, 8623' can be spaced apart from one another by a gap 8622 along the mesiodistal dimension. The gap 8622 can be sized to at least partially receive a portion of the connector 8503 connected to the head 8502 of the attachment portion 8500. Referring to FIGS. 87A and 87B, in the secured state, the attachment portion 8500 can be positioned proximate and/or against the backing 8602 of the securing member 8600 and bound between the occlusal 8604, 8604' and gingival protrusions

8623, 8623'. The connector 8503 can also be positioned between the gingival protrusions 8623, 8623' (e.g., within the gap 8622). The gingival protrusions 8623, 8623' can engage the mesial and distal sides of the head 8502 and/or connector 8503 to prevent or limit mesiodistal motion of the attachment portion 8500. When the attachment portion 8500 is secured to the securing member 8600, all or a portion of the occlusal portions 8508, 8508' of the second regions 8507*b*, 8507*b'* can extend occlusally of an occlusal edge of the backing 8602. These occlusal portions 8508, 8508' of the distal and mesial projections can advantageously provide a surface configured to be engaged by a tool that pinches the occlusal portions 8508, 8508' toward one another (and thus the distal and mesial projections 8506, 8506' toward one another) to engage and disengage the securing member 8600.

The attachment portion 8500 can comprise a resilient and/or superelastic material such that, when the attachment portion 8500 is braced between the protrusions 8604, 8604', the attachment portion 8500 actively exerts force on the surrounding surfaces. The attachment portion 8500 (or one or more portions thereof) can be configured to press on the securing member 8600 when in the secured position. Active and/or continuous force exerted by the attachment portion 8500 on the securing member 8600 can advantageously eliminate or reduce play between the attachment portion 8500 and the securing member 8600 along a mesiodistal dimension, an occlusogingival dimension, and/or a buccolingual dimension, thus providing a more accurate and efficient transfer of force from the appliance to the tooth. In some embodiments, the attachment portion 8500 (or one or more portions thereof) does not chronically press outwardly on the securing member 8600 and is instead configured to engage the securing member 8600 if the attachment portion 8500 moves into contact with and/or moves such that it exerts a force on one or more portions of the securing member 8600. Thus, the securing member 8600 can be configured to limit movement of the attachment portion 8500 relative to the securing member 8600. In some embodiments, one or more of the securing surfaces is configured for transferring orthodontic force between the attachment portion 8500 (e.g., to and/or from the connector 8503, to and/or from the rest of the appliance, etc.) and the securing member 8600 (e.g., to and/or from the tooth, etc.). In various embodiments, one or more of the securing surfaces does not substantially transfer orthodontic force between the attachment portion 8500 and the securing member 8600.

The attachment portion 8500 of FIGS. 85, 87A and 87B can be secured to the securing member 8600 by positioning the attachment portion 8500 proximate the securing member 8600 and moving the attachment portion 8500 along an occlusogingival path. The connector 8503 and/or other portion of the appliance continuous with the head 8502 of the attachment portion 8500 can be positioned relative to the securing member 8600 such that the head 8502 is positioned occlusally of the occlusal protrusions 8604, 8604' of the securing member 8600 and/or at, near, and/or occlusally of an occlusal edge of the backing 8602. The portion of the connector 8503 connected to the head 8502 can be positioned within the mesiodistal gap 8620 between the protrusions 8604, 8604' of the securing member 8600. In some embodiments, the back surface of the attachment portion 8500 can be positioned proximate and/or in contact with the backing 8602 of the securing member 8600. In some embodiments, an operator slides the connector 8503 and head 8502 occlusogingivally by positioning a tool (e.g., tool 830 in FIG. 8) within the opening 8530 and moving the tool occlusogingivally. Continued gingival movement of the connector 8503 and/or head 8502 can force the exterior surfaces of the distal and mesial projections 8506, 8506' along the first regions 8507*a*, 8507*a'* into contact with the occlusal protrusions 8604, 8604', respectively. Because of the shapes and positions of the occlusal protrusions 8604, 8604', occlusogingival force applied to the first regions 8507*a*, 8507*a'* can force the first regions 8507*a*, 8507*a'* to bend mesiodistally. Once the first regions 8507*a*, 8507*a'* clear the occlusal protrusions 8604, 8604', the distal and mesial projections 8506, 8506', can bend back towards their shapes in the relaxed state, thereby wedging the attachment portion 8500 into the securing member 8600 as shown in FIGS. 87A and 87B.

The attachment portion 8500 can comprise distal and mesial flexures 8532, 8532' configured to bend and/or otherwise deform to facilitate securing of the attachment portion 8500 to the securing member 8600. In some embodiments, the flexures 8532, 8532' comprise all or portions of the distal and mesial projections 8506, 8506'. The projections 8506, 8506', for example, can be configured to bend in a first direction to facilitate or enable sliding of the attachment portion 8500 gingivally to secure to the securing member 8600 and/or the projections 8506, 8506' can be configured to bend in a second, opposite direction to facilitate or enable locking of the attachment portion 8500 to the securing member 8600. In the illustrated embodiment, deformation of the flexures 8532, 8532' while moving the attachment portion 8500 from the detached state to the attached state is primarily in a mesiodistal dimension. In other embodiments, this deformation can be primarily in an occlusogingival dimension and/or equally in a mesiodistal and occlusogingival dimension. In any of these cases, the deformation can also be buccolingual.

To release the attachment portion 8500 from the securing member 8600, the projections 8506, 8506' can be pinched together to allow the first regions 8507*a* to move occlusally through the gap 8620 between the occlusal protrusions 8604, 8604'. In some embodiments, a second tool is inserted into the opening 8530 in the connector 8503 to push and guide the attachment portion 8500 in an occlusal direction. With or without the second tool, the attachment portion 8500 can then be pulled away from the backing 8602 along the occlusogingival dimension.

The location at which the connector 8503 connects to the head 8502, a dimension along which the connector 8503 extends, a property of the connector 8503, etc. can be at least partially based on a force to be imparted on a tooth to which the attachment portion 8500 is configured to be secured (and/or an intended movement of the tooth). For example, as previously noted, movement of the attachment portion 8500 between the attached and detached states can include movement of the projections 8506, 8506' in a mesiodistal dimension. Thus, to avoid any movement of a connector 8503 unintentionally causing the attachment portion 8500 to move toward the detached state during treatment and/or to avoid inhibiting useful movement of the projections 8506, 8506' related to attaching and/or detaching processes, the connector 8503 can connect to a portion of the attachment portion 8500 away from the projections 8506, 8506' and in particular a location that would not cause movement of the projections 8506, 8506' in any way that is biased towards disengagement from the securing member 8600. In some cases, for example as shown in FIG. 85, the connector 8503 is continuous with the proximal end portions of the 8506, 8506'. Such a configuration can prevent or limit the connector 8503 from applying forces to the projections 8506, 8506' that inadvertently cause the flexures 8532, 8532' to deform during orthodontic treatment. The location at which the connector 8503 connects to the head 8502, a dimension along which the connector 8503 extends, a property of the connector 8503, etc. can at least partially be based on the mechanism by which the attachment portion 8500 is attached to and/or detached from the securing member 8600 and/or the geometry of the securing member 8600.

Figure 88:
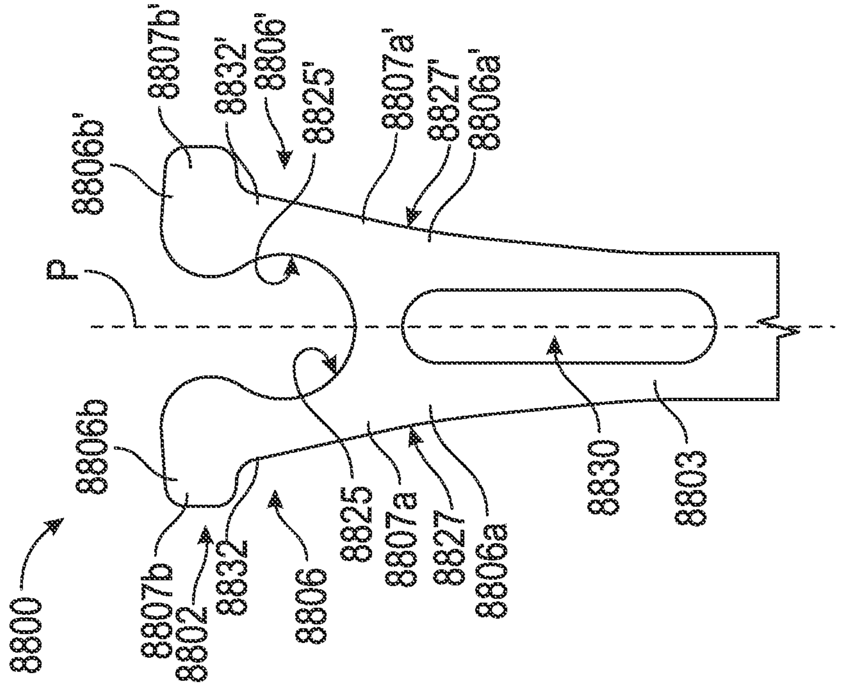
FIG. 88 is a front view of an attachment portion configured in accordance with several embodiments of the present technology.

FIG. 88 shows a planar view of an attachment portion 8800 configured in accordance with several embodiments of the present technology. The attachment portion 8800 can be configured to be secured to a patient's tooth via a securing member, such as securing member 8900 shown in FIG. 89. The attachment portion 8800 and the securing member 8900 are shown in a secured arrangement in FIGS. 90A and 90B. As discussed in greater detail below, the attachment portion 8800 and the securing member 8900 can be configured such that the attachment portion 8800 can be releasably secured to the securing member 8900. The attachment portion 8800 can be continuous with a connector 8803 that connects the attachment portion 8800 to one or more additional portions (not shown) of the overall orthodontic appliance. The attachment portion 8800 can have an attached state in which the orthodontic appliance exerts active and/or retentive orthodontic force (e.g., from a biasing portion (not shown) of the orthodontic appliance) on the tooth via the connector 8803, the attachment portion 8800, and the securing member 8900. Correspondingly, the attachment portion 8800 can have a detached state in which the orthodontic appliance is operably disconnected from the securing member 8900.

The attachment portion 8800 can be configured to move from the detached state to the attached state in response to relative movement between the attachment portion 8800 and the securing member 8900 in an occlusogingival dimension. This relative movement and/or another action can cause the attachment portion 8800 to resiliently deform and then at least partially return to its original form. In this or another manner, the attachment portion 8800 can pop and/or snap from the detached state to the attached state. Furthermore, the attachment portion 8800 can be configured to move from the attached state toward the detached state in response to leverage. These and other features of processes for moving the attachment portion 8800 between the attached and detached states as well as structures of the attachment portion 8800 and the securing member 8900 associated with these features are further discussed below with reference to FIGS. 88-90B.

In at least some cases, the attachment portion 8800 and the securing member 8900 are symmetrical about an occlusogingival plane P that bisects the attachment portion 8800 and the securing member 8900 at an occlusogingival midline when the attachment portion 8800 is in the attached state. In FIGS. 88-90B, symmetrical features of the attachment portion 8800 and the securing member 8900 at a distal side of the occlusogingival plane P are assigned a reference number with no apostrophe whereas symmetrical features at a mesial side of the occlusogingival plane P are assigned a reference number with an apostrophe. In the discussion of FIGS. 88-90B herein, the symmetrical features at the distal side of the occlusogingival plane P may be referred to as "distal" whereas the symmetrical features at the mesial side of the occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth. Also, "occlusal" and "gingival" features can be occlusal and gingival, respectively, when the appliance is installed in the illustrated orientation or be gingival and occlusal, respectively, when the appliance is installed in an opposite orientation rotated 180 degrees about a buccolingual axis relative to the illustrated orientation.

Referring to FIG. 88, the attachment portion 8800 can comprise a head 8802. In some embodiments, the attachment portion 8800 comprises a head 8802 and at least a portion of the connector 8803 that is continuous with the head 8802. The connector 8803, for example, can comprise a second connector as previously described herein and/or can extend gingivally away from a gingival portion of the head 8802. The connector 8803 can have features similar to any of the connectors disclosed herein (e.g., first connectors, second connectors, third connectors, etc.) and can comprise a single connector or multiple connectors. For example, the connector 8803 can comprise a single, occlusogingivally extending connector (as shown in FIG. 88), multiple occlusogingivally extending connectors, one or more occlusogingivally extending connectors and one or more mesiodistally extending connectors branching off of the one or more occlusogingivally extending connectors and/or the attachment portion 8800, or one or more mesiodistally extending connectors (and no occlusogingivally extending connectors). Accordingly, the attachment portion 8800 can be connected to a single connector or to multiple connectors also referred to herein as a connector 8803. The connector 8803 can connect to the head 8802 at a variety of locations. For example, a gingivally extending connector can connect to a gingival portion of the head 8802. Any connector 8803 disclosed herein can extend away from the head 8802 along a variety of dimensions (e.g., along an occlusogingival dimension, a mesiodistal dimension, a buccolingual dimension, etc.).

The portion of the connector 8803 immediately adjacent the attachment portion 8800 can at least partially enclose and define an opening 8830. In at least some cases, the opening 8830 is sized to receive a tool in a first orientation (e.g. an occlusogingival orientation) to facilitate securing the attachment portion 8800 to the securing member 8900. Other orientations are possible.

The head 8802 can have a front surface (facing out of the page) and a back surface (not visible in FIG. 88), and a thickness t (labeled in FIG. 90A) measured between the front and back surfaces. In some embodiments, the head 8802 and the connector 8803 are part of the same, monolithic piece of material (e.g., cut from a sheet of material, a 3D-printed piece, etc.). Thus, the head 8802 and the connector 8803 may refer to different portions of the same continuous component. The attachment portion 8800 can be one portion of a greater orthodontic appliance, or may be formed separately and attached to an orthodontic appliance. The attachment portion 8800 and/or the corresponding appliance can be cut from the same sheet of material and/or may be formed by molding, casting, machining, 3D printing, stamping, extruding, or the like. The attachment portion 8800 may comprise a metal or a plastic and may have superelastic and/or shape memory properties. In some embodiments, the attachment portion 8800 does not have superelastic and/or shape memory properties.

As parts of the head 8802, the attachment portion 8800 can comprise various structures associated with one or more functional objectives. These functional objectives can include establishing and maintaining a secure connection between the attachment portion 8800 and the securing member 8900 when the attachment portion 8800 is in the attached state, establishing and maintaining efficient transfer of orthodontic force from the appliance to the tooth via the attachment portion 8800 and the securing member 8900 when the attachment portion 8800 is in the attached state, allowing convenient movement of the attachment portion 8800 from the attached state to the detached state, allowing convenient movement of the attachment portion 8800 from the detached state to the attached state, and providing a tactile indication of movement of the attachment portion 8800 to the attached state, among others.

With reference to FIG. 88, the attachment portion 8800 at the head 8802 can comprise distal and mesial projections 8806, 8806' extending from a distal and mesial aspect, respectively, of an occlusal end portion of the connector 8803. Each of the distal and mesial projections 8806, 8806' comprise an interior surface 8825 and 8825', respectively, and an exterior surface 8827 and 8827', respectively. The distal projection 8806 can comprise an elongate member extending along a longitudinal axis from a first end portion **8806*a* to a second end portion 8806*b*. Starting at the first end portion 8806*a* and extending along the longitudinal axis to the second end portion 8806*b*, the distal projection 8806 can include a gingivally located first region 8807*a* and a second region 8807*b* continuous with and extending distally from the first region 8807*a*. The mesial projection 8806' can include features as described for the distal projection 8806** but mirrored about the occlusogingival plane P.

Figure 89:
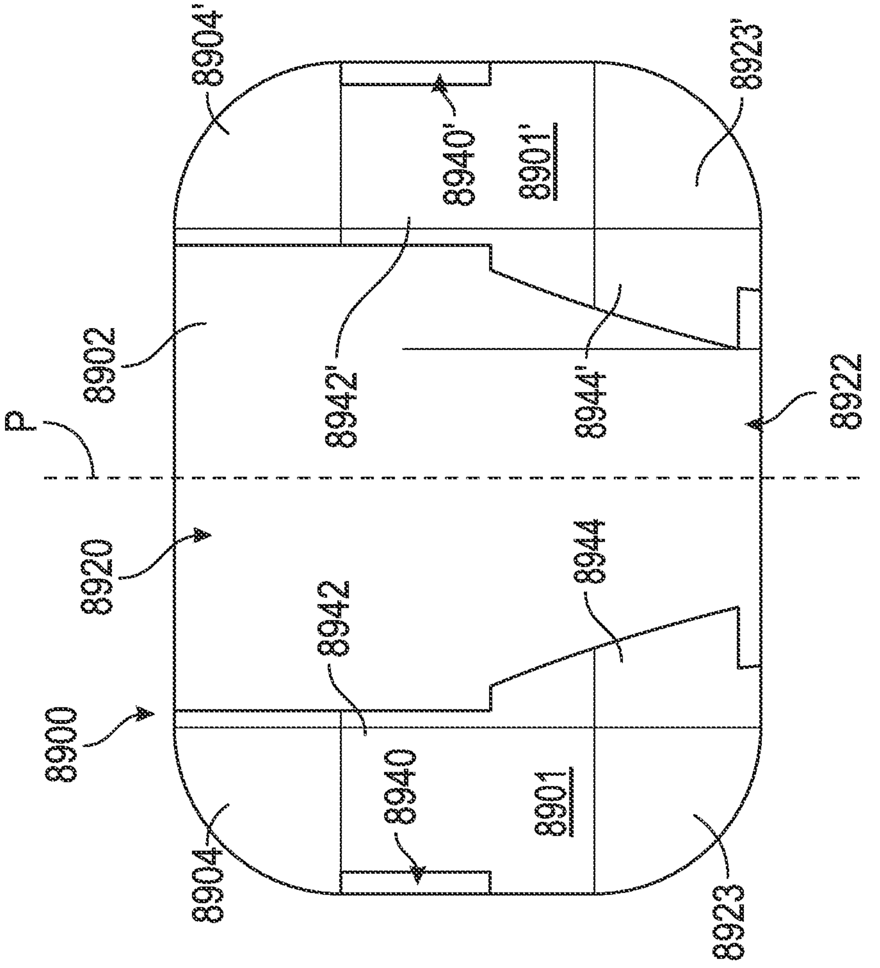
FIG. 89 is a front view of a securing member configured in accordance with several embodiments of the present technology.

FIG. 89 is a front view of the securing member 8900 configured for use with the attachment portion 8800. The securing member 8900 has a first side (facing out of the page) and a second side (not visible in FIG. 89) opposite the first side along a thickness of the securing member 8900 and configured to be bonded to a patient's tooth. The securing member 8900 can comprise a backing 8902 and distal and mesial protrusions 8901, 8901' carried by and extending away from the first side of the backing 8902. The distal and mesial protrusions 8901, 8901' can be spaced apart by a gap 8921 along a mesiodistal dimension. The distal and mesial protrusions 8901, 8901' can be configured to engage the attachment portion 8800 and to retain the attachment portion 8800 at a specific location relative to the backing 8902 and the patient's tooth.

The distal and mesial protrusions 8901, 8901' can include openings 8940, 8940', respectively, that extend in a distal and mesial direction, respectively, from an inner surface of the distal and mesial protrusions 8901, 8901'. In some embodiments, for example as shown in FIG. 89, both of the openings 8940, 8940' can extend through an entire width of the respective protrusion 8901, 8901'. In several embodiments, one or both of the openings 8940, 8940' extend only partially through the width of the respective protrusion 8901, 8901' (and thus does not terminate at an opening at an exterior surface of the respective protrusion 8901, 8901'). In any case, the openings 8940, 8940' are configured to receive all or a portion of the second regions **8807*b*, 8807' of the projections 8806, 8806' therein. For example, the openings 8940, 8940' can have a depth that is slightly greater than a thickness t of the attachment portion 8800 so that the attachment portion 8800 can fit in the openings 8940, 8940'**.

Each of the protrusions 8901, 8901' can have an occlusal portion 8904, 8904' above the opening 8940, 8940', an intermediate portion 8942, 8942' lingual (or buccal, depending on which side of the tooth the securing member 8900 is attached) of the opening 8940, 8940', and a gingival portion 8923, 8923' gingival of the opening 8940, 8940'. The gingival portions 8923, 8923' can include a lip 8944, 8944' that extends inwardly, towards the occlusogingival plane P, along a mesiodistal dimension. Each of the lips 8944, 8944' can be spaced apart from the backing 8902 by a gap in which the attachment portion 8800 is configured to be positioned. The occlusal portions 8904, 8904' can be spaced apart from one another by a gap 8920 along the mesiodistal dimension, and the gingival portions 8923, 8923' can be spaced apart from one another by a gap 8922 along the mesiodistal dimension. The gap 8922 can be sized to at least partially receive a portion of the connector 8803 connected to the head 8802 of the attachment portion 8800.

Figure 90B:
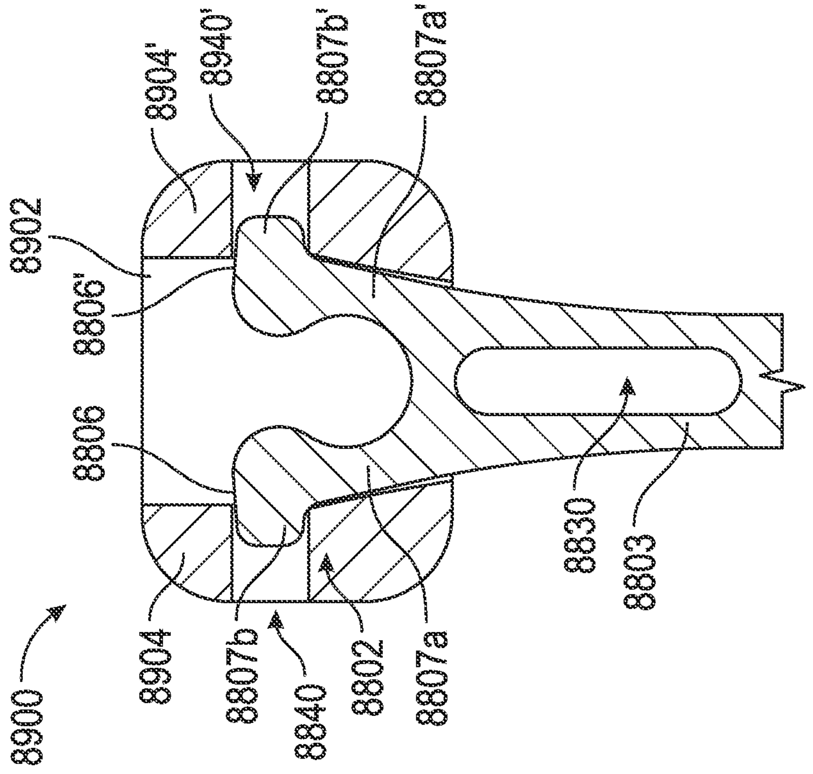
FIGS. 90A and 90B are different views of an attachment portion secured to a securing member in accordance with several embodiments of the present technology.
Figure 90A:
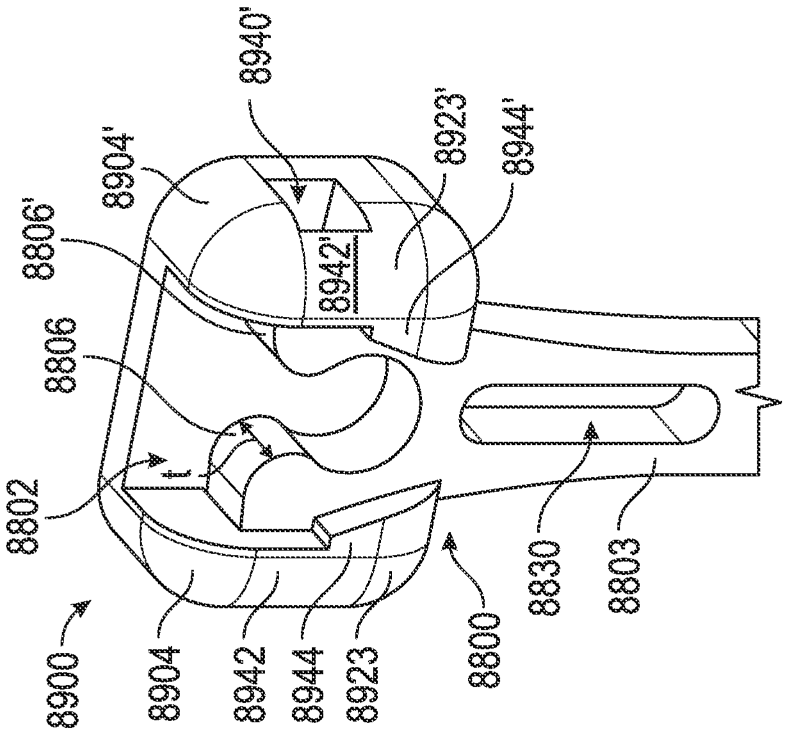

Referring to FIGS. 90A and 90B, the occlusal portions 8904, 8904' can be configured to engage the second regions **8807*b*, 8807' of the projections 8806, 8806' of the attachment portion 8800 to prevent or limit occlusal motion of the attachment portion 8800 when the attachment portion 8800 is in the attached state. The intermediate portions 8942, 8942' can be configured to engage the second regions 8807*b*, 8807*b*' of the projections 8806, 8806' of the attachment portion 8800 to prevent or limit lingual (or buccal, depending on which side of the tooth the securing member 8900 is attached) motion of the attachment portion 8800 when the attachment portion 8800 is in the attached state. The gingival portions 8923, 8923' can be configured to engage the first regions 8807*a*, 8807*a*' of the projections 8806, 8806' of the attachment portion 8800 to prevent or limit mesiodistal motion of the attachment portion 8800 when the attachment portion 8800 is in the attached state. The lips 8944, 8944' of the gingival portions 8923, 8923' can be configured to engage the first regions 8807*a*, 8807*a*' of the projections 8806, 8806' of the attachment portion 8800 to prevent or limit lingual (or buccal, depending on which side of the tooth the securing member 8900 is attached) motion of the attachment portion 8800 when the attachment portion 8800 is in the attached state. In the attached state, the attachment portion 8800 can be positioned proximate and/or against the backing 8902 of the securing member 8900 and bound between the distal and mesial protrusions 8901, 8901'. Some or none of the connector 8803 can also be positioned between the gingival portions 8923, 8923' (e.g., within the gap 8922) of the protrusions 8901, 8901'**.

The attachment portion 8800 can comprise a resilient and/or superelastic material such that, when the attachment portion 8800 is braced between the protrusions 8901, 8901', the attachment portion 8800 actively exerts force on the surrounding surfaces. The attachment portion 8800 (or one or more portions thereof) can be configured to press on the securing member 8900 when in the secured position. Active and/or continuous force exerted by the attachment portion 8800 on the securing member 8900 can advantageously eliminate or reduce play between the attachment portion 8800 and the securing member 8900 along a mesiodistal dimension, an occlusogingival dimension, and/or a buccolingual dimension, thus providing a more accurate and efficient transfer of force from the appliance to the tooth. In some embodiments, the attachment portion 8800 (or one or more portions thereof) does not chronically press outwardly on the securing member 8900 and is instead configured to engage the securing member 8900 if the attachment portion 8800 moves into contact with and/or moves such that it exerts a force on one or more portions of the securing member 8900. Thus, the securing member 8900 can be configured to limit movement of the attachment portion 8800 relative to the securing member 8900. In some embodiments, one or more of the securing surfaces is configured for transferring orthodontic force between the attachment portion 8800 (e.g., to and/or from the connector 8803, to and/or from the rest of the appliance, etc.) and the securing member 8900 (e.g., to and/or from the tooth, etc.). In various embodiments, one or more of the securing surfaces does not substantially transfer orthodontic force between the attachment portion 8800 and the securing member 8900.

The attachment portion 8800 of FIGS. 88, 90A and 90B can be secured to the securing member 8900 by positioning the attachment portion 8800 proximate the securing member 8900 and moving the attachment portion 8800 along an occlusogingival path. The connector 8803 and/or other portion of the appliance continuous with the head 8802 of the attachment portion 8800 can be positioned relative to the securing member 8900 such that the head 8802 is positioned occlusally of the occlusal portions 8904, 8904' of the securing member 8900 and/or at, near, and/or occlusally of an occlusal edge of the backing 8902. The portion of the connector 8803 connected to the head 8802 can be positioned within the mesiodistal gap 8920 between the occlusal portions 8904, 8904' of the securing member 8900. In some embodiments, the back surface of the attachment portion 8800 can be positioned proximate and/or in contact with the backing 8902 of the securing member 8900. In some embodiments, an operator slides the connector 8803 and head 8802 occlusogingivally by positioning a tool (e.g., tool 830 in FIG. 8) within the opening 8830 and moving the tool occlusogingivally. Continued gingival movement of the connector 8803 and/or head 8802 can force the exterior surfaces of the distal and mesial projections 8806, 8806' along the first regions 8807*a*, 8807*a'* into contact with the occlusal protrusions 8904, 8904', respectively. Because of the shapes and positions of the occlusal protrusions 8904, 8904', occlusogingival force applied to the first regions 8807*a*, 8807*a'* can force the first regions 8807*a*, 8807*a'* to bend mesiodistally. Once the first regions 8807*a*, 8807*a'* clear the occlusal protrusions 8904, 8904', the distal and mesial projections 8806, 8806', can bend back towards their shapes in the relaxed state, thereby wedging the attachment portion 8800 into the securing member 8900 as shown in FIGS. 90A and 90B.

The attachment portion 8800 can comprise distal and mesial flexures 8832, 8832' configured to bend and/or otherwise deform to facilitate securing of the attachment portion 8800 to the securing member 8900. In some embodiments, the flexures 8832, 8832' comprise all or portions of the distal and mesial projections 8806, 8806'. The projections 8806, 8806', for example, can be configured to bend in a first direction to facilitate or enable sliding of the attachment portion 8800 gingivally to secure to the securing member 8900 and/or the projections 8806, 8806' can be configured to bend in a second, opposite direction to facilitate or enable locking of the attachment portion 8800 to the securing member 8900. In the illustrated embodiment, deformation of the flexures 8832, 8832' while moving the attachment portion 8800 from the detached state to the attached state is primarily in a mesiodistal dimension. In other embodiments, this deformation can be primarily in an occlusogingival dimension and/or equally in a mesiodistal and occlusogingival dimension. In any of these cases, the deformation can also be buccolingual. To release the attachment portion 8800 from the securing member 8900, the projections 8806, 8806' can be pinched together to allow the first regions 8807*a* to move occlusally through the gap 8920 between the occlusal protrusions 8904, 8904'. In some embodiments, a second tool is inserted into the opening 8830 in the connector 8803 to push and guide the attachment portion 8800 in an occlusal direction. With or without the second tool, the attachment portion 8800 can then be pulled away from the backing 8902 along the occlusogingival dimension.

The location at which the connector 8803 connects to the head 8802, a dimension along which the connector 8803 extends, a property of the connector 8803, etc. can be at least partially based on a force to be imparted on a tooth to which the attachment portion 8800 is configured to be secured (and/or an intended movement of the tooth). For example, as previously noted, movement of the attachment portion 8800 between the attached and detached states can include movement of the projections 8806, 8806' in a mesiodistal dimension. Thus, to avoid any movement of a connector 8803 unintentionally causing the attachment portion 8800 to move toward the detached state during treatment and/or to avoid inhibiting useful movement of the projections 8806, 8806' related to attaching and/or detaching processes, the connector 8803 can connect to a portion of the attachment portion 8800 away from the projections 8806, 8806' and in particular a location that would not cause movement of the projections 8806, 8806' in any way that is biased towards disengagement from the securing member 8900. In some cases, for example as shown in FIG. 88, the connector 8803 is continuous with the proximal end portions of the projections 8806, 8806'. Such a configuration can prevent or limit the connector 8803 from applying forces to the projections 8806, 8806' that inadvertently cause the flexures 8832, 8832' to deform during orthodontic treatment. The location at which the connector 8803 connects to the head 8802, a dimension along which the connector 8803 extends, a property of the connector 8803, etc. can at least partially be based on the mechanism by which the attachment portion 8800 is attached to and/or detached from the securing member 8900 and/or the geometry of the securing member 8900.

B. Moveable Securing Members

In some embodiments, a securing member can include one or more moveable components that are configured to move to secure an attachment portion to the securing member and/or release an attachment portion from securing member. Attachment portions configured for use with such securing members can be resilient, for example as described above, or may be relatively rigid.

Figure 91:
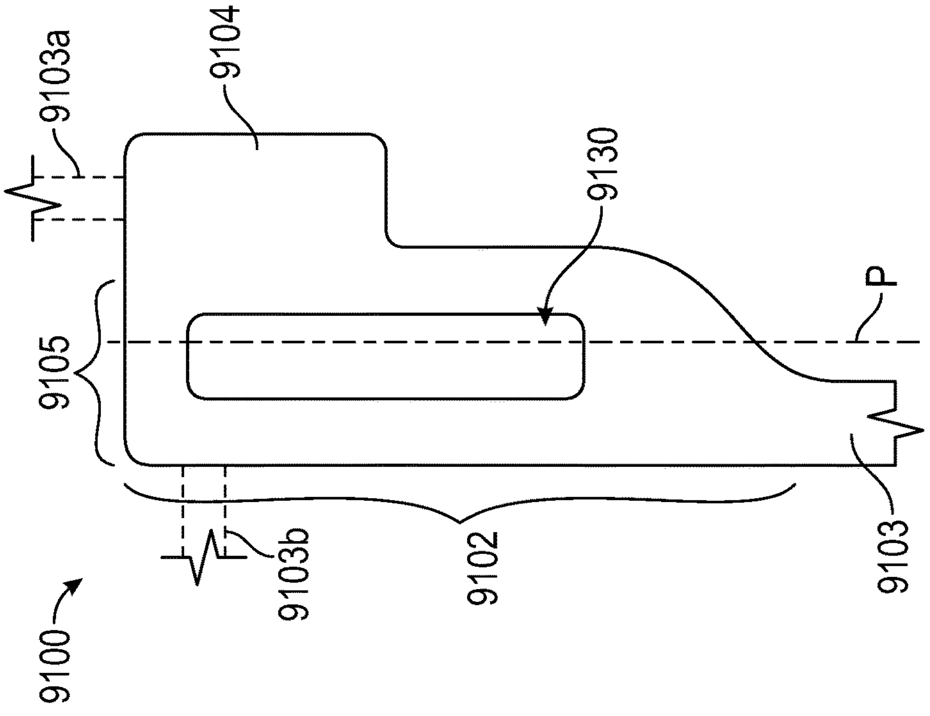
FIG. 91 is a front view of an attachment portion configured in accordance with several embodiments of the present technology.

FIG. 91 shows a planar view of an attachment portion 9100 configured in accordance with several embodiments of the present technology. The attachment portion 9100 can be configured to be secured to a patient's tooth via a securing member, such as securing member 9200 shown in FIG. 92. The attachment portion 9100 and the securing member 9200 are shown in a secured arrangement in FIGS. 93A and 93B. As discussed in greater detail below, the attachment portion 9100 and the securing member 9200 can be configured such that the attachment portion 9200 can be releasably secured to the securing member 9200 at least in part by a deformable protrusion of the securing member 9200. The attachment portion 9100 can be continuous with a connector 9103 that connects the attachment portion 9100 to one or more additional portions (not shown) of the overall orthodontic appliance. The attachment portion 9100 can have an attached state in which the orthodontic appliance exerts active and/or retentive orthodontic force (e.g., from a biasing portion (not shown) of the orthodontic appliance) on the tooth via the connector 9103, the attachment portion 9100, and the securing member 9200. Correspondingly, the attachment portion 9100 can have a detached state in which the orthodontic appliance is operably disconnected from the securing member 9200.

In the discussion of FIGS. 91-93B herein, the features at the distal side of an occlusogingival plane P (labeled in FIG. 92) may be referred to as "distal" whereas the features at the mesial side of an occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth.

Referring to FIG. 91, the attachment portion 9100 can comprise a head 9102. In some embodiments, the attachment portion 9100 comprises a head 9102 and at least a portion of the connector 9103 that is continuous with the head 9102. The connector 9103, for example, can comprise a second connector as previously described herein and/or can extend gingivally away from a gingival portion of the head 9102. The connector 9103 can have features similar to any of the connectors disclosed herein (e.g., first connectors, second connectors, third connectors, etc.) and can comprise a single connector or multiple connectors. For example, the connector 9103 can comprise a single, occlusogingivally extending connector (as shown in FIG. 91), multiple occlusogingivally extending connectors, one or more occlusogingivally extending connectors and one or more mesiodistally extending connectors branching off of the one or more occlusogingivally extending connectors and/or the attachment portion 9100, or one or more mesiodistally extending connectors (and no occlusogingivally extending connectors). Accordingly, the attachment portion 9100 can be connected to a single connector or to multiple connectors also referred to herein as a connector 9103. The connector 9103 can connect to the head 9102 at a variety of locations. In addition to or instead of a gingivally extending connector 9103, a connector (shown schematically as 9103*b*) can extend distally from a distal side of the head 9102 and/or a connector (shown schematically as connector 9103*a*) can extend occlusally from an occlusal side of the head 9102. Any connector 9103 disclosed herein can extend away from the head 9102 along a variety of dimensions (e.g., along an occlusogingival dimension, a mesiodistal dimension, a buccolingual dimension, etc.).

The head 9102 can have a front surface (facing out of the page) and a back surface (not visible in FIG. 91), and a thickness t (labeled in FIG. 93A) measured between the front and back surfaces. In some embodiments, the head 9102 and the connector 9103 are part of the same, monolithic piece of material (e.g., cut from a sheet of material, a 3D-printed piece, etc.). Thus, the head 9102 and the connector 9103 may refer to different portions of the same continuous component. The attachment portion 9100 can be one portion of a greater orthodontic appliance, or may be formed separately and attached to an orthodontic appliance. The attachment portion 9100 and/or the corresponding appliance can be cut from the same sheet of material and/or may be formed by molding, casting, machining, 3D printing, stamping, extruding, or the like. The attachment portion 9100 may comprise a metal or a plastic and may have superelastic and/or shape memory properties. In some embodiments, the attachment portion 9100 does not have superelastic and/or shape memory properties.

With reference to FIG. 91, the attachment portion 9100 at the head 9102 can comprise a first portion 9105 extending occlusally from the connector 9103 and a second portion 9104 extending mesially from a mesial side of the first portion 9104. The first portion 9105 can enclose and define an opening 9130. In at least some cases, the opening 9130 is sized to receive a tool in a first orientation (e.g. an occlusogingival orientation) to facilitate securing the attachment portion 9100 to the securing member 9200. Other orientations are possible.

Figure 92:
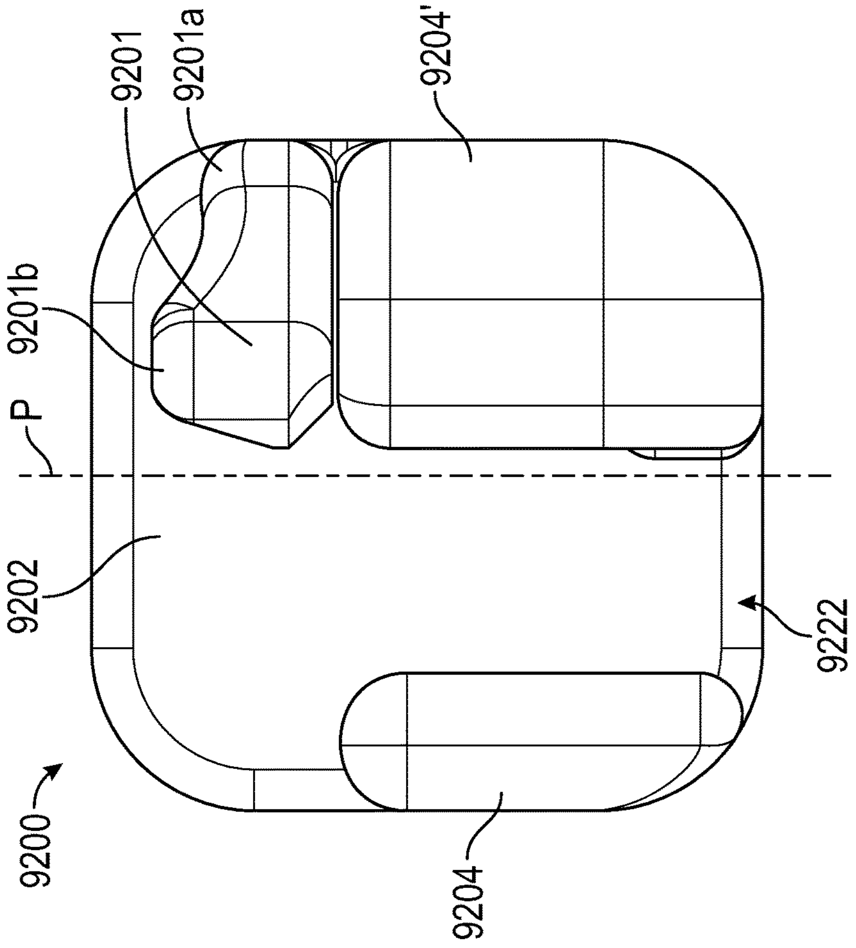
FIG. 92 is a front view of a securing member configured in accordance with several embodiments of the present technology.

FIG. 92 is a front view of the securing member 9200 configured for use with the attachment portion 9100. The securing member 9200 has a first side (facing out of the page) and a second side (not visible in FIG. 92) opposite the first side along a thickness of the securing member 9200 and configured to be bonded to a patient's tooth. The securing member 9200 can comprise a backing 9502 and non-deformable first and second protrusions 9204, 9204' carried by and extending away from the first side of the backing 9502 along a buccolingual dimension. In some embodiments, for example as shown in FIG. 92, the protrusions 9204, 9204' can be disposed at an intermediate and/or gingival aspect of the backing 9502. In certain embodiments, the protrusions 9204, 9204' are disposed at an occlusal aspect of the backing 9502. The protrusions 9204, 9204' can be spaced apart from one another by a gap 9222 along the mesiodistal dimension. The gap 9222 can be sized to receive the head 9102 of the attachment portion 9100. The first protrusion 9204 can be configured to engage the attachment portion 9100 and prevent or limit mesial movement of the attachment portion 9100 when the attachment portion 9100 is in the attached state. The second protrusion 9204' can be configured to engage the attachment portion 9100 and prevent or limit distal and gingival movement of the attachment portion 9100 when the attachment portion 9100 is in the attached state. While the securing member 9200 in FIG. 92 shows a single protrusions 9201, in some embodiments the securing member 9200 can include more than one deformable protrusions (e.g., two protrusions, three protrusions, four protrusions, etc.).

The securing member 9200 further comprises a deformable protrusion 9201 carried by and extending away from the first side of the backing 9502 along a buccolingual dimension. In some embodiments, including that shown in FIG. 92, the protrusion 9201 is positioned occlusally of the first and second protrusions 9204, 9204'. In some embodiments, the protrusion 9201 is disposed gingival of or overlaps and/or is aligned with one or both of the first and second protrusions 9204, 9204'. The protrusion 9201 can have a first portion 9201*a* that extends along a buccolingual dimension from the backing 9502 and a second portion 9201*b* that extends away from the first portion 9201*a*. The deformable protrusion 9201 can be configured to deform (e.g., bend, stretch, compress, twist, etc.) to move between a first configuration in which the second portion 9201*b* is positioned partially or completely over a gap between the second protrusion 9204' and the backing 9502 and a second configuration in which the second portion 9201*b* is positioned away from the gap or still over the gap but leaving enough space for the second portion 9104 of the head 9102 to move therethrough (e.g., such that the gap comprises at least a thickness of the second portion 9104). For example, the protrusion 9201 can be configured to bend towards and away from the backing along at least a buccolingual dimension. In some embodiments, the deformable protrusion 9201 can be configured to extend across none, some, or all of the gap 9222 between the protrusions 9204, 9204' when the deformable protrusion 9201 is in the second configuration.

Figure 93A:
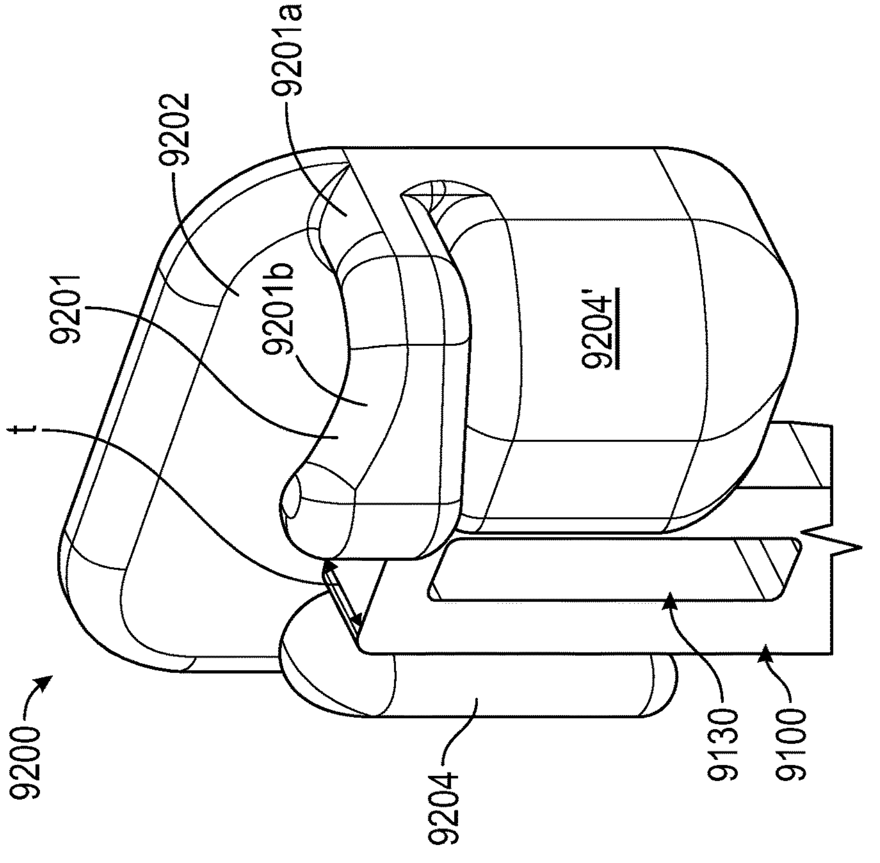
FIGS. 93A and 93B are different views of an attachment portion secured to a securing member in accordance with several embodiments of the present technology.
Figure 93B:
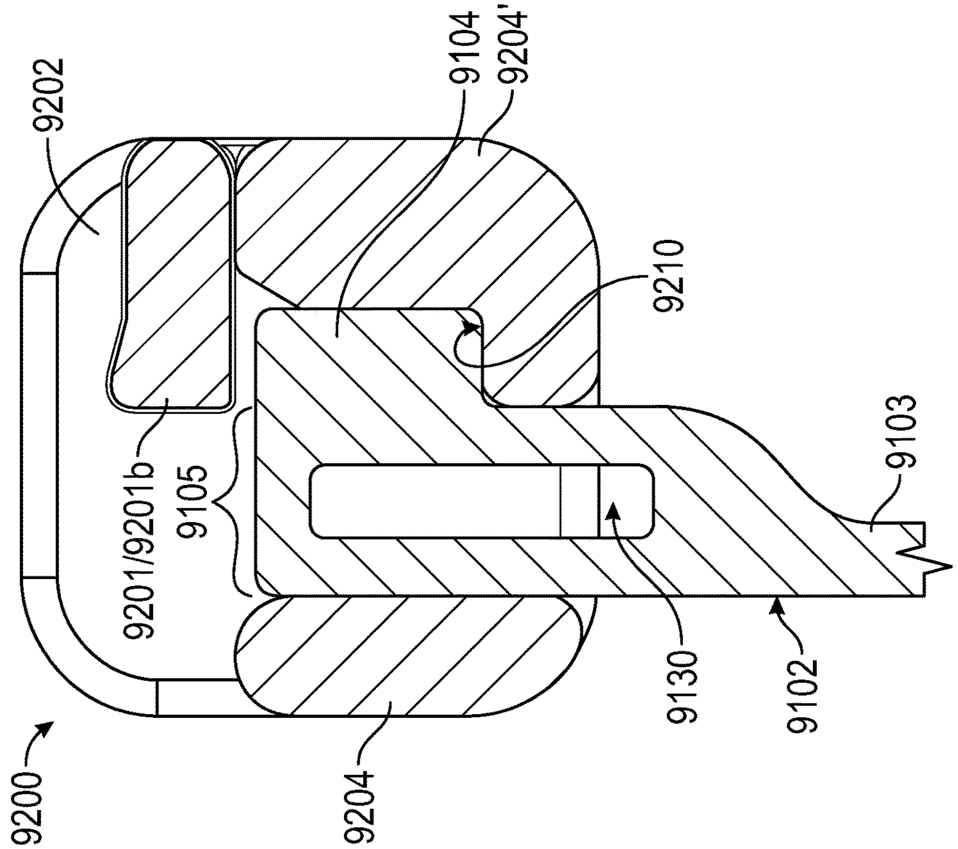

Referring to FIGS. 93A and 93B, in the secured state, the attachment portion 9100 can be positioned proximate and/or against the backing 9502 of the securing member 9200 and bound between the non-deformable protrusions 9204, 9204' and an occlusal side of the deformable protrusion 9201 in the second, secured configuration.

The attachment portion 9100 of FIGS. 91, 93A and 93B can be secured to the securing member 9200 by positioning the attachment portion 9100 proximate the securing member 9200 and moving the attachment portion 9100 along an occlusogingival path. The connector 9103 or other portion of the appliance continuous with the head 9102 of the attachment portion 9100 can be positioned relative to the securing member 9200 such that the head 9102 is positioned occlusally of the protrusions 9204, 9204' of the securing member 9200 and/or at, near, and/or occlusally of an occlusal edge of the backing 9502. In some embodiments, the back surface of the attachment portion 9100 can be positioned proximate and/or in contact with the backing 9502 of the securing member 9200. With the deformable protrusion 9201 in a first, unsecured and/or open configuration, an operator slides the connector 9103 and head 9102 gingivally by positioning a tool (e.g., tool 830 in FIG. 8) within the opening 9130 and moving the tool occlusogingivally. In some embodiments the tool is not required and/or the head 9102 does not have the opening 9130. The connector 9103 and/or head 9102 can be pulled gingivally until the second portion 9104 of the head 9102 abuts an inner occlusal surface 9210 of the second protrusion 9204'. The deformable protrusion 9201 can then be moved into the second, secured configuration (for example, by moving the second portion **9201*b* towards the backing 9502) in which the second portion 9201*b* is positioned over the second portion 9104 of the attachment portion 9100, thereby securing attachment portion 9100 relative to the securing member 9200**.

To release the attachment portion 9100 from the securing member 9200, the deformable protrusion 9201 can be moved into the first, open configuration, for example by moving the second portion **9201*b* away from the backing 9502. The attachment portion 9100 is then free to move occlusally relative to the securing member 9200 to ultimately be released from the securing member 9200. In some embodiments, a tool is inserted into the opening 9130 guide the attachment portion 9100** in an occlusal direction.

The location at which the connector 9103 connects to the head 9102, a dimension along which the connector 9103 extends, a property of the connector 9103, etc. can be at least partially based on a force to be imparted on a tooth to which the attachment portion 9100 is configured to be secured (and/or an intended movement of the tooth), as detailed elsewhere herein.

Figure 94:
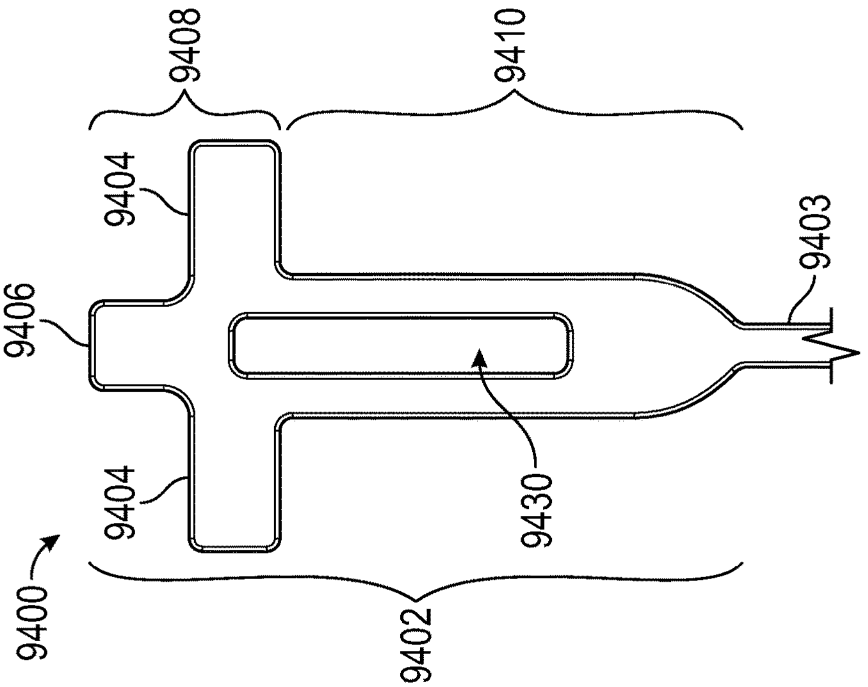
FIG. 94 is a front view of an attachment portion configured in accordance with several embodiments of the present technology.

FIG. 94 shows a planar view of an attachment portion 9400 configured in accordance with several embodiments of the present technology. The attachment portion 9400 can be configured to be secured to a patient's tooth via a securing member, such as securing member 9500 shown in FIG. 95. The attachment portion 9400 and the securing member 9500 are shown in a secured arrangement in FIGS. 96A and 96B. As discussed in greater detail below, the attachment portion 9400 and the securing member 9500 can be configured such that the attachment portion 9500 can be releasably secured to the securing member 9400 at least in part by a deformable protrusion of the securing member 9500. The attachment portion 9400 can be continuous with a connector 9403 that connects the attachment portion 9400 to one or more additional portions (not shown) of the overall orthodontic appliance. The attachment portion 9400 can have an attached state in which the orthodontic appliance exerts active and/or retentive orthodontic force (e.g., from a biasing portion (not shown) of the orthodontic appliance) on the tooth via the connector 9403, the attachment portion 9400, and the securing member 9500. Correspondingly, the attachment portion 9400 can have a detached state in which the orthodontic appliance is operably disconnected from the securing member 9500.

In the discussion of FIGS. 94-96B herein, the features at the distal side of an occlusogingival plane P (labeled in FIG. 95) may be referred to as "distal" whereas the features at the mesial side of an occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth.

Referring to FIG. 94, the attachment portion 9400 can comprise a head 9402. In some embodiments, the attachment portion 9400 comprises a head 9402 and at least a portion of the connector 9403 that is continuous with the head 9402. The connector 9403, for example, can comprise a second connector as previously described herein and/or can extend gingivally away from a gingival portion of the head 9402. The connector 9403 can have features similar to any of the connectors disclosed herein (e.g., first connectors, second connectors, third connectors, etc.) and can comprise a single connector or multiple connectors. For example, the connector 9403 can comprise a single, occlusogingivally extending connector (as shown in FIG. 94), multiple occlusogingivally extending connectors, one or more occlusogingivally extending connectors and one or more mesiodistally extending connectors branching off of the one or more occlusogingivally extending connectors and/or the attachment portion 9400, or one or more mesiodistally extending connectors (and no occlusogingivally extending connectors). Accordingly, the attachment portion 9400 can be connected to a single connector or to multiple connectors also referred to herein as a connector 9403. The connector 9403 can connect to the head 9402 at a variety of locations. In addition to or instead of a gingivally extending connector 9403, a connector can extend mesiodistally from one or both projections 9404 (discussed below). Any connector 9403 disclosed herein can extend away from the head 9402 along a variety of dimensions (e.g., along an occlusogingival dimension, a mesiodistal dimension, a buccolingual dimension, etc.).

The head 9402 can have a front surface (facing out of the page) and a back surface (not visible in FIG. 94), and a thickness t (labeled in FIG. 96A) measured between the front and back surfaces. In some embodiments, the head 9402 and the connector 9403 are part of the same, monolithic piece of material (e.g., cut from a sheet of material, a 3D-printed piece, etc.). Thus, the head 9402 and the connector 9403 may refer to different portions of the same continuous component. The attachment portion 9400 can be one portion of a greater orthodontic appliance, or may be formed separately and attached to an orthodontic appliance. The attachment portion 9400 and/or the corresponding appliance can be cut from the same sheet of material and/or may be formed by molding, casting, machining, 3D printing, stamping, extruding, or the like. The attachment portion 9400 may comprise a metal or a plastic and may have superelastic and/or shape memory properties. In some embodiments, the attachment portion 9400 does not have superelastic and/or shape memory properties.

With reference to FIG. 94, the attachment portion 9400 at the head 9402 can comprise a first portion 9410 extending occlusally from the connector 9403 and a second portion 9408 extending from an occlusal end of the first portion 9410. The first portion 9410 or the first portion 9410 and the second portion 9408 can enclose and define an opening 9430. In at least some cases, the opening 9430 is sized to receive a tool in a first orientation (e.g. an occlusogingival orientation) to facilitate securing the attachment portion 9400 to the securing member 9500. Other orientations are possible. The second portion 9408 can include an occlusal projection 9406 and mesiodistal projections 9404 on either side of the occlusal projection 9406.

Figure 95:
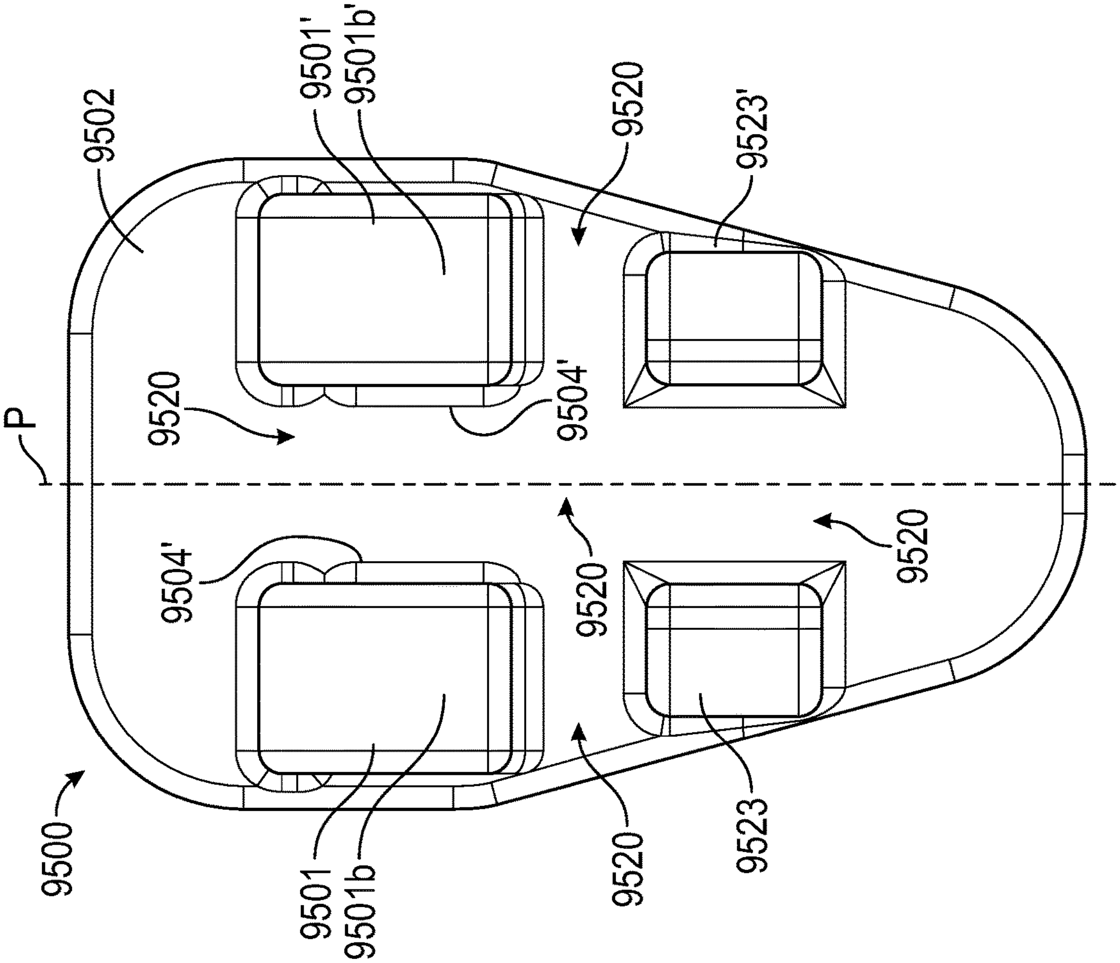
FIG. 95 is a front view of a securing member configured in accordance with several embodiments of the present technology.

FIG. 95 is a front view of the securing member 9500 configured for use with the attachment portion 9400. The securing member 9500 has a first side (facing out of the page) and a second side (not visible in FIG. 95) opposite the first side along a thickness of the securing member 9500 and configured to be bonded to a patient's tooth. The securing member 9500 can comprise a backing 9502 and non-deformable first and second occlusal protrusions 9504, 9504' and first and second gingival protrusions 9523, 9523' carried by and extending away from the first side of the backing 9502 along a buccolingual dimension. The protrusions 9504, 9504', 9523, 9523' can be spaced apart from one another by gaps 9520 that are configured to receive the head 9402 therein. In some embodiments, including that shown in FIG. 95, each of the occlusal protrusions is at least partially aligned along the mesiodistal dimension with a respective one of the gingival protrusions 9523, 9523'.

The securing member 9500 further comprises a plurality of deformable protrusions 9501, 9501' carried by and extending away from the first side of the backing 9502 along a buccolingual dimension. While the securing member 9500 in FIG. 95 shows two protrusions 9501, 9501', in some embodiments the securing member 9500 can include more or fewer than two deformable protrusions (e.g., one protrusion, three protrusions, four protrusions, etc.). In some embodiments, including that shown in FIG. 95, each of the protrusions 9501, 9501 is positioned occlusally of and aligned with a respective one of the occlusal protrusions 9504, 9504'. Each of the protrusions 9501, 9501' can have a first portion 9501*a*, 9501*a*' that extends along a buccolingual dimension from the backing 9502 and a second portion 9501*b*, 9501*b*' that extends away from the first portion 9501*a*, 9501*a*'. Each of the protrusions 9501, 9501' can be configured to deform (e.g., bend, stretch, compress, twist, etc.) to move between a first configuration in which the second portion 9501*b*, 9501*b*' is positioned partially or completely over the gaps 9520 between the protrusions 9504, 9504', 9523, 9523' and a second configuration in which the second portion 9501*b* is positioned away from the gaps 9520 or still over a portion of the gaps 9520 but leaving enough space for the head 9402 to move therethrough (e.g., such that the individual branches of the gaps 9520 comprise at least a width of the projections of the second portion 9408). For example, each of the protrusions 9501, 9501' can be configured to bend towards and away from the backing along at least a buccolingual dimension.

Figure 96B:
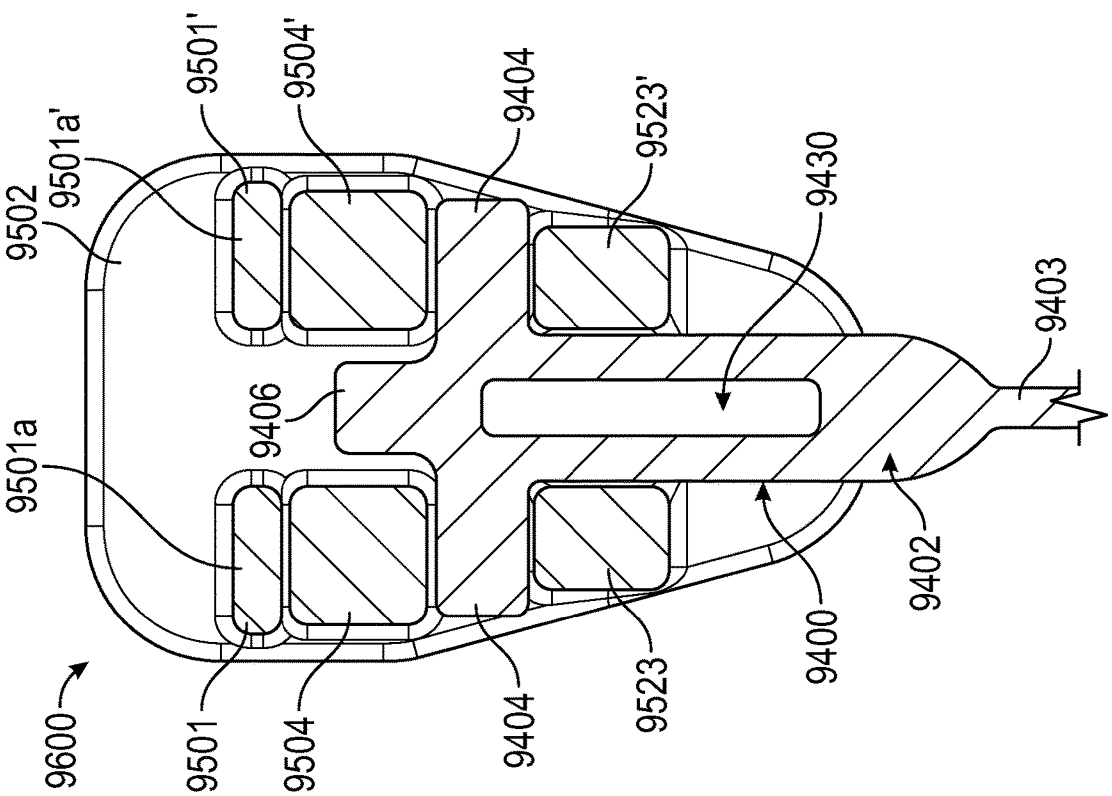
FIGS. 96A and 96B are different views of an attachment portion secured to a securing member in accordance with several embodiments of the present technology.
Figure 96A:
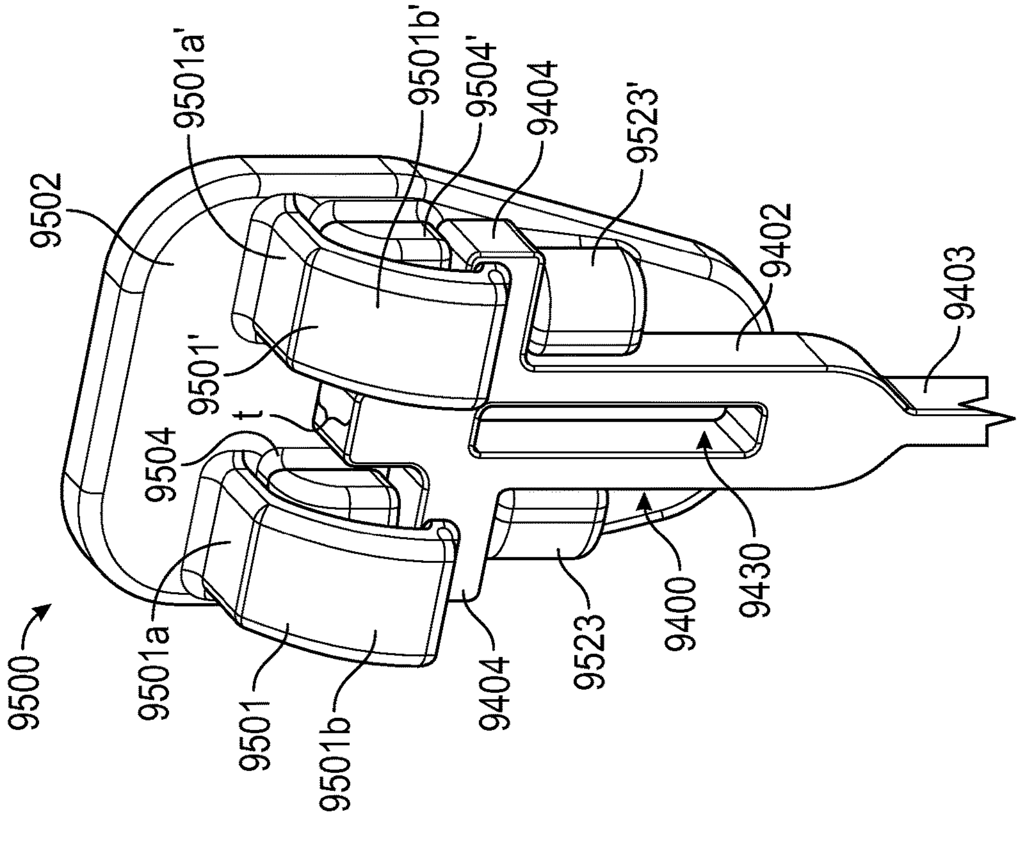

Referring to FIGS. 96A and 96B, in the secured state, the attachment portion 9400 can be positioned proximate and/or against the backing 9502 of the securing member 9500 and bound between the non-deformable protrusions 9504, 9504', 9523, 9523' and a buccal side (or lingual, depending on the side of the teeth the appliance is installed on) of the deformable protrusions 9501, 9501' in the second, secured configuration.

With the deformable protrusions 9501, 9501' in a first, unsecured and/or open configuration, the attachment portion 9400 of FIGS. 94, 96A and 96B can be secured to the securing member 9500 by positioning the head 9402 of the attachment portion 9400 in the gaps 9520 between the protrusions 9504, 9504', 9523, 9523'. In some embodiments, the back surface of the attachment portion 9400 can be positioned proximate and/or in contact with the backing 9502 of the securing member 9500. In some embodiments a tool (e.g., tool 830 in FIG. 8) can be used to manipulate the attachment portion 9400. In some embodiments the tool is not required and/or the head 9402 does not have the opening 9430. The deformable protrusions 9501, 9501' can then be moved into the second, secured configuration (for example, by moving the second portion 9501*b* towards the backing 9502) in which the second portion 9501*b* is positioned over the mesiodistal projections 9404 of the attachment portion 9400, thereby securing attachment portion 9400 relative to the securing member 9500.

To release the attachment portion 9400 from the securing member 9500, the deformable protrusions 9501, 9501' can be moved into the first, open configuration, for example by moving the second portion 9501*b* away from the backing 9502. The attachment portion 9400 is then free to move away from the backing 9502 to be released from the securing member 9500.

The location at which the connector 9403 connects to the head 9402, a dimension along which the connector 9403 extends, a property of the connector 9403, etc. can be at least partially based on a force to be imparted on a tooth to which the attachment portion 9400 is configured to be secured (and/or an intended movement of the tooth), as detailed elsewhere herein.

Figure 97:
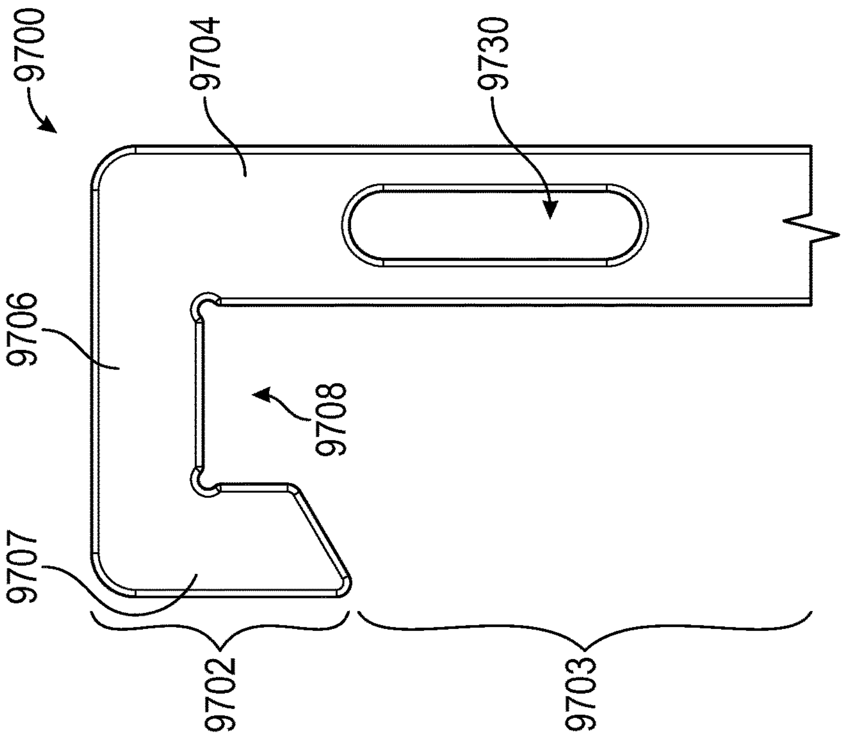
FIG. 97 is a front view of an attachment portion configured in accordance with several embodiments of the present technology.

FIG. 97 shows a planar view of an attachment portion 9700 configured in accordance with several embodiments of the present technology. The attachment portion 9700 can be configured to be secured to a patient's tooth via a securing member, such as securing member 9800 shown in FIG. 98. The attachment portion 9700 and the securing member 9800 are shown in a secured arrangement in FIGS. 99A and 99B. As discussed in greater detail below, the attachment portion 9700 and the securing member 9800 can be configured such that the attachment portion 9800 can be releasably secured to the securing member 9700 at least in part by a deformable protrusion of the securing member 9800. The attachment portion 9700 can be continuous with a connector 9703 that connects the attachment portion 9700 to one or more additional portions (not shown) of the overall orthodontic appliance. The attachment portion 9700 can have an attached state in which the orthodontic appliance exerts active and/or retentive orthodontic force (e.g., from a biasing portion (not shown) of the orthodontic appliance) on the tooth via the connector 9703, the attachment portion 9700, and the securing member 9800. Correspondingly, the attachment portion 9700 can have a detached state in which the orthodontic appliance is operably disconnected from the securing member 9800.

In the discussion of FIGS. 97-99B herein, the features at the distal side of an occlusogingival plane P (labeled in FIG. 98) may be referred to as "distal" whereas the features at the mesial side of an occlusogingival plane P may be referred to as "mesial." It should be understood that these and other directional terms used herein do not denote absolute orientation. For example, "distal" features can be at the distal side of the occlusogingival plane P when the appliance is installed at a lingual side of the tooth or be at the mesial side of the occlusogingival plane P when the appliance is installed at a buccal side of the tooth. Likewise, "distal" features on a securing member can be at the distal side of the occlusogingival plane P when the appliance is installed on one side of a midline (see FIG. 1A) of a patient's mouth or be at the mesial side of the occlusogingival plane P when the appliance is installed on the other side of the midline of the patient's mouth.

Referring to FIG. 97, the attachment portion 9700 can comprise a head 9702. In some embodiments, the attachment portion 9700 comprises a head 9702 and at least a portion of the connector 9703 that is continuous with the head 9702. The connector 9703, for example, can comprise a second connector as previously described herein and/or can extend gingivally away from the head 9702. The connector 9703 can have features similar to any of the connectors disclosed herein (e.g., first connectors, second connectors, third connectors, etc.) and can comprise a single connector or multiple connectors. For example, the connector 9703 can comprise a single, occlusogingivally extending connector (as shown in FIG. 97), multiple occlusogingivally extending connectors, one or more occlusogingivally extending connectors and one or more mesiodistally extending connectors branching off of the one or more occlusogingivally extending connectors and/or the attachment portion 9700, or one or more mesiodistally extending connectors (and no occlusogingivally extending connectors). Accordingly, the attachment portion 9700 can be connected to a single connector or to multiple connectors also referred to herein as a connector 9703. The connector 9703 can connect to the head 9702 at a variety of locations. In addition to or instead of a gingivally extending connector 9703, a connector can extend mesiodistally from one or both mesial or distal sides of the head 9702. Any connector 9703 disclosed herein can extend away from the head 9702 along a variety of dimensions (e.g., along an occlusogingival dimension, a mesiodistal dimension, a buccolingual dimension, etc.). In at least some cases, the connector 9703 encloses an opening 9730 is sized to receive a tool in a first orientation (e.g. an occlusogingival orientation) to facilitate securing the attachment portion 9700 to the securing member 9800.

The head 9702 can have a front surface (facing out of the page) and a back surface (not visible in FIG. 97), and a thickness t (labeled in FIG. 99A) measured between the front and back surfaces. In some embodiments, the head 9702 and the connector 9703 are part of the same, monolithic piece of material (e.g., cut from a sheet of material, a 3D-printed piece, etc.). Thus, the head 9702 and the connector 9703 may refer to different portions of the same continuous component. The attachment portion 9700 can be one portion of a greater orthodontic appliance, or may be formed separately and attached to an orthodontic appliance. The attachment portion 9700 and/or the corresponding appliance can be cut from the same sheet of material and/or may be formed by molding, casting, machining, 3D printing, stamping, extruding, or the like. The attachment portion 9700 may comprise a metal or a plastic and may have superelastic and/or shape memory properties. In some embodiments, the attachment portion 9700 does not have superelastic and/or shape memory properties.

With reference to FIG. 97, the attachment portion 9700 at the head 9702 can comprise a first portion 9704 extending occlusally from the connector 9703, a second portion 9706 extending distally from an occlusal end of the first portion 9704, and a third portion 9707 extending gingivally from the end of the second portion 9706. The first, second, and third portions 9704, 9706, and 9707 can partially enclose and define an opening 9708. In at least some cases, the opening 9708 is sized to receive a protrusion of the securing member 9800 therethrough.

Figure 98:
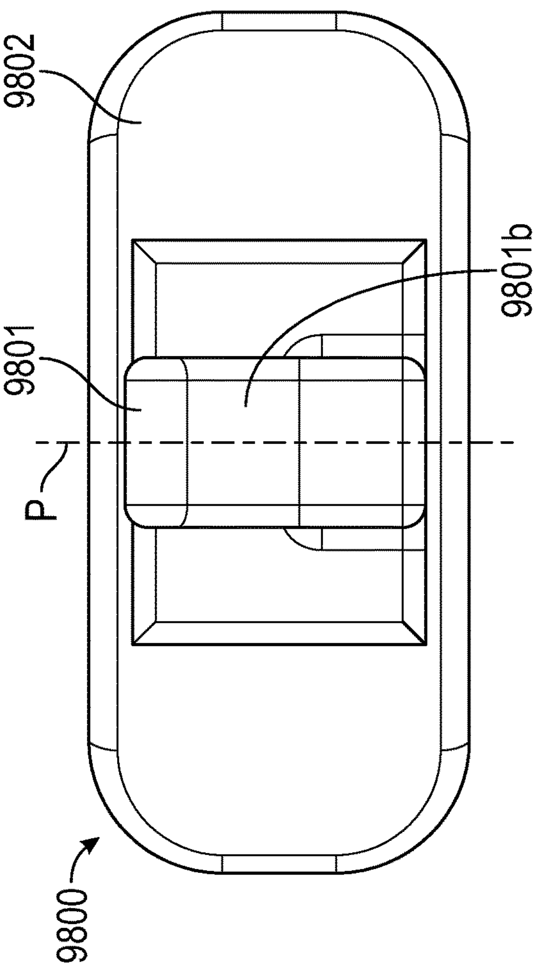
FIG. 98 is a front view of a securing member configured in accordance with several embodiments of the present technology.

FIG. 98 is a front view of the securing member 9800 configured for use with the attachment portion 9700. The securing member 9800 has a first side (facing out of the page) and a second side (not visible in FIG. 98) opposite the first side along a thickness of the securing member 9800 and configured to be bonded to a patient's tooth. The securing member 9800 can comprise a backing 9802 and a deformable protrusion 9801 carried by and extending away from the first side of the backing 9802 along a buccolingual dimension. While the securing member 9800 in FIG. 98 shows a single deformable protrusions 9801, in some embodiments the securing member 9800 can include two or more deformable protrusions (e.g., two protrusions, three protrusions, four protrusions, etc.). The protrusion 9801 can have a first portion 9801*a* that extends along a buccolingual dimension in a direction away from the backing 9802 and a second portion 9801*b* that extends away from the first portion 9801*a*. The protrusion 9801 can be configured to deform (e.g., bend, stretch, compress, twist, etc.) to move between a first configuration in which the second portion 9801*b* is positioned partially or completely over a gap between the protrusion 9801 and the backing 9802 and a second configuration in which the second portion 9801*b* is positioned away from the gap or still over a portion of the gaps but leaving enough space for the head 9702 to move therethrough (e.g., such that the gap comprises at least a thickness t of the head 9702. For example, the protrusion 9801 can be configured to bend towards and away from the backing along at least a buccolingual dimension.

Figure 99B:
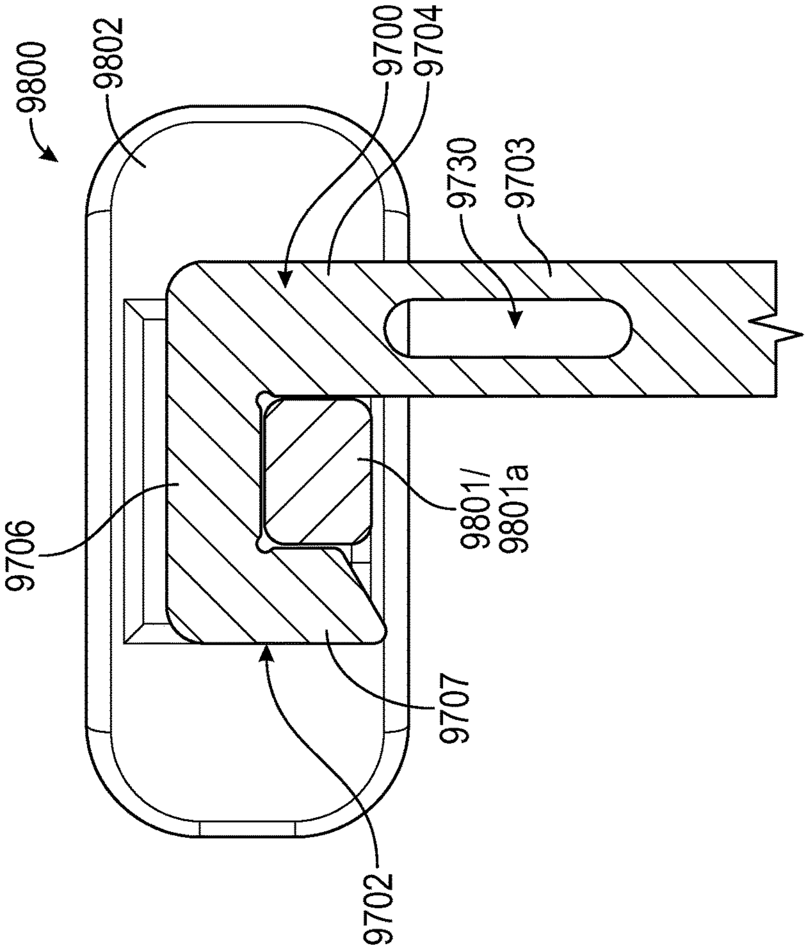
FIGS. 99A and 99B are different views of an attachment portion secured to a securing member in accordance with several embodiments of the present technology.
Figure 99A:
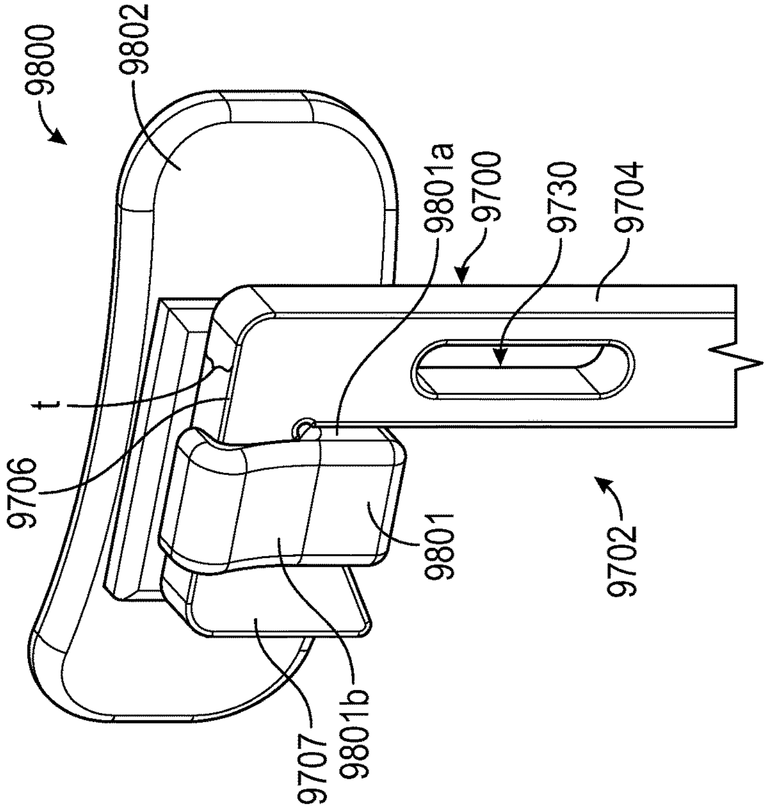

Referring to FIGS. 99A and 99B, in the secured state, the attachment portion 9700 can be positioned proximate and/or against the backing 9802 of the securing member 9800 and bound between the protrusion 9801 in the second, secured configuration.

With the deformable protrusion 9801 in a first, unsecured and/or open configuration, the attachment portion 9700 of FIGS. 97, 99A and 99B can be secured to the securing member 9800 by positioning the head 9702 of the attachment portion 9700 in the gaps between the protrusion 9801 and the backing 9802. In some embodiments, the back surface of the attachment portion 9700 can be positioned proximate and/or in contact with the backing 9802 of the securing member 9800. In some embodiments a tool (e.g., tool 830 in FIG. 8) can be used to manipulate the attachment portion 9700. In some embodiments the tool is not required and/or the connector 9703 does not have the opening 9730. The deformable protrusion 9801 can then be moved into the second, secured configuration (for example, by moving the second portion 9801*b* towards the backing 9802) in which the second portion 9801*b* is positioned over at least the second portion 9706 of the head 9702 such that the head 9702 wraps around a portion of the first portion 9801*a* of the protrusion 9801.

To release the attachment portion 9700 from the securing member 9800, the deformable protrusion 9801 can be moved into the first, open configuration, for example by moving the second portion 9801*b* away from the backing 9802. The attachment portion 9700 is then free to move away from the backing 9802 to be released from the securing member 9800.

The location at which the connector 9703 connects to the head 9702, a dimension along which the connector 9703 extends, a property of the connector 9703, etc. can be at least partially based on a force to be imparted on a tooth to which the attachment portion 9700 is configured to be secured (and/or an intended movement of the tooth), as detailed elsewhere herein.

Figure 100:
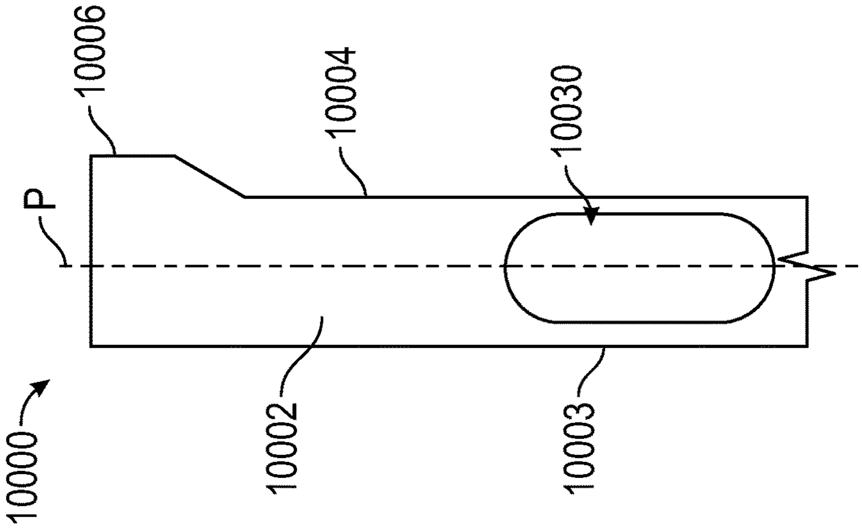
FIG. 100 is a front view of an attachment portion configured in accordance with several embodiments of the present technology.

FIG. 100 shows a planar view of an attachment portion 10000 configured in accordance with several embodiments of the present technology. The attachment portion 10000 can be configured to be secured to a patient's tooth via a securing member, such as securing member 10100 shown in FIG. 101. The attachment portion 10000 and the securing member 10100 are shown in a secured arrangement in FIGS. 102A and 102B. As discussed in greater detail below, the attachment portion 10000 and the securing member 10100 can be configured such that the attachment portion 10100 can be releasably secured to the securing member 10000 at least in part by a deformable protrusion of the securing member 10100. The attachment portion 10000 can be continuous with a connector 10003 that connects the attachment portion 10000 to one or more additional portions (not shown) of the overall orthodontic appliance. The attachment portion 10000 can have an attached state in which the orthodontic appliance exerts active and/or retentive orthodontic force (e.g., from a biasing portion (not shown) of the orthodontic appliance) on the tooth via the connector 10003, the attachment portion 10000, and the securing member 10100. Correspondingly, the attachment portion 10000 can have a detached state in which the orthodontic appliance is operably disconnected from the securing member 10100.

Referring to FIG. 100, the attachment portion 10000 can comprise a head 10002. In some embodiments, the attachment portion 10000 comprises a head 10002 and at least a portion of the connector 10003 that is continuous with the head 10002. The connector 10003, for example, can comprise a second connector as previously described herein and/or can extend gingivally away from the head 10002. The connector 10003 can have features similar to any of the connectors disclosed herein (e.g., first connectors, second connectors, third connectors, etc.) and can comprise a single connector or multiple connectors. For example, the connector 10003 can comprise a single, occlusogingivally extending connector (as shown in FIG. 100), multiple occlusogingivally extending connectors, one or more occlusogingivally extending connectors and one or more mesiodistally extending connectors branching off of the one or more occlusogingivally extending connectors and/or the attachment portion 10000, or one or more mesiodistally extending connectors (and no occlusogingivally extending connectors). Accordingly, the attachment portion 10000 can be connected to a single connector or to multiple connectors also referred to herein as a connector 10003. The connector 10003 can connect to the head 10002 at a variety of locations. In addition to or instead of a gingivally extending connector 10003, a connector can extend occlusally from an occlusal side of the head 10002. Any connector 10003 disclosed herein can extend away from the head 10002 along a variety of dimensions (e.g., along an occlusogingival dimension, a mesiodistal dimension, a buccolingual dimension, etc.). In at least some cases, the connector 10003 encloses an opening 10030 is sized to receive a tool in a first orientation (e.g. an occlusogingival orientation) to facilitate securing the attachment portion 10000 to the securing member 10100.

The head 10002 can have a front surface (facing out of the page) and a back surface (not visible in FIG. 100), and a thickness t (labeled in FIG. 102A) measured between the front and back surfaces. In some embodiments, the head 10002 and the connector 10003 are part of the same, monolithic piece of material (e.g., cut from a sheet of material, a 3D-printed piece, etc.). Thus, the head 10002 and the connector 10003 may refer to different portions of the same continuous component. The attachment portion 10000 can be one portion of a greater orthodontic appliance, or may be formed separately and attached to an orthodontic appliance. The attachment portion 10000 and/or the corresponding appliance can be cut from the same sheet of material and/or may be formed by molding, casting, machining, 3D printing, stamping, extruding, or the like. The attachment portion 10000 may comprise a metal or a plastic and may have superelastic and/or shape memory properties. In some embodiments, the attachment portion 10000 does not have superelastic and/or shape memory properties.

With reference to FIG. 100, the attachment portion 10000 at the head 10002 can comprise a first portion 10004 extending occlusally from the connector 10003 and a second portion 10006 extending mesially from a mesial side of the first portion 10004.

Figure 101:
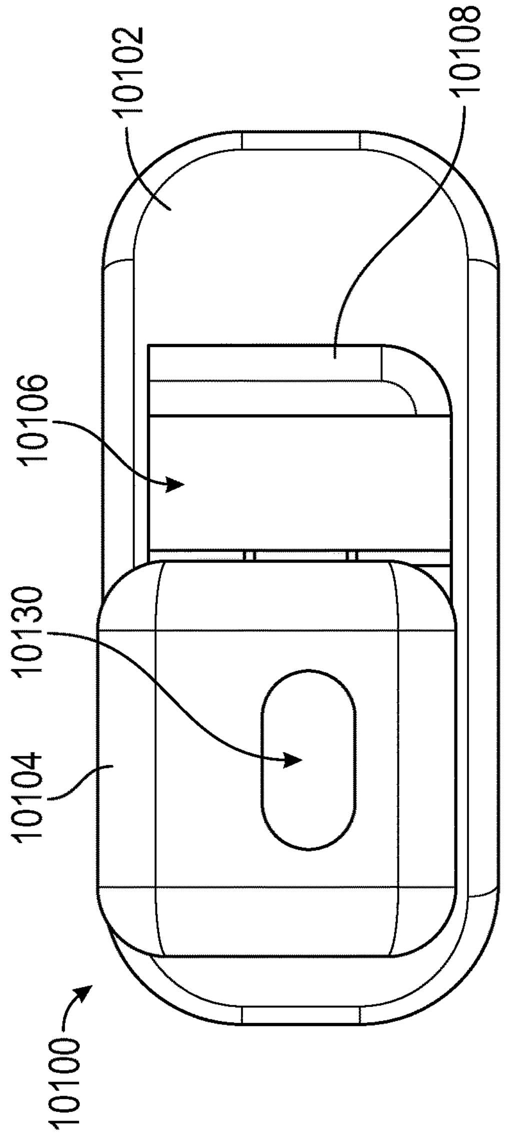
FIG. 101 is a front view of a securing member configured in accordance with several embodiments of the present technology.

FIG. 101 is a front view of the securing member 10100 configured for use with the attachment portion 10000. The securing member 10100 has a first side (facing out of the page) and a second side (not visible in FIG. 101) opposite the first side along a thickness of the securing member 10100 and configured to be bonded to a patient's tooth. The securing member 10100 can comprise a backing 10102, a protrusion 10108 extending away from the backing 10102 along a buccolingual dimension, and a slot 1016 configured to receive the attachment portion 10000 therein. The securing member 10100 can further comprise a slider 10104 that optionally includes an opening 10130 configured to receive a tool to facilitate movement of the slider 10104. The securing member 10100 can further include a track 10110 disposed on and/or in the backing 10102. The slider 10104 can be configured to translate within and/or on the track 10110 to secure the attachment portion 10000 in place within the slot 10106. The track 10110 can be oriented such that it extends along a substantially mesiodistal dimension. In some embodiments, the track 10110 and/or the slider 10104 can have other orientations.

Figure 102B:
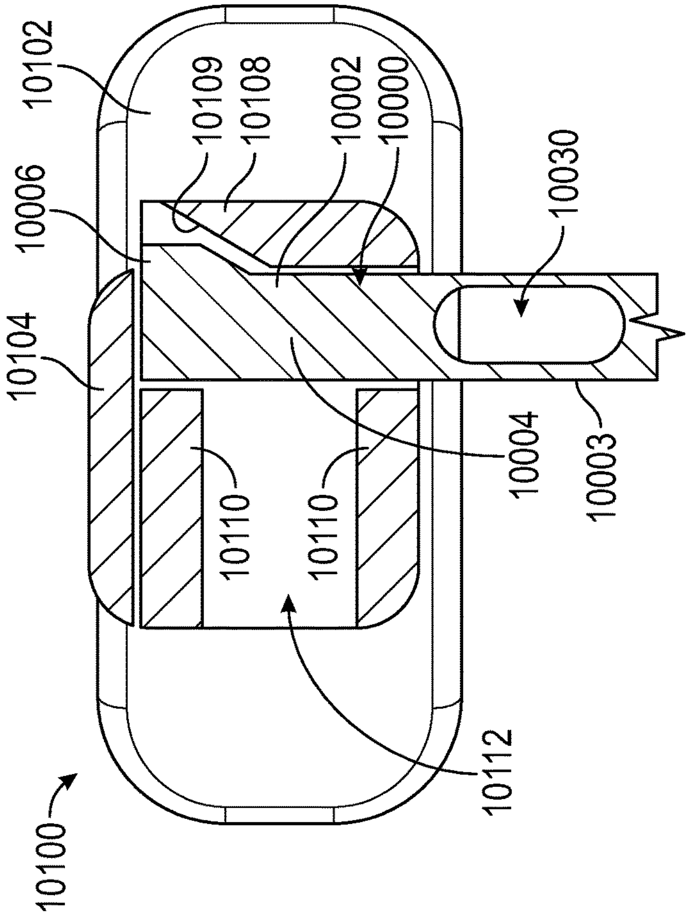
FIGS. 102A and 102B are different views of an attachment portion secured to a securing member in accordance with several embodiments of the present technology.
Figure 102A:
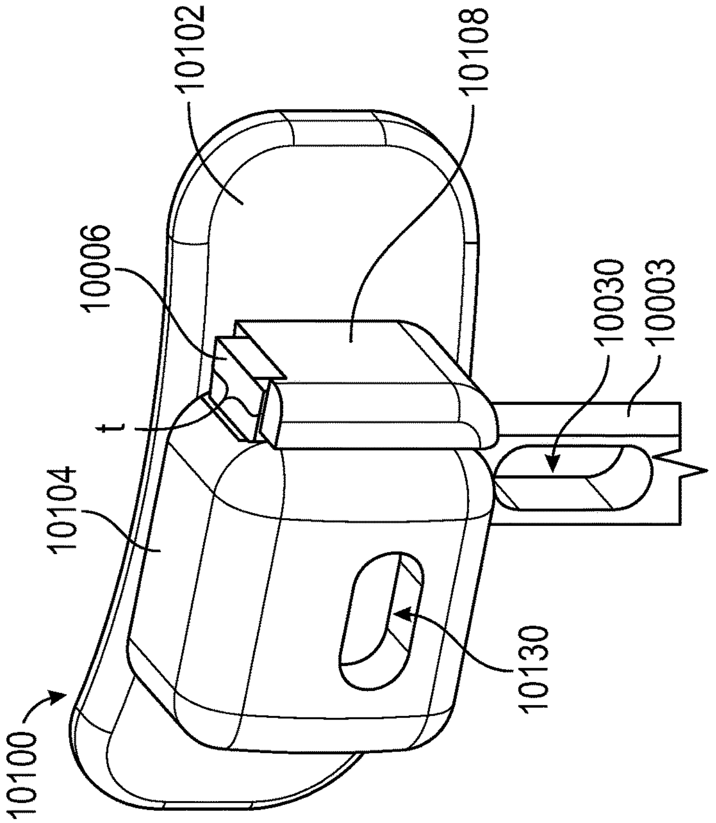

With the slider 10104 in an open position (see FIG. 101), the attachment portion 10000 can be positioned in the slot 10106 such that the second portion 10006 abuts and/or is adjacent to a shelf 10109 along an inner surface of the protrusion 10108. The slider 10104 can then be moved to the closed position (as shown in FIGS. 102A and 102B) in which the slider 10104 prevents or limits the attachment portion 10000 from moving away from the backing 10102 along a buccolingual dimension. In this secured state, the tracks 10110 and the protrusion 10108 prevent and/or limit mesiodistal movement of the attachment portion 10000, while the shelf 10109 (see FIG. 102B) prevents or limits gingival movement of the attachment portion 10000. To release the attachment portion 10000, the slider 10004 can be moved to the open state.

Figures 103A, 103B, 103C:
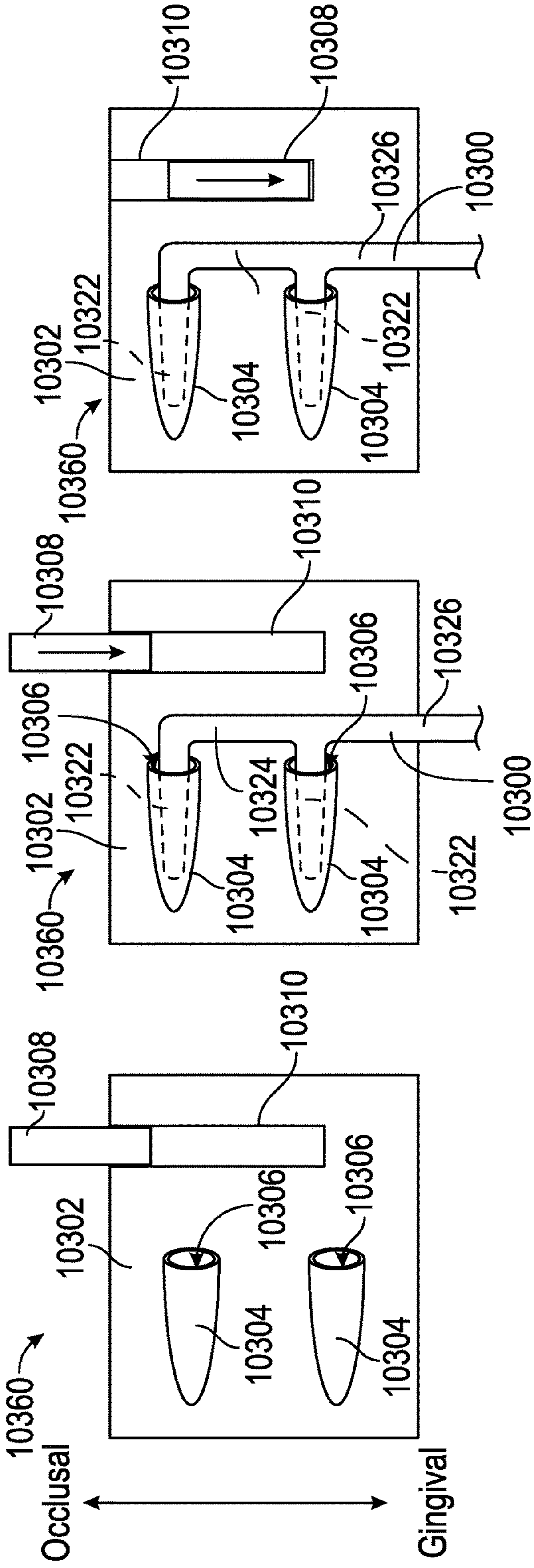
FIGS. 103A-103C illustrate a securing member and an attachment portion engaging with one another in accordance with several embodiments of the present technology.

FIGS. 103A-103C illustrate a securing member 10360 and a corresponding attachment portion 10300 configured in accordance with several embodiments of the present technology. The securing member 10360 can comprise a low-profile, substantially flat backing 10302 including one or more slots 10306. The slots 10306 can be bound by a raised portion 10304 of the securing member 10360 and the backing 10302, or the slots 10306 can be burrowed into the backing 10302 itself. Either way, each of the slots 10306 can be configured to receive a portion of an attachment portion (such as attachment portion 10300). The securing member 10360 can further include a track 10310 disposed on and/or in the backing 10302 and a slider 10308 configured to translate within and/or move relative to the track 10310 to secure the attachment portion 10300 in place within the slots 10306. The track 10310 can be oriented such that it extends along a substantially occlusogingival dimension. In some embodiments, the track 10310 and/or slider 10308 can have other orientations.

As shown in FIG. 103B, an attachment portion 10300 can comprise an extension portion 10324 and two fingers 10322 extending laterally away (e.g., along a substantially mesiodistal dimension) from the extension portion 10324, and optionally to the same side. The extension portion 10324 may connect to the orthodontic appliance via a connector 10326. As previously described herein, in some embodiments the attachment portion 10300 is integral with the connector 10326 and/or the rest of the orthodontic appliance. The fingers 10322 can be oriented such they run parallel to one another, or the fingers 10322 can be angled relative to one another. Moreover, the fingers 10322 can have the same lengths and/or widths, or different lengths and/or widths. In some embodiments, the attachment portion 10300 comprises more or fewer than two fingers 10322 (e.g., one finger, three fingers, four fingers, etc.). The fingers 10322 can be cantilevered with respect to the extension portion 10324 such that each of the fingers 10322 has a proximal end at the extension portion 10324 and a free far end.

As shown in FIG. 103B, the fingers 10322 can be configured to be inserted into the slots 10306 to position the extension portion 10324 of the attachment portion 10300 between the slots 10306 and the track 10310. The slider 10308 can be moved along the track 10310 between an unlocked position (FIG. 103B) and a locked position (FIG. 103C). In the locked position, the slider 10308 is positioned proximate the extension portion 10324. The slider 10308 can have an increased height relative to a broad surface of the backing 10302 such that, when the slider 10308 is positioned proximate the extension portion 10324 (as shown in FIG. 103C) the slider 10308 prevents or limits movement of the extension portion 10324 along a mesiodistal dimension. As such, when in the locked position, the slider 10308 prevents the fingers 10322 from being removed from the slots 10306 and thereby prevents release of the attachment portion 10300 from the securing member 10360. The slider 10308 can be moved to the unlocked position by an operator to release the attachment portion 10300 from the securing member 10360, for example at the end of treatment.

CONCLUSION

Although many of the embodiments are described above primarily with respect to systems, devices, and methods for orthodontic appliances positioned on a lingual side of a patient's teeth, the technology is applicable to other applications and/or other approaches, such as orthodontic appliances positioned on a facial or buccal side of the patient's teeth. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1A-103C.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. An orthodontic system, comprising:

a securing member including:

a backing having a first side and a second side opposite the first side along a thickness of the backing and configured to be secured to a tooth of a patient, a protrusion carried by the backing, wherein the protrusion extends away from the first side in a buccolingual dimension when the securing member is secured to the tooth via the backing, and a fulcrum at the protrusion; and an orthodontic appliance operably associated with the securing member, wherein the orthodontic appliance includes an attachment portion configured to be releasably secured to the securing member, wherein the attachment portion has:

an attached state in which the orthodontic appliance exerts active and/or retentive orthodontic force on the tooth via the attachment portion and the securing member when the securing member is secured to the tooth, and a detached state in which the orthodontic appliance is operably disconnected from the securing member, wherein the attachment portion is configured to move from the detached state to the attached state in response to relative movement between the attachment portion and the securing member in an occlusogingival dimension when the securing member is secured to the tooth, and wherein the attachment portion is configured to move occlusally relative to the securing member from the attached state toward the detached state in response to leverage from a lever supported by the fulcrum when the securing member is secured to the tooth.

2. The orthodontic system of claim 1, wherein the attachment portion is configured to snap from the detached state to the attached state in response to relative movement between the attachment portion and the securing member in an occlusogingival dimension when the securing member is secured to the tooth.

3. The orthodontic system of claim 1, wherein the orthodontic appliance further comprises:

a biasing portion configured to store the orthodontic force; and a connector through which the biasing portion is connected to the attachment portion, wherein the connector extends gingivally away from the attachment portion at the securing member when the attachment portion is in the attached state and the securing member is secured to the tooth.

4. The orthodontic system of claim 1, wherein the orthodontic appliance further comprises:

a biasing portion configured to store the orthodontic force; and a connector through which the biasing portion is connected to the attachment portion, wherein the connector extends mesially or distally away from the attachment portion at the securing member when the attachment portion is in the attached state and the securing member is secured to the tooth.

5. The orthodontic system of claim 1, wherein the attachment portion is symmetrical about an occlusogingival plane when the attachment portion is in the attached state and the securing member is secured to the tooth.

6. The orthodontic system of claim 1, wherein:

the attachment portion includes an elongate leveraging surface at which the attachment portion is configured to contact the lever supported by the fulcrum when the attachment portion is in the attached state and the securing member is secured to the tooth;

the attachment portion is configured to move from the attached state toward the detached state in response to leverage exerted on the attachment portion via the leveraging surface from the lever supported by the fulcrum when the securing member is secured to the tooth; and a length of the leveraging surface is within ten degrees of perpendicular to an occlusogingival dimension when the attachment portion is in the attached state and the securing member is secured to the tooth.

7. The orthodontic system of claim 1, wherein:

the attachment portion defines an elongate slot at which the attachment portion is configured to receive the lever supported by the fulcrum when the attachment portion is in the attached state and the securing member is secured to the tooth; and a length of the slot is within ten degrees of perpendicular to an occlusogingival dimension when the attachment portion is in the attached state and the securing member is secured to the tooth.

8. The orthodontic system of claim 1, further comprising:

a biasing portion configured to store the orthodontic force; and a connector through which the biasing portion is connected to the attachment portion, wherein the attachment portion includes:

a force-transferring surface through which the attachment portion is configured to transfer the orthodontic force from the biasing portion to the tooth via the securing member when the attachment portion is in the attached state and the securing member is secured to the tooth, and a flexure configured to resiliently deform as the attachment portion moves from the detached state toward the attached state and the securing member is secured to the tooth.

9. The orthodontic system of claim 8, wherein:

the securing member includes a first securing surface;

the attachment portion includes a second securing surface;

the flexure carries the second securing surface; and the first and second securing surfaces conformably restrict relative movement between the attachment portion and the securing member in an occlusogingival dimension when the attachment portion is in the attached state and the securing member is secured to the tooth.

10. The orthodontic system of claim 9, wherein:

the first and second securing surfaces conformably restrict occlusal movement of the attachment portion relative to the securing member when the attachment portion is in the attached state and the securing member is secured to the tooth;

the securing member includes a third securing surface;

the attachment portion includes a fourth securing surface; and the third and fourth securing surfaces conformably restrict gingival movement of the attachment portion relative to the securing member when the attachment portion is in the attached state and the securing member is secured to the tooth.

11. The orthodontic system of claim 9, wherein:

the securing member defines a recess;

the first securing surface is at the recess;

the attachment portion includes a protuberance;

the second securing surface is at the protuberance; and the protuberance is seated in the recess when the attachment portion is in the attached state and the securing member is secured to the tooth.

12. The orthodontic system of claim 9, wherein sliding contact between the first securing surface and the second securing surface causes the flexure to resiliently deform in a mesiodistal dimension while the attachment portion moves from the detached state toward the attached state and the securing member is secured to the tooth.

13. The orthodontic system of claim 9, wherein sliding contact between the first securing surface and the second securing surface causes the flexure to resiliently deform in a buccolingual dimension while the attachment portion moves from the detached state toward the attached state and the securing member is secured to the tooth.

14. The orthodontic system of claim 9, wherein:
the first securing surface is a distal first securing surface;
the second securing surface is a distal second securing surface;
the flexure is a distal flexure;
the distal first securing surface, the distal second securing surface, and the distal flexure are at a distal side of an occlusogingival plane when the attachment portion is in the attached state and the securing member is secured to the tooth;
the securing member includes a mesial first securing surface;
the attachment portion includes:
a mesial flexure configured to resiliently deform while the attachment portion moves from the detached state toward the attached state and the securing member is secured to the tooth, and
a mesial second securing surface carried by the mesial flexure;
the mesial first securing surface, the mesial second securing surface, and the mesial flexure are at a mesial side of the occlusogingival plane when the attachment portion is in the attached state and the securing member is secured to the tooth; and
the mesial first securing surface and the mesial second securing surface conformably restrict relative movement between the attachment portion and the securing member in an occlusogingival dimension when the attachment portion is in the attached state and the securing member is secured to the tooth.

15. The orthodontic system of claim 14, wherein:
the distal flexure is configured to resiliently deform mesially while the attachment portion moves from the detached state toward the attached state and the securing member is secured to the tooth; and
the mesial flexure configured to resiliently deform distally while the attachment portion moves from the detached state toward the attached state and the securing member is secured to the tooth.

16. The orthodontic system of claim 14, wherein:
the distal flexure is configured to resiliently deform distally while the attachment portion moves from the detached state toward the attached state and the securing member is secured to the tooth; and
the mesial flexure configured to resiliently deform mesially while the attachment portion moves from the detached state toward the attached state and the securing member is secured to the tooth.

17. The orthodontic system of claim 14, wherein:
the distal flexure is configured to resiliently deform in a buccolingual dimension while the attachment portion moves from the detached state toward the attached state and the securing member is secured to the tooth; and
the mesial flexure configured to resiliently deform in the buccolingual dimension while the attachment portion moves from the detached state toward the attached state and the securing member is secured to the tooth.

18. The orthodontic system of claim 14, wherein:
the securing member defines:
a distal recess, and
a mesial recess;
the distal first securing surface is at the distal recess;
the mesial first securing surface is at the mesial recess;
the attachment portion includes:
a distal protuberance, and
a mesial protuberance;
the distal second securing surface is at the distal protuberance;
the mesial second securing surface is at the mesial protuberance;
the distal recess and the distal protuberance are at the distal side of the occlusogingival plane when the attachment portion is in the attached state and the securing member is secured to the tooth;
the mesial recess and the mesial protuberance are at the mesial side of the occlusogingival plane when the attachment portion is in the attached state and the securing member is secured to the tooth;
the distal protuberance is seated in the distal recess when the attachment portion is in the attached state and the securing member is secured to the tooth; and
the mesial protuberance is seated in the mesial recess when the attachment portion is in the attached state and the securing member is secured to the tooth.

19. The orthodontic system of claim 14, wherein:
the distal first securing surface and the distal second securing surface conformably restrict occlusal movement of the attachment portion relative to the securing member when the attachment portion is in the attached state and the securing member is secured to the tooth;
the mesial first securing surface and the mesial second securing surface conformably restrict occlusal movement of the attachment portion relative to the securing member when the attachment portion is in the attached state and the securing member is secured to the tooth;
the securing member includes:
a distal third securing surface, and
a mesial third securing surface;
the attachment portion includes:
a distal fourth securing surface, and
a mesial fourth securing surface;
the distal third securing surface and the distal fourth securing surface are at the distal side of the occlusogingival plane when the attachment portion is in the attached state and the securing member is secured to the tooth;
the mesial third securing surface and the mesial fourth securing surface are at the mesial side of the occlusogingival plane when the attachment portion is in the attached state and the securing member is secured to the tooth;
the distal third securing surface and the distal fourth securing surface conformably restrict gingival movement of the attachment portion relative to the securing member when the attachment portion is in the attached state and the securing member is secured to the tooth; and
the mesial third securing surface and the mesial fourth securing surface conformably restrict gingival movement of the attachment portion relative to the securing member when the attachment portion is in the attached state and the securing member is secured to the tooth.

20. A method of operating an orthodontic system, the method comprising:
detaching an attachment portion of an orthodontic appliance of the orthodontic system from a securing member of the orthodontic system while the securing member is secured to a tooth of a patient, wherein detaching the attachment portion from the securing member includes:
moving a lever into contact with a leveraging surface of the attachment portion while the attachment portion is in an attached state, wherein the attachment portion in the attached state operably connects the orthodontic appliance to the securing member such that the orthodontic appliance exerts active and/or retentive orthodontic force on the tooth via the attachment portion and the securing member, and wherein the attachment portion has a detached state in which the orthodontic appliance is operably disconnected from the securing member; and moving the lever supported by a fulcrum of the securing member to exert leverage on the attachment portion via the leveraging surface and thereby move the attachment portion occlusally relative to the securing member from the attached state toward the detached state.

21. The method of claim 20, further comprising transferring the orthodontic force to the tooth while the attachment portion is in the attached state and before detaching the attachment portion from the securing member.

22. The method of claim 20, further comprising transferring the orthodontic force to the tooth via a connector of the orthodontic appliance at a gingival side of the attachment portion while the attachment portion is in the attached state and before detaching the attachment portion from the securing member.

23. The method of claim 20, further comprising transferring the orthodontic force to the tooth via a connector of the orthodontic appliance at a mesial or distal side of the attachment portion while the attachment portion is in the attached state and before detaching the attachment portion from the securing member.

24. The method of claim 20, wherein:

the leveraging surface is elongate; and moving the lever includes moving the lever while a length of the leveraging surface is within ten degrees of parallel to a buccolingual dimension.

25. The method of claim 20, wherein:

moving the lever includes moving the lever while the lever is received in a slot defined by the attachment portion; and exerting leverage on the attachment portion includes exerting leverage on the attachment portion via the leveraging surface at an occlusal side of the slot.

26. The method of claim 20, further comprising attaching the attachment portion to the securing member before detaching the attachment portion from the securing member and while the securing member is secured to the tooth, wherein:

detaching the attachment portion from the securing member includes moving the attachment portion occlusally relative to the securing member; and attaching the attachment portion to the securing member includes moving the attachment portion gingivally relative to the securing member.

27. The method of claim 26, wherein attaching the attachment portion to the securing member includes snapping the attachment portion from the detached state to the attached state in response to moving the attachment portion occlusally relative to the securing member.

28. The method of claim 20, wherein detaching the attachment portion from the securing member includes resiliently deforming a flexure of the attachment portion.

29. The method of claim 28, wherein resiliently deforming the flexure includes resiliently deforming the flexure in a mesiodistal dimension.

30. The method of claim 28, wherein resiliently deforming the flexure includes resiliently deforming the flexure in a buccolingual dimension.

31. An orthodontic system, comprising:

a securing member including:

a backing having a first side and a second side opposite the first side along a thickness of the backing and configured to be secured to a tooth of a patient, a protrusion carried by the backing, wherein the protrusion extends away from the first side in a buccolingual dimension when the securing member is secured to the tooth via the backing, and an orthodontic appliance operably associated with the securing member, wherein the orthodontic appliance includes an attachment portion configured to be releasably secured to the securing member, wherein the attachment portion has:

an attached state in which the orthodontic appliance exerts active and/or retentive orthodontic force on the tooth via the attachment portion and the securing member when the securing member is secured to the tooth, and a detached state in which the orthodontic appliance is operably disconnected from the securing member, wherein the attachment portion is configured to move from the detached state to the attached state in response to relative movement between the attachment portion and the securing member in an occlusogingival dimension when the securing member is secured to the tooth, and wherein the attachment portion is configured to be forcefully moved occlusally relative to the securing member from the attached state toward the detached state when the securing member is secured to the tooth.

* * * * *